US012124211B2

(12) United States Patent
Uesugi et al.

(10) Patent No.: US 12,124,211 B2
(45) Date of Patent: Oct. 22, 2024

(54) DRUM UNIT, CARTRIDGE AND COUPLING MEMBER

(71) Applicant: CANON KABUSHIKI KAISHA, Tokyo (JP)

(72) Inventors: Tetsuo Uesugi, Suntou-gun (JP); Makoto Hayashida, Numazu (JP); Koji Yamaguchi, Numazu (JP); Takashi Yano, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/229,722

(22) Filed: Aug. 3, 2023

(65) Prior Publication Data

US 2023/0375976 A1 Nov. 23, 2023

Related U.S. Application Data

(60) Division of application No. 17/522,005, filed on Nov. 9, 2021, now Pat. No. 11,762,330, which is a division
(Continued)

(30) Foreign Application Priority Data

Feb. 27, 2015 (JP) ................................ 2015-039432
Feb. 9, 2016 (JP) ................................ 2016-023071

(51) Int. Cl.
*G03G 21/18* (2006.01)
*G03G 15/00* (2006.01)
(Continued)

(52) U.S. Cl.
CPC ......... *G03G 21/1853* (2013.01); *G03G 15/00* (2013.01); *G03G 15/08* (2013.01);
(Continued)

(58) Field of Classification Search
CPC .... G03G 21/1853; G03G 21/16; G03G 21/18; G03G 21/1857; G03G 21/186;
(Continued)

(56) References Cited

U.S. PATENT DOCUMENTS 3,399,911 A 9/1968 Reisch
5,128,715 A 7/1992 Furuyama et al.
(Continued)

FOREIGN PATENT DOCUMENTS

CA 2 421 985 3/1998
CL 2010-00577 6/2010
(Continued)

OTHER PUBLICATIONS

Feb. 18, 2022 Office Action in Korean Patent Application No. 2022-7002582 (with English translation).
(Continued)

*Primary Examiner* — Ryan D Walsh
(74) *Attorney, Agent, or Firm* — Venable LLP

(57) ABSTRACT

A developing cartridge includes a coupling member provided adjacent to a first end of a casing. The coupling member is operatively connected to a developing roller, and the coupling member is rotatable about a rotational axis thereof. The coupling member includes (i) a cylindrical portion, (ii) a first projection at least partially positioned inside of the cylindrical portion, (iii) a second projection at least partially positioned inside of the cylindrical portion, (iv) an elastically movable projection at least partially positioned inside of the cylindrical portion, and (v) a wall extending in a direction perpendicular to the rotational axis and positioned between a second end of the casing and the first and second projections.

11 Claims, 151 Drawing Sheets

Related U.S. Application Data of application No. 16/594,506, filed on Oct. 7, 2019, now Pat. No. 11,442,405, which is a division of application No. 15/685,169, filed on Aug. 24, 2017, now Pat. No. 11,061,364, which is a continuation of application No. PCT/JP2016/056692, filed on Feb. 26, 2016.

(51) Int. Cl.
*G03G 15/08* (2006.01)
*G03G 21/16* (2006.01)

(52) U.S. Cl.
CPC .......... *G03G 15/757* (2013.01); *G03G 21/16* (2013.01); *G03G 21/18* (2013.01); *G03G 21/1857* (2013.01); *G03G 21/186* (2013.01); *G03G 21/1821* (2013.01); *G03G 21/1842* (2013.01); *G03G 2215/0132* (2013.01); *G03G 2221/1657* (2013.01); *Y10T 403/60* (2015.01); *Y10T 403/606* (2015.01); *Y10T 403/7026* (2015.01); *Y10T 403/7033* (2015.01)

(58) Field of Classification Search
CPC .......... G03G 21/1821; G03G 21/1842; G03G 15/00; G03G 15/08; G03G 15/757; G03G 2215/0132; G03G 2215/1657; Y10T 403/606; Y10T 403/60; Y10T 403/7026; Y10T 403/7033
See application file for complete search history.

(56) References Cited

U.S. PATENT DOCUMENTS

| | | | |
|---|---|---|---|
| 5,132,728 | A | 7/1992 | Suzaki et al. |
| 5,148,902 | A | 9/1992 | Nakamura |
| 5,528,348 | A | 6/1996 | Miwa et al. |
| 5,678,139 | A | 10/1997 | Nomura et al. |
| 5,842,093 | A | 11/1998 | Tanda |
| 5,897,243 | A | 4/1999 | Komatsubara et al. |
| 5,920,753 | A | 7/1999 | Sasaki et al. |
| 5,953,562 | A | 9/1999 | Kawaguchi et al. |
| 6,006,058 | A | 12/1999 | Watanabe et al. |
| 6,072,968 | A | 6/2000 | Nomura et al. |
| 6,104,896 | A | 8/2000 | Zaman et al. |
| 6,128,454 | A | 10/2000 | Kawai et al. |
| 6,240,266 | B1 | 5/2001 | Watanabe et al. |
| 6,317,572 | B1 | 11/2001 | Miyabe et al. |
| 6,349,188 | B1 | 2/2002 | Kawai et al. |
| 6,381,429 | B1 | 4/2002 | Shibata et al. |
| 6,394,943 | B1 | 5/2002 | Cormier et al. |
| 6,473,580 | B1 | 10/2002 | Inomata |
| 6,603,939 | B1 | 8/2003 | Toba et al. |
| 6,608,980 | B2 | 8/2003 | Murayama et al. |
| 6,681,088 | B2 | 1/2004 | Kanno et al. |
| 6,782,219 | B2 | 8/2004 | Yoshino et al. |
| 6,834,173 | B2 | 12/2004 | Yamaguchi et al. |
| 6,915,092 | B2 | 7/2005 | Yamaguchi et al. |
| 6,920,298 | B2 | 7/2005 | Yamada et al. |
| 6,947,687 | B2 | 9/2005 | Yamaguchi et al. |
| 6,961,528 | B2 | 11/2005 | Yamaguchi et al. |
| 6,983,115 | B2 | 1/2006 | Isobe et al. |
| 7,016,626 | B2 | 3/2006 | Yokomori et al. |
| 7,068,965 | B2 | 6/2006 | Yoshino et al. |
| 7,092,655 | B2 | 8/2006 | Noda et al. |
| 7,116,925 | B2 | 10/2006 | Yamaguchi |
| 7,136,604 | B2 | 11/2006 | Chadani et al. |
| 7,184,687 | B2 | 2/2007 | Yamaguchi et al. |
| 7,194,225 | B2 | 3/2007 | Yamaguchi |
| 7,274,896 | B2 | 9/2007 | Kawai et al. |
| 7,319,834 | B2 | 1/2008 | Yamaguchi |
| 7,477,865 | B2 | 1/2009 | Yamaguchi |
| 7,519,310 | B2 | 4/2009 | Yamaguchi et al. |
| 7,792,460 | B2 | 9/2010 | Yamaguchi et al. |
| 7,881,645 | B2 | 2/2011 | Yamada et al. |
| 7,933,534 | B2 | 4/2011 | Hoshi et al. |
| 8,121,519 | B2 | 2/2012 | Yamaguchi et al. |
| 8,270,876 | B2 | 9/2012 | Morioka et al. |
| 8,369,744 | B2 | 2/2013 | Asanuma et al. |
| 8,472,840 | B2 | 6/2013 | Abe et al. |
| 8,494,411 | B2 | 7/2013 | Miyabe et al. |
| 8,577,252 | B2 | 11/2013 | Anan et al. |
| 8,630,564 | B2 | 1/2014 | Ueno et al. |
| 8,676,090 | B1 | 3/2014 | Ueno et al. |
| 8,682,211 | B2 | 3/2014 | Hoshi et al. |
| 8,768,218 | B2 | 7/2014 | Huck et al. |
| 8,818,241 | B2 | 8/2014 | Swartz et al. |
| 8,867,955 | B2 | 10/2014 | Yamaguchi et al. |
| 8,897,673 | B2 | 11/2014 | Lee et al. |
| 8,909,102 | B2 | 12/2014 | Moegan |
| 8,965,243 | B2 | 2/2015 | Hayashida |
| 9,046,820 | B1 | 6/2015 | Yamada et al. |
| 9,046,823 | B2 | 6/2015 | Satomura et al. |
| 9,063,464 | B2 | 6/2015 | Furutani et al. |
| 9,146,500 | B2 | 9/2015 | Uesugi et al. |
| 9,152,081 | B2 | 10/2015 | Yasui et al. |
| 9,207,581 | B2 | 12/2015 | Wada et al. |
| 9,213,267 | B2 | 12/2015 | Hoshi et al. |
| 9,285,707 | B2 | 3/2016 | Matsushita et al. |
| 9,291,942 | B2 | 3/2016 | Matsuzaki et al. |
| 9,302,801 | B2 | 4/2016 | Matsumura et al. |
| 9,304,440 | B2 | 4/2016 | Yoshida et al. |
| 9,304,441 | B2 | 4/2016 | Matsushita et al. |
| 9,310,717 | B2 | 4/2016 | Matsunaga et al. |
| 9,341,983 | B2 | 5/2016 | Yoshida et al. |
| 9,354,553 | B2 | 5/2016 | Yoshida et al. |
| 9,383,678 | B2 | 7/2016 | Furutani et al. |
| 9,465,356 | B2 | 10/2016 | Yamaguchi et al. |
| 9,494,890 | B2 | 11/2016 | Komatsu et al. |
| 9,500,995 | B2 | 11/2016 | Satomura et al. |
| 9,529,304 | B2 | 12/2016 | Uesugi et al. |
| 9,588,478 | B1 | 3/2017 | Fan |
| 9,665,040 | B2 | 5/2017 | Matsuzaki et al. |
| 9,684,279 | B2 | 6/2017 | Nakamura et al. |
| 9,885,978 | B2 | 2/2018 | Matsuzaki et al. |
| 10,207,761 | B2 | 2/2019 | McKinster et al. |
| 11,762,330 | B2 * | 9/2023 | Uesugi .............. G03G 21/1853 399/117 |
| 2002/0025191 | A1 | 2/2002 | Kitayama et al. |
| 2002/0044794 | A1 | 4/2002 | Nishiuwatoko et al. |
| 2002/0076235 | A1 | 6/2002 | Matsuzaki |
| 2002/0127029 | A1 | 9/2002 | Yamada et al. |
| 2002/0018666 | A1 | 12/2002 | Noda et al. |
| 2003/0002758 | A1 | 1/2003 | Wyer |
| 2003/0099485 | A1 | 5/2003 | Ahn et al. |
| 2004/0005169 | A1 | 1/2004 | Yokomori et al. |
| 2004/0190945 | A1 | 9/2004 | Yamada |
| 2005/0047818 | A1 | 3/2005 | Yamada et al. |
| 2005/0117935 | A1 | 6/2005 | Hoshi et al. |
| 2006/0008287 | A1 | 1/2006 | Noda et al. |
| 2006/0045568 | A1 | 3/2006 | Kishi et al. |
| 2007/0110478 | A1 | 5/2007 | Nuagami et al. |
| 2007/0237545 | A1 | 10/2007 | Cho et al. |
| 2008/0044204 | A1 | 2/2008 | Inoue |
| 2008/0080892 | A1 | 4/2008 | Yamaguchi |
| 2008/0138115 | A1 | 6/2008 | Chadani et al. |
| 2008/0152388 | A1 | 6/2008 | Ueno et al. |
| 2008/0240796 | A1 | 10/2008 | Morioka et al. |
| 2008/0279584 | A1 | 11/2008 | Huang et al. |
| 2009/0003876 | A1 | 1/2009 | Maeshima et al. |
| 2009/0142103 | A1 | 6/2009 | Chaudhuri et al. |
| 2009/0317129 | A1 | 12/2009 | Abe et al. |
| 2009/0317131 | A1 | 12/2009 | Morioka et al. |
| 2009/0317132 | A1 | 12/2009 | Asanuma et al. |
| 2010/0034561 | A1 | 2/2010 | Batori et al. |
| 2010/0166452 | A1 | 7/2010 | Leemhuis et al. |
| 2010/0221041 | A1 | 9/2010 | Takai et al. |
| 2010/0272470 | A1 | 10/2010 | Tomatsu et al. |
| 2010/0278559 | A1 | 11/2010 | Komatsu et al. |
| 2011/0038649 | A1 | 2/2011 | Miyabe et al. |
| 2011/0211863 | A1 | 9/2011 | Watanabe et al. |
| 2012/0056954 | A1 | 3/2012 | Asauchi et al. |
| 2012/0230729 | A1 | 9/2012 | Abe |

(56) References Cited

U.S. PATENT DOCUMENTS

| | | | |
|---|---|---|---|
| 2012/0269545 | A1 | 10/2012 | Morita et al. |
| 2012/0294649 | A1 | 11/2012 | Kikuchi et al. |
| 2013/0037588 | A1 | 2/2013 | Visenzi |
| 2013/0058710 | A1 | 3/2013 | Fan |
| 2013/0170867 | A1 | 7/2013 | Acosta et al. |
| 2013/0287448 | A1 | 10/2013 | Baker et al. |
| 2014/0036336 | A1 | 2/2014 | Camara et al. |
| 2014/0037336 | A1 | 2/2014 | Yan |
| 2014/0079440 | A1 | 3/2014 | Alber et al. |
| 2014/0153968 | A1 | 6/2014 | Huck et al. |
| 2014/0193179 | A1 | 7/2014 | Tomoda et al. |
| 2015/0202726 | A1 | 1/2015 | Yonezawa |
| 2015/0050050 | A1 | 2/2015 | Huang |
| 2015/0153701 | A1 | 6/2015 | Huang |
| 2015/0165909 | A1 | 6/2015 | Maul |
| 2015/0168910 | A1 | 6/2015 | Maul |
| 2016/0004185 | A1 | 1/2016 | Enokuchi et al. |
| 2017/0248909 | A1 | 8/2017 | Nakamura et al. |
| 2018/0113399 | A1 | 4/2018 | Matsuzaki et al. |
| 2019/0179249 | A1 | 6/2019 | Mori et al. |
| 2019/0187608 | A1 | 6/2019 | Uesugi et al. |
| 2023/0375976 | A1* | 11/2023 | Uesugi ................. G03G 21/186 |

FOREIGN PATENT DOCUMENTS

| | | | |
|---|---|---|---|
| CL | 2011-01473 | | 6/2011 |
| CL | 2014-02867 | | 10/2014 |
| CN | 1182891 | A | 5/1998 |
| CN | 1359036 | A | 7/2002 |
| CN | 1517813 | A | 8/2004 |
| CN | 1680885 | A | 10/2005 |
| CN | 201007783 | Y | 1/2008 |
| CN | 102067042 | A | 5/2011 |
| CN | 102067043 | A | 5/2011 |
| CN | 102067045 | A | 5/2011 |
| CN | 102749821 | A | 10/2012 |
| CN | 1379292 | A | 11/2012 |
| CN | 104076658 | A | 10/2014 |
| CN | 203858453 | U | 10/2014 |
| CN | 104166327 | A | 11/2014 |
| CN | 104991428 | A | 10/2015 |
| CO | 16088043 | | 4/2016 |
| DE | 19617149 | A | 10/1996 |
| EP | 0 833 412 | | 4/1998 |
| EP | 1 113 344 | A | 7/2001 |
| EP | 1 195 651 | | 4/2002 |
| EP | 1 202 135 | | 5/2002 |
| EP | 1 229 406 | | 8/2002 |
| EP | 1 233 310 | A2 | 8/2002 |
| EP | 1 600 826 | | 11/2005 |
| EP | 1 628 165 | | 2/2006 |
| EP | 1 705 532 | A1 | 9/2006 |
| EP | 1 734 410 | | 12/2006 |
| EP | 1 843 216 | A | 10/2007 |
| EP | 1 369 750 | | 12/2008 |
| EP | 2 498 139 | A | 9/2012 |
| EP | 2 631 718 | | 8/2013 |
| EP | 2 735 917 | A1 | 5/2014 |
| JP | H01-79075 | U | 5/1989 |
| JP | H04-24656 | A | 1/1992 |
| JP | H05-19550 | A | 1/1993 |
| JP | H05-27655 | A | 2/1993 |
| JP | H08-87225 | A | 4/1996 |
| JP | H10-104996 | A | 4/1998 |
| JP | S63-193160 | A | 8/1998 |
| JP | 11-187738 | A | 7/1999 |
| JP | 2000-214727 | A | 8/2000 |
| JP | 2001-193755 | A | 7/2001 |
| JP | 2001-3566538 | A | 12/2001 |
| JP | 2002-318490 | A | 10/2002 |
| JP | 2003-186368 | A | 7/2003 |
| JP | 2003-343602 | A | 12/2003 |
| JP | 2004-295147 | A | 10/2004 |
| JP | 2005-077742 | A | 3/2005 |
| JP | 2006-162944 | A | 6/2006 |
| JP | 2006-227098 | A | 8/2006 |
| JP | 2008-233867 | A | 10/2008 |
| JP | 2011-028167 | A | 2/2011 |
| JP | 2013-033301 | A | 2/2013 |
| JP | 2014-170141 | A | 9/2014 |
| JP | 2014-206770 | A | 10/2014 |
| JP | 2014-240991 | A | 12/2014 |
| KR | 10-2005-0052322 | A | 6/2005 |
| KR | 10-2009-0080120 | A | 7/2009 |
| KR | 10-2019-0130192 | A | 12/2009 |
| KR | 10-2010-0017728 | A | 2/2010 |
| KR | 10-2012-0008091 | A | 1/2012 |
| RU | 2 376 620 | C2 | 12/2009 |
| RU | 2488868 | C | 7/2013 |
| TW | 201435521 | A | 9/2014 |
| WO | 2010004854 | A1 | 1/2010 |
| WO | 2010/024457 | | 3/2010 |
| WO | 2013/085073 | A1 | 6/2013 |
| WO | 2013/187737 | | 12/2013 |

OTHER PUBLICATIONS

Feb. 2, 2022 Office Action in Chilean Patent Application No. 202001372.

Feb. 2, 2022 Office Action in Chilean Patent Application No. 202001374.

Feb. 2, 2022 Office Action in Chilean Patent Application No. 202001377.

Feb. 11, 2022 Office Action in Chilean Patent Application No. 202001373.

Feb. 11, 2022 Office Action in Chilean Patent Application No. 202001376.

Jan. 21, 2022 Office Action in Chilean Patent Application 201903230.

Jan. 27, 2022 Office Action in Canadian Patent Application No. 3,028,578.

Mar. 30, 2022 Office Action in Canadian Patent Application No. 3,028,570.

Mar. 28, 2022 Office Action in Canadian Patent Application No. 3,108,746.

Mar. 28, 2022 Office Action in Canadian Patent Application No. 3,108,745.

Mar. 29, 2022 Office Action in Canadian Patent Application No. 2,977,940.

Mar. 25, 2022 Office Action in Canadian Patent Application No. 3,108,740.

Mar. 25, 2022 Office Action in German Patent Application No. 11 2016 000 940.2 (with English translation).

Nov. 10, 2022 Notice of Allowance in Korean Patent Application No. 10-2022-7034071.

Nov. 24, 2022 Notice of Acceptance in Australian Patent Application No. 2021200543.

Dec. 23, 2022 Office Action in Canadian Patent Application No. 3,135,761.

Dec. 28, 2022 Office Action in Canadian Patent Application No. 3,135,765.

Dec. 23, 2022 Office Action in Canadian Patent Application No. 3,135,754.

Dec. 23, 2022 Office Action in Canadian Patent Application No. 3,135,768.

Dec. 6, 2022 Office Action in Japanese Patent Application No. 2022-016881 (with computer translation).

Apr. 3, 2023 Notice of Allowance in Korean Patent Application No. 10-2023-7004693.

Apr. 4, 2023 Office Action in Brazilian Patent Application No. 112017017874-5 (with English translation).

May 9, 2023 Examination Report in United Emirates Patent Application No. P6001077/2017.

May 30, 2023 Office Action in Canadian Patent Application No. 2,977,940.

Jun. 30, 2023 Notice of Allowance in Taiwanese Patent Application No. 11220632920.

Jun. 30, 2023 Notice of Allowance in Taiwanese Patent Application No. 110139222.

(56) References Cited

OTHER PUBLICATIONS

Oct. 31, 2023 Examination Report in Australian Patent Application No. 2022268284.
Search Report in Russian Patent Application No. 2019123022, mailed Dec. 2, 2019 (with English translation).
Decision on Grant in Russian Patent Application No. 2019123022, mailed Dec. 16, 2019 (with English translation).
Jan. 29, 2020 Examination Report in Australian Patent Application No. 2019200238.
Jan. 15, 2020 Office Action in Taiwanese Patent Application Pub. No. 107117081 (with English translation).
Feb. 20, 2020 Office Action in Indian Patent Application Pub. No. 201747033632.
Mar. 10, 2020 Communication in European Patent Application No. 19 178 941.1.
U.S. Appl. No. 16/594,822; U.S. Appl. No. 16/594,234; U.S. Appl. No. 16/594,250; U.S. Appl. No. 16/594,302; U.S. Appl. No. 16/594,340; U.S. Appl. No. 16/594,351; U.S. Appl. No. 16/594,440; U.S. Appl. No. 16/594,478; U.S. Appl. No. 16/594,478; U.S. Appl. No. 16/594,536; U.S. Appl. No. 16/594,604; U.S. Appl. No. 16/594,774; and U.S. Appl. No. 16/679,811.
Apr. 1, 2020 Office Action in Colombian Patent Application No. NC2017/0009086 (with English translation).
Feb. 24, 2020 Office Action in Chilean Patent Application No. 201702162.
Mar. 31, 2020 Office Action in Japanese Patent Application No. 2016-038343 (with excerpt English translation).
Apr. 20, 2020 Notice of Allowance in Korean Patent Application No. 10-2020-7002335.
Apr. 22, 2020 Notice of Allowance in Korean Patent Application No. 10-2020-7002445.
Jun. 10, 2020 Office Action in Colombian Patent Application No. NC2019/0014006 (with English translation).
Jun. 10, 2020 Office Action in Colombian Patent Application No. NC2019/0014008 (with English translation).
Jun. 10, 2020 Office Action in Colombian Patent Application No. NC2019/0014009 (with English translation).
Jul. 28, 2020 Office Action in Colombian Patent Application No. NC2019/0014011 (with English translation).
Aug. 21, 2020 Office Action in Colombian Patent Application No. NC2019/0014014 (with English translation).
Jun. 10, 2020 Office Action in Colombian Patent Application No. NC2019/0014007 (with English translation).
Oct. 16, 2020 Office Action in Canadian Patent Application No. 3,028,570.
Oct. 13, 2020 Office Action in Canadian Patent Application No. 3,028,577.
Oct. 13, 2020 Office Action in Canadian Patent Application No. 3,028,578.
Oct. 16, 2020 Office Action in United Kingdom Patent Application No. GB2005498.7.
Oct. 16, 2020 Office Action in United Kingdom Patent Application No. GB2005496.1.
Nov. 24, 2020 Notice of Allowance in Korean Patent Application No. 10-2020-7002335.
Nov. 24, 2020 Notice of Allowance in Korean Patent Application No. 10-2020-7002423.
Nov. 10, 2020 Office Action in Canadian Patent Application No. 3,028,568.
Apr. 26, 2021 Office Action Indonesian Patent Application No. P00201706423 (with English translation).
May 5, 2021 Office Action in Chilean Patent Application No. 201903230.
May 20, 2021 Communication in European Patent Application No. 19 178 941.1.
Apr. 19, 2021 Extended Search Report in European Patent Application No. 20209710.1.
Apr. 19, 2021 Extended Search Report in European Patent Application No. 20209713.5.
Feb. 24, 2021 Search and Examination Report in United Arab Emirates Patent Application No. P6001077/2017.
Feb. 9, 2021 Office Action in Russian Patent Application No. 2020125146 (with English translation).
Aug. 16, 2021 Office Action in Chilean Patent Application No. 202001373.
Aug. 17, 2021 Office Action in Chilean Patent Application No. 202001376.
Aug. 17, 2021 Office Action in Chilean Patent Application No. 202001379.
Office Action in Russian Patent Application No. 2019123022, dated Dec. 2, 2019 (with English Translation).
Aug. 11, 2021 Office Action in Chilean Patent Application No. 202001374.
Aug. 12, 2021 Office Action in Chilean Patent Application No. 202001377.
Aug. 16, 2021 Office Action in Chilean Patent Application No. 202001375.
Aug. 16, 2021 Office Action in Chilean Patent Application No. 202001380.
Aug. 10, 2021 Office Action in Chilean Patent Application No. 202001372.
English translation of Japanese Patent Application Pub. No. 2006-162944.
Jul. 6, 2021 Office Action in Japanese Patent Application No. 2020-108233 (with English translation).
Jul. 5, 2021 Decision to Grant in Russian Patent Application No. 2020125146 (with English translation).
Sep. 28, 2023 Office Action in Chinese Patent Application No. 202110403201.6.
Sep. 27, 2023 Office Action in Chinese Patent Application No. 202110402893.2.
Sep. 29, 2023 Office Action in Chinese Patent Application No. 202110402941.8.
Sep. 28, 2023 Office Action in Chinese Patent Application No. 202110402942.2.
Sep. 28, 2023 Office Action in Chinese Patent Application No. 202110403137.1.
U.S. Appl. No. 16/067,363.
U.S. Appl. No. 16/158,908.
English translation of Japanese Patent Application Publication No. H05-19550.
English translation of Japanese Patent Application Publication No. H08-87225.
Extended Search Report in European Patent Application No. 16 755 757.8, issued Jun. 27, 2018.
Decision on Grant in Russian Patent Application No. 2017133462, mailed Jun. 6, 2018 (with English translation).
Notice of Allowance in Taiwanese Patent Application No. 105105978, mailed Apr. 18, 2018.
Examination Report in Australian Patent Application No. 2016224399, dated Aug. 27, 2018.
Dec. 26, 2018 Office Action in Chinese Patent Application No. 20168001880.2 (with English translation).
Jan. 10, 2019 Office Action in Korean Patent Application No. 10-2017-7027394.
Office Action in Colomian Patent Application No. NC2017/0009086, dated Mar. 28, 2019 (with English translation).
May 13, 2019 Office Action in Chilean Patent Application No. 201702162.
Communication in European Patent Application No. 16 755 757.8, dated Jun. 3, 2019.
Decision to Grant in Russian Patent Application No. 2018130291, mailed May 21, 2019.
International Search Report and Written Opinion for International Patent Application No. PCT/JP2016/056692.
Notice of Allowance in Korean Patent Application No. 10-2017-7027394, mailed Oct. 30, 2019.
Oct. 8, 2020 Office Action in Canadian Patent Application No. 3,028,564.
Oct. 25, 2021 Notice of Allowance in Korean Patent Application No. 10-2021-7005196.

(56) References Cited

OTHER PUBLICATIONS

May 22, 2020 Decision to Grant in Russian Patent Application No. 2020108458 (with English translation).
Jul. 7, 2020 Office Action in Brazilian Patent Application No. BR112017017874-5 (with English translation).
Nov. 19, 2021 Examination Report in Australian Patent Application No. 2021200543.
Jan. 21, 2022 Office Action in Chilean Patent Application No. 201903230.
Dec. 20, 2021 Examination Report in Indian Patent Application No. 202048050394.
Dec. 20, 2021 Examination Report in Indian Patent Application No. 202048050498.
Dec. 20, 2021 Examination Report in Indian Patent Application No. 202048050380.
Dec. 20, 2021 Examination Report in Indian Patent Application No. 202048050129.
Dec. 20, 2021 Examination Report in Indian Patent Application No. 202048050157.
Dec. 20, 2021 Examination Report in Indian Patent Application No. 202048050186.
Jan. 6, 2022 Examination Report in Indian Patent Application No. 202048050548.
May 11, 2022 Decision to Grant in Russian Patent Application Pub. No. 2021126032 (with English Translation).
Jul. 1, 2022 Notice of Allowance in Korean Patent Application Pub. No. 10-2022-7002582.
Aug. 4, 2022 Notice of Allowance in Chilean Patent Application No. 2020-01374.
Aug. 5, 2022 Office Action in Chilean Patent Application No. 2020-01380.
Aug. 5, 2022 Office Action in Chilean Patent Application No. 2020-01375.
Aug. 8, 2022 Office Action in Chilean Patent Application No. 2020-01379.
Nov. 20, 2023 Examination Report in Philippines Patent Application No. 1/2017/501542.
Feb. 19, 2024 Search Report in European Patent Application No. 23 176 398.8.
Dec. 26, 2023 Search Report in United Arab Emirates Patent Application No. P6000658/2021.
May 7, 2024 Office Action in India Patent Application No. 20248050129.
May 27, 2024 Notice of Allowance in Korean Patent Application No. 10-2023-7021858.
May 7, 2024 Office Action in Indian Patent Application No. 202048050157.
May 7, 2024 Office Action in Indian Patent Application No. 202048050186.
May 3, 2024 Office Action in Canadian Patent Application No. 2,977,940.
May 20, 2024 Office Action in Chinese Patent Application No. 202110402894.2 (with English translation).
May 31, 2024, Notice of Allowance in Philippines Patent Application No. 1/2017/501542.
Jun. 7, 2024 Office Action in Indian Patent Application No. 202048050305.
Jun. 7, 2024 Office Action in Indian Patent Application No. 202048050380.
Jun. 10, 2024 Office Action in Indian Patent Application No. 202048050394.
Jun. 27, 2024 Office Action in Indian Patent Application No. 202048050394.
Jun. 27, 2024 Office Action in Indian Patent Application No. 202048050305.
Jun. 27, 2024 Office Action in Indian Patent Application No. 20204805080.
May 28, 2024 Office Action in Japanese Patent Application No. 2023-036402 (with English translation).
Aug. 8, 2024 Office Action in United Arab Emirates Patent Application No. P6000659/2021.
Aug. 8, 2024 Office Action in United Arab Emirates Patent Application No. P6000660/2021.
Aug. 8, 2024 Office Action in united Arab Emirates Patent Application No. P6000661/2021.
English translation of Japanese Patent Application Pub. No. 2014-170141 A.
English translation of Japanese Patent Application Pub. No. 2014-206770 A.
English translation of Japanese Patent Application Publ. No. 2011-028167 A.

* cited by examiner (a)

(b)

(a)

(b)

(a)

(b)

(a)

(b)

DRUM UNIT, CARTRIDGE AND COUPLING MEMBER

TECHNICAL FIELD

The present invention relates to a process cartridge usable with an image forming apparatus using an electrophotographic process, or the like.

BACKGROUND ART

In an electrophotographic image forming apparatus, there is known a structure in which elements such as a photosensitive drum and a developing roller, which are rotatable members related to image formation, are integrated into a cartridge which is detachably mountable relative to a main assembly of an image forming apparatus (hereinafter, the apparatus main assembly). In such a structure, a structure for receiving a driving force from the apparatus main assembly to rotate the photosensitive drum in the cartridge is employed in many apparatuses. At this time, a structure is known in which a driving force is transmitted through engagement between a coupling member on a cartridge side and a driving force transmitting portion such as a drive pin on the apparatus main assembly side.

For example, Japanese Patent Laid-Open No. 2008-233867 discloses a cartridge having a coupling member provided at a end portion of a photosensitive drum so as to be tillable with respect to a rotation axis of the photosensitive drum.

Problem to be Solved by the Invention

It is another object of the present invention to develop the above-mentioned conventional technique.

Means for Solving the Problem

Typical structures are as follows.

A drum unit detachably mountable to a main assembly of an electrophotographic image forming apparatus, the apparatus including a driving shaft provided with a recess, said drum unit comprising:

(I) a photosensitive drum; and (II) a coupling member provided on said photosensitive drum, said coupling member including, (II-I) a driving force receiving portion configured to enter the recess and receive a driving force for rotating said photosensitive drum, and (II-II) a supporting portion movably supporting said driving force receiving portion, wherein at least a part of said supporting portion and/or at least a part of said driving force receiving portion is disposed inside said photosensitive drum.

Effects of the Invention

The above-mentioned conventional technique is further developed.

BRIEF DESCRIPTION OF THE DRAWINGS

FIG. 118 is a cross-sectional view of the coupling member 2328 according to Embodiment 21.

FIG. 119 is a sectional view of the coupling member 2328 and the main assembly driving shaft 2410 according to Embodiment 21.

FIG. 120 is a perspective view of a main assembly driving shaft 2210 according to Embodiments 19-21.

FIG. 121 is a perspective view of the cartridge 7 according to Embodiments 19-21.

FIG. 122 is a cross-sectional view of a coupling member 2438 according to Embodiment 22.

FIG. 123 is a cross-sectional perspective view of a coupling member 2428 according to Embodiment 22.

FIG. 124 is sectional views of the coupling member 2428 according to Embodiment 22, taken along a plane perpendicular to the rotation axis of the coupling member 2428 and including a position of a linear portion 2474*p* of a base portion 2474.

FIG. 125 is a cross-sectional view of the coupling member 2428 according to the Embodiment 22 and the main assembly drive shaft 101 taken along a plane perpendicular to the rotation axis and including the driving force receiving surface 2473*a*.

FIG. 126 is a perspective view of an alignment 2433 according to Embodiment 22.

FIG. 127 is explanatory sectional views of the mounting operation of the coupling member 2428 to the main assembly driving shaft 101 according to Embodiment 22.

FIG. 128 is explanatory cross-sectional views of a mounting operation of the coupling member 2428 according to Embodiment 22 on the main driving shaft 101.

FIG. 129 is an illustration of a flange member 2470 according to Embodiment 22 as viewed in the Z direction from the inner side.

Figure 130:
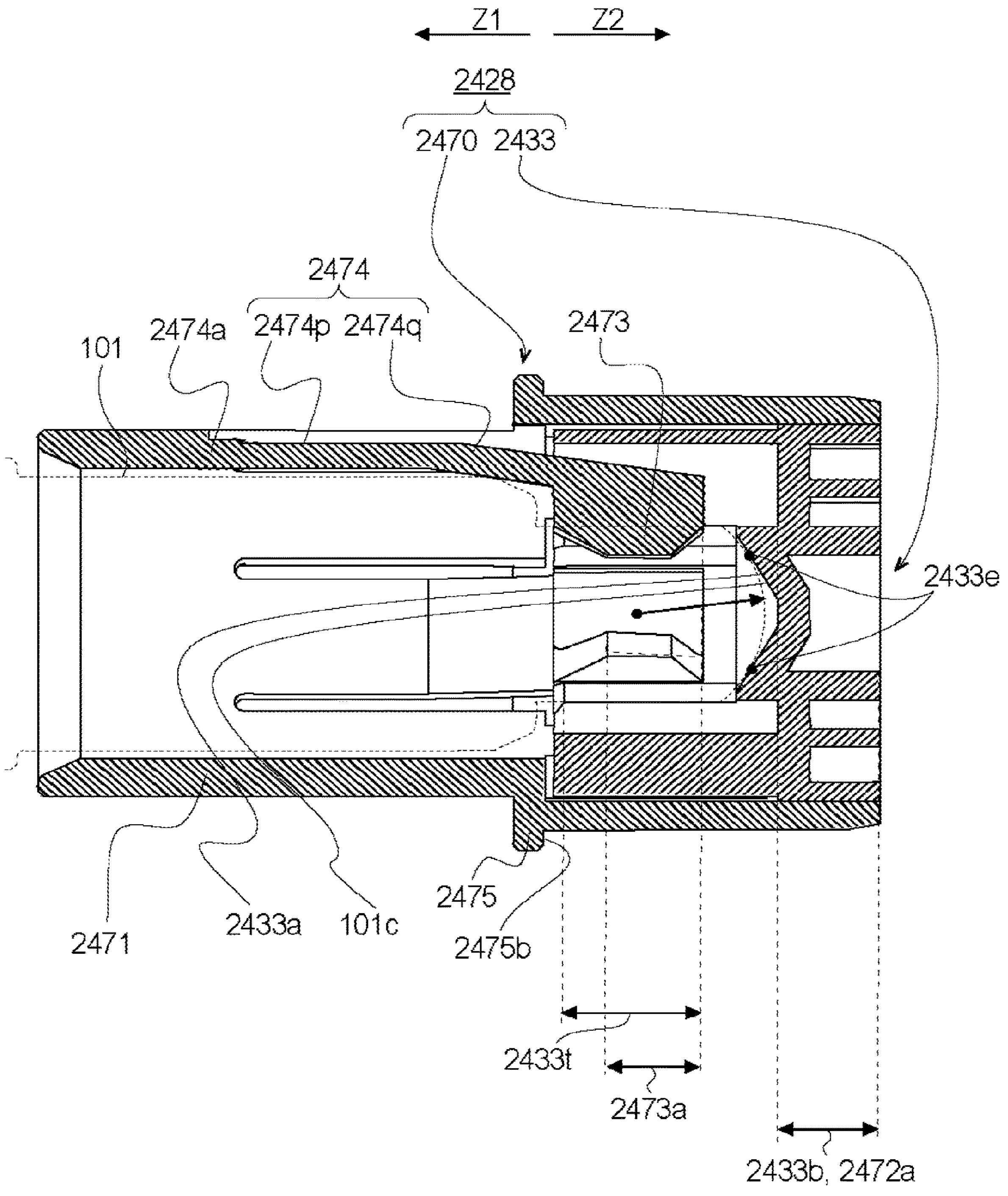

FIG. 130 is a cross-sectional view of the coupling member 2438 according to Embodiment 22.

Figure 131:
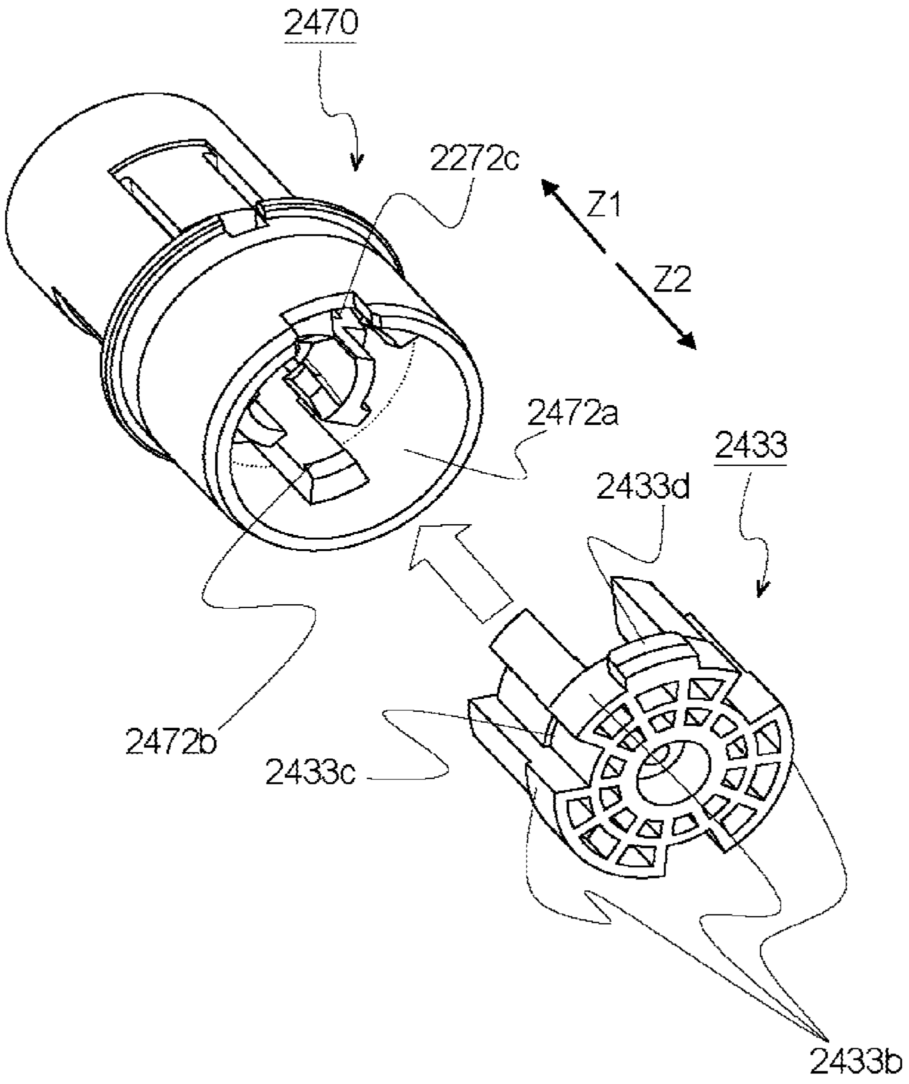

FIG. 131 is a perspective view illustrating assembling of an aligning member 2433 to the flange member 2470 according to Embodiment 22.

Figure 132:
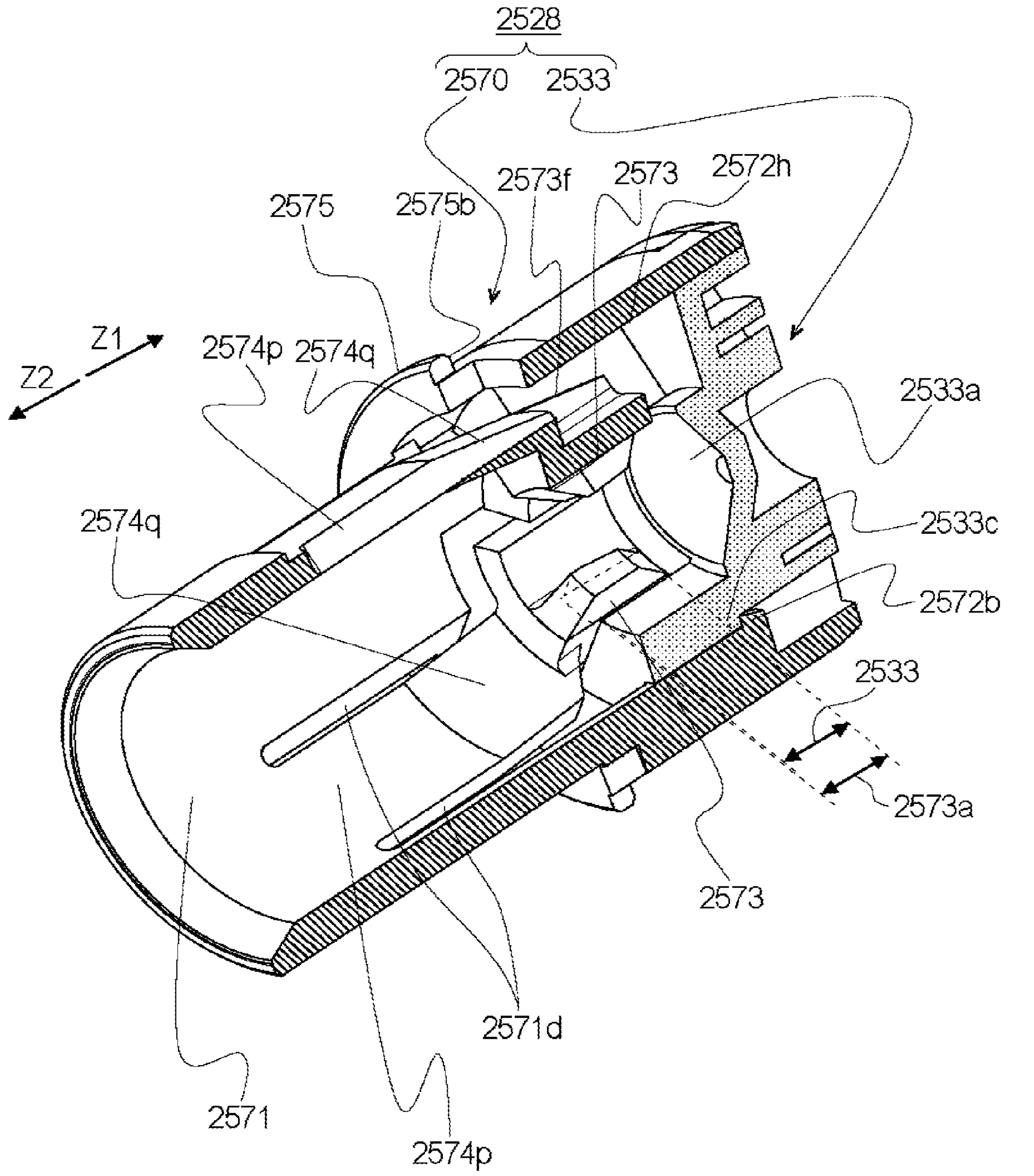

FIG. 132 is a cross-sectional perspective view of a coupling member 2528 according to Embodiment 23.

Figure 133:
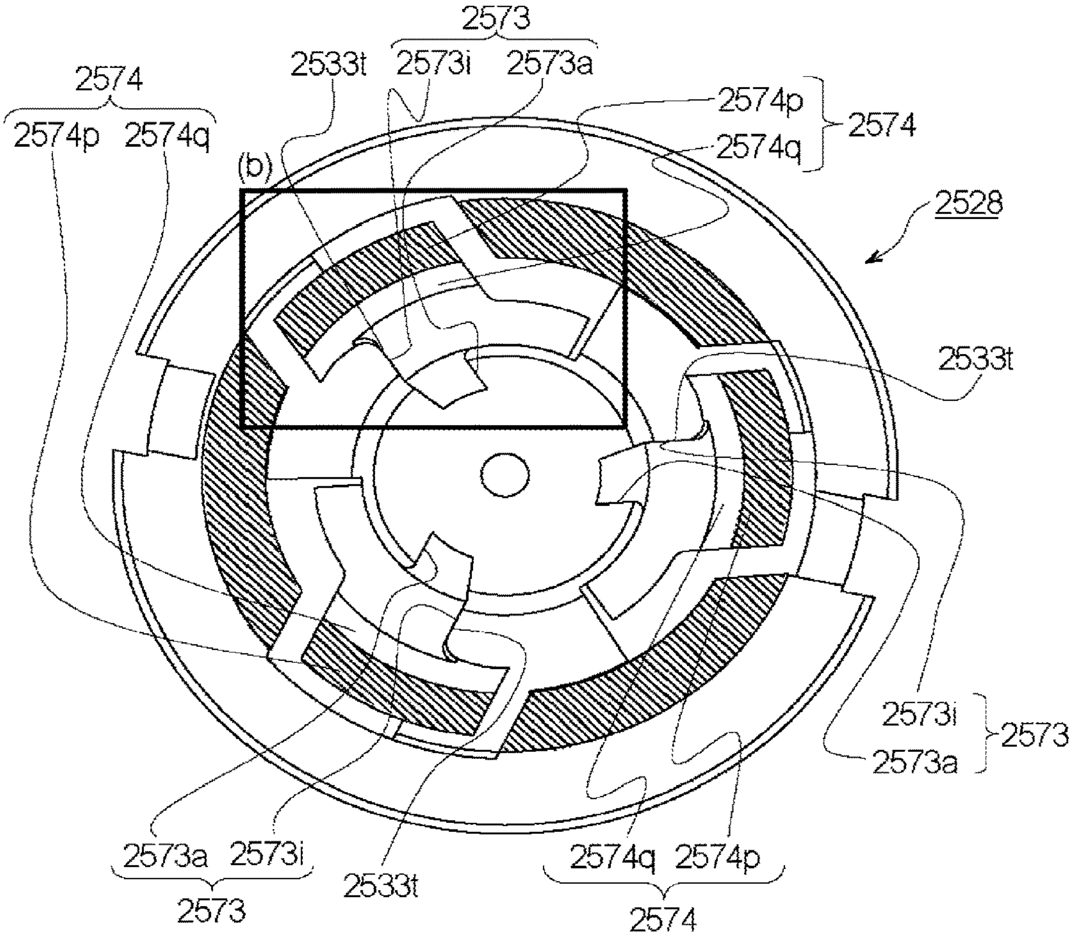
Figure 133:
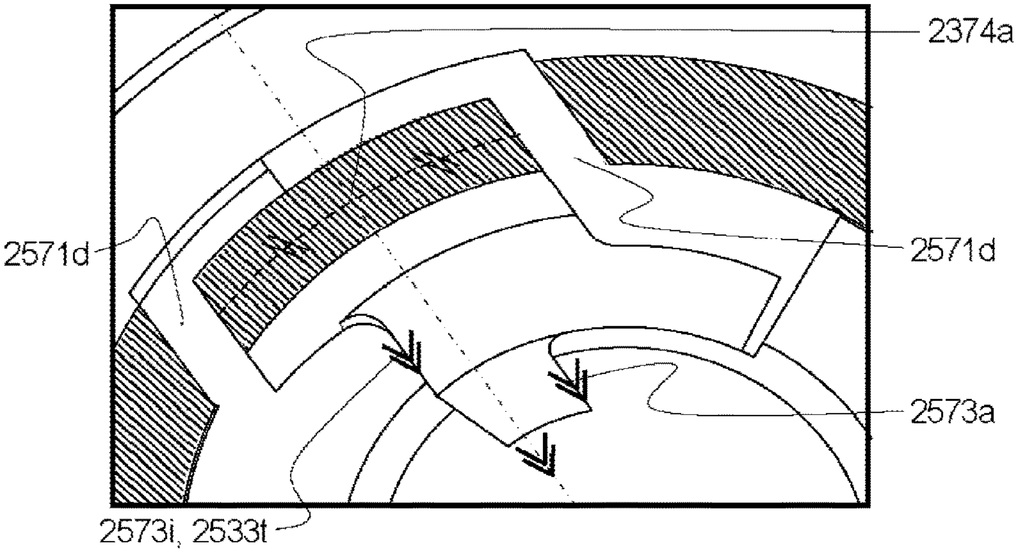

FIG. 133 is sectional views of the coupling member 2528 according to Embodiment 23, taken along a plane perpendicular to the rotation axis of the coupling member 2528 and including a position of a linear portion 2574*p* of a base portion 2574.

Figure 134:
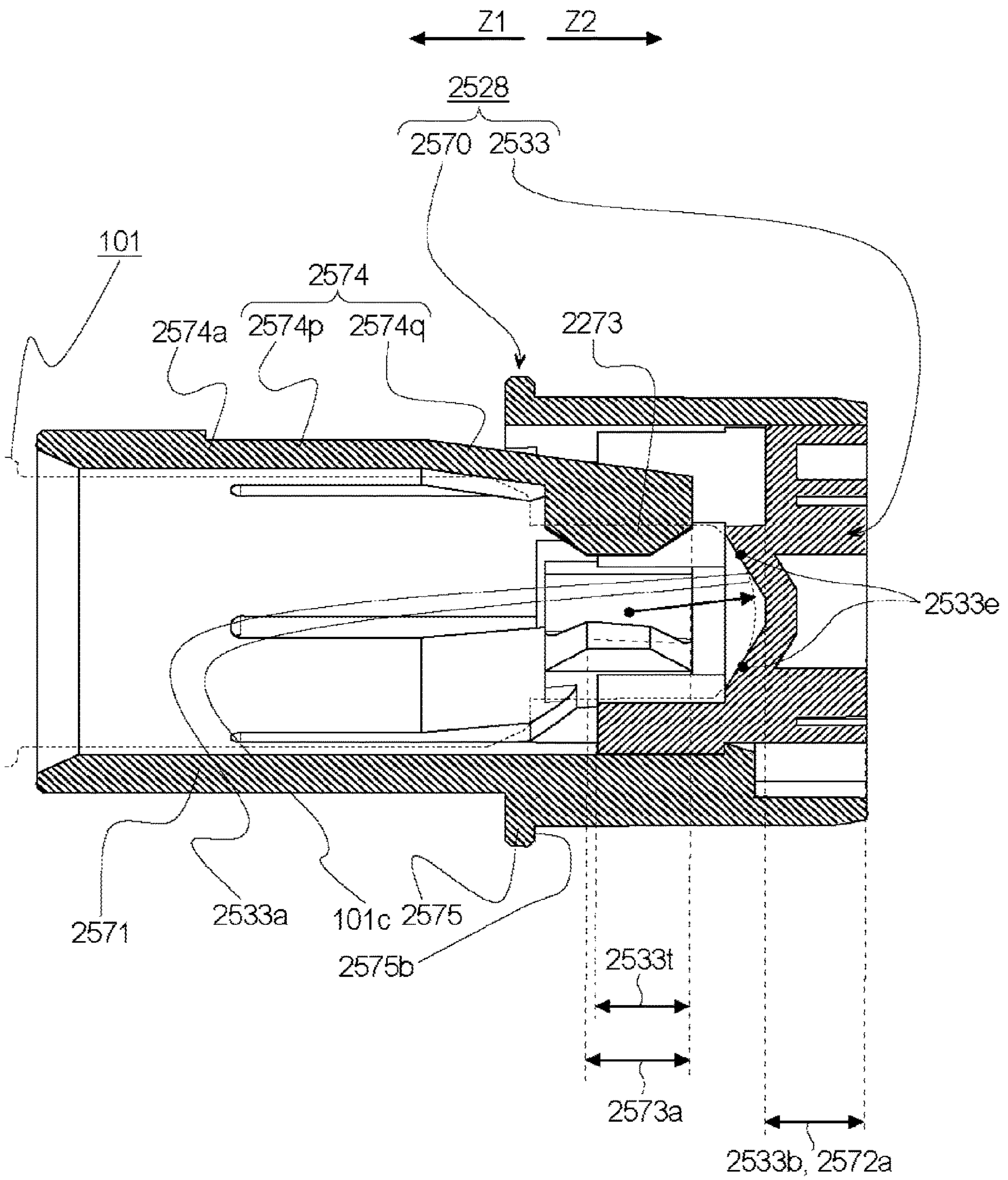

FIG. 134 is a cross-sectional view of a coupling member 2538 according to Embodiment 23.

Figure 135:
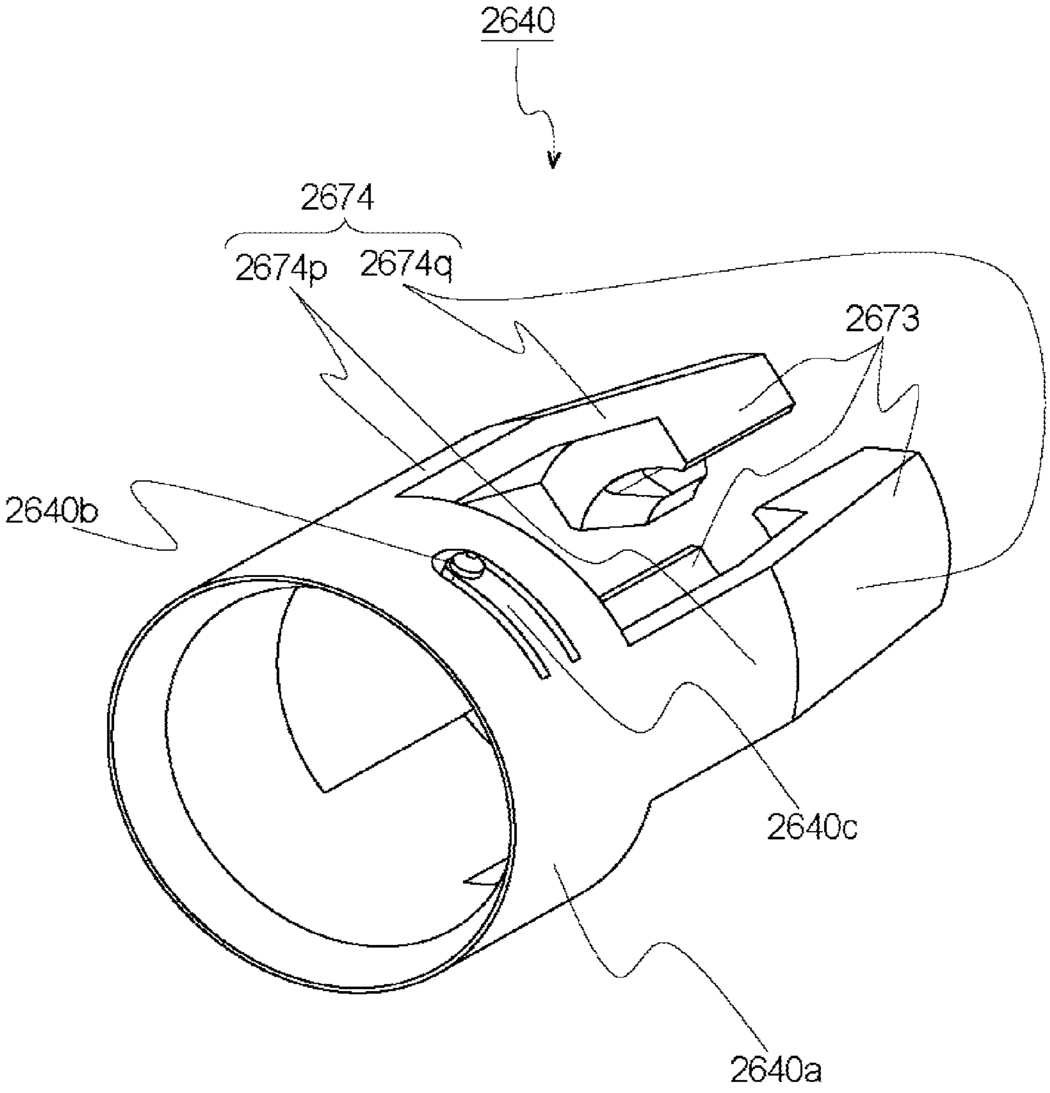

FIG. 135 is a perspective view of a cylindrical inner member 2640 according to Embodiment 24.

Figure 136:
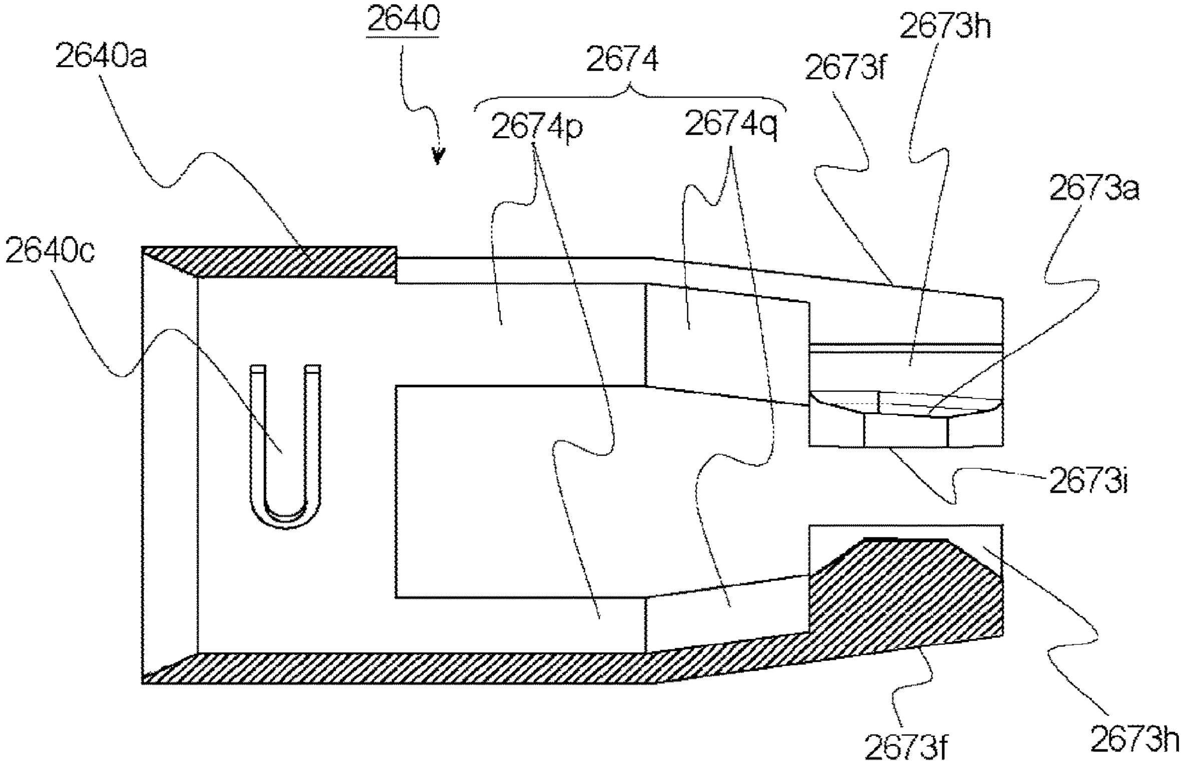

FIG. 136 is a sectional view of the cylindrical inner member 2640 according to Embodiment 24.

Figure 137:
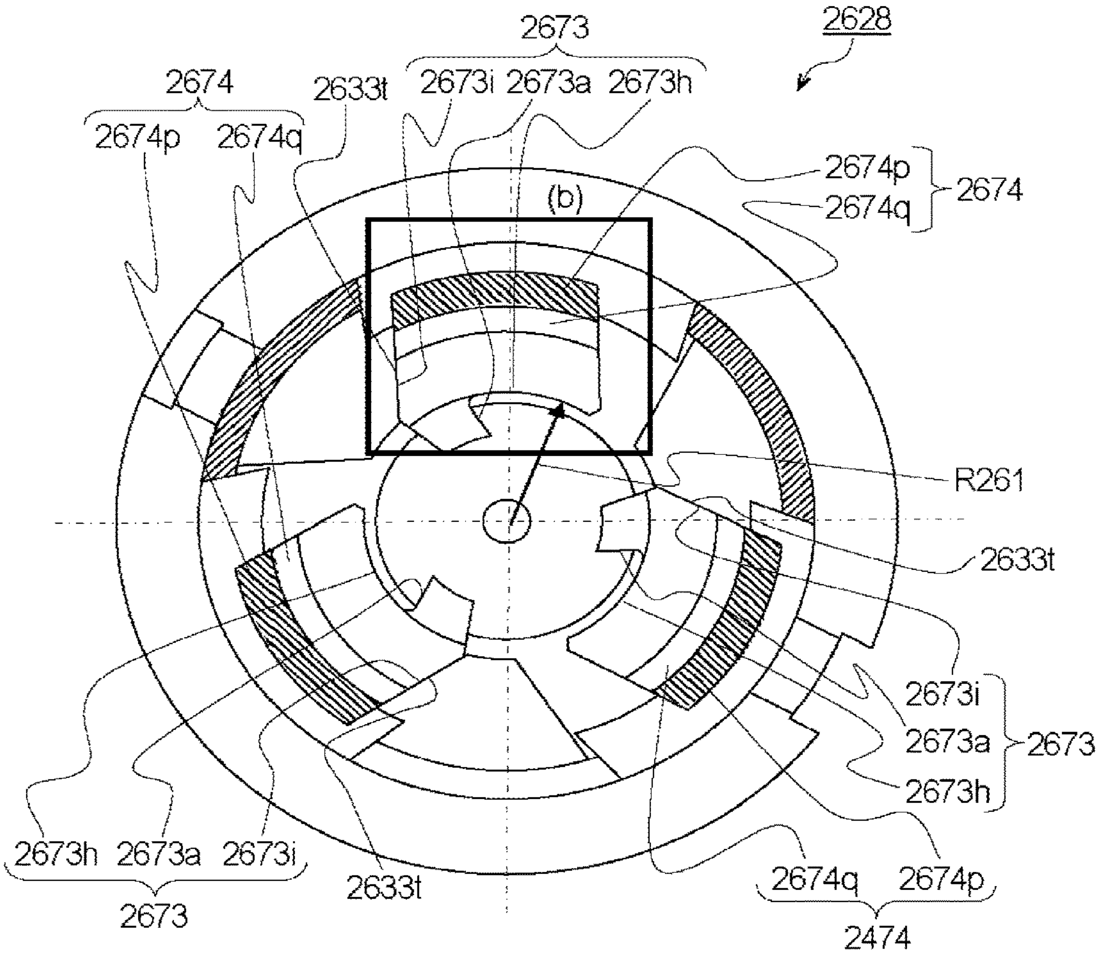
Figure 137:
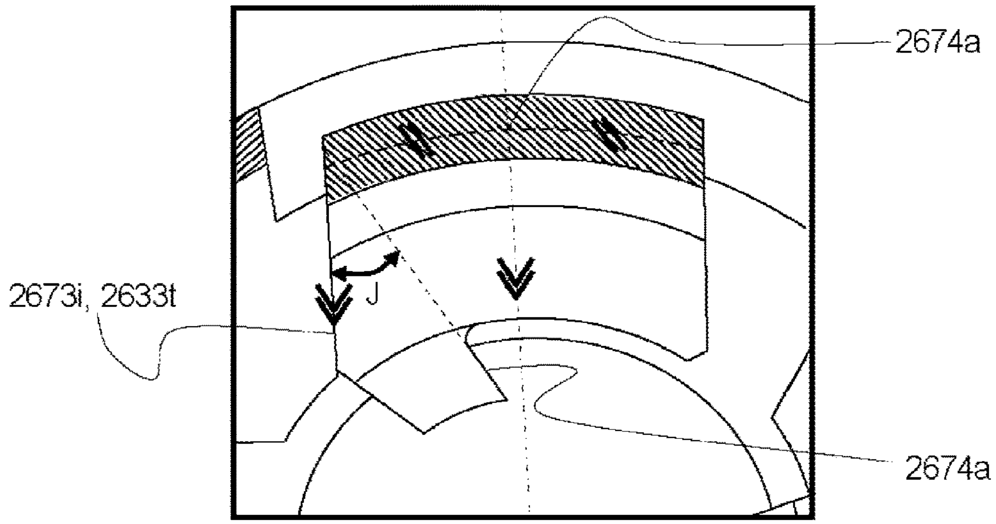

FIG. 137 is cross-sectional views of a coupling member 2628 according to Embodiment 24, taken along a plane perpendicular to the rotation axis of the coupling member 2628 and including a linear portion 2674*p* of a base portion 2674.

Figure 138:
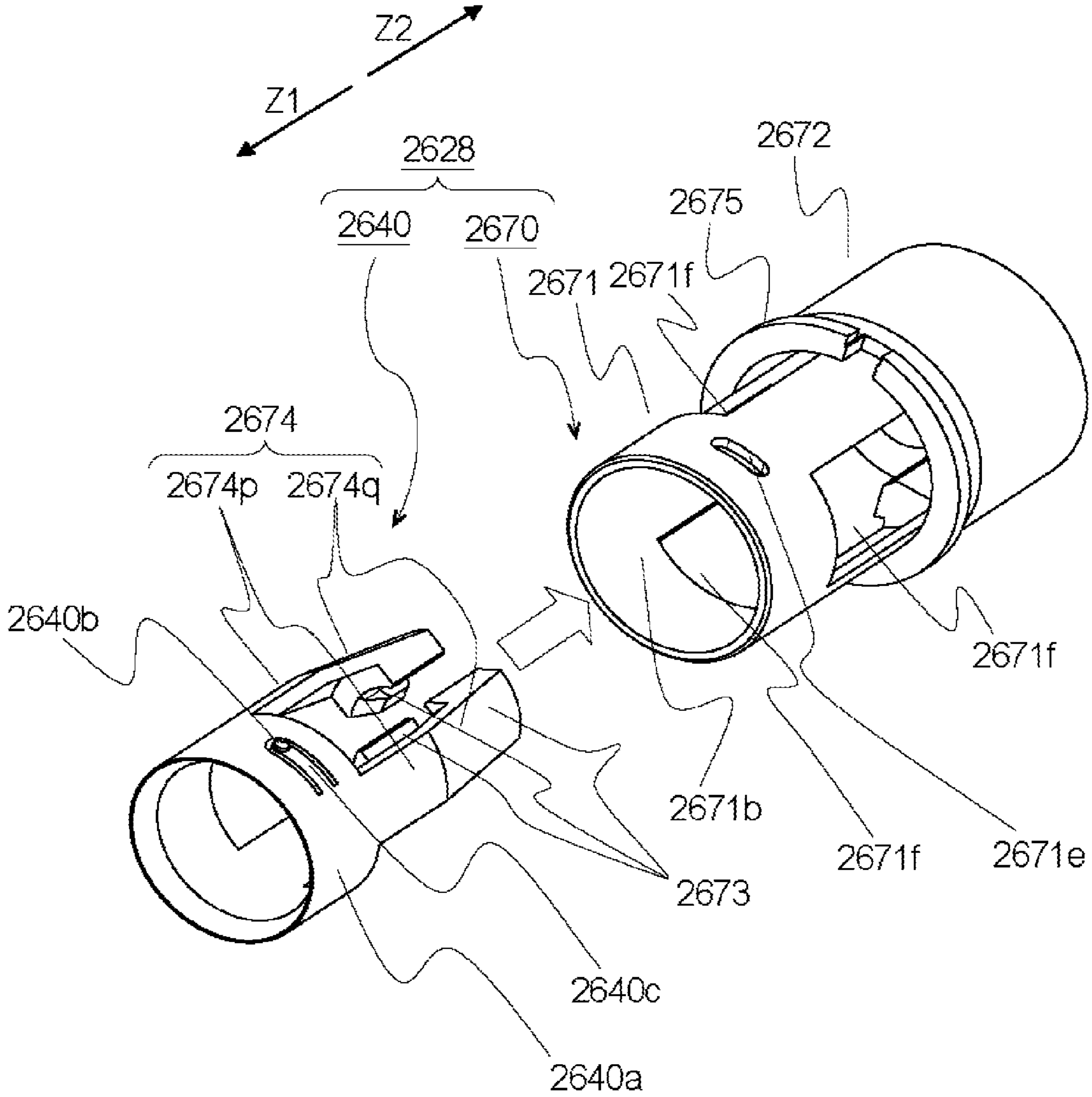

FIG. 138 is a perspective view illustrating the assembling of the cylindrical inner member 2640 to a flange member 2670 according to Embodiment 24.

Figure 139:
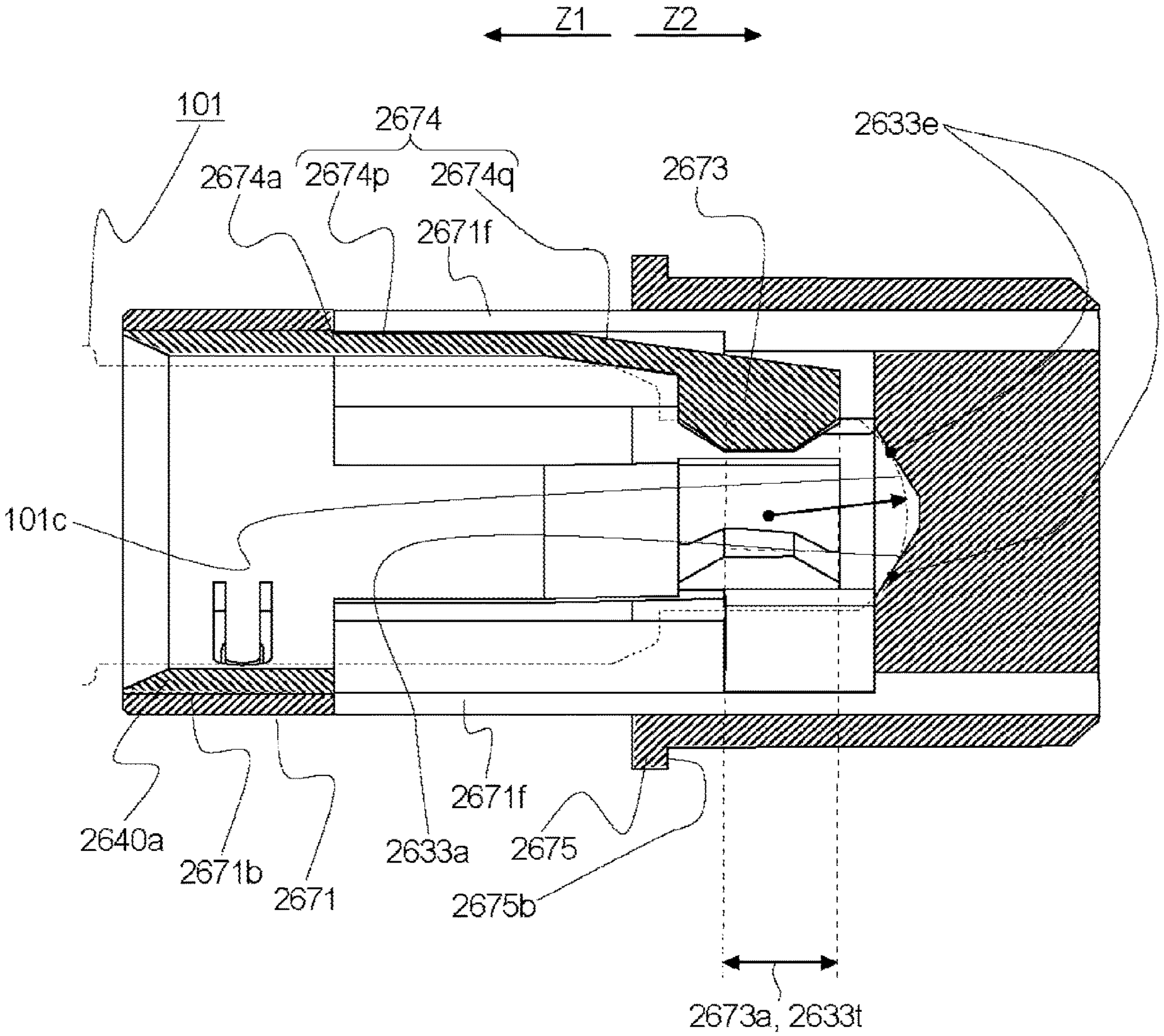

FIG. 139 is a cross-sectional view of the coupling member 2628 according to Embodiment 24.

Figure 140:
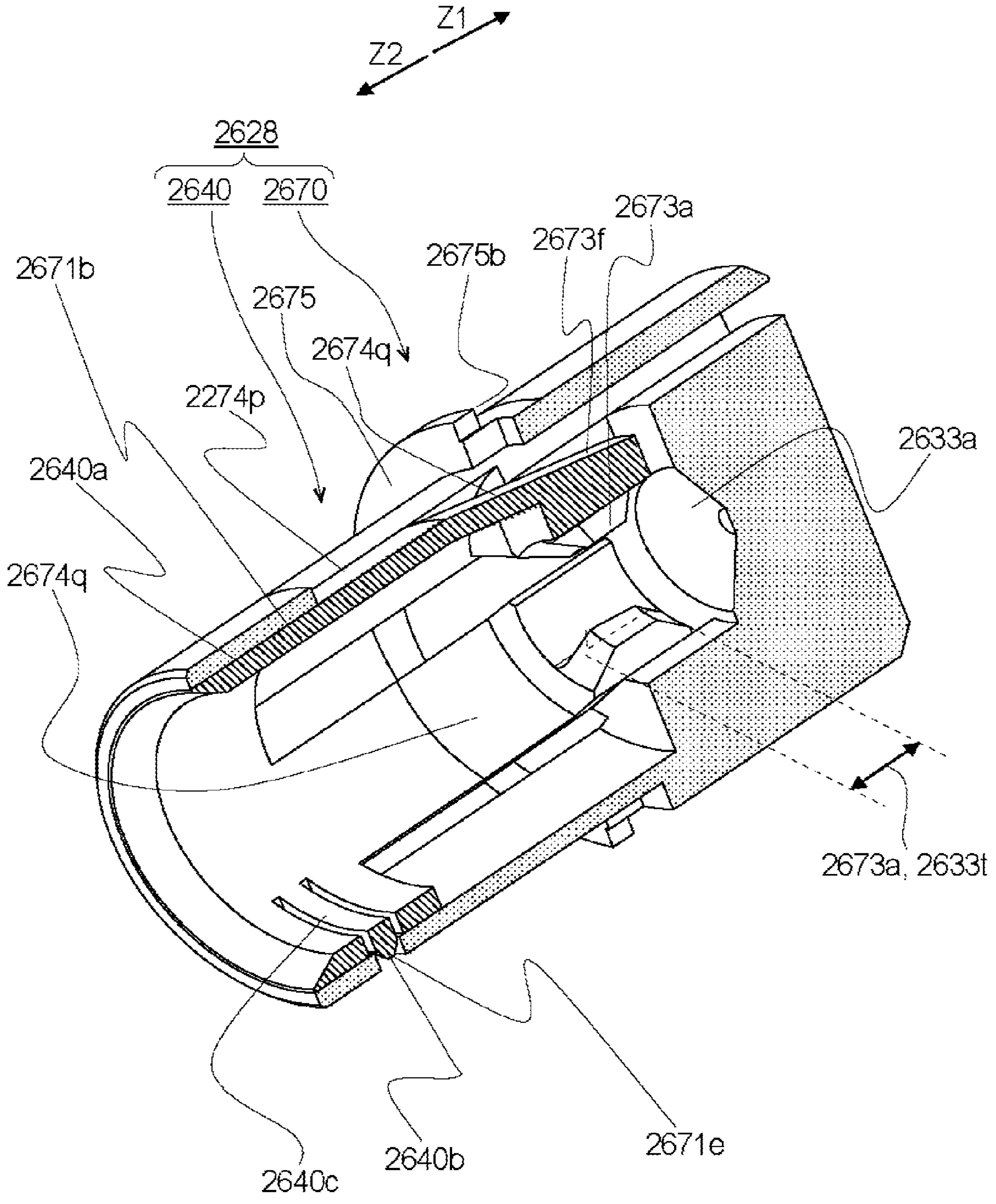

FIG. 140 is a sectional perspective view of the coupling member 2628 according to Embodiment 24.

Figure 141:
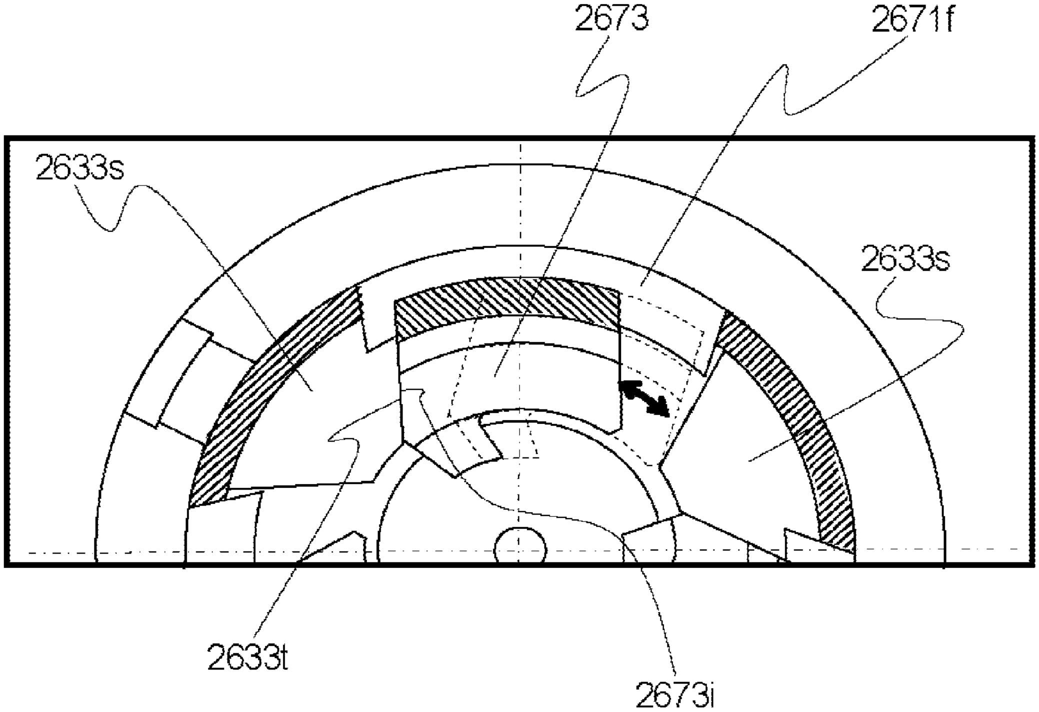

FIG. 141 is a sectional view illustrating movement of the cylindrical inner member 2640 with respect to the flange member 2670 according to Embodiment 24.

Figure 142:
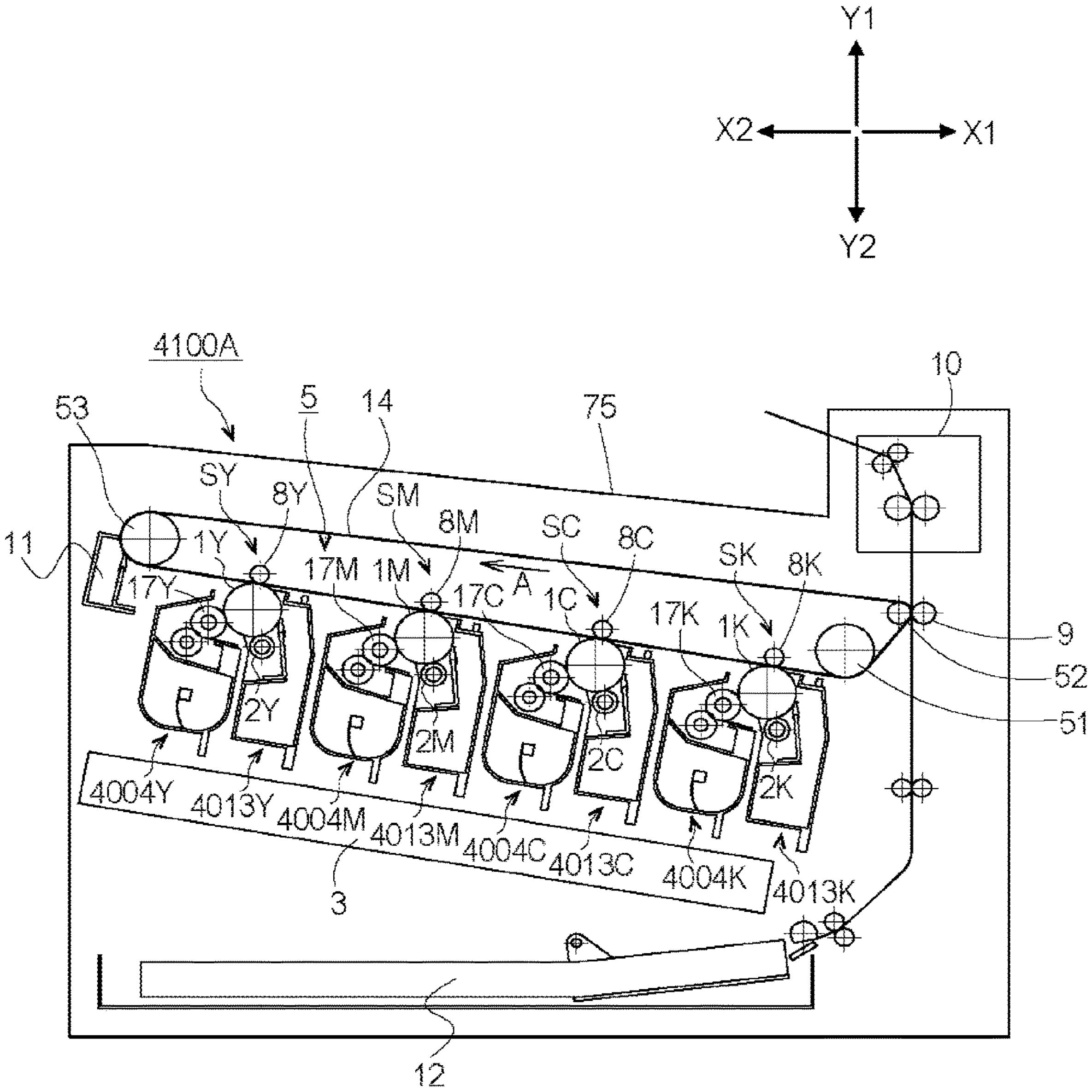

FIG. 142 is a schematic sectional view of an image forming apparatus 4100A according to embodiment 25.

Figure 143:
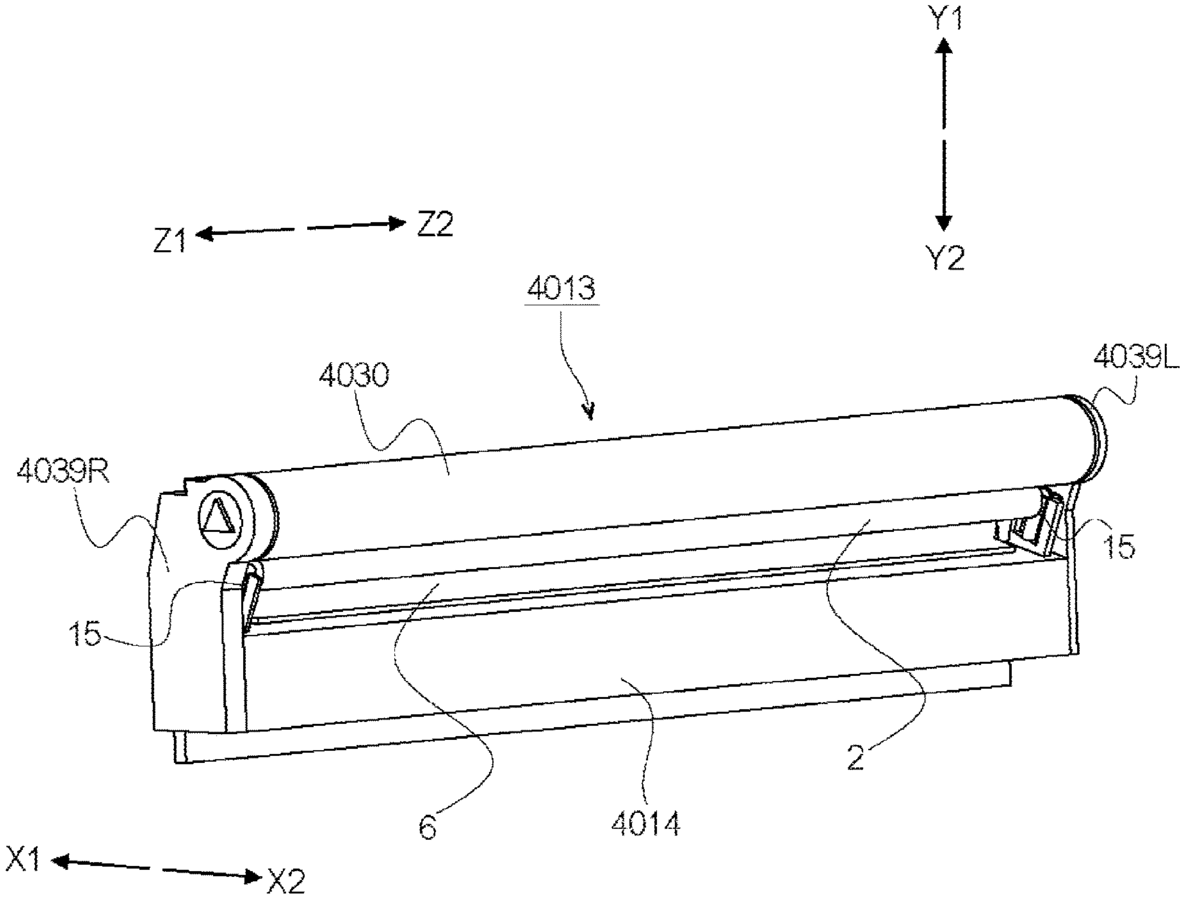

FIG. 143 is an external perspective view of a drum cartridge 4013 according to embodiment 25.

Figure 144:
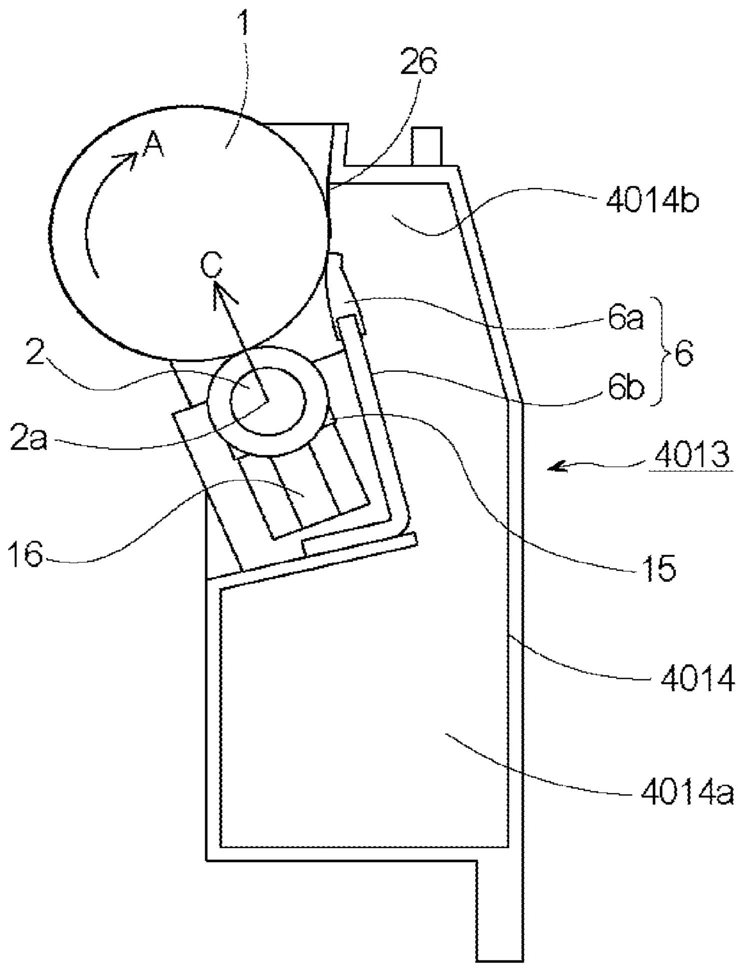

FIG. 144 is a cross-sectional view of the drum cartridge 4013 according to Embodiment 25.

Figure 145:
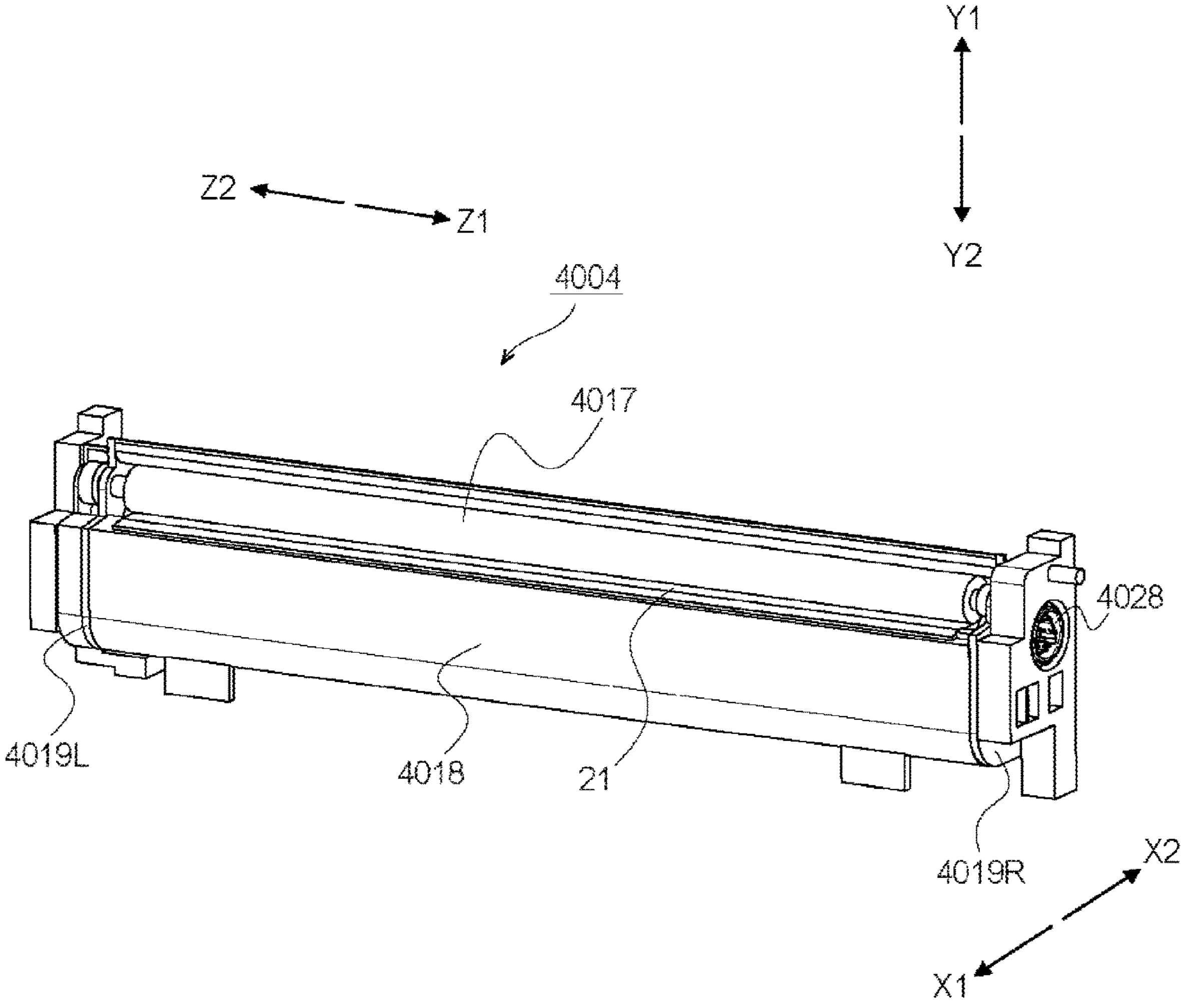

FIG. 145 is an external perspective view of a developing cartridge 4004 according to Embodiment 25.

Figure 146:
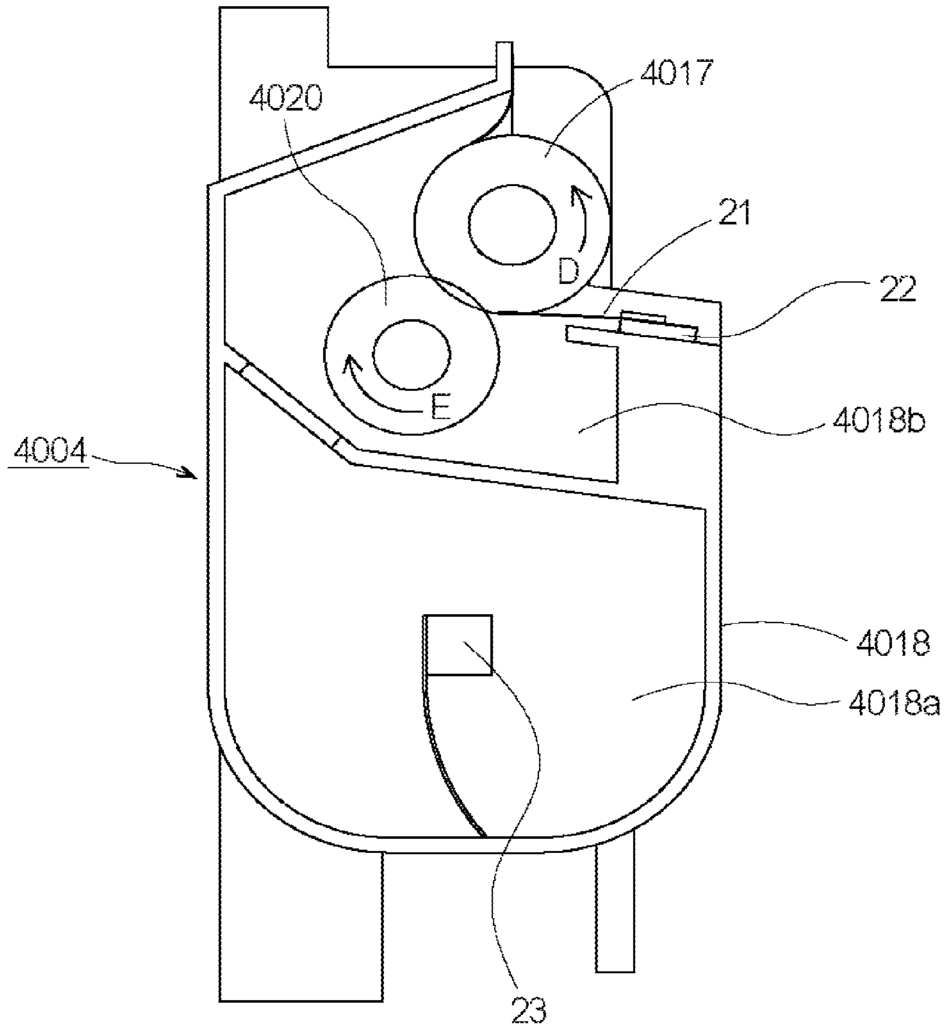

FIG. 146 is a sectional view of the developing cartridge 4004 according to Embodiment 25.

Figure 147:
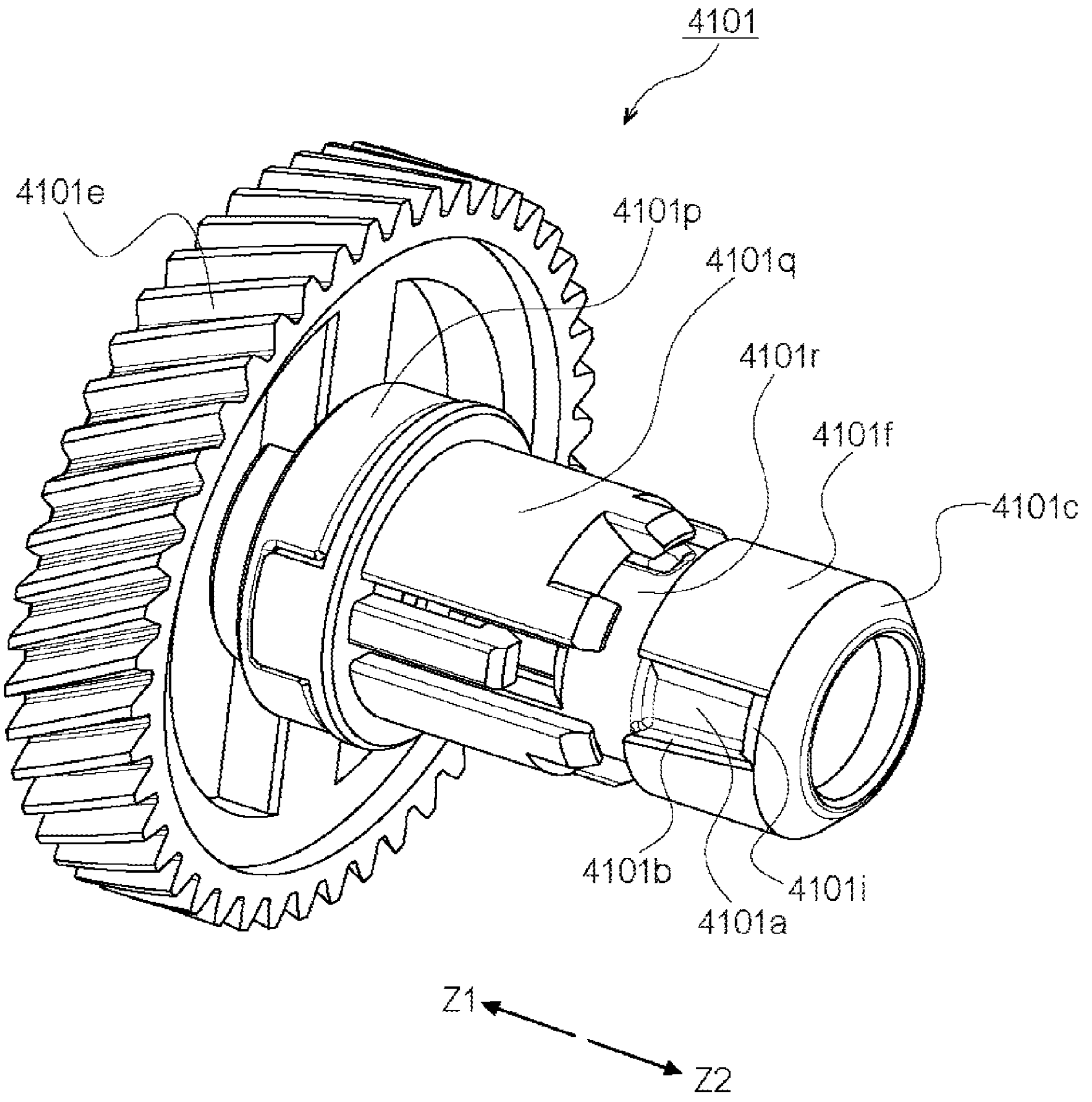

FIG. 147 is an external view of a main assembly driving shaft 4101 according to Embodiment 25.

Figure 148:
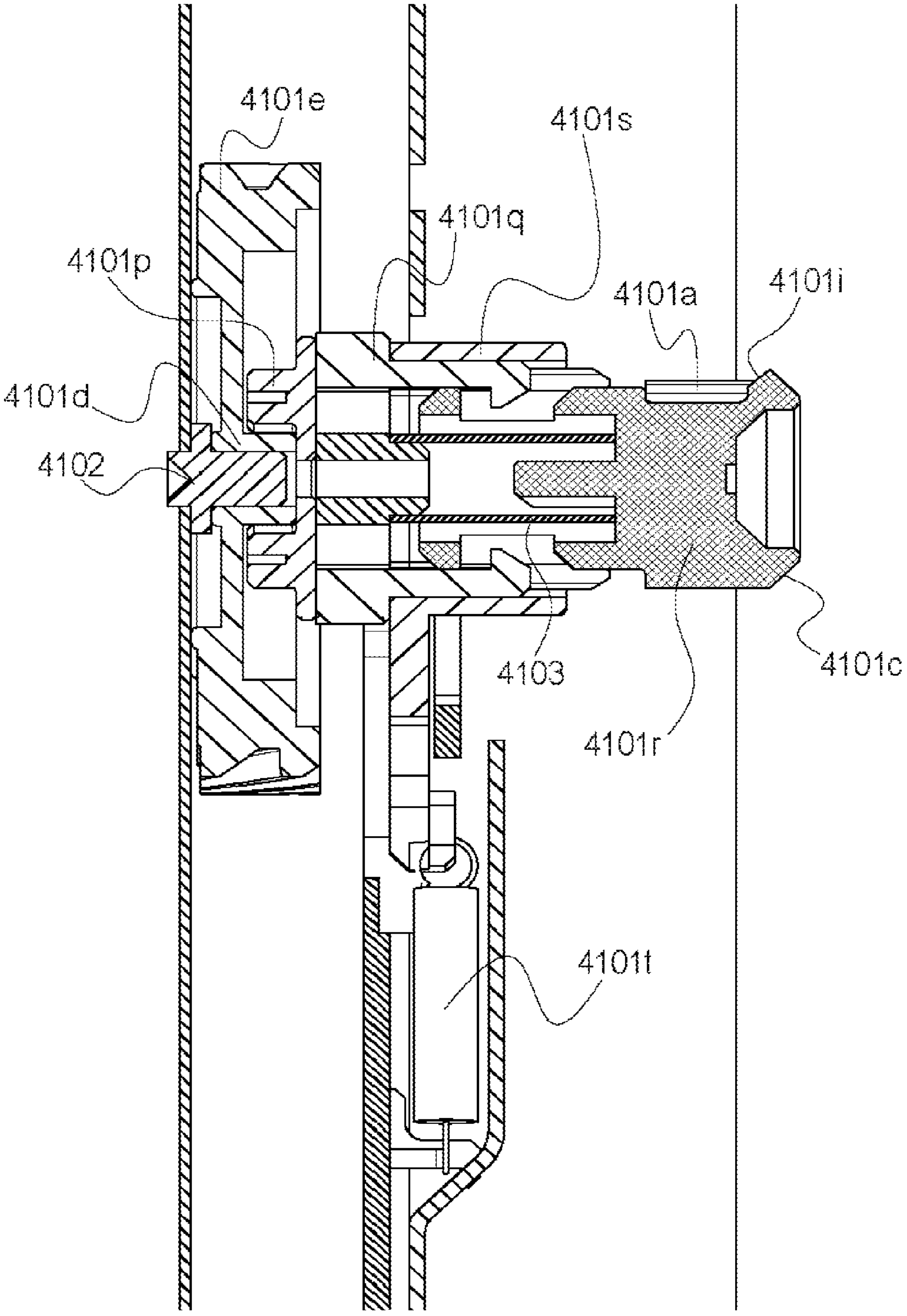

FIG. 148 is a cross-sectional view taken along the rotation axis (rotation axis) of the main assembly driving shaft 4101 mounted to thereof the image forming apparatus main assembly according to Embodiment 25.

Figure 149:
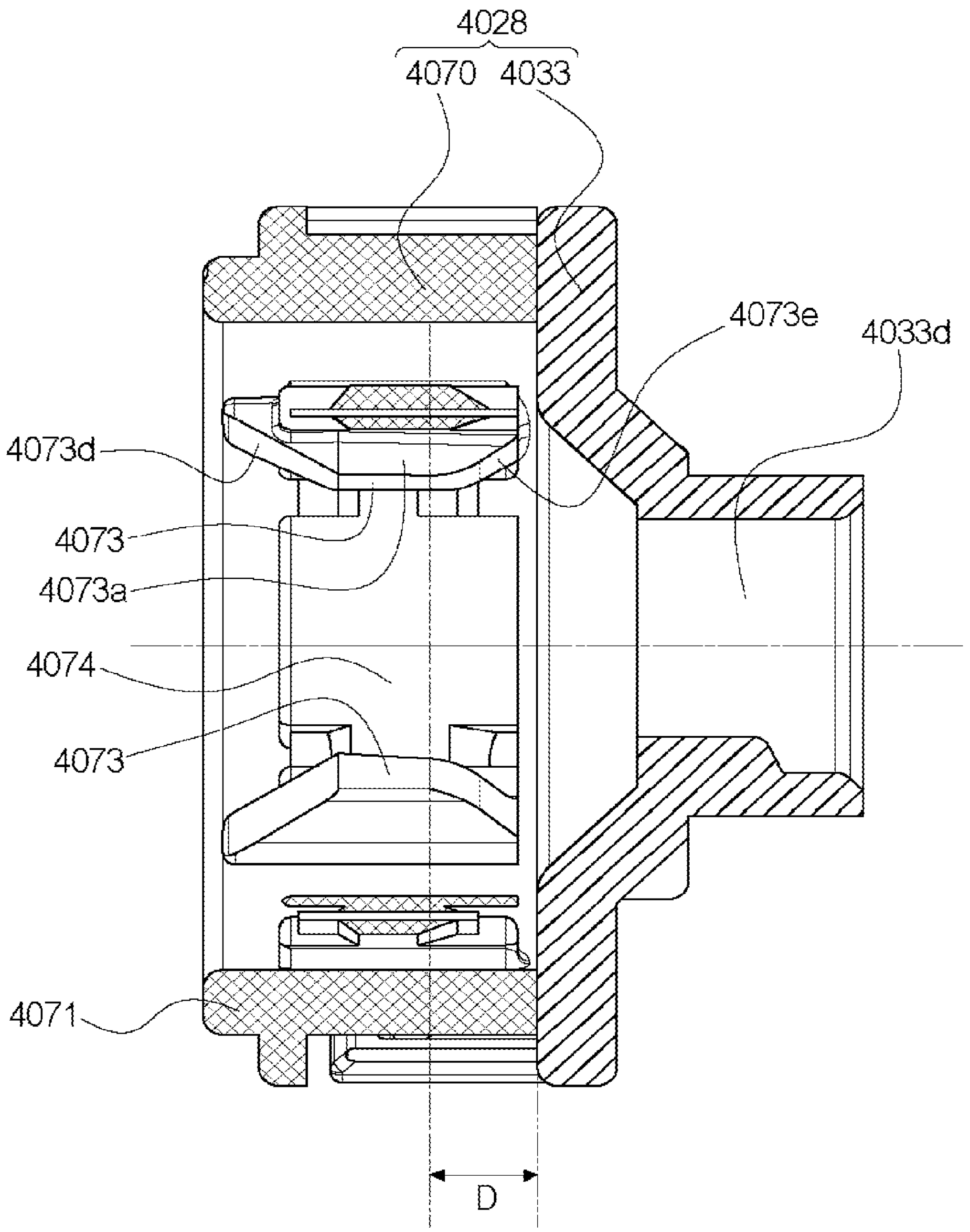

FIG. 149 is a cross-sectional view of a coupling member 4028 according to Embodiment 25 taken along a plane perpendicular to the rotation axis of the coupling member 4028 at a position passing through the base 4074.

Figure 150:
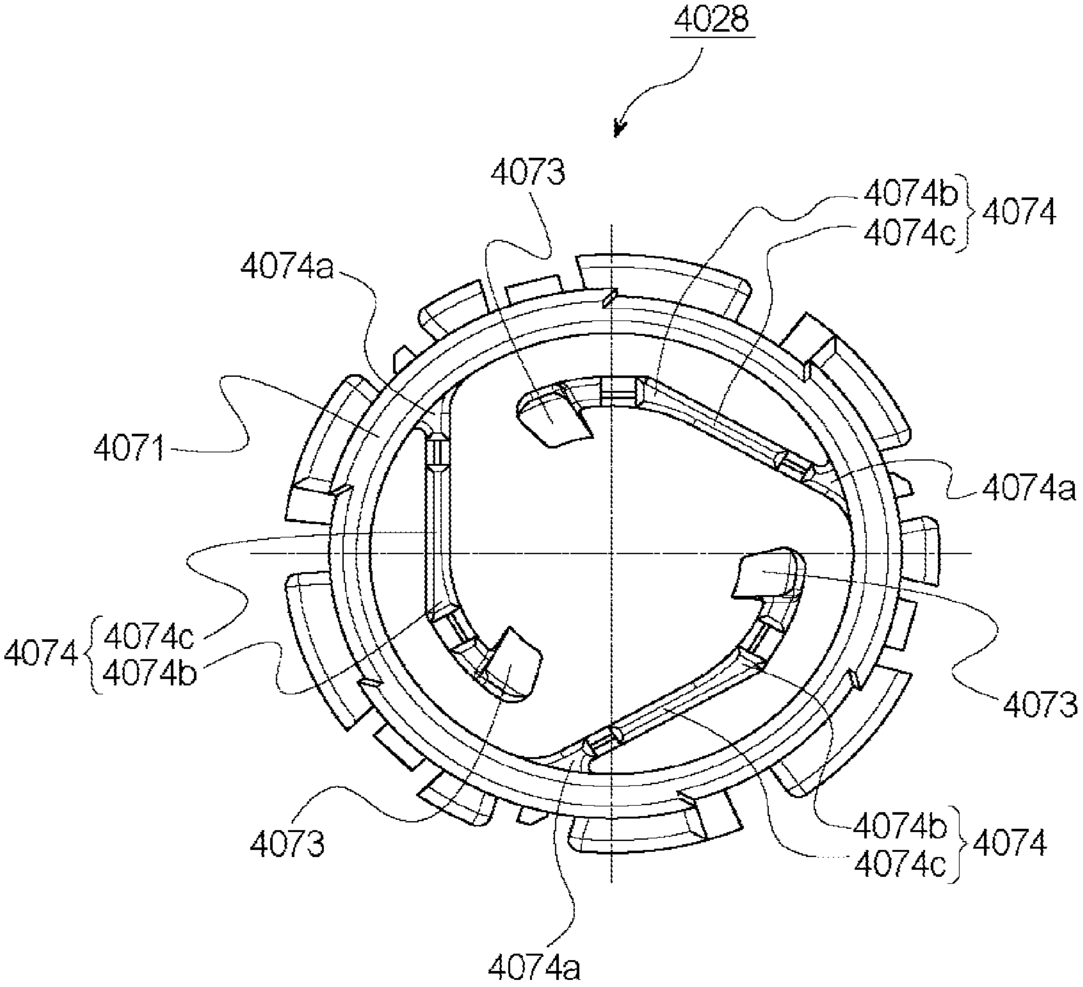

FIG. 150 is an illustration of a cylinder member 4070 according to Embodiment 25 as viewed from the outer side in the Z direction.

Figure 151:
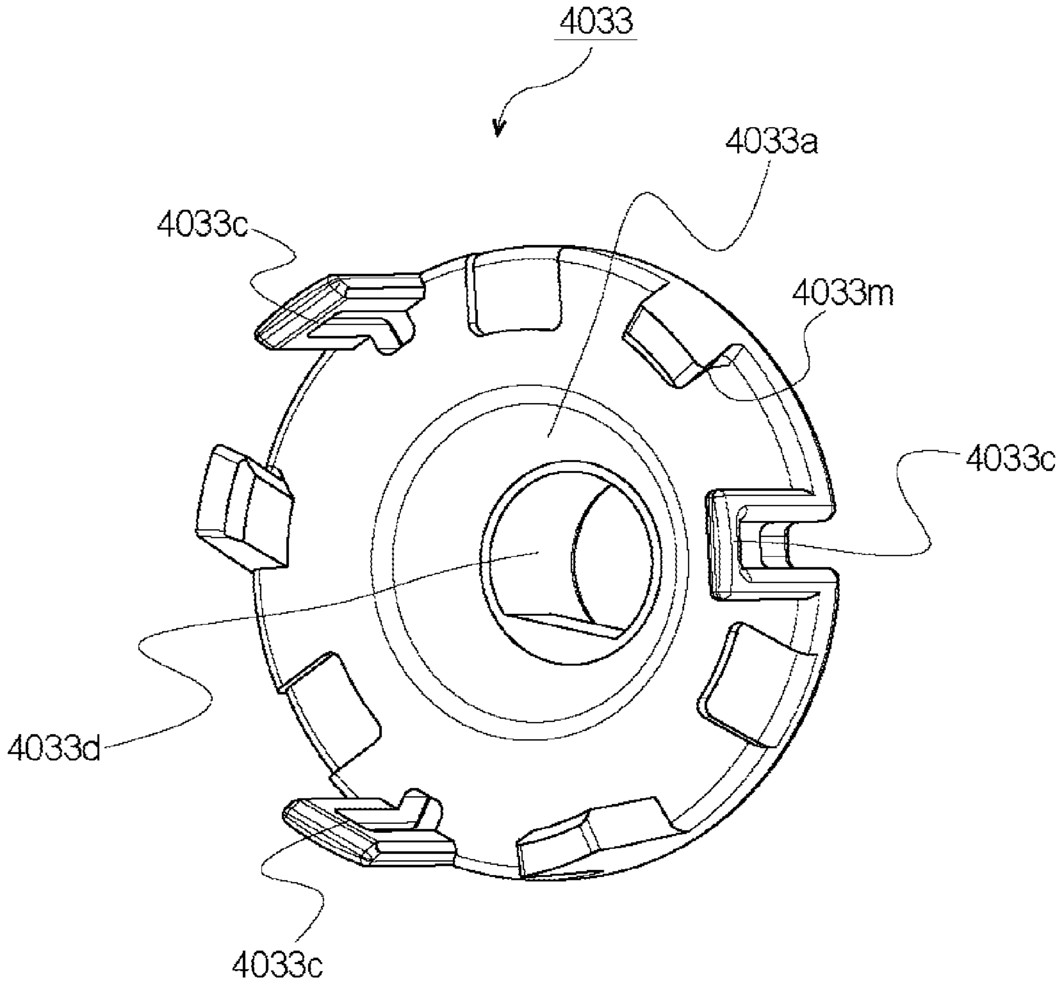

FIG. 151 is a perspective view of an aligning member 4033 according to embodiment 25.

Figure 152:
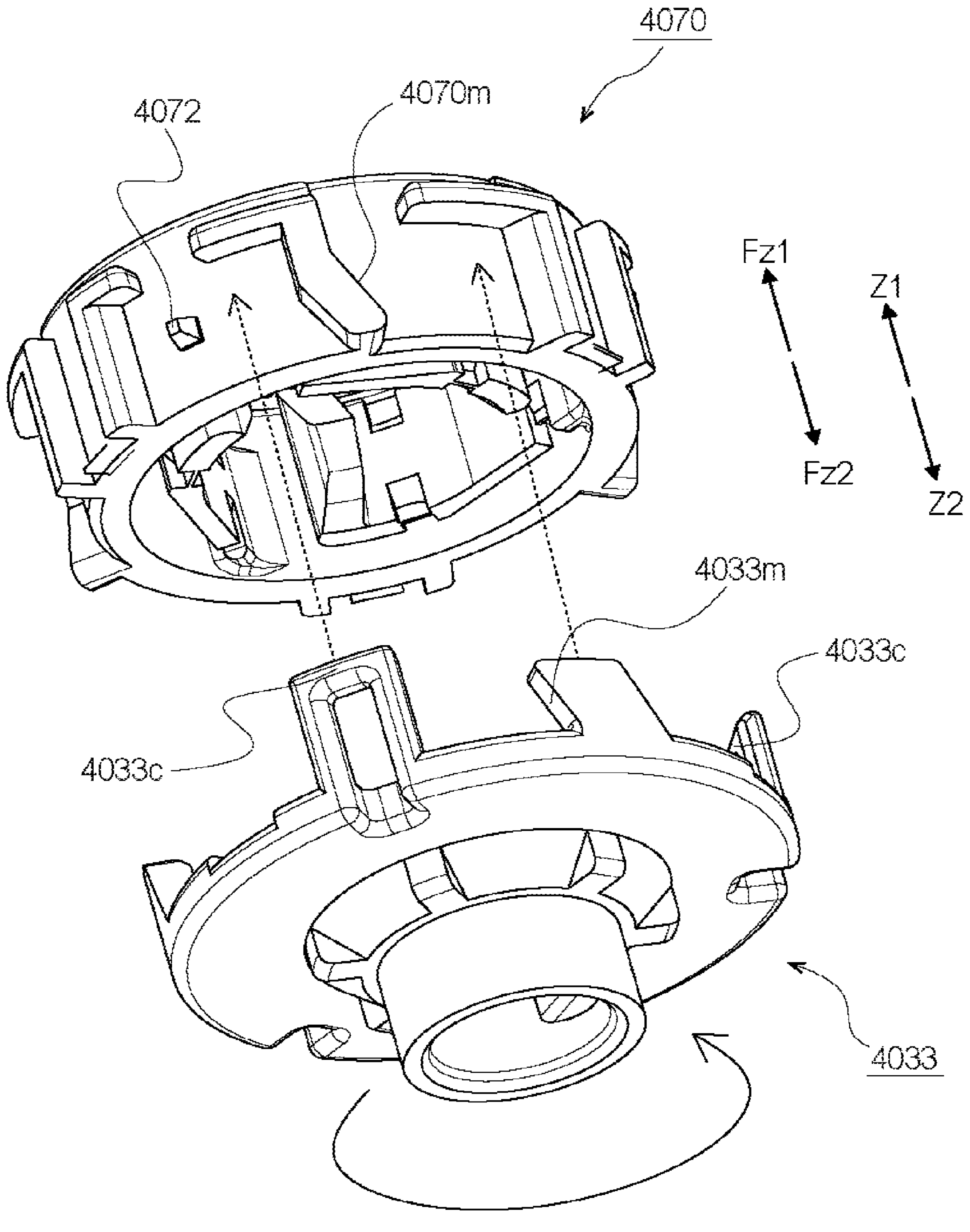

FIG. 152 is an illustration for explaining assembly of the coupling member 4028 according to Embodiment 25.

Figure 153:
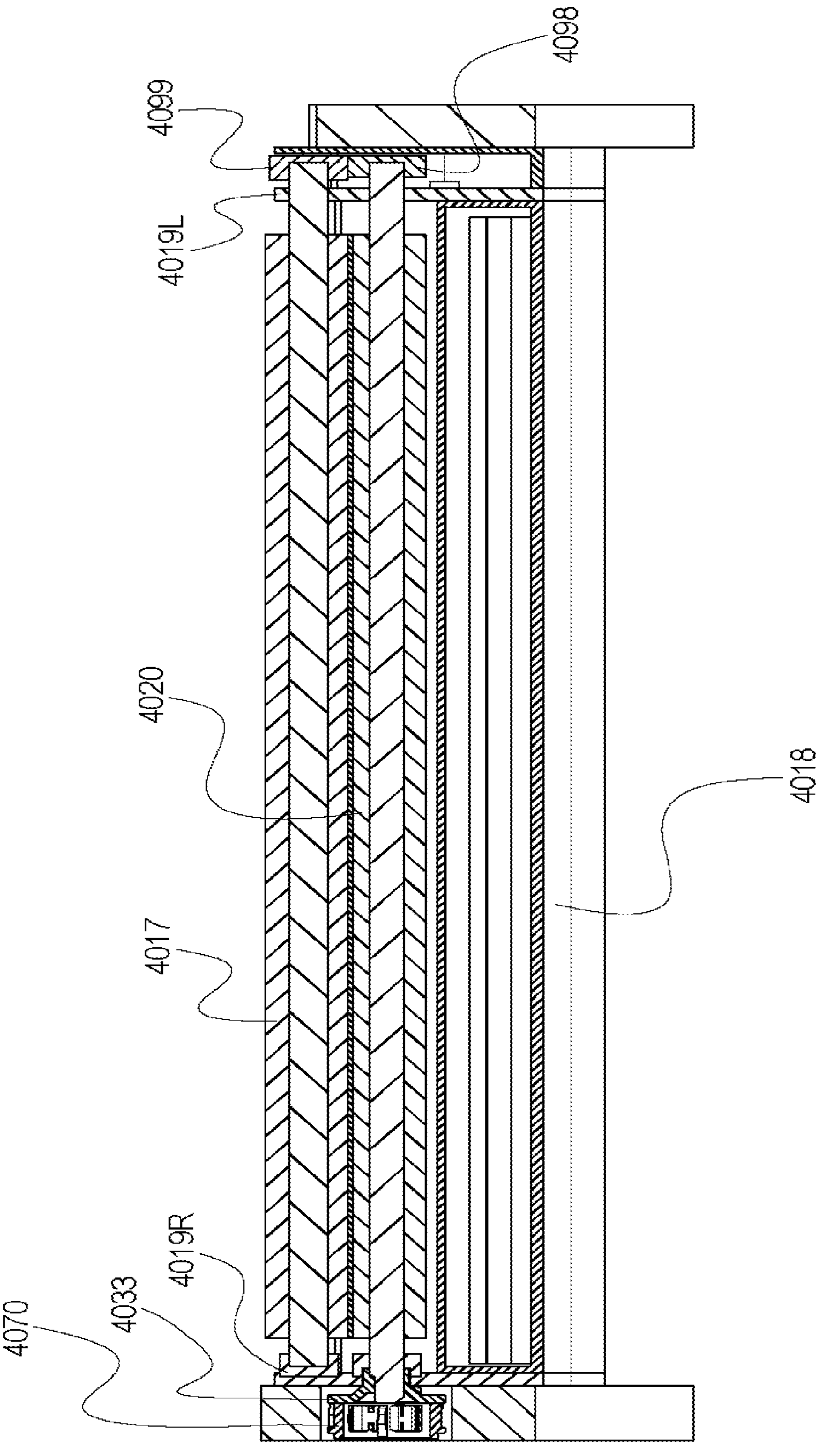

FIG. 153 is a sectional view of the developing cartridge 4004 according to Embodiment 25.

Figure 154:
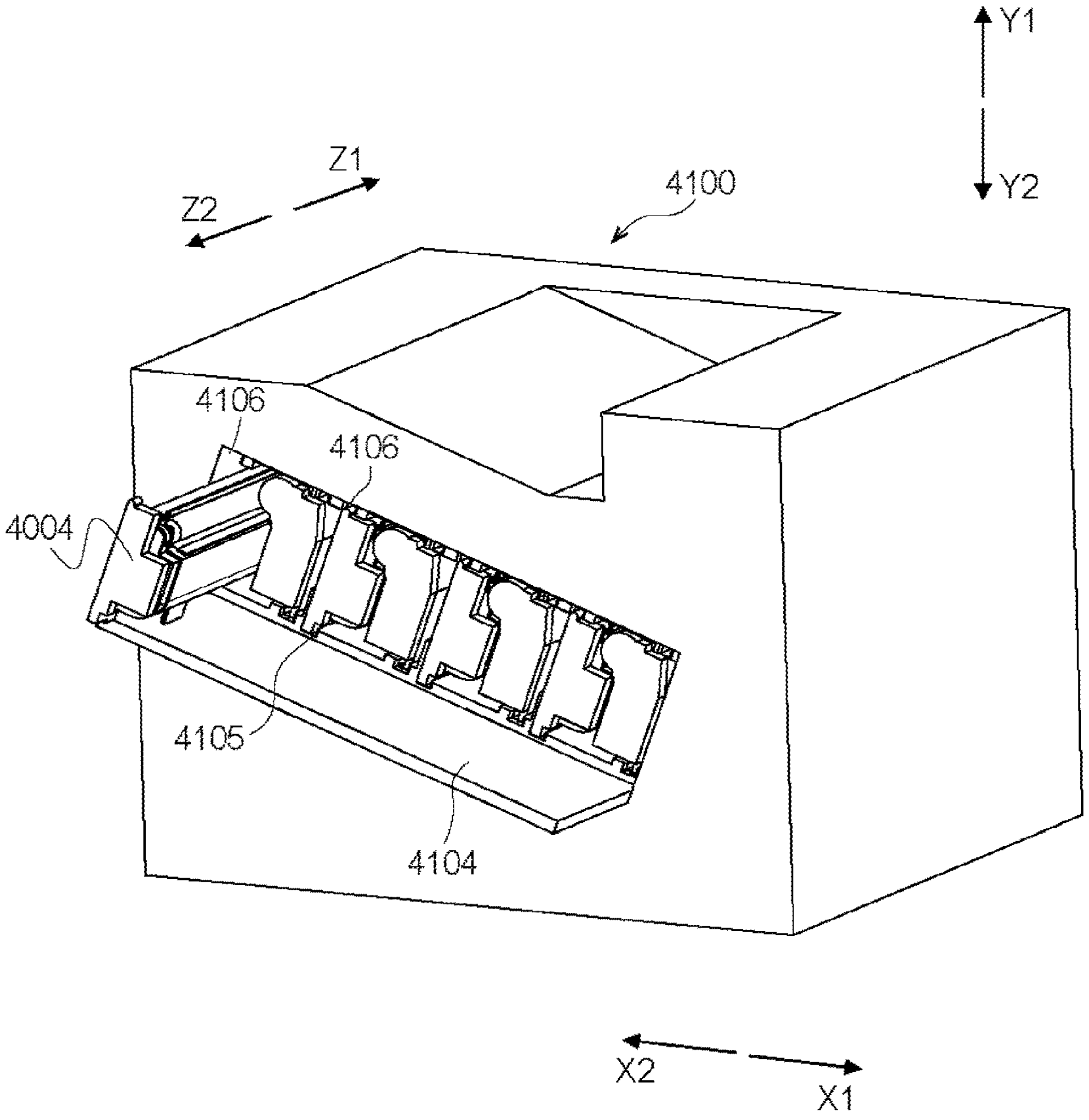

FIG. 154 is a perspective view illustrating the mounting of the developing cartridge 4004 to the image forming apparatus main assembly 4100A according to Embodiment 25.

Figure 155:
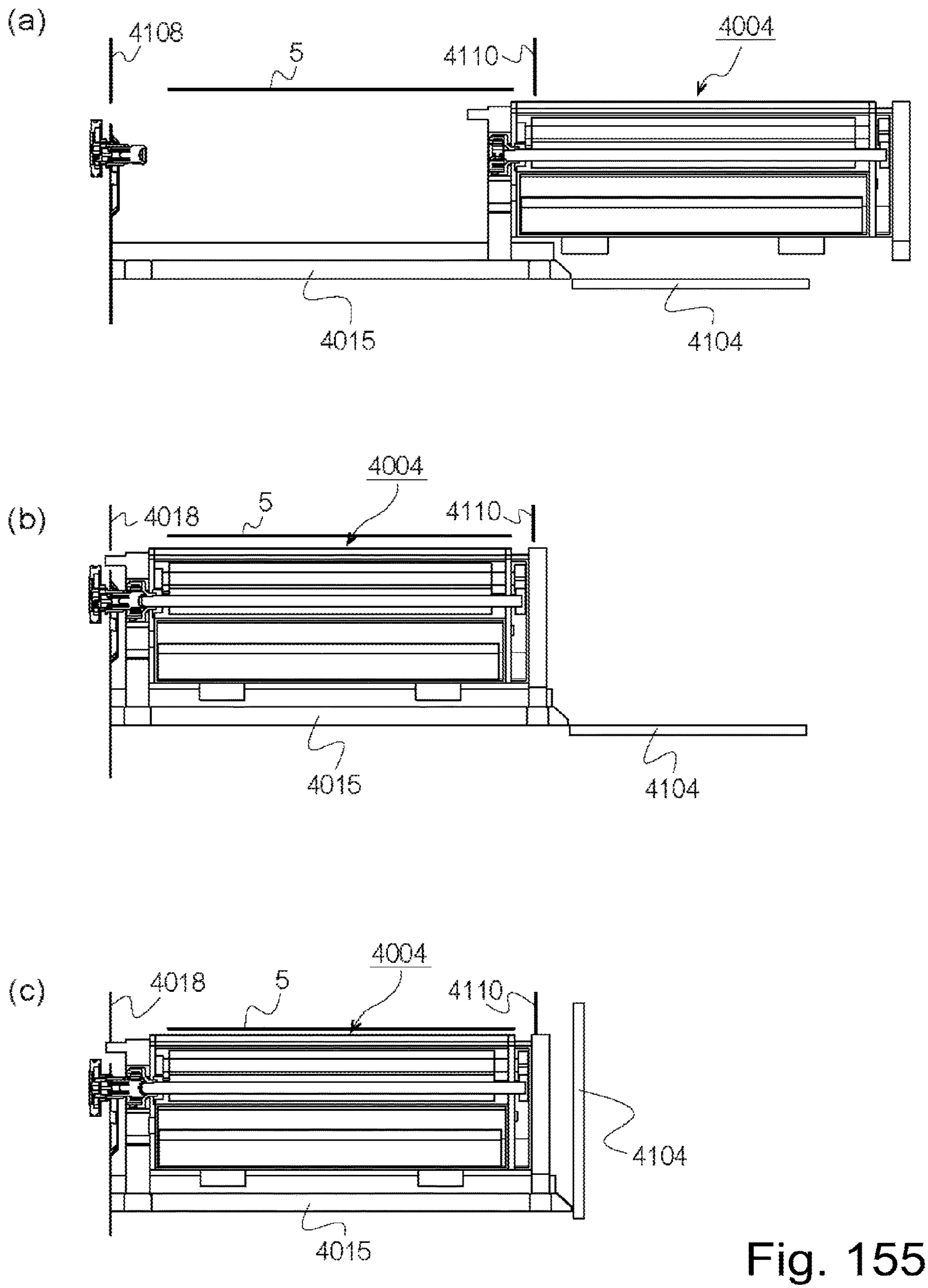

FIG. 155 is sectional views illustrating the mounting operation of the developing cartridge 4004 to the image forming apparatus main assembly 4100A according to Embodiment 25.

Figure 156:
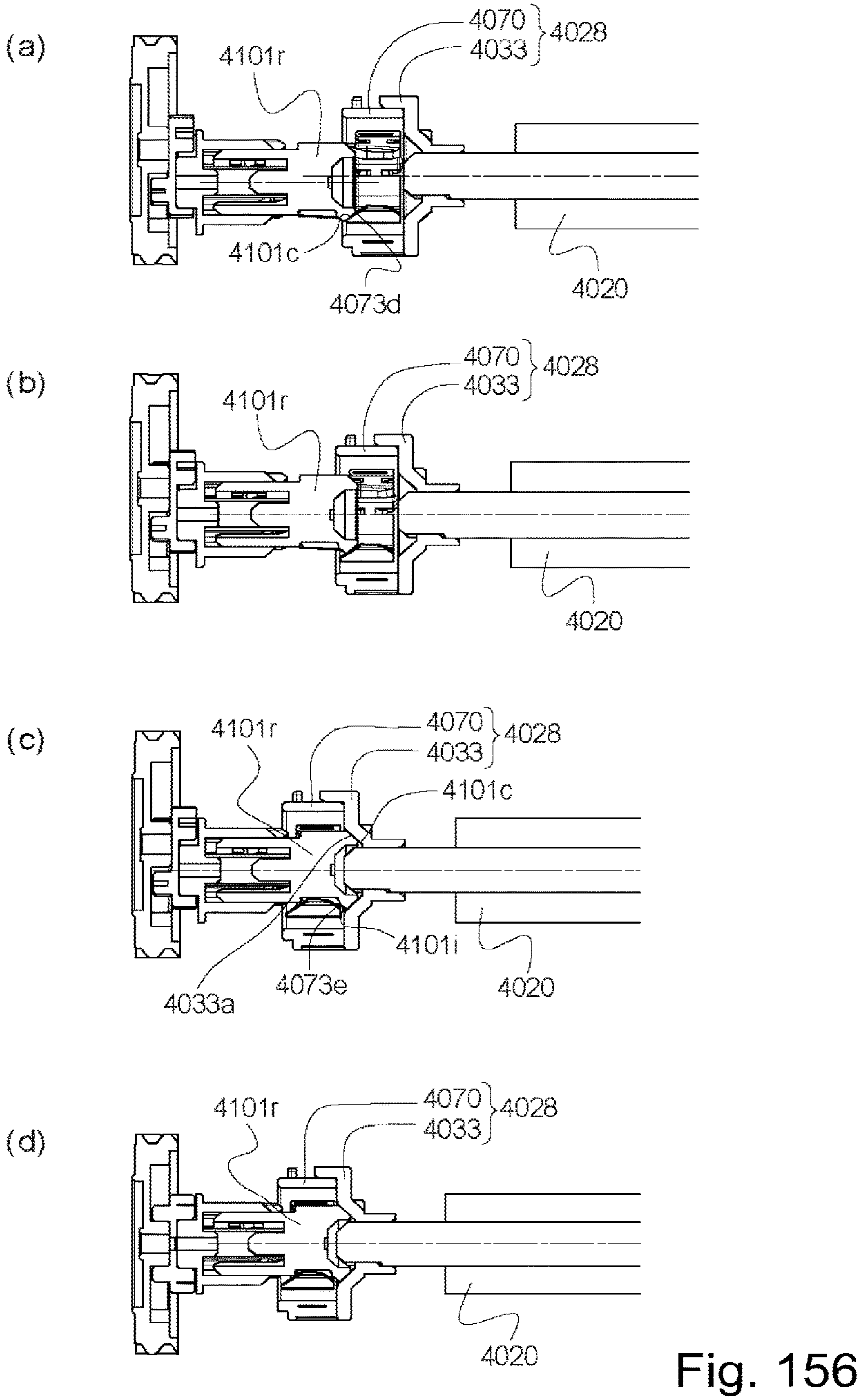

FIG. 156 is cross-sectional views illustrating a mounting operation of the coupling member 4028 to the main assembly driving shaft 4101 according to Embodiment 25.

DESCRIPTION OF EMBODIMENTS

Hereinafter, the image forming apparatus and the process cartridge of the present embodiment will be described in conjunction with the accompanying drawings. The image forming apparatus forms an image on a recording material using an electrophotographic image forming process, for example. For example, it includes an electrophotographic copying apparatus, an electrophotographic printer (for example, a LED printer, a laser beam printer, etc.), an electrophotographic facsimile machine, and the like. In addition, the cartridge is mountable to and dismountable from the main assembly of the image forming apparatus. Among the cartridges, the one unitized with process means acting on the photoreceptor and the photoreceptor is particularly called process cartridge.

Also, a unit including a photosensitive drum and a coupling member as a unit is called a drum unit.

In the following embodiments, a full-color image forming apparatus relative to which four process cartridges can be mounted and dismounted is taken as a example, in Embodiment 4. However, the number of process cartridges mountable to the image forming apparatus is not limited to this. Likewise, the constituent elements disclosed in the embodiments are not intended to limit the material, arrangement, dimensions, other numerical values, etc. Unless otherwise specified. Unless otherwise specified, "above" means upward in the direction of gravity when the image forming apparatus is installed.

Embodiment 1

[General Description of Electrophotographic Image Forming Apparatus]

First, the overall structure of an embodiment of an electrophotographic image forming apparatus (image forming apparatus) according to this embodiment will be described in conjunction with FIG. 1.

Figure 1:
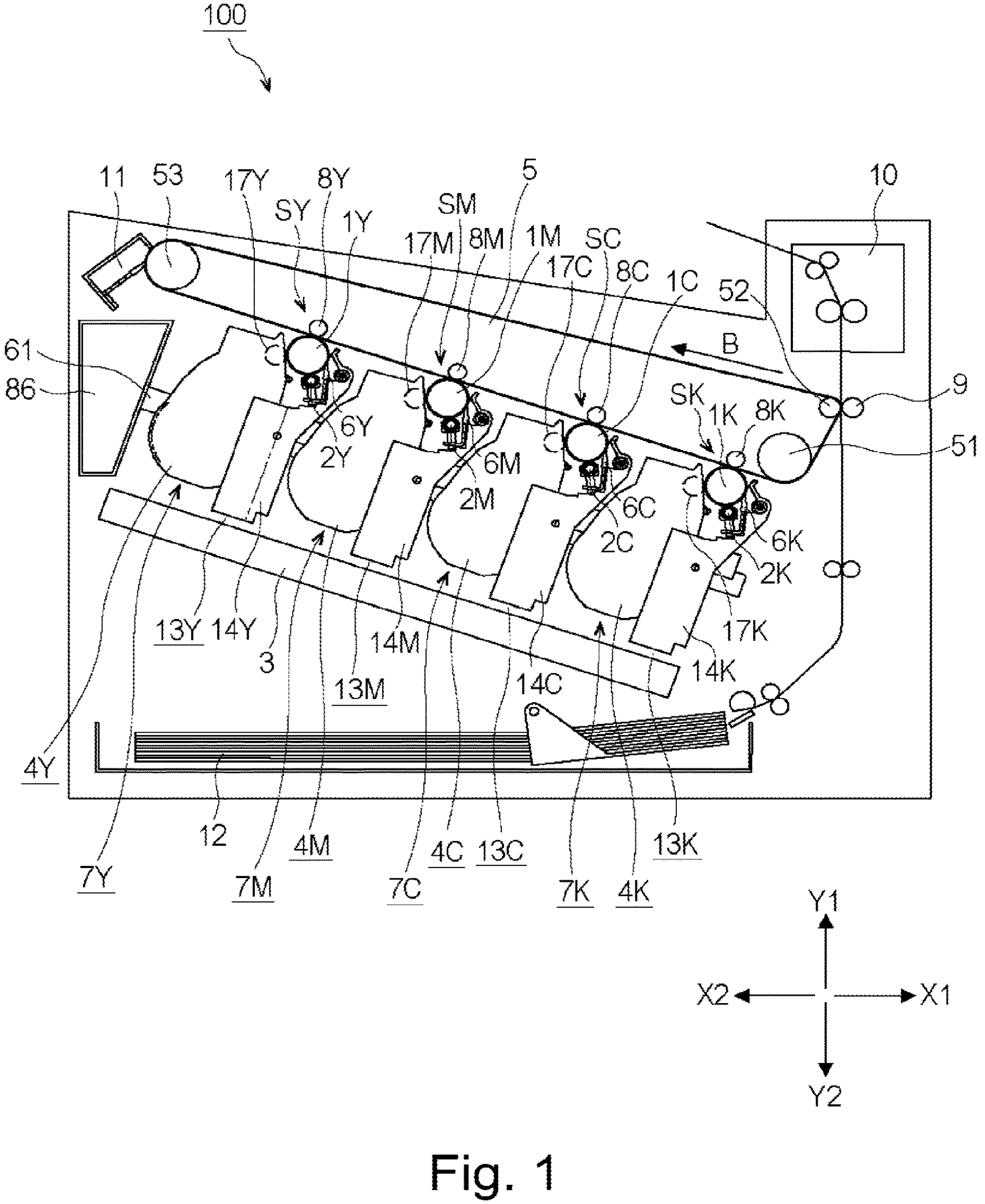
FIG. 1 is a schematic sectional view of an image forming apparatus 100.

FIG. 1 is a schematic sectional view of an image forming apparatus 100 according to this embodiment.

As shown in FIG. 1, the image forming apparatus 100 includes, as a plurality of image forming sections, first, second, third fourth image forming unit SY, SM, SC, and SK for forming images of respective colors, namely yellow (Y), magenta (M), cyan (C) and black (K). In this embodiment, the first to fourth image forming portions SY, SM, SC, and SK are arranged in a line in a substantially horizontal direction.

In this embodiment, the structures and operations of the process cartridges 7 (7Y, 7M, 7C, 7K) are substantially the same except that the colors of the images to be formed are different. Therefore, hereinafter, Y, M, C, and K will be omitted and explanation will be commonly applied unless otherwise stated.

In this embodiment, the image forming apparatus 100 has cylinders (hereinafter referred to as photosensitive drums) 1 each having a photosensitive layer, the cylinders being arranged side by side along a direction inclined slightly with respect to a vertical direction as a plurality of image bearing members. A scanner unit (exposure device) 3 is disposed below the process cartridge 7. In addition, around the photoconductive drum 1, a charging roller 2 or the like functioning as process means (process device, process member) acting on the photosensitive layer are arranged.

The charging roller 2 is charging means (charging device, charging member) for uniformly charging the surface of the photosensitive drum 1. The scanner unit (exposure device) 3 is exposure means (exposure device, exposure member) for forming an electrostatic image (electrostatic latent image) on the photosensitive drum 1 by exposing to a laser on the basis of image information. Around the photosensitive drum 1, there are provided a cleaning blade 6 as a developing device (hereinafter referred to as developing unit) 4 and cleaning means (cleaning device, cleaning member).

Further, an intermediary transfer belt 5 as an intermediary transfer member for transferring the toner image from the photosensitive drum 1 onto the recording material (sheet, recording medium) 12 is provided so as to face the four photosensitive drums 1.

The developing unit 4 of this embodiment uses a non-magnetic one-component developer (hereinafter referred to as toner) as a developer and employs a contact developing system in which a developing roller 17 as a developer carrying member contacts with the photosensitive drum 1.

With the above-described structure, the toner image formed on the photosensitive drum 1 is transferred onto the sheet (paper) 12, and the toner image transferred onto the sheet is fixed. As a process means acting on the photosensitive drum 1, the process cartridge includes a charging roller 2 for charging the photosensitive drum 1 and a cleaning blade 6 for cleaning toner remaining without being transferred onto the photosensitive drum 1. The untransferred residual toner remaining on the photosensitive drum 1 not having been transferred onto the sheet 12 is collected by the cleaning blade 6. Further, the residual toner collected by the cleaning blade 6 is accommodated in a removed developer accommodating portion (hereinafter referred to as a waste toner accommodating portion) 14*a* from the opening 14*b*. The waste toner accommodating portion 14*a* and the cleaning blade 6 are unitized to form a cleaning unit (photosensitive body unit, image bearing member unit) 13.

Further, the developing unit 4 and the cleaning unit 13 are unitized (made into a cartridge) to form a process cartridge 7. The image forming apparatus 100 is provided on the main assembly frame with guides (positioning means) such as a mounting guide and a positioning member (not shown). The process cartridge 7 is guided by the above-mentioned guide, and is configured to be mountable to and dismountable from the image forming apparatus main assembly (main assembly of the electrophotographic image forming apparatus) 100A.

Toners of respective colors of yellow (Y), magenta (M), cyan (C) and black (K) are accommodated in the process cartridges 7 for the respective colors.

The intermediary transfer belt 5 contacts the photosensitive drum 1 of each process cartridge and rotates (moves) in the direction indicated by an arrow B in FIG. 1. The intermediary transfer belt 5 is wound around a plurality of support members (a drive roller 51, a secondary transfer opposed roller 52, a driven roller 53). On the inner peripheral surface side of the intermediary transfer belt 5, four primary transfer rollers 8 as primary transfer means are juxtaposed so as to face each photosensitive drum 1. A secondary transfer roller 9 as a secondary transfer means is disposed at a position facing the secondary transfer opposing roller 52 on the outer peripheral surface side of the intermediary transfer belt 5.

At the time of image formation, the surface of the photosensitive drum 1 is first uniformly charged by the charging roller 2. Then, the surface of the thus charged photosensitive drum 1 is scanned by and exposed to laser beam corresponding to image information emitted from the scanner unit 3. By this, an electrostatic latent image corresponding to image information is formed on the photosensitive drum 1. The electrostatic latent image formed on the photosensitive drum 1 is developed into a toner image by the developing unit 4.

The photosensitive drum is a rotatable member (image bearing member) that rotates in a state of carrying an image (developer image, toner image) formed with a developer (toner) on the surface thereof.

The toner image formed on the photosensitive drum 1 is transferred (primary transfer) onto the intermediary transfer belt 5 by the operation of the primary transfer roller 8.

For example, at the time of forming a full-color image, the above-described process is sequentially performed in the four process cartridges 7 (7Y, 7M, 7C, 7K). The toner images of the respective colors formed on the photosensitive drums 1 of the respective process cartridges 7 are sequentially primary-transferred so as to be superimposed on the intermediary transfer belt 5. Thereafter, in synchronism with the movement of the intermediary transfer belt 5, the recording material 12 is fed to the secondary transfer portion. The four color toner images on the intermediary transfer belt 5 are altogether transferred onto the recording material 12 conveyed to the secondary transfer portion constituted by the intermediary transfer belt 5 and the secondary transfer roller 9.

The recording material 12 to which the toner image has been transferred is conveyed to a fixing device 10 as fixing means. By applying heat and pressure to the recording material 12 in the fixing device 10, the toner image is fixed on the recording material 12. Further, the primary transfer residual toner remaining on the photosensitive drum 1 after the primary transferring process is removed by the cleaning blade 6 and collected as waste toner. Further, the secondary transfer residual toner remaining on the intermediary transfer belt 5 after the secondary transfer step is removed by the intermediary transfer belt cleaning device 11.

The image forming apparatus 100 is also capable of forming monochrome or multicolor images using desired single or some (not all) image forming units.

[General Description of Process Cartridge]

Figure 2:
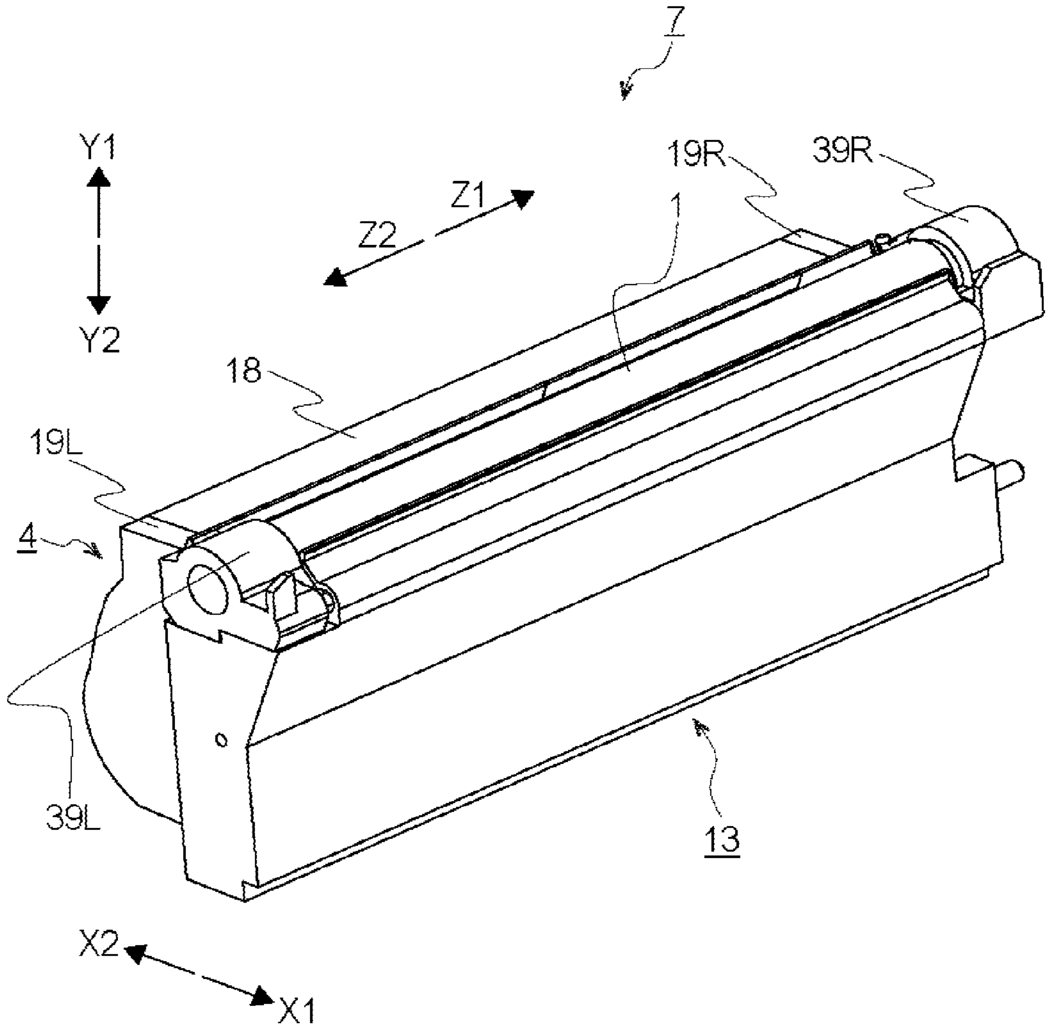
FIG. 2 is a perspective view of an outer appearance of a process cartridge 7.
Figure 3:
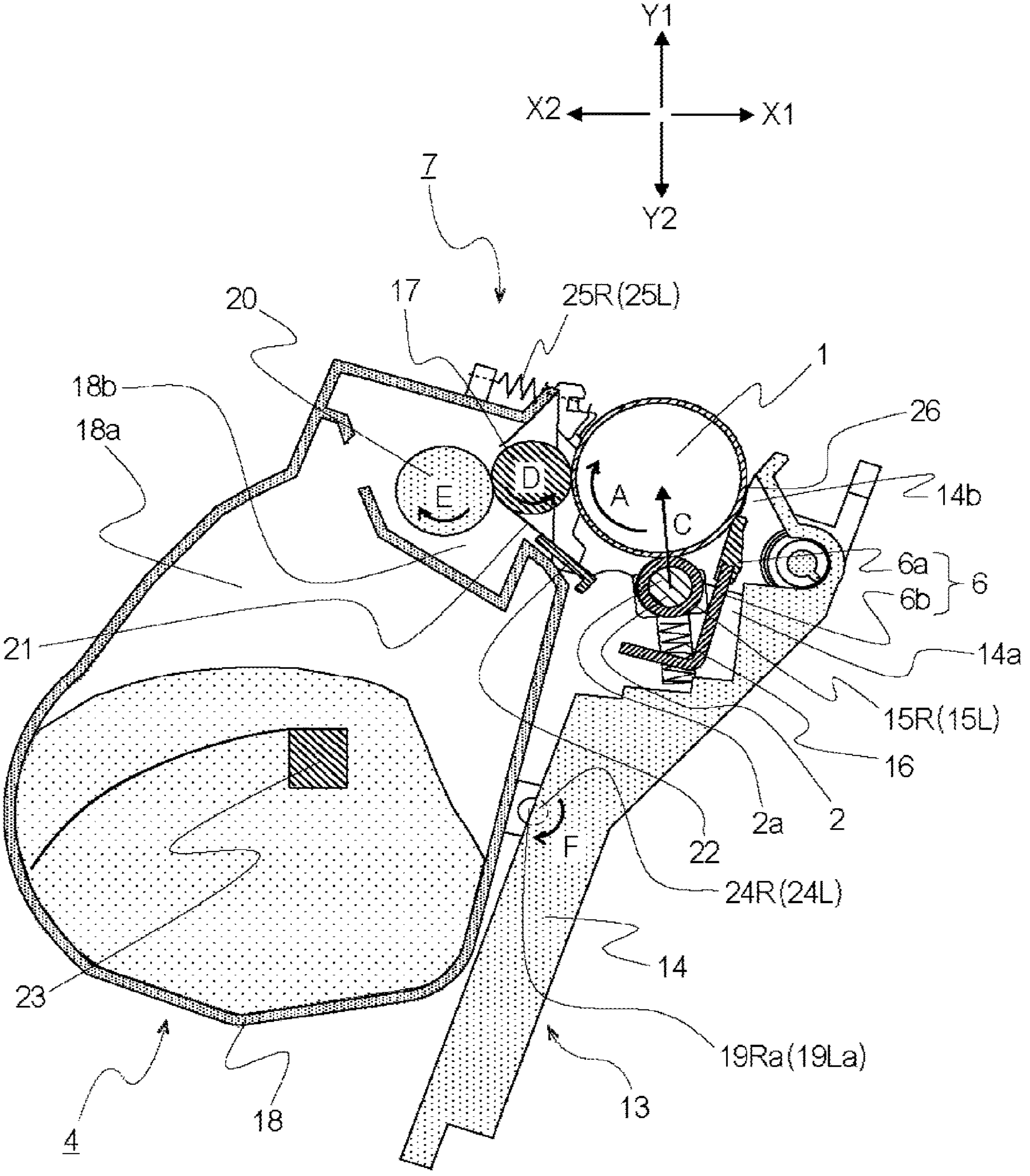
FIG. 3 is a sectional view of the process cartridge 7 taken along a plane perpendicular to a rotation axis of a photosensitive drum 1.
Figure 4:
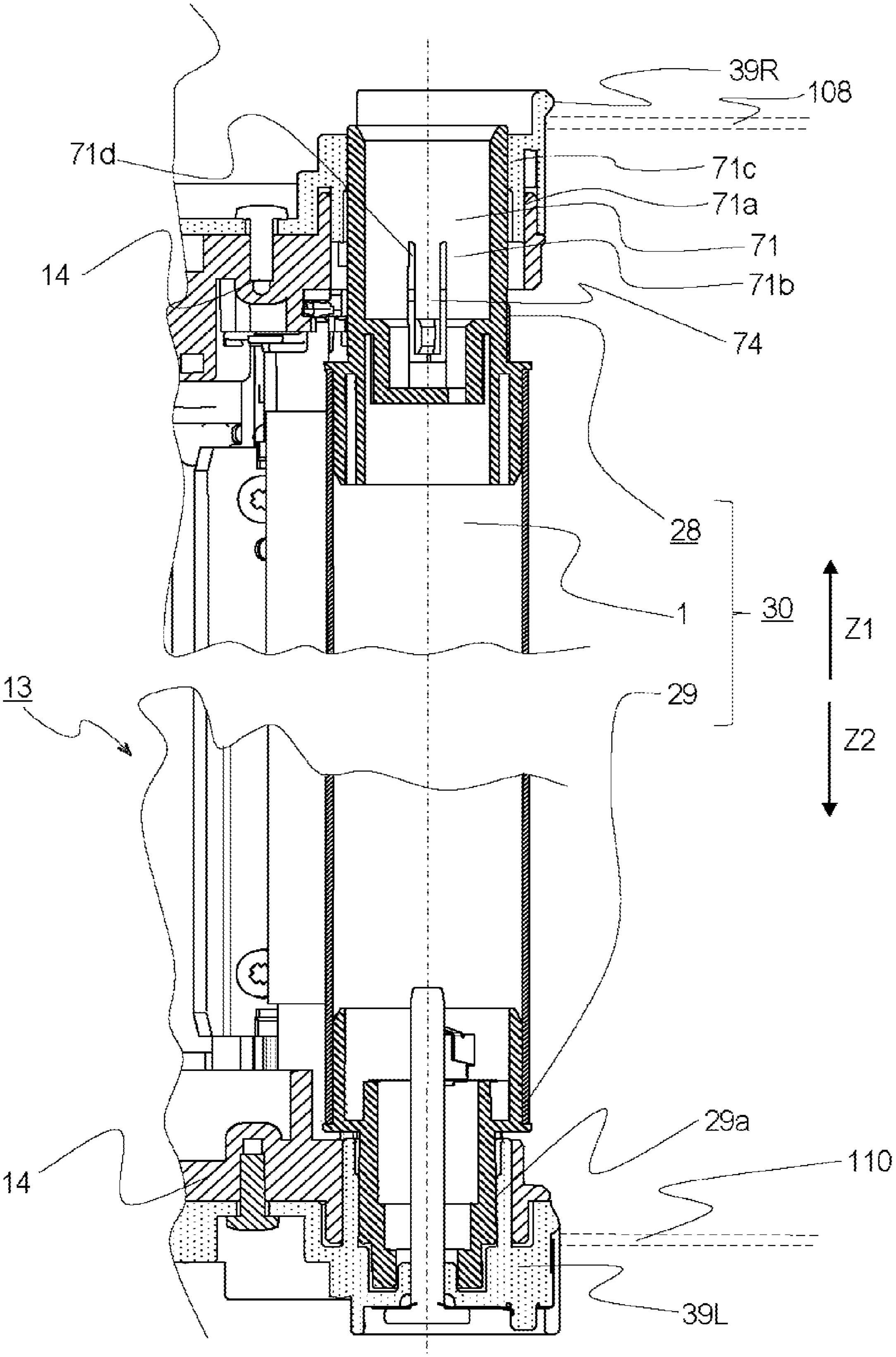
FIG. 4 is a cross-sectional view of the process cartridge taken along a plane including the rotation axis center (rotation axis) of the photosensitive drum 1.

Referring to FIGS. 2, 3, and 4 the process cartridge 7 (cartridge 7) mounted in the image forming apparatus main assembly 100A of this embodiment will be described.

The cartridge 7*a* containing the yellow toner, the cartridge 7*b* containing the magenta toner, the cartridge 7*c* containing the cyan toner and the cartridge 7*d* containing the black toner have the same structure. Therefore, in the following description, each of the cartridges 7*a*, 7*b*, 7*c*, 7*d* will be referred to simply as a cartridge 7. The respective cartridge components will also be described in the same manner.

FIG. 2 is an external perspective view of the process cartridge 7. Here, as shown in FIG. 2, the direction of the rotation axis of the photosensitive drum 1 is defined as a Z direction (arrow Z1, arrow Z2), the horizontal direction in FIG. 1 as X direction (arrow X1, arrow X2), the vertical direction is a Y direction (arrow Y1, arrow Y2).

FIG. 3 is a schematic cross-sectional view of the process cartridge 7 viewed in the Z direction in a state (attitude) in which the photosensitive drum 1 and the developing roller 17 are in contact with each other, which is mounted to the image forming apparatus 100.

The process cartridge 7 comprises two units, namely a cleaning unit 13 including the photosensitive drum 1, the charging roller 2 and the cleaning blade 6 as a unit, and a developing unit 4 including a developing member such as the developing roller 17.

The developing unit 4 has a developing frame 18 for supporting various elements in the developing unit 4. The developing unit 4 includes the developing roller 17 as a developer carrying member which is rotatable in the direction of the arrow D (counterclockwise direction) in contact with the photosensitive drum 1. The developing roller 17 is rotatably supported by the developing frame 18 through development bearings 19 (19R, 19L) at both end portions with respect to the longitudinal direction (rotational axis direction) thereof. Here, the developing bearings 19 (19R, 19L) are mounted to respective side portions of the developing frame 18, respectively.

In addition, the developing unit 4 is provided with a developer accommodating chamber (hereinafter, toner accommodating chamber) 18*a* and a developing chamber 18*b* in which the developing roller 17 is provided.

In the developing chamber 18*b*, there are provided a toner supply roller as a developer supply member which contacts the developing roller 17 and rotates in the direction of arrow E, and a developing blade 21 as a developer regulating member for regulating the toner layer of the developing roller 17. The developing blade 21 is fixed and integrated to the fixing member 22 by welding or the like.

A stirring member 23 for stirring the contained toner and for conveying the toner to the toner supplying roller 20 is provided in the toner accommodating chamber 18*a* of the developing frame 18.

The developing unit 4 is rotatably coupled to the cleaning unit 13 around the fitting shafts 24 (24R, 24L) fitted in the holes 19Ra, 19La provided in the bearing members 19R, 19L. Further, in the developing unit 4, the developing roller 17 is urged by the pressure spring 25 (25R, 25L) in a direction of contacting to the photosensitive drum 1. Therefore, at the time of image formation using the process cartridge 7, the developing unit 4 turns (rotates) in the direction of an arrow F about the fitting shaft 24, so that the photosensitive drum 1 and the developing roller 17 are in contact with each other.

The cleaning unit 13 has a cleaning frame 14 as a frame for supporting various elements in the cleaning unit 13.

FIG. 4 is a cross-sectional view taken along an imaginary plane including a rotation center of the photosensitive drum 1 of the process cartridge 7. The side (with respect to the Z1 direction) where the coupling member 28 receives the driving force from the image forming apparatus main assembly is referred to as the driving side (back side) of the process cartridge 7. The side opposite to the driving side (with respect to the Z2 direction) is referred to as the non-driving side (front side) of the process cartridge 7.

On the end opposite from the coupling member 28 (the end portion on the non-driving side of the process cartridge), there is provided a electrode (electrode portion) in contact with the inner surface of the photosensitive drum 1, and this electrode functions as the electrical ground by contacting the main assembly.

The coupling member 28 is mounted to one end of the photosensitive drum 1, and a non-driving side flange member 29 is mounted to the other end of the photosensitive drum 1 to constitute a photosensitive drum unit 30. The photosensitive drum unit 30 receives a driving force from a main assembly driving shaft 101 provided in the image forming apparatus main assembly 100A via the coupling member 28 (driving force is transmitted from the main assembly driving shaft 101).

The coupling member 28 is configured to be coupled to and detached from the main assembly driving shaft 101.

The coupling member 28 is also a flange member (driving side flange member) mounted to the driving side end portion of the photosensitive drum 1.

As shown in FIG. 4, the Z1 side of the coupling member 28 has a cylindrical shape (cylindrical portion 71). The cylindrical portion 71 protrudes toward the Z1 side (outside in the axial direction) beyond the end portion of the photosensitive drum 1. The outer peripheral portion of the cylindrical portion 71 is the outer peripheral surface 71*a*. On the outer circumferential surface 71*a*, a cut-away portion 71*d* is provided for forming a base portion 74 which will be described hereinafter. In the cylindrical portion 71, a portion on the Z1 side of the cut-away portion 71*d* is a borne portion 71*c*. The borne portion 71*c* is rotatably supported by the bearing portion provided in a drum unit bearing member 39R. In other words, the borne portion 71*c* is supported by the bearing portion of the drum unit bearing member 39R, so that the photosensitive drum unit 30 can rotate.

Similarly, the non-driving side flange member 29 provided on the non-driving side of the photosensitive drum unit 30 is rotatably supported by a drum unit bearing member 39L. The non-driving side flange member 29 has a cylindrical portion (cylindrical portion) projecting from the end portion of the photosensitive drum 1, and the outer peripheral surface 29*a* of this cylindrical portion is rotatably supported by the drum unit bearing member 39L.

The drum unit bearing member 39R is disposed on the driving side of the process cartridge 7, and the drum unit bearing member 39L is disposed on the non-driving side of the process cartridge 7.

As shown in FIG. 4, when the process cartridge 7 is mounted in the apparatus main assembly 100A, the drum unit bearing member 39R abuts to the rear cartridge positioning section 108 provided in the image forming apparatus main assembly 100A. Further, the drum unit bearing member 39L abuts to the front side cartridge positioning portion 110 of the image forming apparatus main assembly 100A. Thereby, the cartridge 7 is positioned in the image forming apparatus 100A.

In the Z direction of this embodiment, the position where the drum unit bearing member 39R supports the borne portion 71*c* is made close to the position where the drum unit bearing member 39R is positioned at the rear side cartridge positioning portion 108. By doing so, it is possible to suppress inclination of the coupling member 28 when the process cartridge 7 is mounted in the apparatus main assembly 100A.

The borne portion 71*c* is disposed so that the position where the bearing member 39R supports the supported portion 71*c* and the position where the bearing member 39R is positioned at the rear side cartridge positioning portion 108 can be close to each other. That is, the borne portion 71*c* is disposed on the free end side (the Z1 direction side) of the outer peripheral surface 71*a* of the cylindrical portion 71 provided in the coupling member 28.

Similarly, in the Z direction, the position where the drum unit bearing member 39L rotatably supports the non-driving side flange member 29 is arranged at a position close to the position where the drum unit bearing member 39L is positioned on the near side cartridge positioning portion 110. By this, the inclination of the non-driving side flange member 29 is suppressed.

The drum unit bearing members 39R and 39L are mounted to the sides of the cleaning frame 14, respectively, and support the photosensitive drum unit 30. By this, the photosensitive drum unit 30 is supported so as to be rotatable relative to the cleaning frame 14.

In addition, a charging roller 2 and a cleaning blade 6 are mounted to the cleaning frame 14, and they are arranged so as to be in contact with the surface of the photosensitive drum 1. In addition, charging roller bearings 15 (15R, 15L) are mounted to the cleaning frame 14. The charging roller bearing is a bearing for supporting the shaft of the charging roller 2.

Here, the charging roller bearings 15 (15R, 15L) are mounted so as to be movable in the direction of the arrow C shown in FIG. 3. A rotating shaft 2*a* of the charging roller 2 is rotatably mounted to the charging roller bearing 15 (15R, 15L). The charging roller bearing 15 is urged toward the photosensitive drum 1 by a pressing spring 16 as an urging means. As a result, the charging roller 2 abuts against the photosensitive drum 1 and is rotated by the photosensitive drum 1.

The cleaning frame 14 is provided with a cleaning blade 6 as a cleaning means for removing the toner remaining on the surface of the photosensitive drum 1. The cleaning blade 6 is formed by unitizing a blade-shaped rubber (elastic member) 6*a* that abuts against the photosensitive drum 1 to remove toner on the photosensitive drum 1 and a supporting metal plate 6*b* that supports the blade-like rubber (elastic member) 6*a* In this embodiment, the support metal plate 6*b* is fixed to the cleaning frame 14 with screws.

As described in the foregoing, the cleaning frame 14 has an opening 14*b* for collecting the transfer residual toner collected by the cleaning blade 6. The opening 14*b* is provided with a blowing prevention sheet 26 which is in contact with the photosensitive drum 1 and seals between the photosensitive drum 1 and the opening 14*b* so as to suppress toner leakage in the upward direction of the opening 14*b*.

In this manner, by employing the structure in which the components related to the image formation are unitized in a cartridge detachably mountable to the apparatus main assembly, the maintenance easiness is improved. In other words, the user can easily perform maintenance of the apparatus by exchanging the process cartridge. Therefore, it is possible to provide an apparatus for which the maintenance operation can be performed not only by a serviceman but also by a user.

[Structure of Main Assembly Driving Shaft]

Referring to FIGS. 5, 6, 7, 8, and 9, structures of the main assembly driving shaft 101 will be described.

Figure 5:
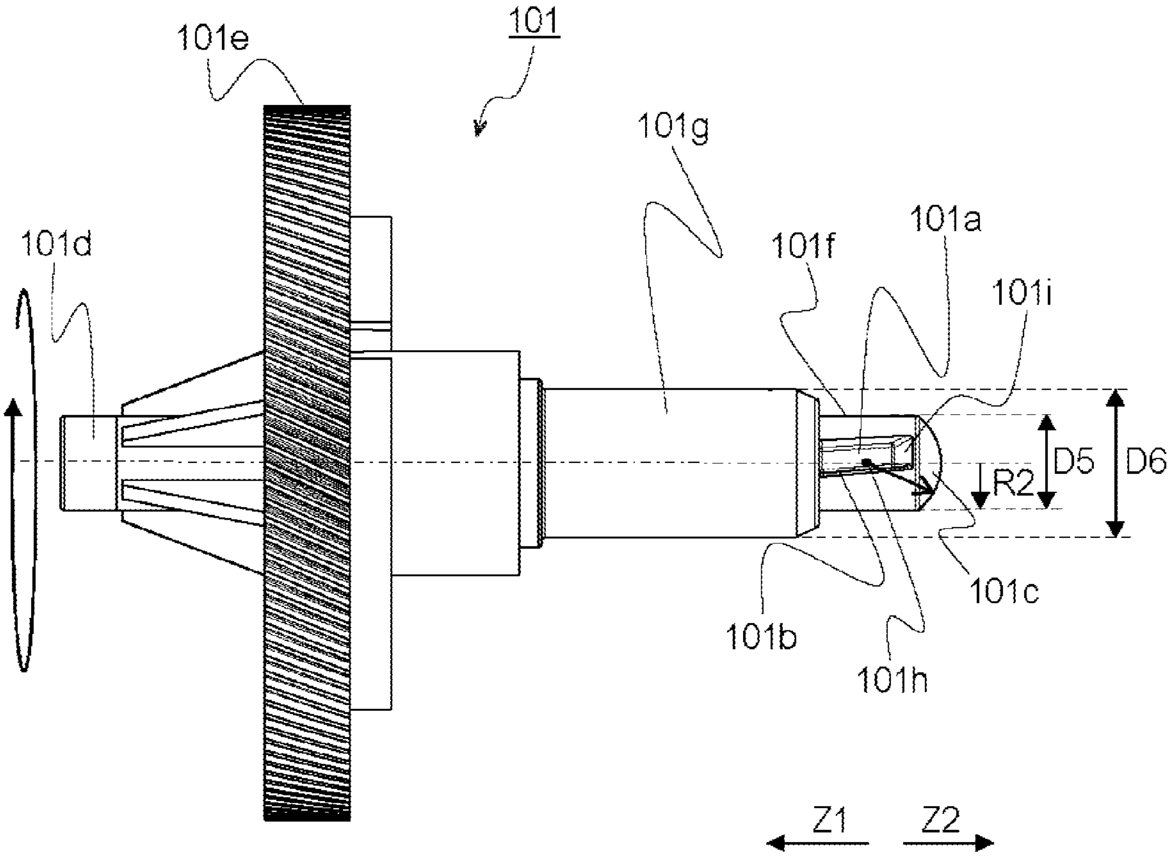
FIG. 5 is an external view of the main assembly driving shaft.

FIG. 5 is an external view of the main assembly driving shaft.

Figure 6:
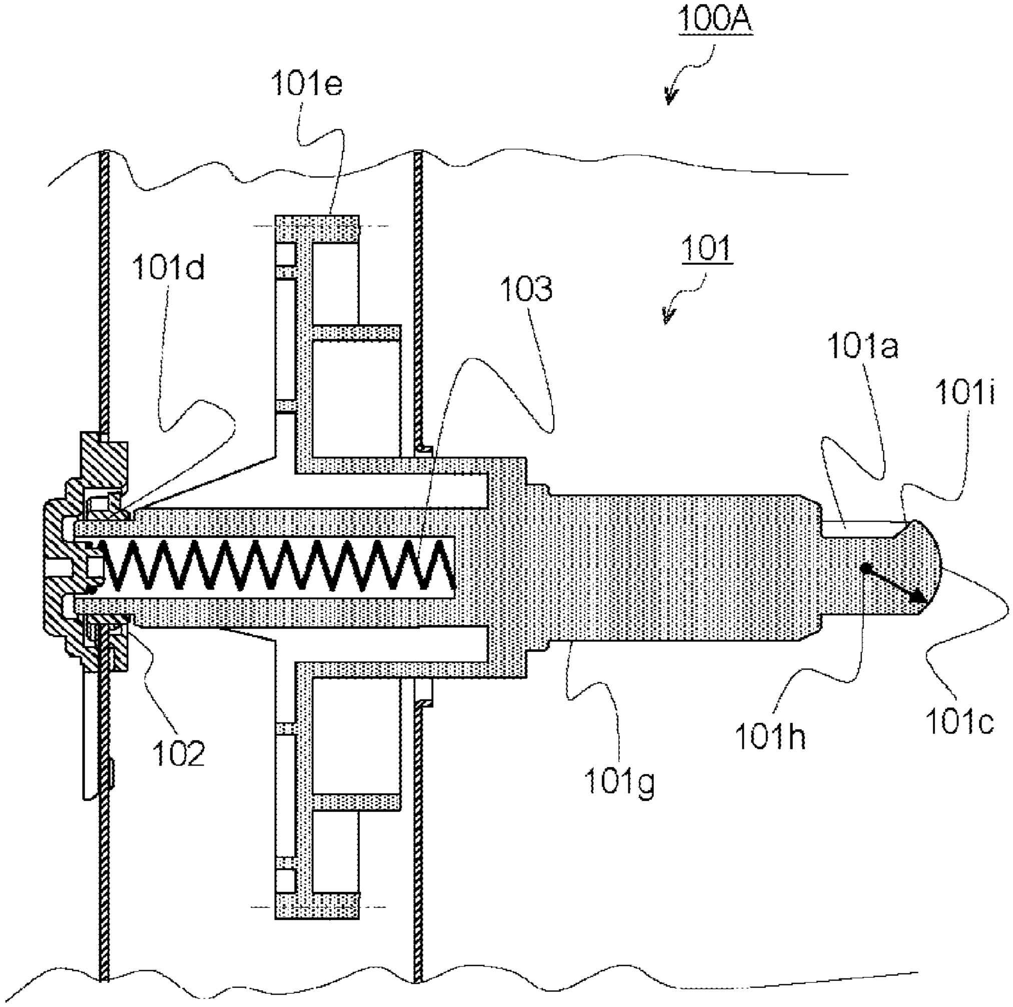
FIG. 6 is a cross-sectional view taken along a plane including the rotation axis center (rotation axis) of the main assembly driving shaft 101 mounted to the image forming apparatus main assembly.

FIG. 6 is a cross-sectional view taken along the rotation axis (rotation axis) of the main assembly driving shaft 101 mounted to the image forming apparatus main assembly.

Figure 7:
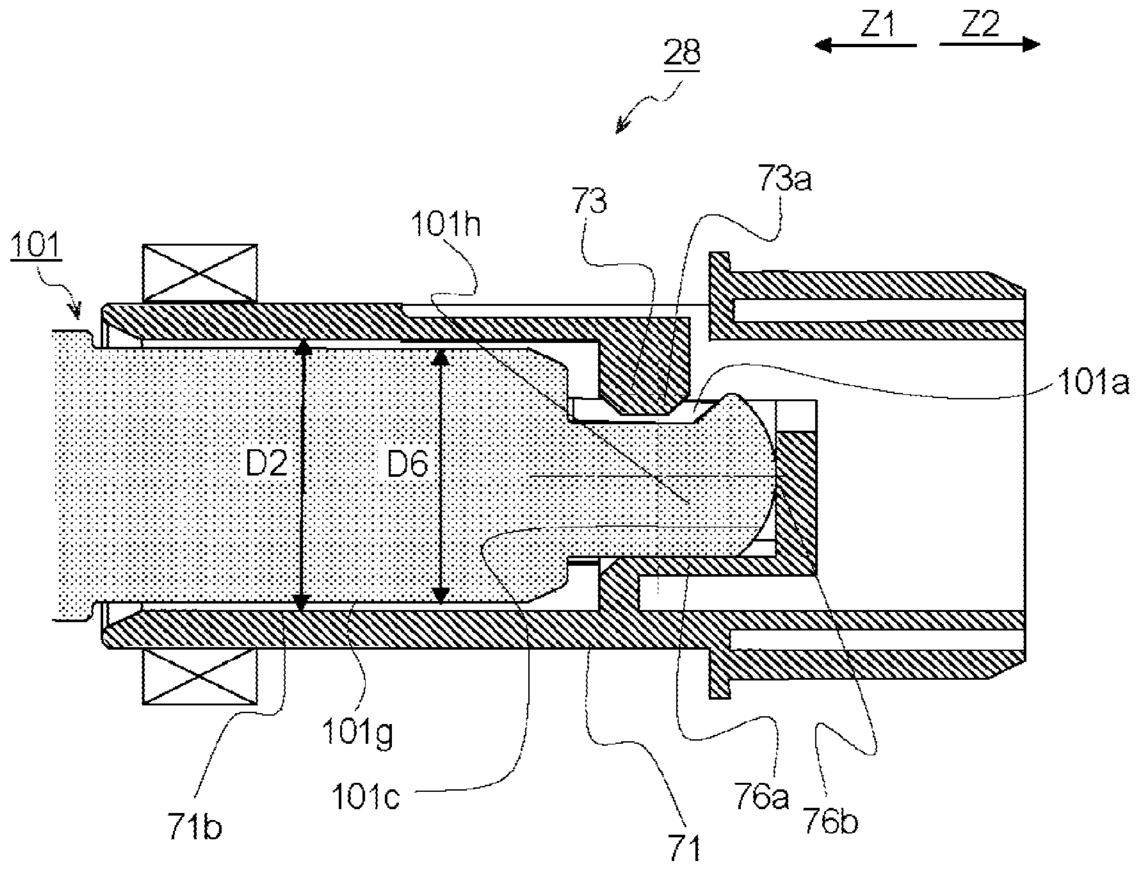
FIG. 7 is a cross-sectional view of the coupling 28 and the main assembly driving shaft 101 taken along a plane including the rotation center line (rotation axis).

FIG. 7 is a cross-sectional view of the coupling 28 and the main assembly driving shaft 101 taken along the rotation axis (rotation axis).

Figure 8:
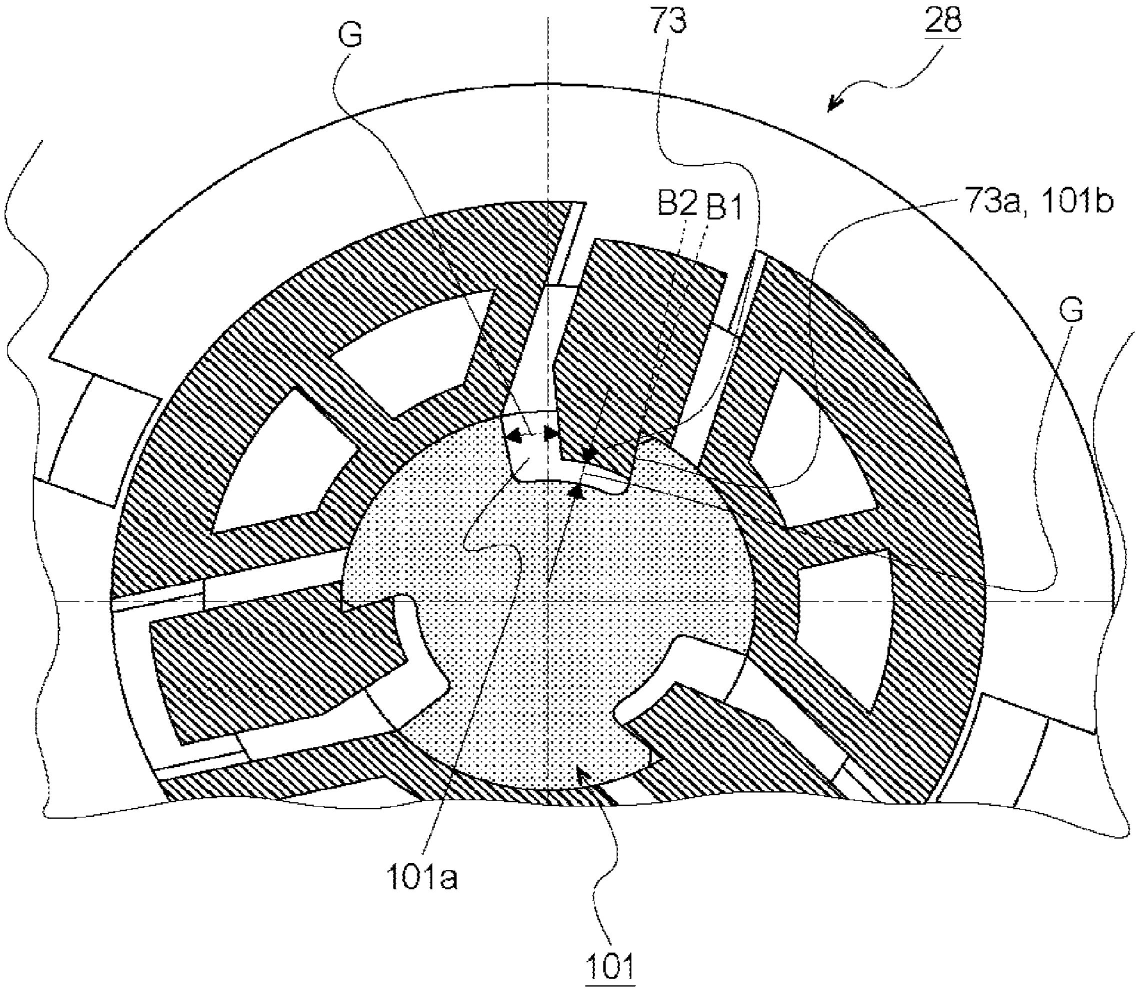
FIG. 8 is a cross-sectional view of the coupling member 28 and the main assembly driving shaft 101, taken along a plane perpendicular to the rotation axis.

FIG. 8 is a cross-sectional view of the coupling member 28 and the main assembly driving shaft 101 taken along a plane perpendicular to the rotation axis.

Figure 9:
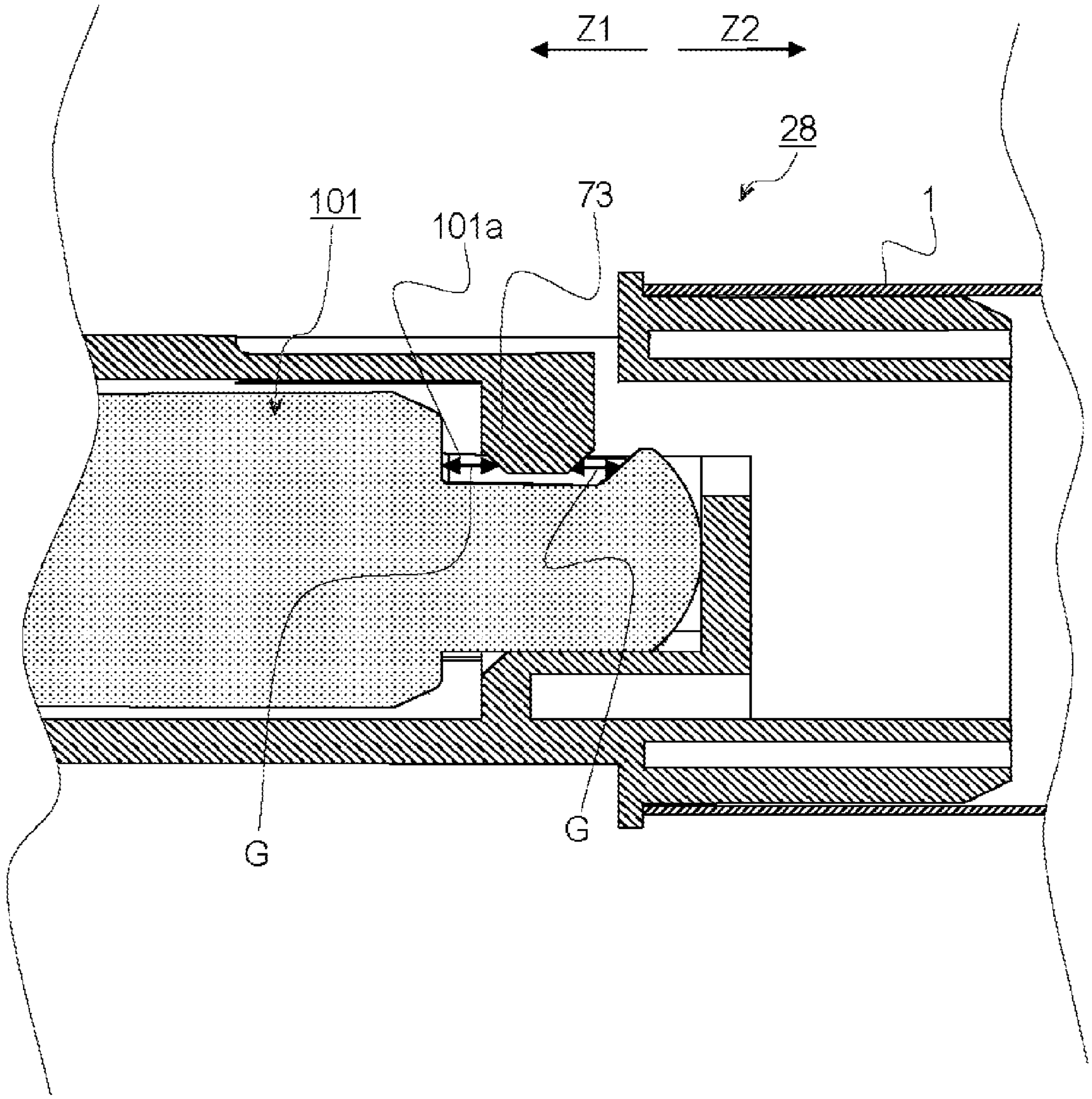
FIG. 9 is a cross-sectional view of the coupling 28 and the main assembly driving shaft 101 taken along a plane including the rotation center line (rotation axis).

FIG. 9 is a cross-sectional view of the coupling 28 and the main assembly driving shaft 101 taken along the rotation axis.

As shown in FIG. 5, the main assembly driving shaft 101 is provided with a gear portion 101*e*, a shaft portion 101*f*, a rough guide portion 101*g* and a borne portion 101*d*.

A motor (not shown) as a drive source is provided in the image forming apparatus main assembly 100A. From the motor, the gear portion 101*e* receives the rotational driving force so that the main assembly driving shaft 101 rotates. Further, the main assembly driving shaft 101 includes a rotatable projecting shaft portion 101*f* protruding toward the cartridge side from the gear portion 101*e* along the rotation axis thereof. The rotational driving force received from the motor is transmitted to the cartridge 7 side by way of the groove-shaped drive transmission groove 101*a* (recessed portion, drive passing portion) provided in the shaft portion 101*f*. In addition, the shaft portion 101*f* has a semispherical shape 101*c* at its free end portion.

The main assembly drive transmission groove 101*a* is shaped so that a part of an engagement portion 73 which will be described hearing after can enter. Specifically, it is provided with a main assembly drive transmission surface 101*b* as a surface that contacts the driving force receiving surface (driving force receiving portion) 73*a* of the coupling member 28 to transmit the driving force.

Further, as shown in FIG. 5, the main assembly drive transmission surface 101*b* is not a flat surface but a shape twisted about the rotational axis of the main assembly driving shaft 101. The twisting direction is such that the downstream side in the Z1 direction of the main assembly driving shaft 101 is upstream of the downstream side in the Z2 direction thereof, with respect to the rotational direction of the main assembly driving shaft 101. In this embodiment, the amount of twisting along the rotational axis direction of the cylinder of the engaging portion 73 is set to about 1 degree per 1 mm. The reason why the main assembly drive transmission surface 101*b* is twisted will be described hereinafter.

Also, the main assembly drive transmission groove 101*a* provided on the Z2 direction side surface with a main assembly side removing taper 101*i*. The main assembly side extraction taper 101*i* is a taper (inclined surface, inclined portion) for assisting the engagement portion 73 to disengage from the drive transmission groove 101*a* when dismounting the process cartridge 7 from the apparatus main assembly 100A. The details thereof will be described hereinafter.

Here, when the driving force is transmitted from the drive transmission groove 101*a* to the engagement portion 73, it is desirable that the main assembly drive transmission surface 101*b* and the driving force receiving surface (driving force receiving portion) 73*a* are assuredly in contact with each other. Therefore, in order to prevent the surface other than the main assembly drive transmission surface 101*b* from coming into contact with the engagement portion 73, the main assembly drive transmission groove 101*a* has a clearance (G) relative to the engagement portion 73 in the rotational axis direction, the circumferential direction and in the radial direction (FIGS. 8 and 9).

Further, on the free end side in the axial direction of the main assembly drive transmission groove 101*a*, there is provided a main assembly side removing taper 101*i* as an inclined surface (inclined portion). Further, in the axial direction of the main assembly driving shaft 101, the center 101*h* of the semispherical shape 101*c* is disposed within the range of the main assembly drive transmission groove 101*a* (FIG. 7). In other words, when the center 101*h* and the main assembly drive transmission groove 101*a* are projected on the axis of the main assembly driving shaft 101 on the axis of the main assembly driving shaft 101, the projection area of the center 101*h* on the axis is within the projection area of the main assembly drive transmission groove 101*a*. The rough guide portion 101*g* is provided between the shaft portion 101*f* and the gear portion 101*e* in the axial direction (FIG. 6). As shown in FIG. 7, the rough guide portion 101*g* has a tapered shape at the free end portion on the shaft portion 101*f* side, and the outer diameter D6 of the rough guide portion 101*g* is, as shown in FIG. 7, is smaller than the inner diameter D2 of inner surface 71*b* of the cylindrical portion 71 of the coupling member 28. The outer diameter D6 of the rough guide portion 101*g* is larger than the outer diameter D5 of the shaft portion 101*f* as shown in FIG. 5. Thus, when the cartridge 7 is inserted into the image forming apparatus main assembly 100A, the main assembly driving shaft 101 is guided to be along the coupling member 28 so as to reduce the axial misalignment between the rotation center of the cylindrical portion 71 and the rotation center of the shaft portion 101*f*. Therefore, the rough guide portion 101*g* can be said to be an insertion guide.

The rough guide portion 101*g* is set to have such a dimensional relationship that it does not abut on the inner peripheral surface 71*b*, after the mounting of the cartridge 7 to the image forming apparatus main assembly 100A is completed.

As shown in FIG. 6, the borne portion 101*d* is disposed on the opposite side of the rough guide portion 101*g* across the gear portion 101*e*. The borne portion 101*d* is rotatably supported by a bearing member 102 provided in the image forming apparatus main assembly 100A.

Further, as shown in FIG. 6, the main assembly driving shaft 101 is urged toward the cartridge 7 side by a spring member 103 of the image forming apparatus main assembly 100A. However, the movable amount (play) of the main assembly driving shaft 101 in the Z direction is about 1 mm which is sufficiently smaller than the width, measured in the Z direction, of the driving force receiving surface 73*a* which will be described hereinafter.

As described above, the main assembly driving shaft 101 is provided with the main assembly drive transmission groove 101*a*, and the coupling member 28 is provided with the engagement portion 73, to transmit the drive from the main assembly 100A to the cartridge 7 (drum unit 30).

As will be described in detail hereinafter, the engaging portion 73 is provided at the free end of the elastically deformable base portion 74. Therefore, the engaging portion 73 is configured to be movable at least outwardly in the radial direction when the cartridge 7 is mounted to the apparatus main assembly 100A. Therefore, as the cartridge 7 is inserted into the apparatus main assembly 100A, the engagement portion 73 enters the drive transmission groove 101*a*, and the engagement portion 73 and the main assembly drive transmission groove 101*a* can engage with each other.

[Structure of Coupling Member]

Referring to FIGS. 4, 10, 11, 12, 13, 14, and 15, the coupling member 28 of this embodiment will be described in detail.

Figure 10:
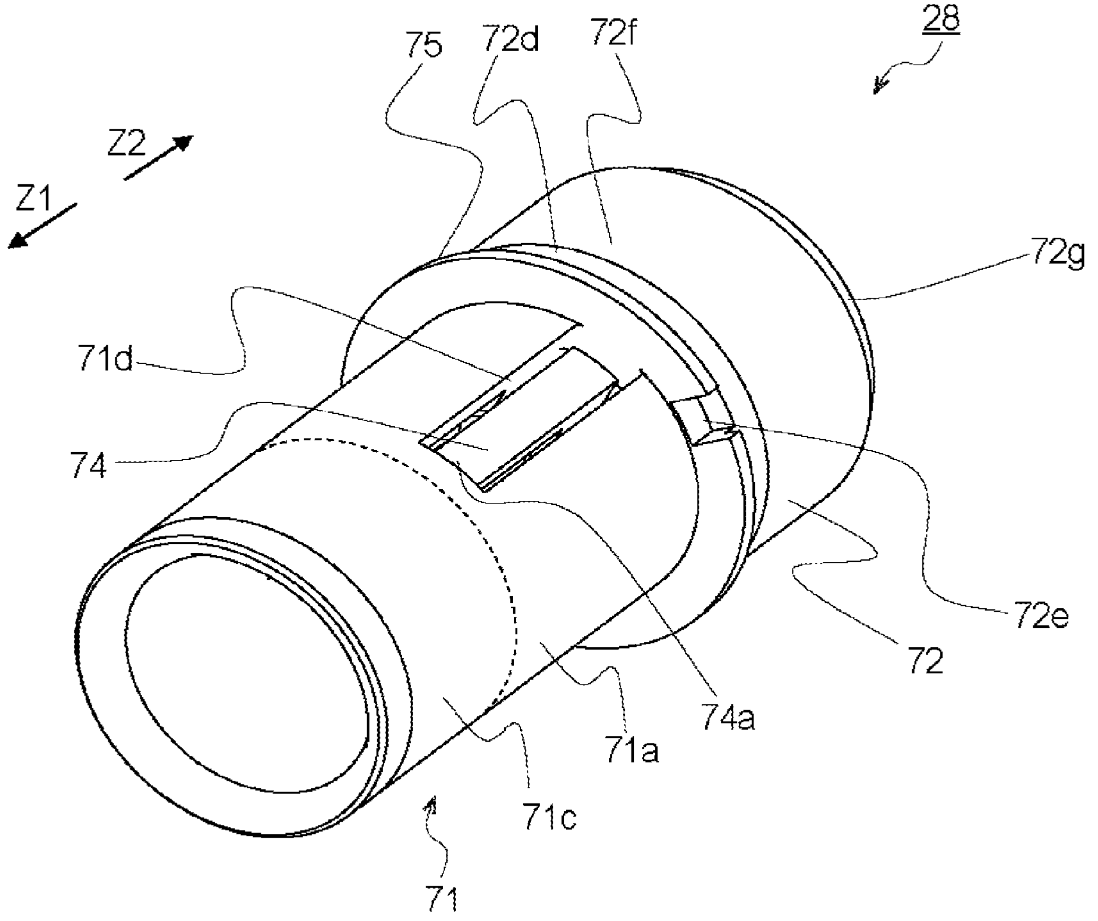
FIG. 10 is a perspective view of the coupling member 28.

FIG. 10 is a perspective view of the coupling member 28.

Figure 11:
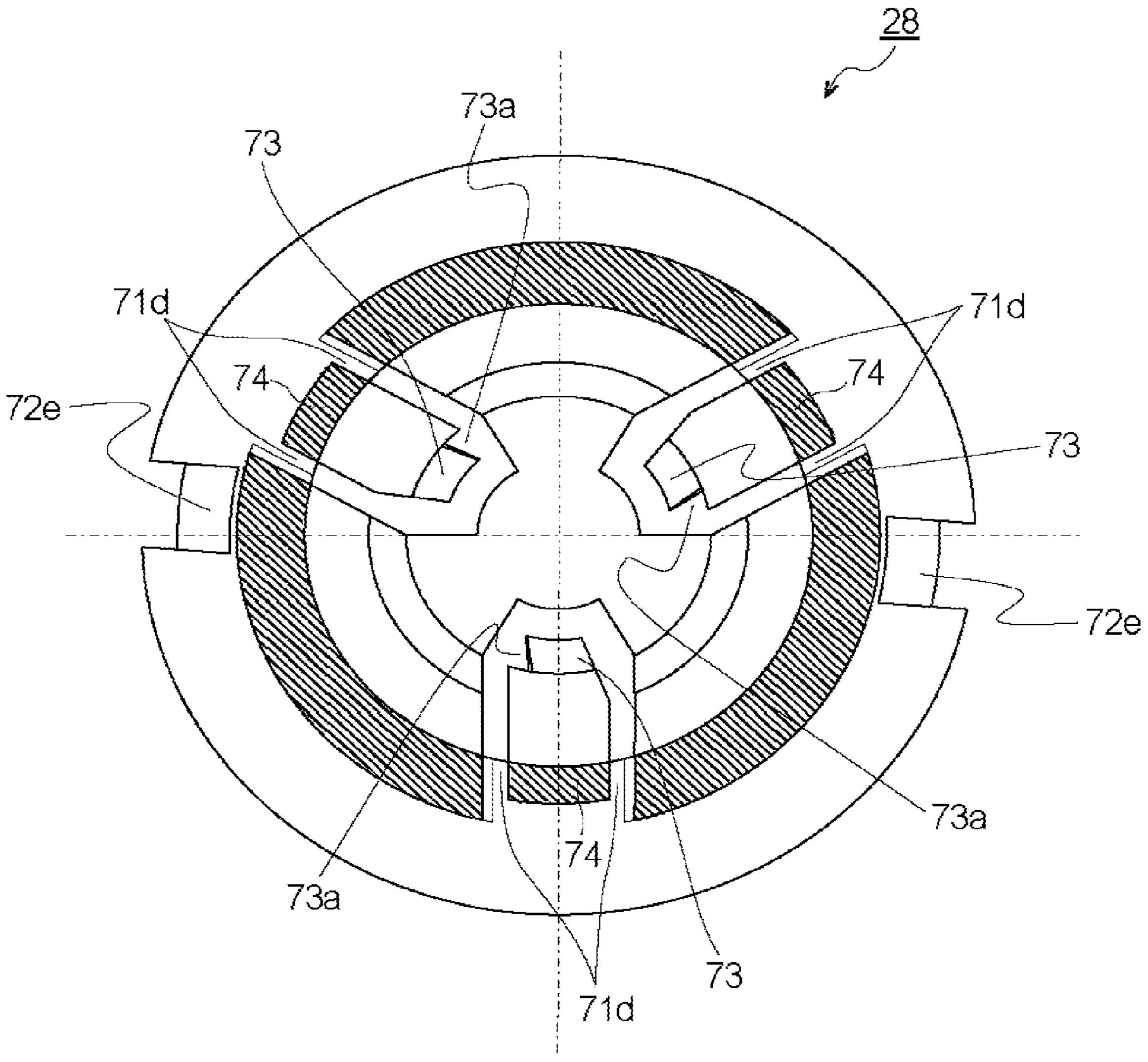
FIG. 11 is a sectional view of the coupling member 28 taken along a plane perpendicular to the axis of rotation of the coupling member 28 and passing through the base portion 74.

FIG. 11 is a cross-sectional view of the coupling member 28 taken along a plane perpendicular to the axis of rotation of the coupling member 28 and including the base portion 74.

Figure 12:
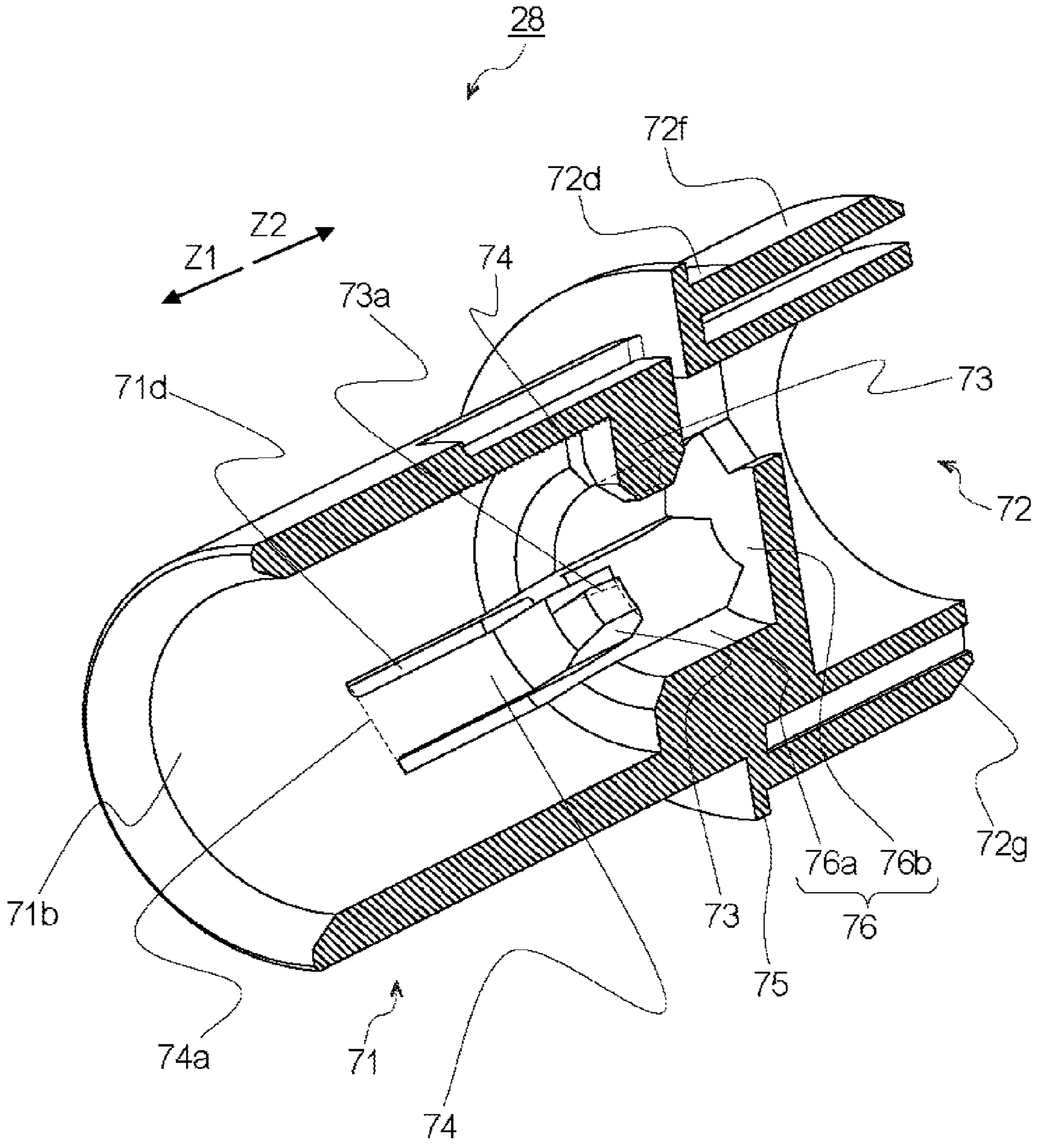
FIG. 12 is a cross-sectional perspective view of the coupling member 28.

FIG. 12 is a cross-sectional perspective view of the coupling member 28.

Figure 13:
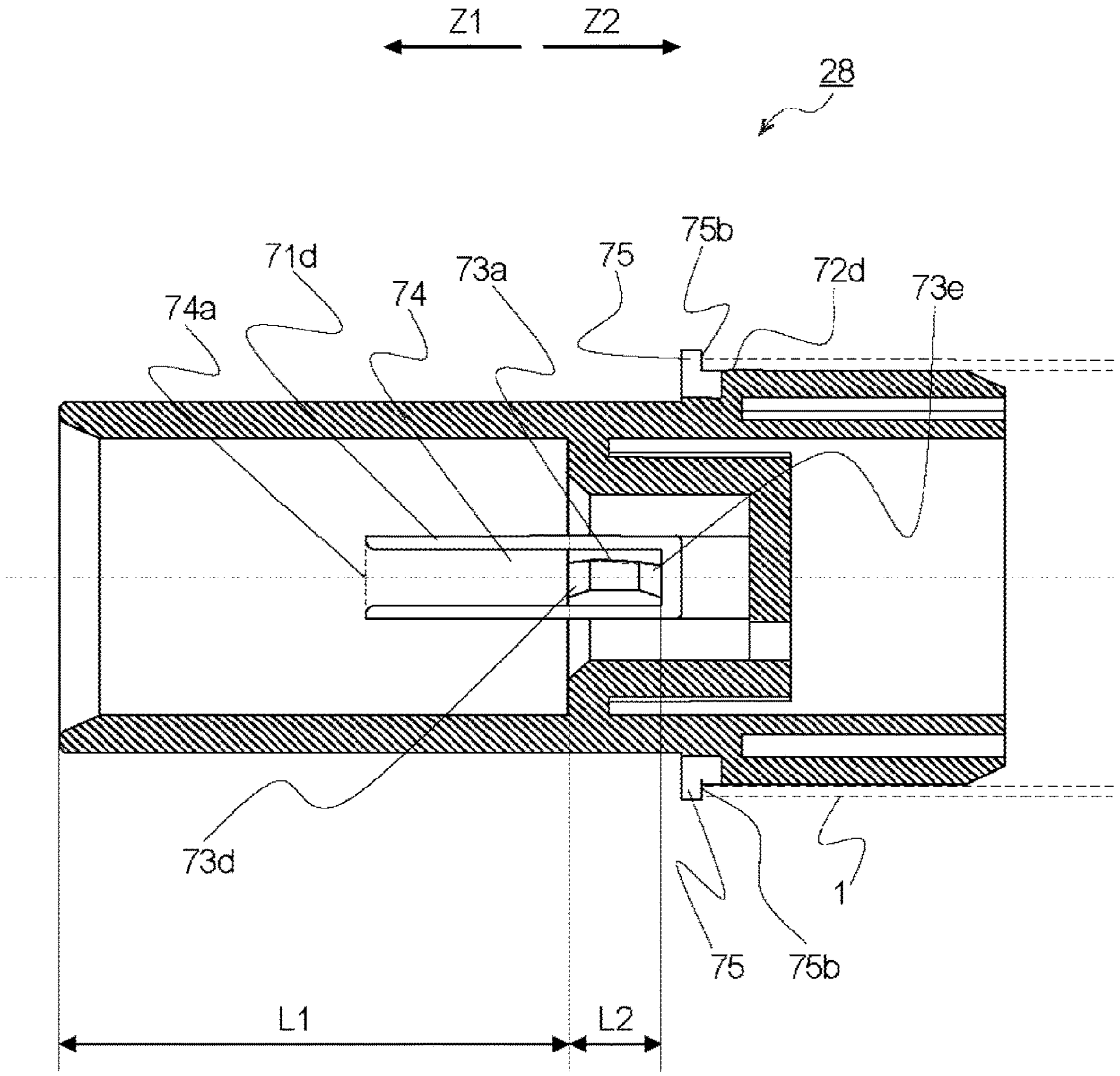
FIG. 13 is a cross-sectional view of the coupling member 28 taken along a plane including rotation center line (rotation axis).

FIG. 13 is a longitudinal sectional view of the coupling member 28 taken along the rotation axis.

Figure 14:
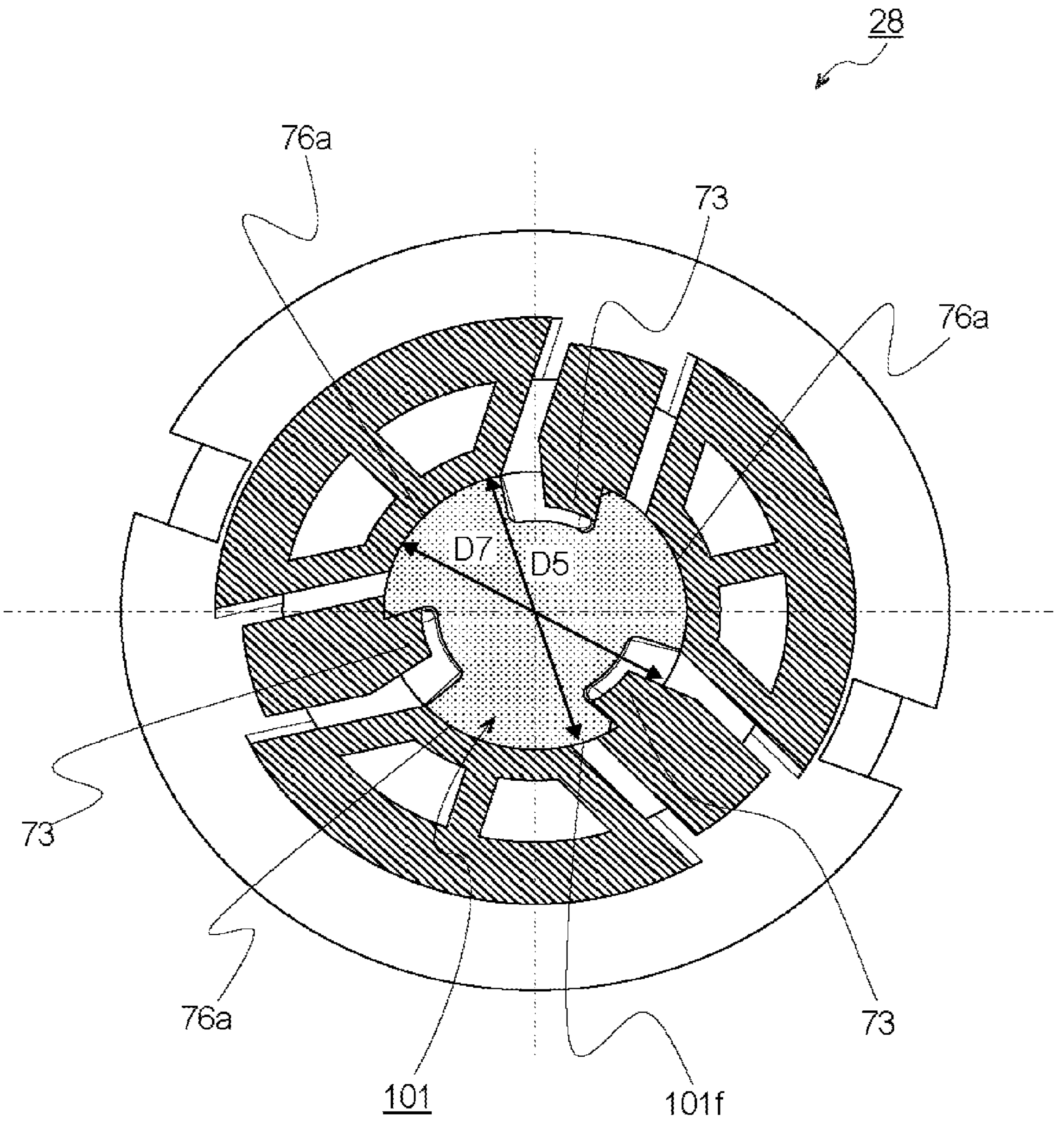
FIG. 14 is a cross-sectional view of the coupling member 28 and the main assembly driving shaft 101 taken along a plane perpendicular to the rotation axis and passing through the base portion 74.

FIG. 14 is a cross-sectional view of the coupling member 28 and the main assembly driving shaft 101 taken along a plane perpendicular to the rotation axis and include in the base portion 74.

Figure 15:
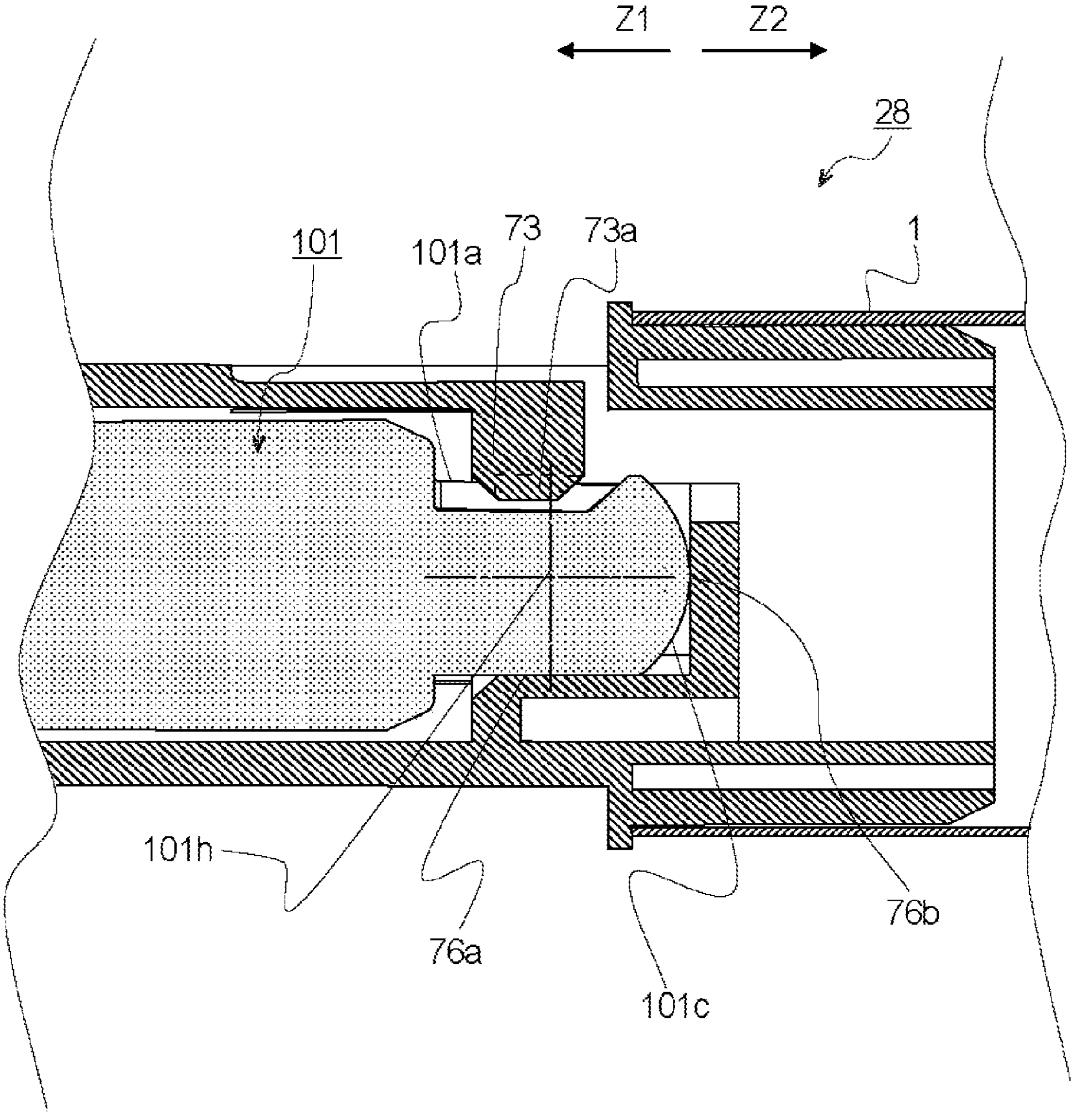
FIG. 15 is a cross-sectional view of the coupling member 28 and the main assembly drive shaft 101 taken along a plane including the rotation center line (rotation axis).

FIG. 15 is a longitudinal sectional view of the coupling member 28 and the main assembly driving shaft 101 taken along the rotation axis.

As shown in FIGS. 10 and 12, the coupling member 28 includes a mounting portion 72, a cylindrical portion 71, a flange portion 75, an engaging portion 73, a base portion 74, and an aligning portion 76. The mounting portion 72 is a portion to be mounted to the photosensitive drum 1. The cylindrical portion 71 has a substantially cylindrical configuration. The cylindrical portion 71 has a borne portion 71*c* as described hereinbefore, and the borne portion 71*c* is rotatably supported by a bearing portion provided in the drum unit bearing member 39R.

The engaging portion 73 projects at least radially inwardly of the coupling member 28 in order to engage with the main assembly driving shaft 101. The engaging portion 73 has a driving force receiving surface 73*a*. The driving force receiving surface 73*a* is a driving force receiving portion for receiving the driving force from the main assembly driving shaft 101 by contacting with the driving groove.

The base portion (deforming portion, extending portion) 74 is formed by cut-away portions 71*d* provided in the cylindrical portion 71 of the coupling member 28. The cut-away portion 71*d* is angular U-shaped. The base portion 74 is deformable with the root portion 74*a* of the base portion 74 as a fulcrum point, and movably supports the engaging portion 73. The engaging portion 73 is movable at least in the radial direction of the coupling member.

That is, the driving force receiving surface (driving force receiving portion) 73*a* is supported by the base portion (supporting portion base portion) 74 and the engaging portion (projecting portion) 73. The base portion 74 and the engaging portion 73 are support portions for supporting the driving force receiving surface 73*a*. In this embodiment, the support portion extends substantially parallel with the axial direction of the coupling member 28.

As shown in FIG. 10, the mounting portion 72 includes a press-fit portion 72*d* press-fitted to the inner diameter of the cylinder of the photosensitive drum 1, a clamp groove 72*e*, a press-fit guide portion 72*f* provided in the rear side (with respect to Z2 direction side) of the press-fit portion 72*d*.

The press-fitting portion 72*d* as a joining portion is a portion for fixing the coupling member 28 to the photosensitive drum 1 by being pressed into the photosensitive drum 1. Specifically, the inner diameter of the cylinder of the photosensitive drum 1 and the outer diameter of the press-fit portion 72*d* are dimensioned so as to establish a press-fitting relation. The structure is not limited to the above-described structure in which the fastening force by clamping is enhanced or when the cylinder inner diameter and the press-fitting portion 72*d* are fixed by adhesion.

As shown in FIG. 10, the clamp groove 72*e* has a groove shape (a recessed portion) provided on the photosensitive drum 1 side of the press-fit portion 72*d* with respect to the Z axis direction. The clamp grooves 72*e* are provided at equally distant two positions around the rotation axis of the coupling member 28. In the rotation axis direction of the drum unit 30 (the rotation axis direction of the coupling member 28), the clamp groove 72*e* and the flange portion 75 are disposed so as to overlap with each other.

The axial line (rotation axis, rotation center line) Ax of the drum unit is an imaginary straight line extending passing through the rotation center of the drum unit 30. The axis of the photosensitive drum 1 and the axis of the coupling member 28 are disposed so as to substantially overlap with each other, and these axes are substantially aligned with the axis Ax of the drum unit 30. Therefore, unless otherwise noted, each axis is used interchangeably in the following description.

Also, the axial direction (rotation axis direction) is the direction in which the axis extends. The axial direction of the drum unit 30 and the axial direction of the coupling member 28 have the same meaning as the longitudinal direction (Z direction) of the drum unit 30.

Further, "X and Y overlap in the direction A" means that when X and Y are projected on a straight line extending in parallel to the direction A, at least a part of the projection area of X overlaps with at least a part of the projection area of Y.

That is, when the clamp groove 72*e* and the flange portion 75 are projected onto the rotation axis Ax of the drum unit 30 (coupling member 28), the projection area of the clamp groove 72*e* and the projection area of the flange portion 75 are at least partly overlap with each other.

In the case of projecting something on a line, the projecting direction is perpendicular to the line unless otherwise stated. For example, "projecting A on the axis" means "projecting A in a direction perpendicular to the axis with respect to the axis". By clamping a part of the end of the photosensitive member 1 at the side of the coupling member 28, the photosensitive drum 1 is plastically deformed. As a result, a part of the photosensitive member enters the inside of the clamp groove 72*e* to firmly fixe the photosensitive drum 1 and the coupling member 28 with each other. Clamping refers to an operation of joining parts by plastic deformation.

In this embodiment, it is connecting to the coupling member 28 by plastically deforming a part of the cylinder (aluminum) of the photosensitive drum 1. In this embodiment, the clamp groove 72*e* is used as a example of means for securedly fixing the coupling member 28 to the photosensitive drum 1, but it is also possible to fix the coupling member 28 by adhesion between the cylinder inner diameter portion and the press-fit portion 72*d* or another fixing means can be used. Therefore, the clamp groove 72*e* is not an inevitable structure.

The press-fit guide portion 72*f* has such a shape as to make it easier to mount the coupling member 28 to the photosensitive drum 1 and to stably press-fit the press-fit portion 72*d* into the photosensitive drum 1 at the time when the coupling member 28 is assembled to the photosensitive drum 1. Specifically, the outer diameter of the press-fit guide portion 72*f* is smaller than the outer diameter of the press-fit portion 72*d* and the cylinder inner diameter of the photosensitive drum 1, and has a guide taper 72*g* on the free end side in the mounting direction to the photosensitive drum 1. The guide taper 72*g* is an inclined portion provided on the coupling member 28 in order to facilitate the insertion of the coupling member 28 into the inside of the photosensitive drum 1.

As described above, the cylindrical portion 71 has a borne portion 71*c* on the free end side (the Z1 direction side) of the outer peripheral surface 71*a* (as shown in FIG. 4, 10). In addition, a cut-away portion 71*d* is provided on the press-fitting portion 72*e* side of the borne portion 71*c* of the cylindrical portion 71. The cut-away portion 71*d* forms a base portion 74 that elastically deformably supports the engagement portion 73 (the details of the engagement portion 73 will be described hereinafter). That is, in the Z direction, the cut-away portion 71*d*, the engaging portion 73 and the base portion 74 are provided between the borne portion 71*c* and the press-fitting portion 72*e*.

In other words, the coupling member 28 has the cut-away portion 71*d*, the engaging portion 73, and the borne portion 71*c* having a outer shape of the cylinder on the Z1 direction side (outside in the axial direction) from the base portion 74. By using such a shape, the engaging portion 73 and the base portion 74 are not exposed at the outer surface of the cartridge 7. Therefore, the engaging portion 73 and the base portion 74 can be protected by the drum unit bearing member 39R and the borne portion 71*c*.

This can prevent the user from unintentionally touching the engaging portion 73 and the base portion 74, and suppress something directly touching the engaging portion 73 and the base portion 74 when the cartridge 7 falls down.

Further, as shown in FIG. 12, the inner peripheral surface 71*b* of the cylindrical portion 71 has a tapered shape at the front free end (Z1 direction). The tapered shape is an inclined portion (inclined surface) for guiding the main assembly driving shaft 101 being inserted into the cylindrical portion 71.

When the main assembly driving shaft 101 is inserted into the cylindrical portion 71, the inner peripheral surface 71*b* of the cylindrical portion 71 guides the main assembly driving shaft 101. The inner peripheral surface 71*b* of the cylindrical portion 71 is a cartridge side guide portion for guiding the main assembly driving shaft 101 and has a circumferential shape.

When the cartridge 7 is inserted into the image forming apparatus main assembly 100A, the main assembly driving shaft 101 is guided so as to follow the coupling member 28 to reduce the axial deviation between the rotation center of the cylindrical portion 71 and the rotation center of the shaft portion 101*f*. Further, as shown in FIG. 7, the inner diameter D2 of the inner peripheral surface 71*b* is larger than the outer diameter D6 of the shaft portion 101*f* of the main assembly driving shaft 101. Therefore, after the mounting of the cartridge 7 to the image forming apparatus main assembly 100A is completed, the inner peripheral surface 71*b* does not contact with the rough guide portion 101*g*.

As shown in FIG. 13, the flange portion 75 has a shape protruding outward from the press-fit portion 72*d* in the radial direction. When the coupling member 28 is assembled to the photosensitive drum 1, the end surface of the photosensitive drum 1 abuts to the end surface 75*b* of the flange portion 75, thereby determining the positions of the photosensitive drum 1 and the coupling member 28 in the Z direction.

As shown in FIG. 11, the engaging portions 73 are arranged at three positions at regular intervals in the circumferential direction of the coupling member 28 (120 degrees interval, substantially equally spaced). Similarly, the base portion 74 and the cut-away portion 71*d* are also arranged at three positions at regular intervals in the circumferential direction of the cylindrical portion 71. The base portion 74 is provided by cut-away portions 71*d*. The base portion 74 has a fixed end in the cylindrical portion 71 and is elastically deformable with the fixed end as a fulcrum.

The base portion 74 is a portion (extending portion, extending portion) extending along the axial direction of the coupling member 28 (the axial direction of the photosensitive drum unit 30). That is, the base portion 74 extends at least outwardly in the axial direction.

An engaging portion 73 is provided at the tip (free end) of the base portion 74. The engaging portion 73 is a projecting portion (protruding portion, protrusion) projected toward the inner side in the radial direction of the coupling member 28 (the inner side in the radial direction of the photosensitive drum unit 30). That is, the engaging portion 73 is a projecting portion (protrusion, protrusion) projecting in a direction crossing with the direction in which the base portion 74 extends.

The shape of the cross section of the engaging portion 73 is not circular (non-circular shape), more preferably it has a corner. This is because then the engaging portion 73 reliably engages with the driving transmission groove 101*a* formed in the main assembly driving shaft 101.

That is, when the supporting portion (the engaging portion 73) is cut perpendicularly to the axis Ax of the coupling member at the position where the drive receiving portion 73*a* is provided, the shape of the cross-section is non-circular.

The engaging portion 73 is supported by an elastically deformable base portion 74 and can move in the radial direction of the coupling member 28 by deformation of the base portion 74. In other words, the base portion 74 is also a deforming portion (elastic deforming portion, flexible portion) which is deformed when it is subjected to a external force and provides a restoring force in a direction returning to a position in the free state.

Specifically, when the engaging portion 73 contacts the outer peripheral surface of the main assembly driving shaft 101, the engaging portion 73 is elastically deformed so that the engaging portion 73 moves outwardly in the radial direction along the outer peripheral surface of the main assembly driving shaft 101. Thereafter, when the engagement portion 73 is at the same position (same phase) as the main assembly side drive transmission groove 101*a* provided on the outer peripheral surface of the main assembly driving shaft 101, the elastic deformation of the engagement portion 73 is eliminated. Then, the engaging portion 73 moves inwardly in the radial direction, so that a part of the engaging portion 73 can enter the main assembly drive transmission groove 101*a*.

from the stand point of the driving stability, it is preferable to dispose a plurality of the engaging portions 73 in the circumferential direction of the cylinder.

The driving force receiving surface 73*a* of the coupling member 28 has a shape twisted about the axis of the coupling member 28, and in this embodiment, the amount of twisting is set to be the same as that of the main assembly drive transmission surface 101*b*.

it will suffice if the driving force receiving surface 73*a* has a different phase, in the rotational direction, of two points in contact with the driving shaft 101. That is, the driving force receiving surface 73*a* may not necessarily have a twisted shape if it has the same function as the twisted surface.

For example, it will suffice if the shape is such that outer side (downstream side in Z1 direction) of the driving force receiving surface 73*a* is in the upstream side of the inner side (downstream side in Z2 direction) with respect to the peripheral moving direction of the rotation of the photosensitive drum 1. In other words, a straight line connecting the cylinder inner end portion and the cylinder outer end portion along the cylinder axis direction of the engagement portion 73 crosses with the rotation axis of the cylinder. The driving force receiving surface 73*a* is an inclined portion inclined with respect to the axis of the coupling member 28.

By employing the twisted one in claim shape of the driving force receiving surface 73*a* in this manner, the photosensitive drum unit 30 receives the force in the direction of attracting toward the borne portion 101*d* of the main assembly driving shaft 101 when the driving force receiving surface 73*a* receives the driving force.

Here, in FIG. 8, the engaging portion 73 can retract and move outwardly in the radial direction of the coupling member 28 (radial direction of the photosensitive drum unit 30). The driving force receiving surface 73*a* provided in the engaging portion 73 is inclined with respect to the moving direction of the engaging portion 73. In the cross-sectional view shown in FIG. 8, a straight line B1 is a straight line along the direction in which the engaging portion 73 moves in the retraction (the direction in which it moves in the radial direction). The straight line B2 is a straight line along the driving force receiving surface 73*a*. It is understood that the straight line B1 and the straight line B2 crosses with each other. By this, the driving force receiving surface 73*a* bites into the driving transmission groove 101*a* in a state that the driving force receiving surface 73*a* is in contact with the driving transmission groove 101*a*, so that the engaging portion 73 does not easily retreat from the driving transmission groove 101*a*. That is, the engagement state between the engagement portion 73 and the drive transmission groove 101*a* is stabilized.

Particularly, the driving force receiving surface 73*a* is inclined relative to the moving direction of the engaging portion 73 (line B1) such that the inner diameter side (free end side) is upstream of the outer diameter side (root side) with respect to the rotational direction of the coupling member 28. Therefore, when the coupling member 28 (photosensitive drum unit 30) rotates, the force received from the driving force receiving surface 73 is in a direction to engage the engaging portion 73 with the main assembly driving transmission groove 101*a*. The state of engagement between the engaging portion 73 and the main assembly drive transmission groove 101*a* is stabilized and the disengagement between the engagement portion 73 and the main assembly drive transmission groove 101*a* is suppressed.

As shown in FIG. 13, the engaging portion 73 has a insertion tapered surface 73*d* on the outer side (the Z1 direction side) of the photosensitive drum unit 30 in the Z direction. The insertion tapered surface 73*d* is an inclined portion facing outwardly in the axial direction. When the coupling member 28 is coupled with the main driving shaft 101, the insertion tapered surface 73*d* rides on the main driving shaft 101, so that the engagement portion 73 retracts to the outside in the radial direction. The insertion tapered surface 73*d* is an at-mounting force receiving portion for receiving a force for retracting in the radial direction 73 when the cartridge is mounted.

Further, the engaging portion 73 has a dismounting tapered surface 73*e* as an at-dismounting force receiving portion on the inner side (the Z2 direction side) of the photosensitive drum unit 30 in the Z direction. The dismounting tapered surface 73*e* is an inclined portion facing inwardly in the axial direction. The dismounting tapered surface 73*e* rides on the main assembly driving shaft 101 when the cartridge is dismounted, that is, when disconnecting the coupling member 28 from the main assembly driving shaft 101. When the dismounting tapered surface 73*e* receives a force from the main assembly driving shaft, the engagement portion 73 moves radially inwardly to disengage from the main assembly driving shaft.

With these structures, it is possible to improve the mounting and dismounting properties of the coupling member 28 to the main driving shaft 101. Both of the two tapered surfaces are inclined parts inclined with respect to the axial direction.

When the cartridges mounted, the inserted taper surface 73*d* and the semispherical 101*c* abuts to each other to move the engagement portion 73 outwardly in the radial direction of the driving shaft. In addition, at the time of dismounting of the cartridge, the dismounting tapered surface 73*e* and the main assembly side dismounting taper 101*i* are brought into contact to each other to move the engagement portion 73 (driving force receiving surface 73*a*) toward the outside in the radial direction of the main assembly driving shaft 101. When the driving force receiving portion 73*a* of the coupling member 28 is connected to or disconnected from the main assembly driving shaft 101, the driving force receiving portion 73*a* receives a force from the main assembly driving shaft 101, so that the driving force receiving portion 73*a* of the coupling member 28 is moved radially outwardly.

Further, the engaging portion 73 is placed so that the length L2 of the driving force receiving surface 73 with respect to the distance L1 from the front end surface of the cylindrical portion 71 to the front end surface of the engaging portion 73 in the Z direction satisfies L1>L2.

The aligning portion 76 has a radial direction positioning portion 76*a*. The radial direction positioning portion 76*a* is a portion for determining the position of the main assembly driving shaft 101 in the radial direction. In other words, the radial direction positioning portion 76*a* is a portion for determining the radial direction position of the coupling member 28 with respect to the main assembly driving shaft 101. That is, the radial direction positioning portion 76*a* is a positioning portion for determining the relative positional relationship between the main assembly driving shaft 101 and the coupling member.

The radial direction positioning portion 76*a* has a arcuate curved surface, and this curved surface contacts with the outer peripheral surface of the main assembly driving shaft 101, to limit the movement of the main assembly driving shaft 101 in the radial direction. That is, the radial direction positioning portion 76*a* has a curved surface which faces the axis line side of the coupling member 28 along the circumferential direction (rotational direction) of the coupling member 28. The radial direction positioning portion 76*a* is disposed axially inward of the inner circumferential surface 71*b* (FIG. 12), and the inner diameter of the radial direction positioning portion 76*a* is smaller than the inner circumferential surface 71*b*. The inner peripheral surface 71*b* is a first inner diameter portion having a relatively large diameter and the radial direction positioning portion 76*a* is a second inner diameter portion having a relatively small diameter.

As shown in FIG. 14, the radial direction positioning portion 76*a* is disposed at a position away from the engaging portion 73 as viewed along the axial direction of the coupling member 28. Further, the radial direction positioning portion 76*a* is disposed outside the free end of the engagement portion 73 (the free end of the driving force receiving surface 73*a*) in the radial direction of the coupling member 28, and is disposed inside of the fixed end (base portion) of the base portion 74.

On the other hand, in the Z direction, the radial direction positioning portion 76*a* is disposed at a position overlapping with the engaging portion 73 (FIG. 15). That is, when the radial direction positioning portion 76*a* and the engaging portion 73 are projected perpendicularly to the axis of the coupling member 28, at least parts of the projected areas of them overlaps with each other on the axis.

With such a arrangement relationship, even if the main assembly driving shaft 101 is inclined with the radial direction positioning portion 76*a* as a fulcrum, the relative position between the main assembly driving shaft 101 and the engagement portion 73 is unlikely to change, and therefore, the engagement between the main assembly driving shaft 101 and the engaging portion 73 are not influenced.

The inner diameter D7 of the radial direction positioning portion 76*a* is substantially the same as the outer diameter D5 of the shaft portion 101*f* of the main assembly driving shaft 101. As described above, the engaging portions 73 are arranged at three positions (120 degrees interval, substantially equally spaced) at regular intervals in the circumferential direction of the coupling member 28. Correspondingly, three radial positioning portions 76*a* are similarly arranged at regular intervals in the circumferential direction of the coupling member 28. As a result, the radial direction positioning portion 76*a* can position the coupling 28 in the radial direction relative to the shaft portion 101*f* at three positions.

In addition, the aligning portion 76 has an abutment portion 76*b*. As shown in FIG. 15, when the driving force is transmitted from the main assembly driving shaft 101 to the coupling member 28, the abutment portion 76*b* is brought into contact with the semispherical shape 101*c*. The semispherical shape 101*c* is a substantially semispherical portion provided at the tip of the main assembly driving shaft 101.

Further, in the Z direction, the abutment portion 76*b* is disposed in the coupling member 28 such that the center 101*h* of the semispherical shape 101*c* of the main assembly driving shaft 101 is within the range of the driving force receiving surface 73*a*, in a state where the abutment portion 76*b* and the semispherical shape 101*c* are in contact.

In this embodiment, the coupling member 28 is an integral member. However, for example, the coupling member 28 may comprise two members by making the aligning portion 76 unintegral with other portions. The coupling member 28 may be constituted by combining three or more separate members by constituting the other portion by a plurality of members.

[Mounting of Cartridge to Main Assembly of Image Forming Apparatus]

Figure 16:
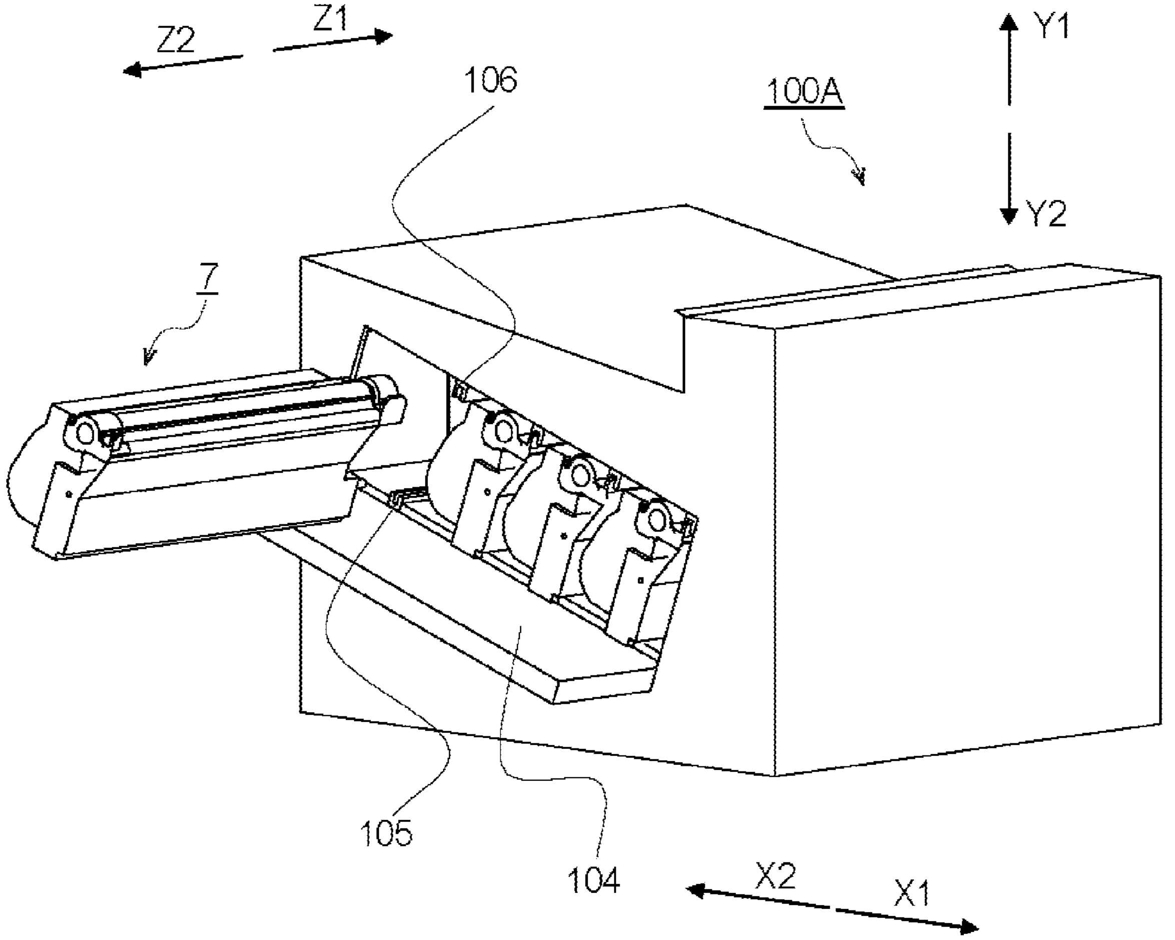
FIG. 16 is a perspective view illustrating mounting of the cartridge 7 to the image forming apparatus main assembly 100A.
Figure 17:
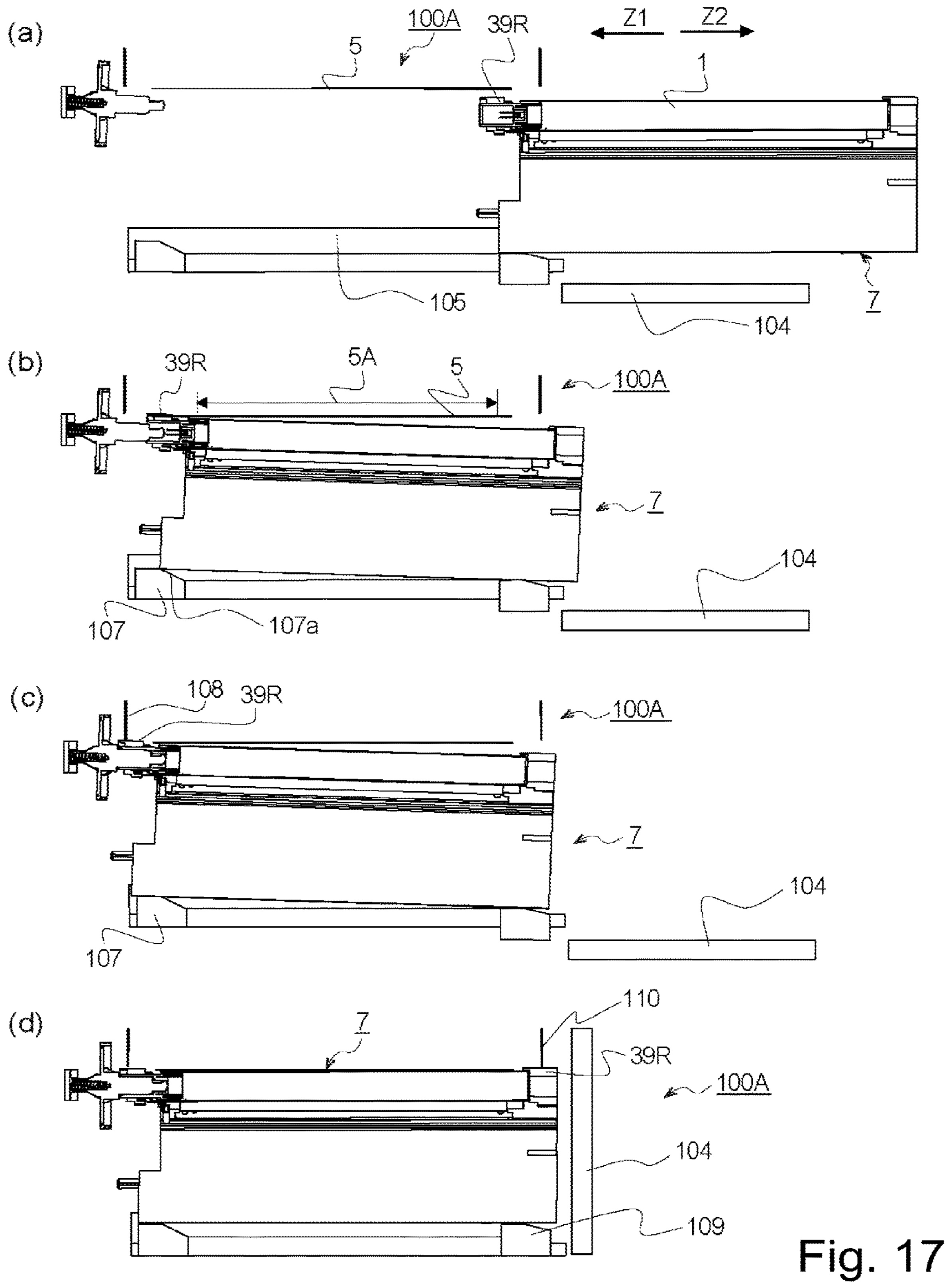
FIG. 17 is cross-sectional views illustrating the mounting operation of the cartridge 7 to the image forming apparatus main assembly 100A.

With reference to FIGS. 16 and 17, mounting and dismounting of the process cartridge 7 relative to the image forming apparatus main assembly will be described.

FIG. 16 is a perspective view illustrating the mounting of the cartridge 7 to the image forming apparatus main assembly 100A.

FIG. 17 is cross-sectional views illustrating the mounting operation of the cartridge 7 to the image forming apparatus main assembly 100A.

The image forming apparatus main assembly 100A of this embodiment employs a structure capable of mounting the cartridge in a substantially horizontal direction. Specifically, the image forming apparatus main assembly 100A has an inside space in which a cartridge can be mounted. The image forming apparatus main assembly has a cartridge door 104 (front door) for inserting the cartridge into the space, at the front side of the main assembly 100A (the side near the user standing in use).

As shown in FIG. 16, the cartridge door 104 of the image forming apparatus main assembly 100A is provided so as to be opened and closed. When the cartridge door 104 is opened, the lower cartridge guide rail 105 for guiding the cartridge 7 is provided on the bottom surface defining the space, and the upper cartridge guide rail 106 is provided on the upper surface. The cartridge 7 is guided to the mounting position by the upper and lower guide rails (105, 106) provided above and below the space. The cartridge 7 is inserted into the mounting position substantially along the axis of the photosensitive drum unit 30.

The mounting and dismounting operations of the cartridge to the image forming apparatus main assembly 100A will be described below Referring to FIG. 17.

As shown in part (a) of FIG. 17, the drum unit bearing member 39R or the photosensitive drum 1 does not contact the intermediary transfer belt 5 at the start of insertion of the cartridge 7. In other words, the size relationship is such that the photosensitive drum 1 and the intermediary transfer belt 5 do not contact with each other in a state in which the end portion on the rear side with respect to the inserting direction of the cartridge 7 is supported by the lower cartridge guide rail 105.

As shown in part (b) of FIG. 17, the image forming apparatus main assembly 100A includes a rear side lower cartridge guide 107 projecting upward with respect to the direction of gravity from the lower cartridge guide rail 105 toward the rear side in the inserting direction of the lower cartridge guide rail 105. The rear cartridge lower guide 107 is provided with a tapered surface 107*a* on the front side with respect to the inserting direction of the cartridge 7. Along with the insertion, the cartridge 7 rides on the tapered surface 107*a* and is guided to the mounting position.

The position and the shape of the rear cartridge lower guide 107 may be any if a part of the cartridge does not rub the image forming area 5A of the intermediary transfer belt 5 when the cartridge is inserted into the apparatus main assembly 100A. Here, the image forming area 5A is a region where a toner image to be transferred onto the recording material 12 is carried on the intermediary transfer belt 5. Further, in this embodiment, of parts of the cartridges in the mounting attitude, the unit bearing member 39R provided on the rear side with respect to the inserting direction of the cartridge 7 most protrudes upward with respect to the direction of gravity. Therefore, it will suffice if the arrangement and the shape of each element are appropriately selected so that the trace (hereinafter referred to as insertion trace) of the end of the drum unit bearing member 39R farthest in the inserting direction at the time of the insertion Of the cartridge does not interfere with the image forming area 5A.

Thereafter, as shown in part (c) of FIG. 17, the cartridge 7 is further inserted to the rear side of the image forming apparatus main assembly 100A from the state in which it is on the rear side cartridge lower guide 107. Then, the drum unit bearing member 39R abuts to the rear cartridge positioning portion 108 provided in the image forming apparatus main assembly 100A. At this time, the cartridge 7 (the photosensitive drum unit 30) is inclined by about 0.5 to 2 degrees relative to the state in which the cartridge 7 (photosensitive drum unit 30) is completely mounted in the image forming apparatus main assembly 100A (part (d) of FIG. 17). That is, in the inserting direction of the cartridge 7, the downstream side of the cartridge 7 (photosensitive drum unit 30) is at an upper level than the upstream side.

Part (d) of FIG. 17 is an illustration of the state of the apparatus main assembly and the cartridge when the cartridge door 104 is closed. The image forming apparatus 100A has a near side cartridge lower guide 109 on the front side, with respect to the inserting direction, of the lower cartridge guide rail 105. The front side cartridge lower guide 109 is configured to move up and down in interrelation with the opening and closing of the cartridge door (front door) 104.

When the cartridge door 104 is closed by the user, the front side cartridge lower guide 109 is raised. Then, the drum unit bearing member 39L and the near side cartridge positioning portion 110 of the image forming apparatus main assembly 100A are brought into contact to each other, so that the cartridge 7 is positioned relative to the image forming apparatus main assembly 100A.

With the above-described operation, the mounting of the cartridge 7 to the image forming apparatus main assembly 100A is completed.

In addition, dismounting of the cartridge 7 from the image forming apparatus main assembly 100A is performed in the reverse order of the above-described inserting operation.

Because the oblique mounting structure is employed as described above, it is possible to suppress the rubbing between the photosensitive drum and the intermediary transfer belt when the cartridge 7 is mounted on the apparatus main assembly 100A. For this reason, it is possible to suppress the occurrence of minute scratches (scratches) on the surface of the photosensitive drum or the surface of the intermediary transfer belt.

Further, the structure of this embodiment can simplify the structure of the image forming apparatus main assembly 100A as compared with the structure in which the entire cartridge is lifted up after the cartridge is horizontally moved and mounted to the apparatus main assembly.

[Engaging Process of Coupling Member with Main Drive Shaft]

Figure 18:
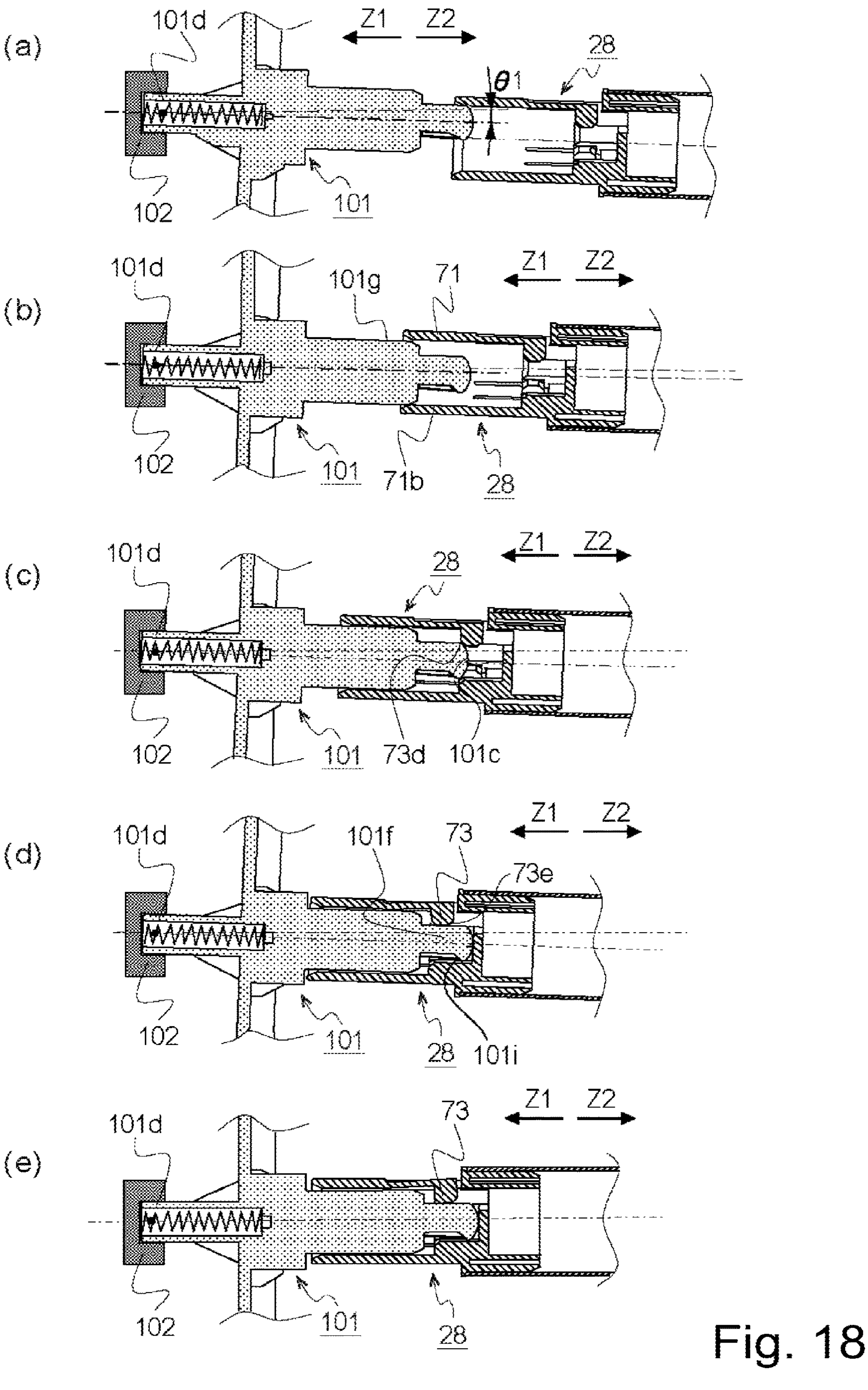
FIG. 18 is a sectional view illustrating the operation of mounting the coupling member 28 on the main assembly driving shaft 101.
Figure 19:
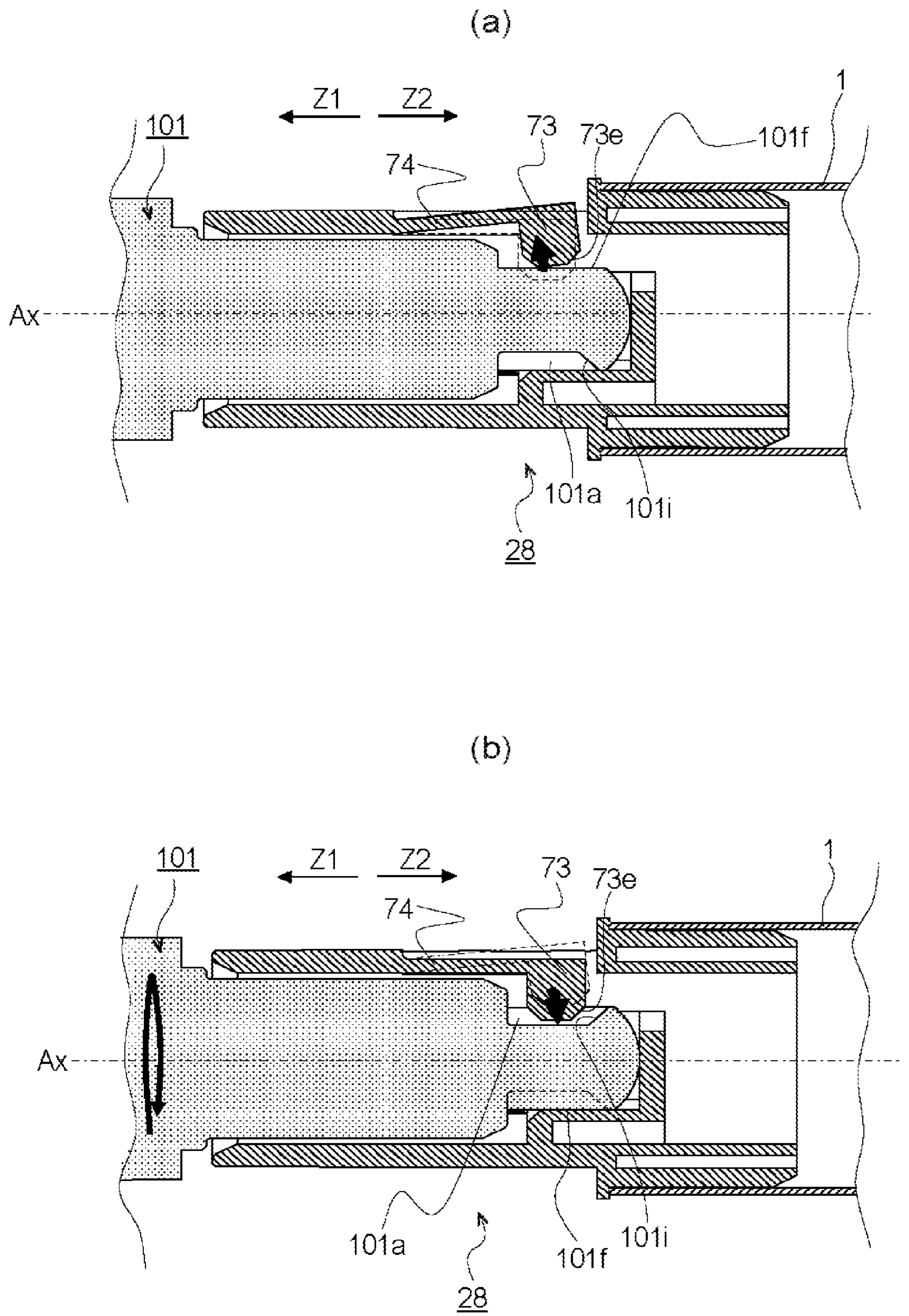
FIG. 19 shows the operation of mounting the coupling member 28 to the main assembly driving shaft 101 when the main assembly driving shaft 101 rotates from the state in which the phases of the main assembly driving transmission groove 101*a* and the engaging portion 73*a* are not aligned with each other to the state in which the phases are aligned with each other.

Referring to FIGS. 18 and 19, the engagement process of the coupling member 28 and the main assembly driving shaft 101 will be described in detail.

FIG. 18 is a cross-sectional view illustrating a mounting operation of the coupling member 28 to the main assembly driving shaft 101.

FIG. 19 is sectional views illustrating the mounting operation of the coupling member 28 to the main assembly driving shaft 101 when the main assembly driving shaft 101 rotates from a state in which the phases of the main assembly drive transmission groove 101*a* and the engagement portion 73 (the drive force receiving surface 73*a*) are not aligned, to the state in which the phases are aligned.

Part (a) of FIG. 18 is an illustration of a state in which the coupling member 28 has started engaging with the main driving shaft 101. Part (e) of FIG. 18 illustrates a state in which the cartridge 7 is mounted to the image forming apparatus main assembly 100A. In particular, part (e) of FIG. 18 shows a state in which the front side lower cartridge guide 109 is raised as the cartridge door 104 is closed, and the cartridge 7 is positioned with respect to the image forming apparatus main assembly 100A.

part (b) of FIGS. 18 to 18 (*d*) are illustrations of a process of connecting the coupling member 28 to the main assembly driving shaft 101 between part (a) of FIG. 18 and part (e) of FIG. 18. The main assembly driving shaft 101 hangs downward in the direction of gravity by a very small angle due to its own weight.

FIG. 19 is an illustration of a state in which the phases of the main assembly drive transmission groove 101*a* and the engagement portion 73 (driving force receiving surface 73*a*) are not aligned.

As has been described with reference to part (b) of FIG. 17, the cartridge 7 rides on the rear lower cartridge guide 107. That is, the cartridge 7 is in a state of being inclined by about 0.5 to 2 degrees while gradually increasing the inclination until reaching the state of part (a) of FIG. 17 to part (b) of FIG. 17. Then, the cartridge 7 rides on the rear lower cartridge guide 107.

Similarly, as shown in part (a) of FIG. 18, the coupling member 28 is inserted into the main assembly driving shaft 101 in a state inclined by about 0.5 to 2 degrees as compared with the state when the cartridge 7 is positioned relative to the image forming apparatus main assembly 100A (as shown in part (e) of FIG. 18).

As shown in FIG. 6, the main assembly driving shaft 101 is cantilevered at the borne portion 101*d*. Further, the gear portion 101*e* is in meshing engagement with a gear (not shown) for transmitting the drive to the gear portion 101*e*. Part (a) of FIG. 18 in an illustration of the state in which the main assembly driving shaft 101 does not abut to the coupling member 28. In this state, the bearing 7 it is slanted by θ1 degree in the direction determined by its own weight and the meshing direction about the borne portion 101*d*, as compared with the state in which the cartridge 7 is positioned relative to the image forming apparatus main assembly 100A (shown in part (e) of FIG. 18).

As shown in part (b) of FIG. 18, the tip of the inner peripheral surface 71*b* of the cylindrical portion 71 of the coupling member 28 first abuts against the rough guide portion 101*g* of the main assembly driving shaft 101. As shown in the Figure, the main assembly driving shaft 101 is configured to be cantilevered at a borne portion 101*d*. Therefore, the rough guide portion 101*g* of the main assembly driving shaft 101 is inserted in a state in which it is fitted to the inner peripheral surface 71*b* of the coupling member 28. As described above, in the Z direction, the engaging portion 73 is provided such that a length L1 from the front end surface of the cylindrical portion 71 to the front end surface of the engaging portion 73, and the length L2 of the driving force receiving surface 73 satisfy L1>L2 (as shown in FIG. 13). Therefore, before the semispherical shape 101*c* at the free end of the main assembly driving shaft 101 hits the engaging portion 73, the rough guide portion 101*g* of the main assembly driving shaft 101 follows the inner peripheral surface 71*b* of the coupling member 28. As a result, the main assembly driving shaft 101 is guided by the coupling member 28, so that the semispherical shape portion 101*c* at the free end of the main assembly driving shaft 101 is prevented from hitting an unintended portion of the engaging portion 73 or the base portion 74. This is effective to protect the engaging portion 73 and the indicating portion 74.

As shown in part (c) of FIG. 18, when the coupling member 28 is further inserted toward the back side of the main driving shaft 101, the insertion taper surface 73*d* of the engagement portion 73 and the main driving shaft 101 and the semispherical shape 101*c* abut to each other. Due to the inclined surface of the insertion tapered surface 73*d* and the spherical shape of the semispherical shape 101*c*, the main assembly driving shaft 101 is guided substantially to the center of the three engaging portions 73.

When the coupling member 28 is inserted further into the main assembly driving shaft 101, the base portion 74 elastically deforms radially outward so that the engaging portion 73 follows the semispherical shape 101*c*. As a result, as shown in part (a) of FIG. 19, the engaging portion 73 moves (retracts) to the outer diameter surface of the shaft portion 101*f* of the main assembly driving shaft 101. By this movement, as shown in part (d) of FIG. 18, the coupling member 28 is mounted to the main assembly driving shaft 101 until the dismounting tapered surface 73*e* of the engagement portion 73 comes deeper in the Z direction than the main assembly side dismounting taper 101*i* of the main assembly driving shaft 101.

Thereafter, as described above, the cartridge 7 is lifted so that the drum unit bearing member 39L of the cartridge 7 hits the front side cartridge positioning portion 110. By thus lifting the cartridge 7, the cartridge 7 is positioned relative to the image forming apparatus main assembly 100A (as shown in part (d) of FIG. 17). By this operation of the cartridge 7, as shown in part (e) of FIG. 18, the inclination of the coupling member 28 is eliminated.

When the main assembly driving shaft 101 rotates, as shown in part (b) of FIG. 19, the main assembly drive transmission groove 101*a* and the engagement portion 73 come to have the same phase. As a result, the elastic deformation of the base portion 74 is eliminated, a part of the engagement portion 73 enters the main assembly drive transmission groove 101*a*, and the coupling member 28 and the main assembly driving shaft 101 are engaged with each other.

When the phases of the main assembly drive transmission groove 101*a* and the engagement portion 73 are aligned, the elastic deformation of the base portion 74 is released at the stage of part (d) of FIG. 17, and the state becomes as shown in part (b) of FIG. 19, so that the main assembly driving shaft 101 can transmit the driving force to the cartridge 7 via the coupling member 28.

As described above, as the cartridge 7 is mounted in the apparatus main assembly 100A, the main assembly drive transmission groove 101*a* and the engagement portion 73 can be engaged with each other. Therefore, there is no need to move the main assembly driving shaft 101 to engage with the coupling member 28. That is, there is no need to provide a mechanism for moving the main assembly driving shaft 101 so as to engage with the coupling member 28, in the apparatus main assembly 100A of the image forming apparatus. In the conventional structure, there is provided a mechanism for moving the main assembly driving shaft 101 so as to engage with the coupling member 28 after mounting the cartridge 7 to the image forming apparatus main assembly 100A. However, in this embodiment, such a mechanism can be omitted from the apparatus main assembly 100A.

When the cartridge 7 is mounted on the apparatus main assembly 100A, the engaging portion 73 of the coupling member 28 contacts with the main assembly driving shaft 101 to retreat radially outward. The engaging portion 73 is configured to engage with the groove (main assembly drive transmission groove 101*a*) of the main assembly driving shaft 101 by moving radially inward.

Here, it is also possible to provide a groove for receiving the drive on the coupling member, and a movable portion engageable with the groove by moving in the radial direction is provided on the main assembly driving shaft 101 side. However, as compared with the cartridge 7, the image forming apparatus main assembly 100A is required to have higher durability. It is preferable to provide the movable portion (the engaging portion 73) that moves in the radial direction on the side of the coupling member 28 of the cartridge 7 as in this embodiment, from the standpoint of the durability of the image forming apparatus main assembly 100A.

[Removal of Coupling Member from Main Driving Shaft]

Figure 20:
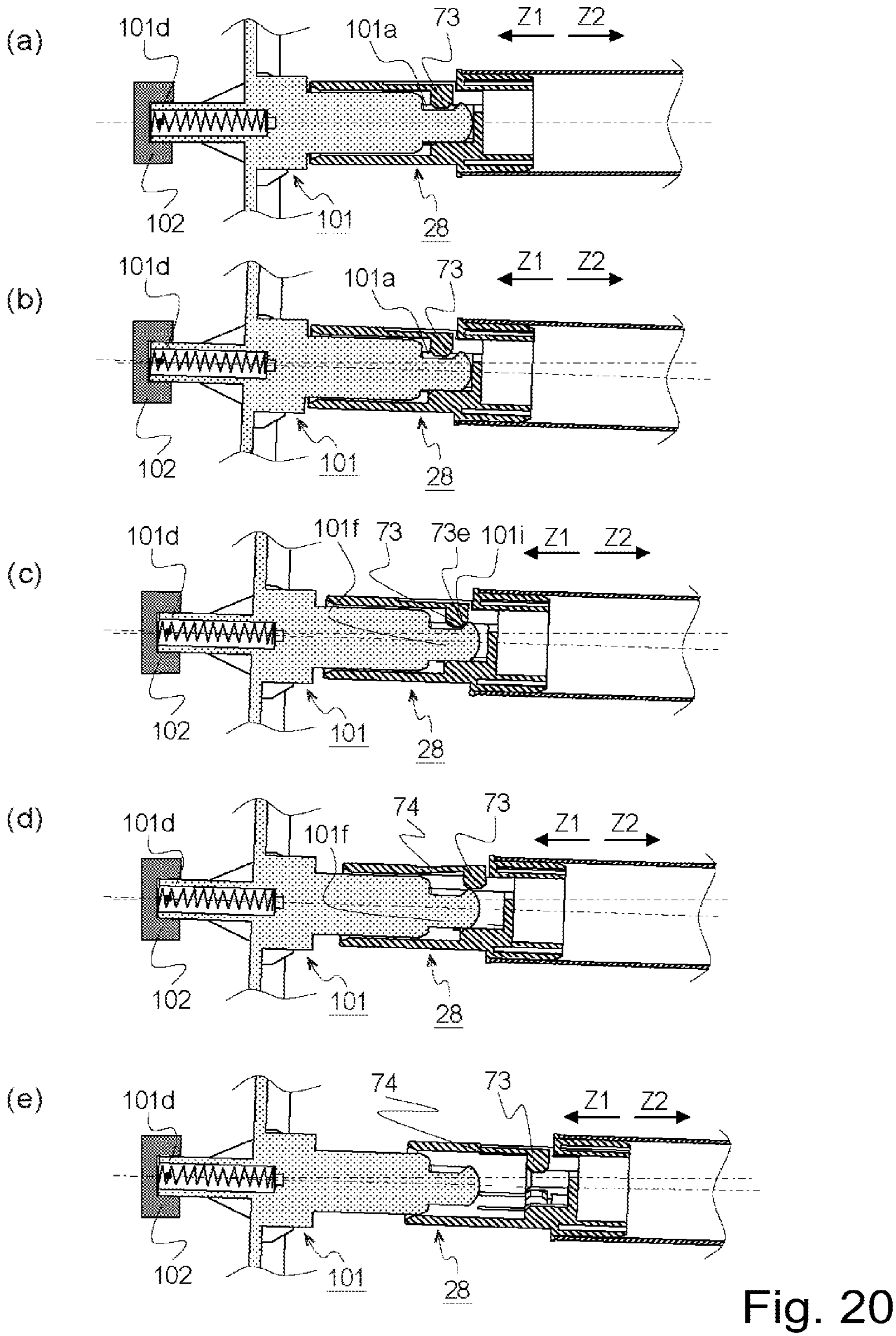
FIG. 20 is a cross-sectional view illustrating removal operation of the coupling member 28 from the main assembly driving shaft 101.

Referring to FIG. 20, the removal operation of the coupling member 28 from the main driving shaft 101 will be described.

FIG. 20 is a cross-sectional view illustrating the removal operation of the coupling member 28 from the main assembly driving shaft 101.

As shown in part (a) of FIG. 20, the drive force receiving surface 73*a* and the main assembly drive transmission surface 101*b* are in contact with each other at the time when the rotation drive of the main assembly driving shaft 101 is stopped. In this state, a part of the engagement portion 73 enters the main assembly drive transmission groove 101*a*.

When the cartridge door 104 is opened, the lower front side cartridge guide 109 lowers, and the drum unit bearing member 39L separates from the front side cartridge positioning portion 110 of the image forming apparatus main assembly 100A. At this time, as shown in part (b) of FIG. 20, the coupling member 28 and the main assembly driving shaft 101 are inclined by about 0.5 to 2 degrees with respect to the angle at the mounting complete state (Z direction).

When the cartridge 7 is started to be removed from the image forming apparatus main assembly 100A, as shown in part (c) of FIG. 20, the dismounting tapered surface 73*e* of the engaging portion 73 abuts to the main assembly side dismounting taper 101*i*. When the dismounting tapered surface 73*e* abuts to the main assembly side dismounting taper 101*i*, the base portion 74 begins to elastically deform and moves the engaging portion 73 outwardly in the radial direction along the main assembly side dismounting taper 101*i*.

Further, when the coupling member 28 is removed from the main assembly driving shaft 101, the state is the same as shown in part (a) of FIG. 19, and the base portion 74 is further elastically deformed and the engagement portion 73 is inserted into the shaft portion 101*f* of the main assembly driving shaft 101. By moving the engaging portion 73 to the outer diameter surface of the shaft portion 101*f*, the coupling member 28 can be removed from the main assembly driving shaft 101 as shown in part (d) of FIG. 20.

Further, when the coupling member 28 is removed from the main assembly driving shaft 101, as shown in part (e) of FIG. 20, the elastic deformation of the base portion 74 is released and the position of the engagement portion 73 returns to the position before the elastic deformation.

With the above-described operation, the coupling member 28 can be removed from the main assembly driving shaft 101.

Figure 21:
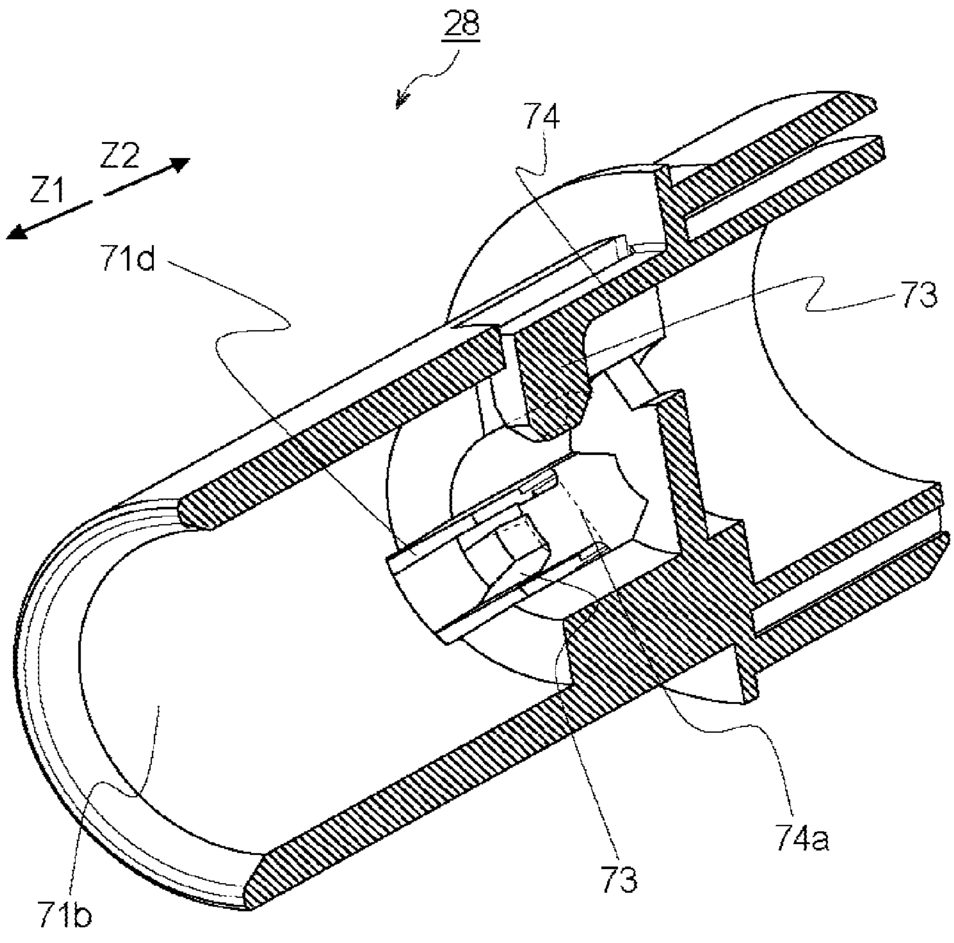
FIG. 21 is a cross-sectional perspective view of the coupling member 28 in another form according to Embodiment 1.

In this embodiment, as shown in FIG. 12, the base portion 74 and the U-shaped cut-away portion 71*d* are arranged on the Z1 direction downstream side of the engagement portion 73, but as shown in FIG. 21, the engagement portion 73 may be arranged in the Z1 direction downstream side of the base portion 74 and the U-shaped cut-away portion 71*d*. It may be selected appropriately depending on the arrangement of the main assembly driving shaft 101 and the coupling member 28 in the image forming apparatus main assembly 100A.

By using the coupling member 28 and the main assembly driving shaft 101 of this embodiment, it is possible to omit a mechanism for moving the main assembly driving shaft 101. In other words, in this embodiment, the coupling member 28 is provided at a position where the coupling member 28 is engageable with the main assembly driving shaft 101 when the cartridge 7 is mounted to the image forming apparatus main assembly 101A. Therefore, it is unnecessary to move the main assembly driving shaft 101 relative to the coupling member 28 so that the coupling member 28 and the main assembly driving shaft 101 can be brought into engagement with each other.

Further, by using the coupling member 28 of this embodiment, the engaging portion 73 and the base portion 74 are not exposed at the outer surface of the cartridge 7. By this, the engaging portion 73 and the base portion 74 can be protected.

In this embodiment, the entirety of the driving force receiving portion 73*a* and the supporting portion thereof (the engaging portion 73 and the base portion 74) is arranged inside the bearing portion of the drum unit bearing member 39R in the axial direction. However, if at least a part of the driving force receiving portion 73*a* and the supporting portion thereof (the engaging portion 73 and the base portion 74) is arranged inside the bearing portion of the bearing member 39R in the axial direction, the engaging portion 73 and the base portion 74 can be protected. In addition, even if the bearing portion is disposed so as to overlap with the driving force receiving portion 73*a* and the supporting portion thereof (the engaging portion 73 and the base portion 74) in the axial direction, the driving force receiving portion 73*a* and the supporting portion thereof are protected.

That is, when the bearing portion, the engaging portion 73, and the base portion 74 are projected onto the axis of the coupling member, the projection areas of the engaging portion 73.

The driving force receiving portion 73*a*, and the base portion 74 may overlap with the projection area of the bearing portion.

Embodiment 2

Referring to FIGS. 22, 23, 24, 25, 26, and 27, Embodiment 2 will be described.

Figure 22:
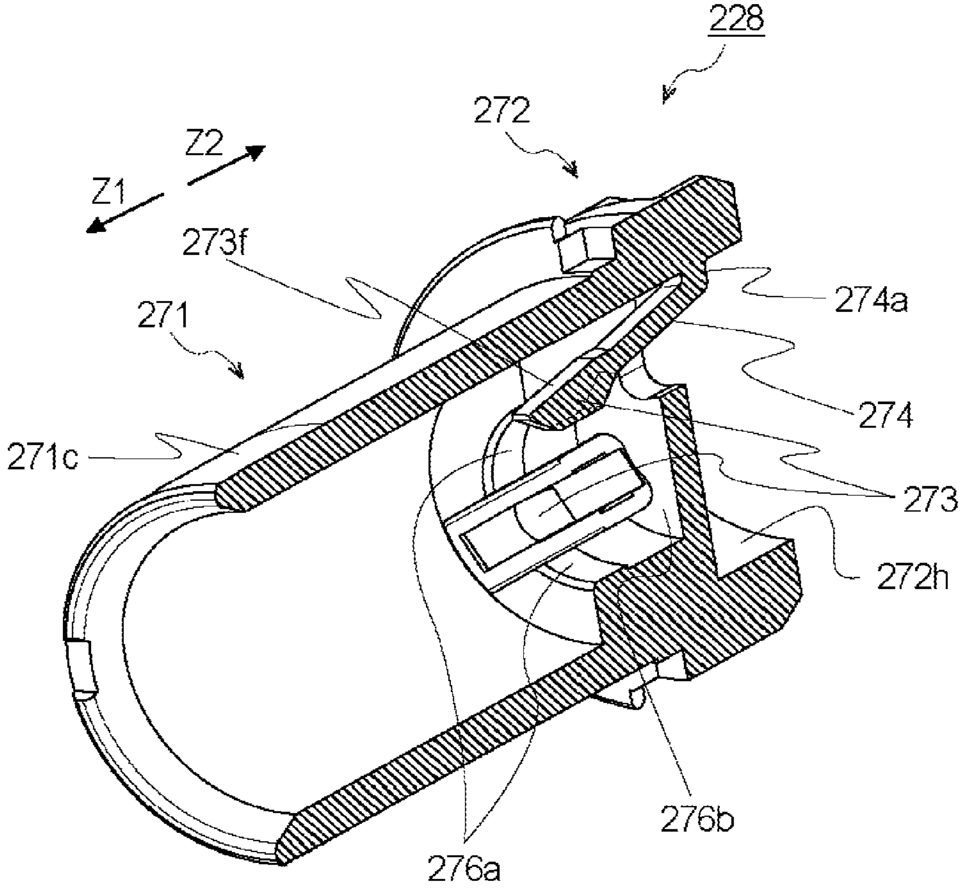
FIG. 22 is a cross-sectional perspective view of the coupling member 228 according to Embodiment 2.

FIG. 22 is a cross-sectional perspective view of the coupling member 228 according to Embodiment 2.

Figure 23:
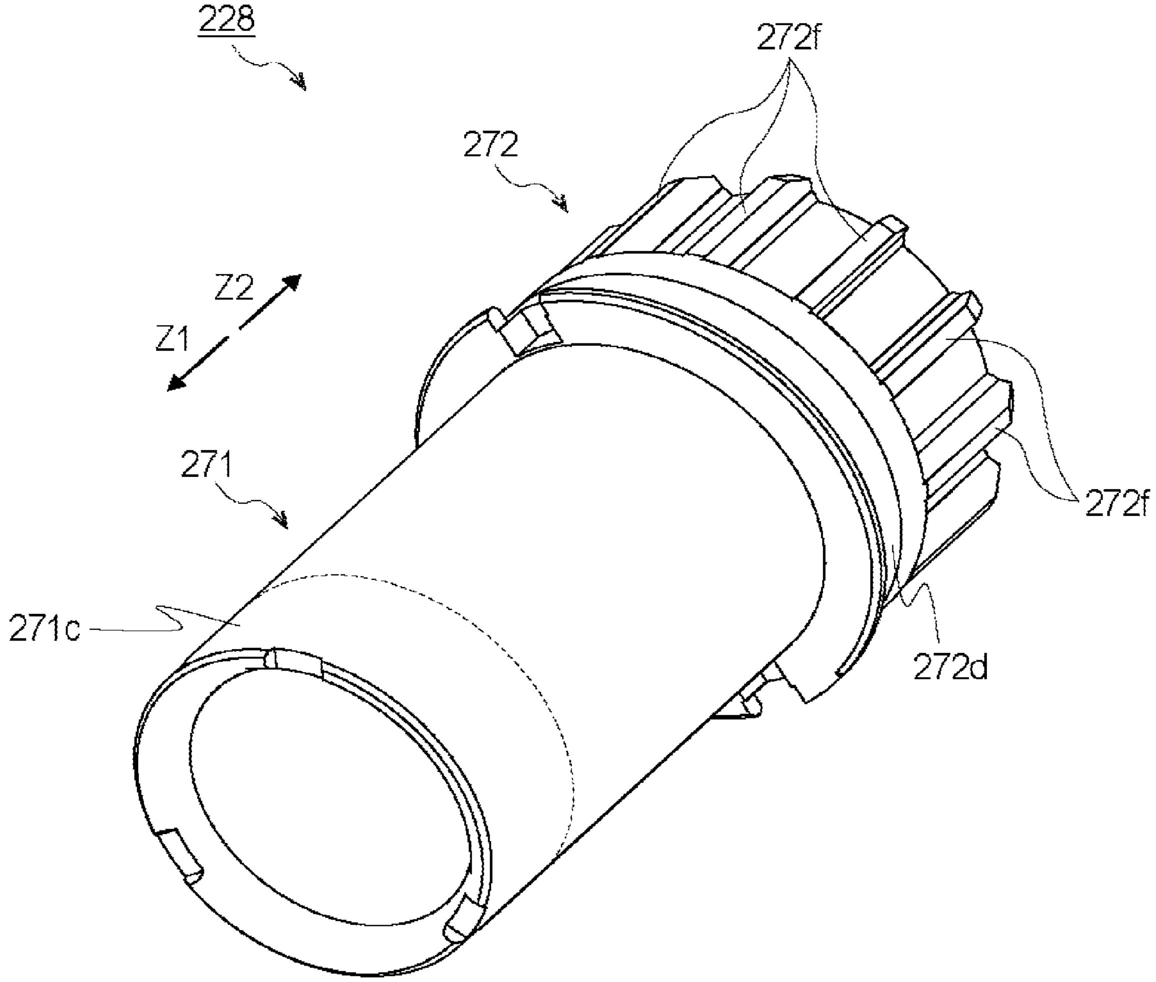
FIG. 23 is a perspective view of the coupling member 228 according to Embodiment 2.

FIG. 23 is a perspective view of the coupling member 228 according to Embodiment 2.

Figure 24:
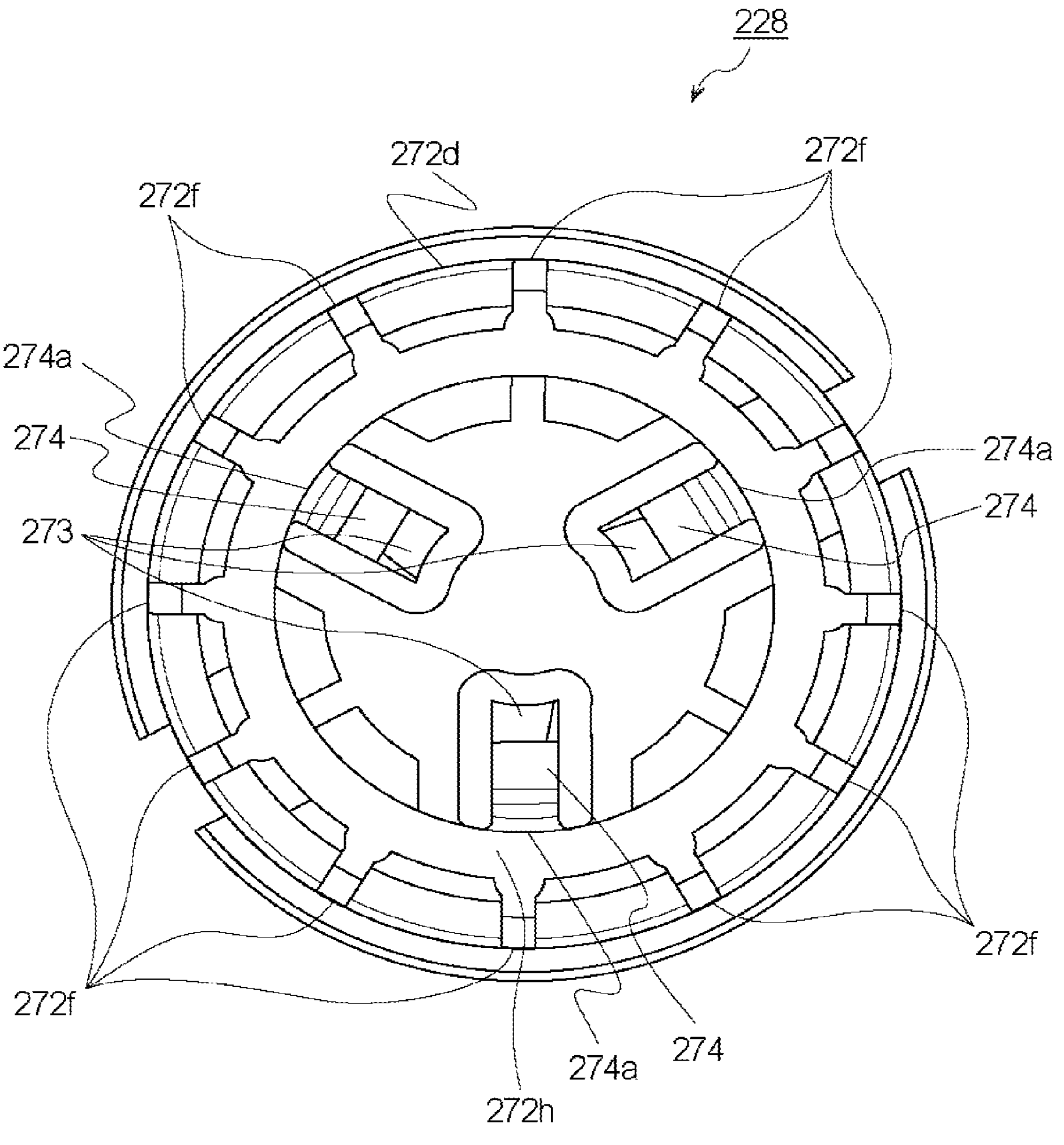
FIG. 24 is a view of the coupling member 228 according to the Embodiment 2 as viewed in a Z direction from an inner side.

FIG. 24 is a illustration of the coupling member 228 according to Embodiment 2 as viewed in the Z direction from the inner side.

Figure 25:
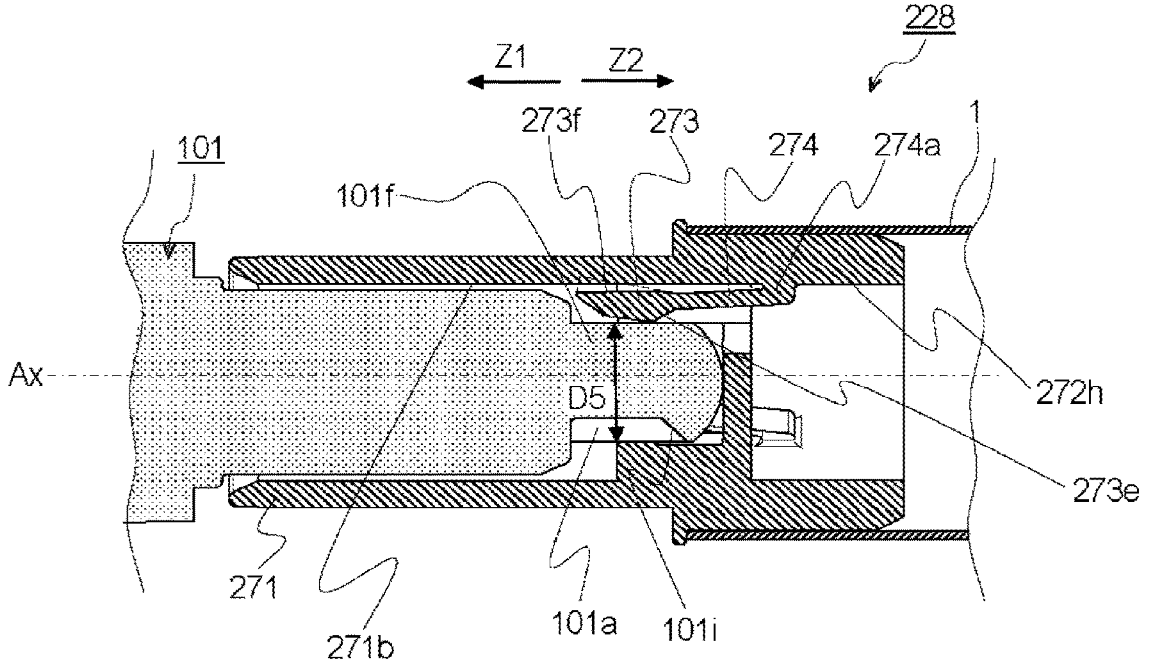
FIG. 25 is a sectional view illustrating an operation of mounting the coupling member 228 to the main assembly driving shaft 101 in Embodiment 2.
Figure 25:
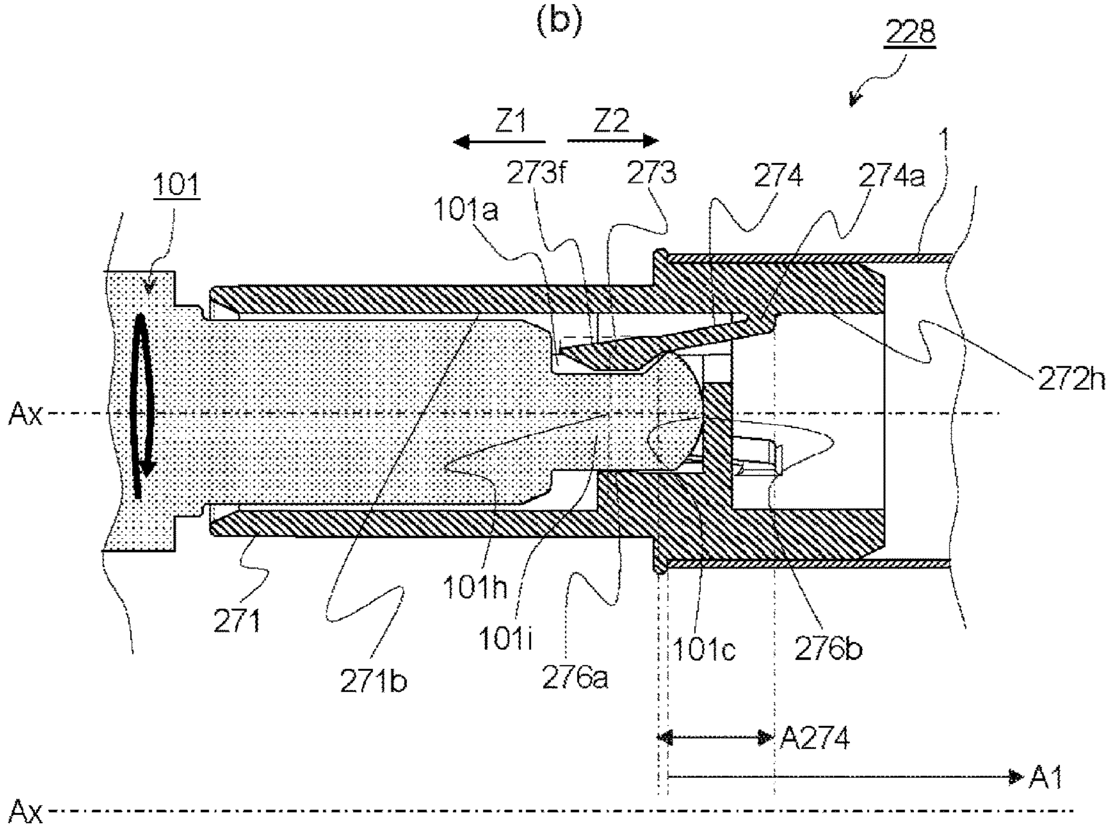

FIG. 25 is a sectional view illustrating the operation of mounting the coupling member 228 to the main assembly driving shaft 101 according to Embodiment 2.

Figure 26:
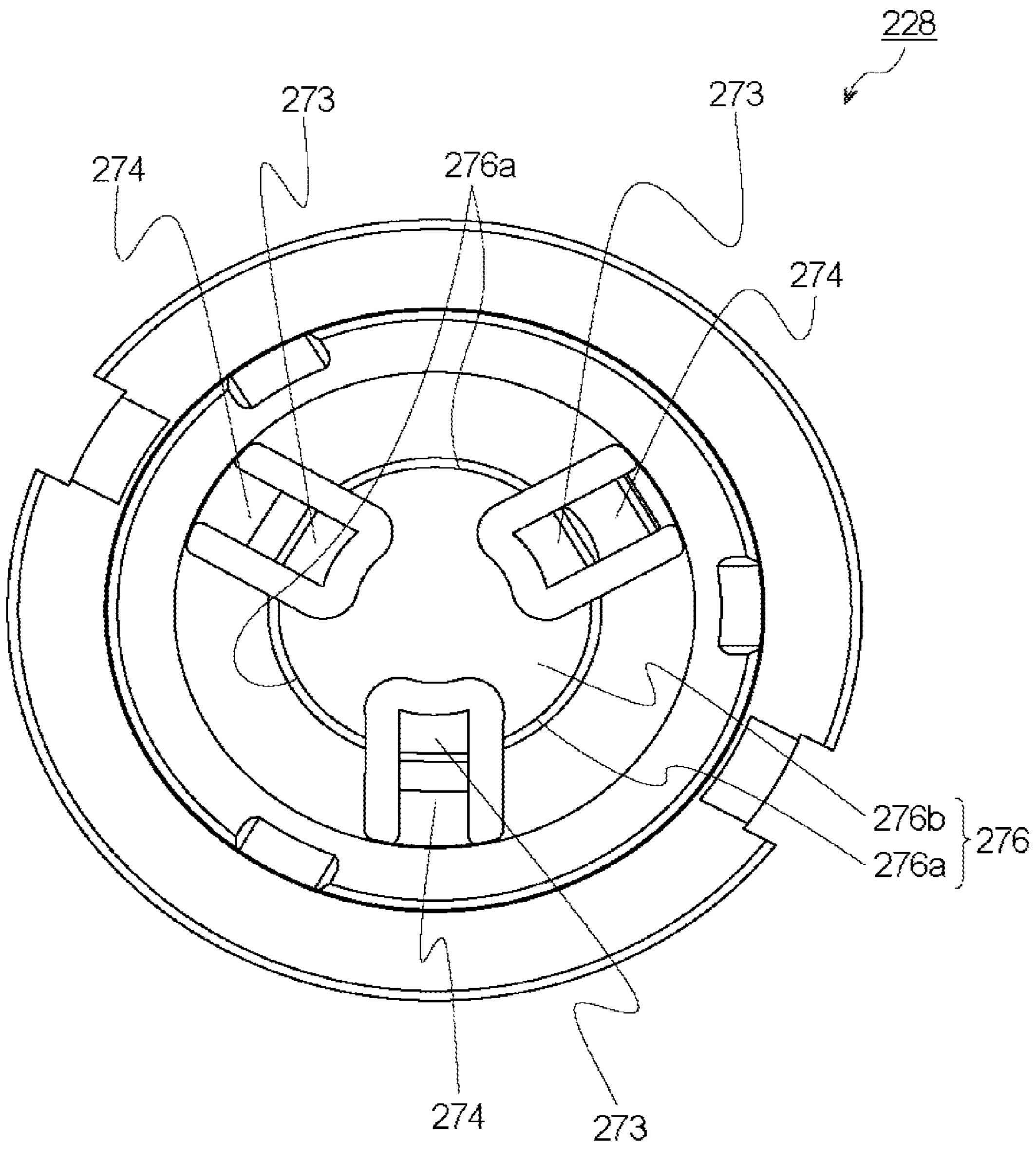
FIG. 26 is an illustration of the coupling member 228 according to Embodiment 2 as viewed from an outer side in the Z direction.

FIG. 26 in an illustration of the coupling member 228 according to Embodiment 2 as viewed from the outer side in the Z direction.

Elements corresponding to those of Embodiment 1 are assigned the same names. For them, detailed explanation will be given in detail regarding the constitution and action and the like which are different from the elements described in the foregoing, and explanations on the same points as those described in the foregoing may be omitted in some cases.

In this embodiment, at least a part of a support portion (the engaging portion 273 and the base portion 274) movably supporting the driving force receiving portion 273*a* is arranged inside the photosensitive drum 1. In particular, the fixed end of the support portion (that is, the base portion 274*a* of the base portion 74) is disposed inside the photosensitive drum 1 (FIG. 25). Details will be described below.

In this embodiment, a coupling member 228 is provided as a flange member mounted to an end portion on the driving side of the cylinder (photosensitive drum 1). The coupling member 228 has an engaging portion 273 configured to engage with the main assembly driving shaft 101 and a base portion 274 for supporting the engaging portion 273.

The engaging portion 273 is provided with a driving force receiving surface 273*a*. The driving force receiving surface 273*a* is a driving force receiving portion (driving force receiving portion) which can receive a driving force (rotational force) for rotating the photosensitive drum 1 from the outside of the cartridge (outside of the drum unit), that is, from the apparatus main assembly.

The engaging portion 273 and the base portion 274 are support portions for supporting the driving force receiving surface (driving force receiving portion) 273*a*.

In Embodiment 1, the cylindrical portion 71 is provided with a cut-away portion 71*d*, and the base portion 74 extends from the cylindrical portion 71. The base portion 74 has a shape arranged between the borne portion 71*c* and the mounting portion 72 in the Z direction.

The case will be considered in which the apparatus with the cartridge is kept unoperated for a long period in a state that the phases of the drive transmission groove 101*a* of the main assembly driving shaft 101 and the engagement portion 73 of the coupling member 28 do not match (shown in part (a) of FIG. 19). In such a case, not only the base portion 74 but also the neighborhood of the root portion 74*a* of the base portion 74 of the cylindrical portion 71 may creep-deforms.

Here, the alignment precision between the borne portion 71*c* and the press-fitted portion 72*d* is kept high so that the axis of the borne portion 71*c* and the axis of the press-fit portion 72*d* of the mounting portion 72 are coaxial. However, even in this case, the amount of creep deformation in the neighborhood of each root portion 74*a* of the cylindrical portion 71 is not necessarily even. Therefore, if the neighborhood of the root portion 74*a* of the base portion 74 therebetween is also creep-deformed, there is a liability that the coaxiality accuracy of alignment for keeping the central axis of the borne portion 71*c* and the central axis of the press-fit portion 72*d* is deteriorated.

If the coaxial accuracy of the axis of the borne portion 71*c* and the axis of the press-fit portion 72*d* decreases, there is a possibility that the coaxial accuracy of the axis of the borne portion 71*c* and the axis of the photosensitive drum 1 also deteriorate. As a result, the rotation precision of the photosensitive drum 1 is also deteriorated, with the result of liability that the image quality may be adversely affected.

Under the circumstances, in this embodiment, the base portion 274 has a shape extending from the inner circumferential cylinder 272*h* of the mounting portion 272 toward the engagement portion 273 outwardly in the axial direction of the coupling member 228. That is, the base portion 274 is an extension (extending portion, extension portion) extending at least in the axial direction. The engaging portion 273 is a projection (protrusion, protrusion) supported by the base portion 274.

The mounting portion 272 is a cylindrical portion having a plurality of ribs around the periphery thereof but is a substantially cylindrical, and it is a portion (inner circumferential contact portion, fixed portion) to be fixed in contact with the inner circumference of the photosensitive drum 1. Further, a cylindrical portion 271 is provided on the outer side of the mounting portion 272 with respect to the axial direction.

The projecting direction of the engaging portion 273 crosses with the extending direction in which the base portion 274 extends. Further, the engaging portion 273 projects at least toward the inner side in the radial direction of the coupling member.

Similarly to Embodiment 1, the engaging portion 273 is provided with a driving force receiving portion for receiving the driving force from the outside (namely the driving shaft 101) outside the drum unit 30. The engaging portion 273 and the base portion 274 are support portions which support the driving force receiving portion 273*a* so as to be movable at least in the radial direction of the coupling member. In more detail, the base portion 274 deforms with its fixed end as a fulcrum point, so that the driving force receiving portion 273*a* is movable at least in the radial direction of the coupling member.

The inner peripheral cylinder 272*h* is an inner diameter portion of the mounting portion 272 and has a cylindrical shape.

By providing the base portion (rear end) 274*a* of the base portion 274 in the inner tube cylinder 272*h*, even if the neighborhood of the root portion 274*a* of the base portion 274 is creep-deformed, the influence extending to the borne portion 271*c* of the cylindrical portion 271 can be suppressed. That is, the outer peripheral portion (press-fit portion 272*d*) of the mounting portion 272 is covered with the photosensitive drum 1, and therefore, the mounting portion 272 is hardly deformed. Therefore, even if the root 274*a* of the base portion 274 is temporarily deformed, the deformation of the mounting portion 272 itself connected with the base portion 274 is suppressed. As a result, the deformation of the entire coupling member 228 is suppressed, so that the deformation of the borne portion 271*c* provided on the free end side of the coupling member 228 can also be suppressed.

Further, by mounting the base portion 274 to the mounting portion 272 which is difficult to be deformed, it is possible to suppress deformation and tilting of the base portion 274. That is, by disposing the base 274*a* of the base portion 274 on the inner circumference cylinder 272*h* of the mounting portion 272, it is possible to suppress the tilting of the root portion 274*a*. For this reason, it is contributable to the stable rotation of the photosensitive drum 1, when the coupling member 228 receives the driving force from the main assembly driving shaft 101.

If the difference between the outer diameter of the press-fit guide portion 272*f* and the inner diameter of the inner peripheral cylinder 272*h* is not sufficiently large, both the press-fit guide portion 272*f* and the inner peripheral cylinder 272*h* may not be circular in some cases. At this time, the press-fit guide portion 272*f* may have a shape of a plurality of ribs radially arranged as in this embodiment. Even with such a shape, the press-fit portion 272*d* can be stably press-fitted into the photosensitive drum 1.

In addition, in this embodiment, as shown in FIG. 23, a plurality of ribs are radially arranged on the outer peripheral portion of the mounting portion 272, and these ribs are press-fit guide portions 272*f*. As shown in FIG. 24, the root portion 274*a* of the base portion 274 is disposed at a position corresponding to the plurality of ribs forming the press-fit guide 272*f*. Thus, when the driving force is received from the main assembly driving shaft 101, the driving force is transmitted from the root portion 274*a* to the press-fitting portion 272*d* through the ribs, so that deformation of the inner circumferential cylinder 272*h* due to the driving force can be further suppressed.

As shown in FIG. 25, when the root portion 274*a* of the base portion 274 is provided in the mounting portion 272, the root portion 274*a* is disposed inside the photosensitive drum (drum cylinder) 1. That is, the base 274 and the photosensitive drum 1 are projected onto the axis Ax of the photosensitive drum 1 (=the axis of the coupling member 228). Then, a part of the projection area A274 of the base portion 274 (the projection area on the side of the base 274*a*) overlaps with a part of the projection area A1 of the photosensitive drum 1 on the axis.

In the case that "A is inside the photosensitive drum 1", An is the interior of the photosensitive drum both when the photosensitive drum is viewed along the axis Ax and when the photosensitive drum is viewed in the direction perpendicular to the axis Ax.

Figure 28:
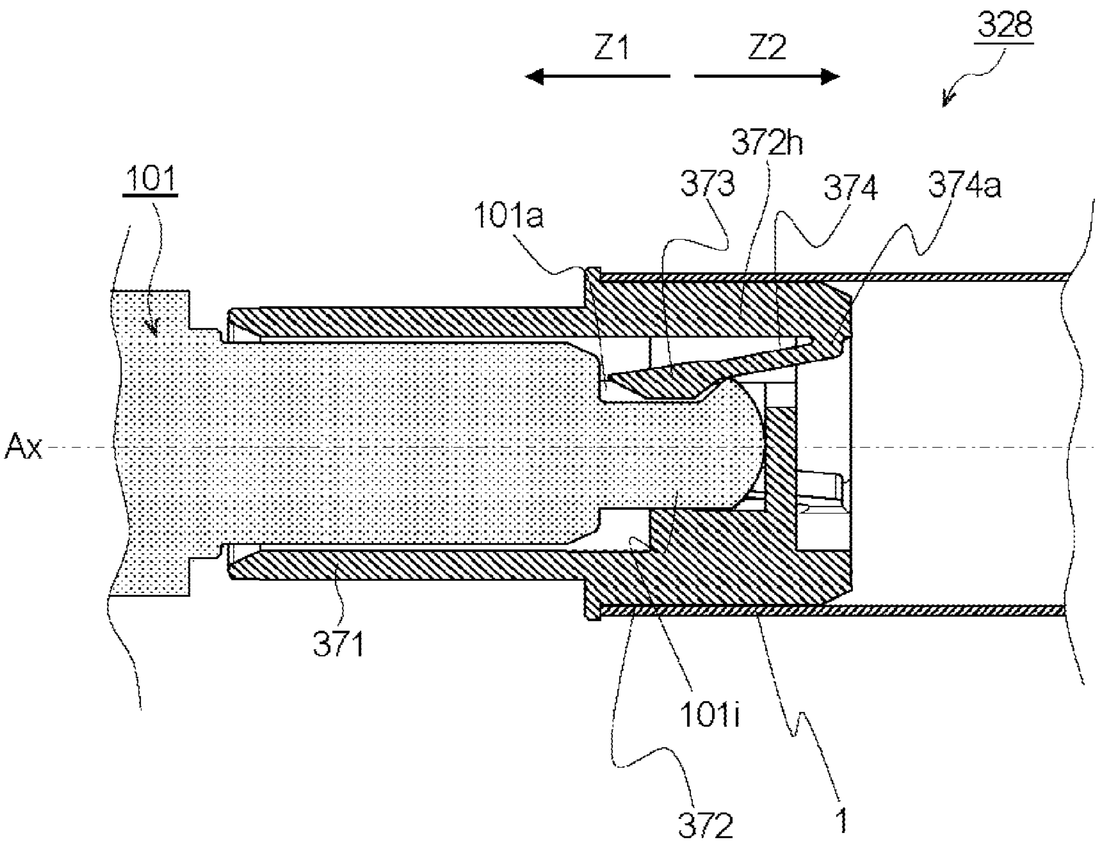
FIG. 28 is a sectional view of the coupling member 328 and the main assembly driving shaft 101 taken along a plane including the rotation axis.

In this embodiment, the base 274 is disposed so that a part of the area on the side of the base 274*a* overlaps with the area of the photosensitive drum 1, but the base 274 may be disposed so that the whole of the base 274 overlaps the photosensitive drum 1. In other words, the entire base portion 274 may be disposed inside the photosensitive drum 1. Such a structure will be described hereinafter with respect to Embodiment 3 (FIG. 28).

The engaging portion 273 will be described. As shown in FIGS. 22 and 25, a taper 273*f* is provided on the outer diameter side of the engaging portion 273. As in Embodiment 1, also in this embodiment, when the phases of the drive transmission groove 101*a* of the main assembly driving shaft 101 and the engagement portion 273 are not aligned each other, the base portion 274 deforms and the engagement portion 273 moves radially outward. Since the engaging portion 273 avoids hitting the main assembly driving shaft 101 by this retracting operation, the coupling member 228 can be mounted to the main assembly driving shaft 101. When the coupling member 228 is mounted to the main assembly driving shaft 101, the dismounting tapered surface 273*e* of the engaging portion 273 moves to the rear side in the Z direction from the main assembly side dismounting taper 101*i* of the main assembly driving shaft 101.

In the process of mounting the coupling member 228 to the main assembly driving shaft 101, the radially outward movement amount of the engagement portion 273 increases as the distance from the base portion 274*a* of the base portion 274 increases. In the absence of the taper 273*f*, when the retraction amount of the engaging portion 273 is large, the engaging portion 273 interferes with the inner peripheral surface 271*b* of the cylindrical portion 271 as indicated by the dotted line in part (a) of FIG. 25. Therefore, by providing the taper 273*f*, the engaging portion 273 is prevented from interfering with the inner peripheral surface 271*b* of the cylindrical portion 271 even if the engaging portion 273 moves largely in the radial direction. As a result, the outer diameter D5 of the shaft portion 101*f* of the main assembly driving shaft 101 can be maximized.

The distance between the base portion 274 and the inner surface (the inner circumferential surface 271*b*) of the coupling member 228 increases as it goes from the rear end to the free end in a state (natural state) in which the elastic deformation is eliminated.

Thereafter, similarly to Embodiment 1, as shown in part (b) of FIG. 25, by the rotation of the main assembly driving shaft 101, when the phase of the drive transmission groove 101*a* and the engagement portion 273 are aligned, the elastic deformation of the base portion 274 It is released. Then, the engagement portion 273 moves inwardly in the radial direction to enter the drive transmission groove 101*a*. The drive can be transmitted from the main assembly driving shaft 101 to the coupling member 228 by way of the engagement portion 273.

Similarly to Embodiment 1, as shown in FIGS. 22 and 26, the aligning portion 276 has a radial direction positioning portion 276*a*. The radial direction positioning portion 276*a* is disposed at a position overlapping with the engaging portion 273 in the Z direction (axial direction). That is, when the radial direction positioning portion 276*a* and the engaging portion 273 are projected onto the axis line of the coupling member 228 (the axis line of the photosensitive drum 1), the projection area of the radial direction positioning portion 276*a* and the projection area of the engaging portion 273 at least partly overlaps with each other.

On the other hand, the radial direction positioning portion 276*a* is disposed at a position out of the engaging portion 273 as viewed along the axial direction of the coupling member 228. FIG. 24 is an illustration of the coupling member 228 as viewed along the axial direction. As can be seen from this Figure, the radial direction positioning portion 276*a* does not overlap with the engaging portion 273, and a certain amount of clearance is provided between them. Such an arrangement relationship is mainly due to the reason in manufacturing the coupling member 228. Details will be described hereinafter.

Further, as shown in FIGS. 22 and 25 (*b*), the aligning portion 276 has an abutment portion 276*b*. When the drive of the main assembly driving shaft 101 is transmitted to the coupling member 228, the abutment portion 276*b* abuts against the semispherical semispherical shape 101*c* at the free end of the main assembly driving shaft 101. By this, the position of the coupling member 228 in the axial direction is determined relative to the main assembly drive 101.

Embodiment 3

Referring to FIG. 28, a Embodiment 3 will be described.

FIG. 28 is a cross-sectional view of the coupling member (flange member) 328 and the main assembly driving shaft 101 taken along the rotation center line (rotation axis) according to the Embodiment 3.

Elements corresponding to those of the above-described embodiment (particularly, Embodiment 2) are denoted by the same names, and descriptions of the similar points to the above-described elements may be omitted. The description will be made mainly on differences from the elements described above.

In this embodiment, the entirety of the driving force receiving portion 373*a* and supporting portions (the engaging portion 373 and the base portion 374) movably supporting the driving force receiving portion 373*a* is disposed inside the photosensitive drum 1.

The coupling member 328 of this embodiment has an engaging portion 373 for engaging with the main assembly driving groove 101*a* and a base portion 374 for supporting the engaging portion. The base portion 374*a* is connected to the inner peripheral cylinder 372*h* of the flange member so that the base portion 374 is supported by the coupling member 328.

The engaging portion 373 is provided with a driving force receiving portion which is in contact with the main assembly driving groove 101*a* and receives the driving force from the main assembly driving groove 101*a*. The shapes of the engaging portion 373 and the driving force receiving portion thereof are the same as those of the engaging portion 273 and the driving force receiving portion 273*a* of Embodiment 2, and therefore the detailed description thereof will be omitted.

The engaging portion 373 is a projecting portion (protruding portion) supported by the base portion 374. The engaging portion 373 projects at least radially inward of the coupling member. The base portion 374 is an extension (extending portion, extended portion) extending in a direction crossing with the projecting direction of the engaging portion 373. The base portion 374 is also a deformable portion (elastically deformable portion, flexible portion) configured to be elastically deformable.

The engaging portion 373 is provided with a driving force receiving portion, and the engaging portion 373 and the base portion 374 are support portions movably supporting the driving force receiving portion.

In Embodiment 2, as shown in FIGS. 22 and 25, the engaging portion 273 is provided inside the cylindrical portion 272 in the Z direction.

On the other hand, in this embodiment, the engaging portion 373 is formed inside the mounting portion 372 in the Z direction. Here, the mounting portion 372 is a portion pressed into the inner periphery of the photosensitive drum 1 and mounted to the photosensitive drum 1. Therefore, the engaging portion 373 and the driving force receiving portion are positioned inside the photosensitive drum 1. More specifically, when the photosensitive drum 1 and the engaging portion 373 are projected onto the axis of the photosensitive drum 1, an area of the photosensitive drum 1 and an area of the engaging portion 373 (period of the driving force receiving portion of the engaging portion 373) are overlapped with each other. More specifically, all the area of the engaging portion 373 (driving force receiving portion) is included in the area of the photosensitive drum 1.

By employing such a shape, it is possible to dispose the photosensitive drum 1 closer to the main driving shaft 101 side (the Z1 direction side) than in Embodiment 2 in the Z direction. Therefore, it is contributable to miniaturization of the cartridge 7 and the image forming apparatus 100 in the Z direction. Or, parts of the engaging portion 373 and the base portion 374 can be provided at the back side of the photosensitive drum 1 which is hard to be touched by the user, and therefore, these members can be protected.

It is preferable that the entire engaging portion 373 is disposed inside the photosensitive drum 1. However, if at least a part of the engaging portion 373 (driving force receiving portion) is inside the photosensitive drum 1, the above-mentioned effect is provided. That is, it will suffice if when the photosensitive drum 1 and the engaging portion 373 are projected onto the axis of the photosensitive drum 1, the area of the photosensitive drum 1 and the area of the engaging portion 373 (the area of the driving force receiving portion) on the axis are at least partly overlapped with each other.

The base portion 374 is also located inside the photosensitive drum 1. That is, when the photosensitive drum 1 and the base portion 374 are projected onto the axis of the photosensitive drum 1, the projection area of the photosensitive drum 1 and the projection area of the base portion 374 overlap each other.

Embodiment 4

The fourth example (Embodiment 4) will be described. This embodiment is a modification of the structure of Embodiment 2. Therefore, prior to the description of this embodiment, the features of the coupling member 228 shown in Embodiment 2 will be described again.

In the Embodiment 2, the coupling member 228 has a shape with which the base portion 274 extends in the axial direction of the coupling member 228 from the inner peripheral cylinder 272*h* of the mounting portion 272 toward the engagement portion 273 (FIG. 25).

Also, when the coupling member 228 is projected onto the projection plane perpendicular to the axis of the coupling member 228, the aligning portion 276 and the like are arranged so that the following relationship is satisfied. That is, in the projection plane, the aligning portion 276 does not overlap the engaging portion 273, the base portion 274, or the region 1 mm around the engaging portion 273 and the base portion 274. In other words, when the coupling member 228 is viewed along the axis, there is a gap (clearance) of about 1 mm between the aligning portion 276 and the engaging portion 273, and there is also a gap (clearance) of about 1 mm between the aligning portion 276 and the base portion 274A.

The reason why the coupling member 228 has the above-described structure is that the coupling member 228 is manufactured through the following manufacturing method. (Description of Manufacturing Method).

The coupling member 228 of Embodiment 2 is manufactured by an injection molding (insert molding) using a mold.

Figure 27:
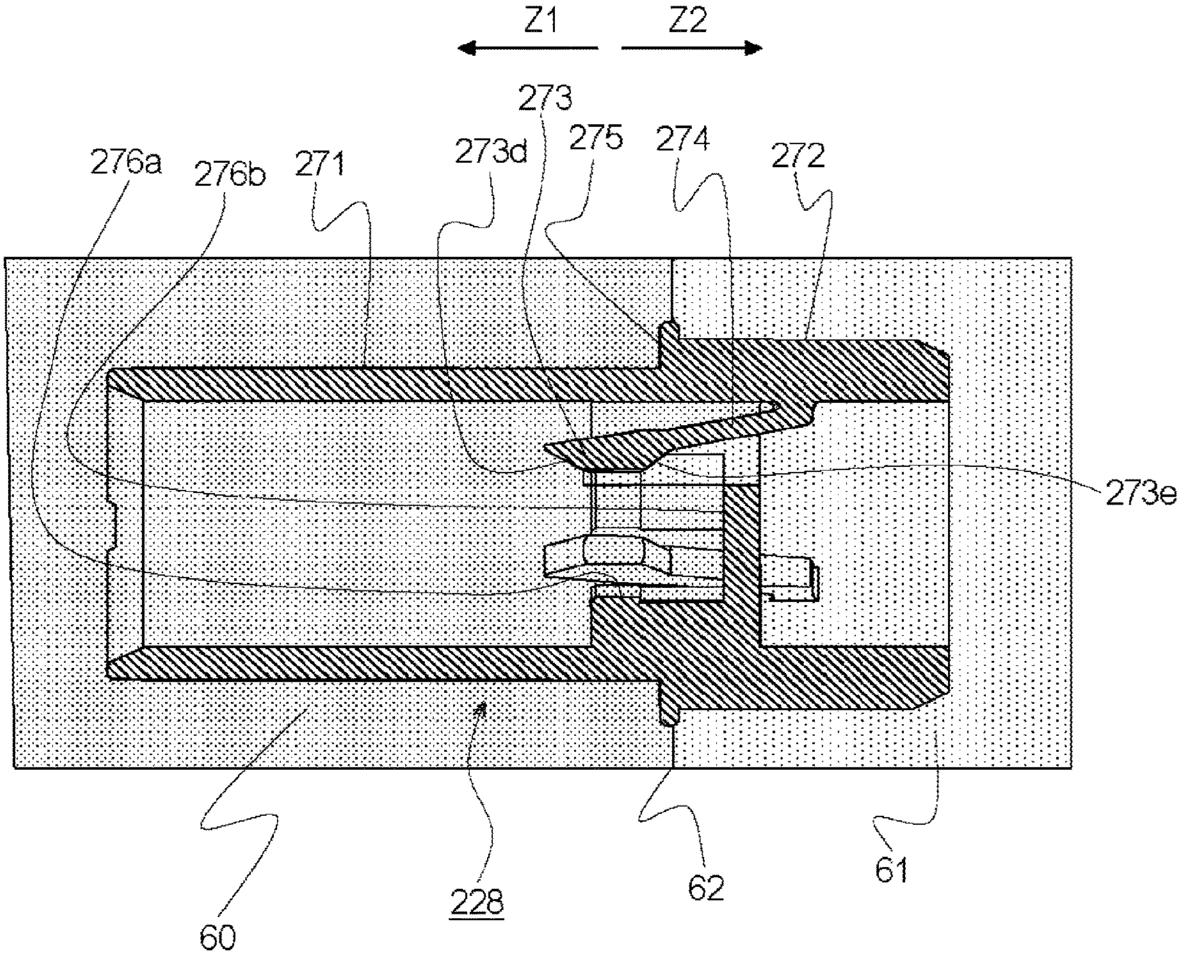
FIG. 27 is a cross-sectional view showing a state in which the coupling member 228 according to the Embodiment 2 is molded in a metal mold.

Referring to FIG. 27, a structure of a metal mold used for molding the coupling member 228 will be described.

The coupling member 228 has a shape with which the flange portion 275 protrudes outward in the radial direction. In the case of molding such a shape, it is preferable that the metal mold is as shown in FIG. 27.

Specifically, as shown in the Figure, the metal mold has a two-piece structure including a left mold (cylindrical mold 60) and a right mold (mounting part mold 61). By aligning the right and left molds, a space portion (mold cavity, hollow portion) having the same shape as the molded product is formed. The material is poured into this space portion and solidified in the mold, whereby the coupling member 228 is provided. The mold has a structure in which a mold parting plane 62 (a plane along which the mold is divided, a plane at which the mold halves are contacted), which is a portion for fitting the right and left molds, is disposed in the neighborhood of the space forming the flange portion 275. The cylindrical mold 60 has a shape including a space for molding the outer periphery of the cylindrical portion 271.

Similarly, the mounting portion side mold 61 has a shape having a space for molding the mounting portion 272.

In the case that the coupling member 228 is molded using such a metal mold, it is preferable to use a thermoplastic resin from the standpoint of mass productivity. More particularly, materials such as POM and PPS are considered to be preferable. However, in order to satisfy requirements such as strength, other materials may be appropriately selected. Specifically, a thermosetting resin or a metallic material may be used.

As described in the foregoing, the engaging portion 273 has an insertion taper 273*d* at one end in the Z direction and a dismounting taper 273*e* at the other end. Therefore, it is difficult to provided the mold parting plane 62 at either end face of the engaging part 273 with respect to the Z direction. This is because, in the case of using a mold divided into two parts, if the mold parting plane 62 is arranged on one of the two end faces of the engaging portion 273, it is difficult to remove the molded coupling member 228 from the mold. That is, at the time of detaching the two molds from the engaging portion 273 after the engaging portion 273 is molded, at least one of the molds is caught by the engaging portion 273 and cannot be moved.

Therefore, when molding the coupling member 228 of this embodiment, the mold parting plane 62 is determined as follows. That is, in the Z direction, a region from the driving force receiving surface 273*a* to the radially inner side of the base portion 274 is formed by the mounting portion side mold 61. Further, a region from the insertion taper 273*d* to the radially outer side of the base portion 274 is formed by the cylindrical mold 60. For this reason, it is necessary for the aligning portion 276 to be shaped so as not to interfere with the cylindrical mold 60 and the mounting portion side mold 61.

Specifically, when looking at the coupling member 228 along the Z direction, the aligning portion 276 does not overlap with the drive moving portion 273 and the base portion 274 in the range of about 1 mm around them (does not overlap) (As shown in FIG. 26).

As a result, a gap exists between the engaging portion 273 and the aligning portion 276, and a gap is generated between the base portion 274 and the aligning portion 276. Due to these gaps, the base portion 274 and the engaging portion 273 can move to a certain extent in the circumferential direction of the coupling member 228. In such a structure, it is desirable to increase the rigidity of the base 274. This is because if the rigidity of the base portion 274 is low by using a material that can not exhibit sufficiently high rigidity of the base portion, the following liability may arise.

Figure 29:
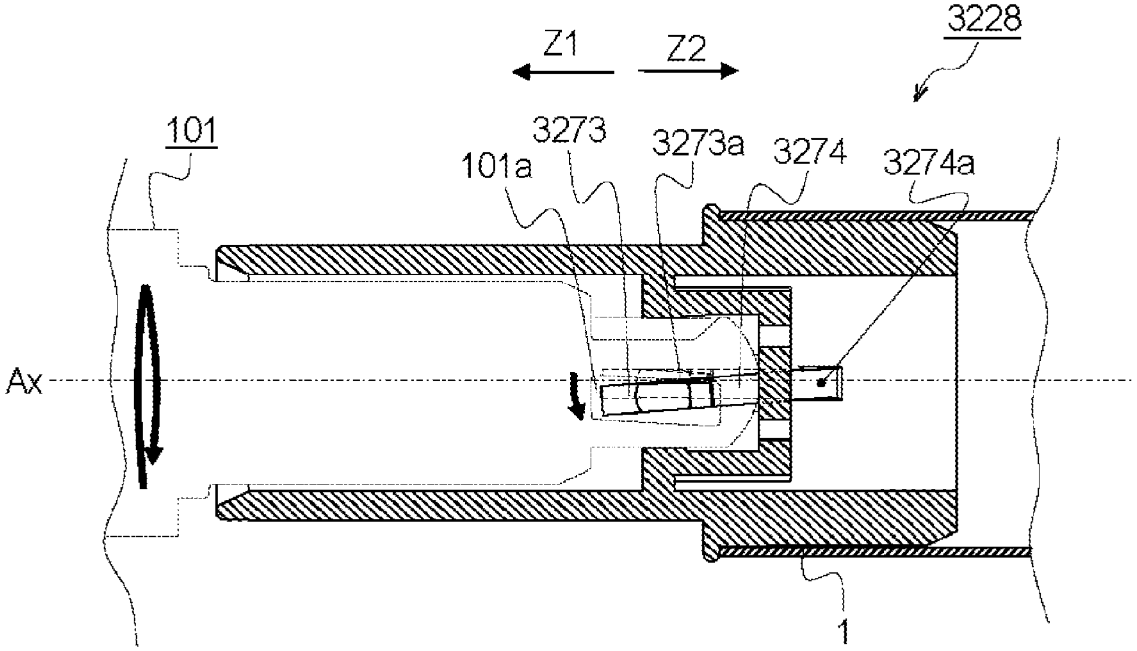
FIG. 29 is a cross-sectional view illustrating deformation of the base portion and the engaging portion not using the coupling member according to the Embodiment 4, taken along a plane including the rotation center line (rotation axis) of the coupling member.

In FIG. 29, as a reference example, a structure in which the material of the coupling member 228 is changed to one having low rigidity is shown.

FIG. 29 is a longitudinal sectional view illustrating the deformation of the base portion and the engaging portion by cutting the coupling member not using Embodiment 4 along the rotation center line (rotation axis).

In this embodiment, when the driving force receiving surface 3273*a* abuts to the main assembly driving force transmitting surface 101*b*, the cleaning blade 26, the charging roller 22, and the like apply a load to the photosensitive drum unit 3230. Due to this load, the is a liability that when the drive transmission force is received by the engagement portion 3273 from the main assembly driving shaft 101 as indicated by a arrow in FIG. 29, the base portion 3274 tilts downstream in the rotational direction from the root portion 3274*a* as a fulcrum point by the driving force. The engaging portion 3273 is disposed on the free end side of the base portion 3274, and therefore, when the base portion 3274 tilts, the engaging portion 3273 also tilts by the amount corresponding to the tilting of the base portion 3274. As a result, there is a likelihood that the driving force receiving surface 3273*a* and the main assembly driving force receiving surface 101*a* are not in contact with each other and the photoconductive drum unit 3230 can not be retracted to the borne portion 101*d* side of the main assembly bearing shaft 101.

Further, when the load applied by the cleaning blade 26, the charging roller 22, or the like described above varies, the rotation amount of the photosensitive drum 1 changes due to the change in the amount of inclination of the base portion 3274, and the image quality may be adversely affected.

Therefore, in Embodiment 2, a member having high rigidity is selected as the material of the coupling member 228 so that the likelihood described with reference to the reference example can be avoided, and the rigidity of the base portion 274 is maintained.

Figure 30:
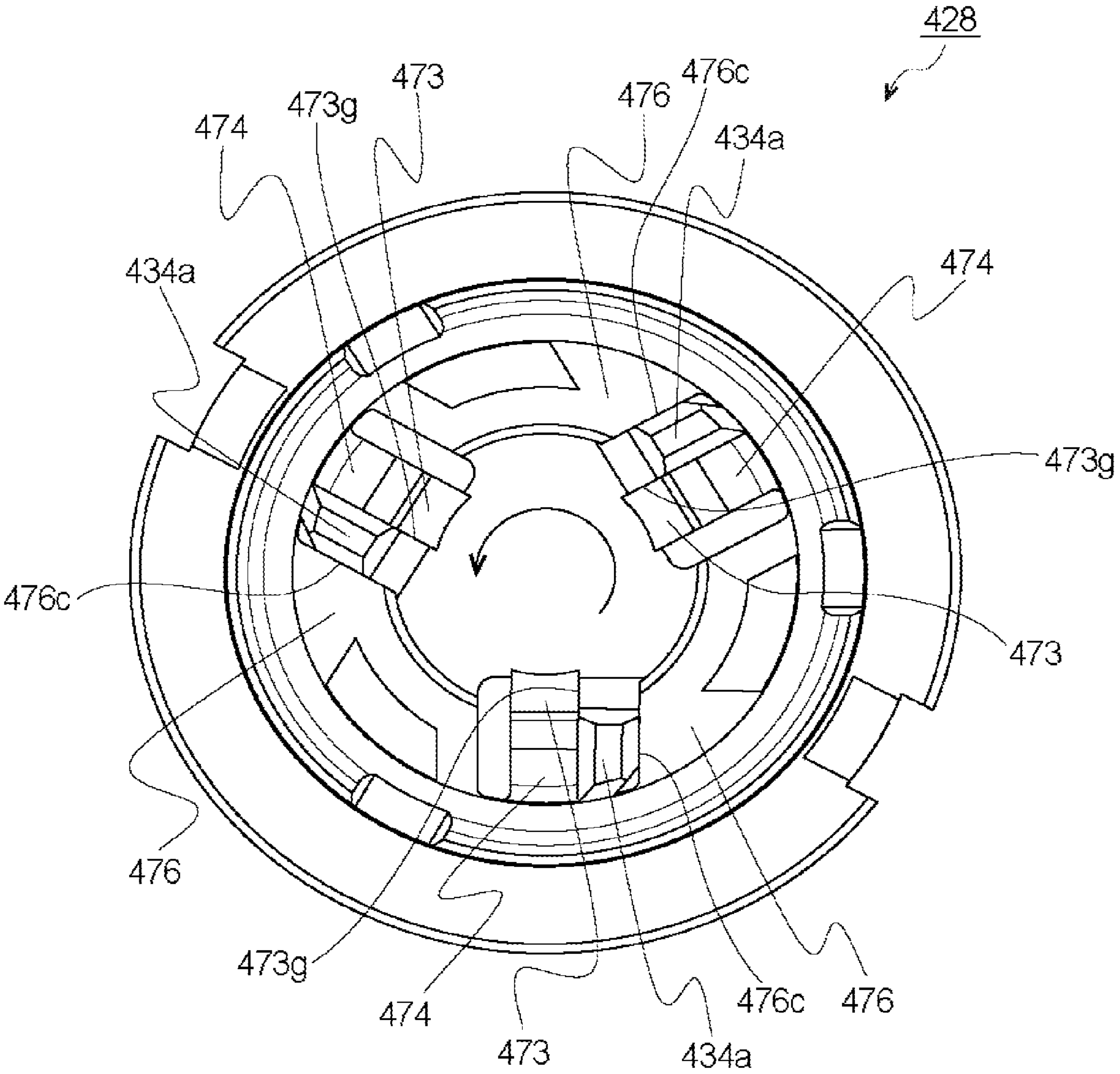
FIG. 30 is a view of the coupling member 428 according to the Embodiment 4 as viewed from an outer side in the Z direction.

On the other hand, in this embodiment (Embodiment 4), unlike Embodiment 2, as shown in FIG. 30, of the gaps between the engaging portion 473 and the aligning portion 476, a backup portion 434*a* of the backup member 434 is inserted the gap upstream in the rotational direction of the engaging portion 473. By this, even if the rigidity of the base portion 474 is low, the tilt amount of the base portion can be kept small.

Hereinafter, Referring to FIGS. 30 to 38, details of the structure of this embodiment will be described.

FIG. 30 in an illustration of the coupling member 428 according to Embodiment 4 as viewed in the Z direction from the outer side.

Figure 31:
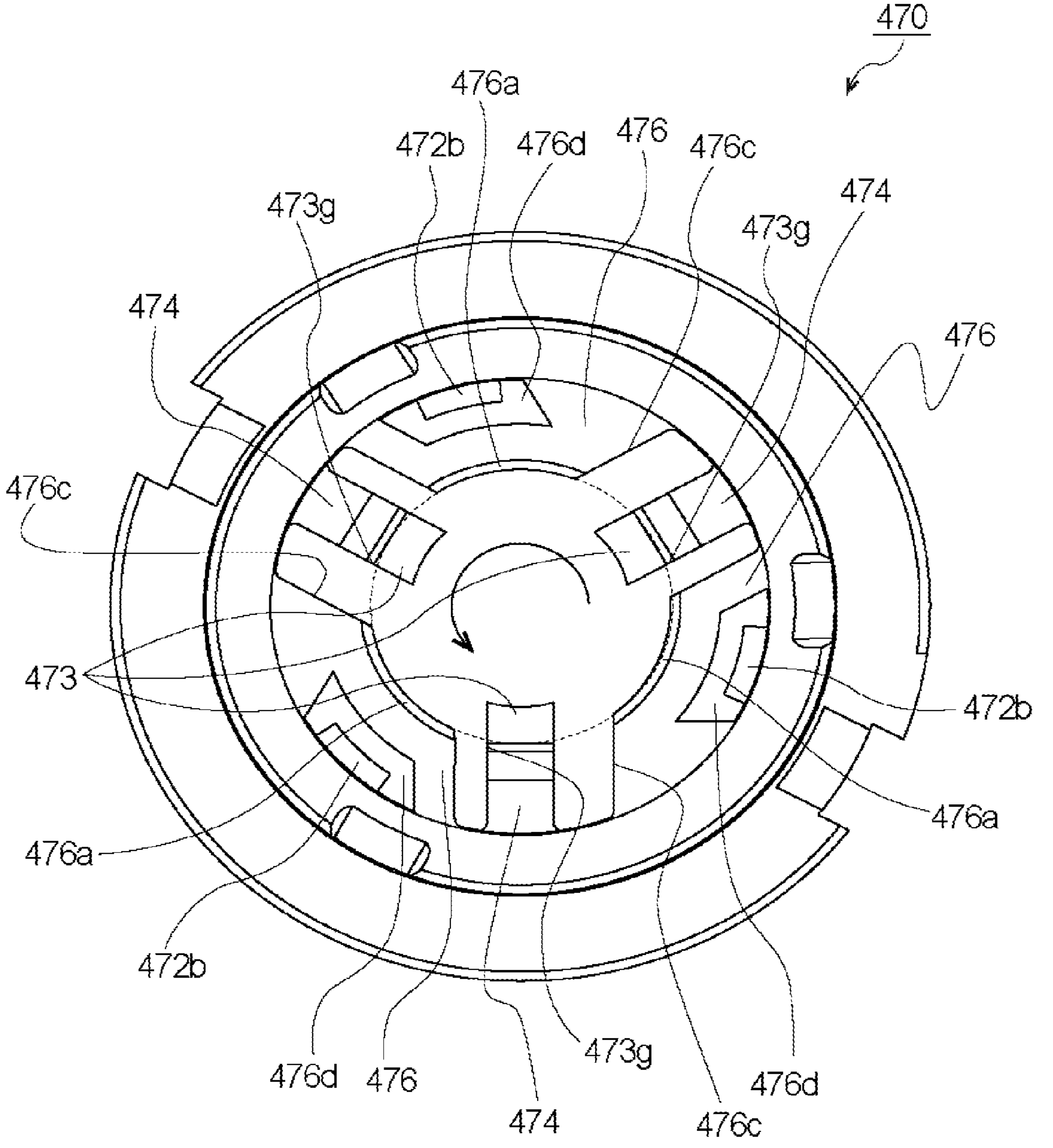
FIG. 31 is a view of the flange member 470 according to Embodiment 4 as viewed in the Z direction from the outer side.

FIG. 31 is a illustration of the flange member 470 according to Embodiment 4 as viewed in the Z direction from the outer side.

Figure 32:
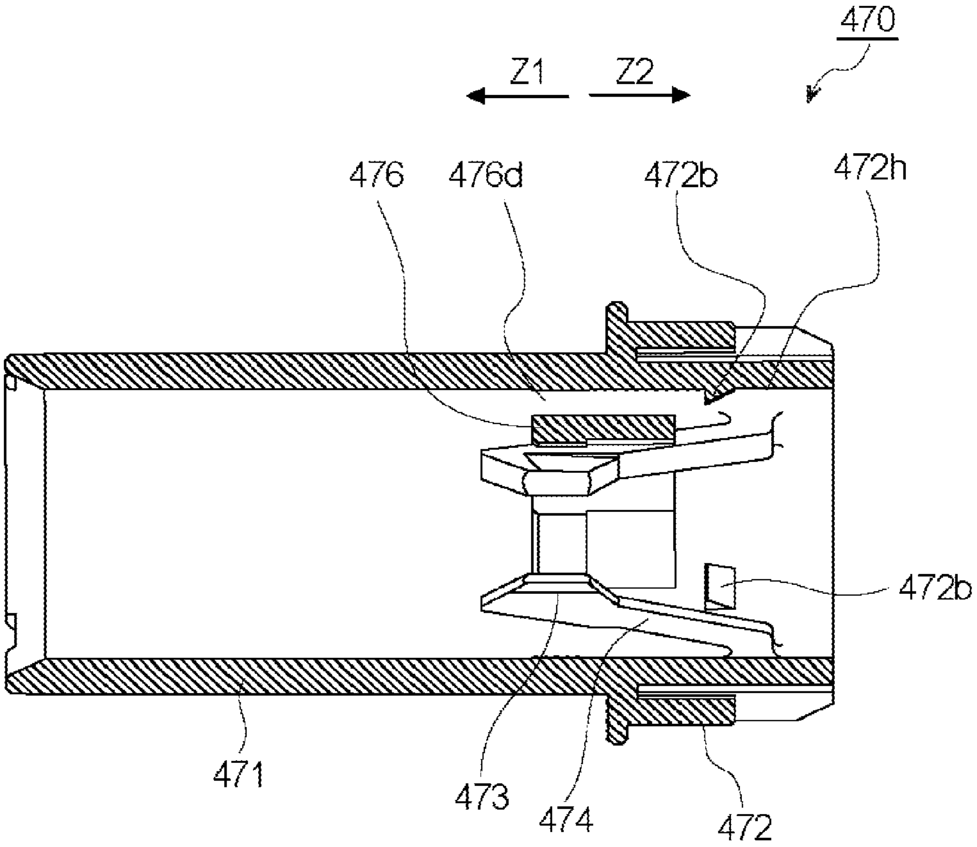
FIG. 32 is a cross-sectional view of the coupling member 428 according to the fourth embodiment, taken along a plane including the rotation center line (rotation axis).

FIG. 32 is a longitudinal sectional view of the coupling member 428 according to Embodiment 4 taken along the rotation center line (rotation axis).

Figure 33:
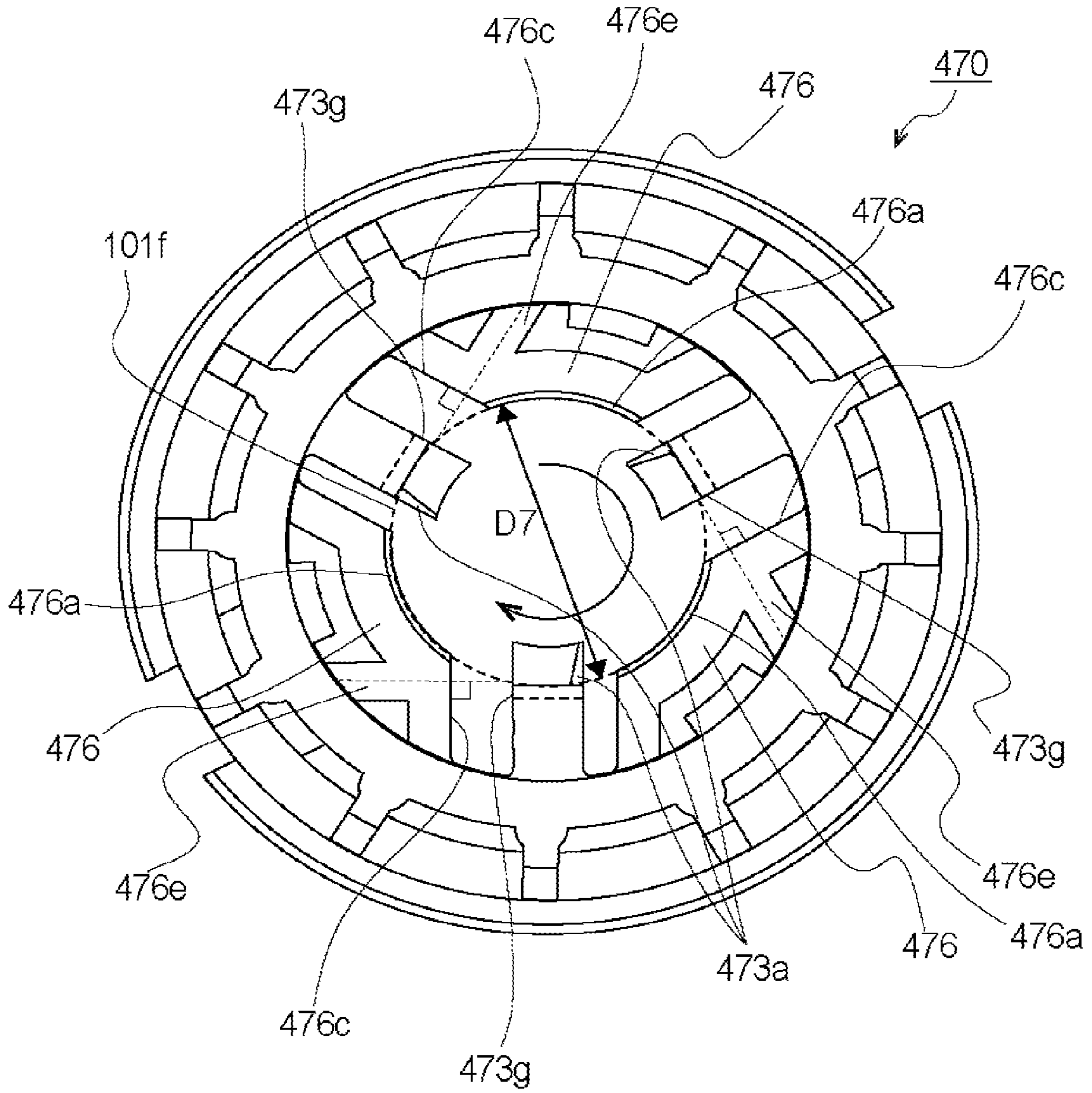
FIG. 33 is a view of the flange member 470 according to Embodiment 4 as viewed from the Z direction from the inner side.

FIG. 33 is an illustration of the flange member 470 according to Embodiment 4 as viewed in the Z direction from the inner side.

Figure 34:
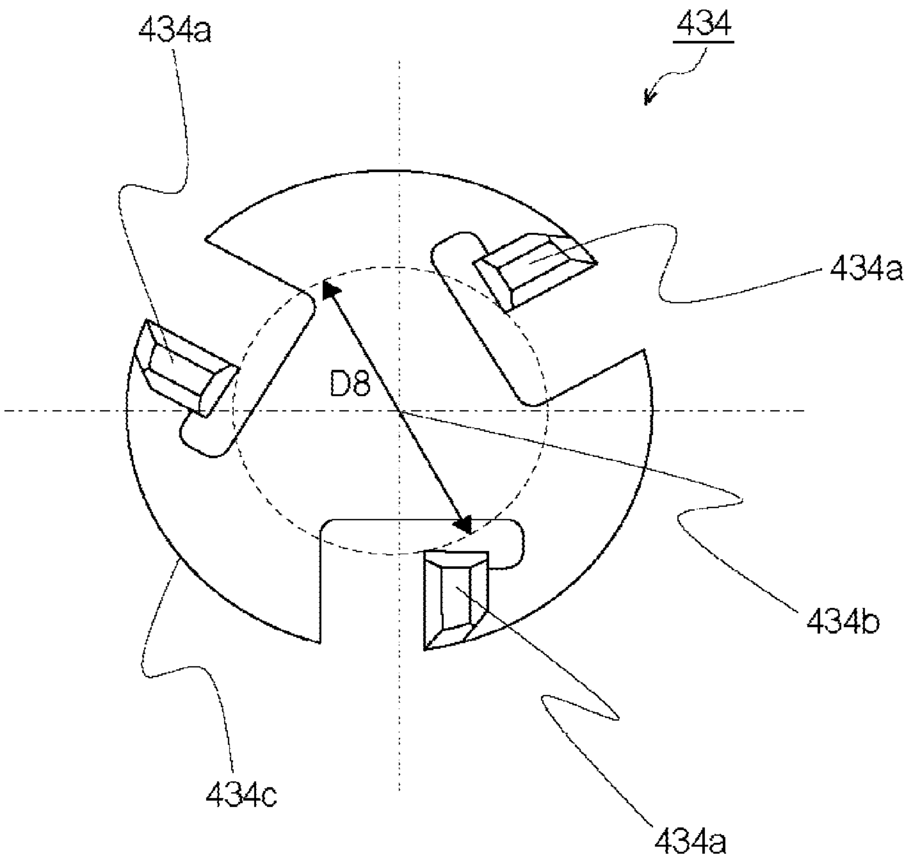
FIG. 34 is an illustration of a backup member 434 according to the Embodiment 4 as viewed from the Z direction outer side.

FIG. 34 is a illustration of the backup member 434 according to Embodiment 4 as viewed in the Z direction from the outer side.

Figure 35:
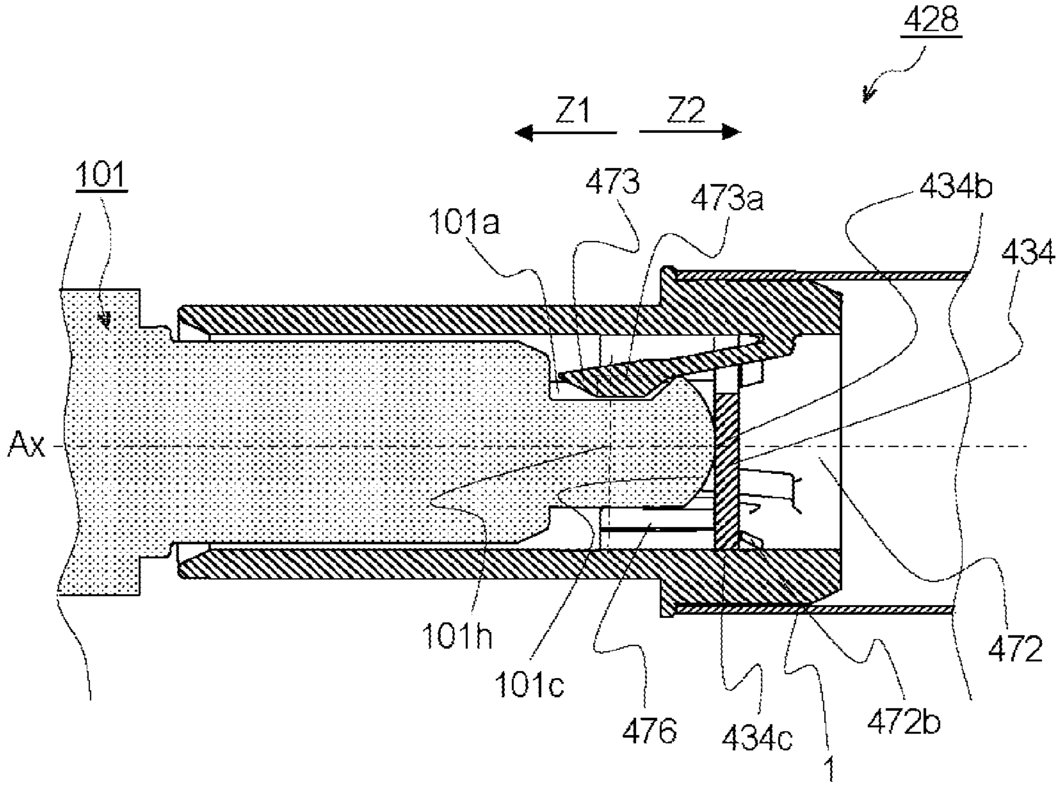
FIG. 35 is a cross-sectional view of the coupling member 428 according to the Embodiment 4 and the main assembly driving shaft 101 taken along a plane including the rotation center line (rotation axis).

FIG. 35 is a longitudinal sectional view of the coupling member 428 according to Embodiment 4 and the main assembly driving shaft 101 taken along the rotation center line (rotation axis).

Figure 36:
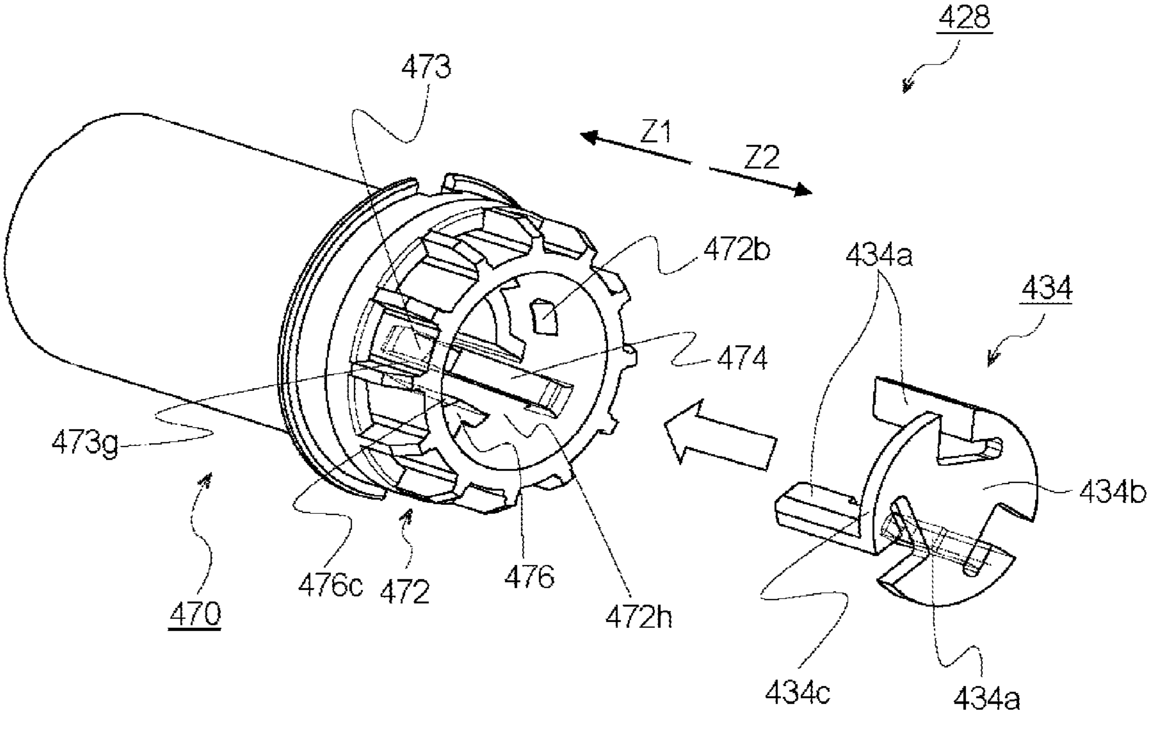
FIG. 36 is a perspective view illustrating assembling of an aligning member 434 to the flange member 470 according to the Embodiment 4.

FIG. 36 is a perspective view illustrating the assembling of the backup member 434 to the flange member 470 according to Embodiment 4.

Figure 37:
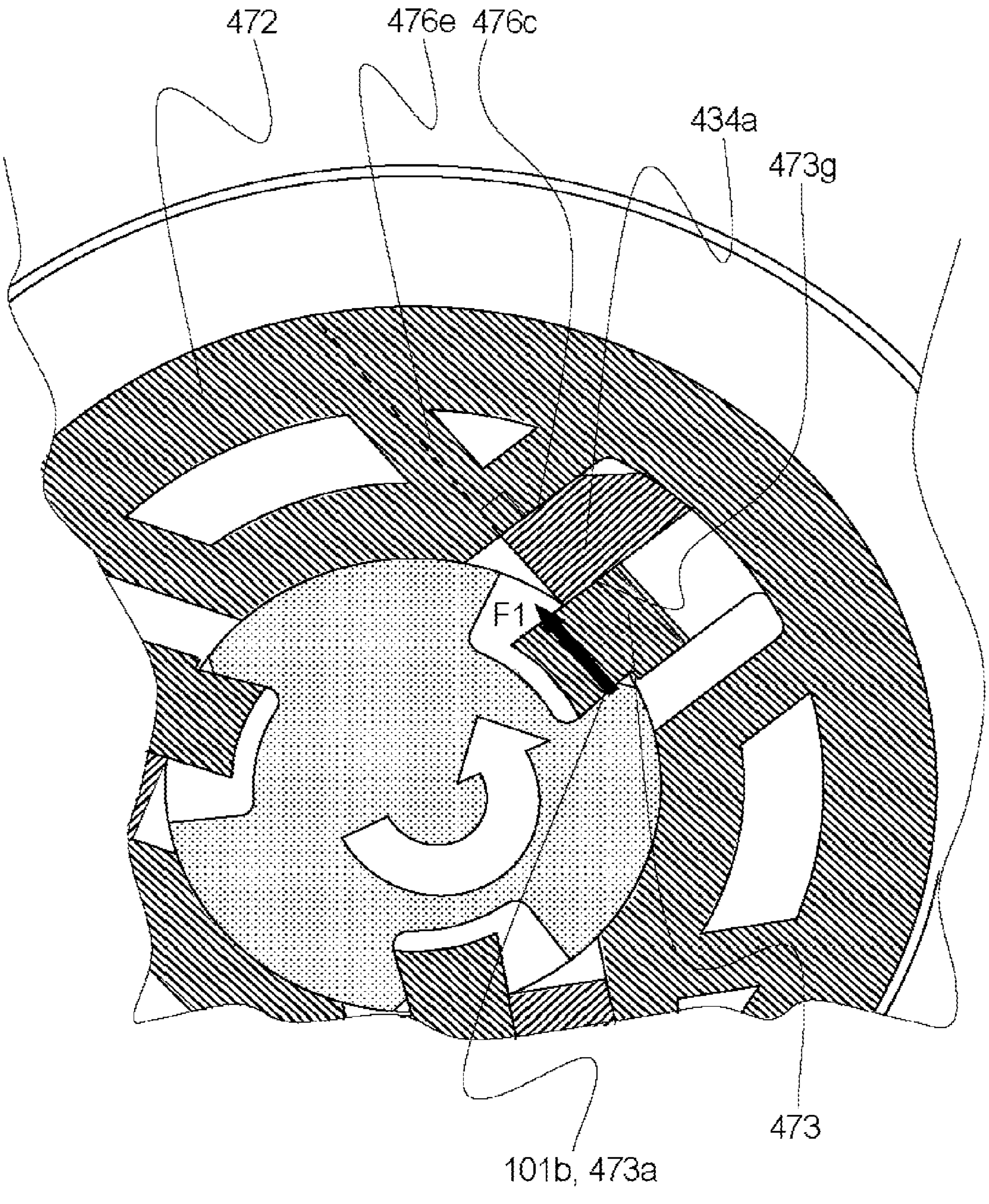
FIG. 37 is a cross-sectional view of the main assembly driving shaft 101 and the coupling member 428 according to the Embodiment 4 taken along a plane perpendicular to the rotational axis and passing through the driving force receiving surface 473*a*.

FIG. 37 is a cross-sectional view of the main assembly driving shaft 101 and the coupling member 428 according to Embodiment 4 taken along a plane perpendicular to the rotation axis and including at a position passing through a driving force receiving surface (driving force receiving portion) 473*a*.

Figure 38:
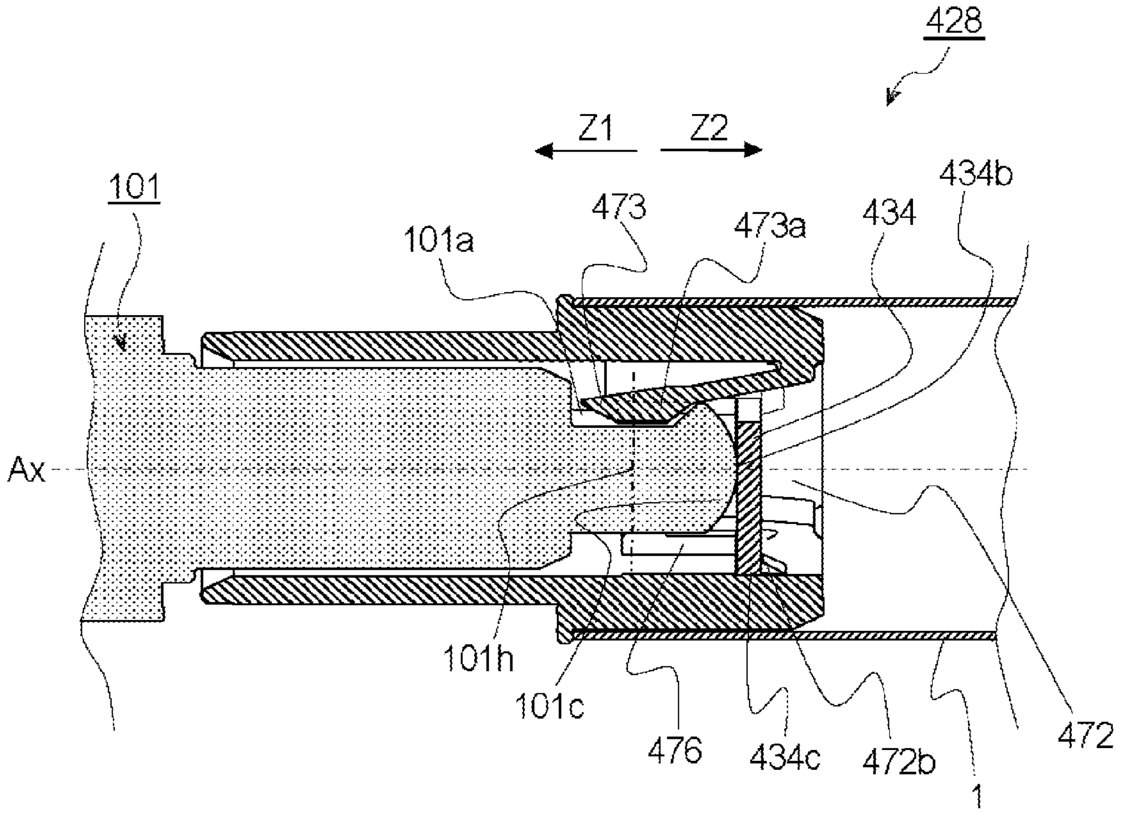
FIG. 38 is a cross-sectional view of the coupling member 428 of another example according to the Embodiment 4 and the main assembly driving shaft 101 taken along a plane including the rotation center line (rotation axis).

FIG. 38 is a longitudinal sectional view of the coupling member 428 of another example according to Embodiment 4 and the main assembly driving shaft 101 taken along the rotation center line (rotation axis).

The coupling member 428 is formed by combining two parts, namely, a flange member 470 and a backup member 434.

In the flange member 470, the cylindrical portion 471, the mounting portion 472, the base portion 474, the engagement portion 473, the radial positioning portion 476*a* of the aligning portion 476, the receiving surface 476*c*, and the hooked portion 472*b* are disposed on the mounting portion 472. The receiving surface 476*c* and the engaging portion 473 are surfaces for sandwiching the backup portion 434*a* described later. The hooking portion 472*b* has a shape for fixing the backup member 434 to the flange member 470.

The engaging portion 473 is provided with a driving force receiving portion for receiving the driving force from the main assembly driving shaft 101 of the image forming apparatus main assembly. The engaging portion 473 and the base portion 474 are support portions for movably supporting the driving force receiving portion.

The flange member 470 is a driving force receiving member for receiving a driving force from the main assembly driving shaft 101 by way of a driving force receiving portion provided in the engaging portion 473.

In the backup member 434, a backup section 434*a*, a butting section 434*b*, and a press-fit section 434*c* are provided. The backup portion 434*a* is assembled into a gap in the upstream side with respect to the rotational direction of the engagement portion 473 of the gap between the engagement portion 473 and the aligning portion 476, and has a shape effective to suppress the tilting of the engagement portion 473 and the base portion 274. The abutment portion 434*b* has such a shape that a semispherical shape 101*c* at the free end of the main assembly driving shaft 101 abuts when driving of the main assembly driving shaft 101 is transmitted to the coupling member 428.

The press-fit portion 434*c* is so shaped as to fix the backup member 434 to the flange member 470 by being press-fitted into the mounting portion 472 of the flange member 470. (Description on Flange Member).

Referring to FIGS. 31, 32, and 33, the flange member 470 will be described.

As shown in FIG. 32, the mounting portion 472 of the flange member 470 has a hook portion 472*b* having a shape for mounting the backup member 434 to the flange member 470. The hooking portion 472*b* has a shape protruding from the inner peripheral surface 472*h* of the mounting portion 472, and as shown in FIG. 31, a plurality of the hooking portions 472*b* are disposed at phases different from the base portion 474 and the engaging portion 473 in the circumferential direction of the flange member 470. In this embodiment, the flange members 470 are arranged at three positions (120 degrees intervals, substantially equal intervals) at regular intervals in the circumferential direction of the flange member 470.

As shown in FIG. 32, the hooking portion 472*b* has, in the downstream side with respect to the Z1 direction, a surface substantially perpendicular to the Z shaft, and has, on the downstream side with respect to the Z2 direction, a taper shape to be used when assembling the backup member 434.

In addition, as the aligning portion 476 is viewed along the Z direction, the mounting portion 472 has a hole 476*d* in the range of about 1 mm around the mounting portion 472 (FIGS. 31, 32).

By providing the hole 476*d* and providing a gap of about 1 mm around the mounting portion 472, it is possible to manufacture the flange member 470 using a simple metal mold.

As shown in FIGS. 31 and 33, the aligning portion 476 has a receiving surface 476*c*. The backup portion 434*a* of the backup member 434 is sandwiched by a pinching surface 473*g* and the receiving surface 476*c* which are portions radially outward of the shaft portion 101*f* of the main assembly driving shaft 101 of the engaging portion 473. The sandwiching surface 473*g* and the receiving surface 476*c* are substantially parallel surfaces.

Further, as shown in FIG. 33, the aligning portion 476 has a rib 476*e* which is substantially perpendicular to the receiving surface 476*c*, an extended line thereof passes through the end of the pinching surface 473*g* on the shaft portion 101*f* side. (Description of backup member).

Referring to FIGS. 30, 34, 35, 36, the backup member 434 will be described.

The backup member 434 has a backup portion 434*a*, an abutment portion 434*b*, and a press-fit portion 434*c*.

As shown in FIG. 30, the back-up portion 434*a* is arranged so as to be assembled in a gap between the sandwiching surface 473*g* of each engaging portion 473 and the receiving surface 476*c*. The thickness is set to be approximately the same as the gap between the surface 473*g* and the receiving surface 476*c*. Further, as shown in FIG. 34, the circle connecting the ridge lines on the side of the sandwiching surface 473*g* of the backup portion 434*a* is disposed such that the center thereof is the same as the press-fitting portion 434*c*, and the diameter D8 thereof is approximately the same as the outer diameter D7 of the radial positioning portion 476*a*.

In the same manner as the abutment portion 76*b* of Embodiment 1, in the state that the abutment portion 434*b* abuts to the semispherical shape 101*c*, the center 101*h* of the semispherical shape 101*c* of the main assembly driving shaft 101 falls within the range of the driving force receiving surface 473*a* (FIG. 35).

The press-fit portion 434*c* is press-fitted into the inner peripheral cylinder 472*h* of the mounting portion 472 of the flange member 470. As shown in FIG. 35, the thickness of the press-fit portion 434*c* is set to be substantially the same as the gap between the vertical surface on the Z1 direction side of the hook portion 472*b* and the aligning portion 476 in the Z direction.

The backup member 434 having the above-described shape is assembled to the flange member 470 from the Z2 direction in the Z1 direction, thereby forming the coupling member 428 (shown in FIG. 36).

[Driving of Coupling Member by Main Assembly Drive Shaft]

Referring to FIG. 37, the transmission of rotational drive from the main driving shaft 101 to the coupling member 428 will be described.

When the driving force receiving surface 473*a* of the coupling member 428 abuts to the main assembly drive transmission surface 101*b*, the cleaning blade 26, the charging roller 22, and the like apply loads to the photosensitive drum unit 430. That is, the driving force receiving surface 473*a* rotates integrally with the driving transmission surface 101*b* while receiving the load (driving force) F1.

When this driving force F1 is received by the driving force receiving surface 473*a*, the driving force F1 is transmitted to the pinching surface 473*g* opposite to the driving force receiving surface 473*a* of the engaging portion 473 as shown in FIG. 37. The engaging portion 473 is backed up by the mounting portion 472 by way of the backup portion 434*a*, the receiving surface 476*c*, and the rib 476*e*, and therefore, the engaging portion 473 is not substantially deformed toward the downstream side in the rotational direction. As a result, the driving force receiving surface 473*a* can be stably brought into contact with the main assembly driving force receiving surface 101*a*, and the photosensitive drum unit 430 can be pulled toward the borne portion 101*d* side of the main assembly driving shaft 101. Even if the load F fluctuates, the engaging portion 473 is backed up as described above, since the engaging portion 473 is substantially not deformed, and therefore, the rotation amount of the photosensitive drum 1 does not substantially change, and the quality of the image quality can be maintained.

That is, the backup portion 434_b_ is a member for restricting the driving force receiving portion provided in the engaging portion 474 from moving in the rotational direction of the drum unit (the circumferential direction of the coupling member).

In this embodiment, the engaging portion 473 (and the driving force receiving portion provided in the engaging portion 473) is provided inside the cylindrical portion 471 in the Z direction (FIG. 35). That is, the engaging portion 473 is located outside the photosensitive drum 1 in the Z direction. However, as shown in FIG. 38, even if the driving force receiving surface 473_a_ (the engaging portion 473) is provided inside the mounting portion 72 in the Z direction, it is good similarly to Embodiment 3. At this time, similarly to the Embodiment 3, the photosensitive drum 1 can be arranged close to the main driving shaft 101 side. Therefore, it is possible to contribute to downsizing of the cartridge 7 and the image forming apparatus 100 in the Z direction. Or, the base portion and the engaging portion 473 can be protected by disposing a part of the base portion and the engaging portion 473 on the rear side of the photosensitive drum 1.

Embodiment 5

Referring to FIGS. 39 to 57, Embodiment 5 will be described.

In this embodiment, a support portion (engaging portion 573, base portion 574) movably supporting the driving force receiving portion 573_a_ extends at least in the circumferential direction of the coupling member 528.

Elements corresponding to those of the above-described embodiment (particularly, the Embodiment 2) are assigned by the same names, and descriptions of the similar points to those of the above-described elements may be omitted. The description will be made mainly about the differences from the abovementioned elements.

Figure 39:
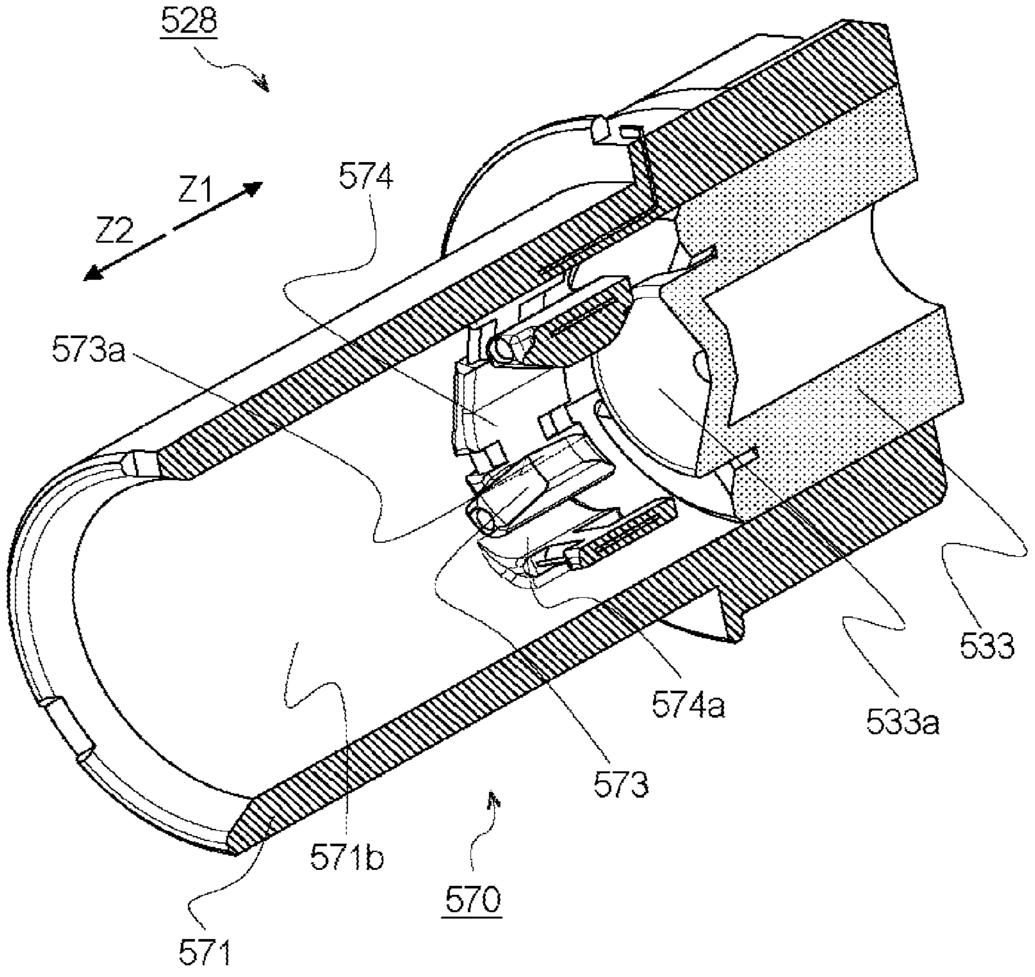
FIG. 39 is a cross-sectional perspective view of a coupling member 528 according to Embodiment 5.

FIG. 39 is a cross-sectional perspective view of a coupling member 528 according to Embodiment 5.

Figure 40:
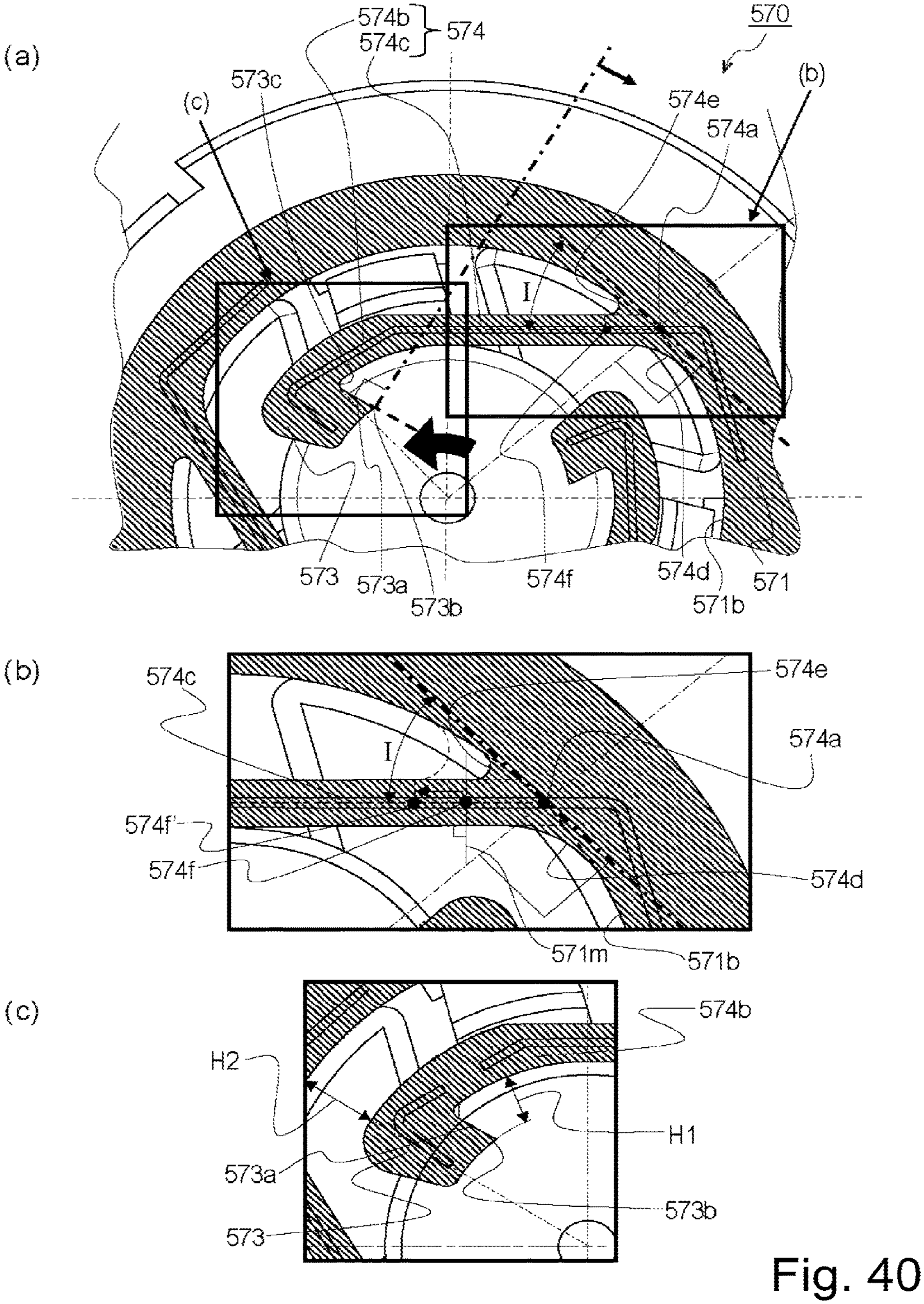
FIG. 40 is cross-sectional views of the coupling member 528 according to Embodiment 5 taken along a plane perpendicular to the rotation axis at a position passing through the drive transmission portion 573.

FIG. 40 is cross-sectional views of the coupling member 528 according to Embodiment 5 taken along a plane perpendicular to the rotation axis and including a position passing through the drive transmission portion 573.

Figure 41:
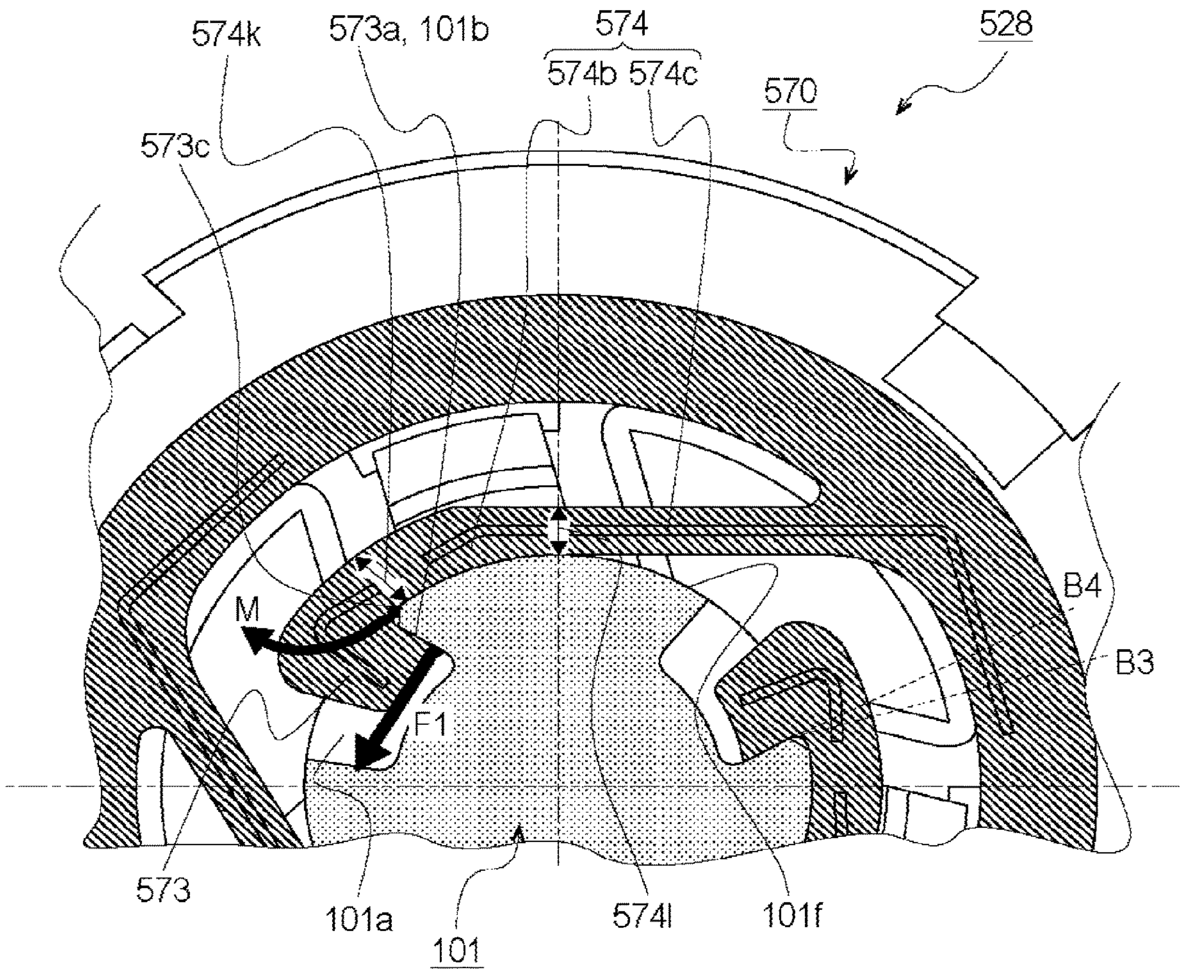
FIG. 41 is a cross-sectional view of the coupling member 528 and the main assembly driving shaft 101 according to Embodiment 5, taken along a plane perpendicular to the rotation axis and including a position passing through the drive transmission portion 573.

FIG. 41 is a cross-sectional view of the coupling member 528 and the main assembly driving shaft 101 according to Embodiment 5 taken along a plane perpendicular to the rotation axis and including a position passing through the engagement portion 573.

Figure 42:
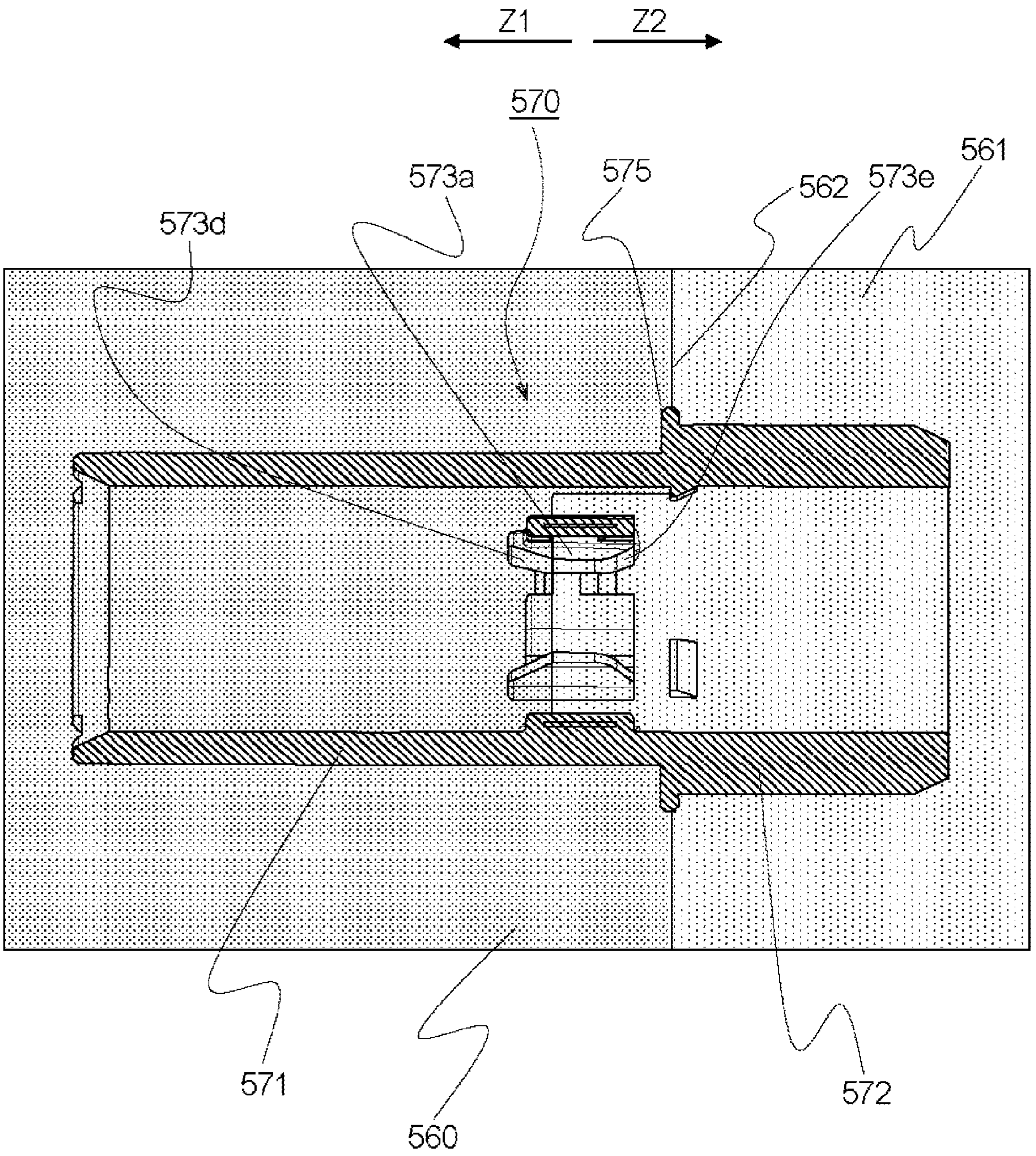
FIG. 42 illustrates the structure of a mold used for forming a flange member 570 according to Embodiment 5.

FIG. 42 illustrates the structure of a mold used for forming the flange member 570 according to Embodiment 5.

Figure 43:
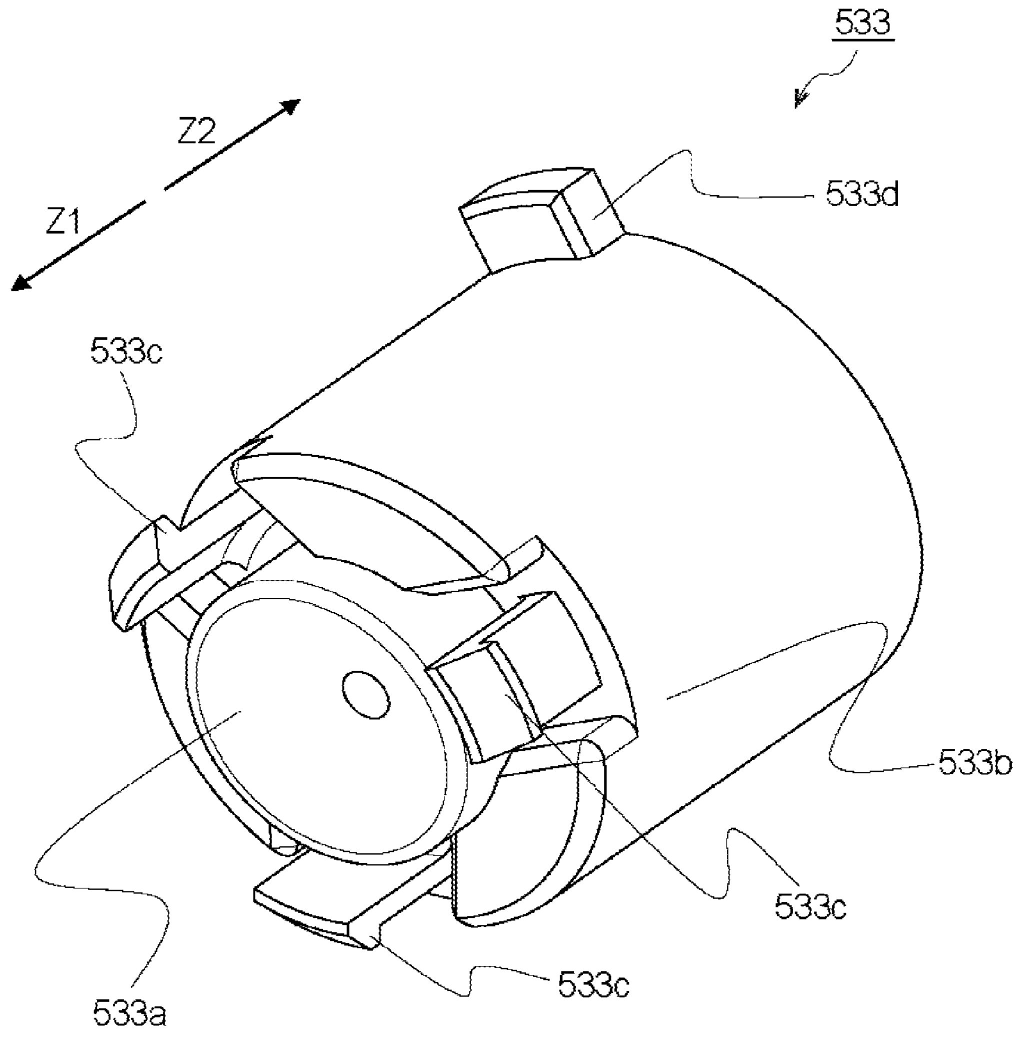
FIG. 43 is a perspective view of an alignment member 533 according to Embodiment 5.

FIG. 43 is a perspective view of an alignment member 533 according to Embodiment 5.

Figure 44:
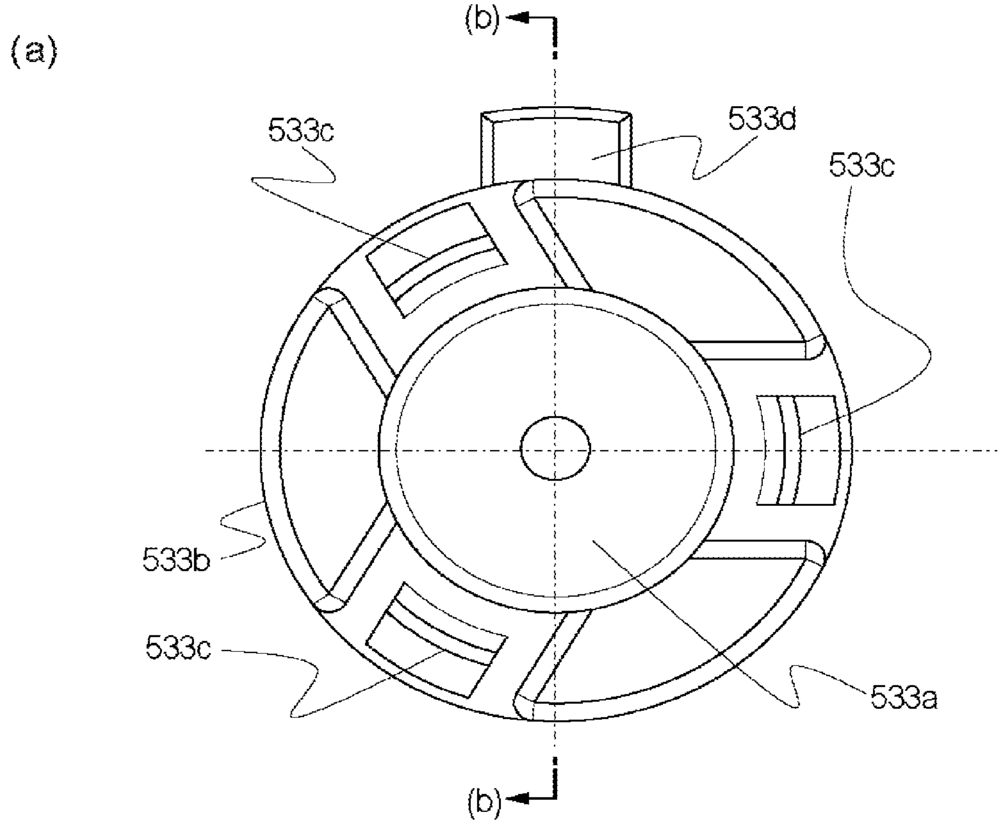
FIG. 44 is views of the alignment member 533 according to Embodiment 5 as viewed in the Z direction from the outer side.
Figure 44:
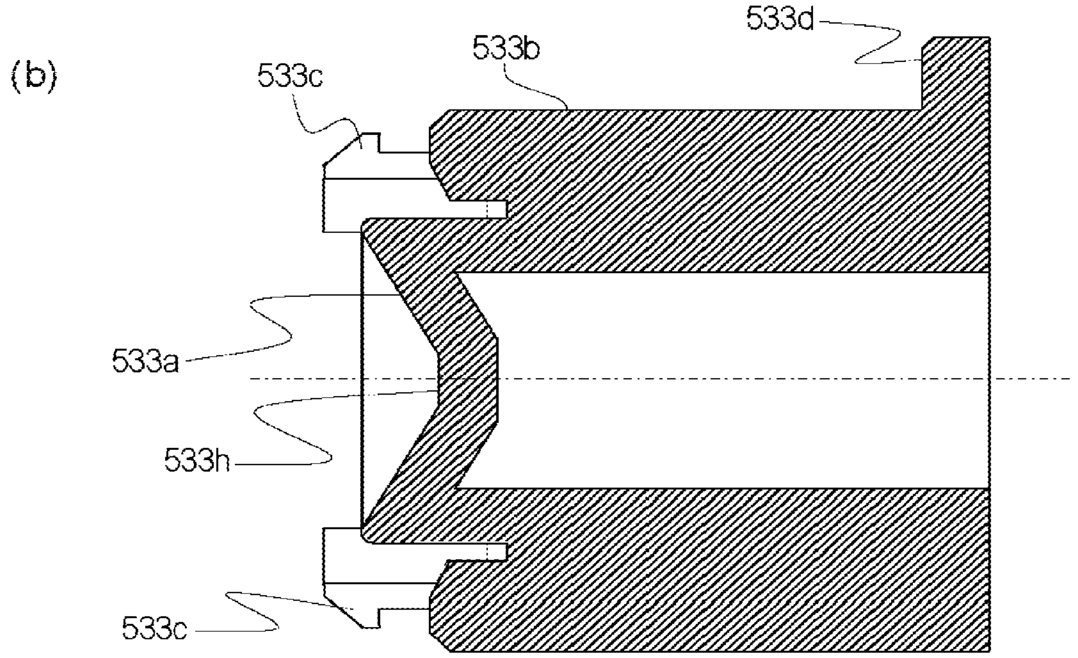

FIG. 44 is an illustration of the alignment member 533 according to Embodiment 5 as viewed in the Z direction from the outer side.

Figure 45:
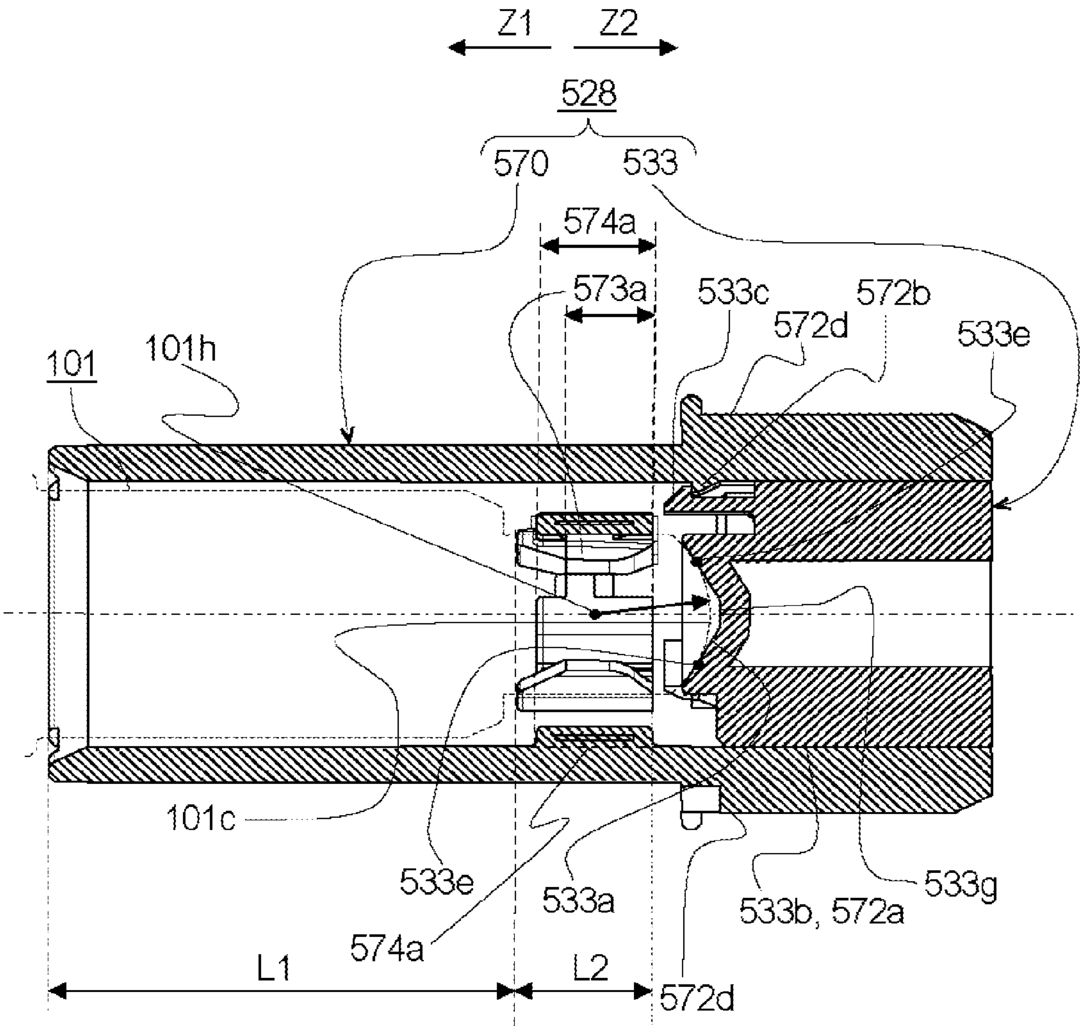
FIG. 45 is a sectional view of the coupling member 528 according to Embodiment 5.

FIG. 45 is a sectional view of the coupling member 528 according to Embodiment 5.

Figure 46:
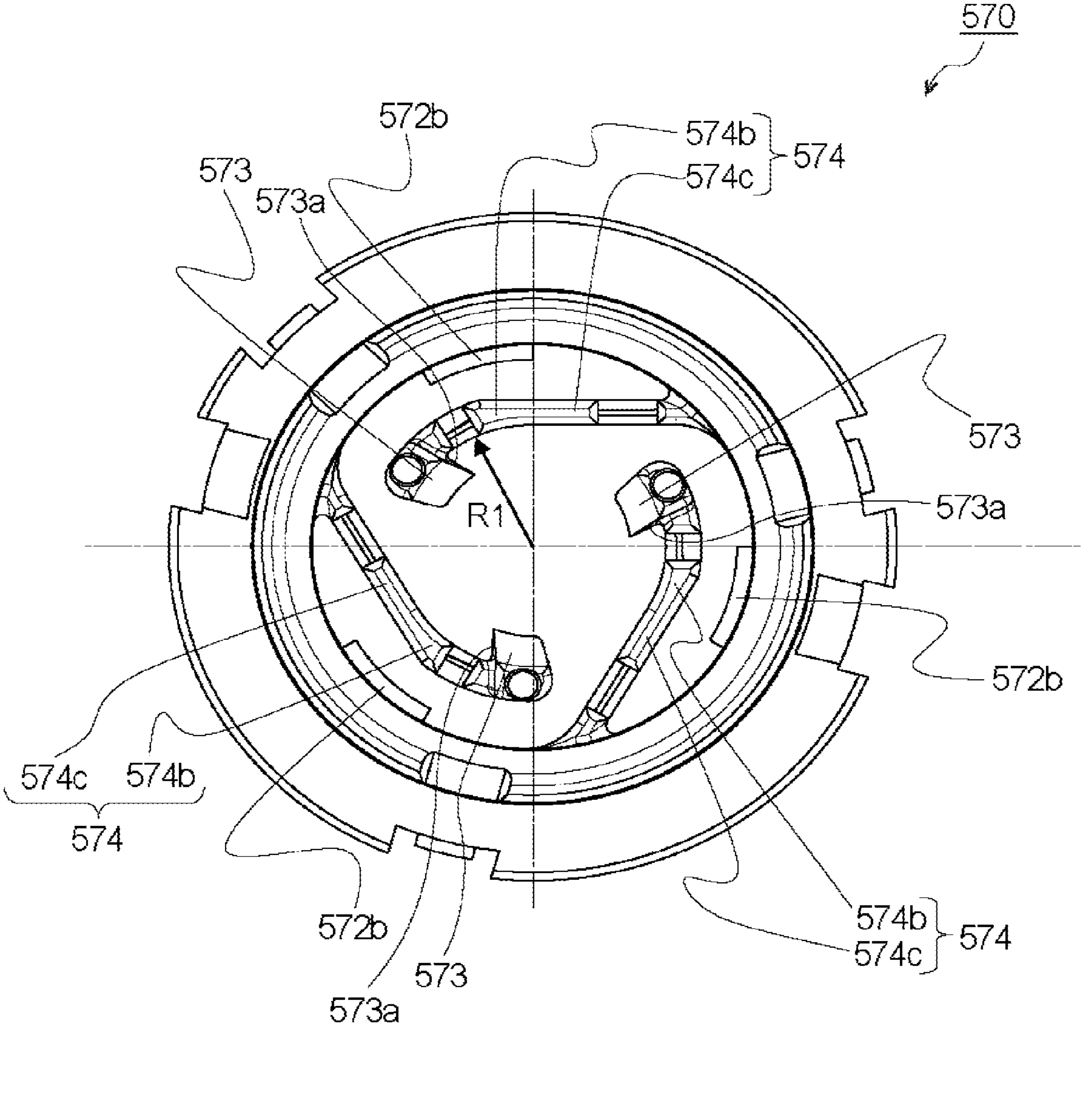
FIG. 46 is a view of the flange member 570 according to Embodiment 5 as viewed in the Z direction from the outer side.

FIG. 46 is a illustration of the flange member 570 according to Embodiment 5 as viewed in the Z direction from the outer side.

Figure 47:
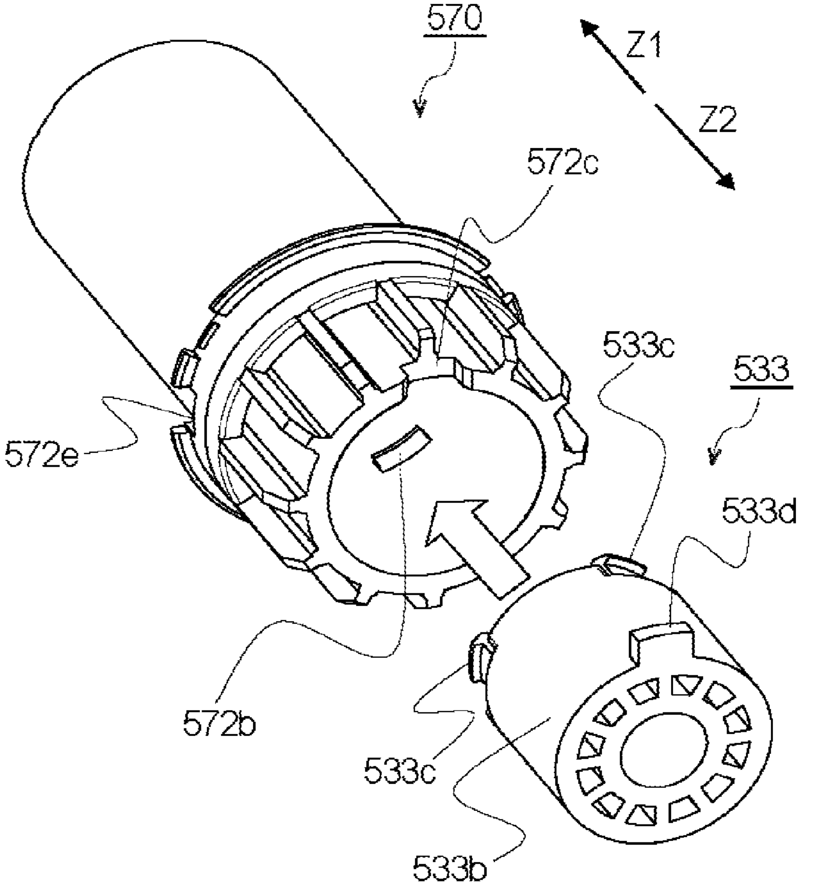
FIG. 47 is an illustration of the assembling of the coupling member 528 according to Embodiment 5.

FIG. 47 in an illustration of the assembly of the coupling member 528 according to Embodiment 5.

Figure 48:
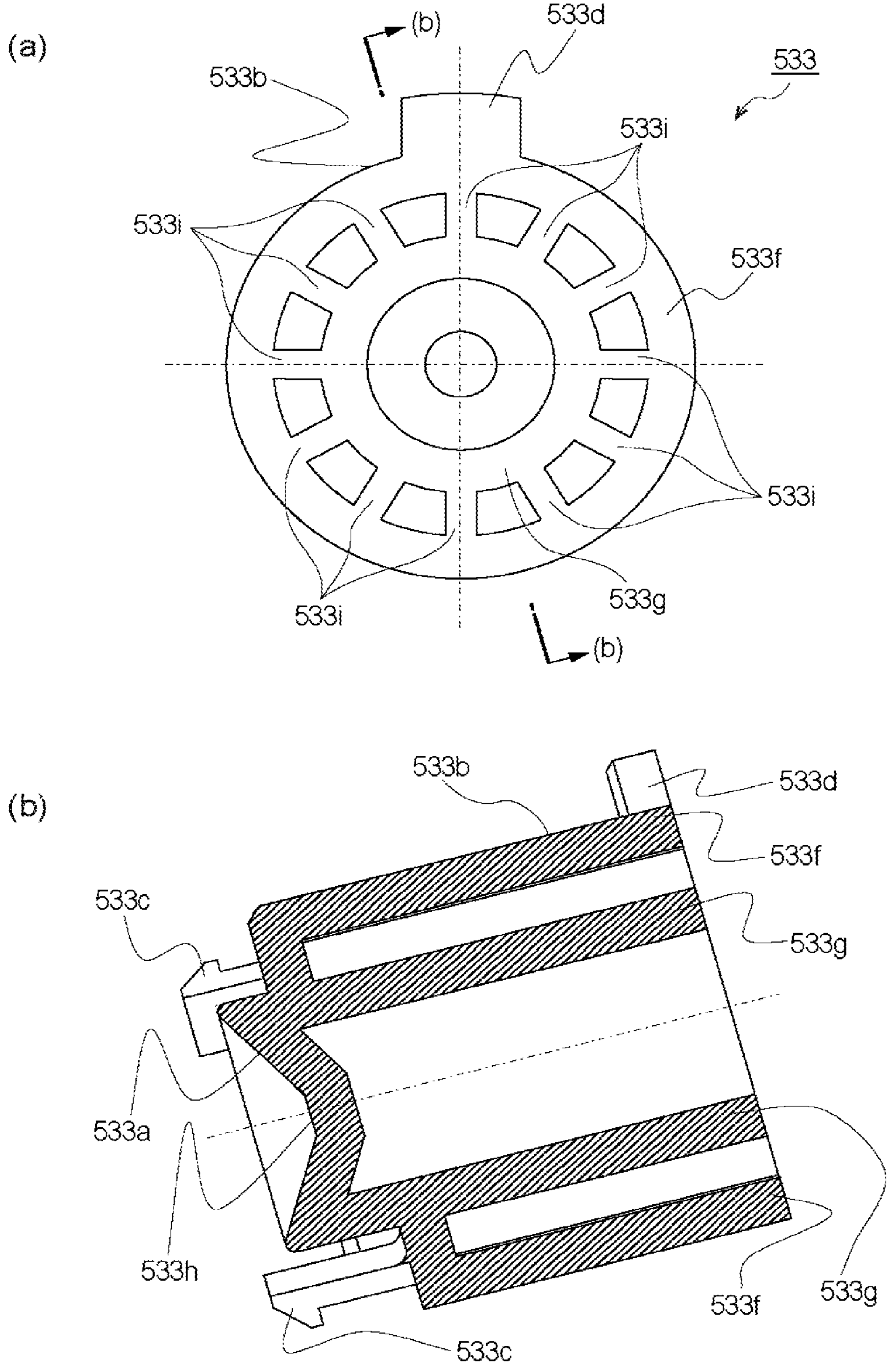
FIG. 48 is an illustration of the aligning member 533 according to Embodiment 5 as viewed from the inside in the Z direction.

FIG. 48 is an illustration of the aligning member 533 according to Embodiment 5 as viewed from the inside in the Z direction.

Figure 49:
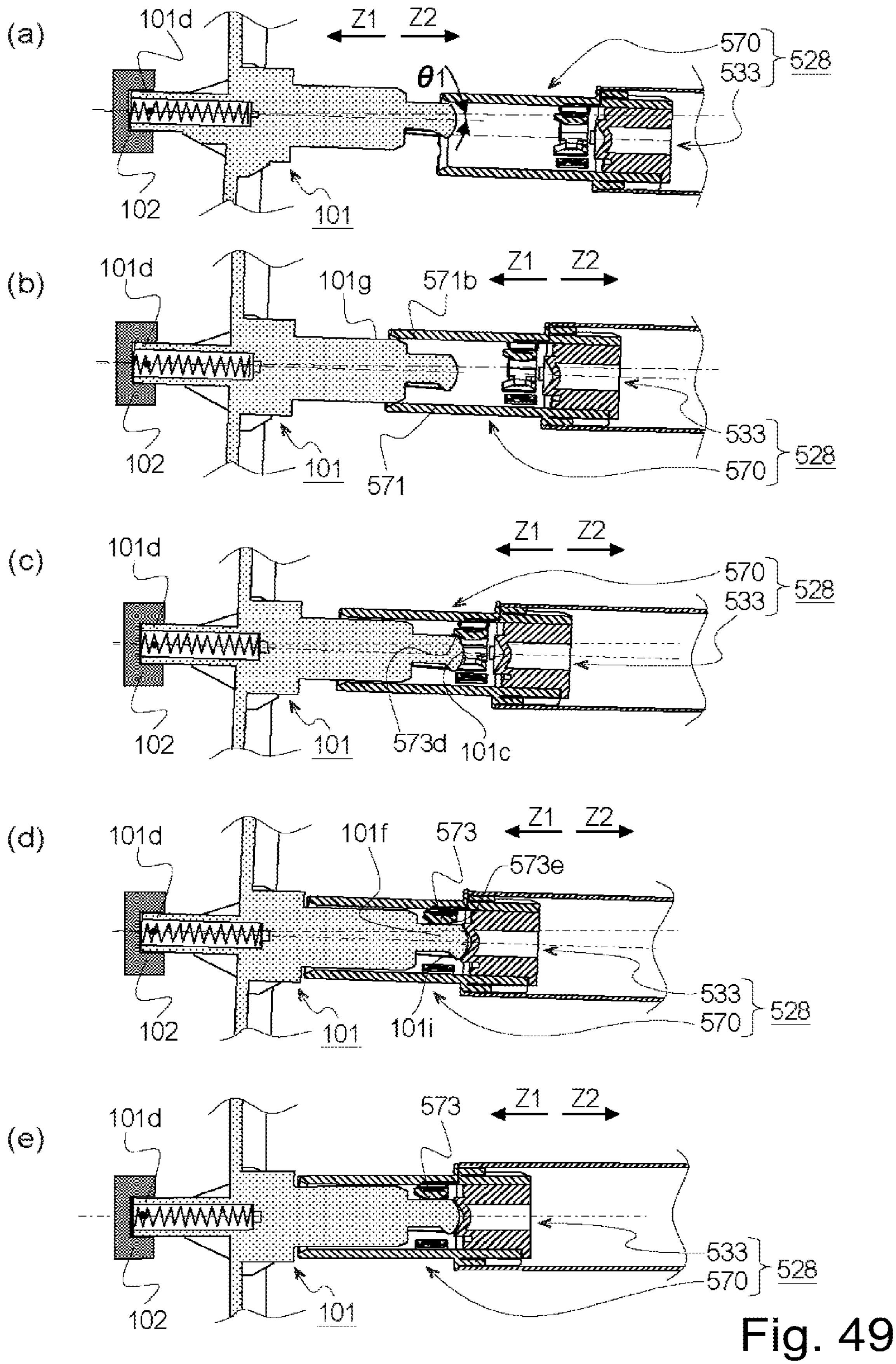
FIG. 49 is views illustrating the operation of mounting the coupling member 528 to the main drive shaft 101 according to Embodiment 5.

FIG. 49 is sectional views illustrating a operation of mounting the coupling member 528 to the main driving shaft 101 according to Embodiment 5.

Figure 50:
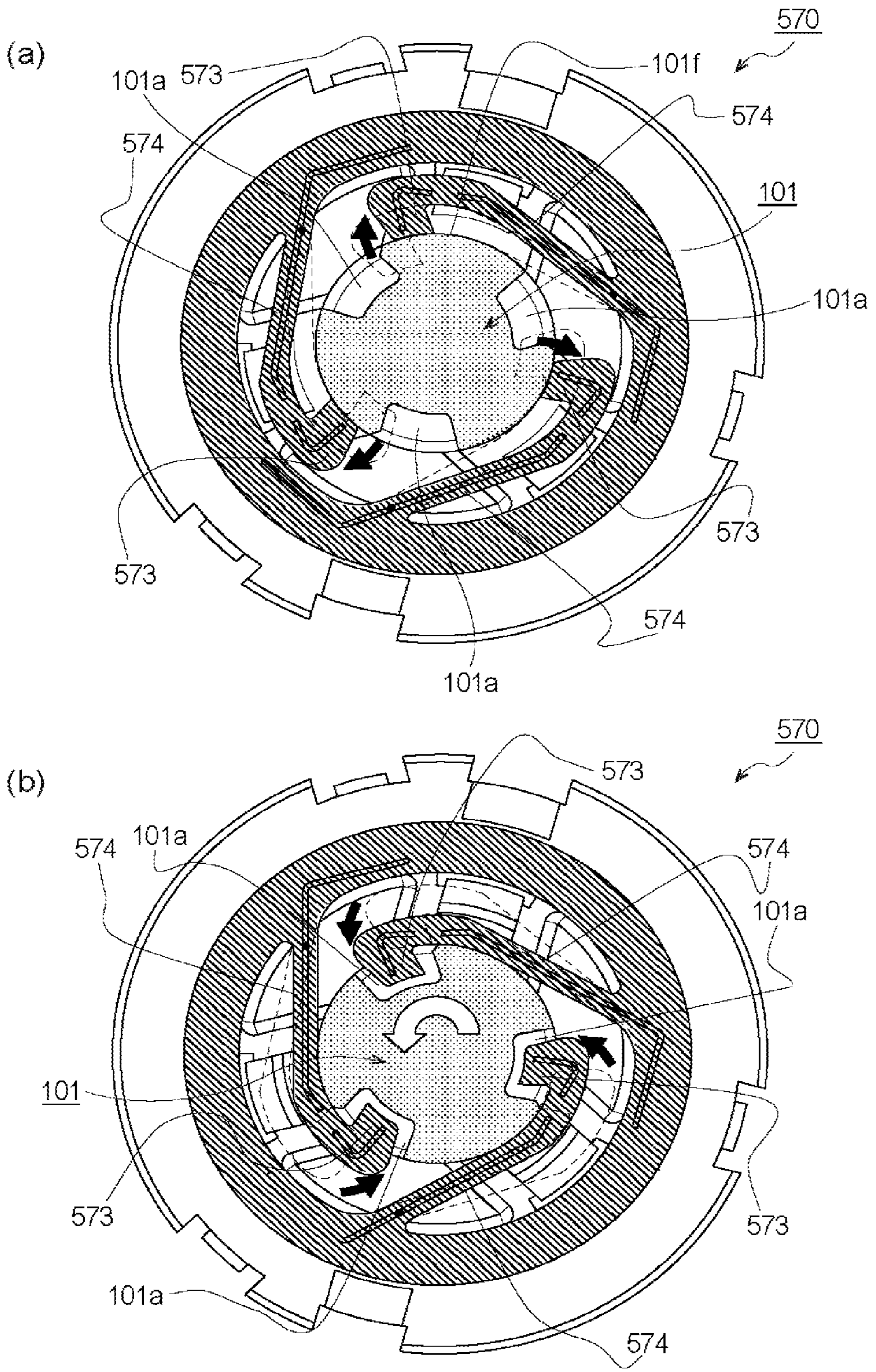
FIG. 50 is sectional views illustrating the operation of mounting the coupling member 528 to the main assembly driving shaft 101 according to Embodiment 5.

FIG. 50 is sectional views illustrating the operation of mounting the coupling member 528 to the main assembly driving shaft 101 according to Embodiment 5.

Figure 51:
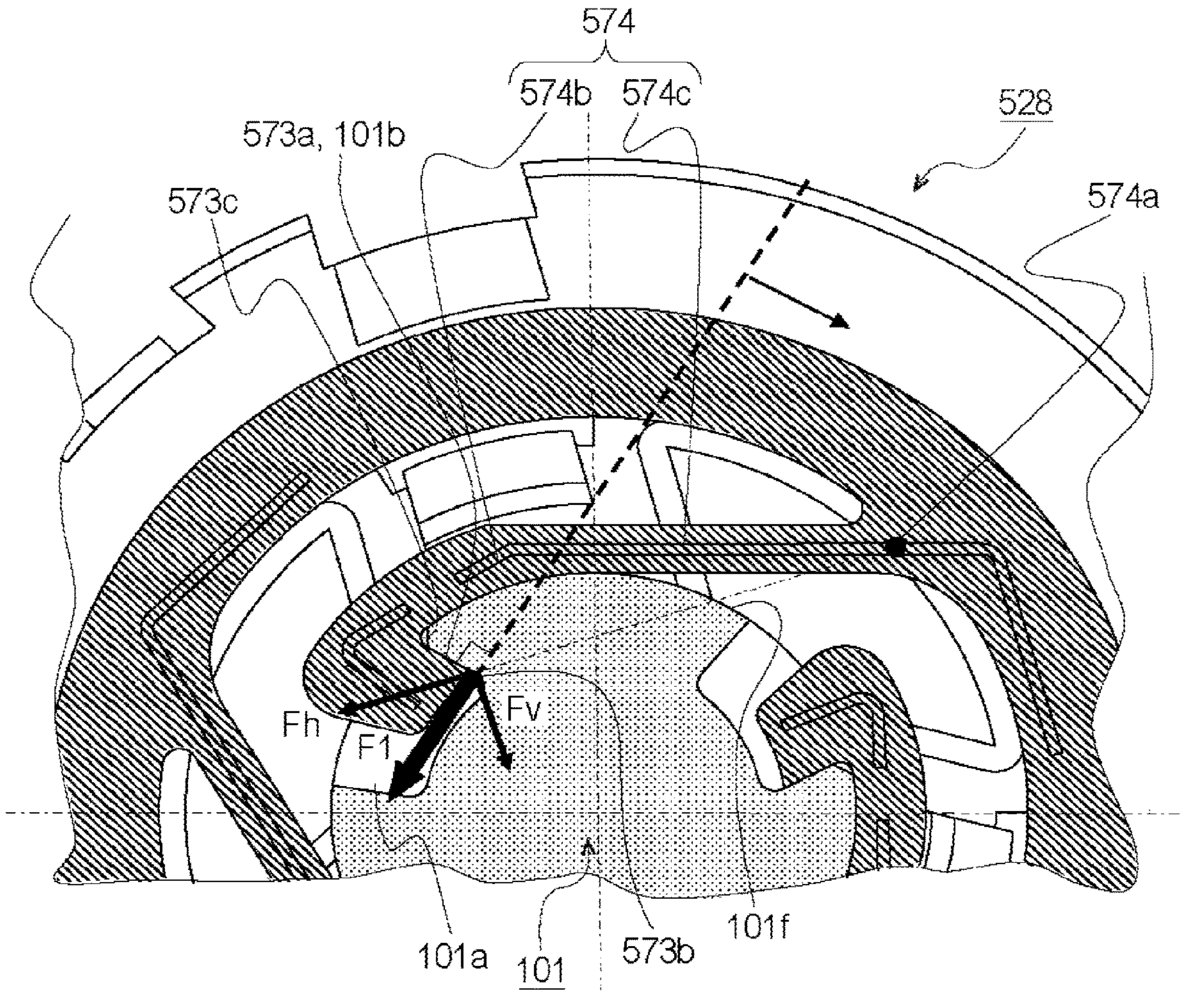
FIG. 51 is a sectional view illustrating drive transmission from the main assembly drive shaft 101 to the coupling member 528 according to Embodiment 5.

FIG. 51 is a sectional view illustrating drive transmission from the main assembly driving shaft 101 to the coupling member 528 according to Embodiment 5.

Figure 52:
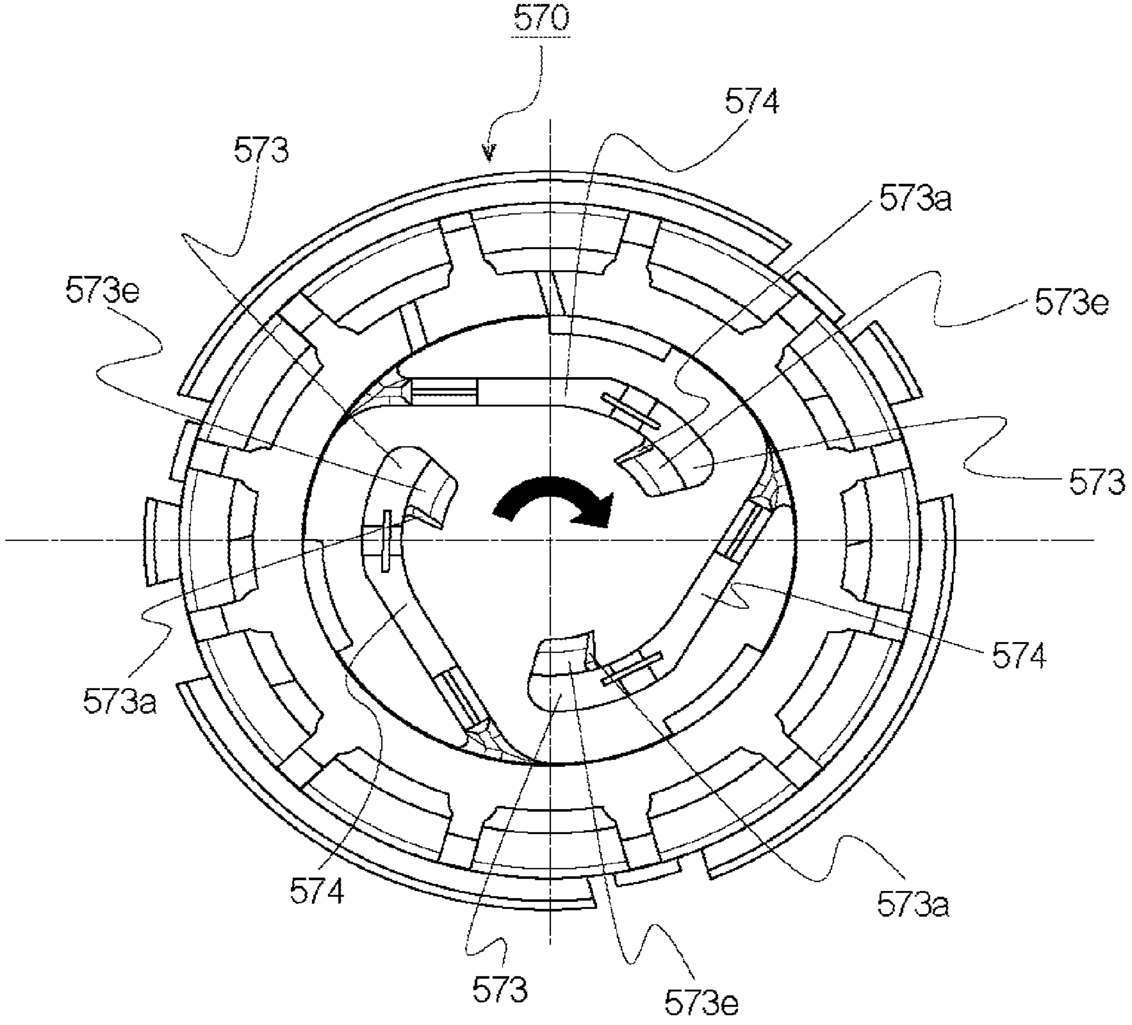
FIG. 52 is a view of the flange member 570 according to Embodiment 5 as viewed in the Z direction from the inner side.

FIG. 52 is a illustration of the flange member 570 according to Embodiment 5 as viewed in the Z direction from the inner side.

Figure 53:
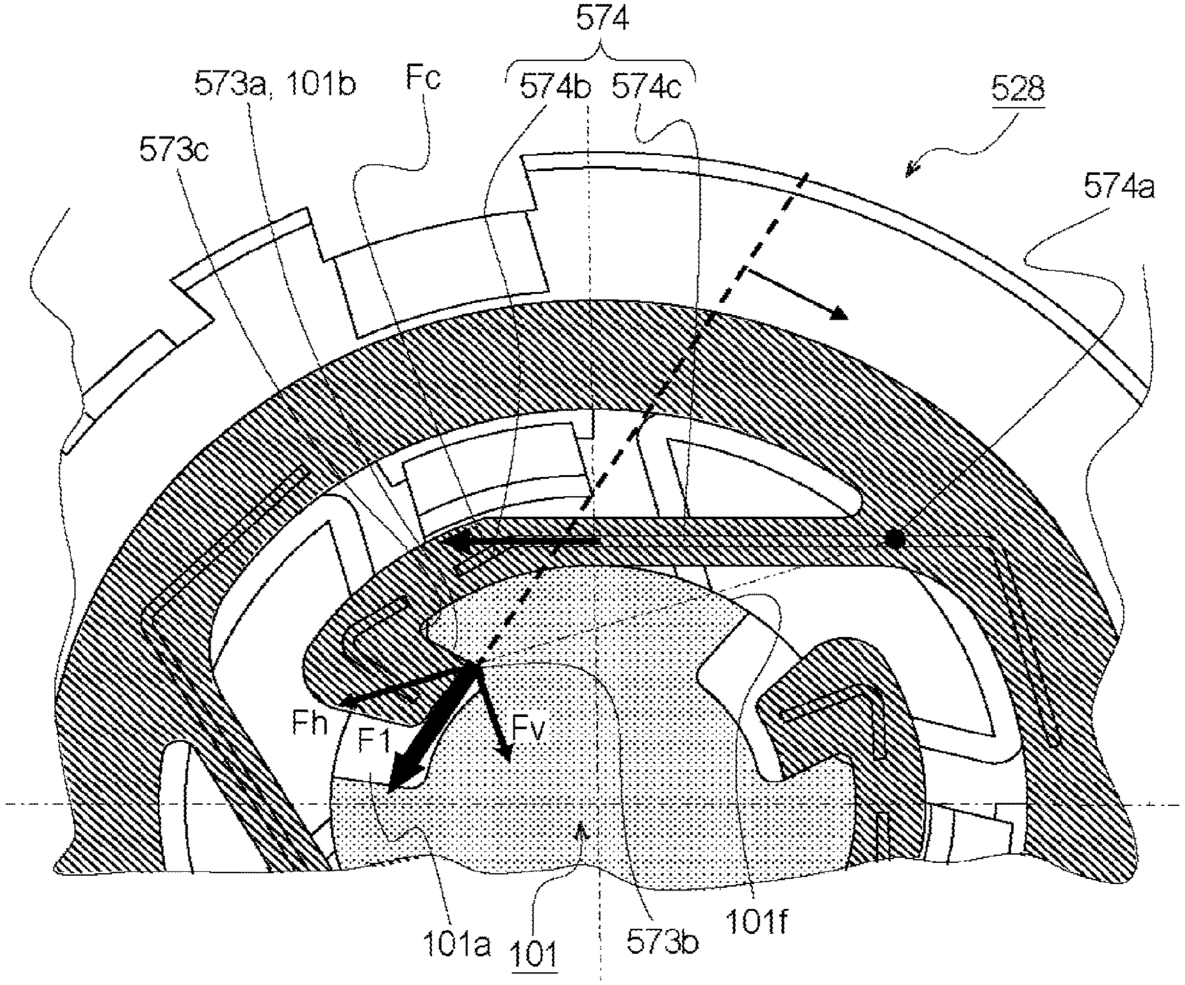
FIG. 53 is a sectional view illustrating the drive transmission from the main assembly drive shaft 101 to the coupling member 528 according to Embodiment 5.

FIG. 53 is a sectional view illustrating drive transmission from the main assembly driving shaft 101 to the coupling member 528 according to Embodiment 5.

Figure 54:
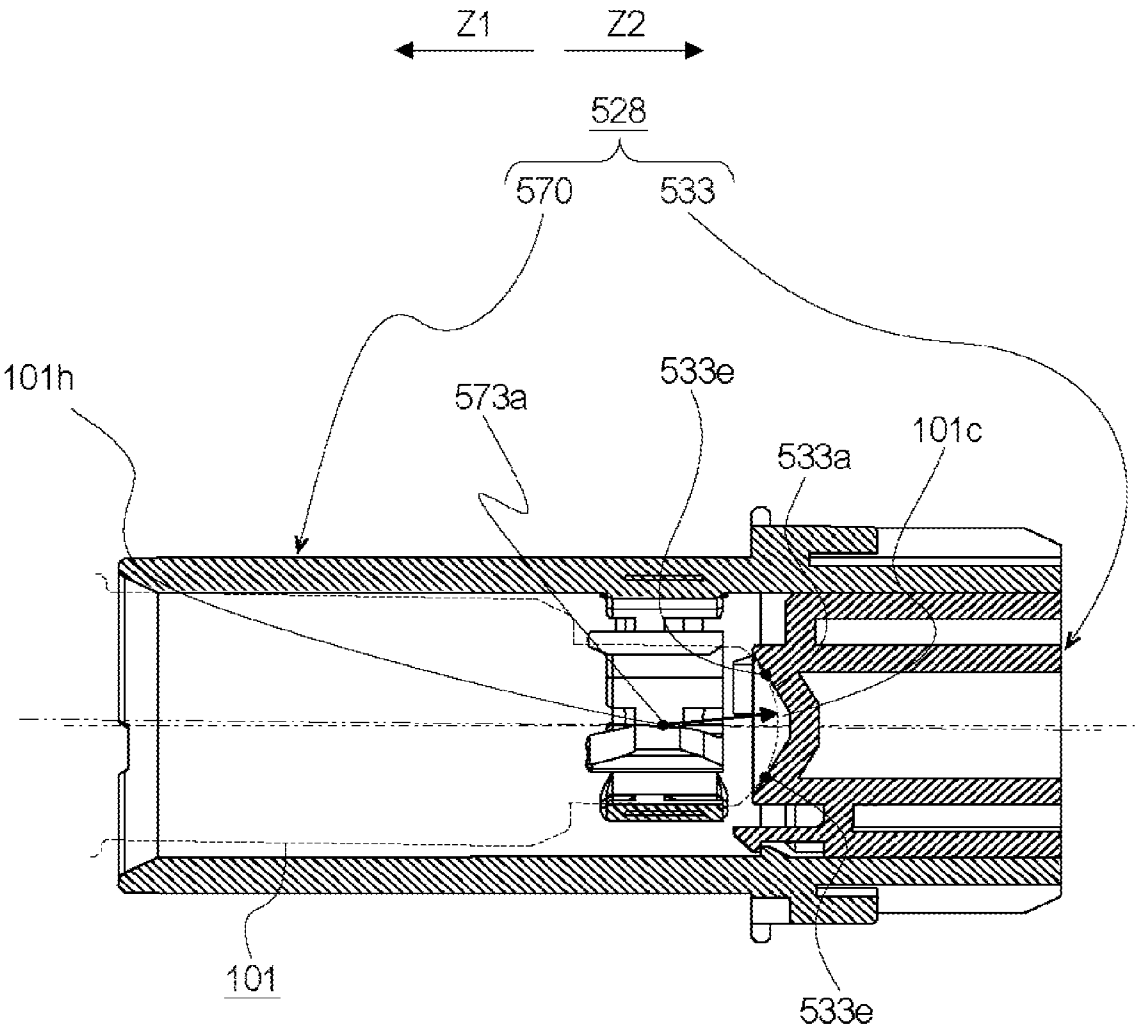
FIG. 54 is a cross-sectional view illustrating the state at the time when the positions of the main assembly drive shaft 101 and the coupling member 528 deviate from each other due to tolerances of parts in Embodiment 5.

FIG. 54 is a cross-sectional view in which the position of the main assembly driving shaft 101 and the coupling member 528 deviates from the tolerance of parts in Embodiment 5.

Figure 55:
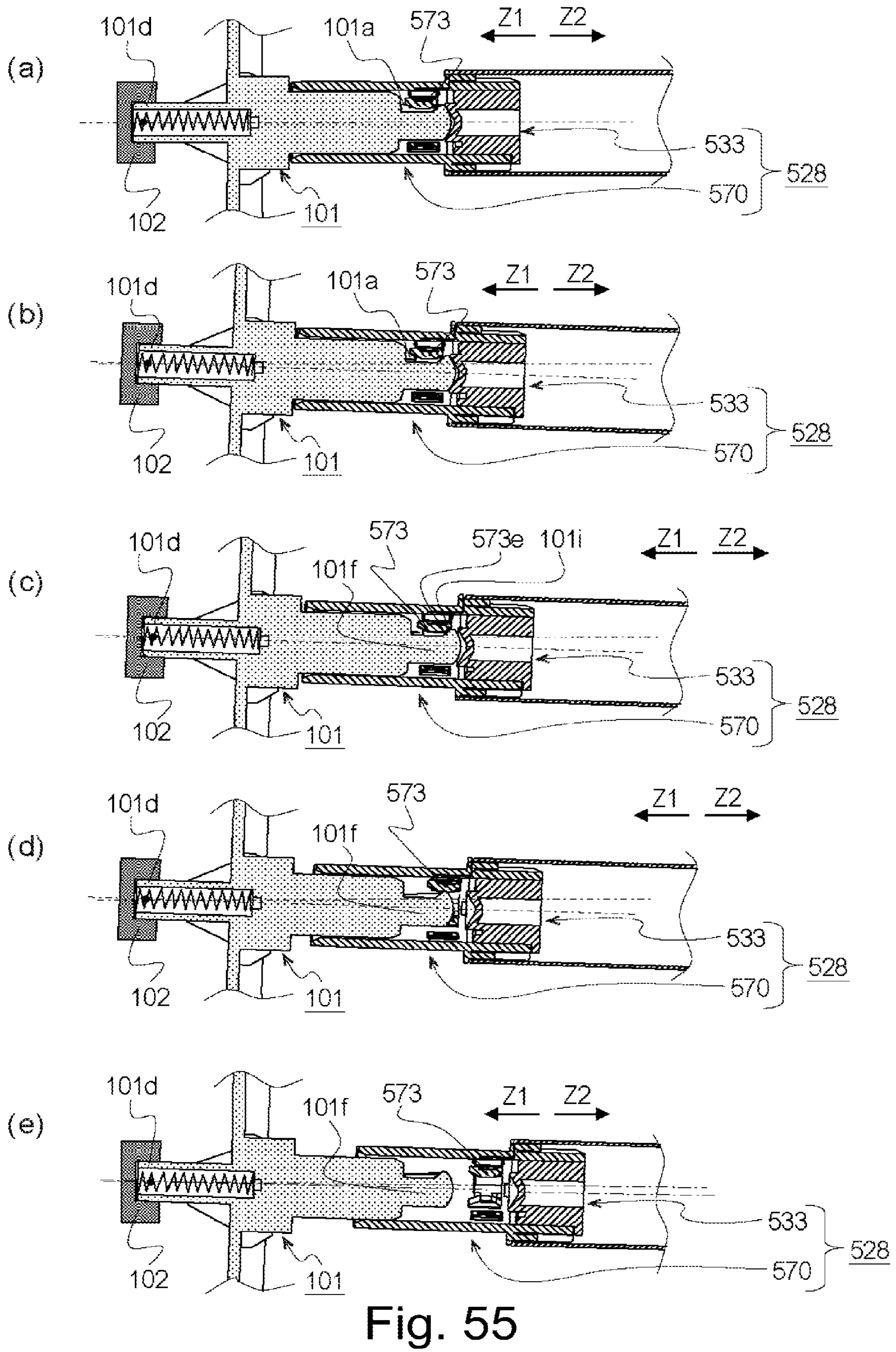
FIG. 55 is a sectional view illustrating the removal operation of the coupling member 528 from the main assembly drive shaft 101 according to Embodiment 5.

FIG. 55 is cross-sectional views illustrating a dismounting operation of the coupling member 528 from the main assembly driving shaft 101 according to Embodiment 5.

Figure 56:
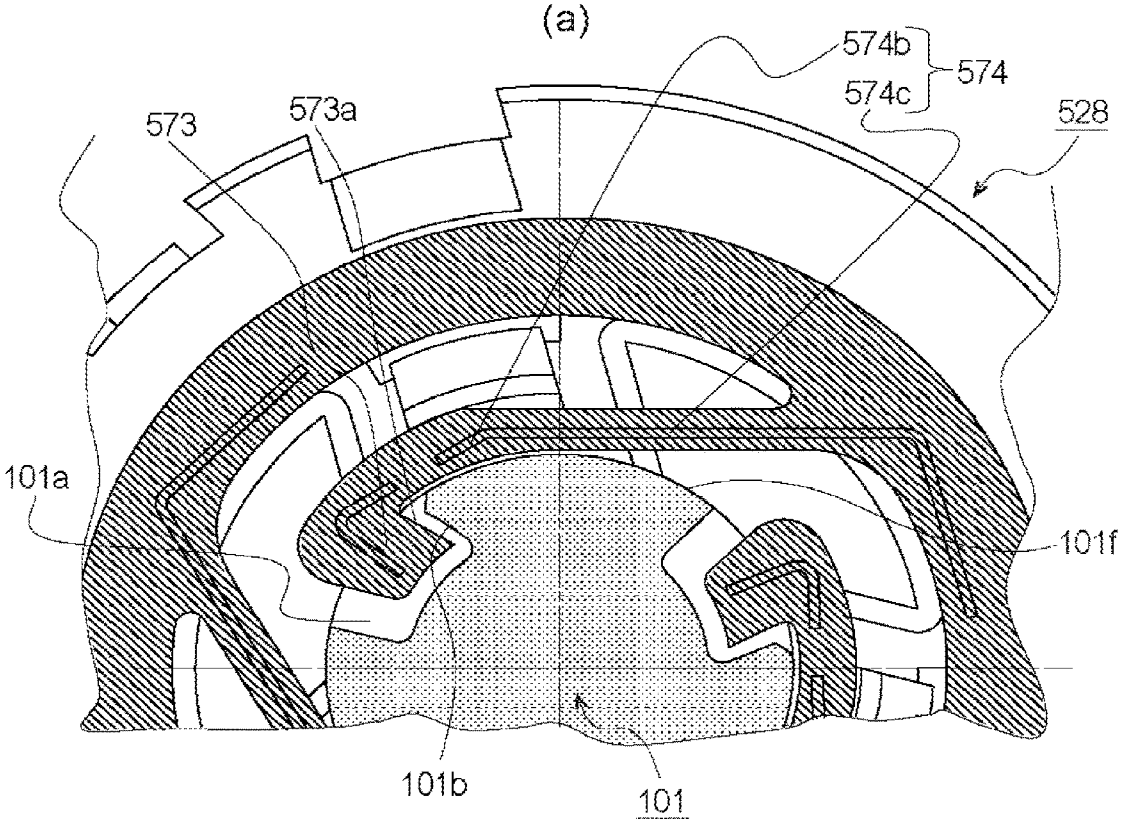
FIG. 56 is sectional views illustrating drive transmission when a winding portion 574*b* of the base portion 574 of the coupling member 528 according to Embodiment 5 is larger in diameter than the shaft portion 101*f* of the main assembly driving shaft 101.
Figure 56:
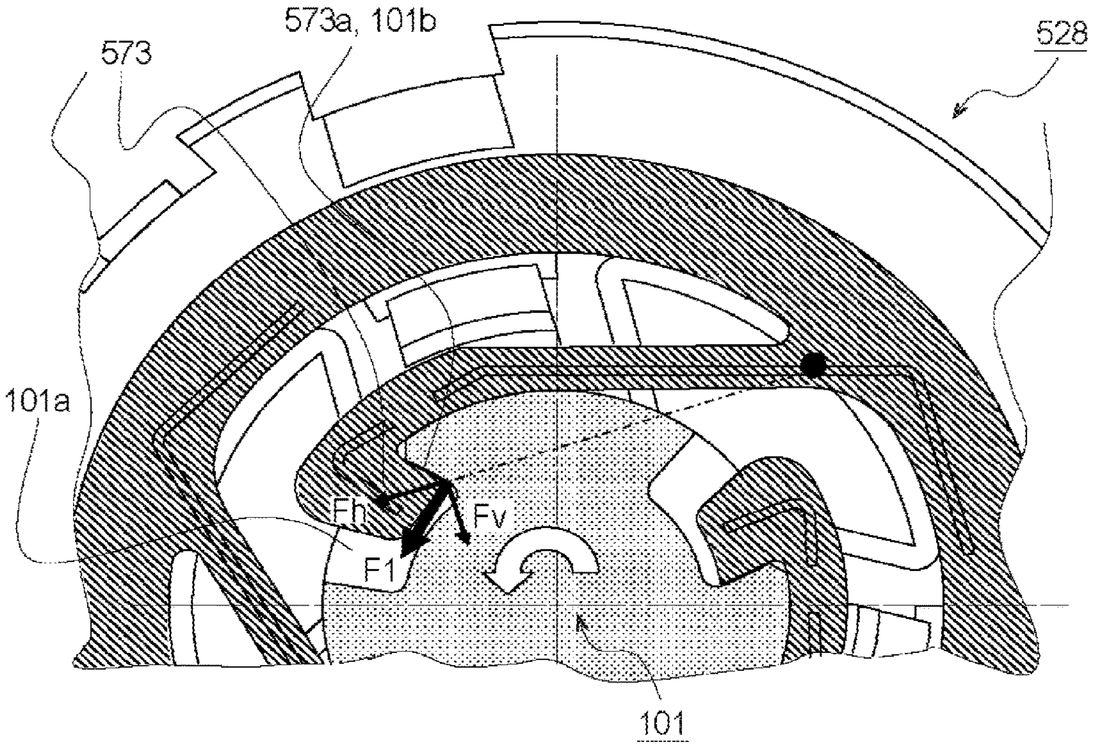

FIG. 56 is sectional views illustrating drive transmission in which a winding portion 574_b_ of the base portion 574 of the coupling member 528 according to Embodiment 5 is larger in diameter than the shaft portion 101_f_ of the main assembly driving shaft 101.

Figure 57:
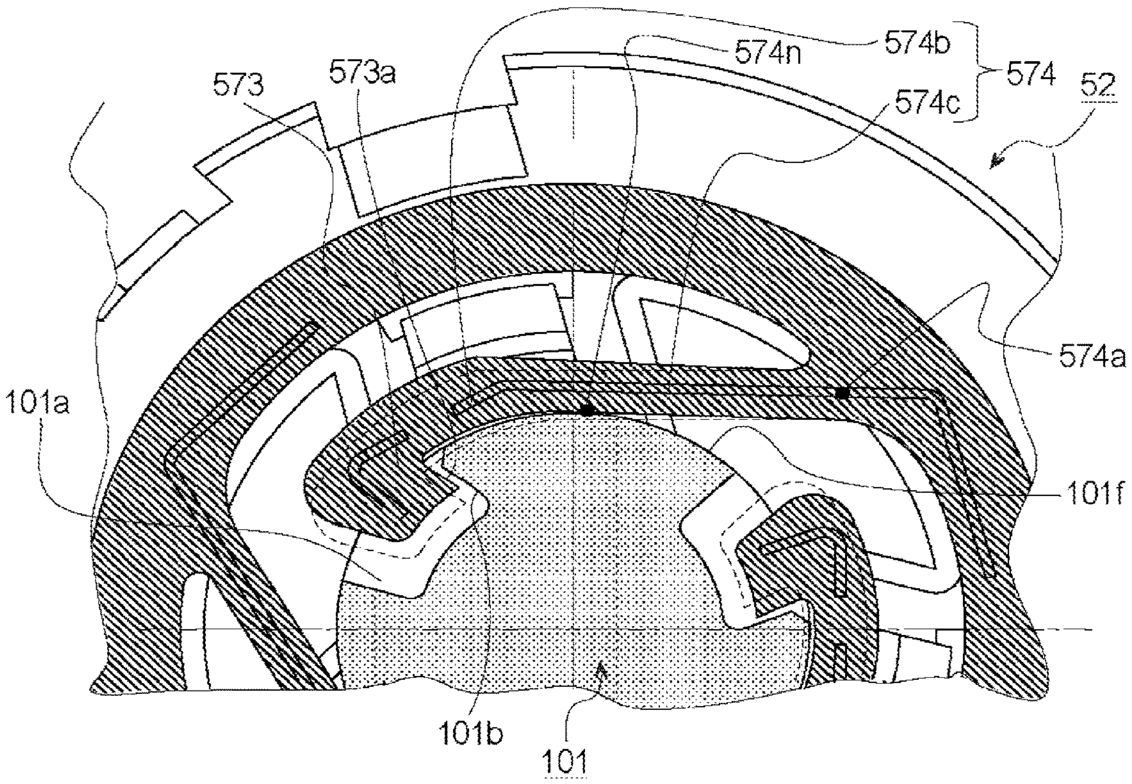
FIG. 57 is sectional views illustrating the drive transmission when the winding portion 574*b* of the base portion 574 of the coupling member 528 according to Embodiment 5 is smaller in diameter than the shaft portion 101*f* of the main assembly driving shaft 101.
Figure 57:
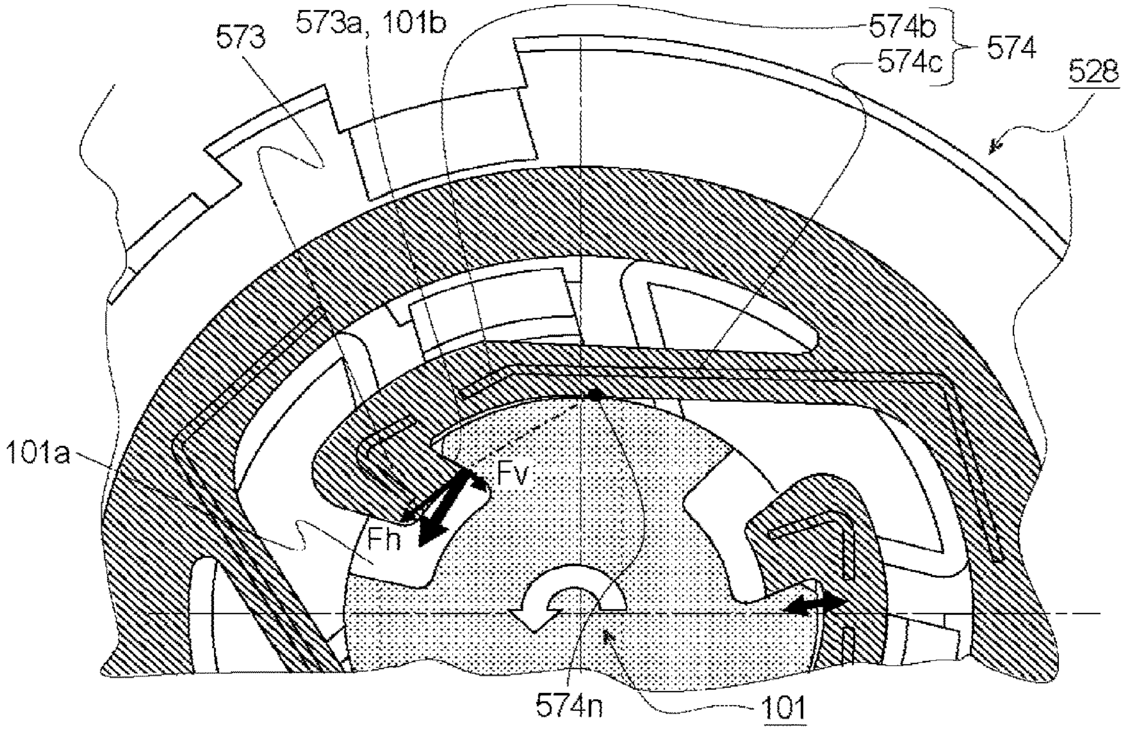

FIG. 57 is sectional views illustrating drive transmission in which the winding portion 574_b_ of the base portion 574 of the coupling member 528 according to Embodiment 5 is smaller in diameter than the shaft portion 101_f_ of the main assembly driving shaft 101.

As shown in FIG. 39, the coupling member 528 includes a flange member (driving force receiving member) 570, an aligning member (positioning member) 533 having an inverted conical shape 533_a_, although the details will be described hereinafter. The base portion 574 is arranged so as to overlap the driving force receiving surface (driving force receiving portion) 573_a_ in the Z direction. That is, when the base portion 574 and the driving force receiving surface 573_a_ are projected onto the axis line of the drum unit, at least parts of respective projection areas overlap.

Further, the driving force receiving surface (driving force receiving portion) 573_a_ and the base portion 574_a_ of the base portion 574 are provided on the inner peripheral surface 571_b_ of the cylindrical portion 571. That is, in the Z direction, the root portion 574_a_ is outside the photosensitive drum 1.

Also, as shown in FIG. 45, the root portion 574_a_ of the base portion 574 is arranged so as to overlap the entire area of the driving force receiving surface 573_a_ in the Z direction.

The root portion 574_a_ is the rear end (the radially outer end portion) of the base portion 574, and the base portion 574 is a connecting portion connected to the flange member 570 (the inner peripheral surface 571_b_). The base portion 574_a_ is the supported portion of the base portion 574. The base 574 is supported by the flange member 570 on the base portion 574_a_.

(Description on Flange Member)

As shown in FIG. 46, a plurality of engaging portions 573 and a plurality of base portions 574 are symmetrically arranged on the flange member 570. That is, the engaging portions 573 are arranged at three positions (120 degrees spacing, substantially equal intervals) at regular intervals in the circumferential direction of the flange member 570. Similarly, the base portions 574 are also arranged at three positions at regular intervals in the circumferential direction of the flange member 570.

The engaging portion 573 is a projecting portion (a projecting portion, a protruding portion) projecting toward the inside at least in the radial direction of the coupling member 528 (the radial direction of the drum unit). The engaging portion 573 is disposed at the free end of the base portion 574 and is supported by the base portion 574.

The base portion 574 is an extending portion (extending portion, extension portion) extending in the circumferential direction of the coupling member 528. The direction in which the base portion 574 extends intersects the projecting direction of the engaging portion 573. In more detail, the base portion 574 extends at least in the circumferential direction of the coupling member 528 (the flange member 570). In other words, the base 574 extends at least in the direction of rotation of the drum unit.

The base portion 574 and the engaging portion 573 are support portions for movably supporting the driving force receiving portion 573*a*. The base portion 574 has a deforming portion (deforming portion, flexible portion) elastically deformed to move the driving force receiving portion 573*a*. The base 574 is configured to deform with the fixed end thereof as a fulcrum.

The engaging portion 573 is configured to engage with the main assembly driving shaft 101. The engaging portion 573 is provided with a driving force receiving surface (driving force receiving portion) 573*a* capable of receiving a driving force (rotational force) for rotating the photosensitive drum 1.

The projecting amount of the engaging portion 573 (the distance projecting from a surface of the base portion 574) measured along the radial direction is 1.2 mm. In order to engage with the driving transmission groove of the main assembly driving shaft 101, the projecting amount of the engaging portion 573 is desirably 0.6 mm or more as measured along the radial direction, more preferably 1.0 mm or more. Further preferably, the amount of projection measured along the radial direction is preferably 1.2 mm or more as in this embodiment.

With the structure in which the entire projecting portion of the engagement portion 573 is engaged with the main drive transmission groove, it is necessary for the base portion drive force receiving portion 573*a* to retreat beyond the projected amount of the engagement portion 573. Therefore, in this embodiment, the driving force receiving portion 573*a* can move at least 1.2 mm in the radial direction.

Further, a preferable movement amount of the driving force receiving portion 573*a* corresponds to a preferable projection amount of the engagement portion 573. That is, the movement amount of the driving force receiving portion 573*a* is desirably 0.6 mm or more as measured along the radial direction, more preferably 1.0 mm or more, further preferably 1.2 mm or more.

The engaging portion 573 and the base portion 574 are support portions that movably support the driving force receiving surface 573*a*. The base portion 574 is an elastically deformable portion (elastically deforming portion, flexible portion), and the base portion 574 deforms so that the driving force receiving surface 573*a* moves.

The driving force receiving surface 573*a* is the outside part of the drum unit (outside part of the process cartridge), that is, the drive transmitting portion (driving force transmitting portion) where the driving force (rotational force) is transmitted from the device main assembly.

The base portion 574 extends in a direction different from the projecting direction of the engaging portion 573 (a direction crossing the protruding direction). That is, the base portion 574 at least extends in the circumferential direction (rotational direction) of the flange member 570. More specifically, the base portion 574 extends from the flange member 570 toward the downstream side in the rotational direction. The free end of the base portion 574 is an end portion in the downstream side with respect to the rotational direction. The rear end (root portion 574*a*) of the base portion 574 is the upstream end portion with respect to the rotational direction. Also, the free end of the base portion 574 is disposed radially inward of the rear end. That is, the free end of the base portion 574 is a end portion on the inner side with respect to the radial direction, and the rear end (base portion 574*a*) of the base portion is an outside end portion with respect to the radial direction.

An engaging portion 573 is provided on the downstream side (free end side) of the base portion 574. An end portion (rear end) in the upstream side of the base portion 574 is a connecting portion that is connected with the flange member 570. The rear end of the base portion 574 is a supported portion that is supported by the flange member 570 and is a root portion 574*a* of the base portion 574.

The extending direction of the base portion 574 is substantially perpendicular to the rotation axis of the flange member 570 (drum unit). That is, the straight line connecting the front end and the rear end of the base portion 754 and the axis form a angle which is substantially 90 degrees. In other words, both the front end and the rear end of the base portion 574 are positioned on the same section plane parallel to the rotation axis of the flange member 570.

As shown in FIG. 50, on the same cross section perpendicular to the axis of the flange member 570, the portion from the free end to the rear and of each of the three bases 574 is arranged. All three engaging portions 573 and three root portions 574*a* are arranged on the same cross section. In other words, the plurality of engaging portions 573 and the plurality of base portions 574 are substantially at the same position with respect to the Z direction.

As shown in part (a) of FIG. 40, the base portion 574 has a root portion 574*a*, a winding portion 574*b*, and a straight portion 574*c* linearly connecting the root portion 574*a* and the winding portion 574*b*. A root portion 574*a* is a portion (connecting portion) where the inner diameter portion (inner surface, inner peripheral portion) of the flange member 570 and the base portion 574 are connected. The straight portion 574*c* is a substantially straight shape (substantially flat plate shape) portion. The winding portion 574*b* is a portion that is to be wound around the main assembly driving shaft 101. That is, when the flange member 570 receives the driving force (rotational force) from the main assembly driving shaft 101 through the engaging portion 573, the winding portion 574*b* winds around the main assembly driving shaft 101 and contacts the main assembly driving shaft 101. The winding portion 574*b* has a curved surface (bow-shaped surface). The winding portion 574*b* is curved so as to follow the main assembly driving shaft 101. In other words, the winding portion 574*b* is curved along the circumferential direction (rotational direction) of the coupling member 528. In other words, the winding portion 574*b* has a curved surface that faces radially inward (on the axis line side of the coupling member), and is a curved surface recessed radially outward.

Further, the winding portion 574*b* is disposed on the side where the driving force receiving surface 573*a* is provided.

The driving force receiving surface 573*a* and the winding portion 574*b* form an acute angle.

As described above, an engaging portion 573 is provided at the free end of the base portion 574. That is, the base portion 574 is a portion that supports the engaging portion 573. Similarly to the above-described embodiments, the base portion 574 is deformed, so that the engaging portion 573 can be moved in the radial direction of the flange member 570.

The resin material forming the base portion 574 and the engaging portion 573 is formed integrally with the resin forming the flange member 570. However, the present invention is not limited to such a structure. The engaging portion 573 may be made of a member different from that of the base portion 574 and may be adhered to the free end of the base portion 574, for example. Similarly, the base portion 574 may be formed of a material different from the other portions of the flange member 570, or the base portion 574 may be dismountable from the flange member 570.

Figure 65:
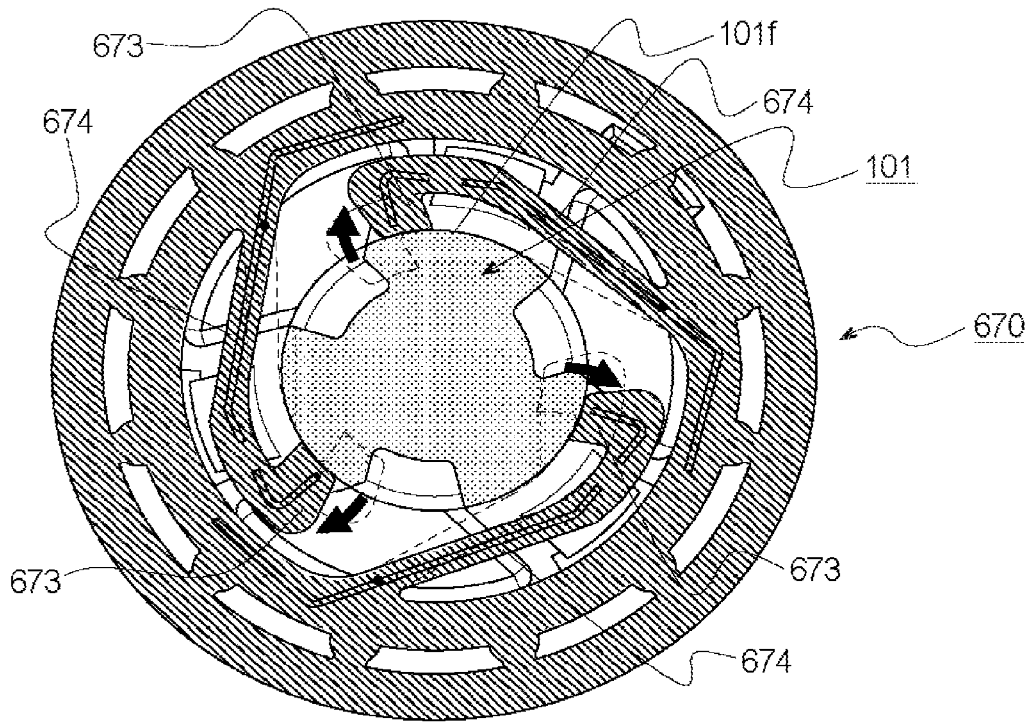
FIG. 65 is sectional views illustrating the operation of mounting the coupling member 628 to the main assembly driving shaft 101 according to the Embodiment 6.
Figure 65:
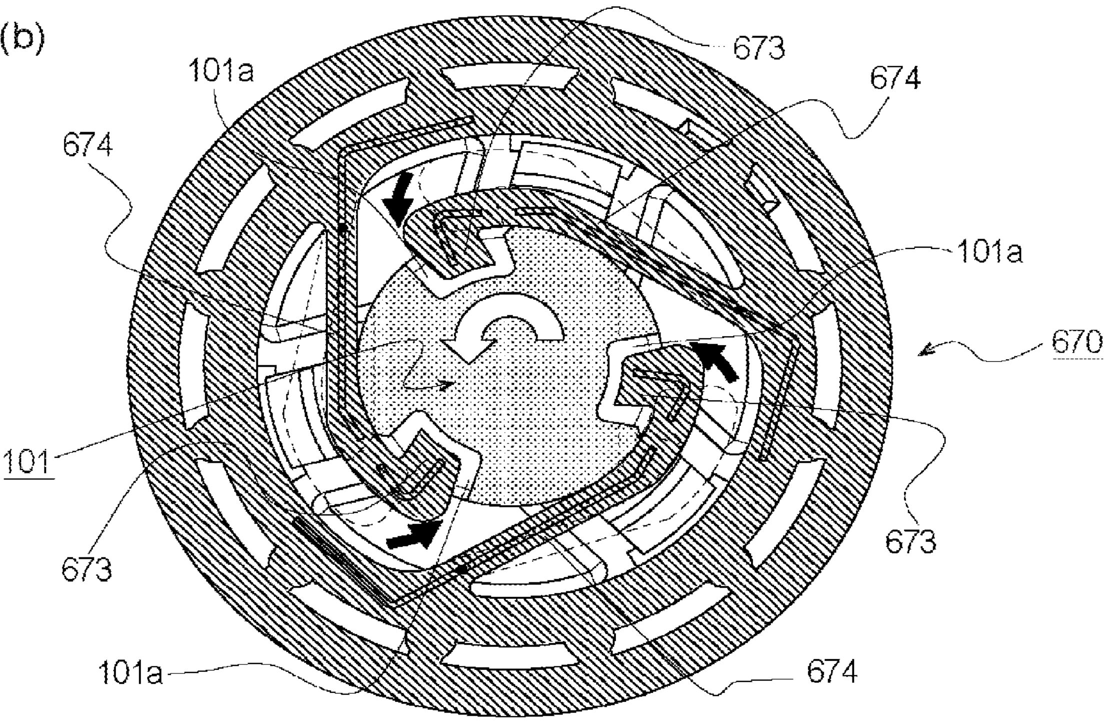

In order to increase the strength of the base portion 574, a metal may be provided inside the resin material forming the base portion 574. In FIG. 50 and so on, a plate-shaped metal is provided inside the resin. Such a structure will be described hereinafter with respect to another embodiment (FIG. 65 and so on).

The width of the base portion 574 measured along the Z direction is equal to or greater than the width of the driving force receiving surface 573*a* measured along the Z direction.

Although the effect will be described later, the length of a perpendicular line drawn from the rotation center (rotation axis) of the flange member 570 to the surface of the winding portion 574*b* is substantially the same as or larger than the radius of the shaft portion 101*f* of the main assembly driving shaft 101. In other words, when the flange member 570 is projected on the plane perpendicular to the rotation axis of the flange member 570, the radius R1 of the arc forming the inner diameter of the winding portion 574*b* on the plane (projection plane) is substantially the same or larger than the radius R2 of the shaft portion 101*f*.

As shown in part (a) of FIG. 40, the straight portion 574*c* has a shape extending in a tangential direction of the inner diameter of the winding portion 574*b*. In other words, the straight portion 574*c* is in the form of a flat plate integral with the arc end of the winding portion 574*b*, and is connected to the inner diameter portion of the flange member 570 at the root portion 574*a*. The tangent line at the end of the winding portion 574*b* is substantially parallel to the straight portion 574*c*.

Here, as shown in part (c) of FIG. 40, in the radial direction of the flange member 570, a distance from the inner diameter end 573*b* of the driving force receiving surface 573*a* to the inside diameter of the winding portion 574*b* is H1.

In the radial direction of the flange member 570, a distance from the outer shape of the engaging portion 573 to the inner diameter of the cylindrical portion 571 is H2. In this case, the engaging portion 573 and the base portion 574 are configured to satisfy a relationship of H1≤H2. By adopting such a structure (shape), the following effects can be obtained.

Even when the engaging portion 573 moves the inner diameter end 573*b* of the driving force receiving surface 573*a* outward in the radial direction H1, interference between the driving force receiving surface 573 and the inner peripheral surface 571*b* of the cylindrical portion 571 can be suppressed. In the course of mounting the coupling member 528 to the main assembly driving shaft, when the engagement portion 573 is brought into contact with the main driving shaft 101, the engagement portion 573 can reliably be retracted assuredly outward in the radial direction.

As described above, the length of the perpendicular line drawn from the rotation center of the flange member 570 to the surface of the winding portion 574*b* is substantially the same as the radius of the shaft portion 101*f* of the main assembly driving shaft 101. Therefore, the inner diameter end 573*b* of the driving force receiving surface 573*a* can move to radially outside of the shaft portion 101*f* without an interference between the outer shape of the engaging portion 573 and the mounting portion 572.

As shown in FIG. 41, a thickness measured in the radial direction of the winding portion 574*b* in the side of the driving force receiving surface 573*a* is defined as a free end side thickness (the thickness on the driving force receiving surface side) 574*k*, and a thickness of the straight portion 574*c* is defined as a straight portion thickness 574*l* (rear side thickness). The following effect can be provided by forming the shape of each part so that a relationship of free end side thickness 574*k*≥straight portion thickness 574*l* is satisfied.

As shown in FIG. 41, when the driving force receiving surface 573*a* receives the rotational force F1 from the main assembly driving force transmitting surface 101*b*, the engaging portion 573 receives a moment M to tend to deform radially outward with the connecting portion between the engaging portion 573 and the base portion 574 as a fulcrum. The deformation of the engaging portion 573 by this moment M can be reduced by increasing the free end side thickness 574*k* supporting the outer end 573*c* functioning as the fulcrum of the deformation against the deformation. On the other hand, if the thickness 574*l* is increased over the range up to the straight portion, the load required when mounting the coupling member 528 to the main assembly driving shaft 101 increases. In other words, the load required to retract the base portion 574 toward the outside in the radial direction becomes large, and therefore, it becomes difficult for the user to mount the cartridge.

Therefore, by selecting the relationship of the front end side thickness 574*k*≥the straight part thickness 574*l*, it is possible to accomplish both the reduction in deformation of the engagement part 573 and the easy cartridge mountability, preferably.

Further, in FIG. 41, the engaging portion 573 is a retractable outwardly in the radial direction of the coupling member 528 (radial direction of the photosensitive drum unit 30). The driving force receiving surface 573*a* provided in the engaging portion 573 is inclined with respect to the moving direction of the engaging portion 573. In the cross-sectional view of FIG. 41, a straight line B3 is a line extending along the direction in which the engaging portion 573 moves in the retraction. The straight line B4 is a line along the driving force receiving surface 573*a*. It is understood that the straight line B3 and the straight line B4 crosses with each other. By this, the driving force receiving surface 573*a* bites into the driving transmission groove 101*a* in a state that the driving force receiving surface 573*a* is in contact with the driving transmission groove 101*a*, so that the engaging portion 573 does not easily retreat from the driving transmission groove 101*a*. That is, the engagement between the engagement portion 573 and the drive transmission groove 101*a* is stabilized.

Particularly, the driving force receiving surface 573*a* is inclined relative to the moving direction of the engaging portion 573 (line B3) such that the inner diameter side (free end side) is upstream of the outer diameter side (root side)

with respect to the rotational direction of the coupling member 528. Therefore, when the coupling member 528 (photosensitive drum unit 30) rotates, the force received from the driving force receiving surface 573 is in a direction to engage the engaging portion 573 with the main assembly driving transmission groove 101*a*. The state of engagement between the engagement portion 573 and the main assembly drive transmission groove 101*a* is stabilized, so that the disengagement of the engagement portion 573 and the main assembly drive transmission groove 101*a* is suppressed.

Part (a) of FIG. 40 in an illustration of the flange member 570 as viewed in the Z direction. As shown in part (a) of FIG. 40, as viewed along the Z direction, the root portion 574*a* is disposed upstream of the flange member 570 (in the rotational direction) with respect to a straight line drawn from the inner diameter end 573*b* of the driving force receiving surface 573*a* in a direction perpendicular to the driving force receiving surface.

Further, as viewed along the Z direction, such a ridge line on the side of the driving force receiving surface 573*a* among ridge lines formed by the straight portion 574*c* and the inner peripheral surface 571*b* of the cylindrical portion 571 as is in the driving force receiving surface 573*a* is called an inner ridge line 574*d*, and the ridge line in the opposite side of the driving force receiving surface 573*a* is called a outer ridge line 574*e*. As shown in part (b) of FIG. 40, the inner ridge line 574*d* is connected to the inner peripheral surface 571*b* of the cylindrical portion 571 with a arc larger than the outer ridge line 574*e*.

This is because it is preferable that the connecting surface where the base portion 574 and the inner peripheral surface 571*b* of the cylindrical portion 571 are connected to each other is as large as possible. This is because, when the driving force receiving surface 573*a* receives the driving force, the force applied to the inner peripheral surface 571*b* of the cylindrical portion 571 to which the root portion 574*a* is connected can be dispersed, and therefore, the deformation of the cylindrical portion 571 can be suppressed. As a result, even if the load received by the photosensitive drum unit 30 changes, the deformation amount of the cylindrical portion 571 is small, so that the influence of deformation on the rotation of the photosensitive drum unit 30 can be suppressed to a small degree. It is desirable to make the connecting surface between the base portion 574 and the cylindrical portion 571 as large as possible.

As shown in part (b) of FIG. 40, as viewed in the Z direction, an angle I formed in the outer ridge line 574*e* side between the angle among angles between the straight portion 574*a* and a line passing through the root portion 574*a* among the tangent lines at the inner diameter of the mounting portion 572 is acute.

The fulcrum point 574*f* of the elastic deformation of the base portion 574 is in the neighborhood of the portion where the influence of the arc of the ridge line formed by the straight portion 574*c* and the cylindrical portion 571 disappears. That is, when the inner ridge line 574*d* and the outer ridge line 574*e* are arcs of the same size, the angle I is acute. Therefore, it is near the intersection of the center line of the straight portion 574*c* and a straight line drawn from the end of the ridge line on the inner diameter side of the outer ridge line 574*e* perpendicularly to the center line of the straight portion 574*c*.

If the ridge line on the side of the outer ridge line 574*e* is gentle, the position of the fulcrum point 574*f* of elastic deformation is shifted to the point 574*f* at the time when the arc is enlarged, because the angle I is an acute angle on the side of the outer ridge 574*e*. Then, the elastically deformable length of the base portion 574 is shortened, and the mountability of the coupling member 528 to the main assembly driving shaft 101 is deteriorated.

An intersection point between a straight line perpendicular to the straight portion 574*c* from the fulcrum point 574*f* and the inside of the straight portion 574*c* is called an intersection point 574*m*. Even if the arc of the inner ridge line 574*d* is made large enough to pass through the intersection 574*m*, the range in which the influences of the arc of the ridge line formed by the straight portion 574*c* and the mounting portion 572 extend remains unchanged. That is, even if the arc of the ridge line of the inner ridge line 574*d* is increased not more than to the extent that a arc passing through the intersection point 574*m*, the large connecting surfaces at which the base portion 574 574 and the cylindrical portion 571 are connected with each other can be assured without deteriorating the mountability of the coupling member 528 to the main assembly driving shaft 101.

(Explanation on Manufacturing Method)

Referring to FIG. 42, the structure of a mold used for forming the flange member 570 will be described.

FIG. 42 is a sectional view illustrating a state in which the flange member 570 is molded in the metal mold.

The flange member 570 has a shape with which the flange portion 575 protrudes outward in the radial direction. In the case of molding such a shape, it is preferable to use a metal mold as shown in FIG. 42.

Specifically, as shown in the Figure, the metal mold has a two-piece structure including a left mold (cylindrical mold 560) and a right mold (mounting part mold 561). By aligning the right and left molds, a space portion (mold cavity, hollow portion) having the same shape as the molded product is formed. The flange member 570 is formed by pouring the material into the space portion and solidifying it in the mold. The mold has a structure in which a mold parting plane 562 (a plane along which the mold is divided, a plane at which the mold halves are contacted), which is a portion for fitting the right and left molds, is disposed in the neighborhood of the space forming the flange portion 575. The cylindrical mold 560 has a shape including a space for molding the outer periphery of the cylindrical portion 571. Similarly, the mounting portion side mold 561 has a shape having a space for molding the mounting portion 572.

In the case that the coupling member 570 is molded using such a metal mold, it is preferable to use a thermoplastic resin from the standpoint of mass productivity. More particularly, materials such as POM and PPS are considered to be preferable. However, in order to satisfy the requirement of strength and so on, other materials may be appropriately selected. Specifically, a thermosetting resin or a metallic material may be used.

Similarly to Embodiment 1, the engaging portion 573 has a mounting taper 573*d* at one end in the Z direction and a dismounting taper 573*e* at the other end. Therefore, it is difficult to dispose the mold parting plane 562 of the mold on either end surface of the engaging part 573 with respect to the Z direction.

This is because it is difficult to take the molded flange member 570 out of the mold if the mold parting plane 562 of the mold is on the end surface of the engagement portion 573 when using a two-part mold. That is, either of the two molds can not move relative to the flange member 570.

Similarly, the driving force receiving surface 573*a* has a shape in which the outer side (downstream side in the Z1 direction) of the photosensitive drum unit 30 is twisted toward the upstream side in the rotational direction relative to the inner side (downstream side in the Z2 direction).

Therefore, the shape forming the driving force receiving surface 573*a* is provided on the mounting portion side mold 561 side. This is because if the driving force receiving surface 573*a* is formed by the left side (the cylindrical side mold 560), the cylindrical side metal mold 560 can not be removed from the driving force receiving surface 573*a*.

It is easier to produce the molds if the mold parting plane 562 is made as straight as possible, since then the mold parting plane 562 can be produced with high accuracy. Therefore, if the mold parting plane 562 is formed as straight as possible, the possibility of occurrence of resin leakage or the like can be reduced.

In order to straighten the mold parting line 562 of the engaging portion 573, it is necessary to arrange the driving force receiving surface 573*a* at the back side of the photosensitive drum unit 30 beyond at least the insertion taper 573*d*. Therefore, in this embodiment, the end of the insertion taper 573*d* and the end of the driving force receiving surface 573*a* are arranged at the same position in the Z direction.

In this embodiment, the inner diameter of the portion where the root portion 574*a* of the flange member 570 is disposed is substantially the same as the inner diameter of the other portion. Specifically, the inner diameter of the portion where the root portion 574*a* is disposed is substantially the same as the inner diameter of the inner peripheral surface 571*b* of the cylindrical portion. Further, the inner diameter of the inner peripheral surface of the mounting portion 572 and the inner diameter of the portion where the root portion 574*a* is disposed are made substantially the same.

Further, as the flange member 570 is viewed along the Z direction, if another shape (protrusion or the like) is provided on the portion overlapping the base portion 574, the other shape and the base portion 574 are connected to each other when the flange member 570 is molded using the metal mold. When said another shape is connected to the base portion 574, the elastic deformation of the base portion 574 is obstructed.

Therefore, in the flange member of this embodiment, the flange member 570 does not have a portion overlapping (overlapping) the base portion 574 on a projection plane provided by projecting the flange member 570 on a plane perpendicular to the rotation axis (Z direction). Likewise, there is no overlap with the driving force receiving portion 573.

(Description on Alignment Member)

Referring to FIGS. 43 to 44, the structure of the alignment member (positioning member) 533 will be described.

In Embodiment 1, the alignment between the main assembly driving shaft 101 and the coupling member 28 is effected by the radial direction positioning portion 76*a* and the positioning in the Z direction is effected by the abutment portion 76*b* (as shown in FIGS. 14 and 15). The radial direction positioning portion 76*a* is disposed at a position overlapping with the engaging portion 73 in the Z direction. That is, when the radial direction positioning portion 76*a* and the engaging portion 573 are projected on the rotation axis of the coupling member 28, they are disposed so that at least part of the projected regions of them are overlapped with each other on the rotation axis.

On the other hand, in this embodiment, the base portion 574 is arranged so as to overlap the driving force receiving surface 573*a* in the Z direction. That is, the base portion 574 and the engaging portion 573 are disposed so that they overlap when projected on the rotation axis of the coupling member 528. When the base portion 574 and the engaging portion 573 are thus arranged, it is difficult to dispose the radial positioning portion as in Embodiment 1 so as to overlap the engaging portion 573 in the Z-axis direction.

Therefore, in this embodiment, the alignment member (positioning member) 533 having the inverted conical shape 533*a* described above is employed instead of the structure such as that of the radial direction positioning portion 76*a* disclosed in Embodiment 1. The coupling member 528 is positioned with respect to the main assembly driving shaft 101 by using the alignment member 533. The inverted conical shape 533*a* is provided by a substantially conical recess. The detailed shape of the alignment member 533 will be described below.

As shown in FIGS. 43 and 44, the aligning member 533 includes a inverted conical shape portion 533*a*, a fitting portion 533*b*, a retaining portion 533*c*, and a projection 533*d* for matching a phases of the flange member 570. The fitting portion 533*b* is fitted into the flange member 570. A retaining portion 533*c* has a function of suppressing the alignment member 533 from disengaging from the flange member 570.

As shown in FIG. 45, the inverted conical shape portion 533*a* is disposed on the inner side (the Z2 direction side) of the photosensitive drum unit beyond the engagement portion 573. As the flange member 570 and the aligning member 533 are viewed along the Z direction, the flange member 570 and the aligning member 533 are assembled than that of each other so that the center of the inverted conical shape 533*a* and the center of the photosensitive drum 1 aligned.

The inverted conical shape 533*a* has an abutment portion 533*e* abutting to the semispherical semispherical shape 101*c* at the free end of the main assembly driving shaft 101 when the photosensitive drum 1 is rotated. As shown in FIG. 45, the aligning member 533 is mounted to the flange member 570 such that in the state that the abutment portion 533*e* and the semispherical shape portion 101*c* contact to each other in the Z direction, the center 101*h* of the semispherical shape portion 101*c* of the main assembly driving shaft 101 is within the range of the driving force receiving surface 573*a*.

As shown in FIG. 45, the fitting portion 533*b* is disposed on the inner side (the Z2 direction side) of the photosensitive drum unit 30 with respect to the abutment portion 533*e*.

Further, the flange member 570 has a fitted portion 572*a* at a position corresponding to the fitting portion 533*b*. As described above, the center of the inverted conical shape 533*a* and the center of the photosensitive drum 1 can be aligned with high accuracy.

As shown in FIG. 43, the retaining portion 533*c* has a snap fit fashion and has a shape for suppressing disengagement of the aligning member 533 from the flange member 570. That is, the retaining portion 533*c* is a connecting portion that connects the aligning member 533 to the flange member 570.

As shown in FIG. 45, when the aligning member 533 is mounted to the flange member 570, the retaining portion 533*c* is located on the inner side (the Z2 direction side) of the photosensitive drum unit 30 with respect to the engaging portion 573 (the driving force receiving portion 573*a*). Therefore, even if the base portion 574 of the flange member 570 is deformed radially outward, the retaining portion 533*c* is configured so as not to prevent deformation (movement) in the radial direction of the base portion 574. That is, the engaging portion 573 does not contact with the retaining portion 533*c* when moving in the radial direction.

Also, as shown in FIGS. 45 and 46, the flange member 570 has a hooking portion 572*b* corresponding to the retaining portion 533*c*. As shown in FIG. 46, the hooking portion 572*b* is disposed in a position so as not to overlap with the base portion 574 as viewed along the Z direction.

The hooked portion 572*b* is disposed substantially in the middle of the two root portions 574 arranged so as to be adjacent to each other in the circumferential direction. Then, a gap between the base portion 574 and the hooking portion 572*b* can be assured in the circumferential direction. In this embodiment, three hook portions 572*b* engaged with the retaining portion 533*c* are disposed in the middle of the root portion 574*a*.

As shown in FIGS. 43 and 47, the convex portion 533*d* functioning as an assembling guide has a shape protruding radially outward from the fitting portion 533*b*. Therefore, when the alignment member 533 is mounted to the flange member 570, the phases of the retaining portion 533*c* and the hooking portion 572*b* can easily be matched. The recessed portion 533*d* is a phase determining portion for determining the phase of the aligning member 533 relative to the flange member 570 (the attitude in the rotational direction, the position in the rotational direction).

As shown in FIG. 47, the cut-away portion 572*c* is disposed at a position spaced 90 degrees away from the clamp groove 572*e* in the circumferential direction. As in Embodiment 1, two clamp grooves 572*e* are equidistantly arranged around the rotation axis of the coupling member 528. That is, in other words, the cut-away portion 572*c* is disposed at the farthest position between the two clamp grooves 572*e* arranged at a position separated by 180 degrees in the circumferential direction of the flange member 570. By this, it is possible to suppress the influence of the clamp groove e and the cut-away portion 572*c* on the rigidity of the flange member 570.

Furthermore, as shown in FIG. 48, the aligning member 533 has an outer cylindrical rib 533*f* forming the fitting portion 533*b* and an inner cylindrical rib 533*g* on the back side of the outer end of the inverted conical shape 533*a*. In addition, the alignment member 533 includes a plurality of radial ribs 533*i* so as to connect the outer cylindrical rib 533*f* and the inner cylindrical rib 533*g*. The ribs are not provided inside the inner cylindrical rib 533*g*.

By connecting the outer cylindrical rib 533*f* and the inner cylindrical rib 533*g* with the radial ribs 533*i*, it is possible to suppress the deformation of the aligning member 533 when the aligning member 533 is press-fitted into the flange member 570. Further, by disposing the rib inside the inner cylindrical portion 533*g*, it is possible to suppress increase of the thickness of the central portion of the conical shape 533*a*. By this, dimensional accuracy of the inverted cone shape 533*a* which affects the alignment function can be improved.

[Engaging Process of Coupling Member with Main Assembly Drive Shaft]

A process of engagement of the coupling member 528 with the main assembly driving shaft 101 will be described in detail.

FIG. 49 is a longitudinal sectional view illustrating the operation of mounting the coupling member to the main assembly driving shaft. Part (a) of FIG. 49 is an illustration of a state in which the coupling member 28 has started engaging with the main driving shaft 101. Part (e) of FIG. 49 shows a state in which the cartridge 7 has been mounted to the image forming apparatus main assembly 100A, the cartridge door 104 has been closed, the lower front side cartridge guide 109 has been raised, and the cartridge 7 has been positioned relative to the image forming apparatus main assembly 100A. Part (b) of FIG. 49 to part (d) of FIG. 49 are illustrations of a process of connecting the coupling member 528 to the main assembly driving shaft 101 between part (a) of FIG. 49 and part (e) of FIG. 49. As in Embodiment 1, the main assembly driving shaft 101 hangs downward in the direction of gravity by a small angle due to its own weight.

Further, FIG. 50 in a illustration of a state in which the phase of the main assembly drive transmission groove 101*a* and the phase of the engagement portion 573 (driving force receiving surface 573*a*) are not aligned with each other. In other words, in FIG. 50, the engaging portion 573 (the driving force receiving surface 573*a*) does not enter the main assembly drive transmission groove 101*a* and FIG. 50 shows a state in which they are not engaged with each other.

Similarly to Embodiment 1, as shown in part (a) of FIG. 49, when the cartridge 7 is positioned relatively to the image forming apparatus main assembly 100A (as shown in part (e) of FIG. 49), the coupling member 528 is inserted into the main assembly driving shaft 101 in a state inclined by about 0.5 to 2 degrees.

First, as shown in part (b) of FIG. 49, the free end of the inner peripheral surface 571*b* of the cylindrical portion 571 of the flange member 570 abuts against the rough guide portion 101*g* of the main assembly driving shaft 101. As shown in the Figure, the main assembly driving shaft 101 is configured to be supported by the bearing portion 101*d* in the cantilever fashion. Therefore, the coupling 7 is inserted into the main assembly driving shaft 101 in a state in which the rough guide portion 101*g* of the main assembly driving shaft 101 fits the inner peripheral surface 571*b* of the coupling member 570. Similarly to Embodiment 1, in the Z direction, the driving force receiving surface 573 of the engaging portion 573 has a length L2 which satisfy L1>L2, where L1 is a distance from the front end surface of the cylindrical portion 571 to the front end surface of the engaging portion 573 (as shown in FIG. 45). Therefore, before the semispherical shape 101*c* at the free end of the main assembly driving shaft 101 hits the engaging portion 573, the rough guide portion 101*g* of the main assembly driving shaft 101 follows the inner peripheral surface 571*b* of the coupling member 570.

By this, the main assembly driving shaft 101 is guided by the coupling member 528. Therefore, the semispherical shape portion 101*c* at the free end of the main assembly driving shaft 101 is prevented from hitting a unintended portion of the engaging portion 573 or the base portion 574 with the result of impact to the engaging portion 573 and/or the base portion 574. That is, the engaging portion 573 and the base portion 574 can be protected.

As shown in part (c) of FIG. 49, when the coupling member 528 is further inserted toward the back side of the main driving shaft 101, the insertion taper surface 573*d* of the engagement portion 573 and the main driving shaft 101 and the semispherical shape 101*c* abut to each other. Due to the inclined surface of the insertion tapered surface 573*d* and the spherical shape of the semispherical shape 101*c*, the main assembly driving shaft 101 is guided substantially to the center of the three engaging portions 573.

When the coupling member 528 is further inserted into the main assembly driving shaft 101, the base portion 574 elastically deforms radially outward so that the engagement portion 573 follows the semispherical shape 101*c*. As a result, as shown in FIG. 50, the engaging portion 573 moves (retracts) to the outer diameter surface of the shaft portion 101*f* of the main assembly driving shaft 101. By this movement, as shown in part (d) of FIG. 49, the coupling member 528 is mounted to the main assembly driving shaft 101 until the dismounting tapered surface 573*e* of the engagement portion 573 comes deeper in the Z direction than the main assembly side dismounting taper 101*i* of the main assembly driving shaft 101.

Thereafter, similarly to Embodiment 1, the cartridge 7 is lifted so that the drum unit bearing member 39L of the cartridge 7 abuts against the front side cartridge positioning portion 110. By thus lifting the cartridge 7, the cartridge 7 is positioned relative to the image forming apparatus main assembly 100A (as shown in part (d) of FIG. 21). By this operation of the cartridge 7, as shown in part (e) of FIG. 49, the inclination of the coupling member 528 is eliminated. That is, the coupling member 528 and the drum unit are in an attitude capable of forming an image.

When the main assembly driving shaft 101 rotates, as shown in part (b) of FIG. 50, the main assembly drive transmission groove 101*a* and the engagement portion 573 come to have the same phase. As a result, the elastic deformation of the base portion 574 is eliminated, a part of the engagement portion 573 enters the main assembly drive transmission groove 101*a*, and the coupling member 528 and the main assembly driving shaft 101 are engaged with each other.

When the phases of the main assembly drive transmission groove 101*a* and the engagement portion 573 are in alignment with each other, at least part of the elastic deformation of the base portion 574 is eliminated at the stage of part (d) of FIG. 49, and the state of part (b) of FIG. 50 is provided. That is, the base portion 574 is deformed so as to move the engaging portion 573 inward in the radial direction when shifting from the state shown in part (a) of FIG. 50 to the state shown in part (b) of FIG. 50. Strictly speaking, the state of the base portion 574 which has been deformed outward in the radial direction is at least partially restored, by which the engaging portion 573 moves at least inward in the radial direction.

In this manner, the base portion 574 advances the engaging portion 573 into the main assembly drive transmission groove 101*a*, and causes the engaging portion 573 to engage with the main assembly driving transmission groove 101*a* of the main assembly driving shaft 101.

[Driving of Coupling Member by Main Assembly Drive Shaft]

Referring to FIGS. 51 to 57, transmission of rotational drive from the main driving shaft 101 to the coupling member 528 will be described.

As described above, after closing the cartridge door 104 of the image forming apparatus main assembly 100A to which the cartridge 7 is mounted, the main assembly driving shaft 101 rotates. As a result, the phase of the engagement portion 573 and the phase of the main assembly drive transmission groove 101*a* match each other, with the result of the state shown in part (b) of FIG. 50. The main assembly driving shaft 101 is configured to be rotatable in the rotational direction for image forming operation and also in the opposite direction.

As shown in part (b) of FIG. 50, when the main assembly driving shaft 101 further rotates in the counterclockwise direction, as shown in FIG. 51, the main assembly drive transmission surface 101*b* abuts against the driving force receiving surface 573*a*. As a result, the rotational driving force of the main assembly driving shaft 101 is transmitted to the photosensitive drum 1 by way of the coupling member 528.

As in Embodiment 1, the driving force receiving surface 573*a* is twisted about the center of the rotation axis of the flange member 570. The twisting direction is such that the outer side (the Z1 direction side) of the photosensitive drum unit 30 of the driving force receiving surface 573*a* is upstream, with respect to the rotational direction of the photosensitive drum 1, of the inner side (downstream side in the Z2 direction) 52 (as shown in FIG. 52).

It will suffice if the phases, in the rotational direction, of the two points in contact with the driving shaft are different, and the structure may be any if it provides the same function as the twisted surface. For example, it will suffice if the shape is such that outer side (downstream side in Z1 direction) of the driving force receiving surface 573*a* is in the upstream side of the inner side (downstream side in Z2 direction) with respect to the peripheral moving direction of the rotation of the photosensitive drum 1. In other words, a straight line connecting the cylinder inner end portion and the cylinder outer end portion along the cylinder axis direction of the engagement portion 573 crosses with the rotation axis of the cylinder.

By employing such a shape, when the driving force receiving surface 573*a* is driven, a force is produced in the direction of drawing the photosensitive drum unit 30 toward the bearing portion 101*d* side of the main assembly driving shaft 101.

Due to this force (force in the Z1 direction), the inverted conical shape 533*a* of the alignment member 533 is brought into a state of certainly abutting against the semispherical shape 101*c* at the free end of the main assembly driving shaft 101. When the inverted conical shape 533*a* contacts the semispherical shape 101*c*, the radial position of the coupling member with respect to the main assembly driving shaft 101 is determined. Furthermore, the position of the coupling member 528 in the longitudinal direction with respect to the main assembly driving shaft 101 is also determined. That is, the inverted conical shape 533*a* is a radial direction positioning portion (aligning portion) for determining the radial direction position of the coupling member 528 (drum unit) with respect to the main assembly driving shaft 101. In addition, the inverted conical shape 533*a* is also a longitudinal direction positioning portion (axial direction positioning portion) for determining the position of the coupling member 528 (drum unit) in the longitudinal direction relative to the main assembly driving shaft 101.

The radial positioning portion and the longitudinal positioning portion need not be conical recess such as a inverted conical shape recess 533*a*. The shape of the radial direction positioning portion and the longitudinal direction positioning portion is not limited if it can determine the position of the photosensitive drum unit 30 relative to the main assembly driving shaft 101 when it contacts to the free end (semispherical shape 101*c*) of the main assembly driving shaft 101. For example, it is preferable that they are recessed shrinking toward the bottom. As such a shape, a non-circular cone shape such as a pyramid (square pyramid or the like) may be used. However, if the recessed portion is a conical shape symmetrical with respect to the axis of the coupling member 528, as in the case of the inverted conical shape 533*a* of this embodiment, the position of the coupling member 528 can be maintain with particularly high accuracy.

Since the inverted conical shape 533*a* only needs to have a region for contacting with the main assembly driving shaft 101, the non-contacting region may have any shape. For example, the inverted conical shape 533*a* which is not in contact with the main assembly driving shaft 101 may be a recessed portion having an open bottom.

As the flange member 570 is viewed along the Z direction, the root portion 574*a* is disposed upstream of a straight line drawn from the inner diameter end 573*b* of the driving force receiving surface 573*a* in a direction perpendicular to the driving force receiving surface 573*a*, with respect to the direction of the rotation of the flange member 570 (part (a) of FIG. 40). By this, the following effects can be provided.

As shown in FIG. 51, the driving force F1 is divided into a component Fh in the direction parallel to the straight line connecting the inner diameter end 573*b* of the driving force receiving surface and the root portion 574*a* of the base portion 574, and a component Fv in the vertical direction. The component Fv in the vertical direction is a component of attracting the engaging portion 573 and the base portion 574 toward the shaft portion 101*f* side. That is, due to the component Fv, a moment for rotating the base portion 574 counterclockwise with the base portion 574*a* as a fulcrum is generated at the base portion 574. As a result, the engaging portion 573 and the base portion 574 are pulled into the shaft portion 101*f*.

In FIG. 51, when a normal line perpendicular to the driving force receiving surface 573*a* is extended from the free end of the driving force receiving surface 573*a*, the base portion 574 extends so as to cross with the normal line. That is, the fixed end of the base portion 574 is disposed on the upstream side, in the rotational direction of the coupling member, of the normal line. With such an arrangement relationship, a moment that causes the base portion 574 to wind around the shaft portion 101*f* of the main assembly driving shaft 101 is generated, which is preferable.

Since the main assembly driving shaft 101 is rotating, when the base portion 574 is pulled, the winding portion 574*b* winds around the shaft portion 101*f*. As a result, the contact area between the base portion 574 and the shaft portion 101*f* is larger than the contact area (shown in part (b) of FIG. 50) in which the base portion 574 is not wound.

As a result of winding the winding portion 574*b* around the shaft portion 101*f*, as shown in FIG. 53, the base portion 574 receives the rotational force Fc generated by the driving force F1 at the straight portion 574*c*. Since the rotational force Fc is a component in the direction perpendicular to the straight portion 574*c*, it is a component in the direction of strong rigidity of the straight portion 574*c*. As a result, the amount of deformation of the base portion 574 can be suppressed to be small. By doing so, even if the load on the photosensitive drum unit 30 changes, the amount of deformation of the base portion 574 is small, so that the influence of deformation on the rotation of the photosensitive drum unit 30 can be suppressed to a small degree.

By the structure in which the radius R1 of the arc forming the inner diameter of the winding portion 574*b* is substantially the same as or larger than the radius R2 of the shaft portion 101*f*, the following effects can be obtained.

As described above, when the driving force receiving surface 573*a* is driven by the main assembly driving transmission surface 101*b*, the base portion 574 is pulled into the shaft portion 101*f* of the main assembly driving shaft 101. As a result, the winding portion 574*b* winds around the shaft portion 101*f*. By the winding of the winding portion 574*b*, the rotational force of the main assembly driving shaft 101 is received by the straight portion 574*c*.

First, as shown in part (a) of FIG. 56, a case where the radius R1 of the winding portion 574*b* is larger than the radius R2 of the shaft portion 101*f* is considered. In this case, when the engaging portion 573 is in phase alignment with the main assembly driving transmission groove 101*a* and enters the main assembly driving transmission groove 101*a*, a gap is generated between the winding portion 573*b* and the shaft portion 101*f*.

Thereafter, when the driving force receiving surface 573*a* is brought into contact with the main assembly drive transmission surface 101*b* and receives the rotational force, as shown in part (b) of FIG. 56, a pulling force with the root portion 574*a* of the base portion 574 as a fulcrum point is provided, so that the winding portion 574*b* is wound around the shaft portion 101*f*. By this winding, the straight portion 74*c* can receive the rotational force substantially in the same manner as when the radius of the winding portion 574*b* is the same as the radius of the shaft portion 101*f*.

On the other hand, the case where the radius R1 of the winding portion 574*b* is smaller than the radius R2 of the shaft portion 101*f* will be described, referring to FIG. 57. As shown in part (a) of FIG. 57, when the engagement portion 573 is in phase alignment with the main assembly drive transmission groove 101*a*, the base portion 574 is deflected to a position where the straight portion 574*c* abuts against the shaft portion 10 if at the contact point 574*n*. In such a case, there is a gap which becomes larger toward the engagement portion 573 side between the winding portion 574*b* and the shaft portion 101*f*. Thereafter, when the driving force receiving surface 573*a* abuts against the main assembly drive transmission surface 101*b* and receives a rotational force, the winding portion 574*b* is pulled with the contact point 574*n* as a fulcrum. However, the distance from the contact point 574*n* to the driving force receiving surface 573*a* is closer than the distance from the root portion 574*a* to the driving force receiving surface 573*a*. Therefore, the driving force F1 necessary for winding the winding portion 574*b* around the shaft portion 101*f* increases as compared with the case where the radius of the winding portion 574*b* is larger than the radius of the shaft portion 101*f*.

For this reason, the radius R1 of the winding portion 574*b* is preferably substantially the same as or larger than the radius R2 of the shaft portion 101*f* More preferable, since then the winding portion 574*b* can be wound around the shaft portion 101*f* with a smaller driving force F1.

As described above, the inverted conical shape 533*a* of the alignment member 533 is disposed so that the center 101*h* of the semispherical shape 101*c* comes within the range of the driving force receiving surface 573*a* of the flange member 570 in the Z direction (FIG. 45). When the engaging portion 573 and the center 101*h* are projected onto the axis line of the drum unit, the center 101*h* is inside the projection area of the engaging portion 573. In FIG. 45, the projected area of the engaging portion 573 is indicated by L2, and it is understood that the center 101*h* is disposed inside the area indicated by L2. By establishing such an arrangement relationship, the following effects can be provided.

The drum unit bearing member 39R and the drum unit bearing member 39L respectively abut against the rear side cartridge positioning portion 108 and the front side cartridge positioning portion 110. Therefore, the position of the cartridge 7 relative to the image forming apparatus main assembly 100A is determined. Here, the relative position between the main assembly driving shaft 101 and the coupling member 28 is affected by part tolerances. Specifically, the position is shifted due to the component part tolerances from the drum unit bearing member 39R to the coupling member 28 and the component part tolerances from the rear side cartridge positioning portion 108 to the main assembly driving shaft 101.

As shown in FIG. 54, the semispherical shape 101*c* abuts against the inverted conical shape 533*a*, so that the supporting both at the bearing portion 101*d* and the semispherical shape portion 101*c* support it established. That is, as viewed from the coupling member 528, the main assembly driving shaft 101 of the main assembly driving shaft 101 is tilted about the center 101*h* of the semispherical shape 101*c*. The same position as the center 101*h* in the Z-axis direction is a position that is least influenced by this tilting. The driving force receiving surface 573*a* is disposed at the same position as the center 101*h* in the Z axis direction, by which the influence of positional displacement can be minimized That is, it is a position where the photosensitive drum 1 can be stably driven.

[Removal of Coupling Member from Main Driving Shaft]

Referring to FIG. 55, dismounting operation of the coupling member 528 from the main assembly driving shaft 101 will be described.

As shown in part (a) of FIG. 55, the drive force receiving surface 573*a* and the main assembly drive transmission surface 101*b* are in contact with each other when the rotational drive of the main assembly driving shaft 101 is stopped. In this state, a part of the engagement portion 573 is in the main assembly drive transmission groove 101*a*.

When the cartridge door 104 is opened, the lower front side cartridge guide 109 lowers, and the drum unit bearing member 39L separates from the side cartridge positioning portion 110 of the image forming apparatus main assembly 100A. At this time, as shown in part (b) of FIG. 55, the coupling member 528 and the main assembly driving shaft 101 are inclined by about 0.5 to 2 degrees with respect to the angle at the mounting complete state (Z direction).

When the cartridge 7 is started to be removed from the image forming apparatus main assembly 100A, as shown in part (c) of FIG. 55, the dismounting tapered surface 573*e* of the engaging portion 573 abuts to the main assembly side dismounting taper 101*i*. When the dismounting tapered surface 573*e* abuts to the main assembly side dismounting taper 101*i*, the base portion 574 begins to elastically deform and moves the engaging portion 573 outwardly in the radial direction along the main assembly side dismounting taper 101*i*.

Further, when the coupling member 528 is pulled out of the main assembly driving shaft 101, the state becomes the same as in part (a) of FIG. 50, in which the base portion 574 further elastically deforms, and the engagement portion 573 is inserted into the shaft portion 101*f* of the main assembly driving shaft 101. By moving the engaging portion 573 to the outer diameter surface of the shaft portion 101*f*, the coupling member 528 can be removed from the main assembly driving shaft 101 as shown in part (d) of FIG. 55.

Further, when the coupling member 528 is removed from the main assembly driving shaft 101, as shown in part (e) of FIG. 55, the elastic deformation of the base portion 574 is released and the position of the engagement portion 573 returns to the position before the elastic deformation.

By the above-described operation, the coupling member 528 can be removed from the main assembly driving shaft 101.

By using the coupling member 528 of this embodiment as described above, it is possible to reduce the deformations of the drive transmission portion 573 and the base portion 574 when receiving the driving force F1. As a result, even if the load received by the photosensitive drum unit 30 changes, it is possible to suppress the influence on the rotation of the photosensitive drum unit to a small degree.

In this embodiment, the coupling member 528, the flange member 570, and the alignment member 533 are combined. However, depending on selection of material and molding method, there is no need to have two members, it may be unitized, or may be constituted by combining three or more members.

Embodiment 6

Referring to FIGS. 58 to 75, Embodiment 6 will be described.

In Embodiment 6, the driving force receiving portion 673*a* and its supporting portion (the base portion 674 and the engaging portion 673) are provided inside the photosensitive drum. In this embodiment, the support portion extends at least in the circumferential direction of the coupling member 628 as in Embodiment 5.

Elements corresponding to those of the above-described embodiment (particularly, the Embodiment 5) are assigned by the same names, and descriptions of the similar points to those of the above-described elements may be omitted. The description will be made mainly about the differences from the abovementioned elements.

Figure 58:
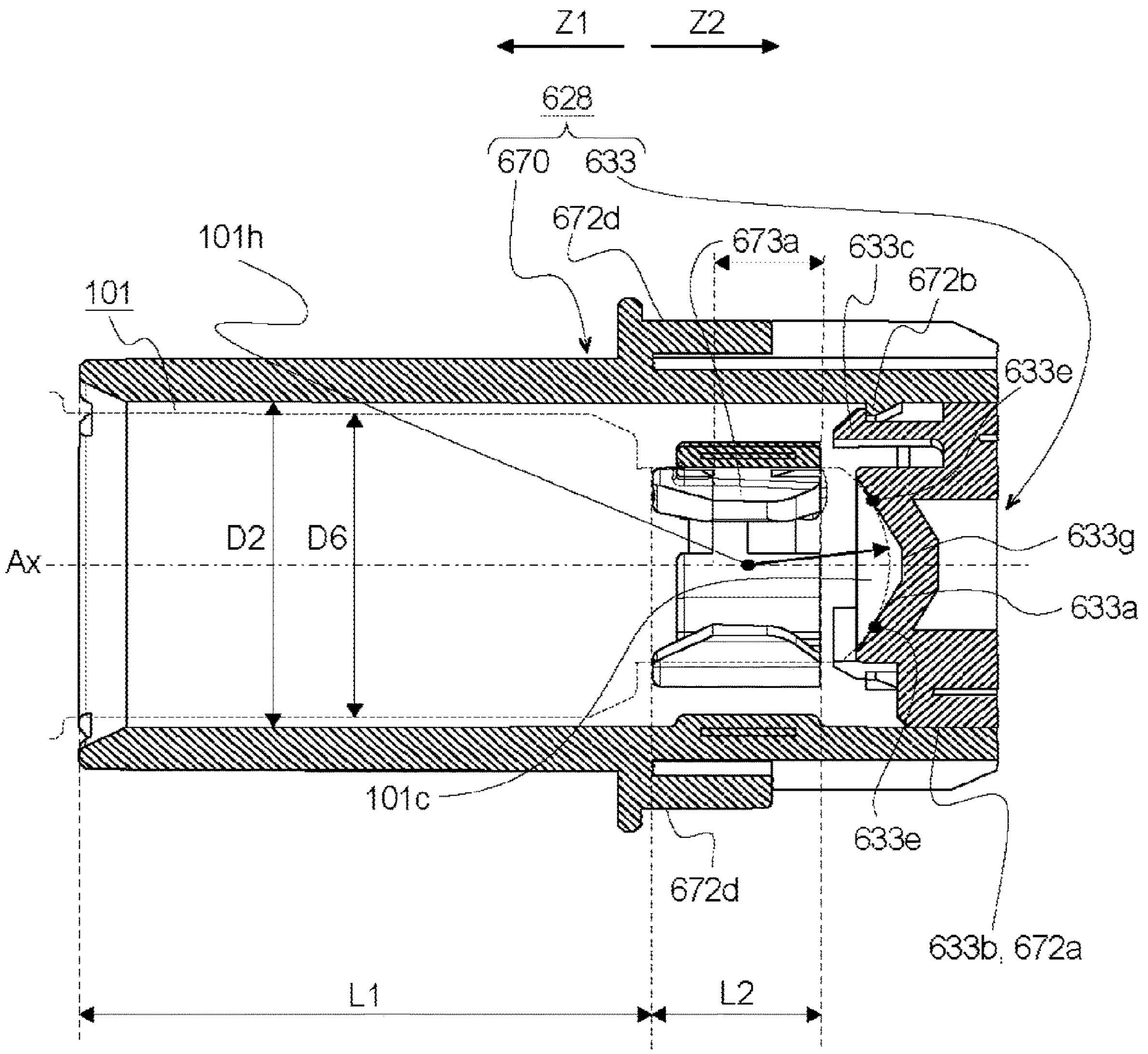
FIG. 58 is a cross-sectional view of the coupling member 628 in Embodiment 6.

FIG. 58 is a sectional view of the coupling member 628 according to Embodiment 5.

Figure 59:
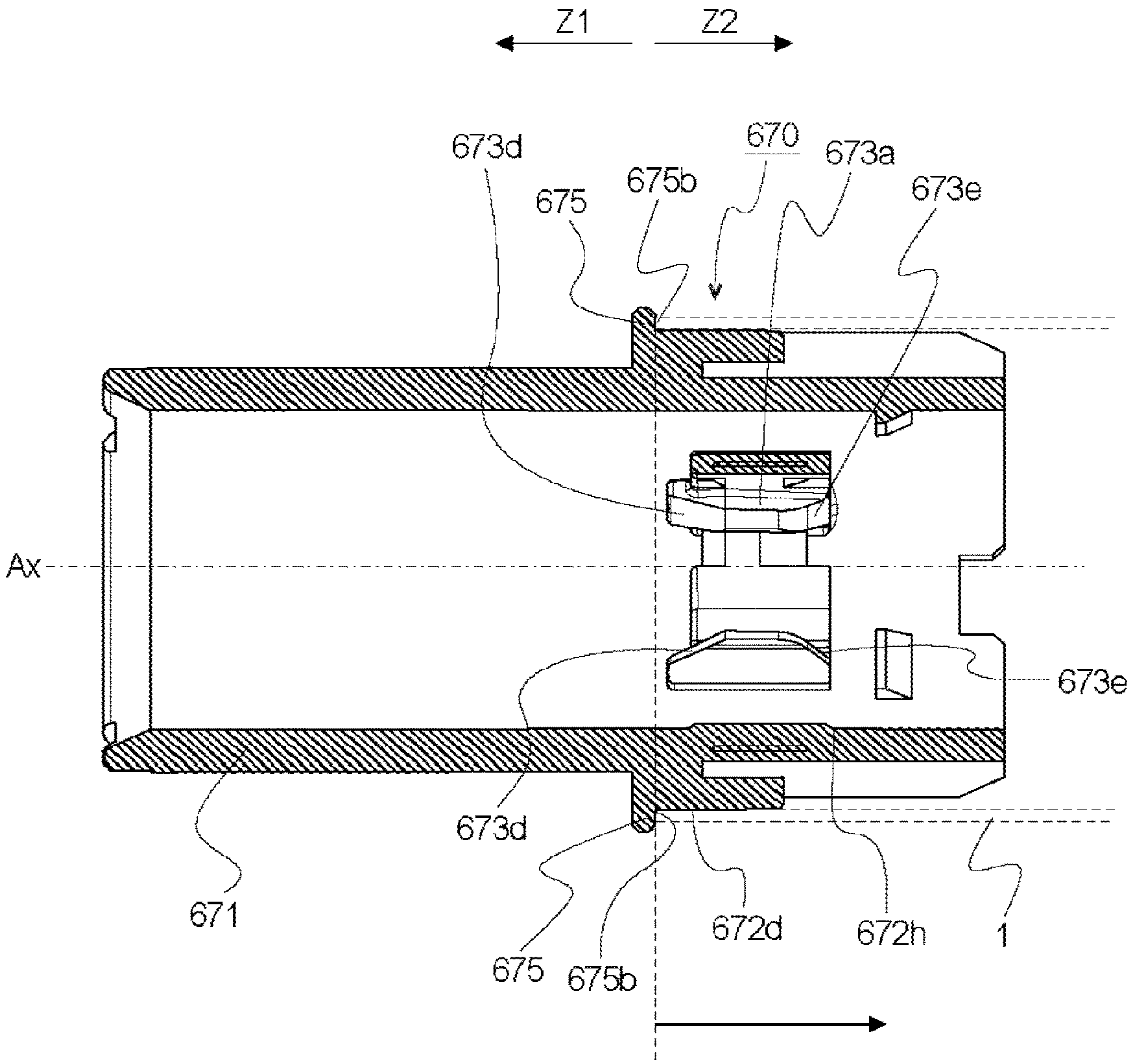
FIG. 59 is a cross-sectional view of the flange member 670 in Embodiment 6.

FIG. 59 is a cross-sectional view of the flange member 670 in Embodiment 6.

Figure 60:
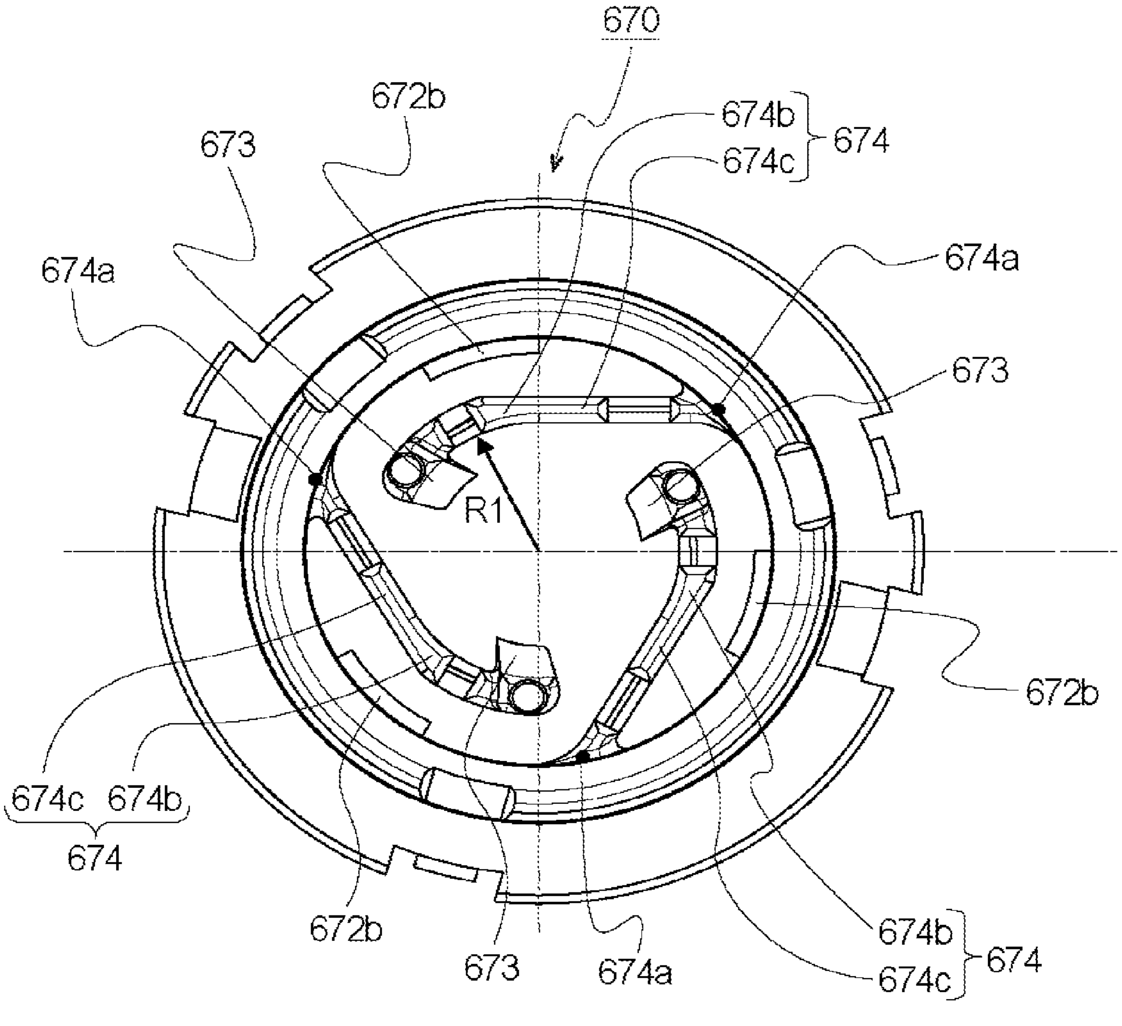
FIG. 60 is a view of the flange member 670 according to Embodiment 6 as viewed in the Z direction from the outer side.

FIG. 60 is a view of the flange member 670 according to Embodiment 6 as viewed in the Z direction from the outer side.

Figure 61:
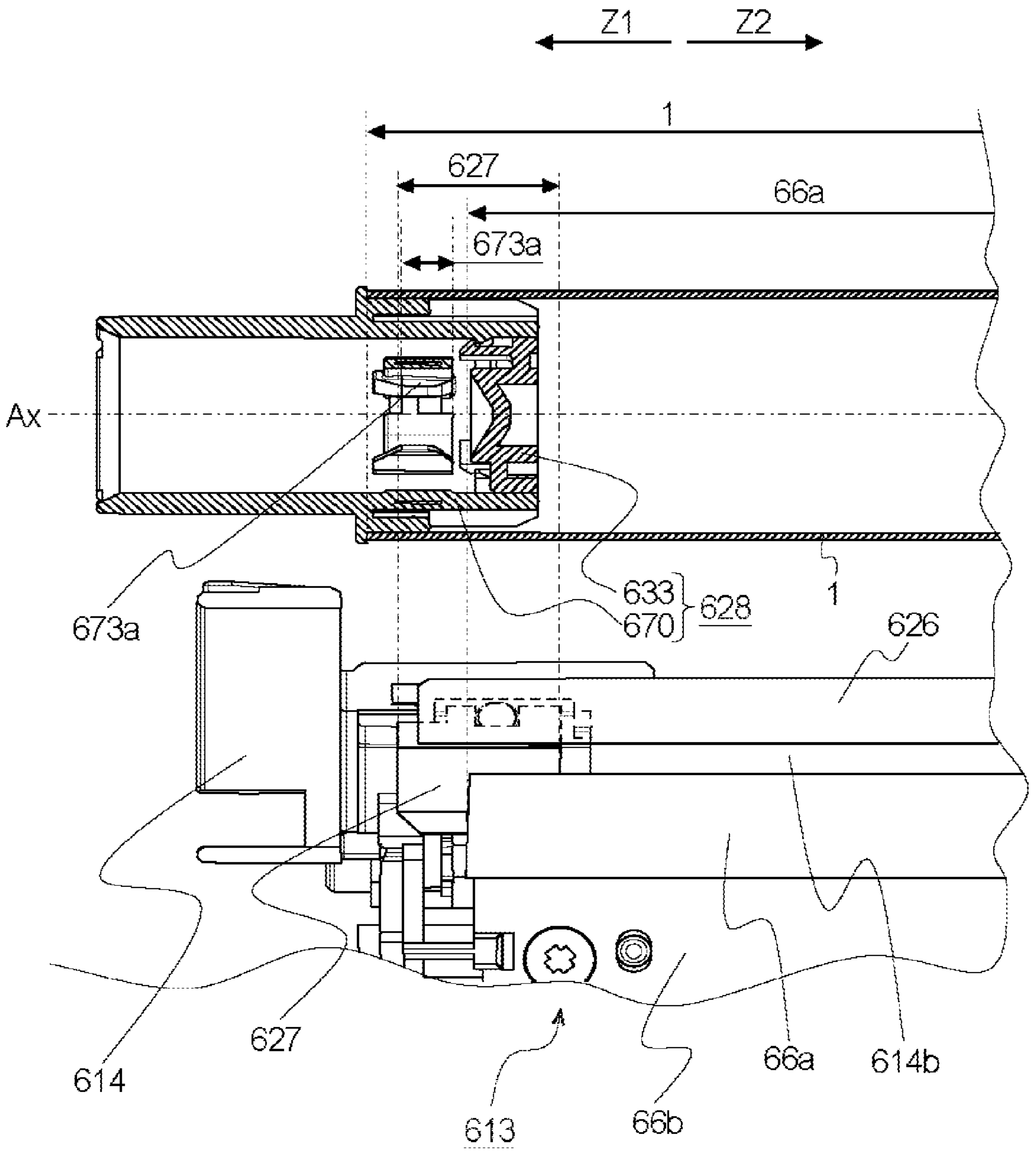
FIG. 61 is a section of view illustrating an arrangement relationship in the Z direction of each part of the cleaning unit according to the Embodiment 6.

FIG. 61 is a section of view illustrating an arrangement relationship in the Z direction of each part of the cleaning unit according to the Embodiment 6.

Figure 62:
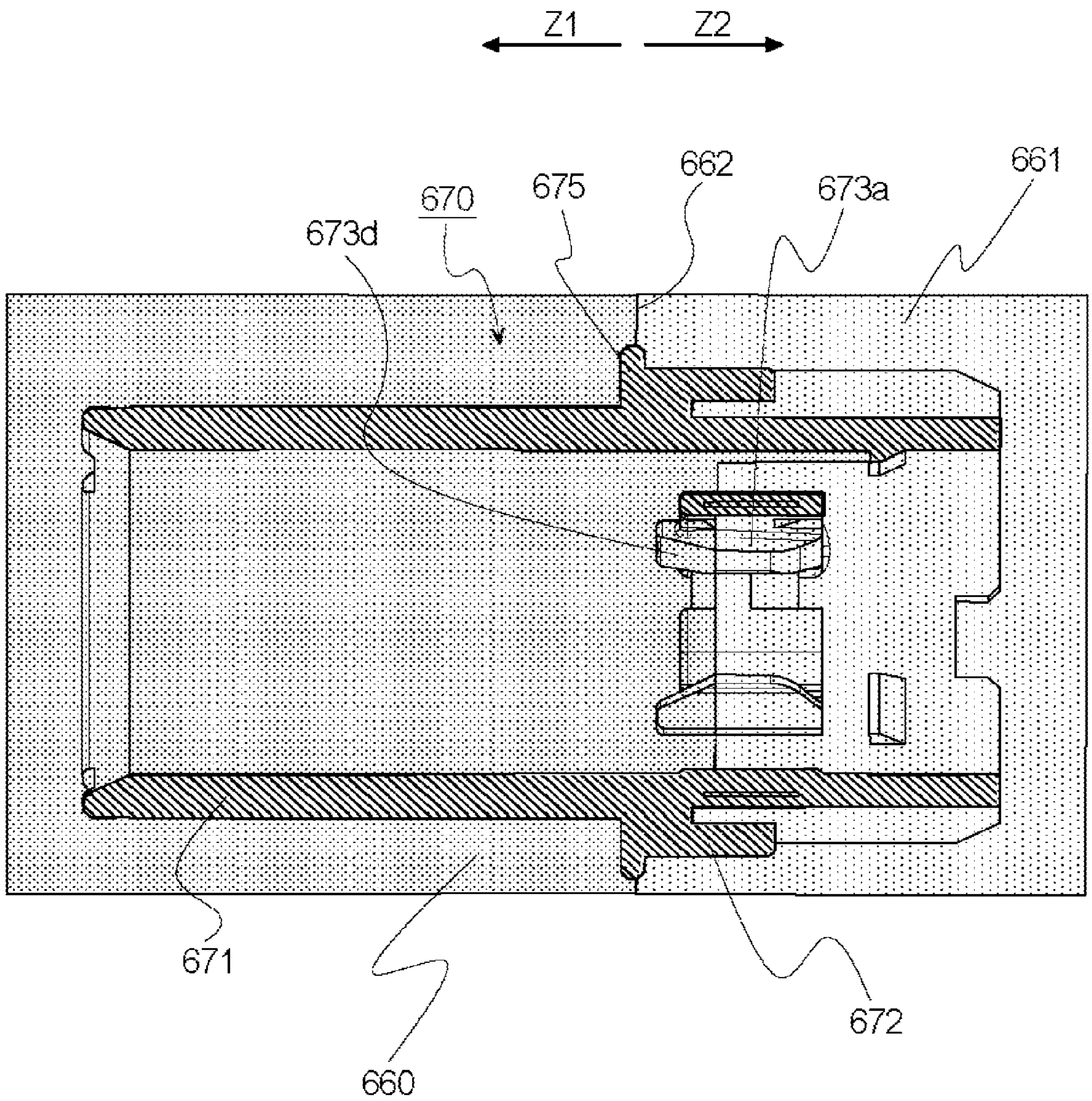
FIG. 62 is a sectional view illustrating a die structure of the flange member 670 according to the Embodiment 6.

FIG. 62 is a sectional view illustrating a die structure of the flange member 670 according to the Embodiment 6.

Figure 63:
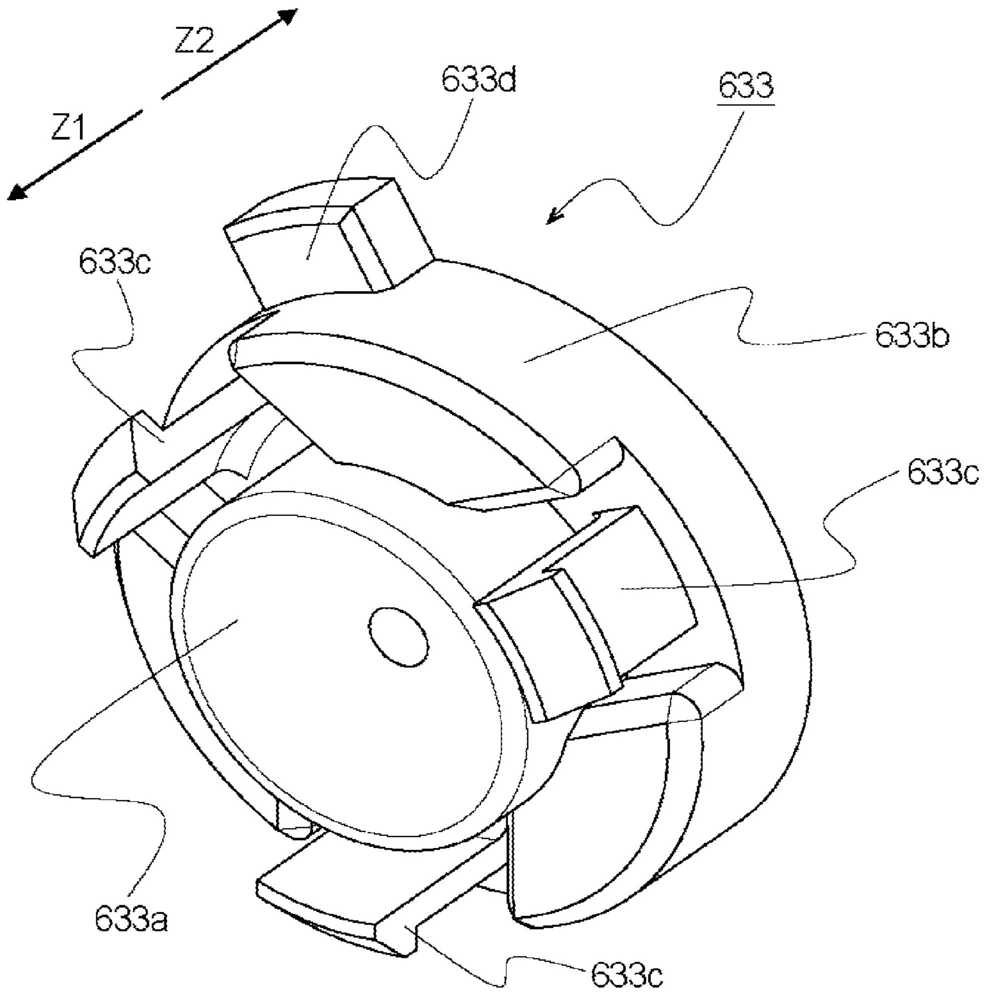
FIG. 63 is a perspective view of the alignment member 633 according to Embodiment 6.

FIG. 63 is a perspective view of an alignment member 633 according to Embodiment 5.

Figure 64:
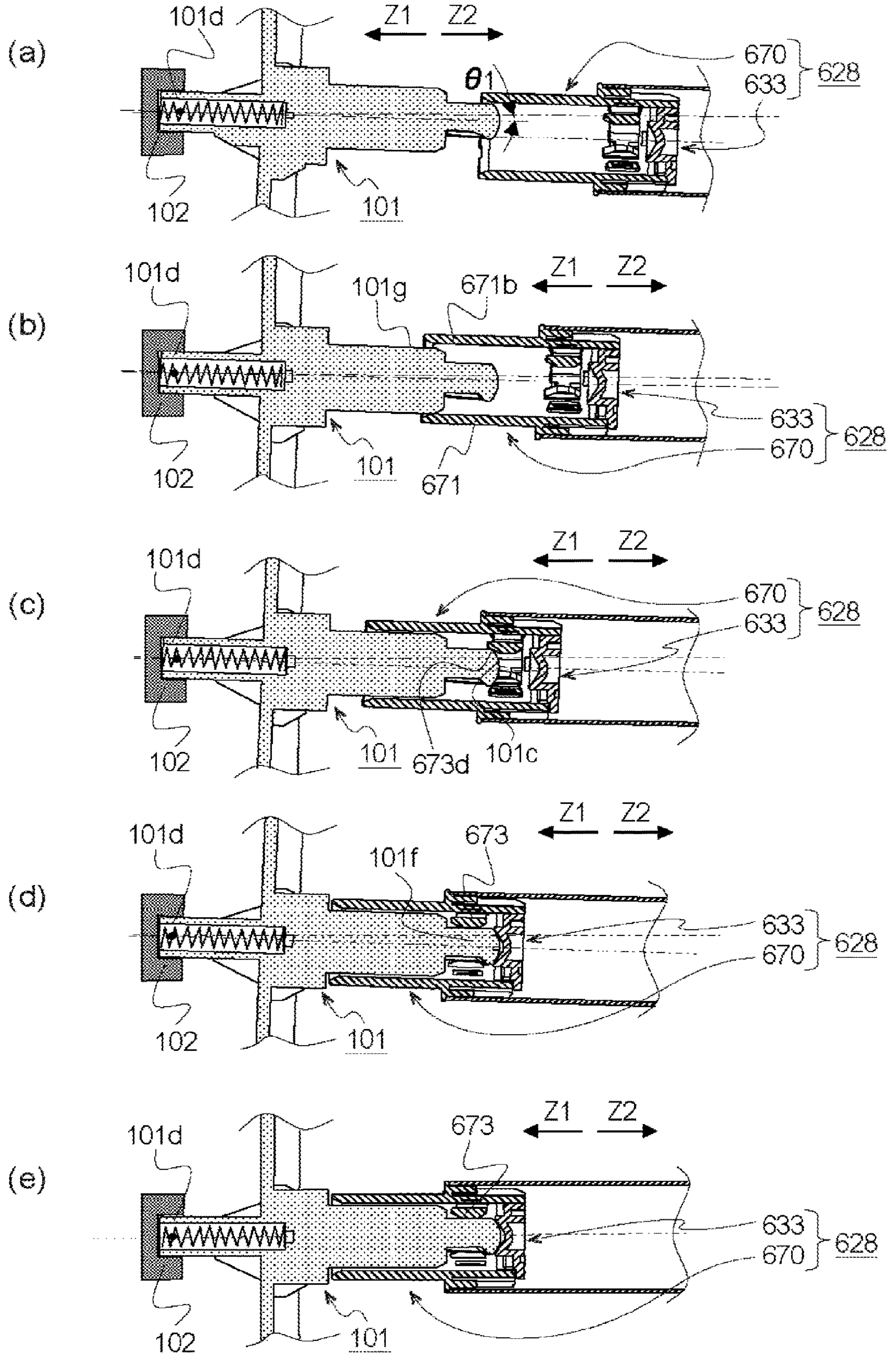
FIG. 64 is sectional views illustrating the mounting operation of the coupling member 628 to the main assembly driving shaft 101 according to Embodiment 6.

FIG. 64 is sectional views illustrating the mounting operation of the coupling member 628 to the main assembly driving shaft 101 according to Embodiment 6.

FIG. 65 is sectional views illustrating the mounting operation of the coupling member 628 to the main assembly driving shaft 101 according to Embodiment 6.

Figure 66:
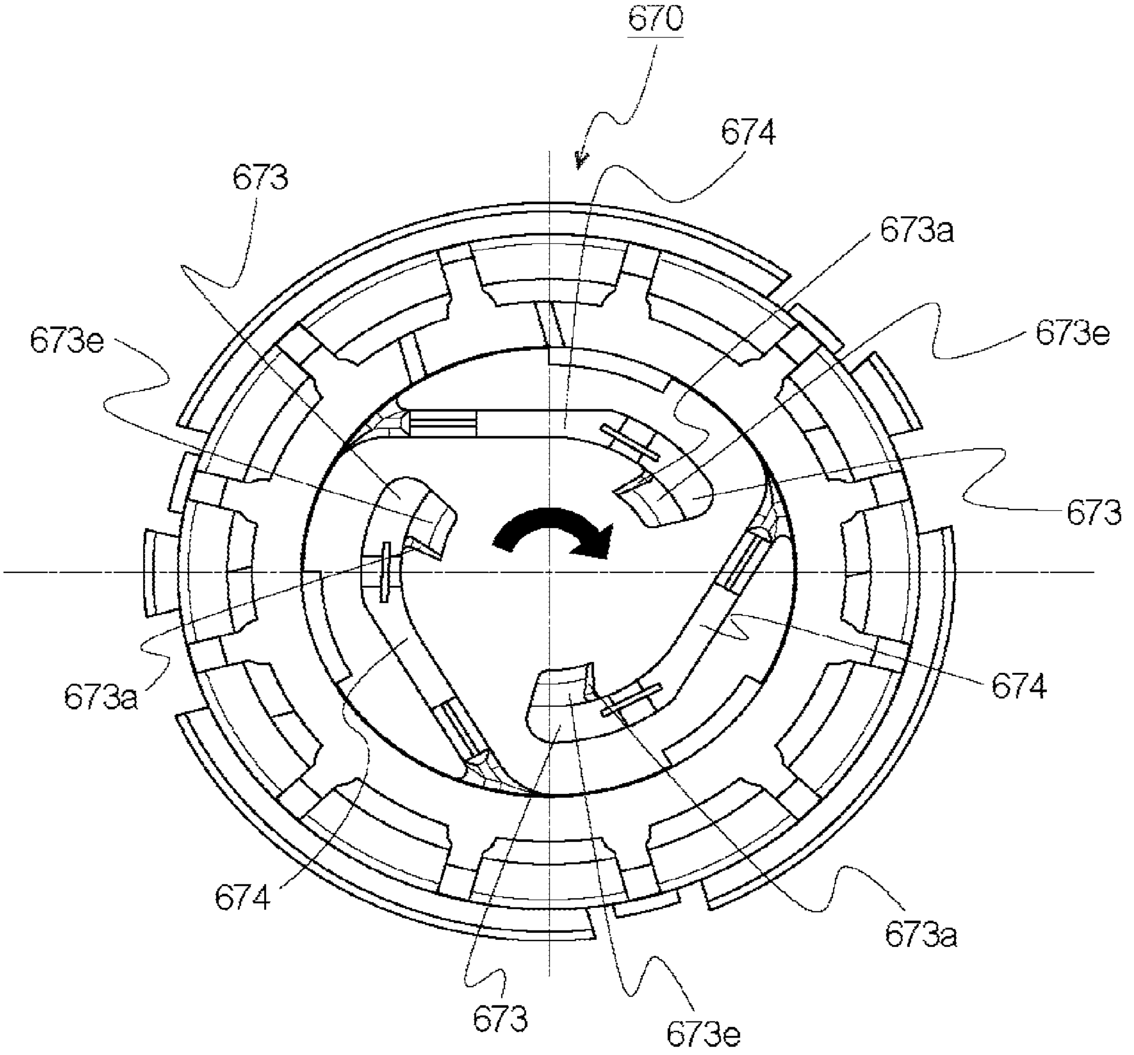
FIG. 66 is a view of the flange member 670 according to Embodiment 6 as viewed in the Z direction from the inner side.

FIG. 66 is a view of the flange member 670 according to Embodiment 6 as viewed from the Z direction from the inner side.

Figure 67:
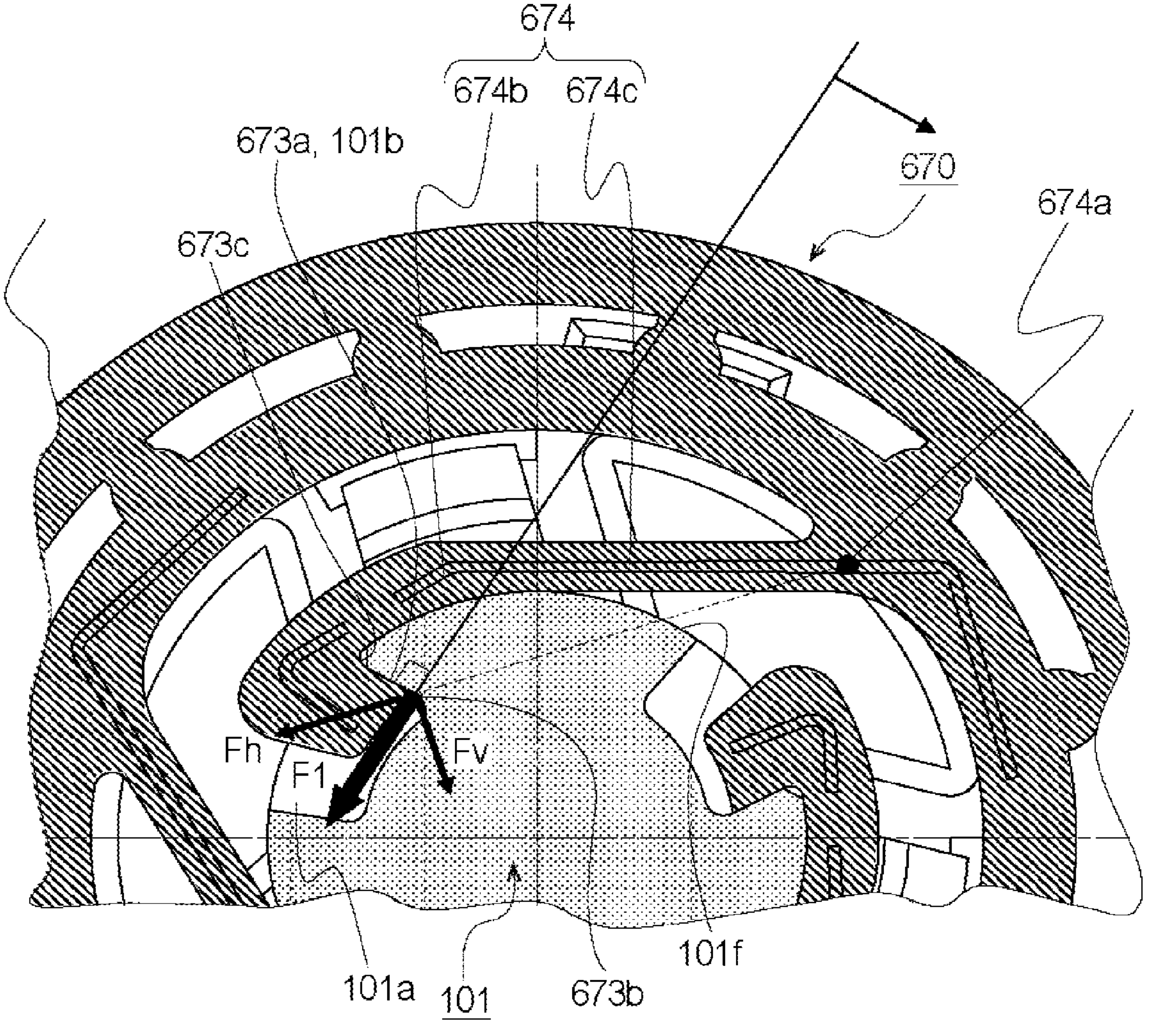
FIG. 67 is a cross-sectional view illustrating the drive transmission from the main assembly driving shaft to the coupling member according to the Embodiment 6.

FIG. 67 is a sectional view illustrating drive transmission from the main assembly drive shaft to the coupling member according to Embodiment 6.

Figure 68:
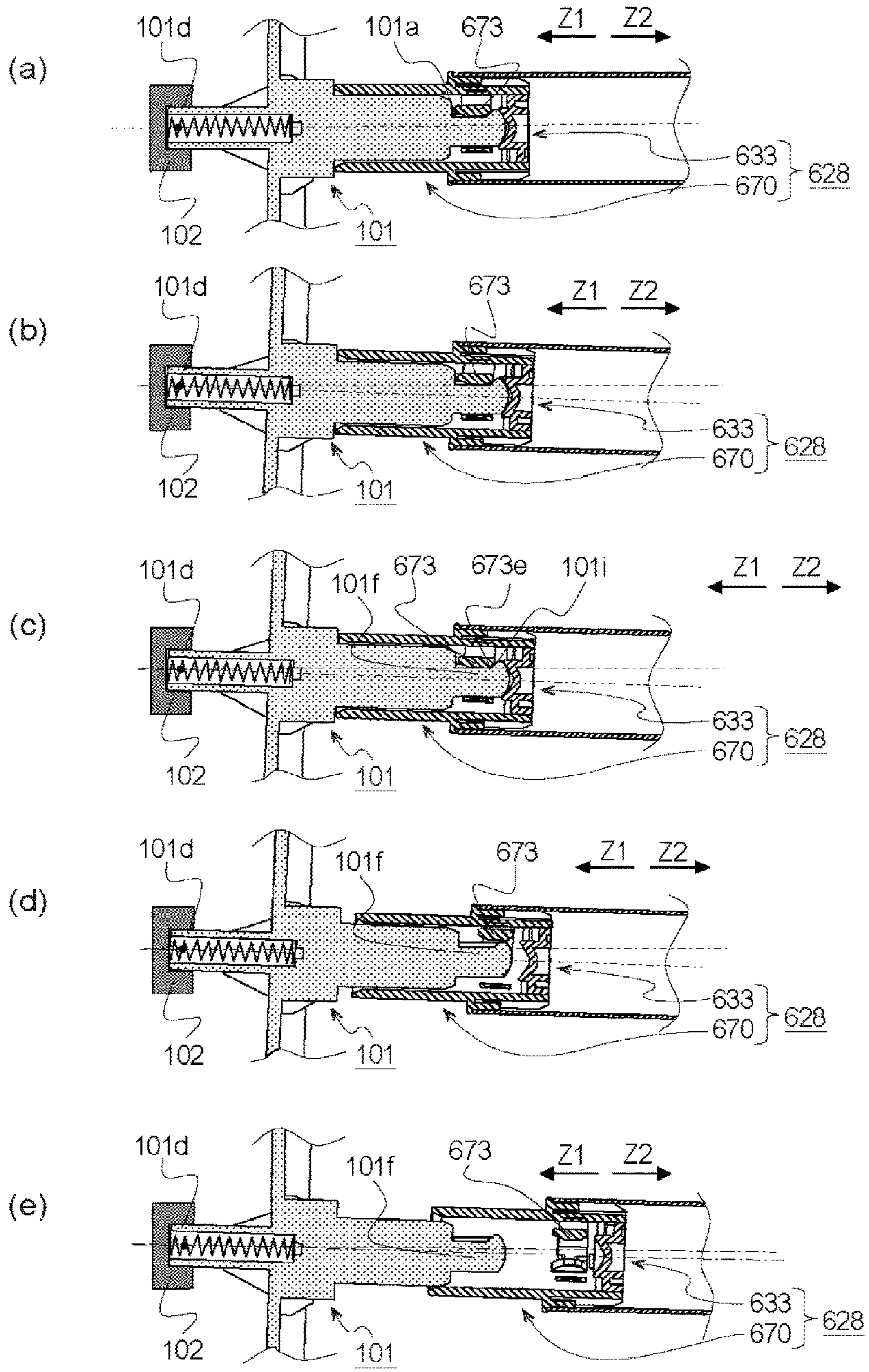
FIG. 68 is sectional views illustrating the dismounting operation of the coupling member 628 from the main assembly drive shaft 101 according to the Embodiment 6.

FIG. 68 is sectional views illustrating the removal operation of the coupling member 628 from the main assembly drive shaft 101 according to Embodiment 6.

Figure 69:
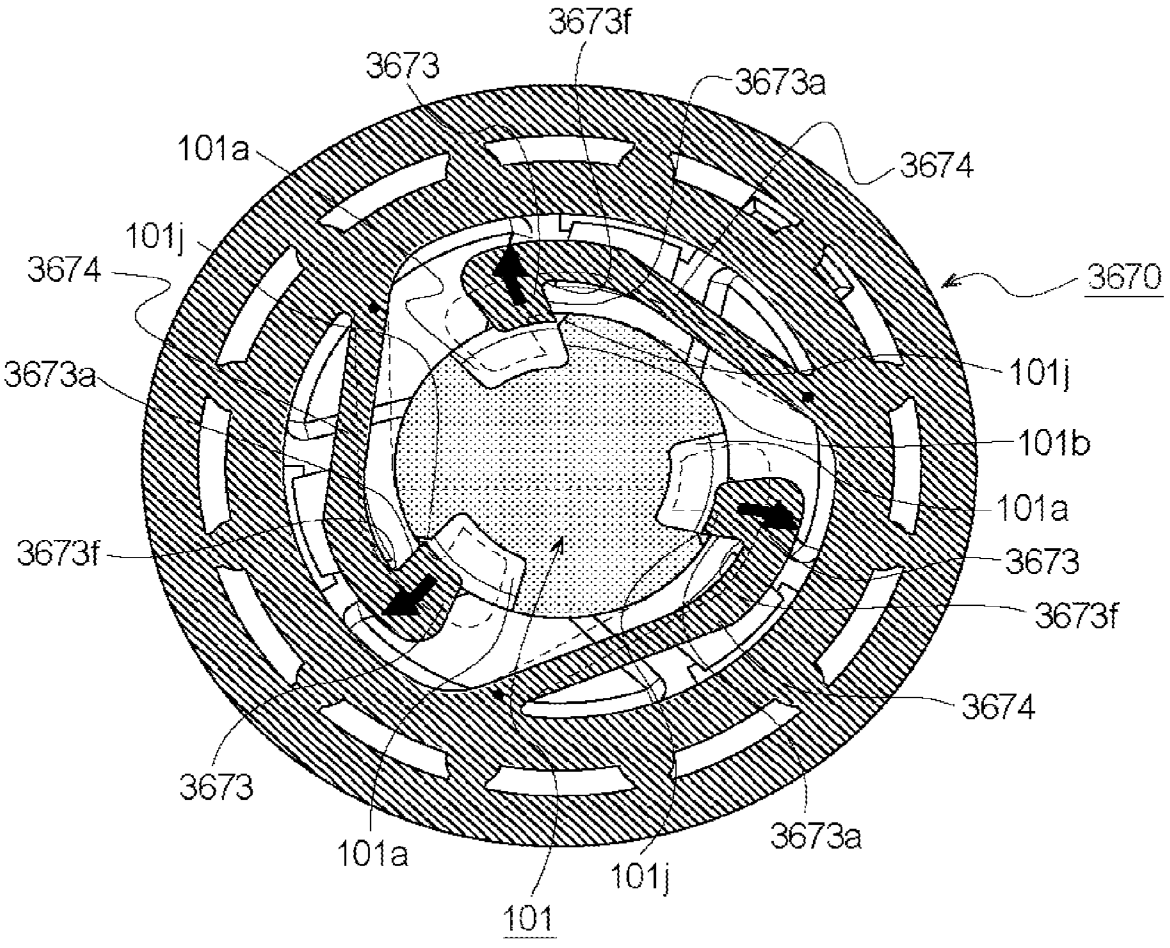
FIG. 69 is a sectional view illustrating a state in which the drive transmission from the main assembly driving shaft 101 to the coupling member 3628 is not stabilized, after long-term storage in a state that the phase of the engaging portion and the main assembly driving transmission groove are not aligned, in the case that the flange member is manufactured using a material exhibiting a large creep deformation.

FIG. 69 is a sectional view illustrating a state in which the drive transmission from the main assembly driving shaft 101 to the coupling member 3628 is not stabilized, after long-term storage in a state that the phase of the engaging portion and the main assembly driving transmission groove are not aligned, in the case that the flange member is manufactured using a material exhibiting a large creep deformation.

Figure 70:
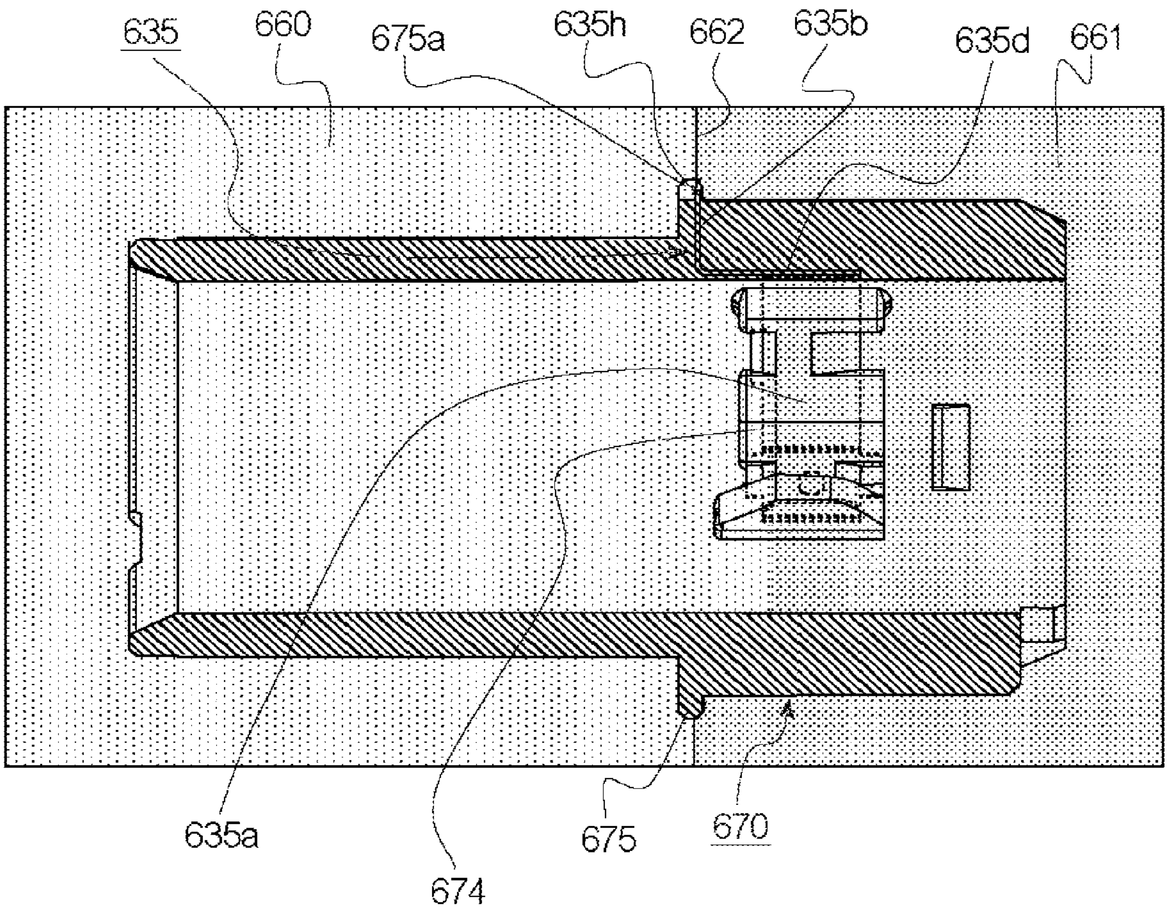
FIG. 70 is a sectional view illustrating a metal mold structure for inserting the metal plate 635 into the flange member 670 according to the Embodiment 6.

FIG. 70 is a sectional view illustrating a metal mold structure for inserting the metal plate 635 into the flange member 670 according to the Embodiment 6.

Figure 71:
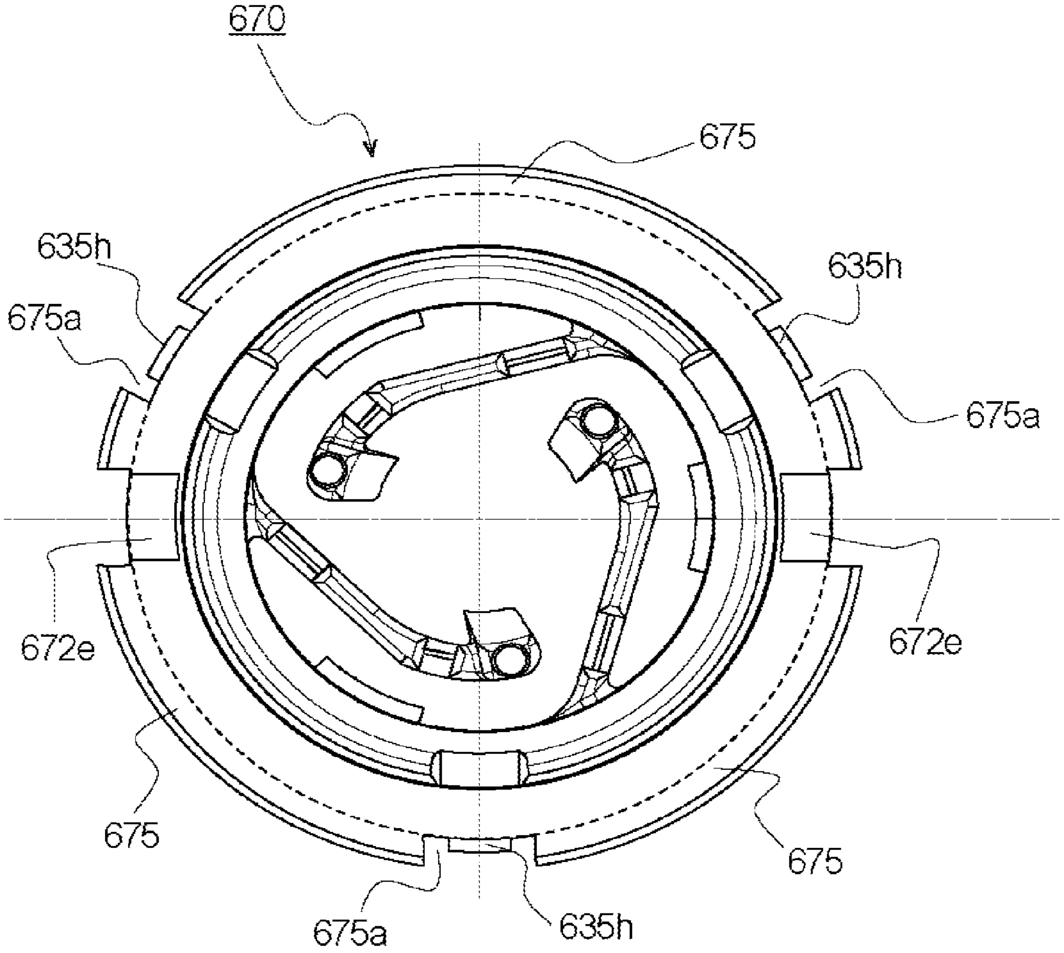
FIG. 71 is an illustration of the flange member 670 according to Embodiment 6 as viewed from the Z direction outer side.

FIG. 71 is a view of the flange member 670 according to Embodiment 6 as viewed in the Z direction from the outer side.

Figure 72:
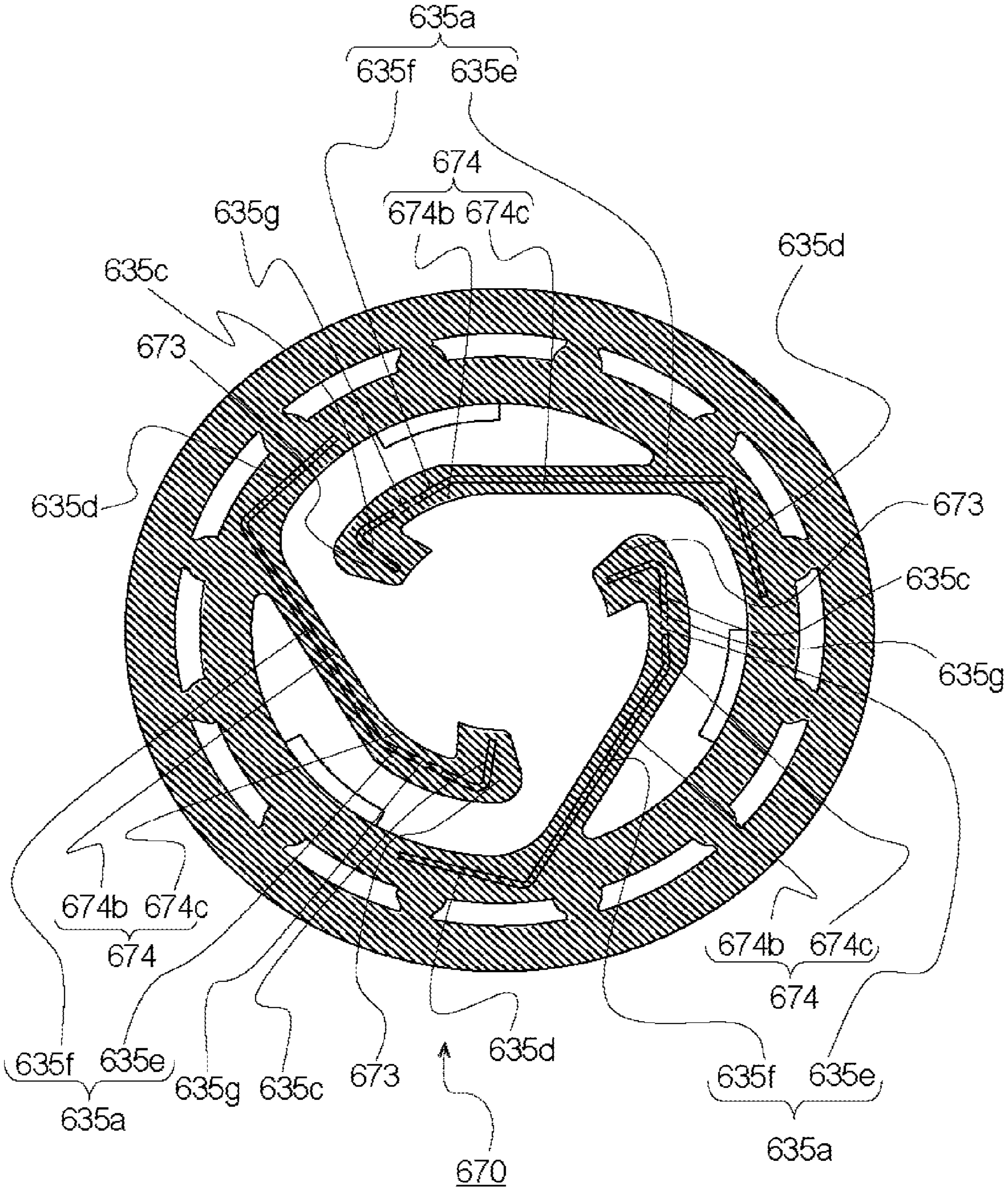
FIG. 72 is a cross-sectional view of the flange member 670 according to Embodiment 6.

FIG. 72 is a cross-sectional view of the flange member 670 in Embodiment 6.

Figure 73:
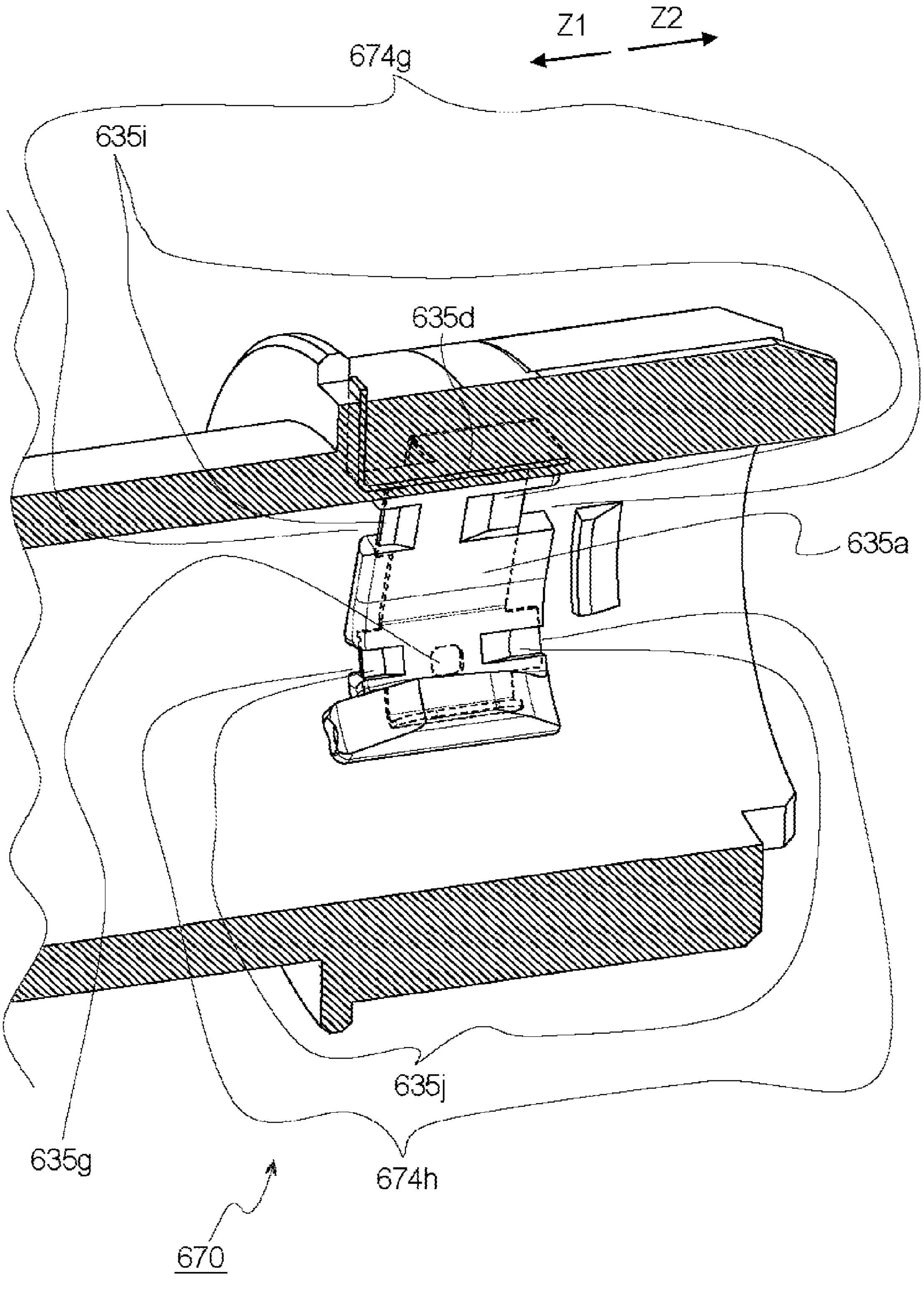
FIG. 73 is a sectional perspective view of the flange member 670 according to Embodiment 6.

FIG. 73 is a sectional perspective view of the flange member 670 according to Embodiment 6.

Figure 74:
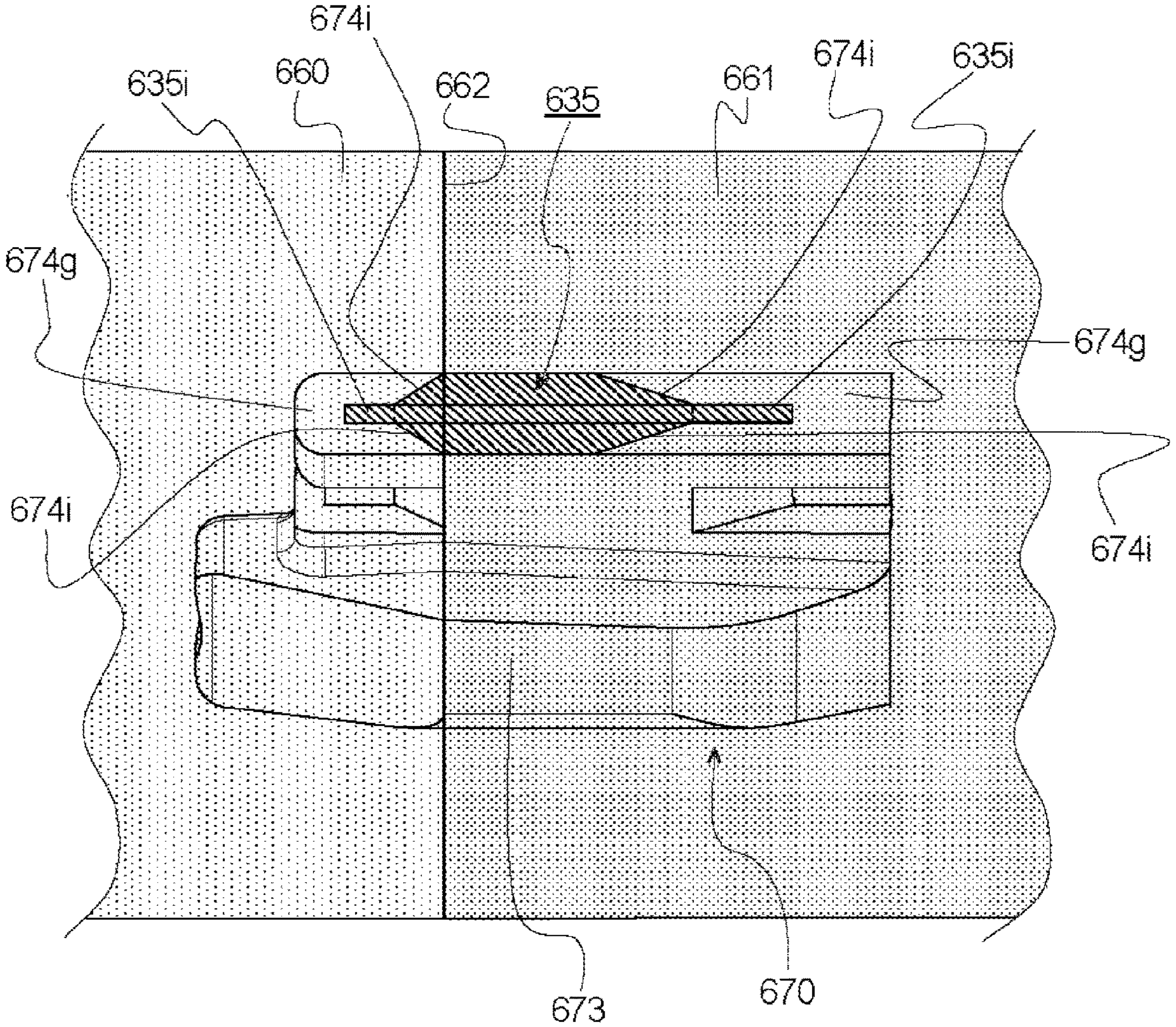
FIG. 74 is a partial cross-sectional view of the flange member 670 according to Embodiment 6 cut by a straight portion cut-away portion 674*g*.

FIG. 74 is a partial cross-sectional view of the flange member 670 according to Embodiment 6 cut by a straight portion cut-away portion 674*g*.

Figure 75:
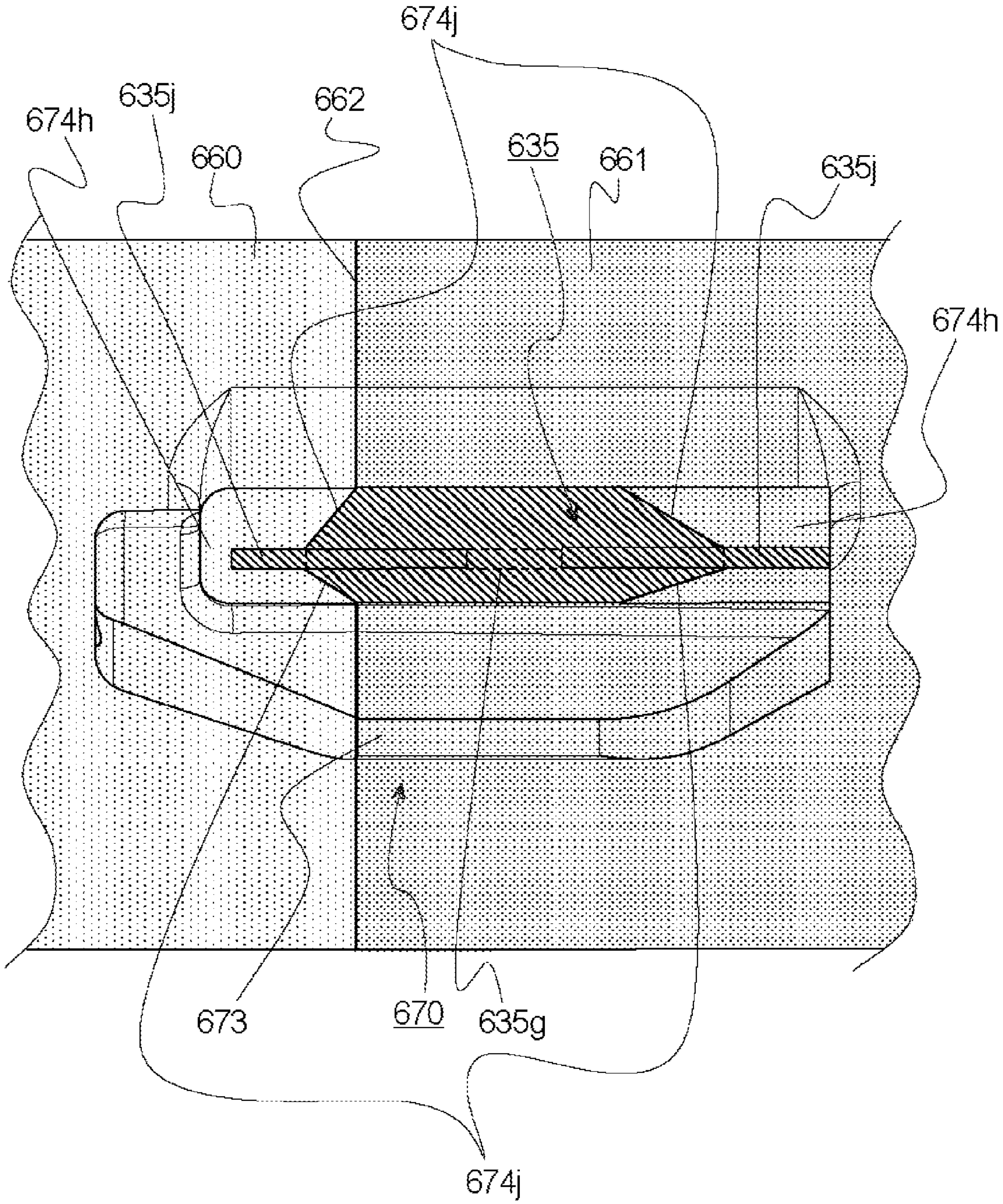
FIG. 75 is a partial sectional view of the flange member 670 according to Embodiment 6, taken along a winding portion cut-away portion 674*h*.

FIG. 75 is a partial sectional view of the flange member 670 according to Embodiment 6, taken along a winding portion cut-away portion 674*h*.

In Embodiment 5, the driving force receiving surface 573*a* and the base portion 574*a* of the base portion 574 are arranged on the inner peripheral surface 571*b* of the cylindrical portion 571 in the Z direction. In this embodiment, as shown in FIG. 59, the driving force receiving surface 673*a* and the root portion 674*a* are arranged in the Z direction in the mounting portion 672 (inside the photosensitive drum 1) in the Z direction in the inner circumference 672*h*. That is, the driving force receiving surface 673*a* and the root portion 674*a* are arranged on the back side (the Z2 direction side) of the end surface 675*b* of the flange portion 675 that abuts against the photosensitive drum 1 when the coupling member 628 is assembled to the photosensitive drum 1.

[Structure of Coupling Member]

As in Embodiment 5, the coupling member 628 is constituted by two members by combining the flange member 670 and the alignment member 633 (shown in FIG. 58). However, depending on selection of material and molding method, there is no need to have two members, it may be unitized, or may be constituted by combining three or more members.

Similarly to the previous embodiments, the coupling member 628 of this embodiment includes a driving force receiving surface (driving force receiving portion) 673*a* for receiving the driving force from the outside (main assembly driving shaft 101). The driving force receiving portion is provided on the projecting portion (the engaging portion 673), and the engaging portion 673 is supported by the base portion 674.

The engaging portion 673 and the base portion 674 are support portions for supporting the driving force receiving surface 673*a*. The base portion 674 is an extending portion (extension portion, extension portion) extending in the circumferential direction of the coupling member 628. An engaging portion 673 is provided at the free end of the base portion 674.

In this embodiment, as the supporting portion (the base portion 674 and the engaging portion 673) and the photosensitive drum 1 are projected onto the axis of the coupling member 628, the entire projection area of the supporting portion is in the projected area of the photosensitive drum 1. The description will be made.

(Description on Flange Member)

As in Embodiment 5, the engaging portions 673 are arranged at three positions (120 degrees interval, substantially equally spaced) at regular intervals in the circumferential direction of the flange member 670. Similarly, the base portions 674 are also arranged at three positions equally spaced in the circumferential direction of the flange member (as shown in FIG. 60).

Similarly to Embodiment 5, the base portion 674 includes a root portion 674*a*, a winding portion 674*b*, and a straight portion 674*c* linearly connecting the root portion 674*a* and the winding portion 674*b*.

As described above, the driving force receiving surface 673*a* and the root portion 674*a* are arranged in the back side (the Z2 direction side) of the end surface 675*b* of the flange portion 675 that abuts to the photosensitive drum 1 when the coupling member 628 is assembled to the photosensitive drum 1 (as shown in FIG. 59). However, a part of the engaging portion 673 including the insertion tapered surface 673*d* may protrude forward (Z1 direction) from the end surface 675*b* of the flange portion 75 to which the photosensitive drum 1 abuts.

Referring to FIGS. 61, the arrangement of the other components of the cleaning unit 613 and the driving force receiving surface 673*a* will be described. FIG. 61 is a section of view illustrating an arrangement relationship, in the Z direction, of each part of the cleaning unit 613. As described above, an opening 614*b* of a cleaning frame 614 suppresses leakage of toner in the rotational direction of the photosensitive drum 1 by A blade-shaped rubber 66*a* of a cleaning blade 66 and a blow-off prevention sheet 626. In addition, the opening 614*b* is provided with end seal members 627 at respective end portions in the Z direction, and a part of the opening 614*b* is brought into contact with the blade-like rubber (elastic member) 66*a* in the Z direction to be in close contact with the photosensitive drum 1 to suppress toner leakage. In the Z direction, the driving force receiving surface 673*a* is disposed in front of the blade-like rubber 66*a* of the cleaning blade 66 (in the Z1 direction), and at least a part of the driving force receiving surface 673*a* overlaps at least with the end sealing member 627. In other words, when the driving force receiving surface 673*a* and the end seal member 627 are projected onto the axis of the drum unit, at least a part of the projection region of the driving force receiving surface 673*a* and at least a part of the projection region of the end seal member 627 overlap with each other.

As in Embodiment 5, the driving force receiving surface 673*a* is twisted above the center of the rotating shaft of the flange member 670. The twisting direction is such that the outside of the driving force receiving surface 673*a* (with respect to the Z1 direction) is upstream of the inside (with respect to the Z2 direction) of the driving force receiving surface 673*a* with respect to the rotational direction of the photosensitive drum 1, and the amount of twisting is set to approximately 1 degrees per 1 mm.

As in Embodiment 5, the length L2 of the driving force receiving surface 73 and the distance L1 from the front end surface of the cylindrical portion 71 to the front side end surface of the engaging portion 673 in the Z direction satisfy L1>L2.

(Explanation on Manufacturing Method)

As in the case of embodiment 5, in the case of production using injection molding, it is preferably a two-piece mold consisting of the cylindrical mold 660 and the mounting portion side mold 661 (shown in FIG. 62).

Similarly to Embodiment 5, the end of the insertion taper 673 and the end of the driving force receiving surface 673*a* are arranged at the same position in the Z direction, and the mold parting plane 662 at the engaging portion 673 is made straight.

The inner diameter of the portion where the root portion 674*a* of the flange member 670 is provided is set to be substantially the same as the inner diameter of the other portion as in Embodiment 5.

Similarly to Embodiment 5, the engaging portion 673 and the support 674 do not overlap with other portions on a projection plane of the flange member 670 projected perpendicularly to the rotation axis (Z direction) (as shown in FIG. 60).

(Description on Alignment Member)

As in Embodiment 5, the aligning member 633 is provided with an inverted conical shape 633*a*, a press-fitting portion 633*b*, a retaining portion 633*c*, and a convex portion 633*d* (shown in FIG. 63). The projecting portion 633*d* is a portion for matching the phases of the aligning member 633 and the flange member 670 with each other.

As in Embodiment 5, in the Z direction, the center 101*h* of the semispherical shape 101*c* of the main assembly driving shaft 101 is within the range of the driving force receiving surface 673*a* in a state in which the semispherical shape 101*c* is in contact with the contact portion 633*e*. The alignment member 633 is mounted to the flange member 670 (shown in FIG. 58) so as to satisfy the condition.

Further, as shown in FIG. 58, the flange member 670 is provided with a press-fitted portion 672*a* at a position corresponding to the press-fit portion 633*b*. The press-fitted portion 672*a* is disposed on the inner side (the Z2 direction side) of the photosensitive drum unit 30 with respect to the press-fit portion 672*d* in the Z direction. Thus, it is possible to suppress the influence of deformation due to press-fitting of the press-fit portion 672*d* on the press-fitted portion 672*a*. By this, the center of the inverted conical shape 33*a* and the center of the photosensitive drum 1 can be aligned with high accuracy.

[Engaging Process of Coupling Member to Main Assembly Drive Shaft]

A process of engagement of the coupling member 628 with the main assembly driving shaft 101 will be described in detail.

As shown in part (a) of FIG. 64, similarly to Embodiment 1, the coupling member 628 is inserted toward the main assembly driving shaft 101 in a state of inclination of approx. 0.5-2 degrees relative to the angle at the time when the cartridge 7 is positioned relative to the image forming apparatus main assembly 100A (shown in part (e) of FIG. 64).

First, as shown in part (b) of FIG. 64, the free end of the inner peripheral surface 671*b* of the cylindrical portion 671 of the flange member 670 abuts against the rough guide portion 101*g* of the main assembly driving shaft 101. The main assembly driving shaft 101 is configured to support the bearing portion 101*d* in the cantilever fashion. Therefore, similarly to Embodiment 5, the coupling 7 is inserted into the main assembly driving shaft 101 in a state that the rough guide portion 101*g* of the main assembly driving shaft 101 fits the inner peripheral surface 671*b* of the coupling member 670. Similarly to Embodiment 1, in the Z direction, the driving force receiving surface 673 of the engaging portion 673 has a length L2 which satisfy L1>L2, where L1 is a distance from the front end surface of the cylindrical portion 671 to the front end surface of the engaging portion 673 (as shown in FIG. 58). Therefore, similarly to Embodiment 5, it is possible to suppress the semispherical shape portion 101*c* at the free end of the main assembly driving shaft 101 from hitting a unintended part of the engagement portion 673 or the base portion 674. Thus, the engaging portion 673 and the base portion 674 can be protected.

When the coupling member 628 is further inserted toward the rear side of the main driving shaft 101 from the state shown in part (b) of FIG. 64, the mounting tapered surface 573*d* of the engagement portion 673 and the semispherical shape portion 101*c* of the free end of the main assembly driving shaft 101 are brought into contact to each other. Due to the inclined surface of the insertion tapered surface 573*d* and the spherical shape of the semispherical shape 101*c*, the main assembly driving shaft 101 is guided substantially to the center of the three engaging portions 673.

Similarly to Embodiment 5, when the coupling member 628 is further inserted into the main assembly driving shaft 101, the base portion 674 elastically deforms radially outward so that the engagement portion 673 follows the semispherical shape 101*c*. As a result, as shown in part (a) of FIG. 65, the engaging portion 673 moves (retracts) to the outer diameter of the shaft portion 101*f* of the main assembly driving shaft 101. By this movement, as shown in part (d) of FIG. 64, the coupling member 628 is mounted to the main assembly driving shaft 101 until the dismounting tapered surface 673*e* of the engagement portion 673 comes deeper in the Z direction than the main assembly side dismounting taper 101*i* of the main assembly driving shaft 101.

Thereafter, similarly to Embodiment 1, the cartridge 7 is lifted so that the drum unit bearing member 39L of the cartridge 7 abuts against the front side cartridge positioning portion 110. By thus lifting the cartridge 7, the cartridge 7 is positioned relative to the image forming apparatus main assembly 100A (as shown in part (d) of FIG. 21). By the operation of this cartridge 7, as shown in part (e) of FIG. 64, the inclination of the coupling member 628 is eliminated.

When the main assembly driving shaft 101 rotates, the phases of the main assembly drive transmission groove 101*a* and the engagement portion 673 are aligned as in the Embodiment 5. As a result, at least a part of the elastic deformation of the base portion 674 is eliminated, and a part of the free end side of the engagement portion 673 enters the main assembly drive transmission groove 101*a*. By this, the coupling member 628 and the main assembly driving shaft 101 are engaged (as shown in part (b) of FIG. 65).

When the phases of the main assembly drive transmission groove 101*a* and the engagement portion 673 are in phase alignment with each other, at least the elastic deformation of the base portion 674 is released at the stage of part (d) of FIG. 64, and the state of part (b) of FIG. 65 results.

[Driving of Coupling Member by Main Assembly Drive Shaft]

Similarly to Embodiment 1, the driving force receiving surface 673*a* has a twisted shape and is inclined with respect to the rotation axis of the flange member 670. This is employed in order that a force is produced for the reverse conical shape 633*a* of the aligning member 633 to assuredly contacts to the semispherical shape 101*c* of the free end of the main assembly driving shaft 101, when receiving driving force at the driving force receiving surface 673*a* from the main assembly driving shaft 101. The twisting direction is such that the outer side (the Z1 direction side) of the driving force receiving surface 673*a* is disposed upstream of the inner side (the Z2 direction side) with respect to the rotational direction of the photosensitive drum 1 (as shown in FIG. 66).

Similarly to Embodiment 5, as the flange member 670 is viewed along the Z direction, a straight line is drawn from the inner diameter end 673*b* of the driving force receiving surface 673*a* in a direction perpendicular to the driving force receiving surface 673*a*. With respect to the straight line, the root portion 674*a* is disposed on the upstream side in the rotational direction of the flange member 670 (FIG. 67). By doing so, when the driving force F1 is provided from the main assembly driving shaft 101, the winding portion 574*b* winds around the shaft portion 101*f*. Thus, similarly to Embodiment 5, even if the load received by the photosensitive drum unit 30 changes, the deformation amount of the base portion 574 is small, and therefore, the influence of deformation on the rotation of the photosensitive drum unit 30 can be suppressed to a small degree.

In addition, in this embodiment, in the Z direction, the root portion 674*a* of the base portion 674 is disposed at the same position as the press-fit portion 672*d* (shown in FIG. 59). That is, in the Z direction, the root portion 674*a* is disposed inside the photosensitive drum 1. That is, when the photosensitive drum (cylinder) 1 and the base portion 674 are projected onto the axis of the photosensitive drum 1, the projection area of the base portion 674*a* overlaps the projection area of the photosensitive drum 1 on the axis. In particular, in this embodiment, the entire projection area of the base portion 674 overlaps the projection area of the photosensitive drum 1. That is, the entire projection area of the base portion 674 is inside the projection area of the photosensitive drum 1.

Similarly, in the Z direction, the engaging portion 673 is disposed inside the photosensitive drum 1. That is, when the photosensitive drum 1 and the engaging portion 673 are projected onto the axis of the photosensitive drum 1, the projection area of the engaging portion 673 overlaps the projection area of the photosensitive drum 1 on the axis.

In Embodiment 5, the root portion 574*a* is disposed outside with respect to the Z direction beyond the mounting portion 572 (FIG. 59). However, with this structure, there is a likelihood that when the driving force receiving surface 573*a* receives the driving force F1 from the main assembly driving shaft 101, the cylindrical portion 571 between the root portion 574*a* and the press-fitting portion 572*d* may be twisted.

On the other hand, in the case that at least a part of the root portion 674*a* is arranged at the same position as the press-fit portion 672*d* in the Z direction as in this embodiment, the amount of the twisting deformation becomes small. This is because the press-fit portion 672*d* is covered by the photosensitive drum 1, so that even if a force is applied from the outside via the base portion 674*a*, the press-fit portion 672*d* is hardly deformed. That is, even if the driving force receiving surface 573*a* receives the driving force from the main assembly of the apparatus, the press-fitting portion 672 is less likely to be twisted and the cylindrical portion 671 is less likely to be twisted, if the root portion 674*a* is mounted to the press-fitting portion 672. namely, the amount of deformation of the flange member 670 can be suppressed to be small.

As a result, even if the load received by the photosensitive drum unit changes, the deformation amount of the flange member 670 is small, and therefore, the influence of deformation on the rotation of the photosensitive drum unit 30 can be suppressed. As a result, the photosensitive drum 1 can be more stably driven.

Further, the engaging portion 673 (driving force receiving surface 673*a*) is disposed inside the photosensitive drum 1 in the Z direction. By employing this arrangement, the following effects can be provided.

When the positions of the main assembly driving shaft 101 and the coupling member 628 deviate due to the component part tolerances, the inclination of the main assembly driving shaft 101 is can be made small, if the drive force receiving surface 673*a* is disposed at a position far from the bearing portion 101*d* for the main assembly driving shaft 101. The driving force receiving surface 673*a* can be placed more inside the photosensitive drum 1 (in the Z direction) by placing the driving force receiving surface 673*a* inside the press-fit portion 672*d* as in this embodiment than by placing the driving force receiving surface 673*a* inside the cylindrical portion. With this arrangement, the inclination of the main assembly driving shaft 101 can be suppressed when the position of the coupling member 628 deviates relative to the positions of the main assembly driving shaft 101. As a result, the photosensitive drum 1 can be stably driven.

[Removal of Coupling Member from Main Assembly Driving Shaft]

Referring to FIG. 69, the removal operation of the coupling member will be described. As in Embodiment 5, the drive force receiving surface 673*a* and the main assembly drive transmission surface 101*b* are in contact with each other when the rotational drive of the main assembly driving shaft 101 is stopped. In this state, a part of the engagement portion 673 is in the main assembly drive transmission groove 101*a* (shown in part (a) of FIG. 68).

When the cartridge door 104 is opened, the lower front side cartridge guide 109 lowers, and the drum unit bearing member 39L separates from the front side cartridge positioning portion 110 of the image forming apparatus main assembly 100A. At this time, the coupling member 628 and the main assembly driving shaft 101 are inclined by about 0.5 to 2 degrees with relative to the mounting complete state (Z direction) as in Embodiment 5 (part (b) of FIG. 68).

When the cartridge 7 is started to be removed from the image forming apparatus main assembly 100A, the removed tapered surface 673*e* of the engaging portion 673 abuts against the main assembly side removed taper 101*i*, as in the Embodiment 5. When the dismounting tapered surface 673*e* abuts against the main assembly side dismounting taper 101*i*, the base portion 674 begins to elastically deform and moves the engaging portion 673 radially outward along the main assembly side dismounting taper 101*i* (part (c) of FIG. 68).

Further, when the coupling member 628 is disengaged from the main driving shaft 101, as in the Embodiment 5, the state is the same as in part (a) of FIG. 65, in which the base portion 674 is further elastically deformed, and the engagement portion 673 is moved to the outer diameter of the shaft portion 101*f* of the shaft 101. As the engaging portion 673 moves to the outer diameter of the shaft portion 101*f*, the engagement between the engaging portion 673 and the main assembly drive transmission groove 101*a* is canceled (eliminated). In this case, as shown in part (d) of FIG. 68, the coupling member 628 can be removed from the main assembly driving shaft 101.

Further, when the coupling member 628 is removed from the main assembly driving shaft 101, as shown in part (e) of FIG. 68, the elastic deformation of the base portion 674 is released and the position of the engagement portion 673 returns to the position before the elastic deformation.

With the above-described operation, the coupling member 628 can be removed from the main assembly driving shaft 101.

[Insert Molding of Flange Member]

The material, shape, and manufacturing method of the coupling member 628 may be appropriately selected if the mountability and drive transmission are stable. In particular, when mass production is taken into consideration, it is preferable to use a resin material.

Specifically, by forming the coupling member 628 using the resin materials (POM, PPS, PS, nylon, etc.) exemplified below, it is possible to provide a result satisfactorily meeting the drive transmission property and the mountability to the device main assembly.

Under such circumstances, the result of investigation the further improvement of the performance of the coupling member will be described below.

The apparatus may be kept unoperated under a high temperature condition in this state that the engagement portion 673 of the flange member 670 and the main assembly drive transmission groove 101*a* of the main assembly driving shaft 101 are not in phase with each other, that is, the base portion 674 is left in a state of being elastically deformed. If this state continues, creep deformation may occur in the base portion 674. The amount of creep deformation depends on the stress applied to the base and the ambient temperature, and therefore, the amount of creep deformation varies depending on the straight thickness 6741 of the base portion and the material of the resin. In such special circumstances, the results of deep investigations for further improvement of reliability will be described below.

FIG. 69 in an illustration illustrating a situation occurring when the creep deformation of the base portion 3674 is large. Specifically, this Figure shows a state in which the inner diameter end 3673*b* of the driving force receiving surface 3673*a* is deformed radially outward to the extent of the position contacting the relief portion 101*j*. For example, when a resin material having a large creep deformation is used, creep deformation of the base portion 3674 proceeds, even to the extent that even when the main assembly driving shaft 101 rotates, the engagement portion 3673 cannot be pulled inward in the radial direction in some cases. In other words, there is a likelihood that the photoconductive drum 1 can not be rotated stably, or the photoconductive drum 1 can not be driven.

Therefore, in order to suppress creep deformation, sheet metal (metal plate, plate-like metal) was inserted as an auxiliary member inside the resin material. As a result, it was possible to suppress the creep deformation as compared with the structure formed only with the resin. In addition, as long as the resin material has excellent creep resistance such as POM and PPS, the result that sufficient reliability can be ensured without placing an auxiliary member inside the resin was obtained.

Condition 1: POM (LC750 available from Asahi Kasei Chemicals Corporation, Japan): Stainless steel sheet metal having a thickness of 0.2 mm inside.

Condition 2: PPS (Torelina A900 available from Toray Industries, Inc.,

Japan).

Condition 3: POM (LC750 available from Asahi Kasei Chemicals Corporation, Japan).

Condition 4: PS (VS142 available from PS Japan): Stainless steel sheet metal having a thickness of 0.2 mm inside.

Condition 5: PS (VS142 a veritable from PS Japan).

When the engagement portion 673 of the flange member 670 and the main assembly drive transmission groove 101*a* of the main assembly drive transmission shaft 101 were not in phase alignment with each other and were stored in a high temperature environment (three days at 50 degrees C.), and the results were that no large creep deformation occurred, in the above-described conditions 1 to 4. Specifically, no creep deformation that had a large influence on drive transmission was observed. However, when resin material with low creep resistance like PS was used, the result was that the creep deformation affected on driving force transmission (condition 5). Nevertheless, it is possible to suppress creep deformation by reinforcement with a sheet metal made of stainless steel as a reinforcing member (auxiliary member) even though the material PS has low load deflection temperature (condition 4).

That is, even if the base portion 674 is made of only the resin material, it was sufficiently resistant to creep deformation without a inserted reinforcing member, if the material has a sufficient creep resistance. It is preferable to insert an auxiliary member in order to ensure high reliability even in a case of receiving in a higher temperature environment for a longer period of time. In other words, it can be said it is preferable that the resin material that is excellent in creep resistance like POM is reinforced with stainless steel sheet metal as in Condition 1, from the standpoint of suppressing the creep deformation. namely, it is possible to prevent the engagement of the driving force receiving surface 673*a* with the main assembly drive transmission surface 101*b* from becoming shallow, thus reliably engaging with the main assembly driving shaft 101.

Hereinafter, a structure for insert-forming the sheet metal member 635 in the flange member 670 will be described in detail.

In this embodiment, three sheet metal members 635 (sheet metal made of stainless steel) as reinforcing members are equally arranged in the circumferential direction of the flange member. The sheet metal member 635 is a member formed by machining a metal plate (metal plate), and is a plate made of stainless steel, that is, an alloy plate mainly made of iron. The sheet metal member 635 is not necessarily made of stainless steel or iron, but may be made of another material.

As shown in FIG. 70, the sheet metal member 635 has a base inside portion 635*a*, an engagement portion inside portion 635*c*, a flange portion inside portion 635*b*, and a connecting portion 635*d*.

The flange inner portion 635*b* is sandwiched between the cylindrical mold 660 and the mounting portion side mold 661 at the parting plane 662. This is done in order to stably mount the sheet metal member 635 to the flange member 670 in the Z direction of the flange member 670. In addition, the portion (the pressed portion 635*h*) which is sandwiched by the metal molds is configured to be exposed from the resin. That is, the sheet metal member 635 has a portion exposed from the resin portion.

Further, as shown in FIG. 71, one of the pressed portions 635*h* is disposed at a position shifted in phase by 90 degrees as viewed from the clamp groove 672*e*. Therefore, the clamp groove 672*e* and the pressed portion 635*h* can be arranged so as not to overlap with each other in the circumferential direction. As shown in FIG. 29, the flange portion inner portion 635*b* is arranged perpendicular to the base inner portion 635*a* disposed in the base portion 674. The flange member 670 has three cut-away portions 675*a* in the flange 675. Then, the pressed portion 635*h* is disposed within a range where the cut-away portion is provided. The cut-away portions 675*a* are equally arranged in the circumferential direction, and one of the cut-away portions 675*a* is disposed at a position perpendicular to the clamp groove 72*e*.

The base inner portion 635*a* comprises a straight portion inside portion 635*e* and a winding portion inside portion 635*f* inside the winding portion 674*b* (inside the straight portion 674*c* of the base portion 674) (as shown in FIG. 72).

The winding portion inner portion 635*f* may not have a R shape corresponding to the winding portion 674*b* but may have a straight shape as shown in FIG. 72.

Further, as shown in FIG. 72, the connection holes (through holes) 635*g* formed in the base inside 635*a* can be connected with the resin on the front and rear surfaces of the metal plate to increase the bonding force between the resin and the metal. That is, the communication hole 63*g* is a hole in which the resin is provided.

In order to prevent the base inner portion 635*a* from being deformed by the resin pressure at the time of injection molding, and in order to hold the base inside portion 635*a* by the cylindrical portion side mold 660 and the mounting portion side 661 described above, the base inner portion 635*a* is exposed at a part of the base portion 674. This increases the accuracy of forming the base portion 674.

Specifically, as shown in FIGS. 72 and 73, a straight part cut-away portion 674*g* and a winding part cut-away portion 674*h* are provided in the resin molded part of the straight part inside 635*e* and the winding part inside 635*f*, respectively. The straight portion exposed portion 635*i* exposed to the outside of the resin portion, and the winding portion exposed portion 635*j* are included in the base inner portion 635*a*.

The straight portion exposed portion 635*i* and the winding portion exposed portion 635*j* are sandwiched between the cylindrical portion side mold 660 and the mounting portion side mold 661. By this, it is made possible to suppress deformation of the base interior 635*a* by the resin pressure during injection molding.

Also, as shown in FIGS. 74 and 75, the straight portion cut-away portion 674*g* and the winding portion cut-away portion 674*h* have straight portion cut-away portion tapered surface 674*i* and a winding portion cut-away portion tapered surface 674*j*, respectively. The cylindrical portion side mold 660 and the mounting portion side mold 661 have tapered shapes corresponding to the shapes of the straight portion cut-away portion tapered surface 674*i* and the winding portion cut-away portion tapered surface 674*j*, respectively. Therefore, even if some misalignment occurs with respect to the corresponding groove shape of the metal mold due to the dimensional tolerance of the metal plate member 635, the taper shapes of the cylindrical part side mold 660 and the attachment part side mold 661 is capable of guiding to the predetermined position of the mold (corresponding groove shape of the mold). As a result, when the resin portion is molded, the engaging portion inside portion 635*a* is disposed inside the engaging portion 673.

As shown in FIG. 73, the connecting portion 635*d* has a shape for connecting the base inside portion 635*a* and the flange portion inside portion 635*b*.

The above is a description of a structure for insert molding the sheet metal 635 into the flange member 670.

Also, the above-described embodiments and the embodiments which will be described hereinafter, insert molding may be used in order to obtain good creep properties as in this embodiment.

Embodiment 7

Figure 76:
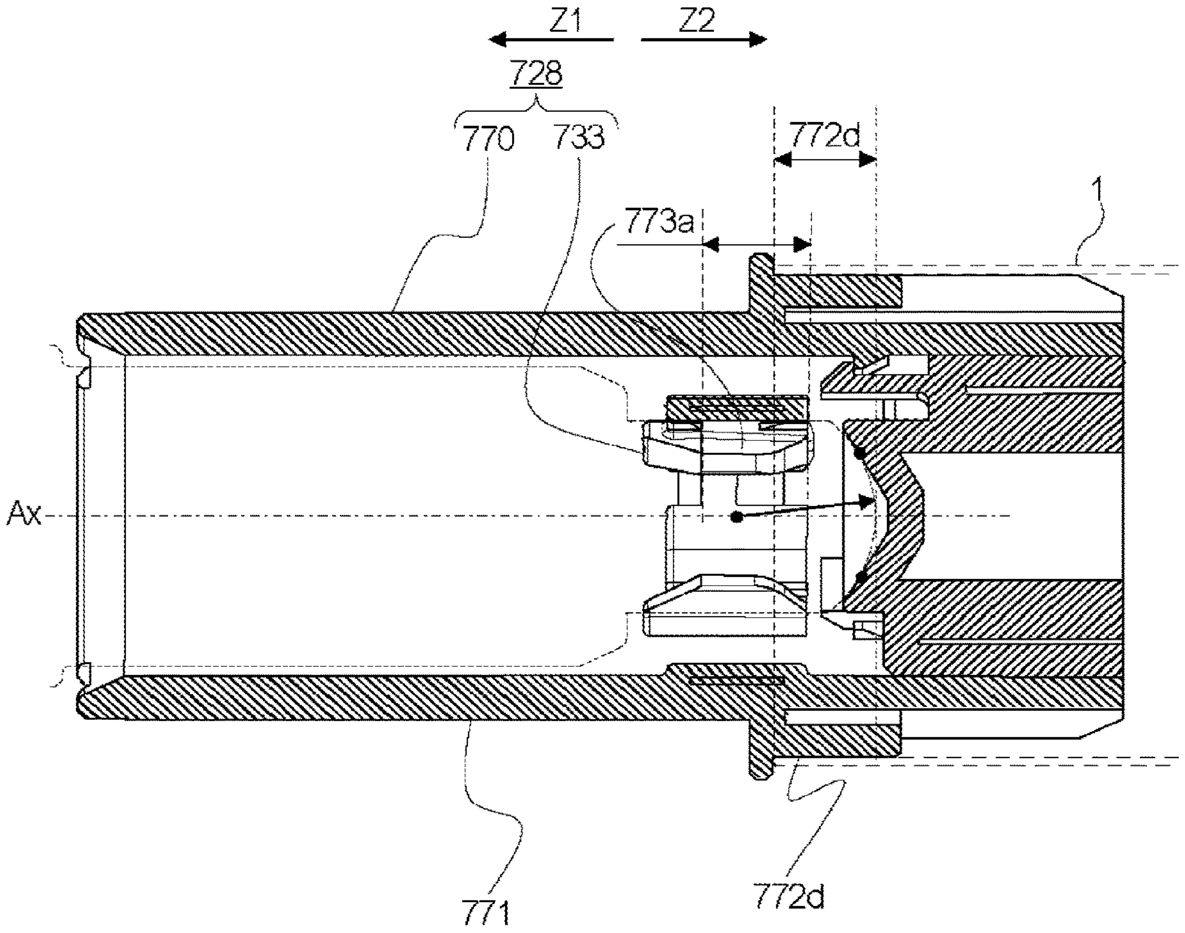
FIG. 76 is a cross-sectional view of the coupling member 728 according to Embodiment 7.
Figure 77A:
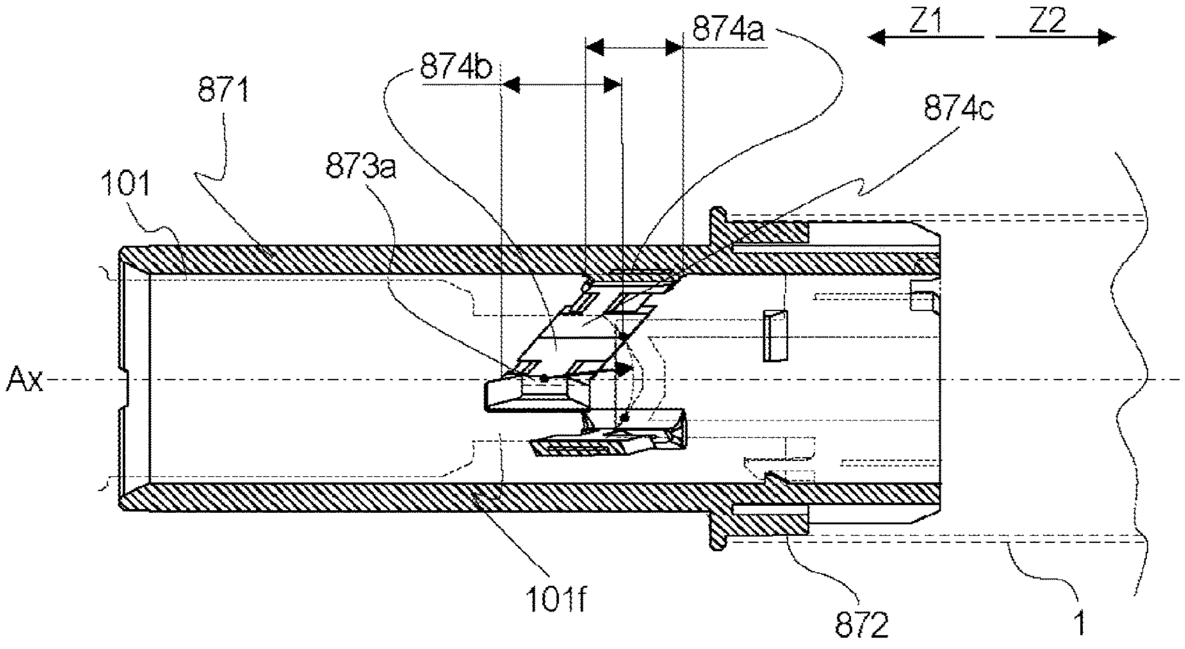
FIG. 77A is a cross-sectional view of a coupling member 828 according to Embodiment 8.
Figure 77B:
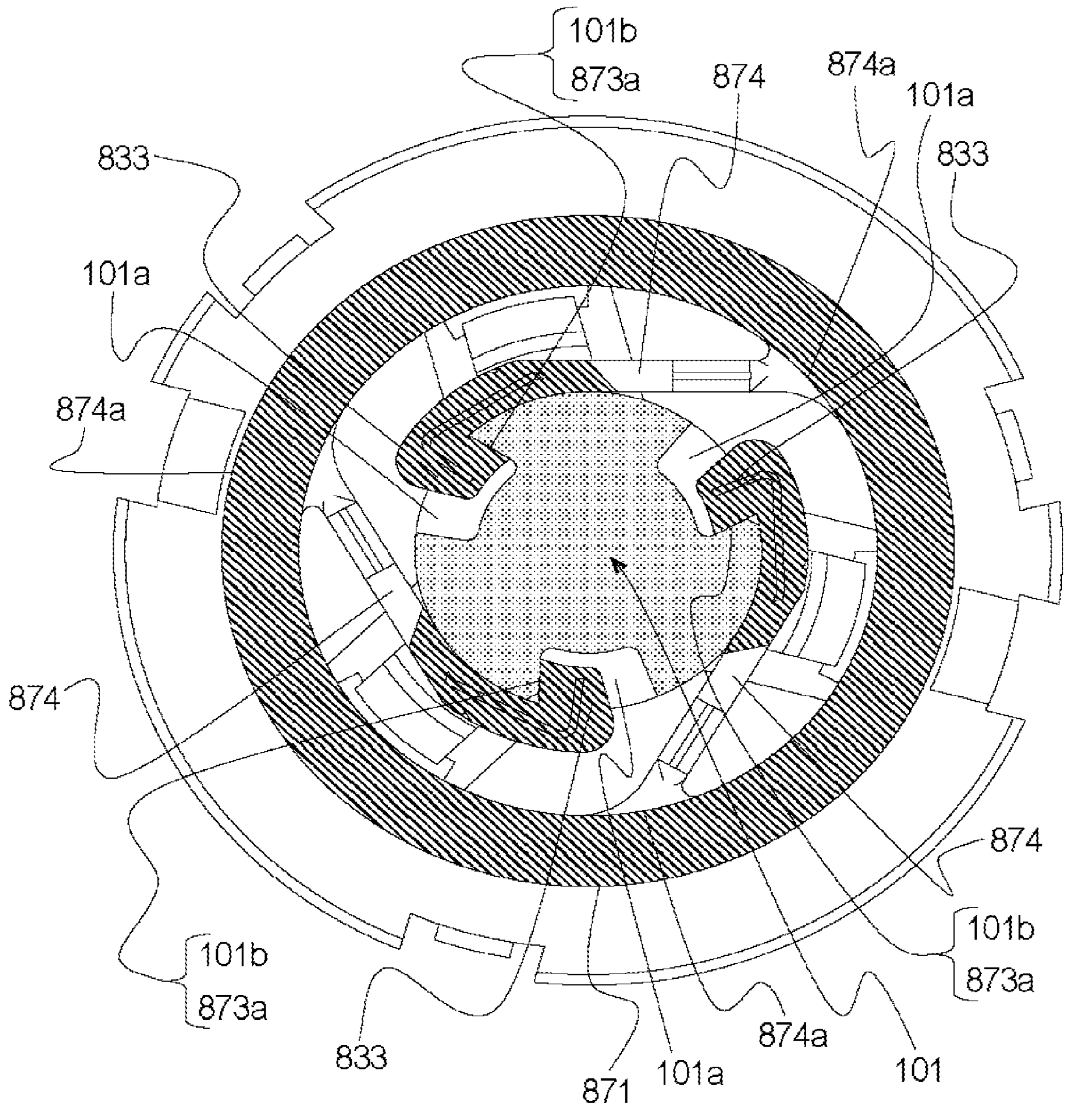
FIG. 77B is a cross-sectional view of the coupling member 828 according to the Embodiment 8 and the main assembly drive shaft 101 taken along a plane perpendicular to the rotation axis and including the driving force receiving surface 873*a*.

Referring to FIG. 76, Embodiment 7 will be described.

In this embodiment, a part of the driving force receiving portion and a part of the supporting portions (the engaging portion 673 and the base portion 674) for supporting the driving force receiving portion are provided inside the photosensitive drum 1.

Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, in the Z direction, the root portion 674*a* of the base portion 674 is disposed at the same position as the press-fit portion 672*d* (shown in FIG. 59).

On the other hand, in this embodiment, in the Z direction, a part of the base portion 774*a* is mounted to the press-fit portion 772*d*. That is, when the base portion 674 and the photosensitive drum 1 are projected onto the axis of the photosensitive drum 1, a part of the projection area of the base portion 774*a* overlaps a part of the projection area of the photosensitive drum 1. On the other hand, a part of the projection area of the root portion 774*a* is located outside the projection area of the photosensitive drum 1.

Also with this structure, although not as much as in Embodiment 6, it is possible to suppress twisting deformation of the cylindrical portion 771 when the driving force F1 is received by the driving force receiving surface (driving force receiving portion) 773*a*, and the information amount of the flange member 70 can be suppressed to be small. As a result, even if the load on the photosensitive drum unit 30 changes, the influence of deformation on the rotation of the photosensitive drum unit 30 can be suppressed to a small extent. As a result, the photosensitive drum 1 can be stably driven.

Embodiment 8

Referring to FIGS. 77A, 77B, 88, and 79, Embodiment 8 will be described.

In this embodiment, the supporting portions (the engaging portion 873 and the base portion 874) for supporting the driving force receiving portion 873*a* extend in the circumferential direction of the coupling member, while the supporting portion also extends in the axial direction of the coupling member.

Elements corresponding to those of the above-described embodiment (particularly, the Embodiment 5) are assigned by the same names, and descriptions of the similar points to those of the above-described elements may be omitted. The description will be made mainly about the differences from the abovementioned elements.

In Embodiment 5, the driving force receiving surface 573*a* and the base portion 574*a* of the base portion 574 are disposed on the inner peripheral surface 571*b* of the cylindrical portion 571 in the Z direction (as shown in FIG. 39). Also, as shown in FIG. 45, the root portion 574*a* of the base portion 574 is arranged so as to overlap the entire area of the driving force receiving surface 573*a* in the Z direction. That is, the straight line connecting the rear end (root portion 574*a*) of the base portion 574 and the tip (driving force receiving surface 573*a*) is substantially perpendicular to the axis (Z direction) of the flange member. That is, the base portion 574 is inclined by about 90 degrees with respect to the Z direction (axial line).

In contrast, in this embodiment, the direction in which the base portion 874 extends is inclined with respect to the direction perpendicular to the Z direction. In other words, the base portion 874 extends at least in the circumferential direction of the coupling member, but the extending direction thereof is not parallel to the circumferential direction. The base portion 874 extends in the circumferential direction of the coupling member, but also extends in the axial direction of the coupling member. As a result, the base portion 874 is inclined with respect to the circumferential direction of the coupling member.

Further, in the Z direction, the base portion 874*a* of the base portion 874 is arranged so that the winding portion 874*b* and a part thereof overlap with each other.

In the Z direction, the driving force receiving surface 873*a* and the root portion 874*a* are disposed inside the cylindrical portion 871 in the same manner as in Embodiment 5.

As in Embodiment 5, when the driving force F1 is received by the driving force receiving surface 873*a*, the winding portion 874*b* winds on the shaft portion 101*f* of the main assembly driving shaft 101, and the winding portion 874*b* rotates integrally with the shaft portion 101*f* to receive the rotational force Fc produced by the driving force F1 by the straight portion 874*c*.

Figure 78:
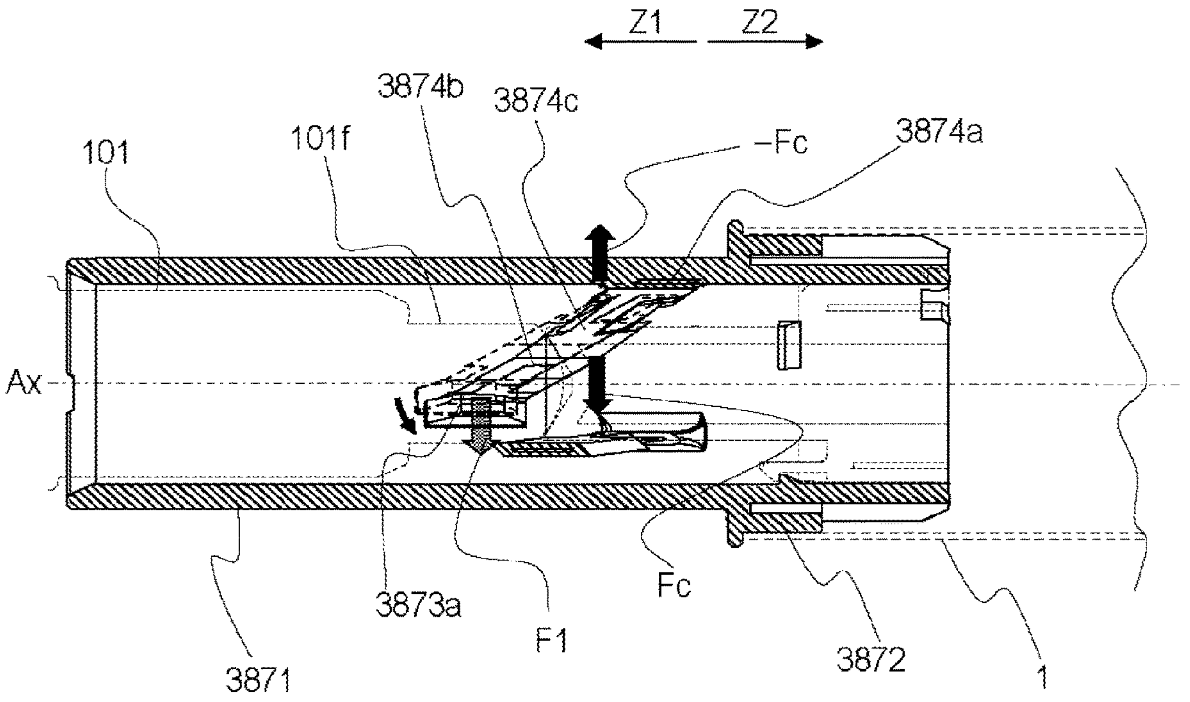
FIG. 78 is a cross-sectional view illustrating the deformation of the base portion and the engaging portion of the coupling member not having the coupling member according to the Embodiment 8, taken along a plane including the rotation center line (rotation axis).

FIG. 78 shows a case where the root portion 3874*a* of the base portion 3874 does not completely overlap the winding portion 3874*b*, unlike this embodiment. When the straight portion 3874*c* receives the rotational force Fc, the root portion 3874*a* receives the reaction force −Fc of the force Fc. The straight portion 3874*c* is pulled by the rotational force Fc and the reaction force −Fc, so that the inclination of the straight portion 3874*c* is made gentler in a direction perpendicular to the Z direction. After the inclination of the straight portion 3874*c* becomes gentle, the rotational force Fc is transmitted to the photosensitive drum 1 via the cylindrical portion 3871 and the mounting portion 872.

As a result, when the load received by the photosensitive drum unit 30 is changed and therefore the rotational force Fc is changed, the deformation amount of the base portion 3874 changes, so that the influence on the rotation of the photosensitive drum unit 30 is larger than in this embodiment.

On the other hand, according to the structure of this embodiment, the root portion 874*a* has a portion overlapping with the winding portion 874*b* in the Z direction. That is, when the winding portion 874*b* and the base portion 874*a* are projected onto the axis line of the drum unit 30, at least a part of the projection area of the winding portion 874*b* and at least a part of the projection area of the base portion 874*b* overlap with each other.

Figure 79:
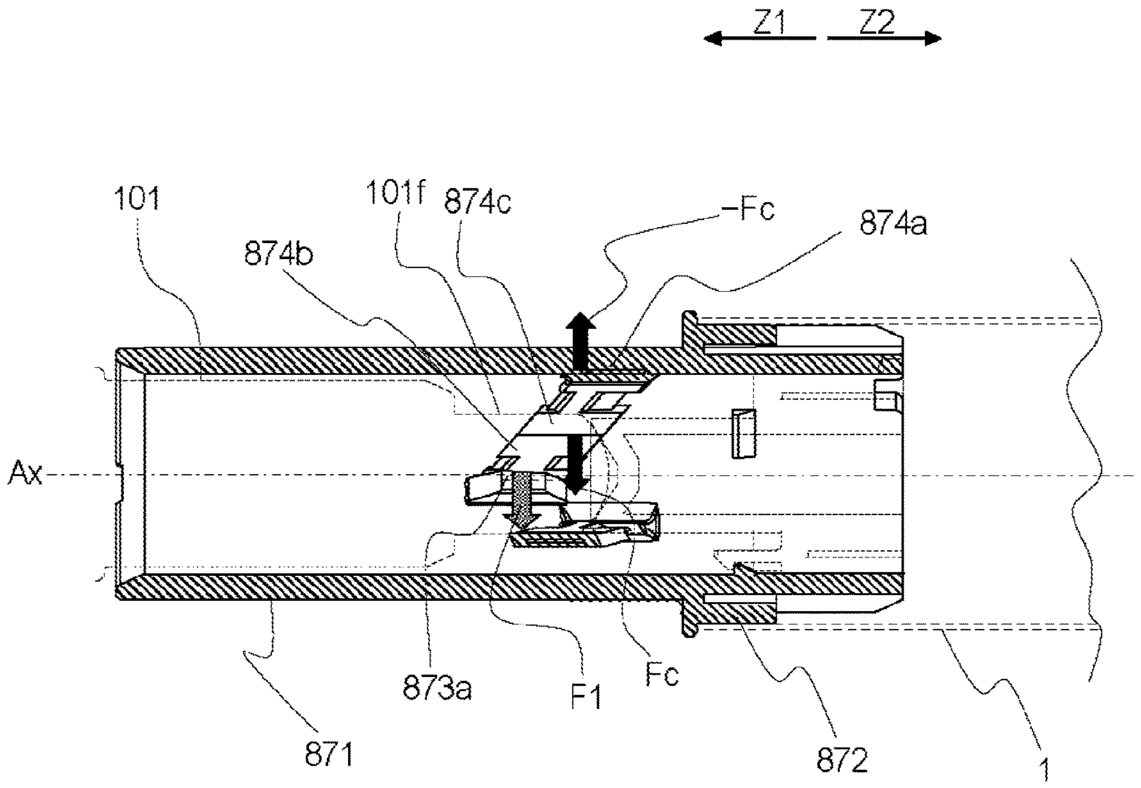
FIG. 79 is a sectional view of the coupling member 828 according to Embodiment 8.

In this way, as shown in FIG. 79, when the rotational force Fc is received, the receiving portion is at the overlapping root portion 874*a*. Therefore, the rotational force Fc can be transmitted to the cylindrical portion 871 substantially without deformation in the direction of making the inclination of the straight portion 874*c* gentle relative to the direction perpendicular to the Z direction. As a result, even if the load received by the photosensitive drum unit changes, the influence on the rotation of the photosensitive drum unit 30 can be reduced.

In order to wind the base portion 874 on the main assembly driving shaft 101 as in this embodiment, the base portion 874 is desirably inclined by 30 degrees to 90 degrees (not less than 30 degrees and not more than 90 degrees) with respect to the Z-axis direction (the axis Ax of the coupling member). A more preferable range is within a range of 50 degrees to 90 degrees (50 degrees to 90 degrees).

The inclination of the base portion 874 (supporting portion of the driving force receiving portion) with respect to the axis Ax of the coupling member is determined as follows.

The cross section of the coupling member take an along a plane including the fixed end (root portion 874*a*) of the base portion 874 and the axis Ax of the coupling member pass (FIG. 79) is taken. In this cross section, the angle between the base portion 874 and the axis Ax is to be viewed. FIG. 79, an angle formed between a straight line extending from the fixed end (base portion 874*a*) of the base portion 874 to the free end (engagement portion 873) and a straight line extending from the fixed end (874*a*) parallel to the axis Ax along the left side face of the base portion 874 is in the angle to be determined. On FIG. 79, the angle is measured to be about 36 degrees.

In this embodiment, the base portion 874 is deviated so that the free end thereof is disposed outside the fixed end in the axial direction (arrow Z1 side).

However, the base portion 874 may be inclined so that the free end thereof is disposed on the inner side in the axial direction (on the arrow Z2 side) than the fixed end. In this case, the inclination of the base portion 874 (supporting portion of the driving force receiving portion) with respect to the axis line Ax may be defined as follows. The angle formed between the straight line extending from the fixed end to the free end of the base portion 874 along the right side face of the base portion 874 and the straight line extending from the fixed end in parallel to the axis Ax is the angle to be determined.

That is, the angle is measured so that the base portion 874 is always 90 degrees or less with respect to the axis Ax.

Embodiment 9

Figure 80:
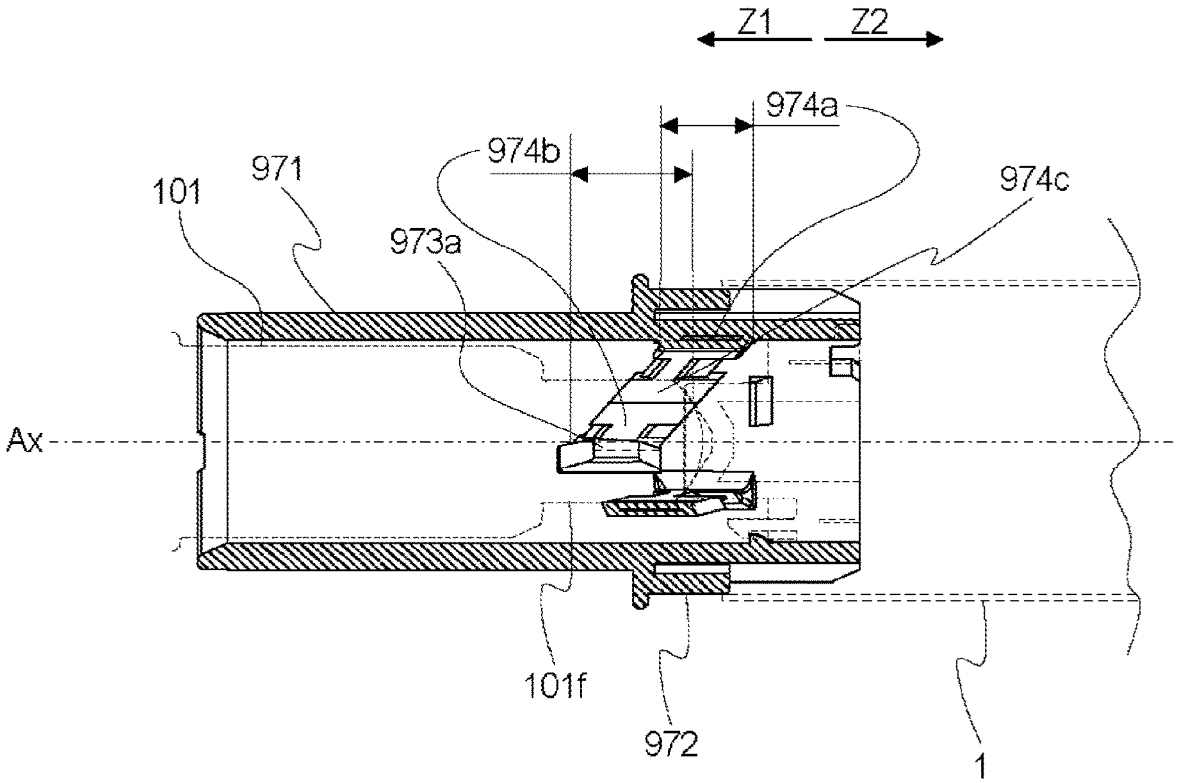
FIG. 80 is a cross-sectional view of a coupling member 928 according to Embodiment 9.
Figure 81:
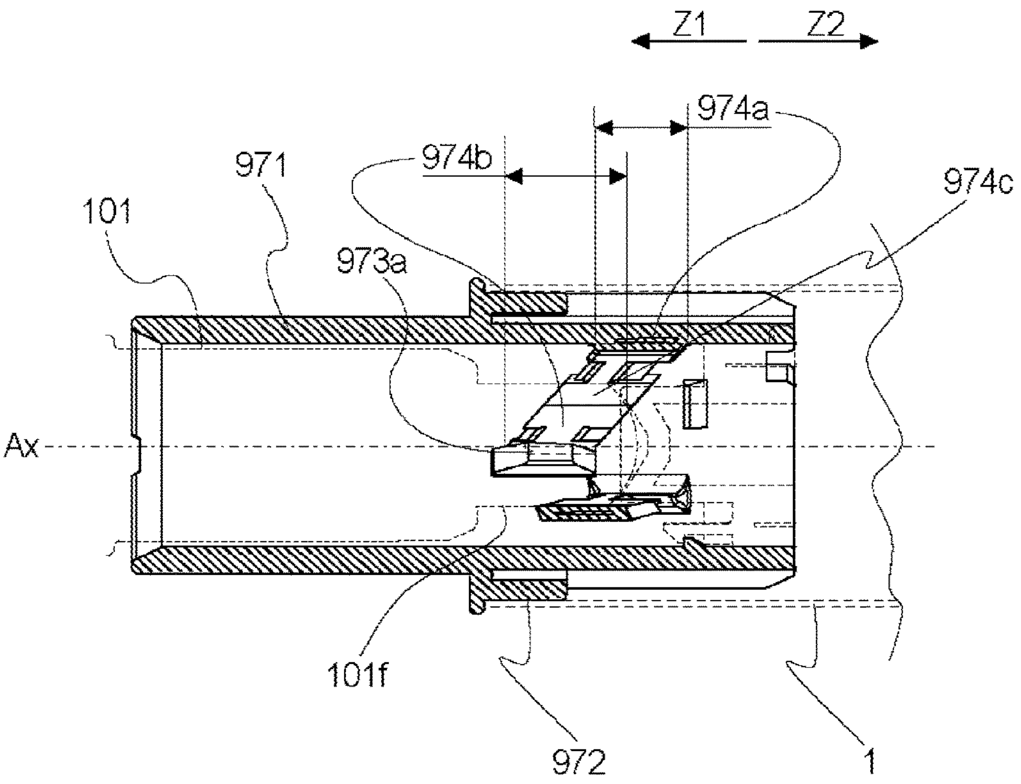
FIG. 81 is a cross-sectional view of another example of the coupling member 928 according to Embodiment 9.
Figure 82:
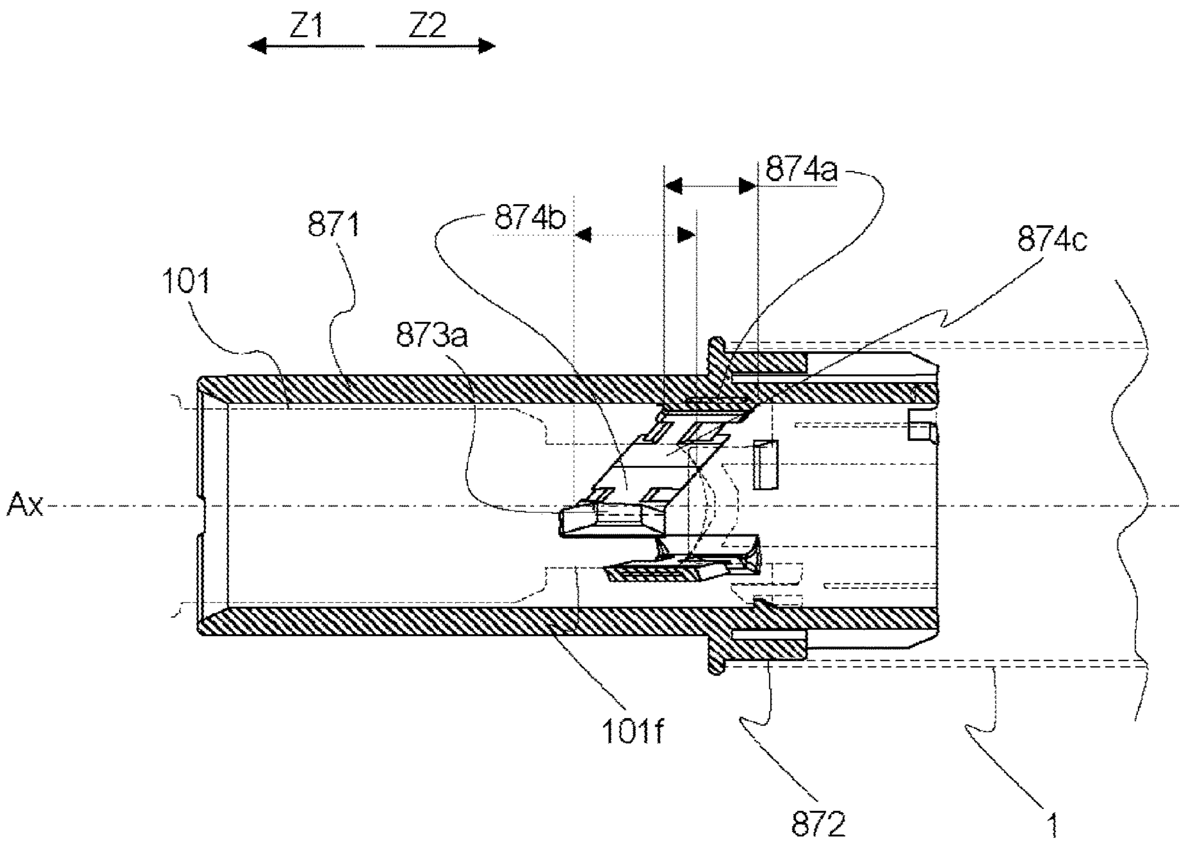
FIG. 82 is a cross-sectional view of another example of the coupling member 928 according to Embodiment 9.

Referring to FIG. 80 to FIG. 82, Embodiment 9 will be described.

In this embodiment, the fixed end (root portion 974*a*) of the base portion 974 is disposed inside the photosensitive drum 1, while at least a part of the driving force receiving surface 673*a* and the engaging portion 673 is disposed in the photosensitive drum 1.

Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, the driving force receiving surface 673*a* and the base portion 674*a* of the base portion 674 are arranged on the inner peripheral surface 672*h* of the mounting portion 672 in the Z direction (as shown in FIG. 59). In addition, the root portion 674*a* of the base portion 674 is disposed so as to overlap with the entire area of the driving force receiving surface 673*a* in the Z direction. That is, the entirety of the driving force receiving surface 673*a* and the entire supporting portion for supporting the driving force receiving surface 673*a* are disposed inside the photosensitive drum 1.

On the other hand, in this embodiment, as shown in FIG. 80, the base portion 974 is inclined with respect to the direction perpendicular to the Z direction, and the root portion 974*a* of the base portion 974 is formed such that the winding portion 974*b* and a part thereof overlap with each other in the Z direction. In the Z direction, the base portion 974*a* is disposed on the inner peripheral surface 972*h* of the mounting portion 972 as in Embodiment 6.

The effect of arranging the base portion 974*a* so that a part of the base portion 974*a* overlaps the winding portion 974*b* in the Z direction is similar to that of Embodiment 8. Furthermore, the effect that the root portion 974*a* is arranged on the inner peripheral surface 972*h* of the mounting portion 972 in the Z direction is the same as the of Embodiment 6 as compared with Embodiment 5, and the present embodiment has the same effect as the Embodiment 8.

As shown in FIG. 81, even if the driving force receiving surface (driving force receiving portion) 973*a* is disposed on the inner peripheral surface 972*h* of the mounting portion 972 in the Z direction, the same effect can be provided.

As shown in FIG. 82, also in the structure in which a part of the root portion 974*a* overlaps the inner peripheral surface 972*h* of the mounting portion 972 in the Z direction, the effect similar to that of the Embodiment 7 as compared with Embodiment 5 can be provided on this embodiment.

Embodiment 10

Referring to FIGS. 83 to 86, an Embodiment 10 will be described. Elements corresponding to those of the above-described embodiment (particularly, the Embodiment 6) are assigned by the same names, and descriptions of the similar points to those of the above-described elements may be omitted. The description will be made mainly about the differences from the abovementioned elements. In Embodiment 6, as shown in FIG. 60, the engaging portion 673 and the base portion 674 are equally arranged in three positions in the circumferential direction of the flange member 670.

Figure 83:
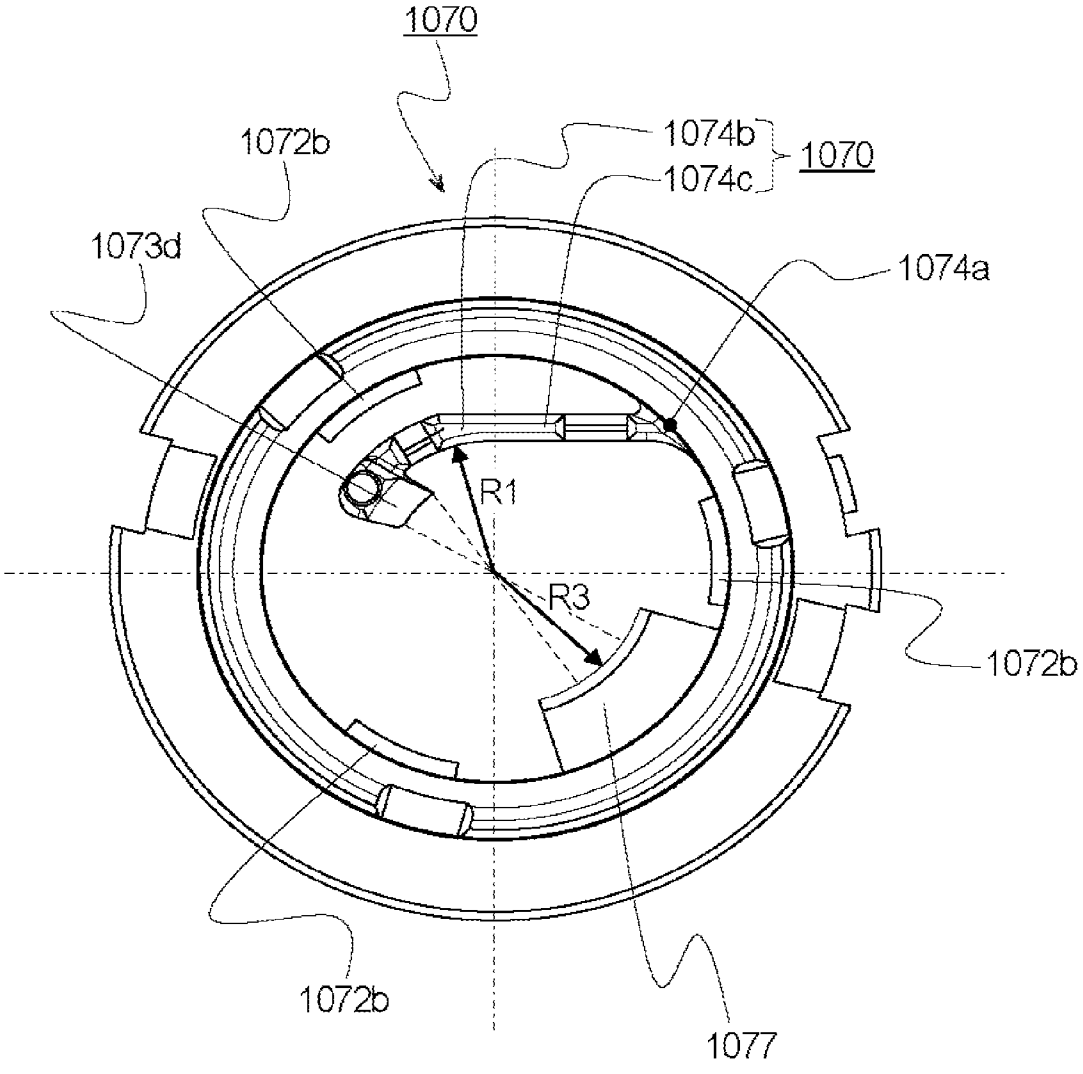
FIG. 83 is an illustration of the coupling member 1028 according to Embodiment 10 as viewed from the outer side in the Z direction.

In this embodiment, as shown in FIG. 83, the engaging portion 1073 and the base portion 1074 are provided at one position. The engaging portion 1073 is provided with a driving force receiving surface (driving force receiving portion) 1073*a*. The engaging portion 1073 and the base portion 1074 are support portions for supporting the driving force receiving portion.

A force receiving portion 1077 is provided to suppress the main assembly driving shaft 101 from tilting too much by the elastic deformation force of the base portion 1074 when the coupling member 1028 is mounted to the main assembly driving shaft 101.

Figure 84:
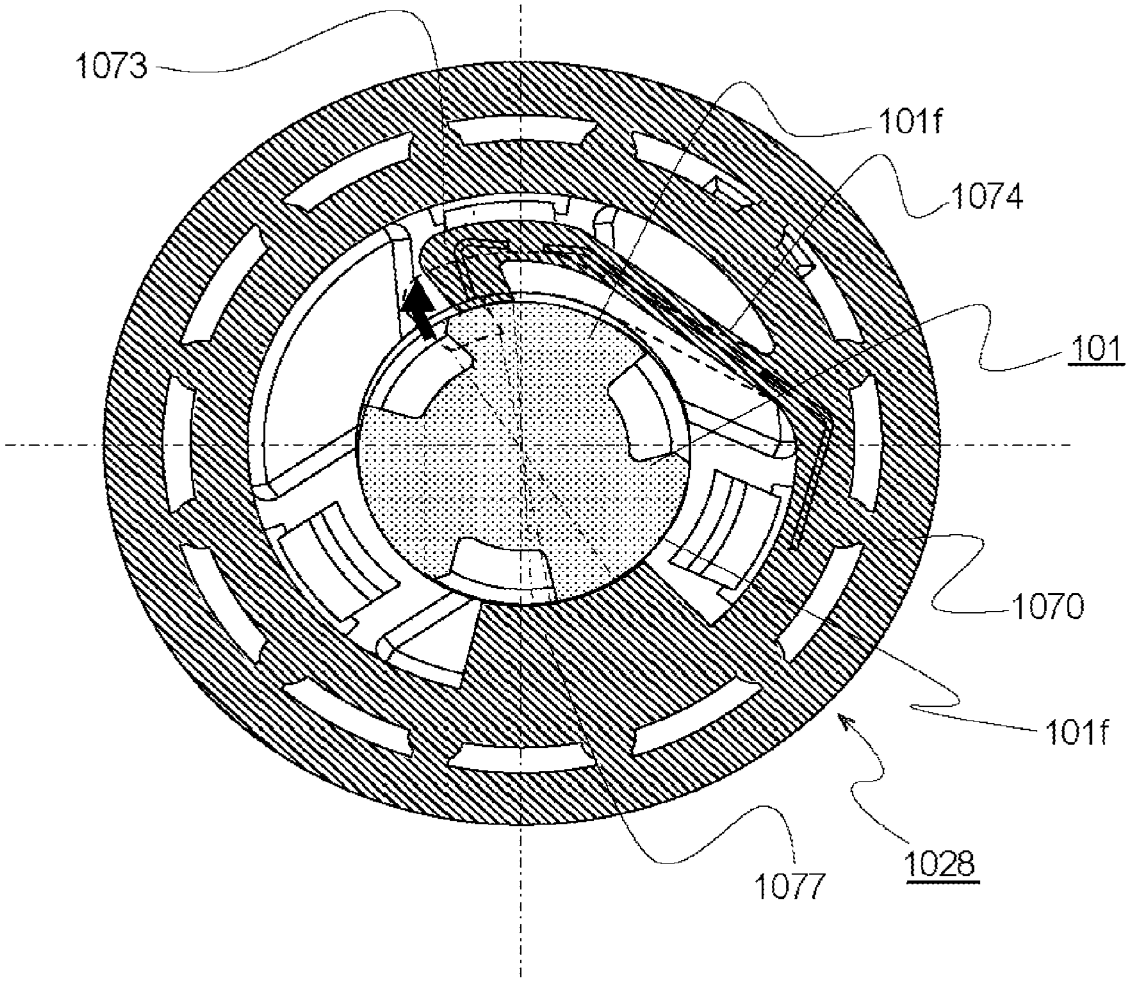
FIG. 84 is a cross-sectional view of the coupling member 1028 according to Embodiment 10 and the main assembly driving shaft 101, taken along a plane perpendicular to the rotational axis and including a position passing through the driving force receiving surface 1073*a*.

More specifically, in a process of engaging the coupling member 1028 to the main driving shaft 101, the base portion 1074 is elastically deformed, and the engagement portion 1073 moves radially outward. At this time, the shaft portion 101*f* of the main assembly driving shaft 101 is pushed to the opposite side by the elastic deformation force of the base portion 1074. At this time, as shown in FIG. 84, the force receiving portion 1077 is brought into contact with the shaft portion 101*f* to suppress the main assembly driving shaft 101 from tilting too much. As a result, the force receiving portion 1077 keeps a satisfactory mountability of the cartridge 7 to the image forming apparatus main assembly 100A.

In a state before elastic deformation of the base portion 1074, at least a part of the insertion tapered surface 1073*d* and at least a part of the flange member 1070 are opposed to each other with the axis line of the flange member 1077 therebetween (FIG. 83). Similarly, in the state of elastic deformation of the base portion 1074 occurred, at least a part of the driving force receiving surface and at least a part of the force receiving portion 1077 are opposed to each other with the axis line therebetween (as shown in FIG. 84).

Figure 85:
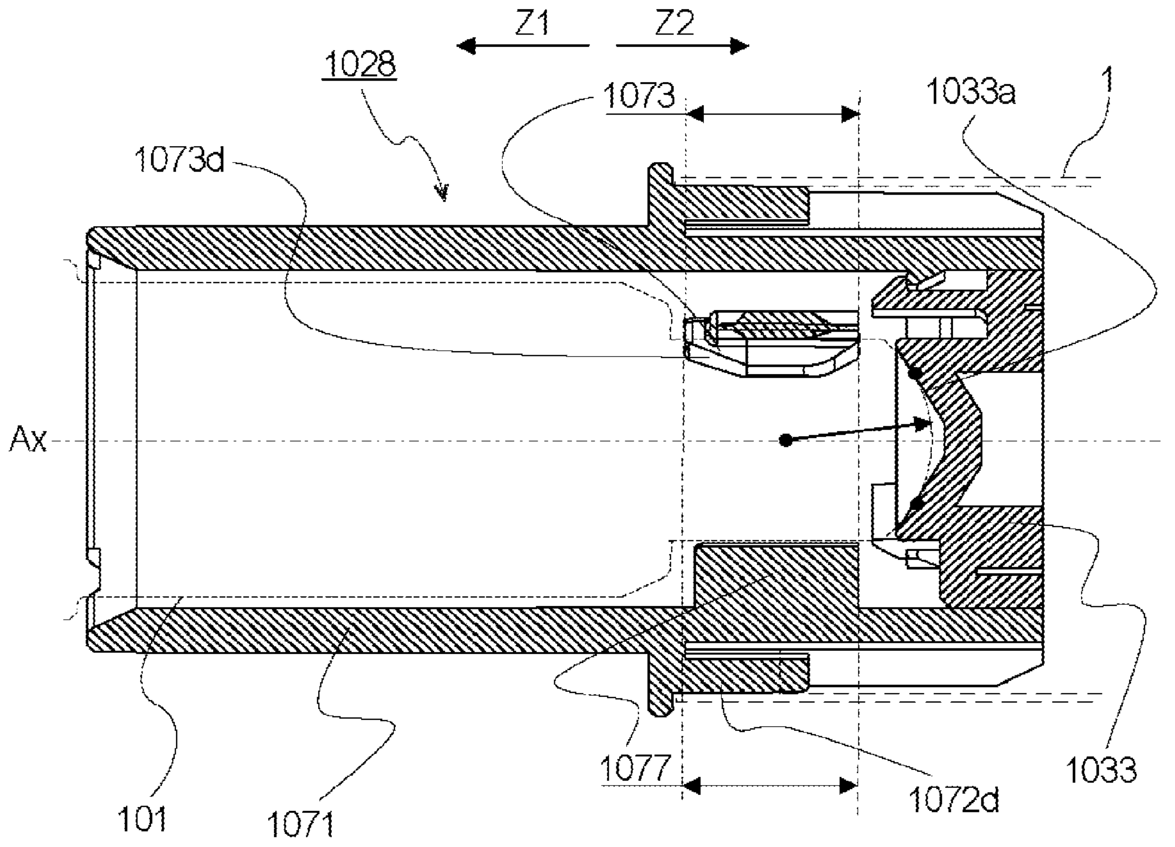
FIG. 85 is a cross-sectional view of the coupling member 1028 according to Embodiment 10.
Figure 86:
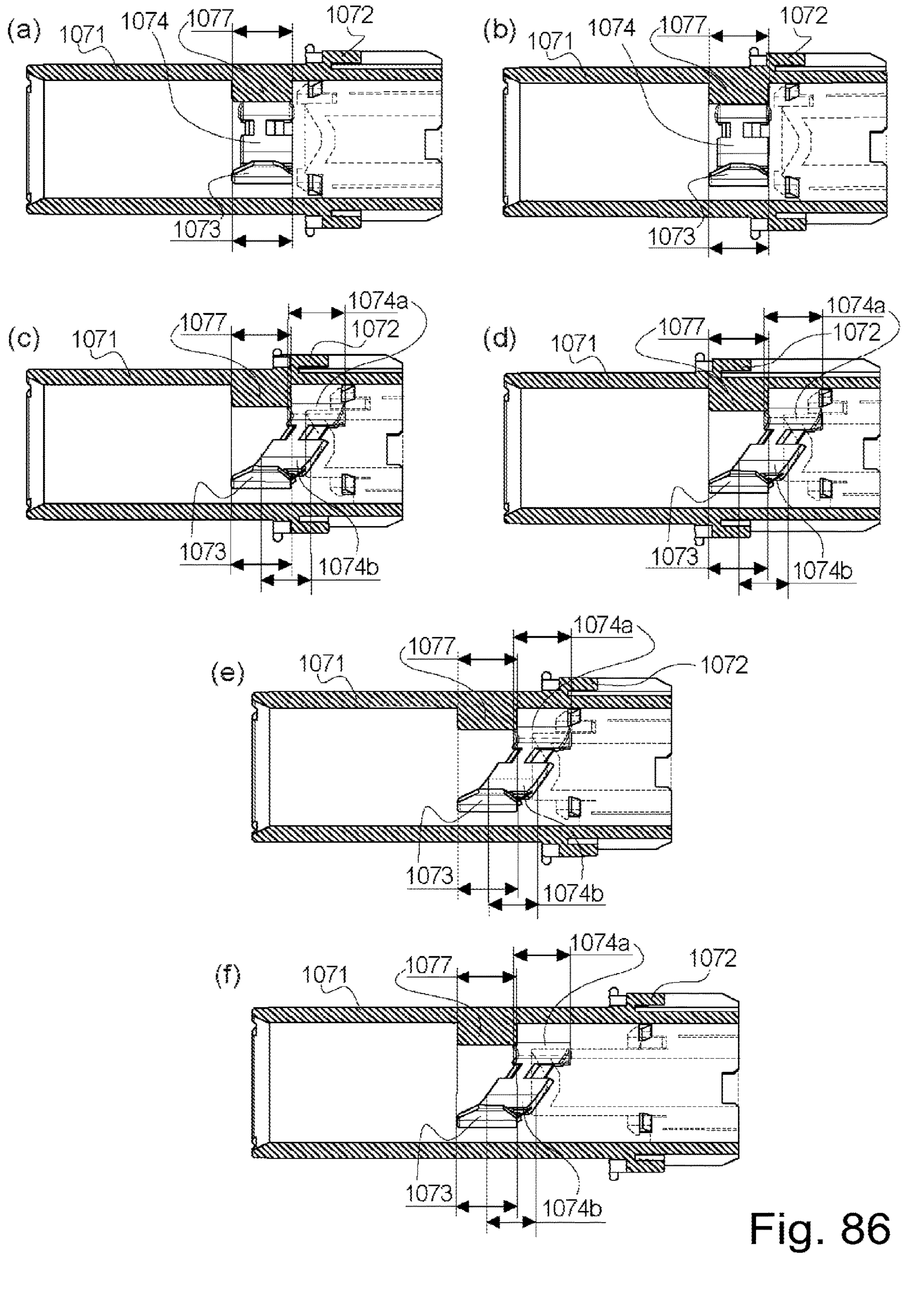
FIG. 86 is sectional views of a modified example of the coupling member 1028 according to Embodiment 10.

As shown in FIG. 85, the alignment of the coupling member 1028 and the main assembly driving shaft 101 is performed by the alignment member 1033 having an inverted conical shape portion 1033*a* as in Embodiment 6. At this time, the radius R3 of the force receiving portion 1077 is larger than the radius R2 of the shaft portion 101*f*, and the force receiving portion 1077 does not abut to the shaft portion 101*f*.

As shown in FIG. 84, the position of the force receiving portion 1077 in the Z direction is the same as that of the engaging portion 1073.

In this embodiment, the engaging portion 1073 and the root portion 1074*a* of the base portion 1074 are disposed inside the mounting portion 1072 in the Z direction as in Embodiment 6. However, as in Embodiment 5, it may be disposed in the cylindrical part 1071 (part (a) of FIG. 86), or a part of the root part 1074*a* may be mounted in the range of the press-fitting part 1072*d* as in Embodiment 7 (part (b) of FIG. 86). As in Embodiments 8 and 9, the base portion may be inclined with respect to the direction perpendicular to the Z direction, and in the Z direction, the root portion 1074*a* of the base portion 1074 may overlap with the winding portion 1074*b* and a part thereof (parts (c), (d), (e) and (f) of FIG. 86).

Embodiment 11

Referring to FIGS. 87A, 87B, 88, and 89, Embodiment 11 will be described.

Elements corresponding to those of the above-described embodiment (particularly, the Embodiment 6) are assigned by the same names, and descriptions of the similar points to those of the above-described elements may be omitted. The description will be made mainly about the differences from the abovementioned elements. In Embodiment 6, as shown in FIG. 60, the engaging portion 673 and the base portion 674 are uniformly arranged in three positions in the circumferential direction of the flange member 670, and as shown in FIG. 58, the coupling member 628 includes the flange member 670 and the aligning member 633.

Figure 87A:
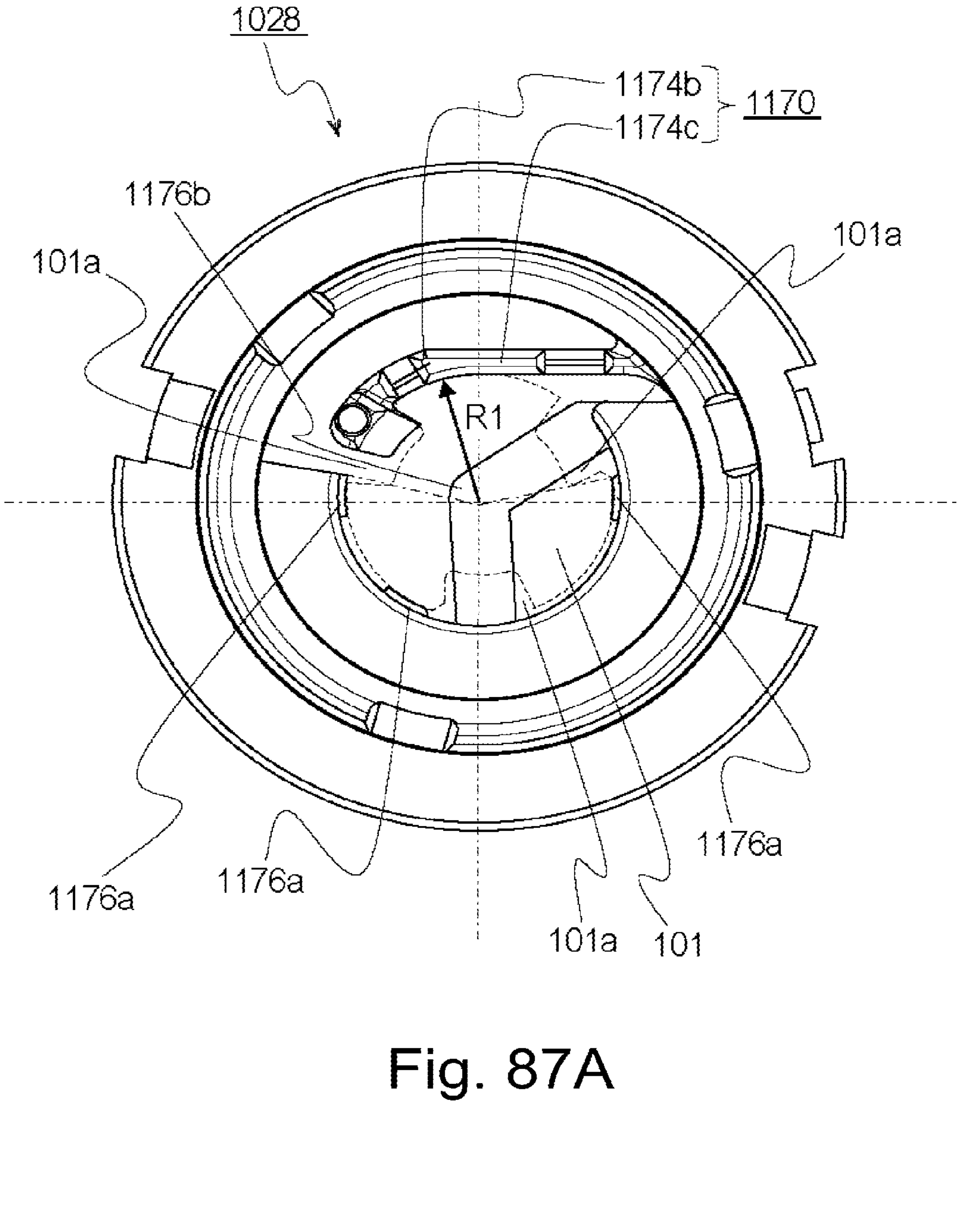
FIG. 87A is an illustration of a coupling member 1128 according to Embodiment 11 as viewed from the outer side in the Z direction.
Figure 87B:
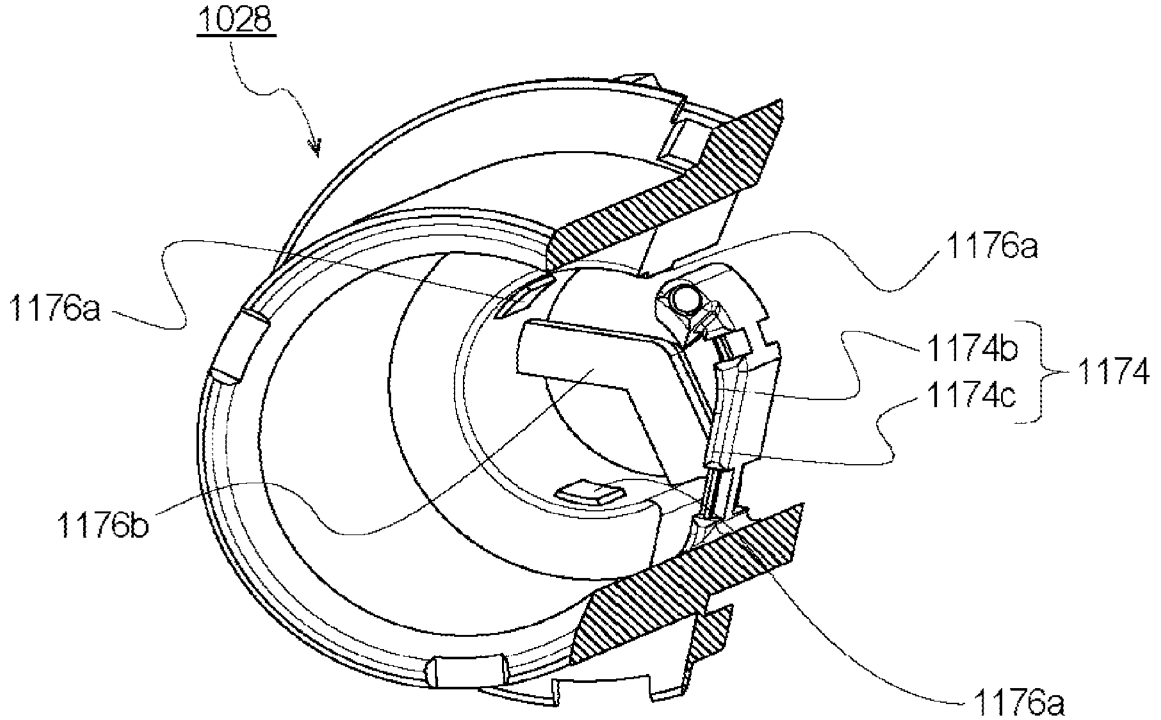
FIG. 87B is a cross-sectional perspective view of the coupling member 1128 according to Embodiment 11.

On the other hand, in this embodiment, as shown in FIGS. 87A and 87B, one coupling portion 1173 and one base portion 1174 are provided in the coupling member 1128. The engaging portion 1173 is provided with a driving force receiving portion. The engaging portion 1173 and the base portion 1174 are support portions that movably support the driving force receiving portion.

As shown in FIGS. 87A, 87B, 88 and 89, the coupling member 1128 is provided with a radial direction positioning portion 1076*a*, having substantially the same diameter as that of the shaft portion 101*f* of the main assembly driving shaft 101 at the position different from the engaging portion 1173 and from the base portion 1174 in the circumferential direction. Also, it is provided with an abutment portion 1076*b* for being contacted by the semispherical shape 101*c* of the free end of the main assembly driving shaft 101 when the driving of the main assembly driving shaft 101 is transmitted to the coupling member 228.

By this, the two parts, namely the flange member 670 and the aligning member 633 in Embodiment 6 are constituted by one part.

As shown in FIG. 87A, three radial positioning portions 1176*a* are arranged in the circumferential direction. The angle formed the angle of the line connecting the outer end of the radial positioning portion 1176*a* and the axis center of the flange is larger than 180 degrees and is disposed at a position other than 120 degrees and 240 degrees positions from the engaging portion 1173. As described in Embodiment 1, the main assembly drive transmission grooves 101*a* are uniformly arranged at three positions (120 degree spacing, substantially equally spaced) in the circumferential direction on the shaft portion 101*f* of the main assembly driving shaft 101. As in the Embodiment 1, after one of the main assembly drive transmission grooves 101*a* of the main assembly driving shaft 101 and the engagement portion 1173 are in phase alignment with each other, the drive force receiving surface 1173*a* of the main assembly drive transmission surface 101*b* is brought into contact thereto, by which the driving force is transmitted from the main assembly driving shaft 101 to the coupling member 1128.

At this time, the radial direction positioning portion 1076*a* takes the position different from those of the three main assembly drive transmission grooves 101*a* equally provided on the shaft portion 101*f* of the main assembly driving shaft 101. The radial direction positioning portion 1076*a* does not enter the driving transmission groove 101*a*. Therefore, the radial positioning portion 1176*a* is positioned in the radial direction on the shaft portion 101*f* without being affected by the two main assembly drive transmission grooves 101*a* not engaged with the driving force receiving surface 1173.

Figure 88:
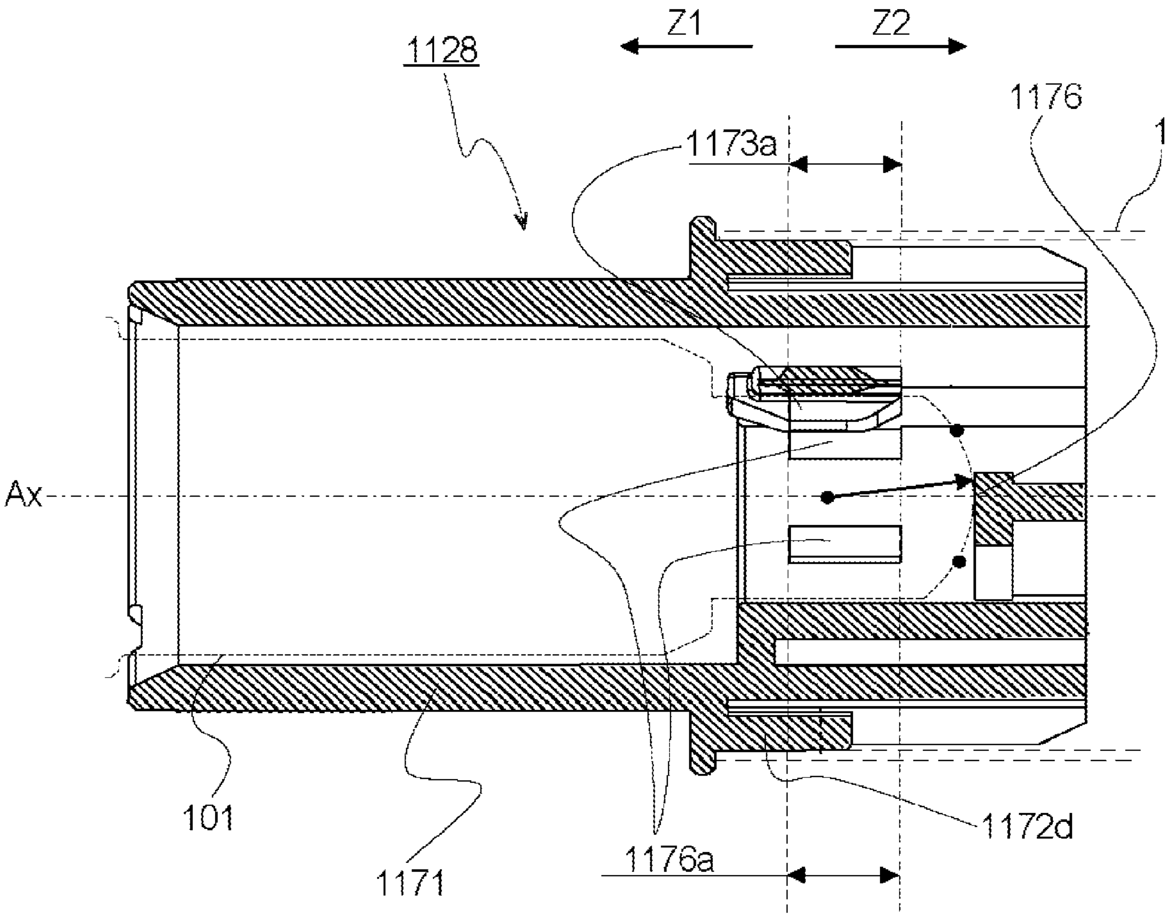
FIG. 88 is a cross-sectional view of the coupling member 1128 according to Embodiment 11.
Figure 89:
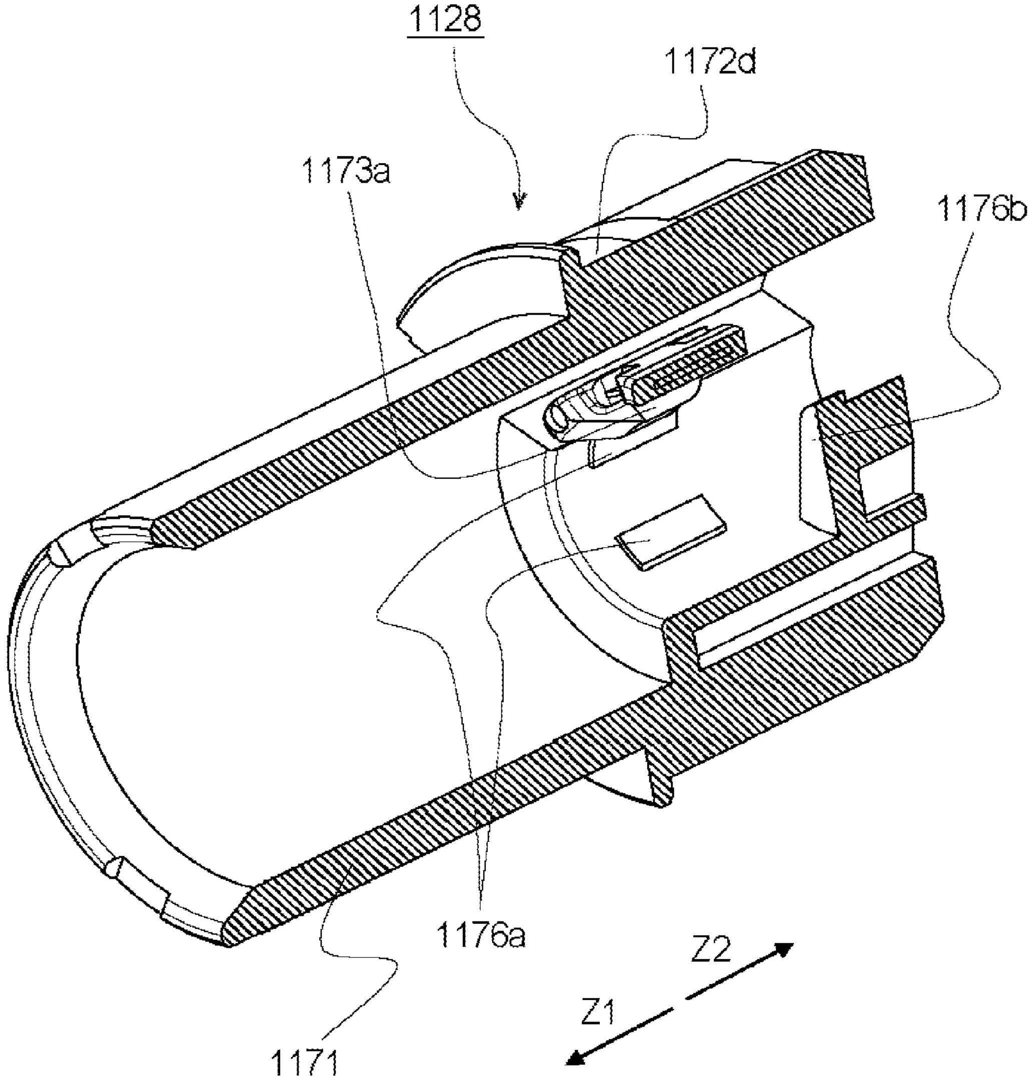
FIG. 89 is a cross-sectional perspective view of the coupling member 1128 according to Embodiment 11.

Further, as shown in FIG. 88, the radial positioning portion 1176*a* is disposed at the same position as the driving force receiving surface 1173*a* in the Z direction.

In Embodiment 6, the flange member 670 and the aligning member 633 are constituted by two parts, but in this embodiment, it can be constituted by one part in the above-described manner.

As shown in FIG. 87A, as viewed in Z direction, the abutment portion 1176*b* does not have a portion overlapping with the projection plane of the engaging portion 1173, the base portion 1174, and the radial positioning portion 1176*a* or about 1 mm around the projection plane. Therefore, similarly to the flange member 670 of the Embodiment 6, the coupling member 1128 can be injection-molded with a die of a two-piece construction including the cylindrical side mold and the mounting portion side mold.

Figure 90:
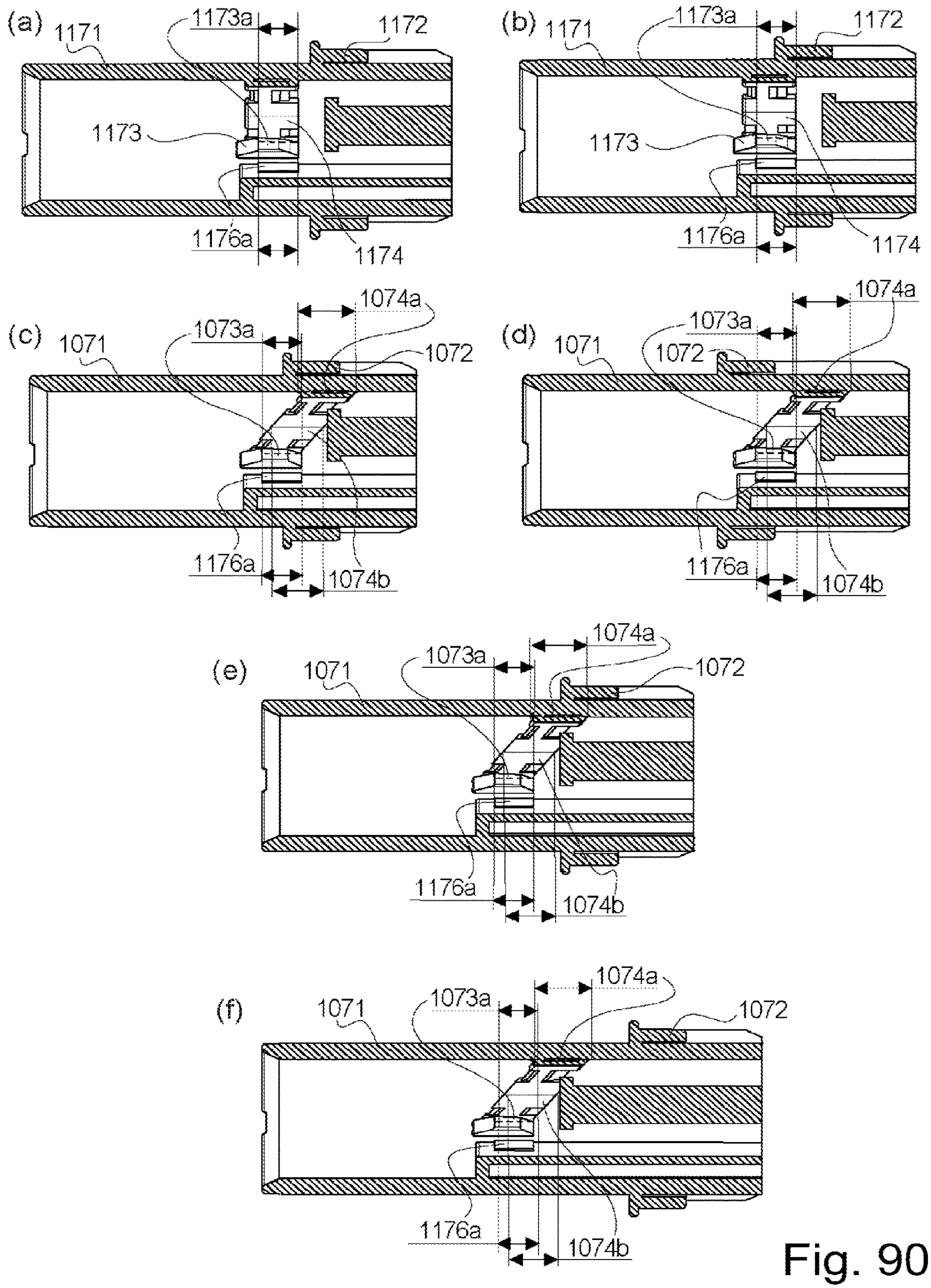
FIG. 90 is sectional views of a modified example of the coupling member 1128 according to Embodiment 11.

In this embodiment, the engaging portion 1173 and the root portion 1174*a* of the base portion 1174 are disposed inside the mounting portion 1172 in the Z direction as in Embodiment 6. However, as in Embodiment 5, it may be disposed in the cylindrical portion 1171 (shown in part (a) of FIG. 90), or a part of the root portion 1174*a* is in the press-fit portion 1172*d* as in Embodiment 7 (shown in part (b) of FIG. 90). Also, as in Embodiments 8 and 9, the base portion may be inclined with respect to the direction perpendicular to the Z direction, and in the Z direction, the root portion 1174*a* of the base portion 1174 may partly overlap the winding portion 1174*b* (parts (c), (d), (e) and (f) of FIG. 90).

Embodiment 12

Figure 91:
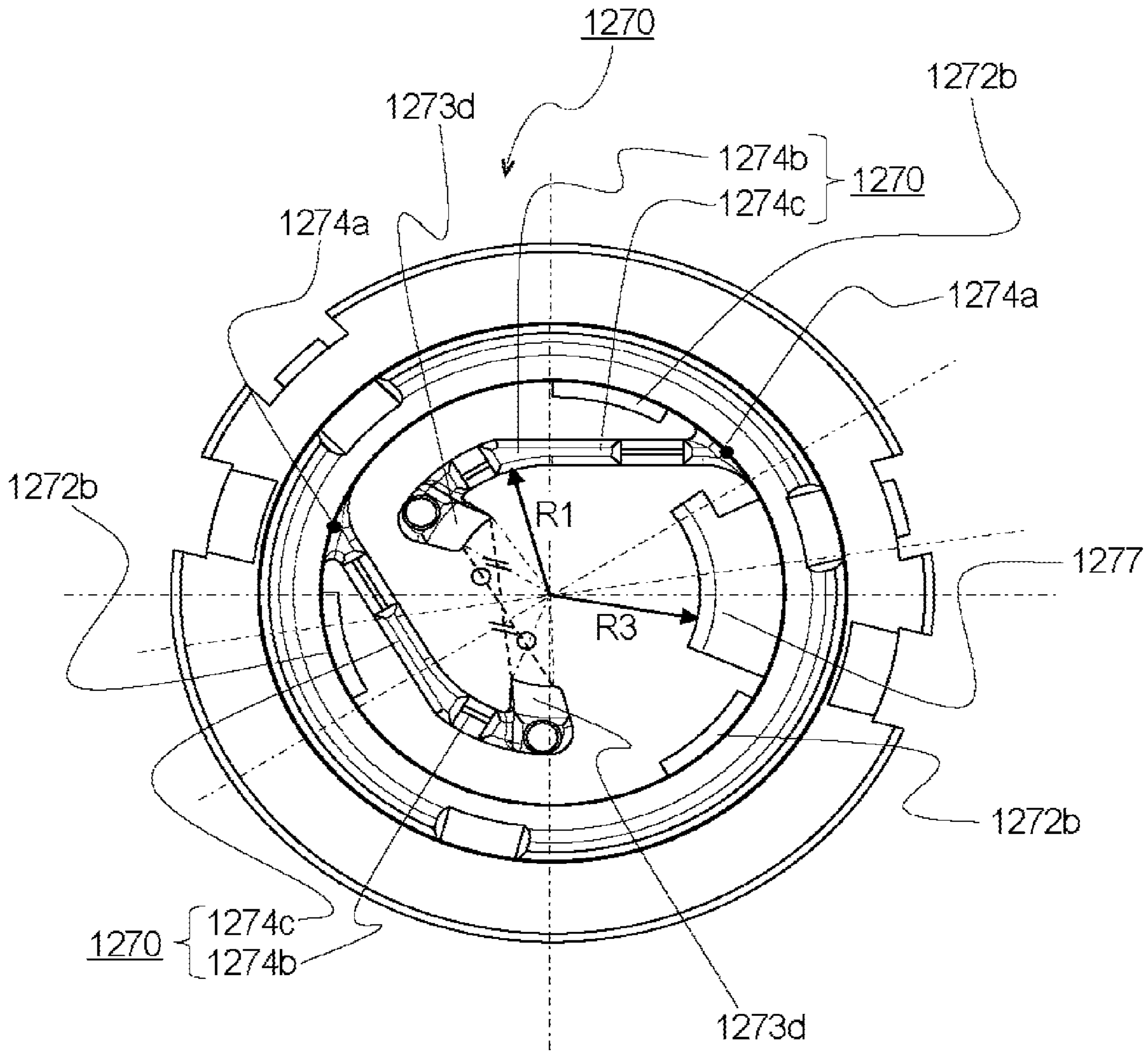
FIG. 91 is an illustration of the flange member 1270 according to Embodiment 12 as viewed from the outer side in the Z direction.
Figure 92:
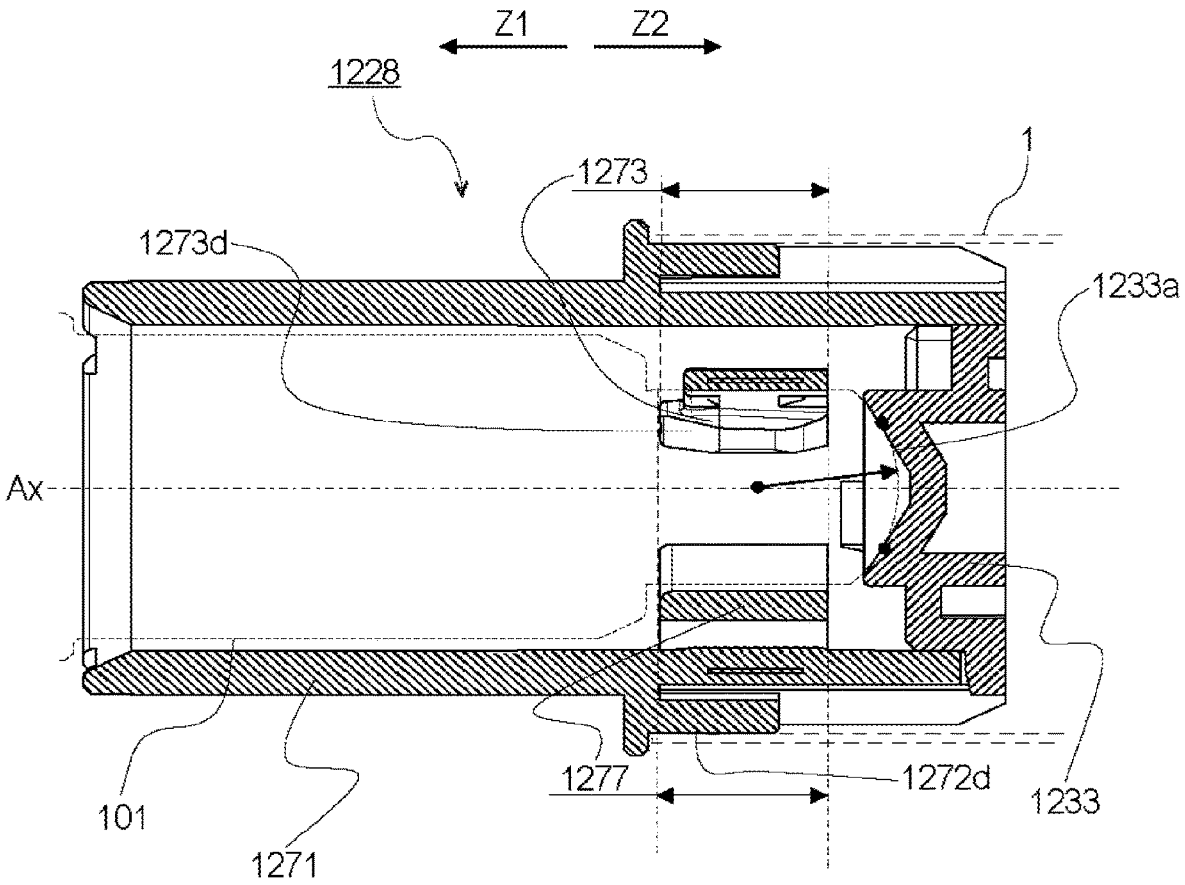
FIG. 92 is a cross-sectional view of a coupling member 1228 according to Embodiment 12.
Figure 93:
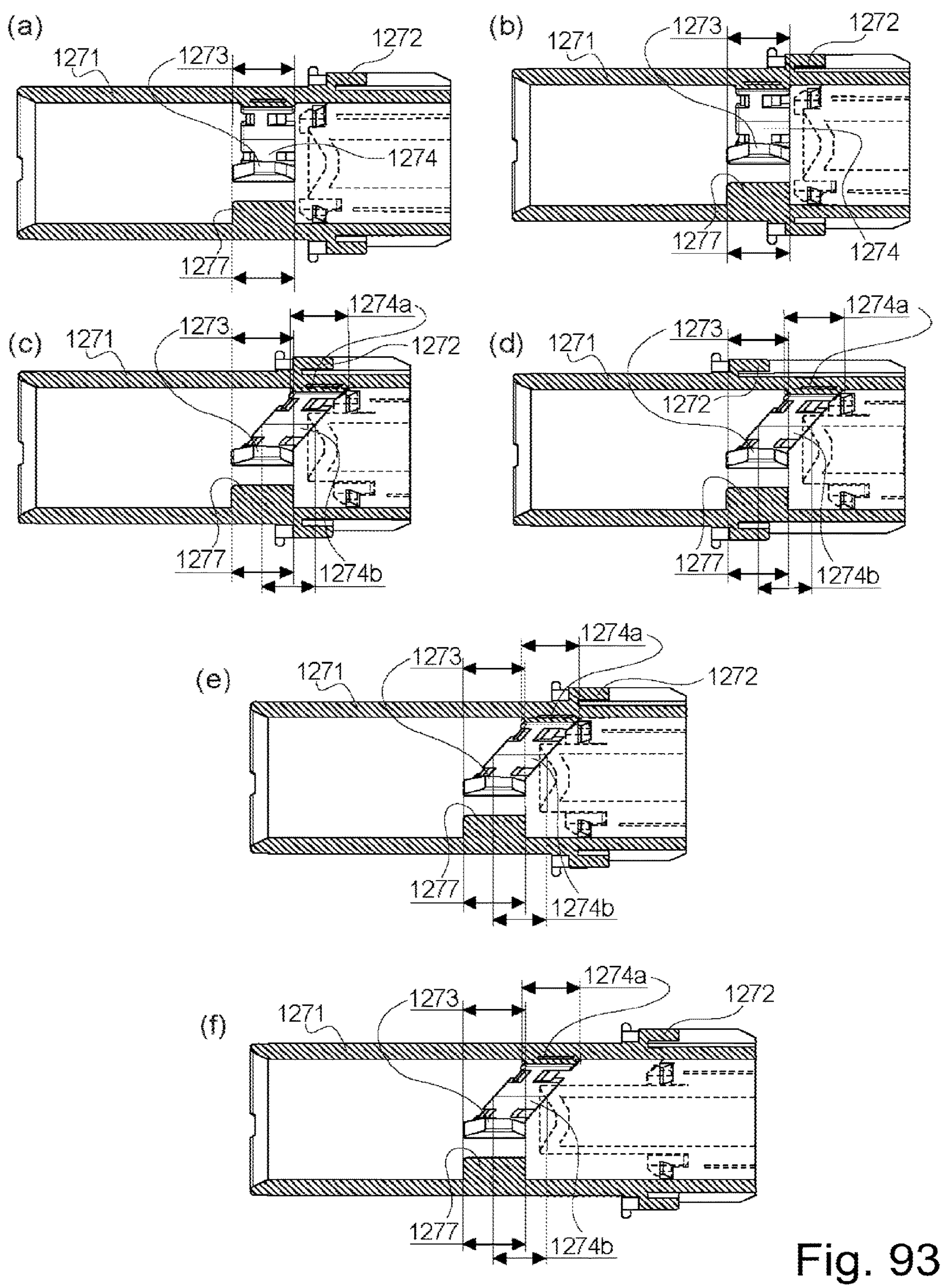
FIG. 93 is sectional views of a modified example of the flange member 1270 according to Embodiment 12.

Referring to FIGS. 91 to 93, Embodiment 12 will be described. Elements corresponding to those of the above-described embodiment (particularly, the Embodiment 6) are assigned by the same names, and descriptions of the similar points to those of the above-described elements may be omitted. The description will be made mainly about the differences from the abovementioned elements. In Embodiment 6, as shown in FIG. 60, the engaging portion 673 and the base portion 674 are equally arranged in three positions in the circumferential direction of the flange member 670. On the other hand, in this embodiment, as shown in FIG. 91, the engaging portions 1273 and the base portions 1274 are provided at two positions (120 degrees intervals). The engaging portion 1273 is provided with a driving force receiving portion 1273*a*. The engaging portion 1273 and the base portion 1274 are support portions that movably support the driving force receiving portion 1273*a*.

In addition, a force receiving portion 1277 is provided to suppress the main assembly driving shaft 101 from tilting too much due to the elastic deformation force of the base portion 1274 when the coupling member 1128 is mounted to the main assembly driving shaft 101.

More specifically, in a process of the coupling member 1228 being engaged with the main driving shaft 101, the base portion 1274 of the force receiving portion 1277 is elastically deformed, and the engagement portion 1273 moves radially outward. At that time, the shaft portion 101*f* of the main assembly driving shaft 101 is pushed in the circumferential direction opposite to the engagement portion by the elastic deformation force of the base portion. At this time, the force receiving portion 1277 is brought into contact with the shaft portion 101*f* and suppresses the main assembly driving shaft 101 from tilting too much. As a result, the mountability of the cartridge 7 to the image forming apparatus main assembly 100A can be kept satisfactory.

In the circumferential direction, it is disposed at a position, with respect to the circumferential direction, including a extension of a line connecting a middle point of a line connecting the inner diameter portions of the insertion taper surface 1273*d* before the formation of the base portion 1274 and the axis of the flange member 1270 (FIG. 91). In this embodiment, the engaging portions 1273 are arranged at intervals of 120 degrees, and therefore, they may be arranged to include a range of 120 degrees from the inner diameter end of the insertion taper 1273*d*.

As shown in FIG. 92, the alignment of the coupling member 1228 and the main assembly driving shaft 101 is performed by the alignment member 1233 having an inverted conical shape portion 1233*a* as in Embodiment 6. At this time, the radius R3 of the force receiving portion 1277 is larger than the radius R2 of the shaft portion 101*f*, and the force receiving portion 1277 does not abut to the shaft portion 101*f*.

As shown in FIG. 92, the position of the force receiving portion 1277 in the Z direction is the same as that of the engaging portion 1273.

In this embodiment, the engaging portion 1273 and the root portion 1274*a* of the base portion 1274 are disposed inside the mounting portion 1272 in the Z direction as in Embodiment 6. However, as in Embodiment 5, it may be disposed in the cylindrical part 1271 (part (a) of FIG. 93), or a part of the root portion 1274*a* may be mounted in the range of the press-fitting part 1272*d* as in Embodiment 7 (part (b) of FIG. 93). As in Embodiments 8 and 9, the base portion may be inclined with respect to the direction perpendicular to the Z direction, and in the Z direction, the root portion 1274*a* of the base portion 1274 may overlap with the winding portion 1274*b* and a part thereof (parts (c), (d), (e) and (f) of FIG. 93).

Embodiment 13

Referring to FIGS. 94 to 98, Embodiment 13 will be described.

Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, as shown in FIG. 60, the engaging portion 673 and the base portion 674 are equally arranged in three positions in the circumferential direction of the flange member 670. Likewise, in the main assembly driving shaft 101, three main assembly drive transmission grooves 101*a* are equally arranged in the circumferential direction of the shaft portion 101*f* of the main assembly driving shaft 101.

Figure 94:
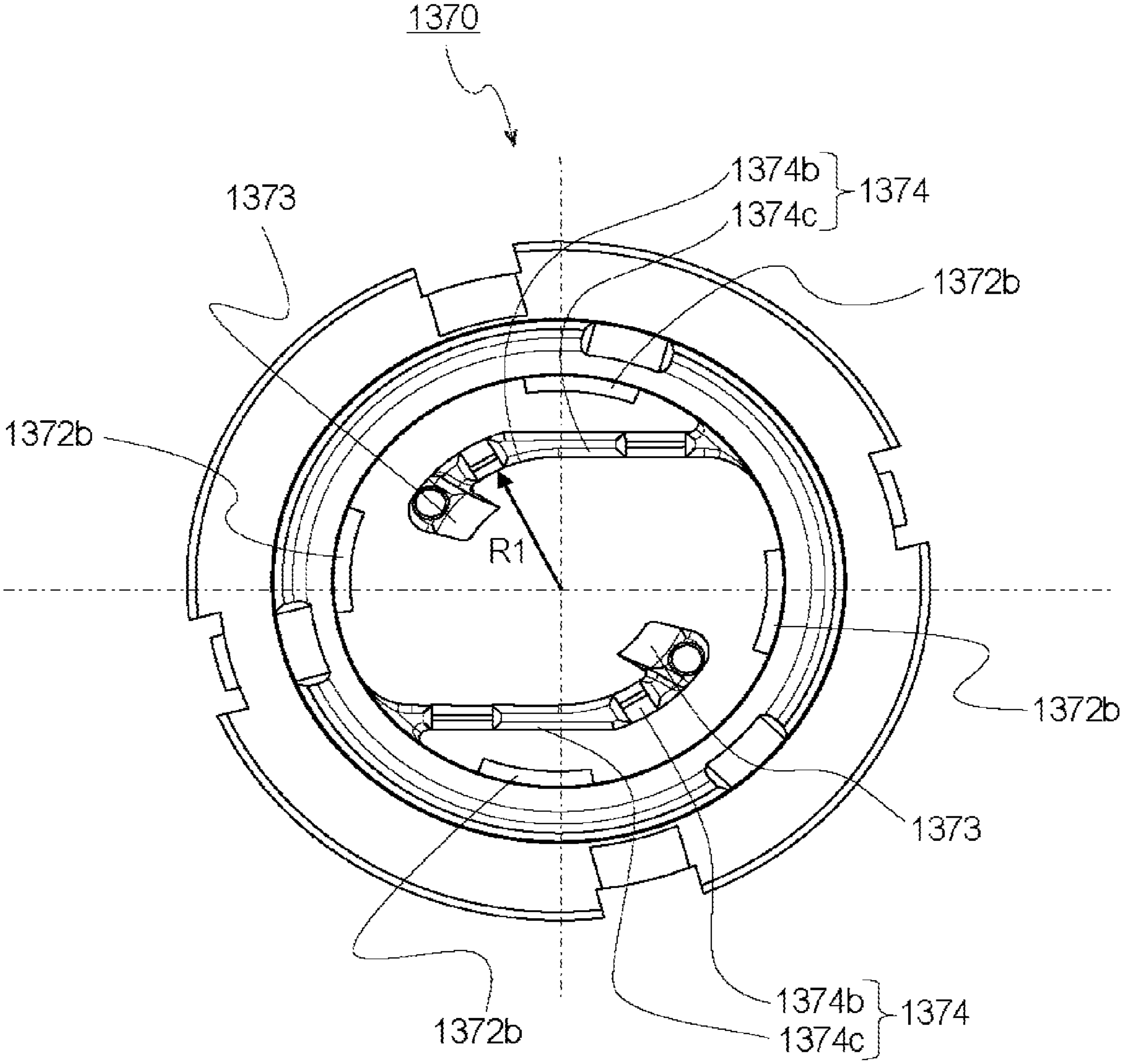
FIG. 94 is an illustration of a flange member 1370 according to Embodiment 13 as viewed from the Z direction outer side.
Figure 95:
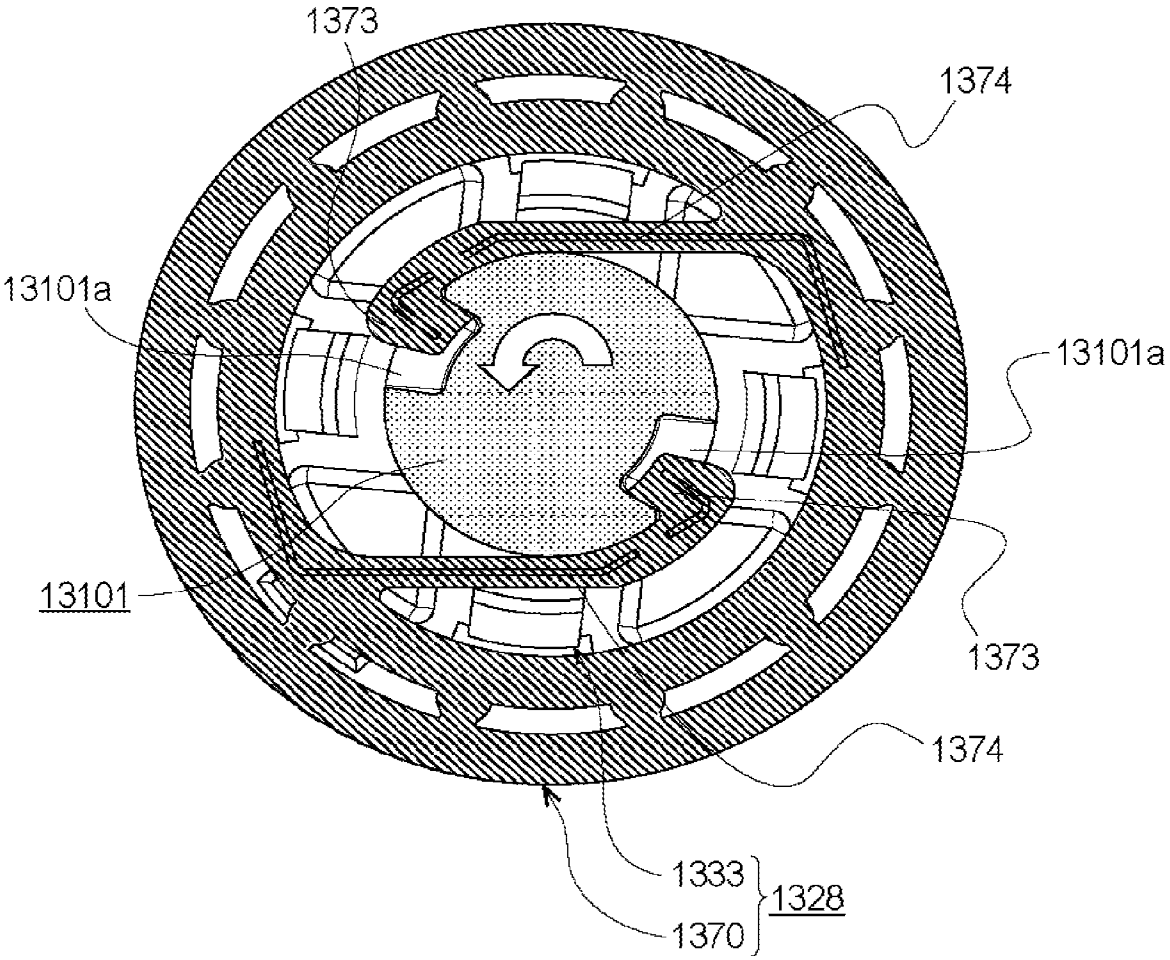
FIG. 95 is a cross-sectional view of a coupling member 1328 according to the thirteenth embodiment and the main assembly driving shaft 101 taken along a plane perpendicular to the rotation axis and including a position passing through the driving force receiving surface 1373*a*.

In this embodiment, as shown in FIGS. 94 and 95, the engaging portions 1373 and the base portions 1374 are equally arranged in two positions in the circumferential direction of the flange member 1370. The engaging portion 1373 is provided with a driving force receiving portion 1373*a*. The engaging portion and the base portion are support portions movably supporting the driving force receiving portion. The engaging portion is a projecting portion, and the base portion is an extending portion.

Also, as shown in FIG. 95, the main assembly driving shaft 13101 is similarly provided with two main assembly drive transmission grooves 13101*a* equally arranged in the circumferential direction of the shaft portion 13101*f* of the main assembly driving shaft 13101.

Figure 96:
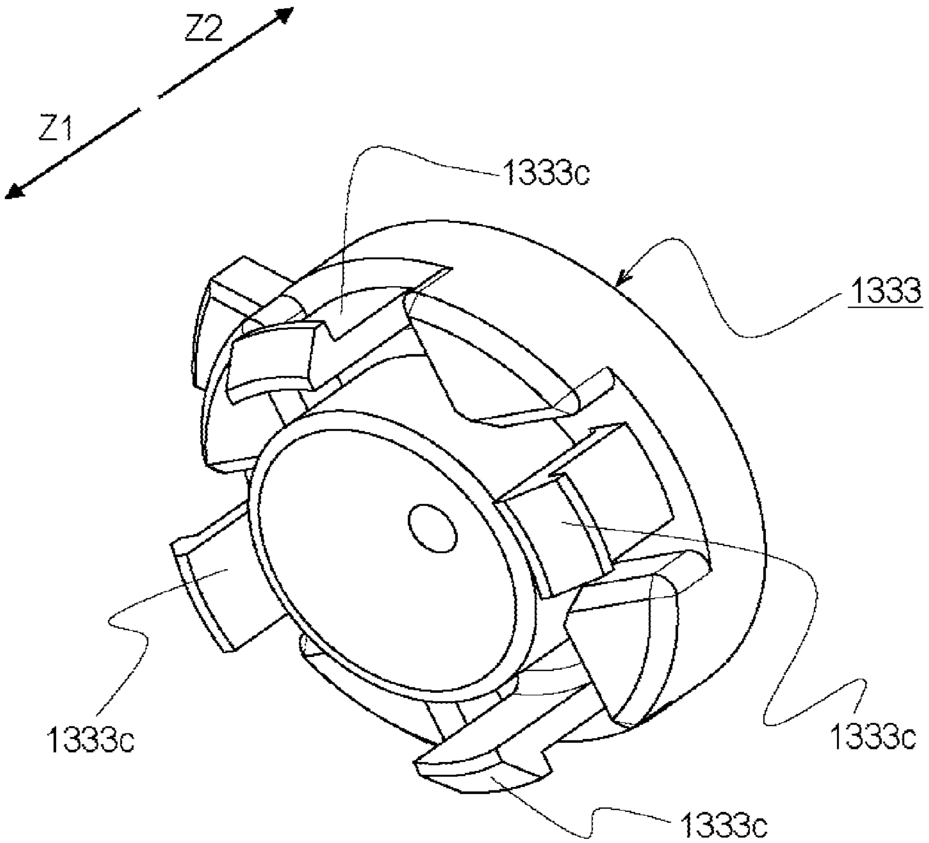
FIG. 96 is a perspective view of an alignment member 1333 according to Embodiment 13.

Four hook portions 1372*b* are equally arranged at four positions in the circumferential direction of the flange member, and in addition, as shown in FIG. 96, the retaining portions 1333*c* of the alignment member 1333 are also arranged at four corresponding positions.

Figure 97:
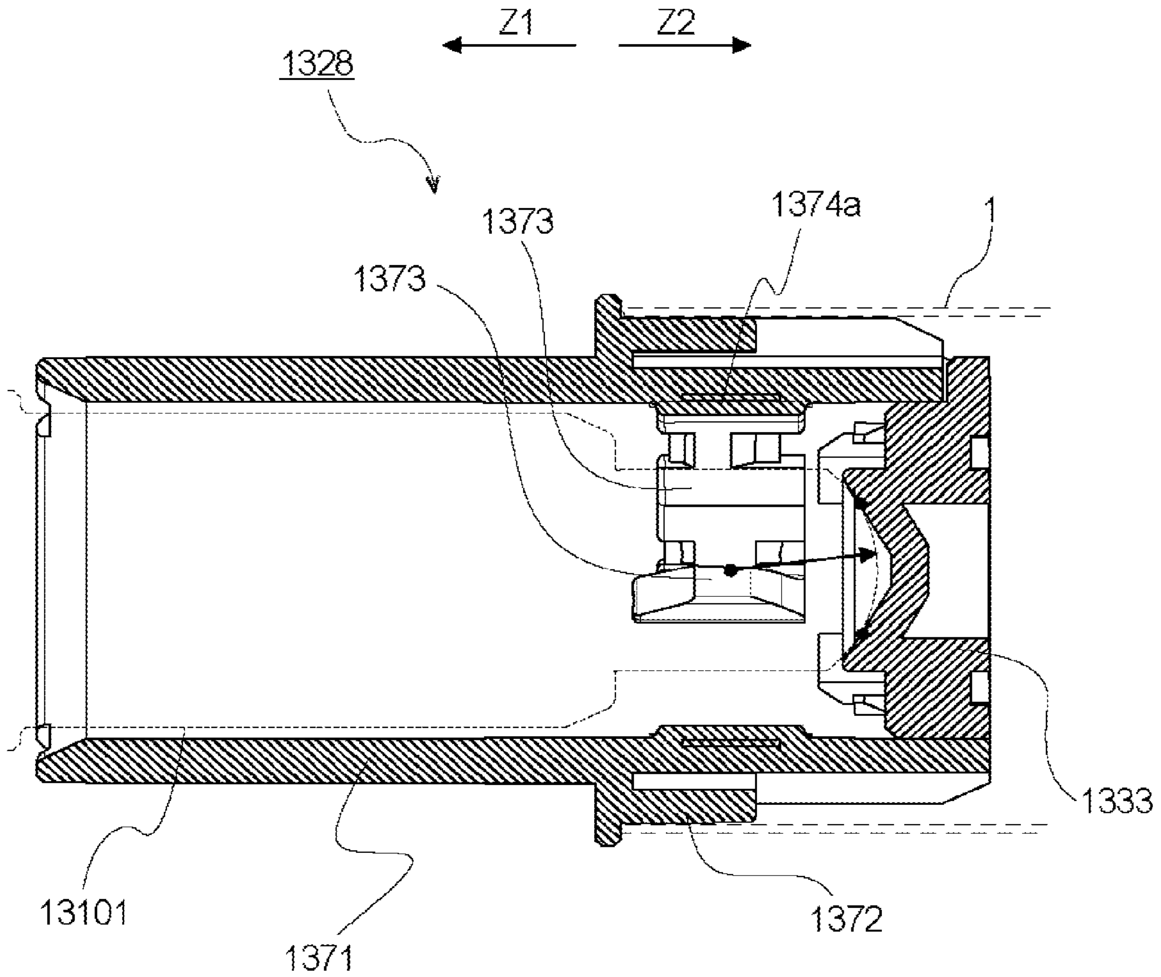
FIG. 97 is a sectional view of the coupling member 1328 according to Embodiment 13.
Figure 98:
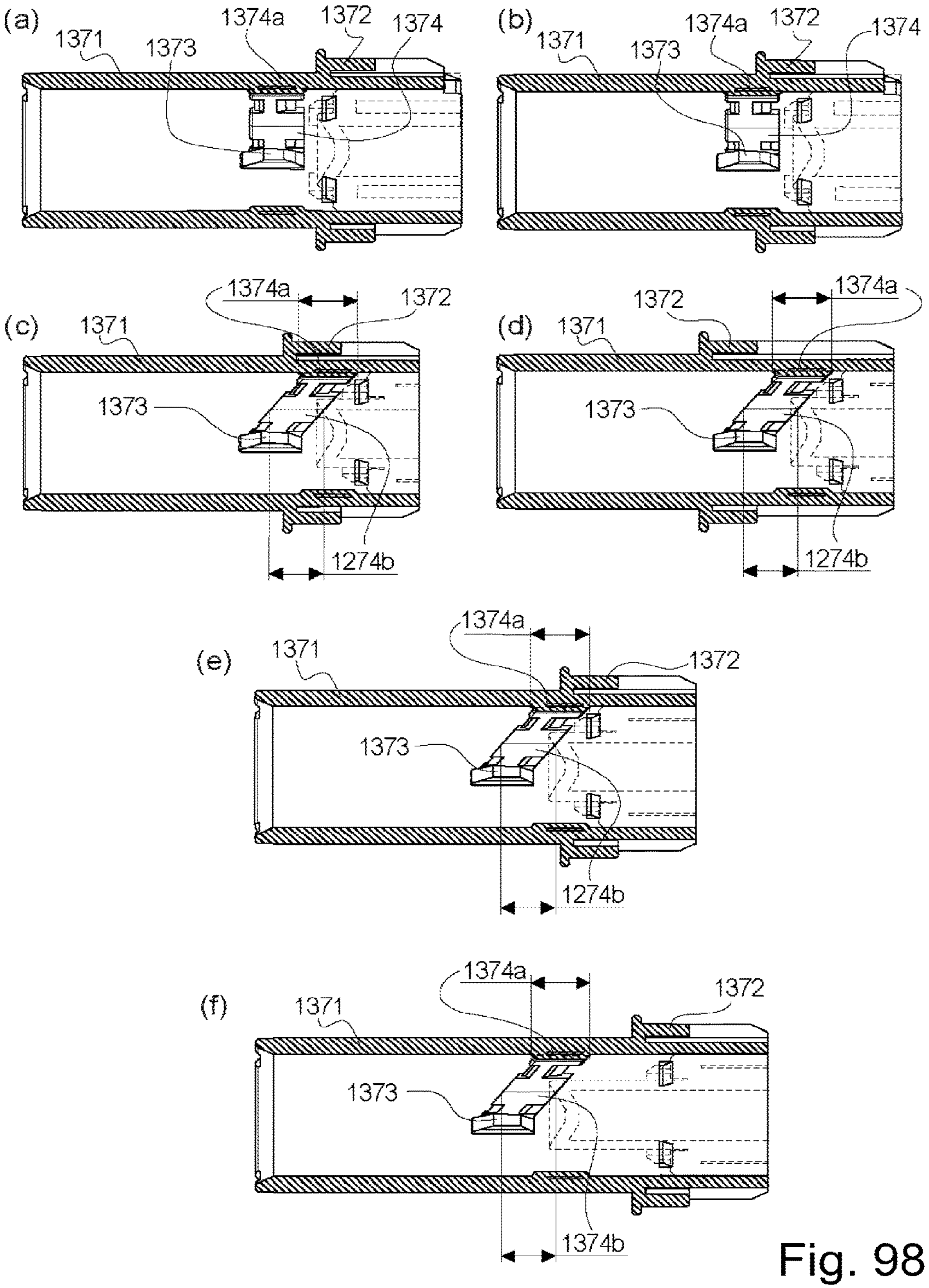
FIG. 98 is sectional views of a modified example of the flange member 1370 according to Embodiment 13.

The engaging portion 1373 and the root portion 1374*a* of the base portion 1374 are disposed inside the mounting portion 1372 in the Z direction (as shown in FIG. 97) as in the Embodiment 6. However, the engaging portion 1373 and the root portion 1374*a* of the base portion 1374 may be disposed in the cylindrical portion 1371 (as shown in part (a)

of FIG. 98) as in Embodiment 5. As in Embodiment 7, a part of the root portion 1374*a* may be mounted to the press-fit portion 1372*d* (part (b) of FIG. 98). As in Embodiments 8 and 9, the base portion may be inclined with respect to the direction perpendicular to the Z direction, and in the Z direction, the root portion 1374*a* of the base portion 1374 may overlap with the winding portion 1374*b* and a part thereof (parts (c), (d), (e) and (f) of FIG. 98).

Embodiment 14

Referring to FIGS. 99 to 106, Embodiment 14 will be described.

Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, a retaining portion 633*c* having a snap-fit shape is used as a shape for suppressing disengagement of the aligning member 633 from the flange member 670 (FIG. 63).

Figure 99:
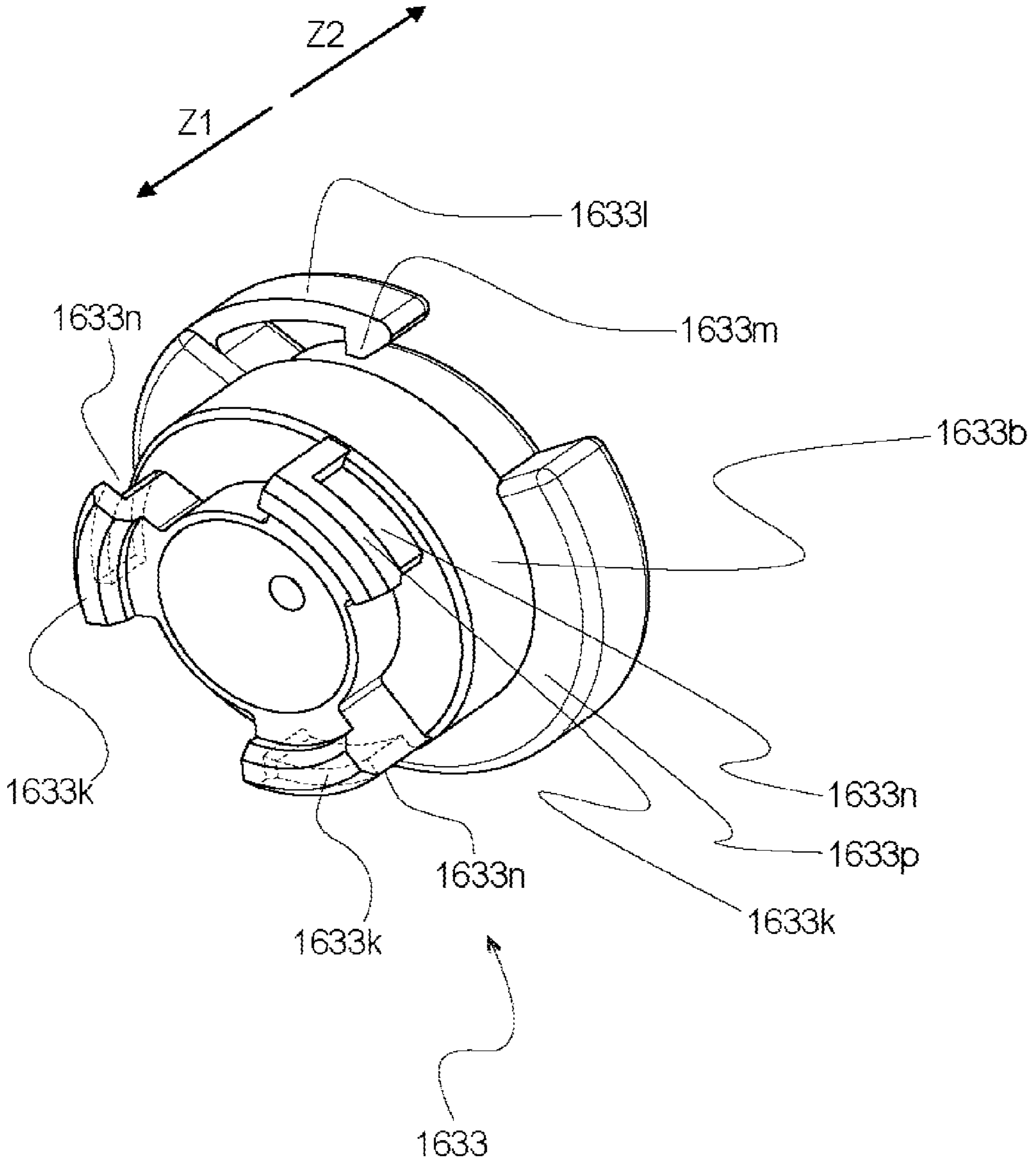
FIG. 99 is a perspective view of an alignment member 1633 according to Embodiment 14.

In contrast, in this embodiment, as shown in FIG. 99, as a method for fixing the alignment member 1633 to the flange member 1670, a recess 1633*k* and a rotation stopper 1633*l* are provided.

The structure for aligning the semispherical shape portion 101*f* of the main assembly driving shaft 101 with respect to the coupling member 1628 using the inverted conical shape 1633*a* is the same as that of the Embodiment 6.

A specific structure will be described below.

As shown in FIG. 99, there is provided a recessed portion 1633*k* having a groove shape 1633*n* which opens toward the upstream side with respect to the rotational direction of the coupling member 1628 and which is provided in the downstream side of the engaging portion 1633*b* with respect to the Z1 direction.

As shown in FIG. 99, the rotation stopper portion 1633*l* is arranged in the downstream side of the engaging portion 1633*b* with respect to the Z2 direction and is extended in the circumferential direction of the fitting portion 1633*b*, and in addition it has a free end on the upstream side with respect to the rotational direction of the coupling member 1628.

Figure 100:
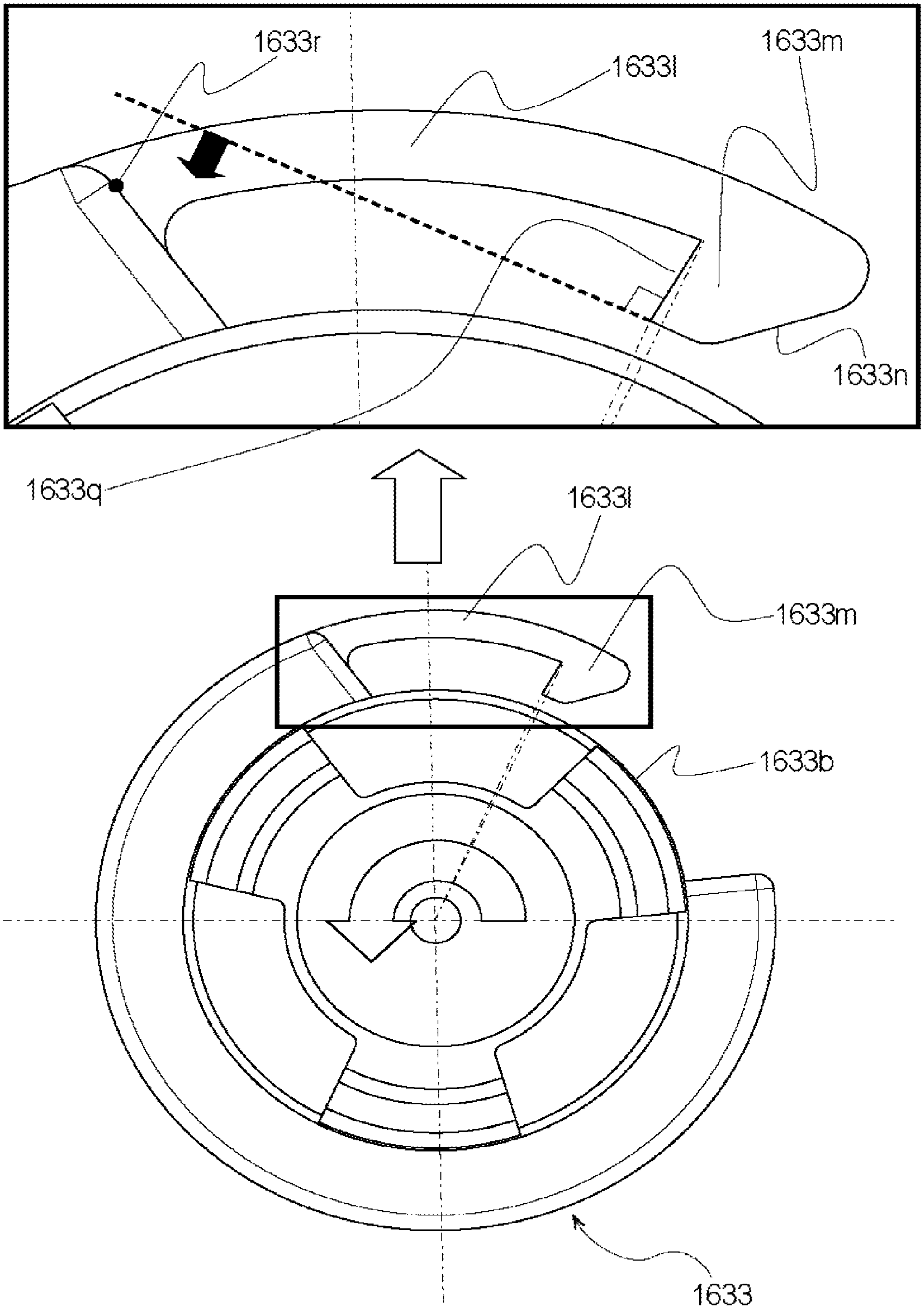
FIG. 100 is a view of the alignment member 1633 according to Embodiment 14 as viewed from the outer side in the Z direction.

The snap-fit shaped free end portion 1633*m* of the rotation stopper portion 1633*l* has a shape extending into the radially inner side of the alignment member 1633. As shown in FIG. 100, the rotation stopper portion 1633*l* has a root portion 1633*r* as a fulcrum of elastic deformation on the fixed end side of the snap fit shape, and the free end portion 1633*m* is provided with a holding surface 1633*q*. The root portion 1633*r* is disposed on the downstream side of a straight line that is perpendicular to the holding surface 1633*q* and passes through the tip of the holding surface 1633*q*, with respect to the rotational direction. Further, the free end portion 1633*m* is provided with a tapered shape 1633*n* on the upstream side with respect to the rotational direction of the coupling member 1628.

Figure 101:
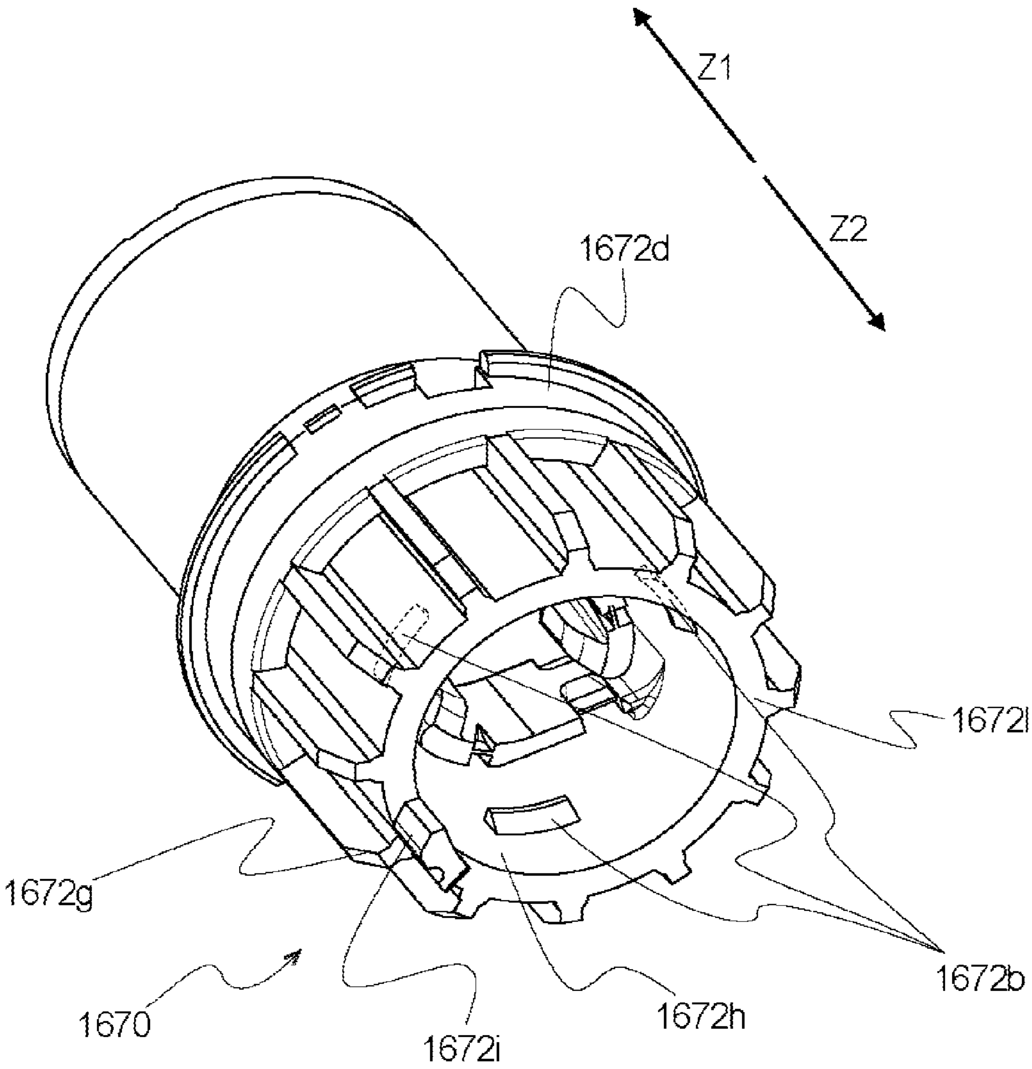
FIG. 101 is a perspective view of a flange member 1670 of Embodiment 14.

As shown in FIG. 101, the flange member 1670 is provided with a hook portion 1672*b* at a position corresponding to the recess 1633*k* in the Z direction and a engagement portion 1672*i* at a position corresponding to the rotation stopper portion 1633*l*.

Figure 102:
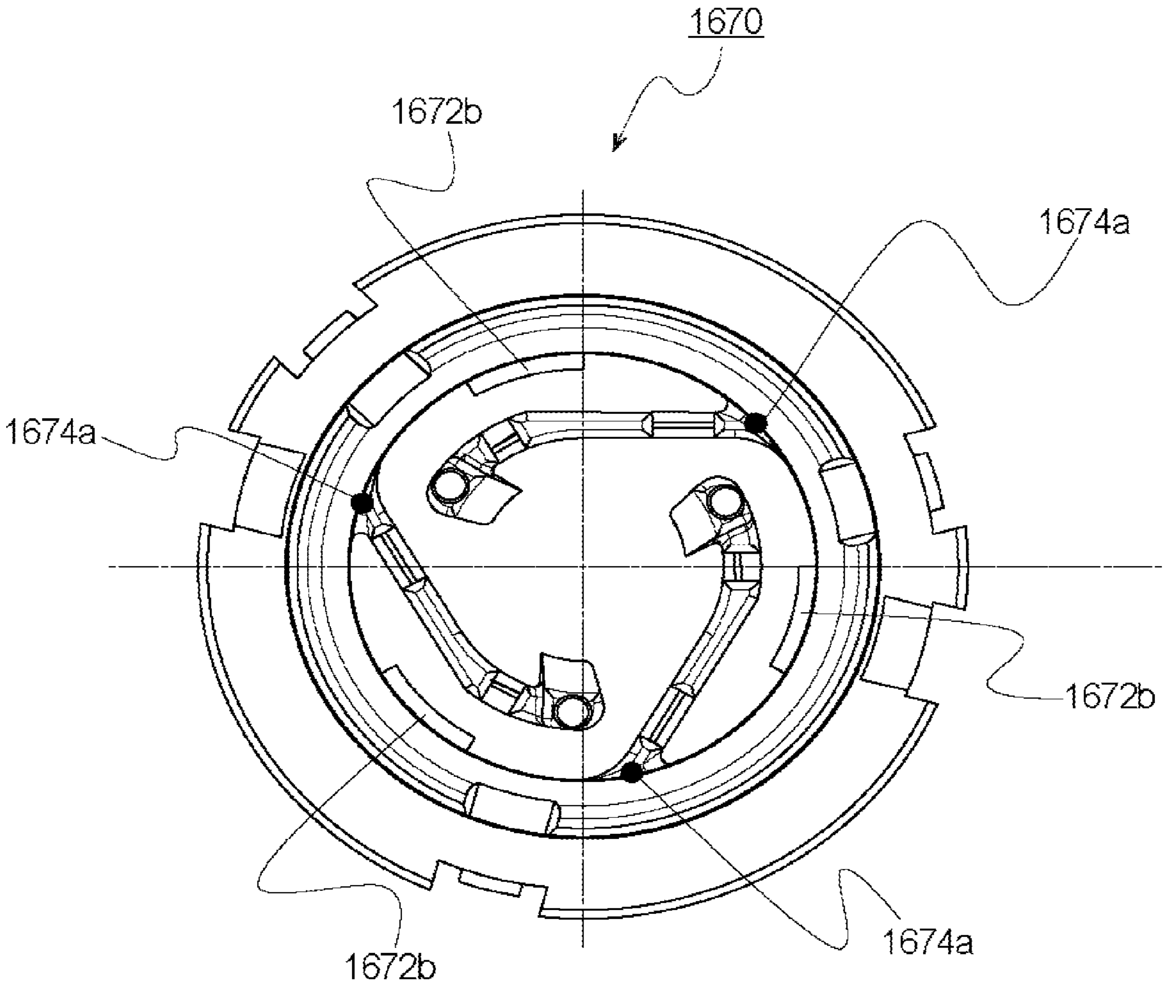
FIG. 102 is an illustration of the flange member 1670 according to Embodiment 14 as viewed in the Z direction from the outer side.

As shown in FIG. 102, three hooking portions 1672*b* are disposed substantially in the middle of the respective root portions 1674*a* in the circumferential direction of the flange member 1670, similarly to the hook portion 672*b* of Embodiment 6. In addition, as shown in FIG. 99, the groove shape portions 1633*n* of the recessed portion 1633*k* are also arranged in three positions corresponding to the hook portion 1672*b*, respectively.

As shown in FIG. 101, the engaging portion 1672*i* is disposed on the back side (the Z2 direction side) with respect to the guide taper 1672*g* and has a shape projecting to the back side (Z2 side) of the flange member 1670 from the end face 1672*l* of the mounting portion 1672.

Figure 103:
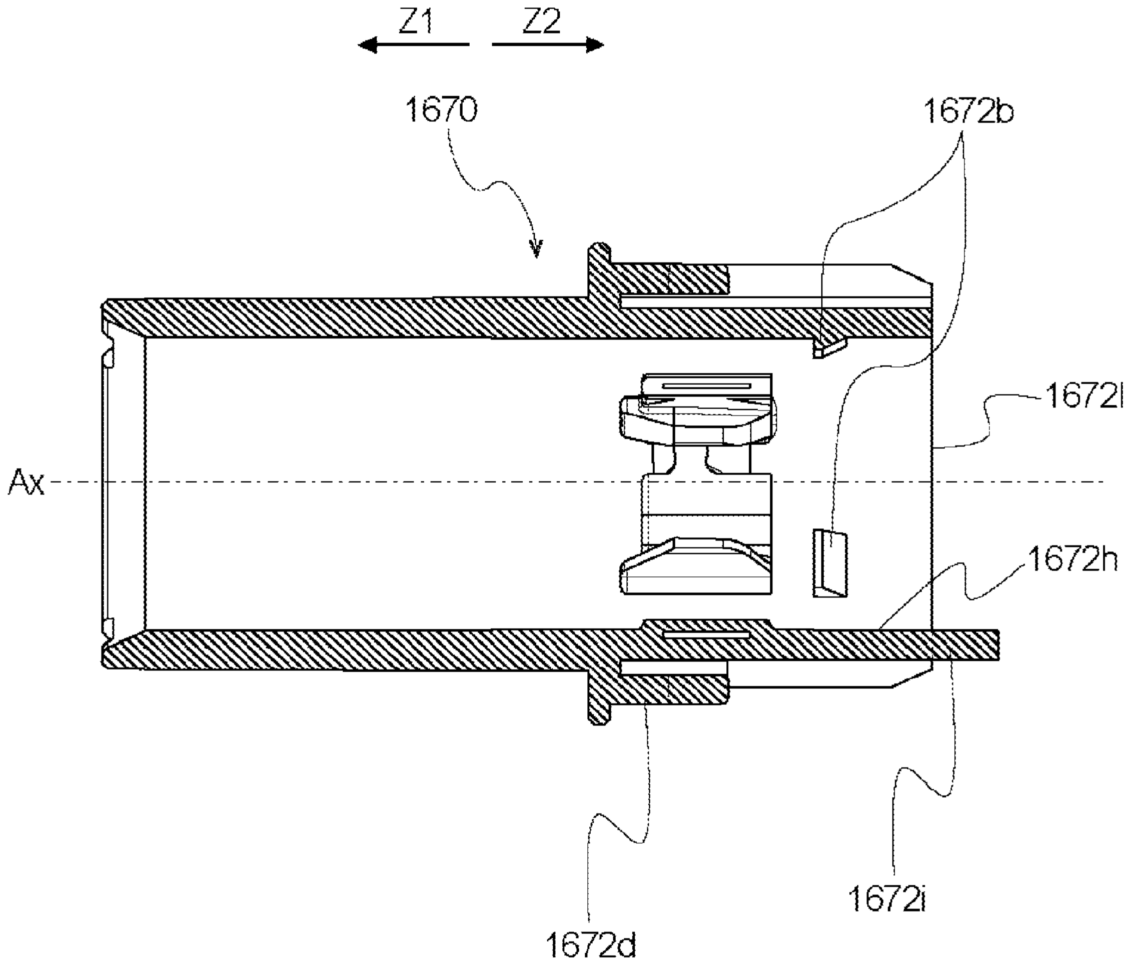
FIG. 103 is a sectional view of the flange member 1670 according to Embodiment 14.
Figure 104:
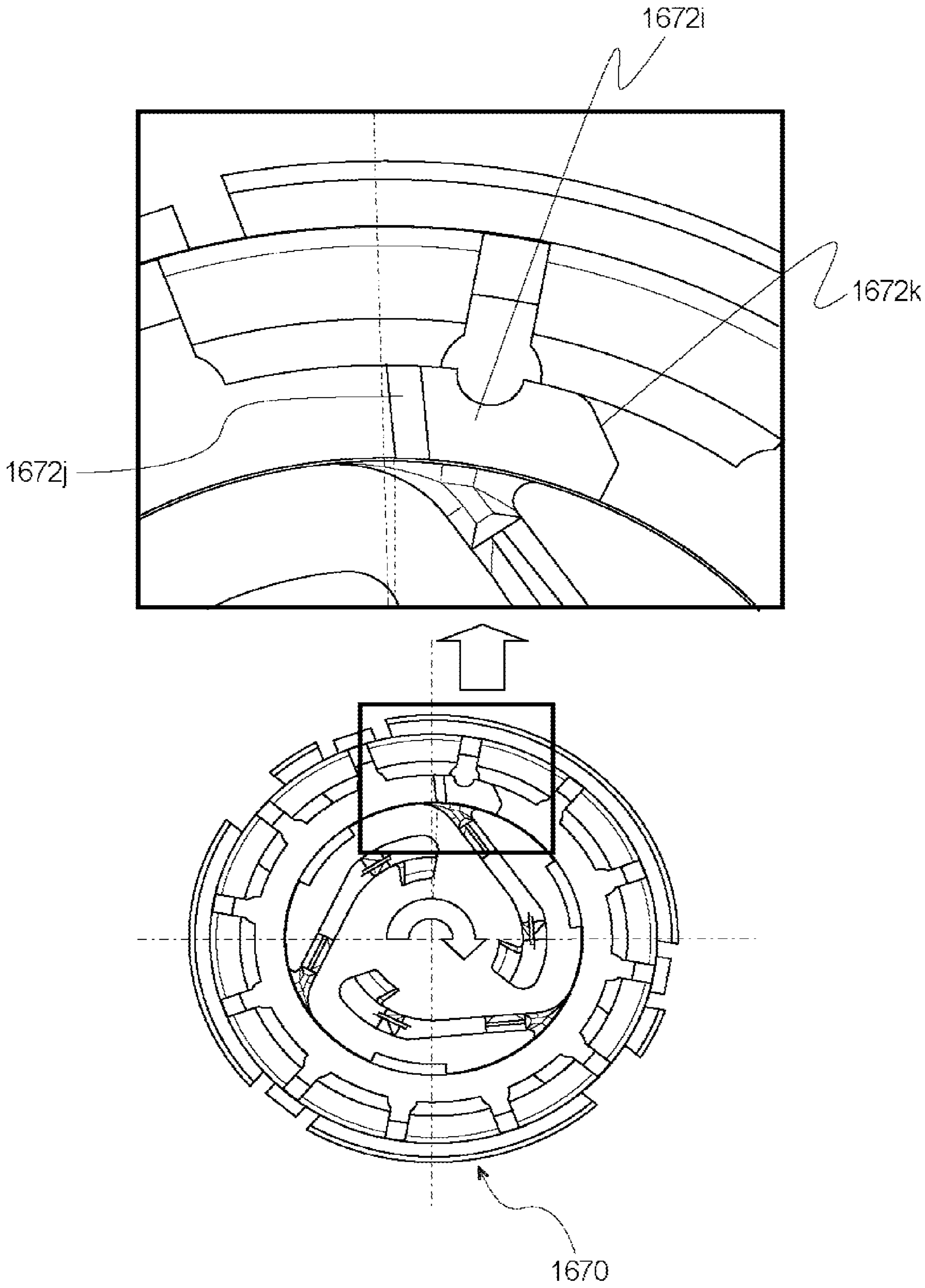
FIG. 104 in an illustration of the flange member 1670 according to Embodiment 14 viewed from the back side in the Z direction.

As shown in FIGS. 101 and 103, the engaging portion 1672*i* is arranged radially outward from the inner periphery 1672*h*, and is disposed radially inward of the press-fitting portion 1672*d*.

The engagement surface 1672*j* on the upstream side in the rotational direction has a shape corresponding to the free end portion 1633*m* of the rotation stopper portion.

Figure 106:
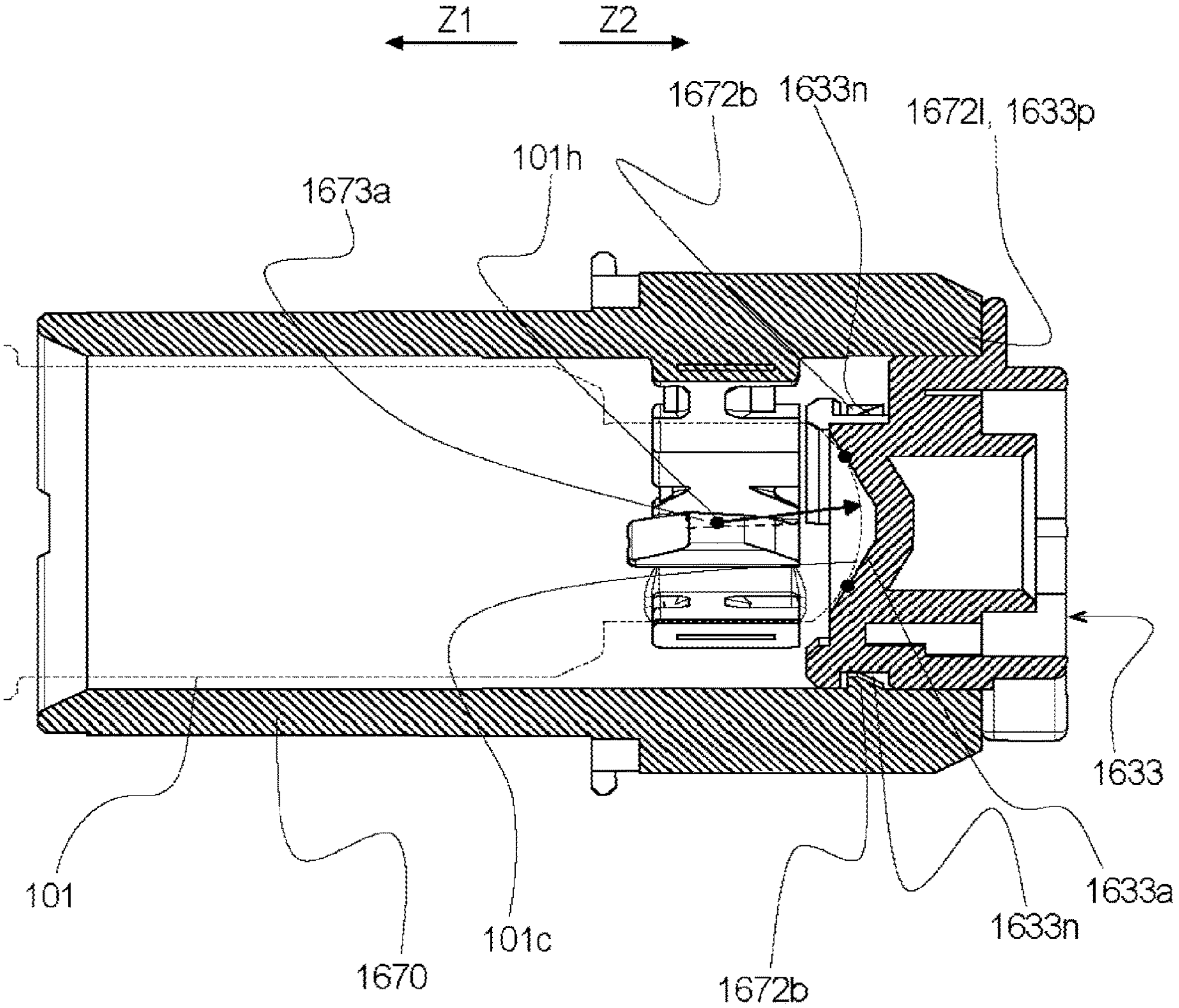
FIG. 106 is a cross-sectional view of the coupling member 1628 according to Embodiment 14.

As shown in FIG. 99, the alignment member 1633 has an abutting surface 1633*p* contacting with the end surface 1672*l* of the mounting portion 1672 of the flange member 1670 in the Z direction. As shown in FIG. 106, the width of the groove shape 1633*n* of the recess 1633*k* in the Z direction is larger than the width of the hooking portion 1672*b*. When the end surface 1672*l* of the flange member 1670 abuts against the abutting face 1633*p*, the hooking portion 1672*b* enters the range of the groove shape portion 1633*n* in the Z direction.

The groove shape portion 1633*n* has a play relative to the hooking portion 1672*b*. By this play, the alignment member 1633 can move in the Z direction relative to the flange member 1670. Even if the aligning member 1633 can move in the Z direction by the play, the inverted cone shape 1633*a* is disposed such that the center 101*h* of the semispherical shape 101*c* of the main assembly driving shaft 101 overlaps with the driving force receiving surface (driving force receiving portion) 1673*a* in the Z direction.

Figure 105:
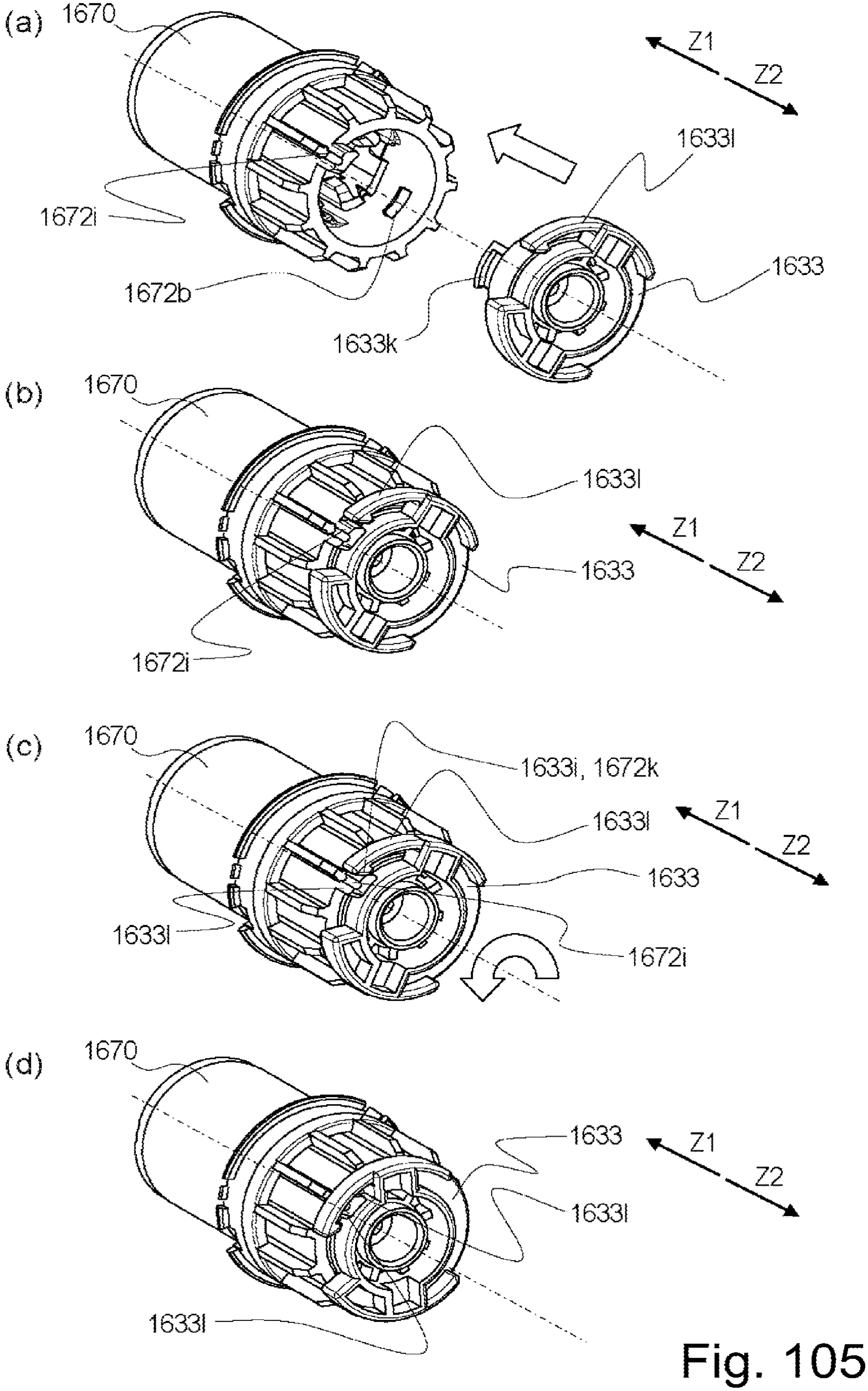
FIG. 105 is illustrations of assembling procedure of the coupling member 1628 according to Embodiment 14.

FIG. 105 shows a method for assembling the alignment member 1633 to the flange member 1670. First, as shown in part (a) of FIG. 105, with the phase on the downstream side of the phase corresponding to the mounting completed state (part (c) of FIG. 105) of the aligning member 1633 with respect to the rotational direction, the aligning member 1633 is assembled to the flange member 1670 from the back side (Z2 side) to the front side (Z1 side).

As shown in part (b) of FIG. 105, the alignment member 1633 is assembled to the flange member 1670 until the abutment surface 1633*n* abuts against the end surface 1672*l* of the flange member 1670. By doing so, the groove shape portion 1633*n* of the recessed portion 1633*k* comes to a position corresponding to the hooking portion 1672*b* in the Z direction.

Subsequently, after aligning the alignment member 1633 to the mounting completion position in the Z direction to the flange 1670, the alignment member is rotated toward the upstream side in the rotational direction of the coupling member 1628. As shown in part (c) of FIG. 105, a tapered shape 1633*i* provided on the rotation stopper portion 1633*l* of the aligning member 1633 is brought into contact with the tapered shape 1672*k* of the flange member 1670.

As described above, the rotation stopper portion 1633*l* has a snap-fit shape, so that the rotation stopper portion 1633*l* rides on the engagement portion 1672*i* while being elastically deformed.

Thereafter, as shown in part (d) of FIG. 105, by rotating the alignment member 1633 relative to the flange member 1670 until the rotation stopper portion 1633*l* is elastically deformed beyond the engagement portion 1672*i*, the alignment member 1633 is assembled to the flange member 1670.

A case will be considered where the cartridge 7 including the coupling member 628 with the aligning member 633 described in the Embodiment 6 mounted thereto is mounted to the image forming apparatus main assembly 100A with a strong force. At this time, the inverted conical shape 633*a* of the aligning member 633 abuts against the semispherical shape 101*c* of the main assembly driving shaft 101 with a strong force. As shown in FIG. 63, the retaining portion 633*c* of Embodiment 6 has a snap-fit shape extending in the axial direction of the coupling member 628.

In the case of using a material of the retaining portion 633*c* with which the snap fit shape portion is bent with a small force, when the aligning member 633 receives the strong force from the main assembly driving shaft 101, the retaining portion 633*c* may be disengaged from the hooking portion 672*b*.

On the contrary, the recessed portion 1633*k* of the alignment member 1633 of the embodiment is fixed with the hook portion 1672*b* by the groove shape portion 1633*n* which opens toward the upstream side with respect to the rotational direction of the coupling member 1628 and which is provided in the downstream side of the engaging portion 1633*b* with respect to the Z1 direction. There is only a small liability that the alignment member 1633 is disengaged from the flange member 1670 even if the above-described strong force is received by the alignment member 1633 from the main assembly driving shaft 101. This is because the recessed portion 1633*k* does not have a snap-fit shape unlike the stopper portion 633*c* of Embodiment 6.

As described above, the base portion 1633*r* of the rotation stopper portion 1633*l* is disposed on the downstream side in the rotational direction with respect to a straight line that is perpendicular to the holding surface 1633*q* and passes through the tip of the holding surface 1633*q*. Because of this shape, it is possible to make difficult the disengagement of the flange member 1670 from the alignment member 1633. If the aligning member 1633 is rotated relative to the flange member 1670 by receiving the rotational driving force from the main assembly driving shaft 101, the holding surface 1633*q* is brought into contact with the engaging surface 1672*j* of the flange member. In this case, a force pulling in toward the rotation center of the flange member 1670 is applied to the rotation stopper portion 1633*l*, and therefore, the alignment member 1633 does not disengage from the flange member 1670.

As described above, by using the coupling member 1628 according to this embodiment, the likelihood can be reduced that the alignment member 1633 is disengaged from the flange member 1670 when the cartridge 7 is mounted to the image forming apparatus main assembly 100A with a strong force.

In this embodiment, the snap fit is provided on the side of the alignment member 1633, but it may be provided on the flange member side.

Embodiment 15

Figure 107:
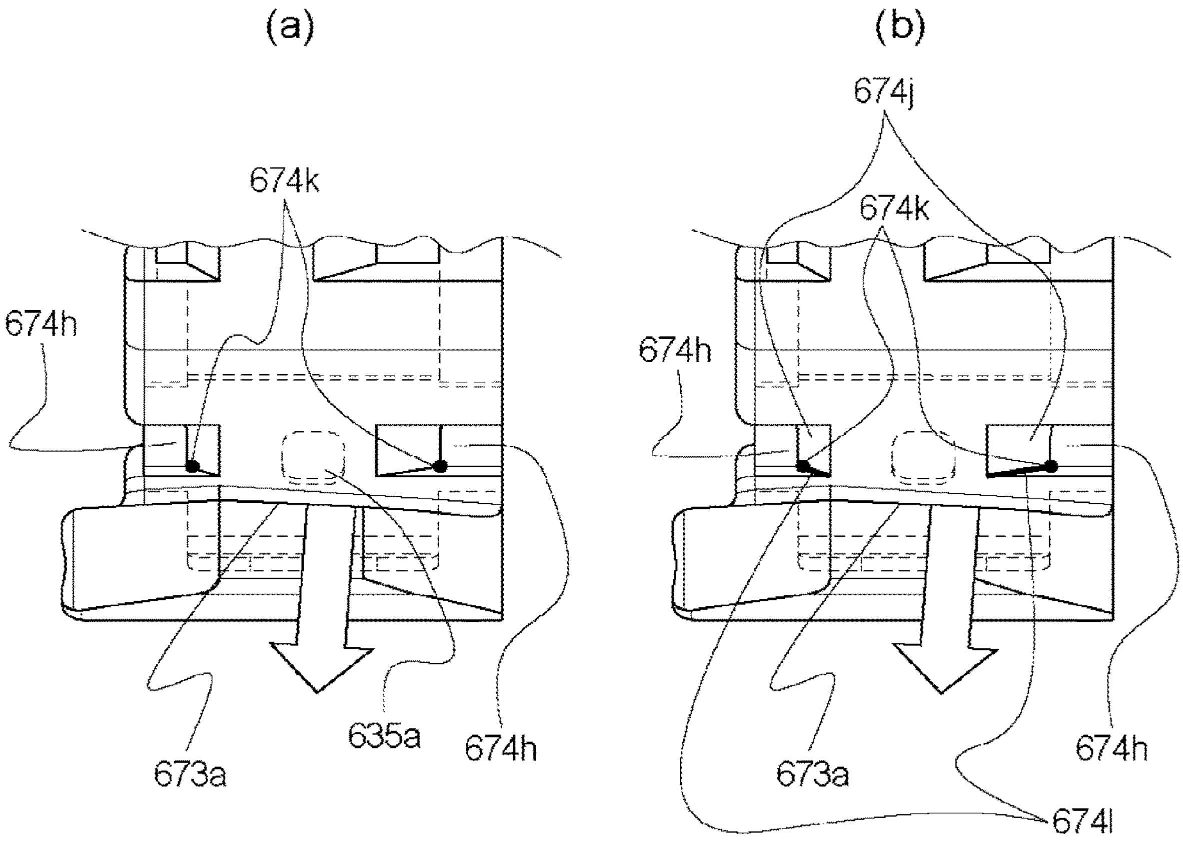
FIG. 107 is illustrations of a stress applied to the base portion without using the base portion of Embodiment 15.
Figure 108:
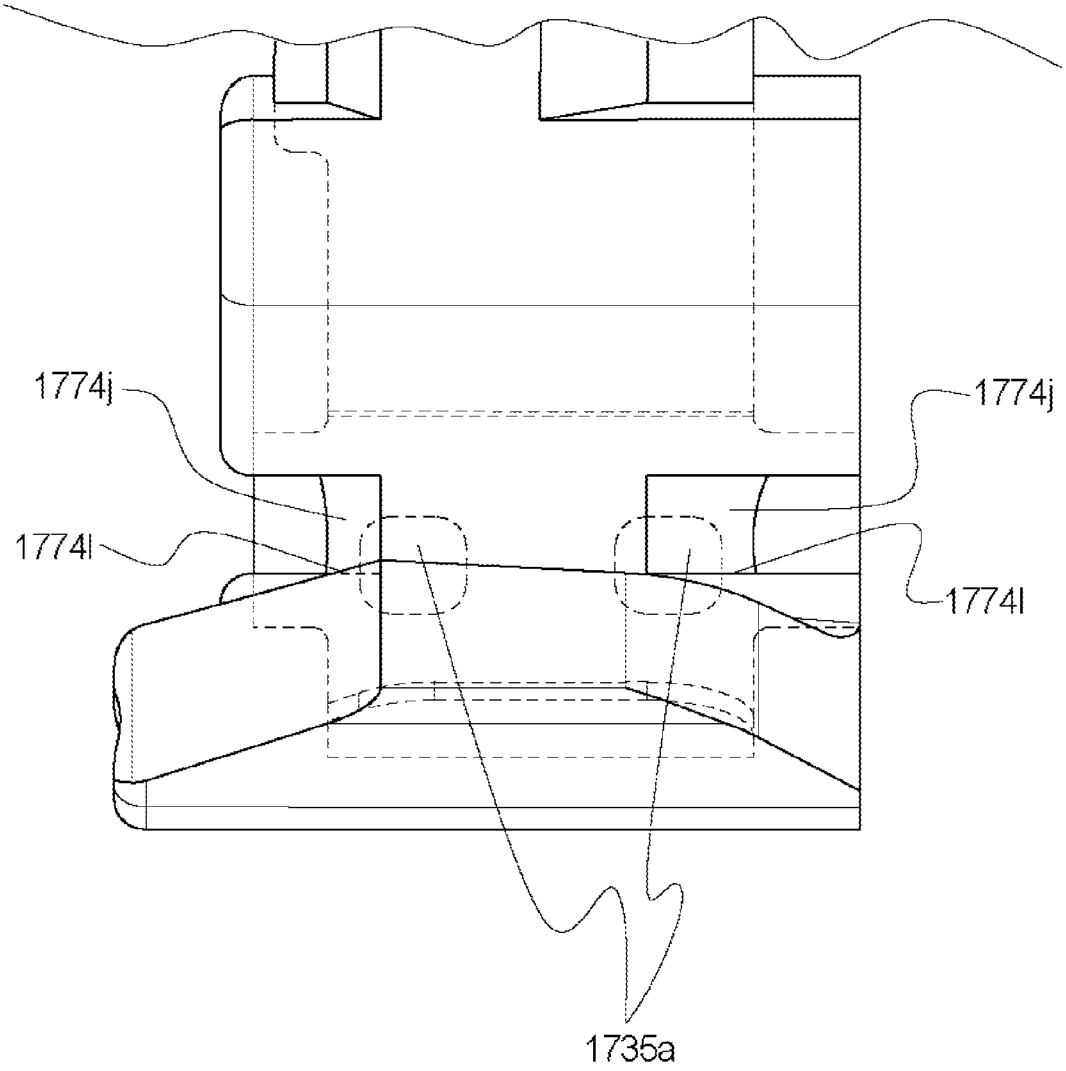
FIG. 108 is an illustration of the base portion 1774 of the flange member according to Embodiment 15.

Referring to FIGS. 107 and 108, Embodiment 15 will be described. Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, the sheet metal member 635 is insert-molded to the flange member 670. More specifically, as shown in FIG. 73, a winding portion cut-away portion 674*h* is provided in the winding portion 674*b* of the base portion 674, and the winding portion exposed portion 635*j* which is a part of the sheet metal member 635 is uncovered by the resin portion 634 of the flange member 670. Further, a connection hole 635*g* is provided in the base inside portion 635*a* of the sheet metal member 635, and the front and back resin of the sheet metal is connected to enhance the bonding strength between the resin portion 634 and the metal plate 635. In Embodiment 6, the drive force receiving surface 673*a* side of the winding portion cut-away portion 674*h* on the radially inner side of the winding portion 674*b* is formed in a direction parallel to the axial direction of the flange member 670. Further, the connecting hole 635*a* is disposed inside the winding portion 674*b* at a position not overlapping with the tapered surface 674*j* of the winding portion cut-away portion in the Z direction.

with the shape of Embodiment 6, when the driving force receiving surface 673*a* receives a driving force from the main assembly driving shaft 101, the direction of driving force receiving surface 673*a* and the radially inner winding portion cut-away portion 674*h* is close to each other. For this reason, the stress concentrates on the drive force receiving surface side corner portion 674*k* of the winding portion cut-away portion 674*h* on the radially inner side (as shown in part (a) of FIG. 107). Then, the stress is transmitted from the driving force receiving surface side corner portion 674*k* as a fulcrum to the driving force receiving surface side ridge line 6741 (part (b) of FIG. 107).

Therefore, in the Embodiment 6, the strength of the driving force receiving surface side ridge line 6741 is sufficiently enhanced against the driving force applied to the driving force receiving surface 673*a* and the load applied to the base portion 674. The driving force receiving surface side ridge line 6741 is a ridge line of the winding portion cut-away portion tapered surface 674*j*.

In this embodiment, the base portion is given a higher strength. That is, in this embodiment, the connecting hole 1735*a* is arranged in two places parallel to the Z direction, inside the winding portion 1774*b*. Also, a part of each respective coupling hole 1735*a* is arranged is overlapped with the driving force receiving surface side ridge line 1774*l* of the winding portion cut-away portion tapered surface 1774*j* in the Z direction and the circumferential direction of the winding portion 1774*b* (Shown in FIG. 108).

As described above, the portion where the resin portion 1739 and the sheet metal member 1735 are most firmly fixed is the connection hole 1735*a*.

The connecting hole 1735*a* is provided so that a part thereof overlaps with the driving force receiving surface side ridge line 1774*l* in the Z direction and the circumferential direction of the winding portion 1774*b*. This prevents the stress from propagating to the driving force receiving surface side ridge line 1744*l* even if the stress concentrates on the driving force receiving surface side corner portion 674*k*. Thus, the receiving surface side ridge line 1744*l* can be more reliably protected.

As a result, a stronger driving force and load can be applied to the driving force receiving surface and the resin portion. Further, the rotation and stoppage of the main assembly driving shaft 101 can be repeated more times.

Figure 109:
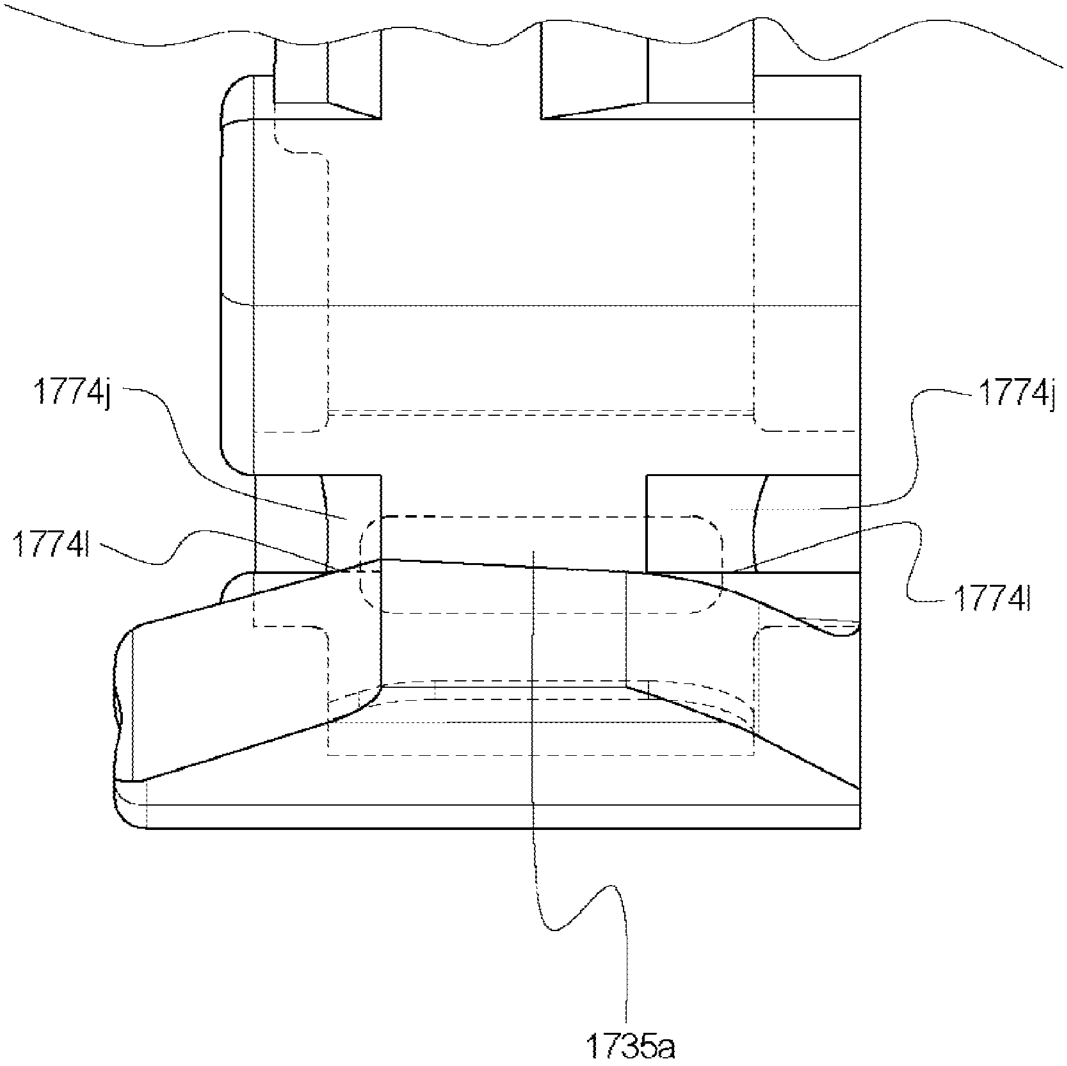
FIG. 109 is an illustration of a modified example of the base portion 1774 of the flange member according to Embodiment 15.

In this embodiment, two coupling holes 1735*a* are arranged in the Z direction, but it is also possible to arrange the coupling holes 1735*a* so that they overlap with the driving force receiving surface side ridge line 1774*l* at the opposite ends in the Z direction and the circumferential direction of the winding portion 1774*b*. Therefore, as shown in FIG. 109, one coupling hole 1735*a* may be used.

Embodiment 16

Figure 110:
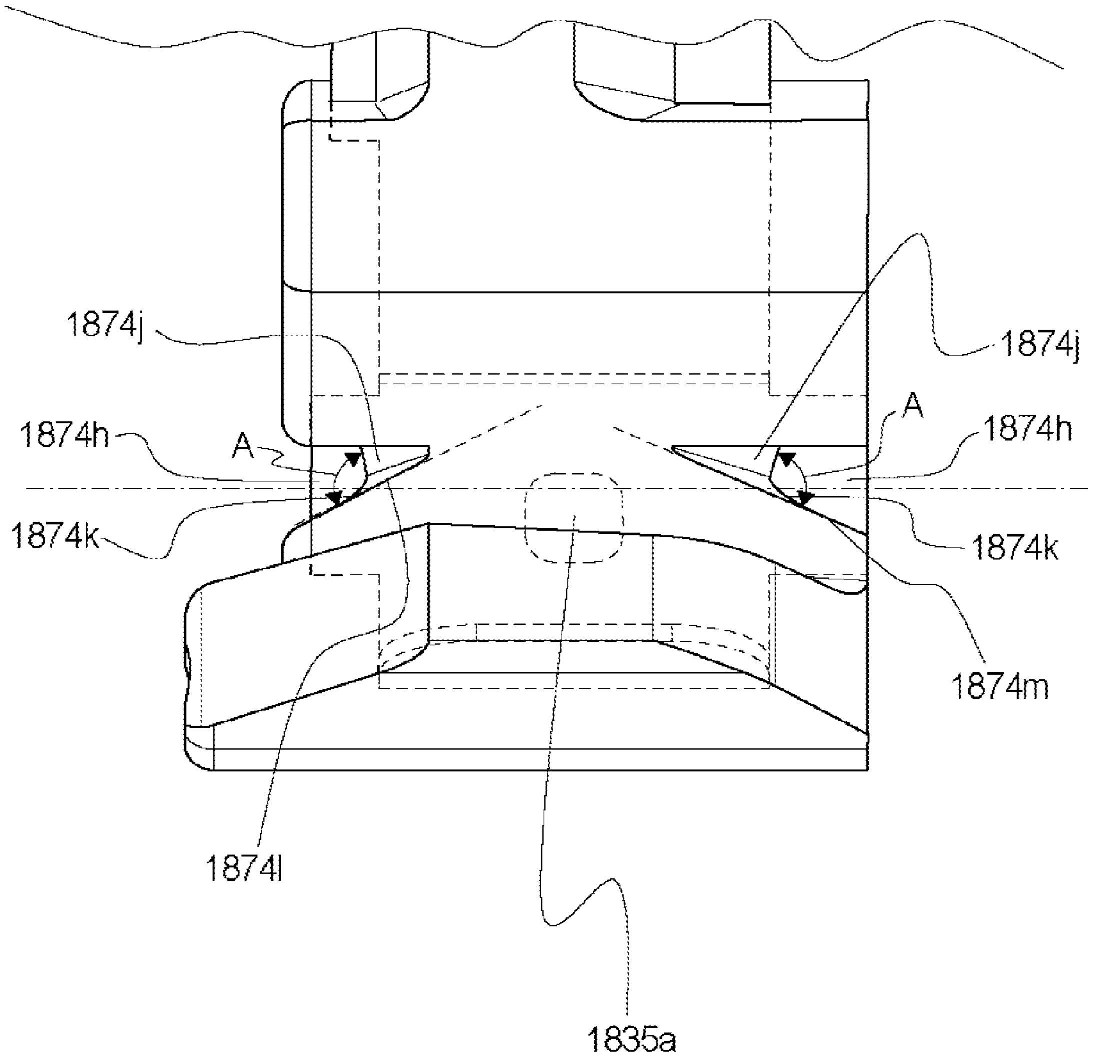
FIG. 110 is an illustration of the base portion 1874 of the flange member according to Embodiment 16.

Referring to FIG. 110, Embodiment 16 will be described. Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, the sheet metal member 635 is insert-molded to the flange member 670. More specifically, as shown in FIG. 73, a winding portion cut-away portion 674*h* is provided in the winding portion 674*b* of the base portion 674, and the winding portion exposed portion 635*j* which is a part of the sheet metal member 635 is uncovered by the resin portion 634 of the flange member 670. Further, a connection hole 635*g* is provided in the base inside portion 635*a* of the sheet metal member 635, and the front and back resin of the sheet metal is connected to enhance the bonding strength between the resin portion 634 and the metal plate 635. In Embodiment 6, the drive force receiving surface 673*a* side of the winding portion cut-away portion 674*h* on the radially inner side of the winding portion 674*b* is formed in a direction parallel to the axial direction of the flange member 670. Further, the connecting hole 635*a* is disposed inside the winding portion 674*b* at a position not overlapping with the tapered surface 674*j* of the winding portion cut-away portion in the Z direction.

With the shape of Embodiment 6, when the driving force receiving surface 673*a* receives a driving force from the main assembly driving shaft 101, the direction of driving force receiving surface 673*a* and the radially inner winding portion cut-away portion 674*h* is close to each other. For this reason, the stress concentrates on the drive force receiving surface side corner portion 674*k* of the winding portion cut-away portion 674*h* on the radially inner side (as shown in part (a) of FIG. 107).

On the contrary, in this embodiment, the angle A formed between the drive force receiving surface side corner portion 1874*k* of the winding portion cut-away portion on the inner peripheral side of the flange member 1870 forms an obtuse angle. Therefore, the drive force receiving surface side ridge line 1874*m* of the winding portion cut-away portion is disposed obliquely relative to the axis line of the flange member 1870 (shown in FIG. 110).

In addition, as shown in FIG. 110, an arc shape is arranged on the driving force receiving surface side corner portion 1874*k*. By employing this structure, it is possible to disperse the stress otherwise concentrated on the corner portion 1874*k* of the winding portion cut-away portion drive force receiving surface compared with Embodiment 6. As a result, it is possible to apply a larger driving force or load to the driving force receiving portion (driving force receiving portion) and the resin portion 1839, and to repeat rotation and stop of the main assembly driving shaft 101 more times.

Embodiment 17

Figure 111:
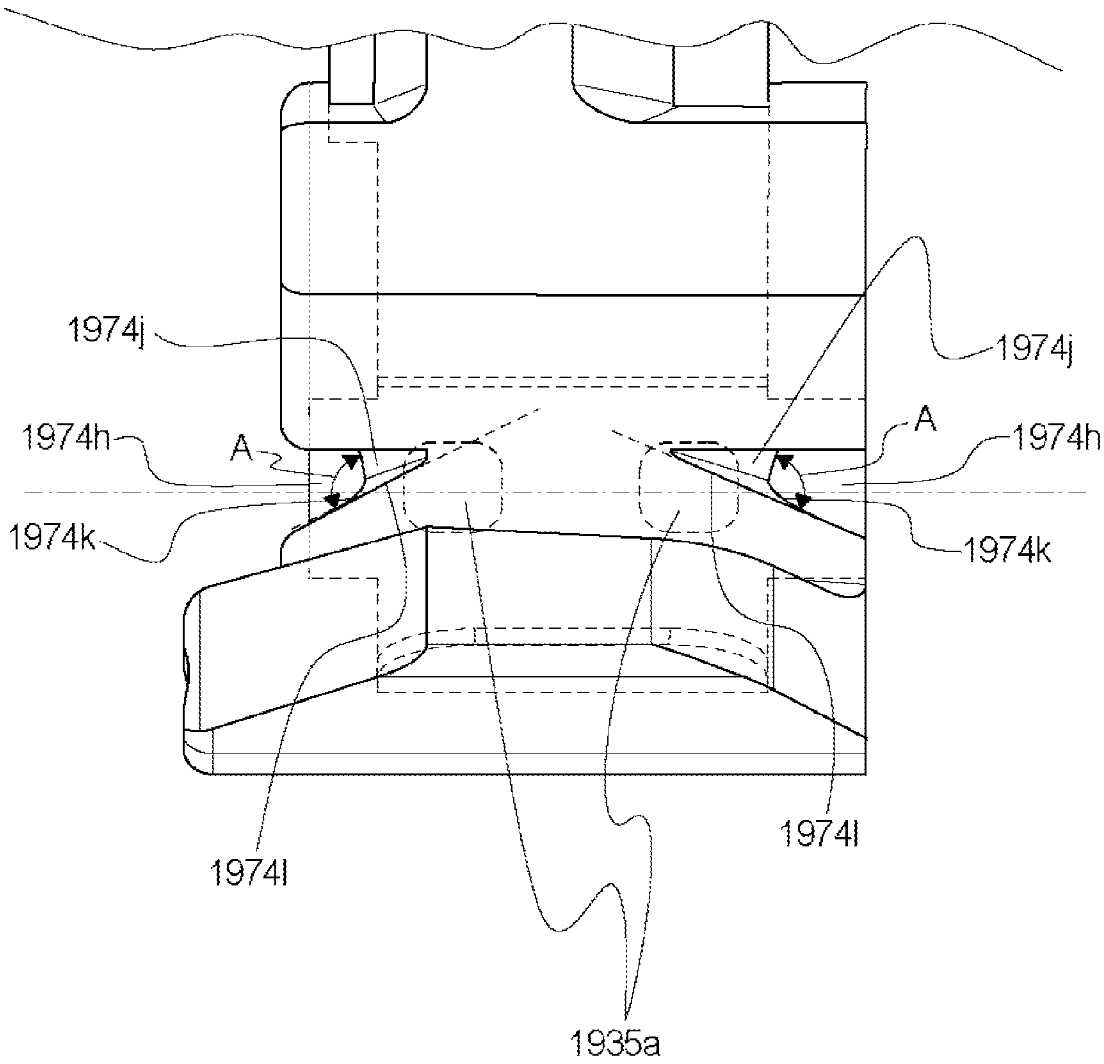
FIG. 111 is an illustration of the base portion 1974 of the flange member according to Embodiment 17.

Referring to FIG. 111, Embodiment 17 will be described. Elements corresponding to those of the above-described embodiment (particularly, the Embodiment 6) are assigned by the same names, and descriptions of the similar points to those of the above-described elements may be omitted. The description will be made mainly about the differences from the abovementioned elements.

In Embodiment 6, the sheet metal member 635 is insert-molded to the flange member 670. More specifically, as shown in FIG. 73, a winding portion cut-away portion 674*h* is provided in the winding portion 674*b* of the base portion 674, and the winding portion exposed portion 635*j* which is a part of the sheet metal member 635 is uncovered by the resin portion 634 of the flange member 670. Further, a connection hole 635*g* is provided in the base inside portion 635*a* of the sheet metal member 635, and the front and back resin of the sheet metal is connected to enhance the bonding strength between the resin portion 634 and the metal plate 635. In Embodiment 6, the drive force receiving surface 673*a* side of the winding portion cut-away portion 674*h* on the radially inner side of the winding portion 674*b* is formed in a direction parallel to the axial direction of the flange member 670. Further, the connecting hole 635*a* is disposed inside the winding portion 674*b* at a position not overlapping with the tapered surface 674*j* of the winding portion cut-away portion in the Z direction.

On the contrary, in this embodiment, as shown in FIG. 111, the connecting holes 1935*a* are arranged in two positions parallel to the Z direction inside the winding portion 1974*b*. In addition, a part of the respective coupling holes 1935*a* are arranged so as to overlap with the driving force receiving surface side ridge line 1974*l* of the winding portion cut-away portion tapered surface 1974*j* in the Z direction and the circumferential direction of the winding portion 1774*b*.

The driving force receiving surface side ridge line 1974*m* of the winding portion cut-away portion is provided to form a obtuse angle A by the driving force receiving surface side corner portion 1974*k* of the winding portion cut-away portion on the inner peripheral side of the flange member 1870 relative to the axis of the flange member 1970 (as shown in FIG. 111). In addition, as shown in FIG. 111, an arc shape is arranged on the driving force receiving surface side corner portion 1974*k*.

By using the structure of this embodiment, the effects of the Embodiments 15 and 16 can be provided in combination. A larger driving force can be applied to the engaging portion (driving force receiving portion) and the resin portion 1839, and the main assembly driving shaft 101 can be repeatedly rotated and stopped more times.

Embodiment 18

Embodiment 18 will be described. Elements having the same or corresponding structures and functions as those of Embodiment 6 are assigned the same reference numerals, and detailed description thereof is omitted.

In Embodiment 6, the dismounting operation of the coupling member 628 from the main assembly driving shaft 101 has been described Referring to FIG. 68.

As described above, in Embodiment 6, the coupling member 628 is removed from the main assembly driving shaft 101 by the following operation.

When the rotation drive of the main assembly driving shaft 101 is stopped, the driving force receiving surface 673*a* and the main assembly drive transmission surface 101*b* are in contact with each other. In this state, a part of the engagement portion 673 is in the main assembly drive transmission groove 101*a* (shown in part (a) of FIG. 68).

When the cartridge door 104 is opened, the lower front side cartridge guide 109 lowers, and the drum unit bearing member 39L separates from the front side cartridge positioning portion 110 of the image forming apparatus main assembly 100A. At this time, the coupling member 628 and the main assembly driving shaft 101 are inclined by about 0.5 to 2 degrees with respect to the mounting complete state (Z direction) (shown in part (b) of FIG. 68).

When the cartridge 7 is started to be removed from the image forming apparatus main assembly 100A, the dismounting tapered surface 673*e* of the engaging portion 673 abuts against the main assembly side dismounting taper 101*i*. When the dismounting tapered surface 673*e* abuts against the main assembly side dismounting taper 101*i*, the base portion 674 begins to elastically deform and moves the engaging portion 673 radially outward along the main assembly side dismounting taper 101*i* (part (c) of FIG. 68).

Further, when the coupling member 628 is pulled out of the main assembly driving shaft 101, the state becomes the same as in part (a) of FIG. 65, in which the base portion 674 further elastically deforms, and the engagement portion 673 is inserted into the shaft portion 101*f* of the main assembly driving shaft 101. By moving the engaging portion 673 to the outer diameter surface of the shaft portion 101*f*, the coupling member 628 can be removed from the main assembly driving shaft 101 as shown in part (d) of FIG. 68.

Further, when the coupling member 628 is removed from the main assembly driving shaft 101, as shown in part (e) of FIG. 68, the elastic deformation of the base portion 674 is released and the position of the engagement portion 673 returns to the position before the elastic deformation.

By the above-described operation, in Embodiment 6, the coupling member 628 is removed from the main assembly driving shaft 101.

Further, in the Embodiment 6, as described above, the root portion 674*a* is disposed in the upstream side of a straight line drawn from the inner diameter end 673*b* of the driving force receiving surface 673*a* in a direction perpendicular to the driving force receiving surface 673*a*, with respect to the rotational direction of the flange member 670 (FIG. 67), as viewed in the Z direction. By this, when the main assembly driving force receiving surface 101*b* of the main assembly driving shaft 101 and the driving force receiving surface 673*a* of the engaging portion 673 contact with each other to rotate, the base portion 674 is retracted, and the winding portion 674*b* is wound on the shaft portion 101*f*.

Even when the rotation of the main assembly driving shaft 101 is stopped in this winding state, the contact between the driving force receiving surface 101*b* and the driving force receiving surface 673*a* is maintained, so that the winding portion 674*b* remain said winding on the shaft portion 101*f*.

Further, as described above, in Embodiment 6, the driving force receiving surface 673*a* is twisted around the center of the rotation axis of the flange member 670. The twisting direction is such that the outside of the driving force surface 673*a* (downstream side in the Z1 direction) with respect to the photosensitive drum unit 30 is in an upstream side of the inside (downstream side in the Z2 direction) with respect to the rotational direction of the photosensitive drum 1.

The driving force receiving surface 673*a* is disposed in such a direction that the dismounting operation is hindered, because in the above-described state, when an attempt is made to dismount the coupling member 628 from the main assembly driving shaft 101, the outside (the Z1 direction side) of the driving force receiving surface 673*a* is disposed on the upstream side of the inside (downstream in the Z2 direction side) with respect to the rotational direction.

Thus, if the coupling member 628 is pulled out of the main driving shaft 101 in the dismounting operation of the Embodiment 6, the dismounting load is larger than the insertion load.

On the other hand, in this embodiment, the main driving shaft 101 is rotated in the reverse direction after the rotation of the main assembly driving shaft 101 is stopped and before the start of the dismounting of the cartridge 7 from the image forming apparatus main assembly 100A. By doing so, the winding portion 674*b* releases the state of being wrapped on the shaft portion 101*f*, and therefore, when the cartridge 7 is removed from the image forming apparatus main assembly 100A, the dismounting load can be reduced.

As a reverse rotation method, in interrelation with the opening operation of the cartridge door 104, the main assembly driving shaft 101 may be reversely rotated by a link mechanism or the like, or the motor of the drive source of the main assembly driving shaft 101 may be reversely rotated.

The same effect can be obtained not only by Embodiment 6 but also by Embodiments 1-19, by employing the structure of reversely rotating the main assembly driving shaft 101 at the dismounting operation.

Embodiment 19

Referring to FIGS. 112 to 115, 120 and 121, another embodiment will be described. First, a mounting structure for mounting the cartridge 7 to the image forming apparatus main assembly 100A will be described. Elements corresponding to those in the above-described embodiment are assigned the same names, and explanation of the same points as the above-described elements may be omitted in some cases. The description will be made mainly about the differences from the abovementioned elements.

Figure 112:
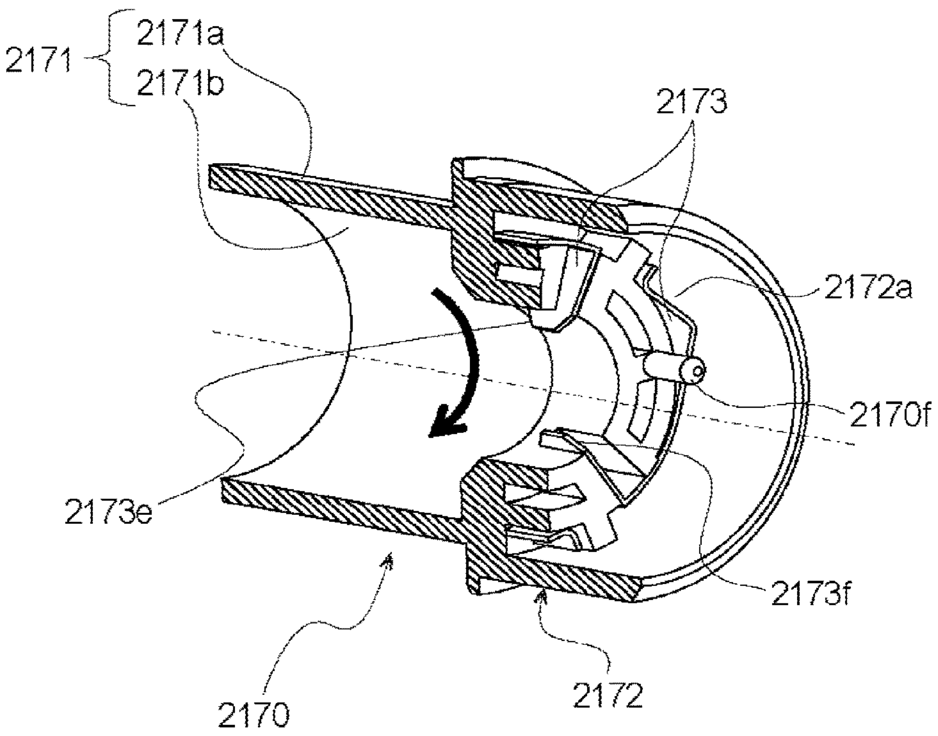
FIG. 112 is a cross-sectional perspective view of a flange member 2170 and an engaging member 2173 according to Embodiment 19.

FIG. 112 is a cross-sectional perspective view of a flange member 2170 and an engaging member 2173.

Figure 113:
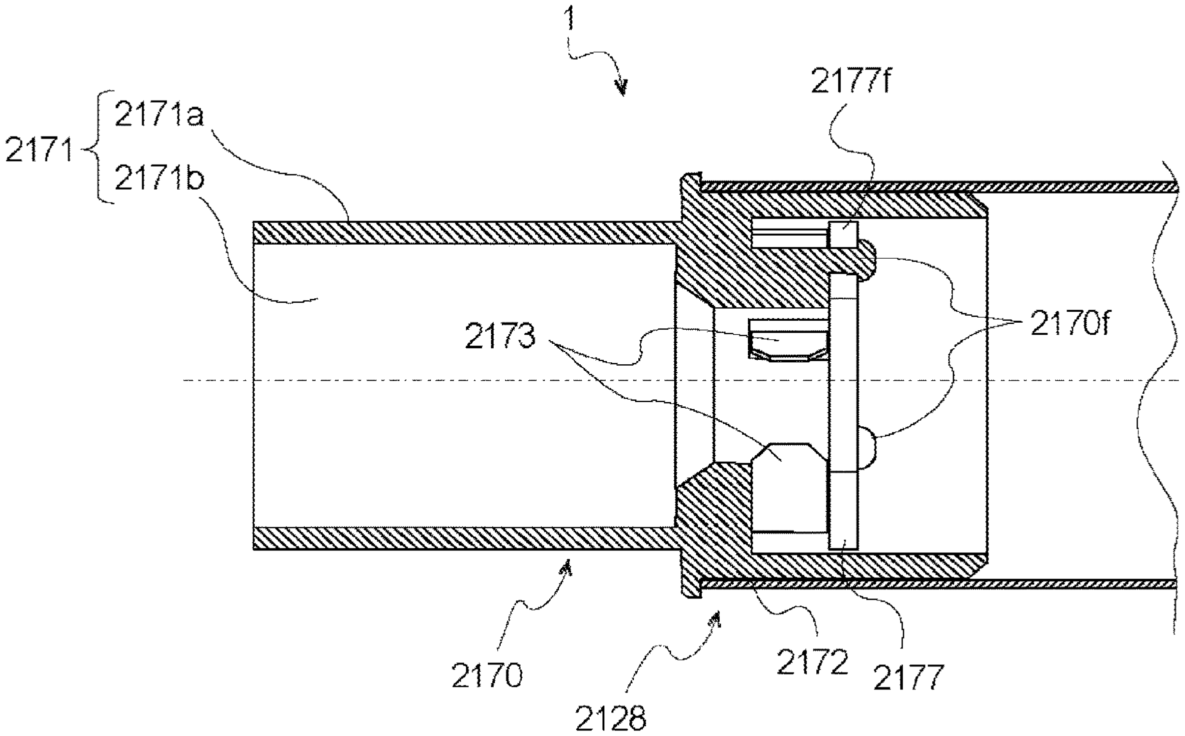
FIG. 113 is a sectional view of a coupling member 2128 according to Embodiment 19.

FIG. 113 is a cross-sectional view of the coupling member 2128.

Figure 114:
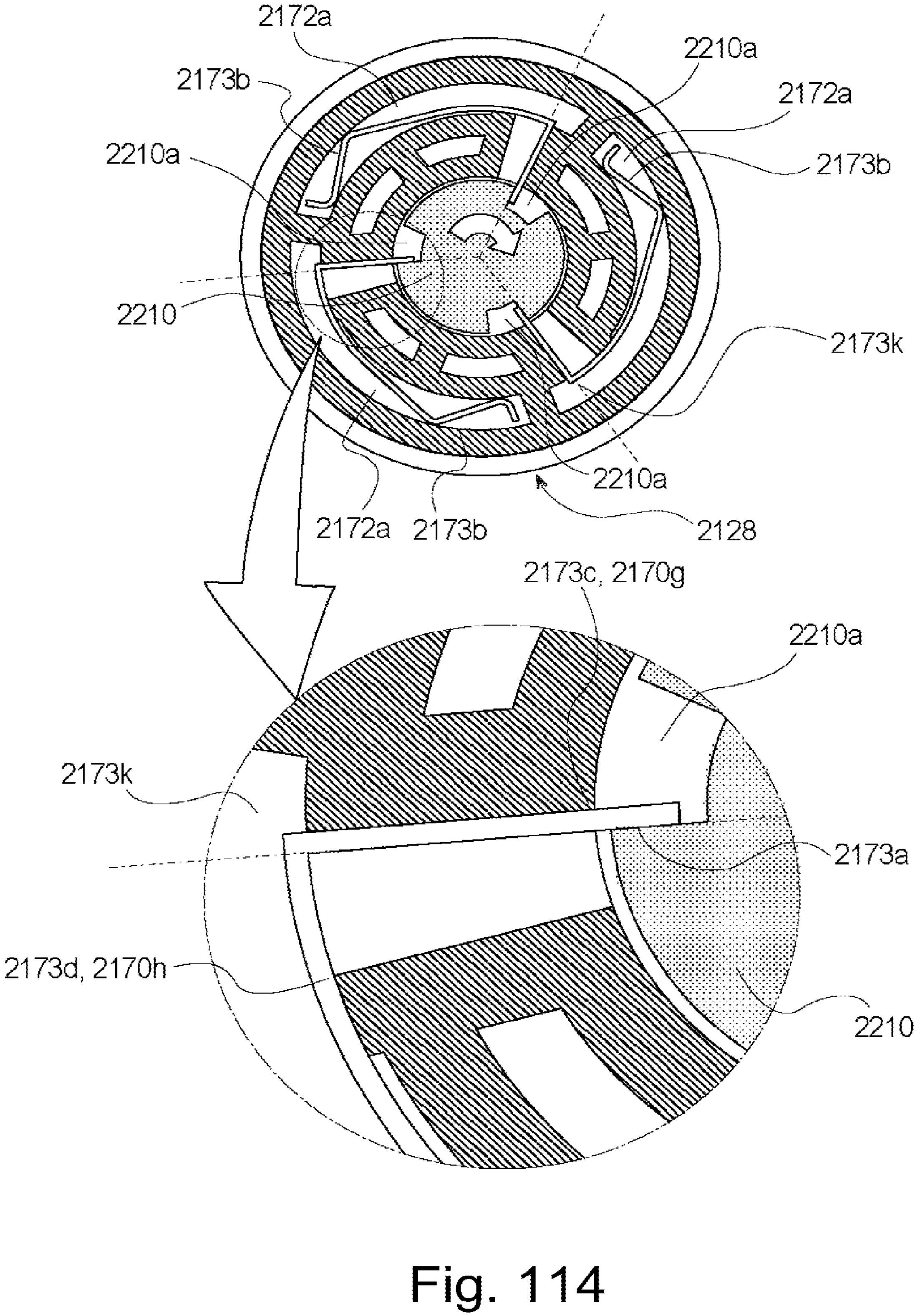
FIG. 114 in an illustration of the coupling member 2128 and the main assembly driving shaft 2101 according to Embodiment 19 as viewed from the back side in the Z direction.

FIG. 114 is a cross-sectional view of the coupling member 2128 when a drive receiving portion 2173*a* is driven by a main assembly driving shaft 2210.

Figure 115:
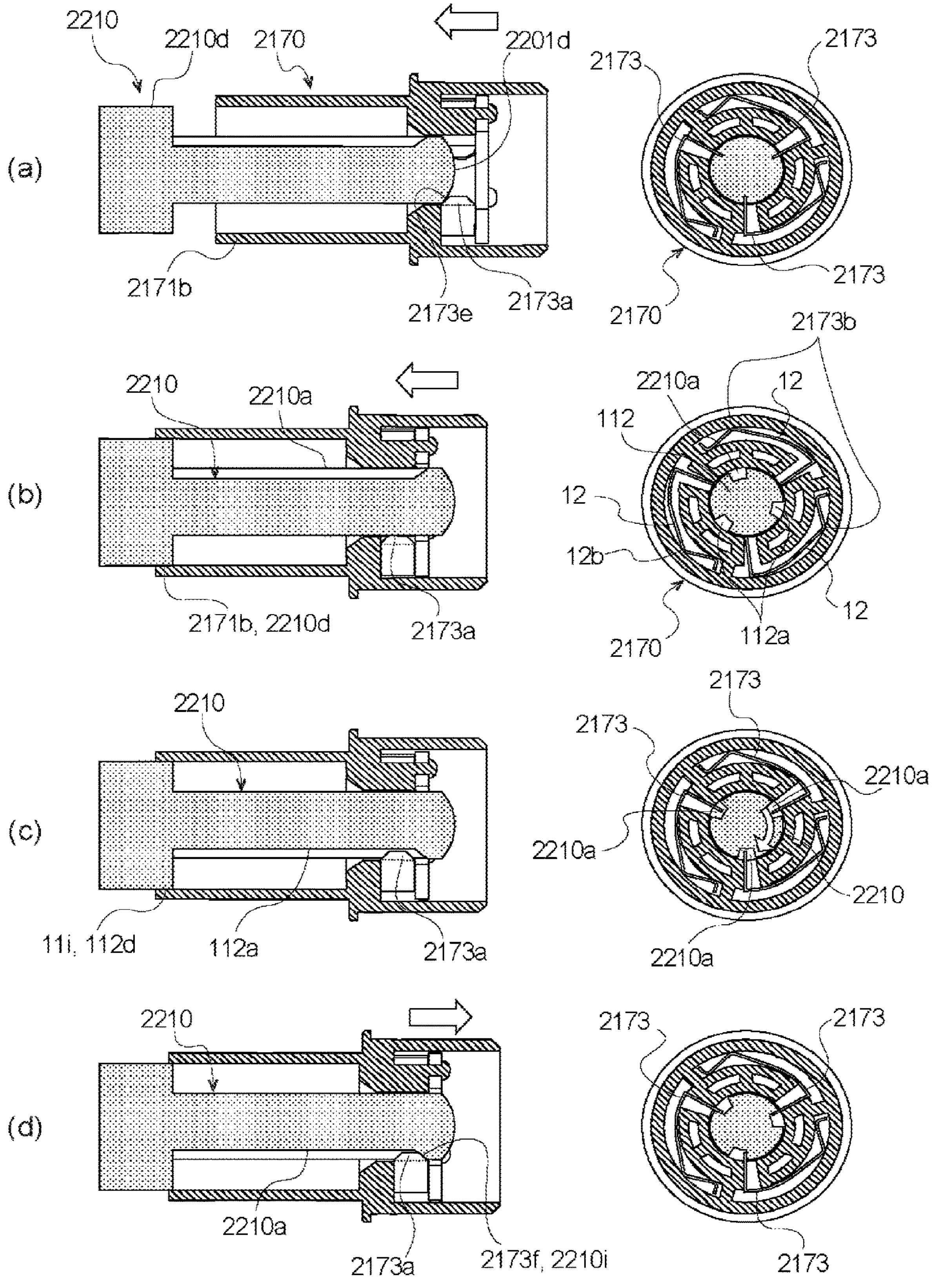
FIG. 115 is sectional views illustrating the mounting operation of the coupling member 2128 to the main assembly driving shaft 2110 according to Embodiment 19.

FIG. 115 is sectional views illustrating an operation of the coupling member 2128 mounted to the main assembly driving shaft 2210 when phases of the driving force receiving portion (driving force receiving surface) 2173*a* and a drive transmission groove 2210*a* are not aligned with each other.

Figure 120:
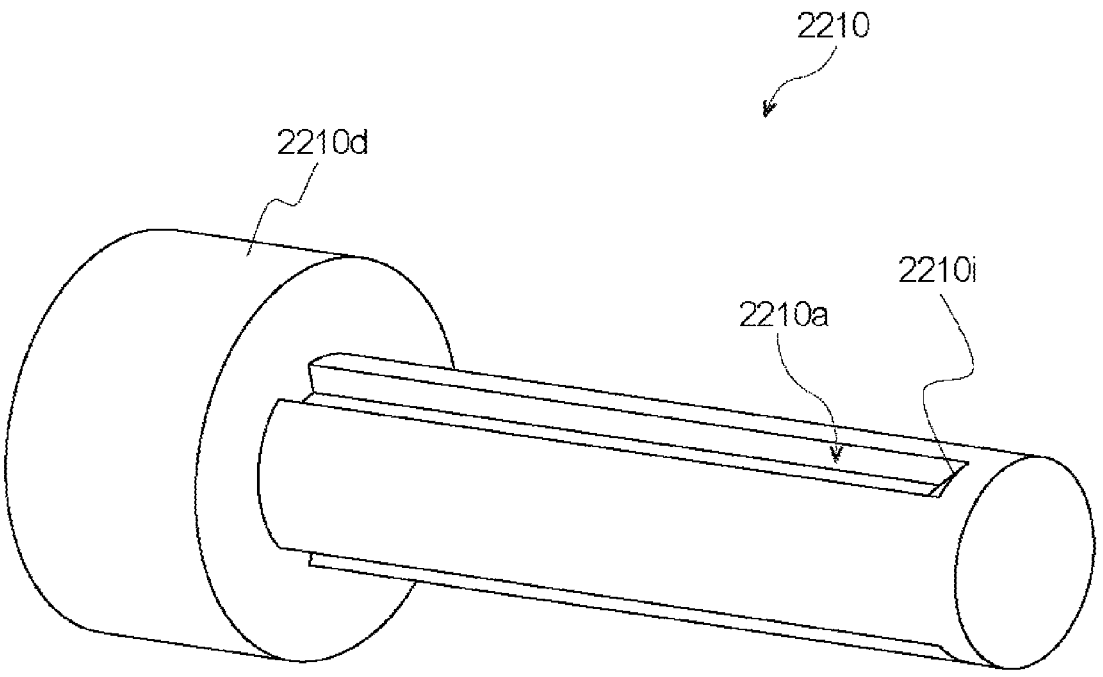

FIG. 120 is a perspective view illustrating a shape of the main assembly driving shaft 2210.

Figure 121:
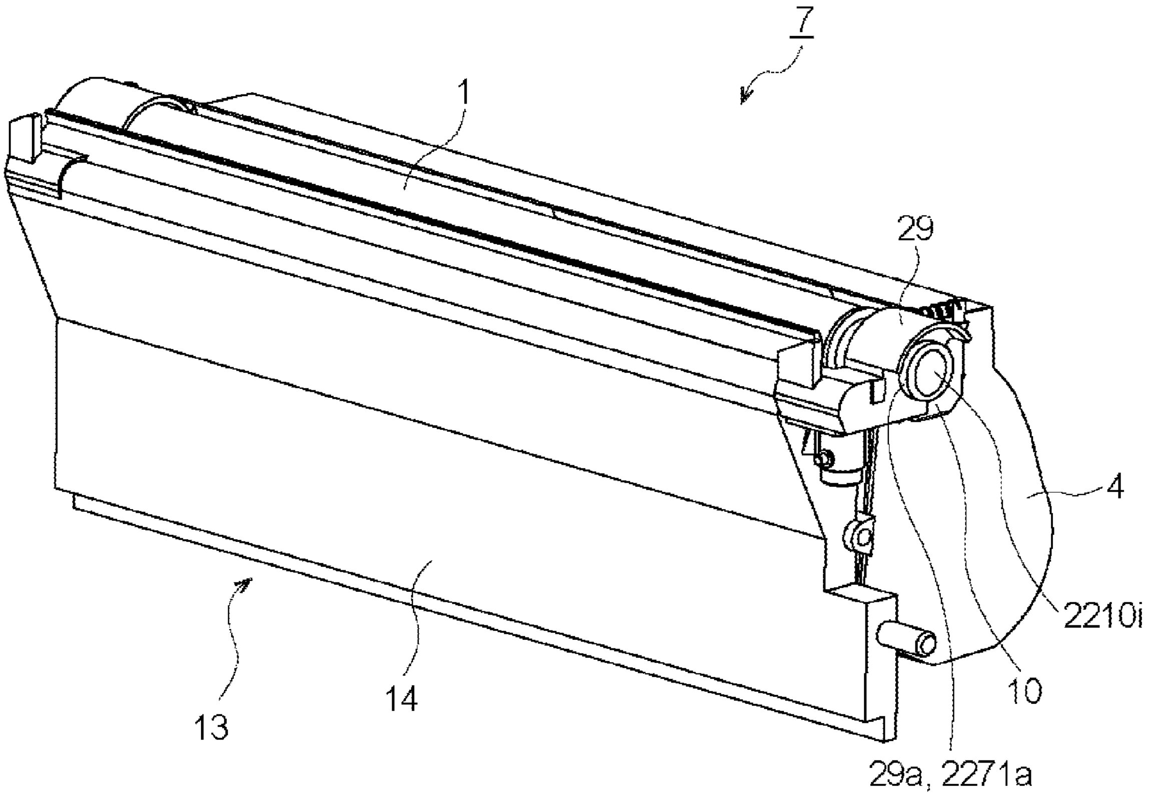

FIG. 121 is a perspective view illustrating a shape of the cartridge 7.

[Structure of Coupling Member and Main Assembly Driving Shaft]

Referring to FIGS. 112, 113, 114, and 120, the structures of the coupling member and the main assembly driving shaft will be described.

A coupling member 2128 is mounted to the free end side with respect to the inserting direction of the cartridge 7 of the photosensitive drum 1, and a main assembly driving shaft 2210 is placed in a position corresponding to the coupling member 2128 of the image forming apparatus main assembly 100A.

As shown in FIG. 113, the coupling member 2128 includes a flange member 2170 mounted to the photosensitive drum 1 and an engaging member (driving force receiving member) 2173 driven by the main assembly driving shaft 2210. Further, the coupling member 2128 has a retaining member 2177 for restricting movement of the engaging member 2173 in the axial direction of the photosensitive drum 1.

As shown in FIG. 112, the flange member 2170 includes a mounting portion 2172 mounted to the inner periphery of the photosensitive drum 1, a cylindrical portion 2171 protruding from the mounting portion 2172, a groove-shaped engagement member mounting portion 2172*a* for mounting the engagement member 2173.

The engaging member 2173 is a driving force receiving member provided with a driving force receiving portion on the surface thereof. As will be described in detail hereinafter, it is also a supporting portion that supports the driving force receiving portion 2173*a* so as to be movable at least in the radial direction of the coupling member.

The flange member 2170 is a driving force receiving member to receive the driving force from the engaging member 2173. In this embodiment, the flange member 2170 is fixed to the inner periphery of the photosensitive drum 1, and the driving force is transmitted from the flange member 2170 to the photosensitive drum 1.

There is a gap between the engagement member 2173 and the flange member 2170, and the engagement portion 2173 is configured to be movable in the radial direction and the circumferential direction within a certain range with respect to the flange member 2170.

The outer peripheral surface 2171*a* of the cylindrical portion 2171 is used as a sliding surface rotatably supported by the bearing portion 29*a* of the bearing member 29 mounted to the cleaning frame 14 of the cleaning unit 13. The inner peripheral surface 2171*b* of the cylindrical portion 2171 is used as a supporting portion for supporting the main assembly driving shaft 2210.

As for the engaging member 2173, a sheet metal member (plate-like metal) having resiliency (elasticity) these used. That is, the engaging member 2173 is a metal plate-like portion, and in other words, it is a leaf spring.

As shown in FIG. 114, the engaging member 2173 has a driving force receiving portion 2173*a* which is in contact with a driving transmission groove 2210*a* having a groove shape provided on the main assembly driving shaft 2210 and receives a driving force (rotational force). The engaging member 2173 is mounted to the flange member 2170 such that the driving force receiving portion 2173*a* is movable in the radial direction and the rotational direction of the photosensitive drum. In this embodiment, as shown in FIG. 114, the root portion 2173*b* of the engagement member 2173 is assembled to the engagement member mounting portion 2172*a* which is the groove shape portion of the flange member 2170 using spring properties. As a result, the engaging member 2173 is mounted to the flange member 2170 so that the driving force receiving portion 2173*a* is movable in the radial direction and the rotational direction of the photosensitive drum 1. That is, the root portion 2173*b* is a supported portion (mounted portion) supported by the mounting portion 2172*a* of the flange member 2170.

The engaging member 2173 has a bent portion 2173*k* bent at an angle of about 90 degrees. A driving force receiving portion 2173*a* is provided at a portion (first portion) in a free end side of the engaging member 2 with respect to the bent portion 2173*k*173. On the other hand, a root portion 2173*b* is provided at a portion in a rear end side of the engaging member 2173 (a second portion of the engaging member) with respect to the bent portion 2173*k*. A length of the second portion is longer than a length of the first portion.

The first portion and the second portion of the engaging member 2173 extend in mutually different directions. That is, the directions in which the first portion and the second portion extend crosses with each other. The first portion of the engaging member 2173 extends from the bent portion 2173*k* at least inward with respect to the radial direction. In other words, the first portion of the engagement member 2173 is a protrusion protruding at least radially inward.

On the other hand, the second portion of the engaging member 2173 extends from the bent portion 2173*k* at least in the circumferential direction of the coupling member (more specifically, the upstream side in the rotational direction). The second portion of the engaging member 2173 is a extending portion extending in a direction different from the protruding direction of the first portion of the engaging member 2173 and also a portion supporting the first portion of the engaging member 2173. As will be described in detail hereinafter, the second portion of the engaging member 2773 is a elastically deformable portion, and the first portion of the engaging member 2173 is movable at least diametrically of the coupling member by the deformation of the second portion.

As shown in FIG. 113, the retaining member 2177 is fixed to the flange member 2170 so as to sandwich the engaging member 2173 between the flange member 2170 and the retaining member 2177, so that the movement of the engaging member 2173 in the direction of the axis of the photosensitive drum 1.

In this embodiment, thermal clamping was used as fixing means (fixing method) for fixing the retaining member 2177 to the flange member 2170. more particularly, a clamping boss 2170*f* of the flange member 2170 is penetrated through the clamping hole 2177*f* of the disengagement prevention member 2177, the free end of the clamping boss 2170*f* is thermally clamped to fix the flange member 2170 and the stopper member 2177. However, other means such as welding, press fitting, snap fitting and the like may be used as a fixing method.

As shown in FIG. 114, the engaging member 2173 is provided with a first abutment portion 2173*c* and a second abutment portion 2173*d*. The first abutment portion 2173*c* is disposed in the upstream side with respect to the rotational direction from the driving force receiving portion 2173*a* and in the outer side with respect to the radial direction. The second abutment portion 2173*d* is formed on a surface (opposite surface) different from the surface on which the first abutment portion 2173*c* and the driving force receiving portion 2173*a* are provided. The second abutting surface 2173*d* is disposed further radially outward than the first abutment portion 2173*c*.

Further, the flange member 2170 is provided with a first wall surface portion 2170*g* and a second wall surface portion 2170*h* that are in contact with the first contact portion 2173*c* and the second contact portion 2173*d*, respectively, when the driving force receiving portion 2173*a* is driven.

The first wall surface portion 2170*g* is a receiving portion (a surface to receive) to which the driving force is transmitted from the engaging member 2173. The first wall surface portion 2170*g* is disposed radially outward of the driving force receiving portion 2173*a*.

As shown in FIG. 120, the main assembly driving shaft 2210 has a drive transmission groove 2210*a* and a supported portion 2210*d*. The drive transmission groove 2210*a* has a portion of a groove shape (recess shape) corresponding to the driving force receiving portion 2173*a*, the groove shape portion being provided on the outer peripheral surface of the main assembly driving shaft 2210. The supported portion 2210*d* is a portion supported by the inner peripheral surface 2171*b* of the flange member 2170.

[Mounting of Coupling Member to Main Assembly Drive Shaft]

Referring to FIGS. 114 and 115, the mounting of the coupling member 2128 to the main assembly driving shaft 2210 will be described.

First, the cartridge 7 is inserted in the direction of the arrow, until a mounting tapered surface (chamfered shape) 2173*e* provided on the upstream side in the inserting direction of the driving force receiving portion 2173*a*, and a spherical shape (semispherical shape 2201*d*) at the free end of the main assembly driving shaft 2210 contact to each other (part (a) of FIG. 115).

Further, when the cartridge 7 is inserted in the direction of the arrow, the engaging member 2173 deforms so that the mounting tapered surface 2173*e* follows the semispherical shape 2201*c* at the free end with the root portion 2173*b* as a fulcrum, using the spring property. The engaging member 2173 is deformed such that the driving force receiving portion 2173*a* moves outward in the radial direction of the photosensitive drum 1.

As shown in part (b) of FIG. 115, by supporting the supported portion 2201*d* with the support portion (inner peripheral portion 2171*b*) of the flange member (cylindrical portion 2171), the coupling member 2128 can be inserted to the mounting completion position relative to the main assembly driving shaft 2210.

Thereafter, as shown in part (c) of FIG. 115, as the main assembly driving shaft 2210 rotates, the drive transmission groove 2210*a* and the drive force receiving portion 2173*a* comes to have the same phases. At this time, the state in which the engaging member 2173 is deformed radially outward of the flange member 2170 in part (b) of FIG. 115 is released, and the driving force receiving portion 2173*a* enters the drive transmission groove 2210*a*.

Thereafter, as shown in FIG. 114, the drive transmission groove 2210*a* is brought into contact with the driving force receiving portion 2173*a*. As a result, the rotational drive is transmitted from the main assembly driving shaft 2210 to the coupling member 2128, and the photosensitive drum 1 can be rotated. At this time, first, the engaging member 2173 moves by the driving force of the main assembly driving shaft 2210 until the first abutment portion 2173*c* is contacted to the first wall surface portion 2170*g*. When the first abutment portion 2173*c* abuts against the first wall surface portion 2170*g*, the engaging member 2173 produces a rotational moment with the first abutment portion 2173*c* as a fulcrum by the driving force received by the driving force receiving portion 2173*a*. However, as the second abutment portion 2173*d* and the second wall surface portion 2170*h* abut to each other, the deformation of the engaging member 2173 is suppressed. As a result, the driving force received by the driving force receiving portion 2173*a* can be stably transmitted to the photosensitive drum 1.

Next, the mounting when the driving force receiving portion 2173*a* and the drive transmission groove 2210*a* are in phase alignment with each other will be described. First, the cartridge 7 is mounted in the direction of the arrow, and similarly to part (a) of FIG. 115, the mounting taper surface 2173*e* provided on the upstream side in the inserting direction of the driving force receiving portion 2173*a*, and the semispherical shape 2201*c* at the tip of the main assembly driving shaft 2210 are brought into contact with each other.

Thereafter, when the cartridge 7 is further inserted in the direction of the arrow, the engaging member 2173 deforms so that the driving force receiving portion 2173*a* moves radially outward of the flange member 2170 by the resiliency thereof. Then, the coupling member 2128 is inserted to the mounting completion position of the main assembly driving shaft 2210. At this time, since the phases of the driving force receiving portion 2173*a* and the drive transmission groove 2210*a* match each other, the deformation of the engaging member 2173 is released, and the main assembly driving shaft 2210 does not rotate, and the state of part (c) of FIG. 115 is established. After the state shown in part (c) of FIG. 115 is reached, the state is the same as when the phases of the driving force receiving portion 2173*a* and the drive transmission groove 2210*a* are not aligned with each other.

In the foregoing, the description of the operation of the coupling member 2128 in the process of mounting to the main assembly driving shaft 2210 has been made.

[Release of Coupling Member from Main Assembly Driving Shaft]

As shown in part (d) of FIG. 115, a dismounting tapered surface (chamfered shape) 2173*f* is provided on the downstream side of the driving force receiving portion 2173*a* in the inserting direction thereof, and a main assembly side dismounting taper (chamfered shape) 2210*i* Is provided on the free end side of the drive transmission groove 2210*a* of the main driving shaft 2210. By this, as the cartridge 7 is pulled out in the direction of the arrow, the dismounting tapered surface 2173*f* and the main assembly side dismounting taper 2210*i* are brought into contact to each other. When the cartridge 7 is further pulled in the direction of the arrow, the engaging member 2173 deforms so that the mounting tapered surface 2173*e* follows the main assembly side dismounting taper 2210*i* by utilizing the resiliency thereof with the root portion 2173*b* as a fulcrum. The engaging member 2173 is deformed such that the driving force receiving portion 2173*a* moves outward in the radial direction of the photosensitive drum 1. When the cartridge 7 is pulled out further in the direction of the arrow, the main assembly driving shaft 2210 and the engaging member 2173 become out of contact from each other, and the deformed state of the engaging member 2173 is released, so that the driving force receiving portion 2173*a* restores the initial position.

As described above, by moving the driving force receiving portion 2173*a* radially outward, the mounting and dismounting and the drive transmission can be carried out without using a mechanism four retracting the main assembly driving shaft 2210 in the axial direction.

Regarding the thickness of the engaging member 2173, it is preferable to satisfy the following condition. In order for the engaging member 2173 to stably receive the driving force, it is desirable that the engaging member 2173 has a portion having a thickness of 0.1 mm or more, more preferably 0.2 mm or more. In particular, it is desirable that the neighborhood of the portion where the driving force receiving portion 2173*a* is provided (the first portion of the engaging member 2173) has the above-mentioned thickness.

In order to smoothly deform the engaging member 2173 when the coupling member 2128 is coupled to and uncoupled from the main assembly driving shaft 2210, it is preferable that the engaging member 2173 has an portion having a diameter of 0.7 mm or less, more preferably 0.5 mm or less. In particular, it is preferable that the thickness in the neighborhood (the second portion of the engaging member 2173) of the root portion 2173*b* where the engaging member 2173 is deformed is in the above-described range.

It is not necessary that the thickness of the engaging member 2173 is constant, and the thickness may be changed between the portion receiving the driving force and the deforming portion.

In the case where the engaging member 2173 is formed to have a constant thickness, it is desirable that both the upper limit and the lower limit of the preferable thickness described above are satisfied.

Embodiment 20

Figure 116:
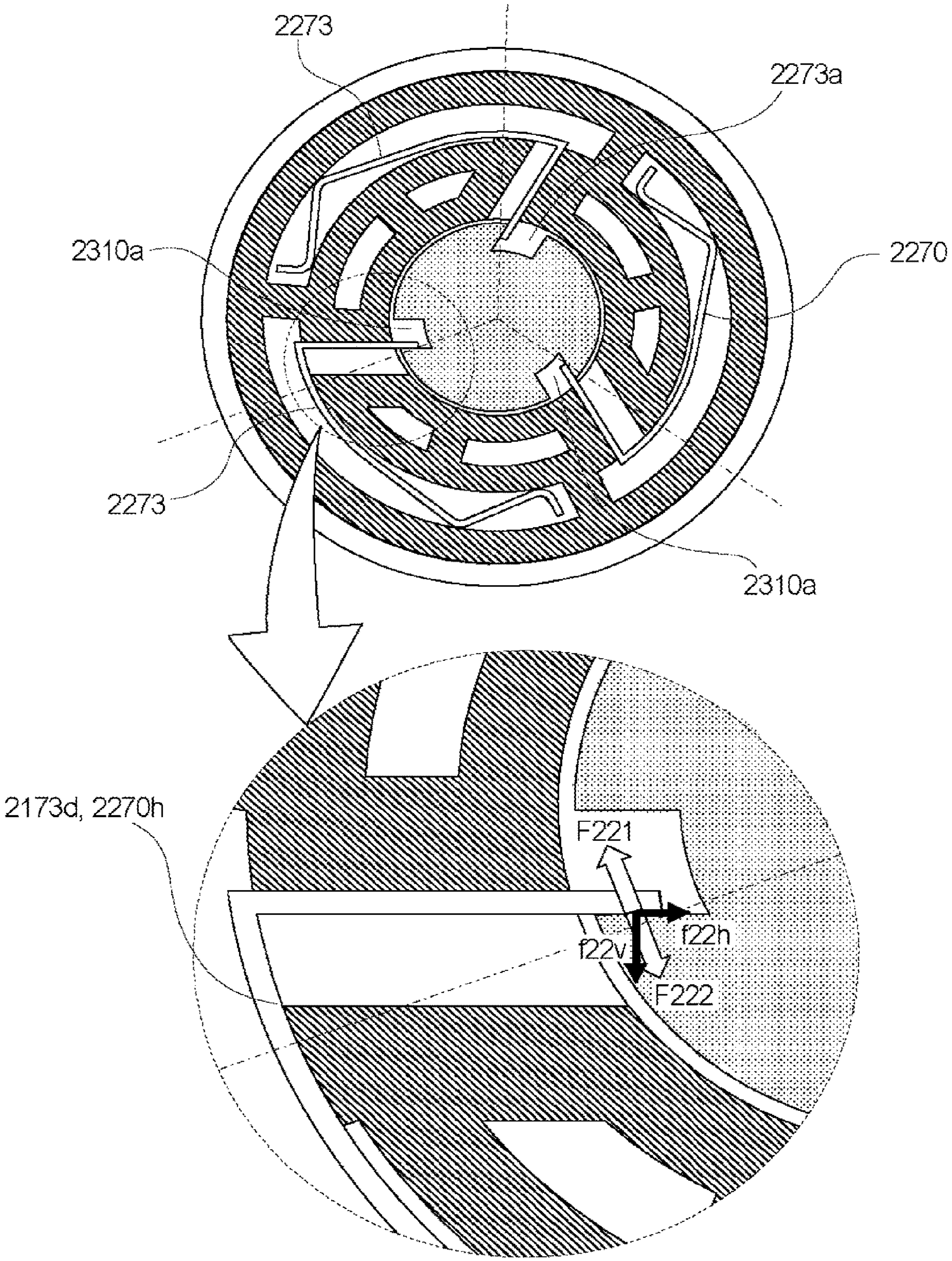
FIG. 116 in an illustration of the coupling member 2228 and the main assembly driving shaft 2101 according to the Embodiment 20 as viewed from the back side in the Z direction.

Referring to FIG. 116, a cartridge and a electrophotographic image forming apparatus according to this embodiment will be described. Elements corresponding to those in the above-described embodiment are assigned the same names, and explanation of the same points as the above-described elements may be omitted in some cases. The description will be made mainly about the differences from the abovementioned elements.

In Embodiment 19, the driving force receiving portion 2173*a* is arranged as follows. That is, as shown in FIG. 114, when a straight line (broken line in FIG. 114) is drawn along the surface of the driving force receiving portion 2173*a* in the cross section perpendicular to the axis of the photosensitive drum 1, such a line passes through the axis (center) of the photosensitive drum 1.

That is, the first portion provided with the driving force receiving portion 2173*a* extends substantially along the radial direction of the flange member. In other words, the first portion of the sheet metal member 213 provided with the driving force receiving portion 2173*a* extends in a direction substantially perpendicular to the circumference.

On the other hand, in this embodiment, as shown in FIG. 116, the radially outer side of the driving force receiving portion 2273*a* is disposed on the downstream side of the radially inner side with respect to the rotational direction. That is, in the engaging member 2273 of this embodiment, the extending direction of the driving force receiving portion 2273*a* is inclined relative to the radial direction.

Furthermore, the drive transmission groove 2310*a* of the main assembly drive transmission shaft 2310 has a shape corresponding to the drive force receiving portion 2273*a*. The drive transmission groove 2310*a* is inclined relative to the radial direction.

By this, when the driving force F221 is applied to the driving force receiving portion 2173*a* from the main assembly driving shaft 2310, the driving force receiving portion 2273*a* produces a reaction force F222. The reaction force F222 includes a component F22v in a direction perpendicular to a component F22h which is in the direction parallel to the driving force receiving portion 2273*a*. Of this component forces, the component F22h is to pull driving force receiving portion 2273*a* inwardly.

As a result, the second abutment portion 2273*d* of the engaging member 2273 can stably abut against the second wall surface portion 2270*h* of the flange member 2270. As a result, it is possible to stably drive the photosensitive drum 1.

Embodiment 21

Figure 118:
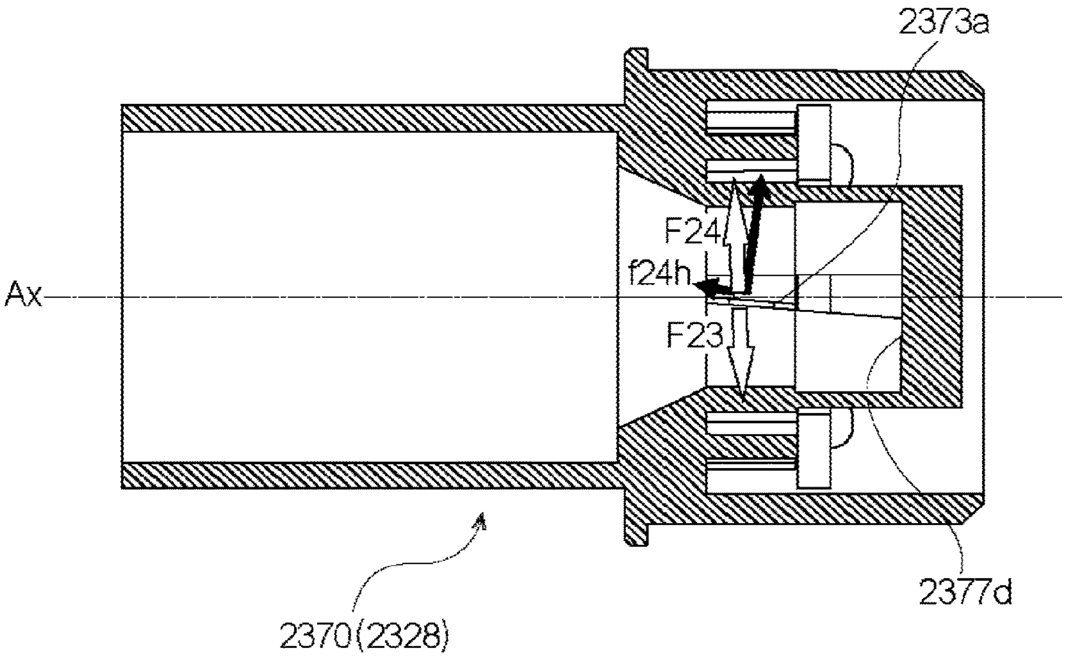
Figure 119:
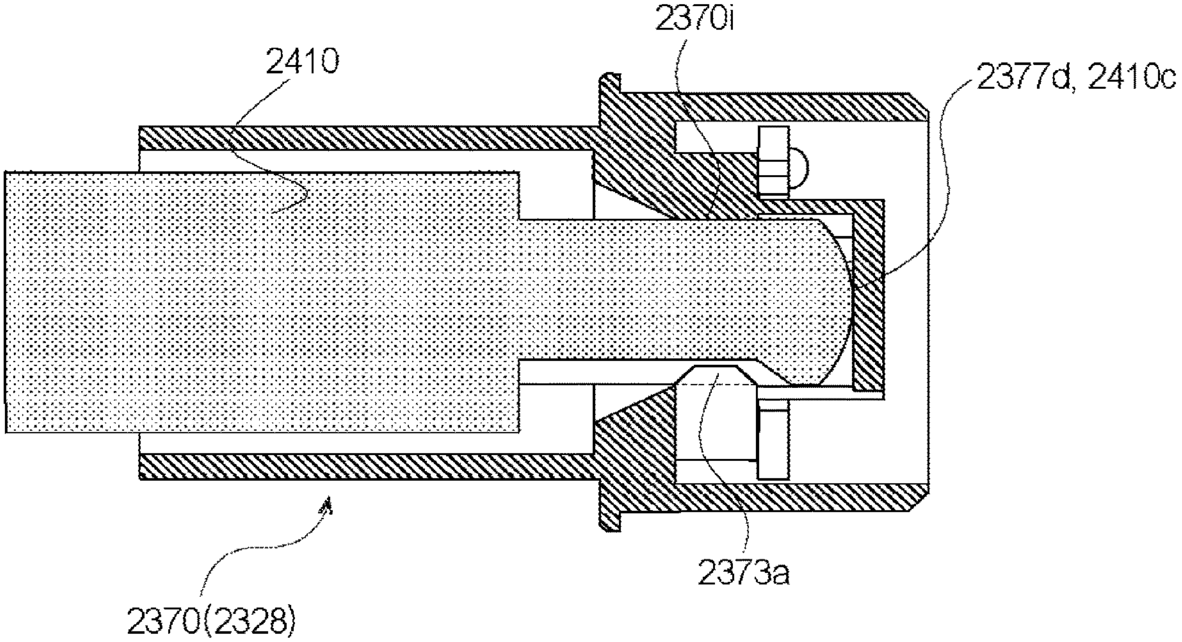

Referring to FIGS. 118, 119 and 120, a cartridge and an electrophotographic image forming apparatus will be described. Elements corresponding to those in Embodiment 19 are assigned the same names, and the description of the same points as the above-described elements may be omitted in some cases. The description will be made mainly about the differences from the abovementioned elements.

Figure 117:
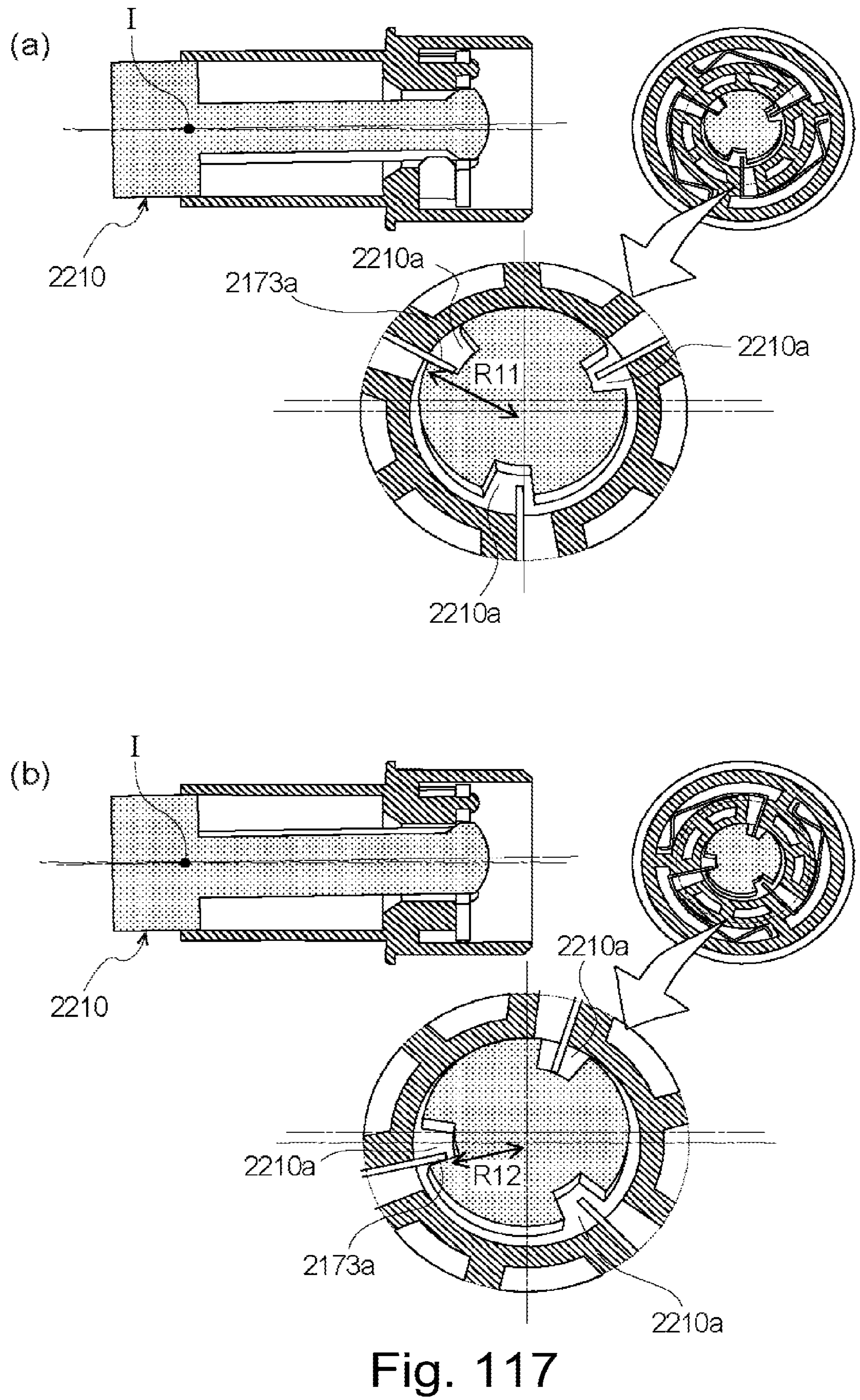
FIG. 117 is an illustration of drive transmission from the main assembly driving shaft to the coupling member not using the structure of the coupling member according to Embodiment 21.

In Embodiment 19, an inner peripheral surface 2171*b* is used for supporting a main assembly driving shaft 2210. With this structure, a cross section when the axis of the main assembly driving shaft 2210 and the photosensitive drum 1 become oblique is shown in FIG. 117. As shown in FIG. 117, when the axes are oblique, the intersection point therebetween is on a center point I of an area (supported portion) where the main assembly driving shaft 2210 is supported by the flange member.

FIG. 117 shows a cross section at the position of the driving force receiving portion 2173*a* when the axes of the main assembly driving shaft 2210 and the photosensitive drum 1 are inclined in this structure. The intersection of the two axes is on the center point I of the area where the main assembly driving shaft 2210 is supported by the flange member 2170. Therefore, in the driving force receiving portion 2373*a* which is apart from the center point I in the axial direction of the photosensitive drum 1, the rotation center of the main assembly driving shaft 2210 and the rotation center of the coupling 10 are deviated from each other. Therefore, the drive radius to be driven by the main assembly driving shaft 2210 varies depending on the phase of the main assembly driving shaft 2210, for example, as will be understood from R231, R232 shown in part (a) of FIG. 117 and part (b) of FIG. 117. By this, the rotation drive of the main assembly driving shaft 2210 is not transmitted to the photosensitive drum 1 in a stabilized manner.

Under the circumstances, in this embodiment, as shown in FIG. 118, a downstream side of the driving force receiving portion 2373*a* with respect to the mounting direction is disposed in an upstream side thereof with respect to the rotating direction of the photosensitive drum 1. Further, an abutting surface (abutment portion) 2377*d* that abuts to the downstream side of the driving force receiving portion 2373*a* with respect to the mounting direction is provided. The abutment surface 2377*d* is a portion that determines the position of the flange member 2370 with respect to the main assembly driving shaft 2210 by contacting to the main assembly driving shaft 2210.

Further, as shown in FIG. 119, a region where the main assembly driving shaft 2410 is supported by the support portion 2370*i* of the flange member 2370 is arranged in the same position as the driving force receiving surface 2373*a* in the axial direction of the photosensitive drum 1.

The description will be made as to the effect of the structure in which the downstream side of the driving force receiving portion 2373*a* with respect to the mounting direction of the driving force receiving portion 2373*a* is disposed in the upstream side thereof with respect to the rotational direction of the photosensitive drum 1, and the abutment surface 2377*d* is disposed in the downstream side with respect to the mounting direction.

As shown in FIG. 118, when the main assembly driving shaft 2410 transmits the driving force F23 to the driving force receiving portion 2373*a*, a reaction force F24 is produced in the driving force receiving portion 2373*a*. The driving force receiving portion 2373*a* is pulled toward the upstream side in the inserting direction by the horizontal direction component f24h of the reaction force F234a parallel with the driving force receiving portion 2373*a*. Since the engaging member 2373 is sandwiched between the flange member 2370 and the stopper member, the coupling member 2328 and the photosensitive drum 1 are integrally drawn toward the upstream side in the inserting direction. As shown in FIG. 119, the abutting surface 2377*d* moves until the abutting surface 2377*d* abuts against the semispherical shape 2410*c* of the free end portion of the main assembly driving shaft 2410. Thus, the position of the photosensitive drum 1 in the image forming apparatus main assembly 100A can be regulated.

Next, the description will be made as to the effect of placing the supporting portion **2370*i* supporting the main assembly driving shaft 2410 in the same position as the driving force receiving portion 2373*a* in the axial direction of the photosensitive drum 1**.

When the axis of the main assembly driving shaft 2410 is inclined with respect to the axis of the photosensitive drum 1, the main assembly driving shaft 2410 is inclined with the support portion **2370*i* as a fulcrum. In this case, if the supporting portion 2370*i* and the driving force receiving portion 2373*a* are close to each other, even if the main assembly driving shaft 2410 is tilted, the moving distance of the main assembly driving shaft 2410 with respect to the driving force receiving portion 2373*a* is reduced. That is, the influence on the engagement state (contact state) between the driving force receiving portion 2373*a* and the main assembly driving shaft 2410** is reduced.

This makes it possible to minimize the phenomenon-that the rotational radius of the driving force receiving portion **2373*a* differs depending on the phase of the main assembly side driving shaft as shown in FIG. 117**.

As described above, the driving of the main assembly driving shaft 2410 can be more stably transmitted to the photosensitive drum 1.

Embodiment 22

Referring to FIGS. 122 to 131, Embodiment 22 will be described.

In this embodiment, the coupling member is provided with a backup portion for restricting the movement of the driving force receiving surface (driving force receiving portion) **2473*a*** in the circumferential direction (rotational direction of the coupling member) of the coupling member.

Elements corresponding to those of the above-described embodiment (particularly, the Embodiment 1) are assigned by the same names, and descriptions of the similar points to those of the above-described elements may be omitted. The description will be made mainly about the differences from the abovementioned elements.

Figure 122:
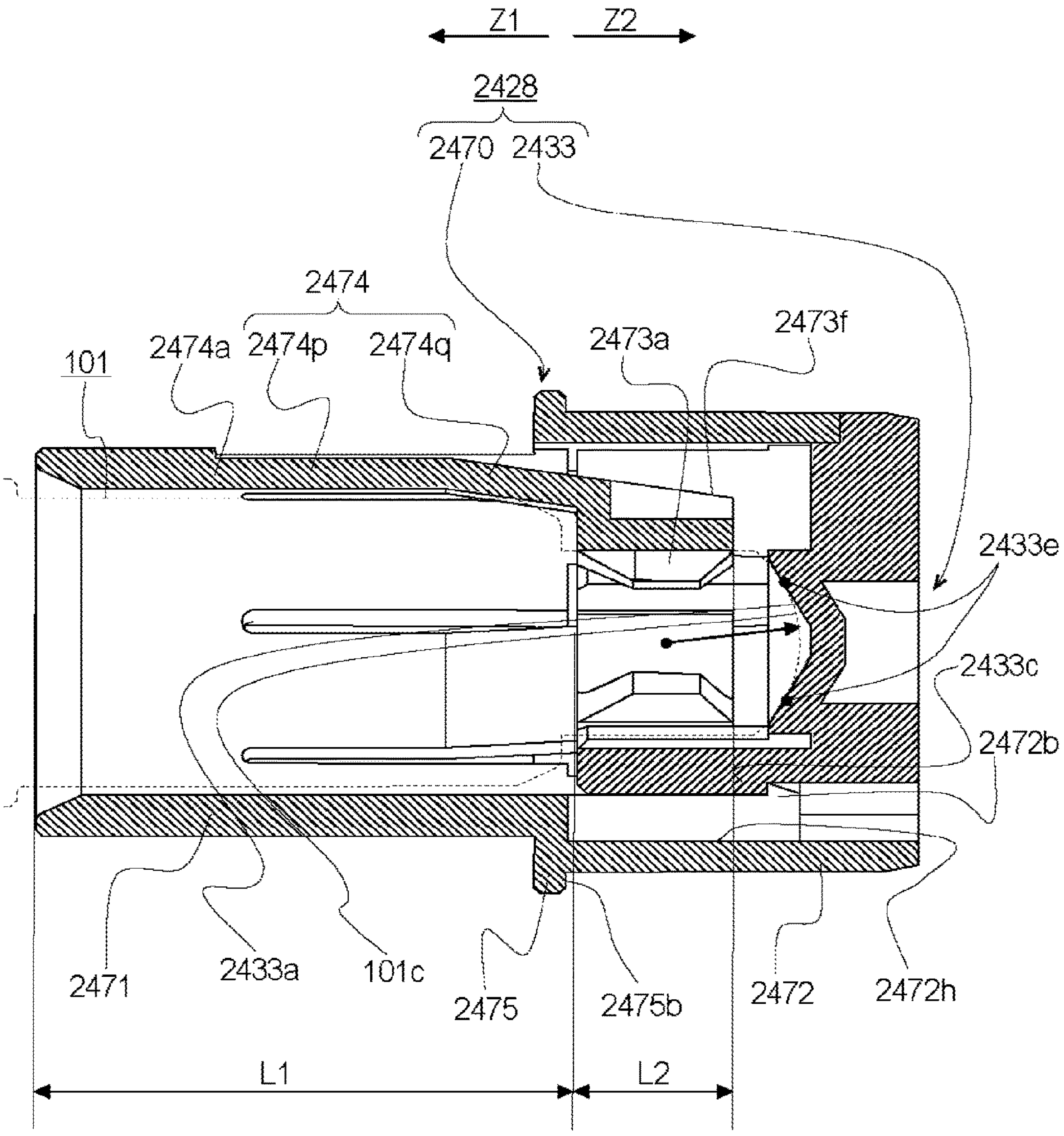

FIG. 122 is a cross-sectional view of the coupling member 2438 according to Embodiment 22.

Figure 123:
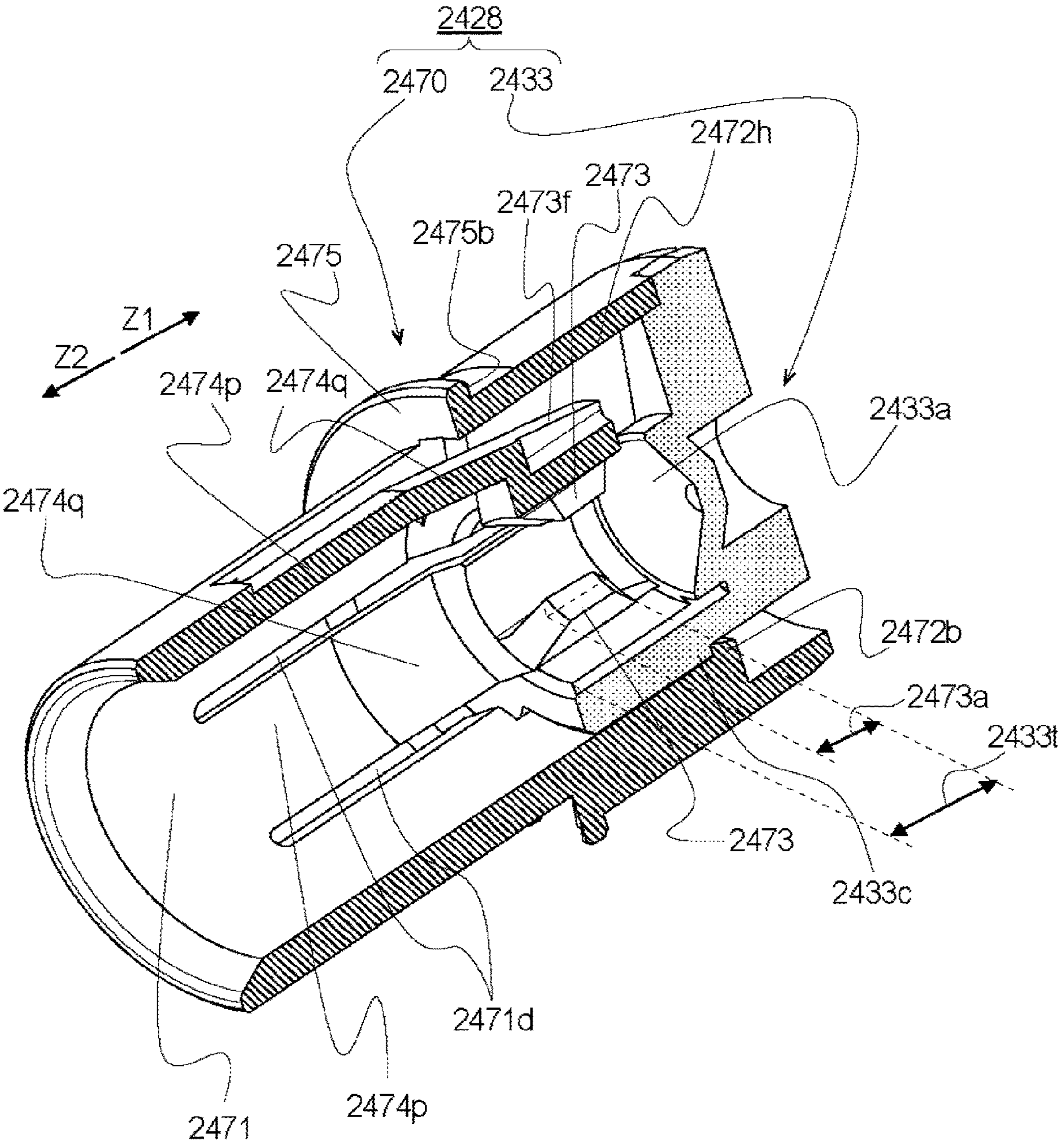

FIG. 123 is a cross-sectional perspective view of the coupling member 2428 according to Embodiment 22.

Figure 124:
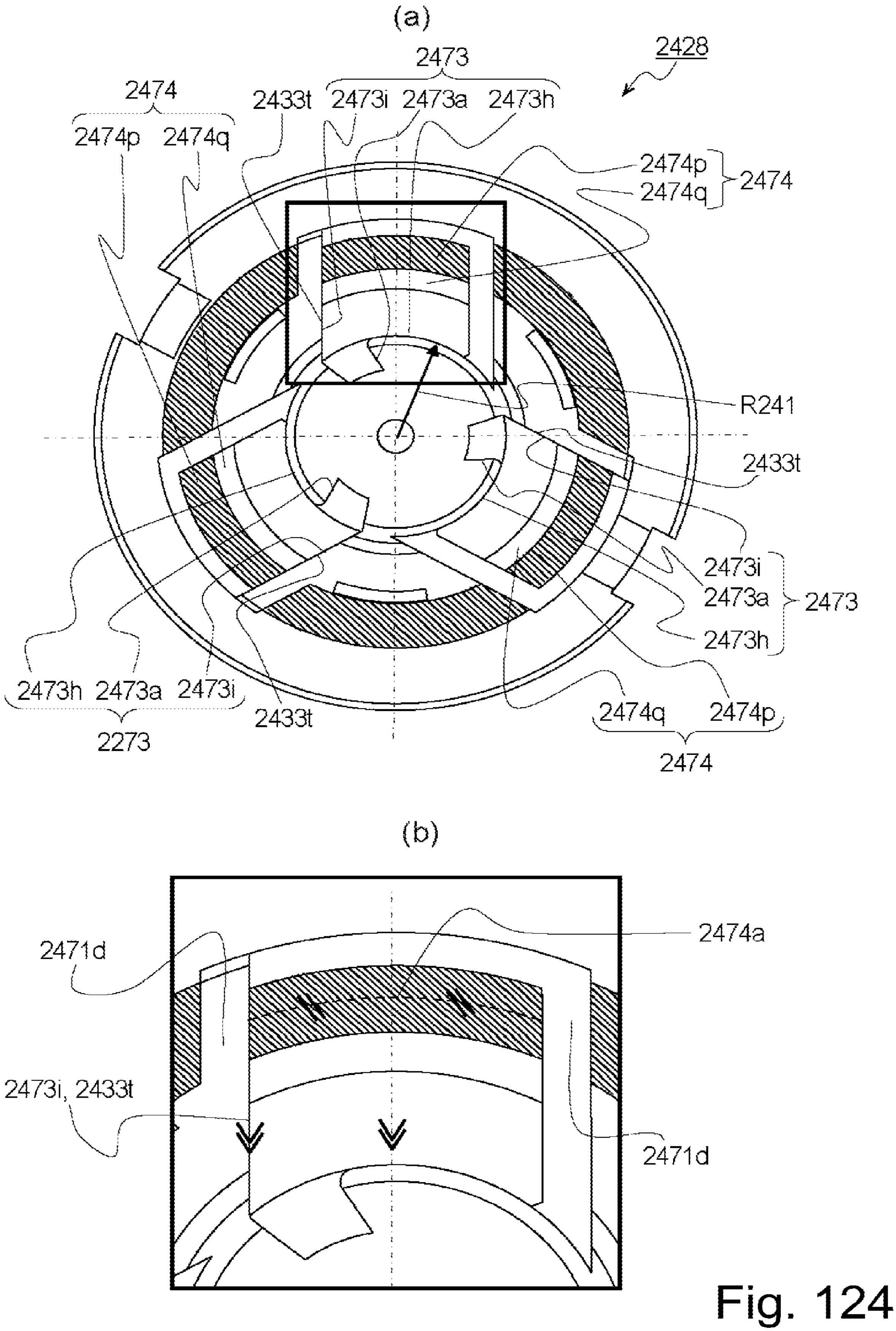

FIG. 124 is sectional views of the coupling member 2428 according to Embodiment 22, taken along a plane perpendicular to the rotation axis of the coupling member 2428 and including a position of a linear portion **2474*p* of a base portion 2474**.

Figure 125:
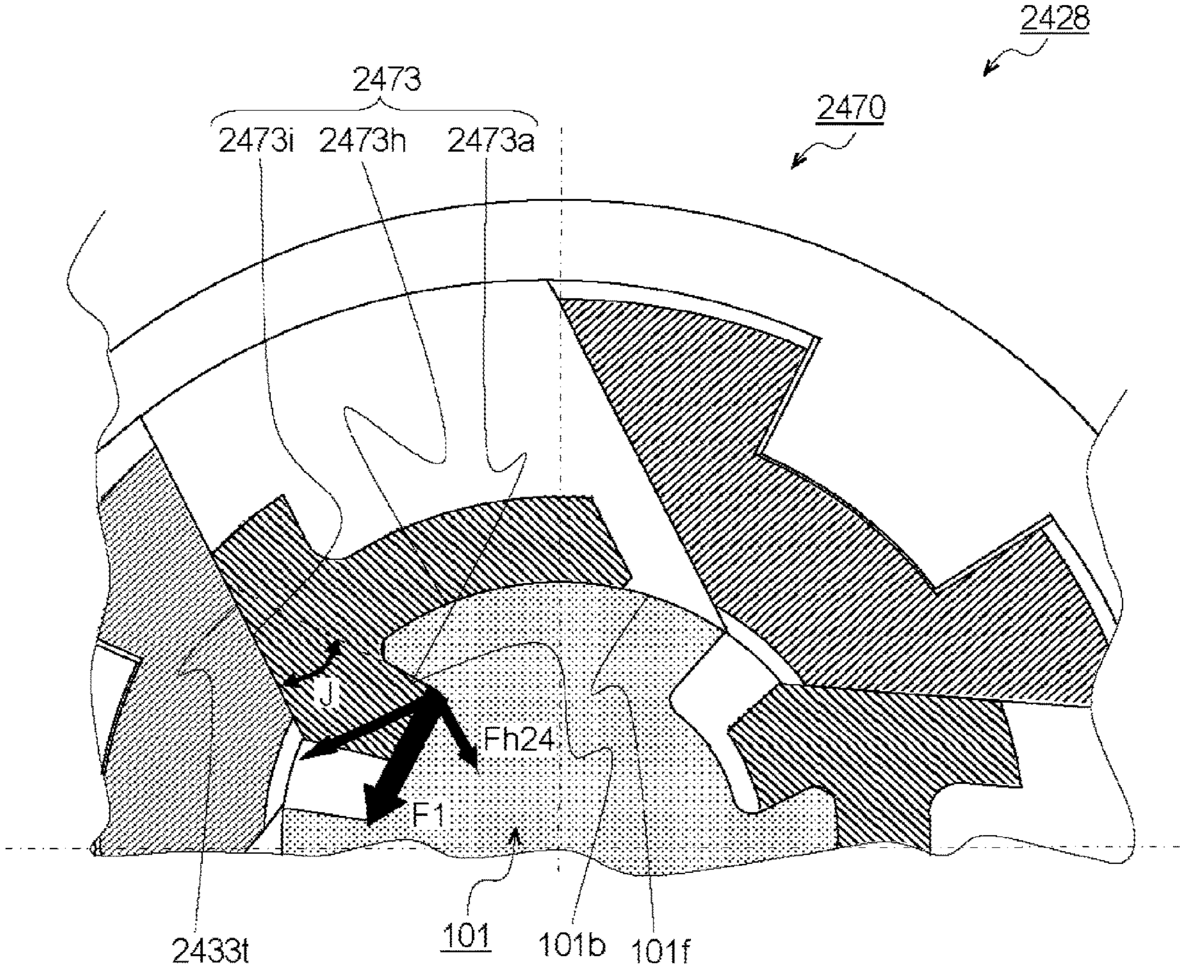

FIG. 125 is a cross-sectional view of the coupling member 2428 according to the Embodiment 22 and the main assembly drive shaft 101 taken along a plane perpendicular to the rotation axis and including the driving force receiving surface **2473*a***.

Figure 126:
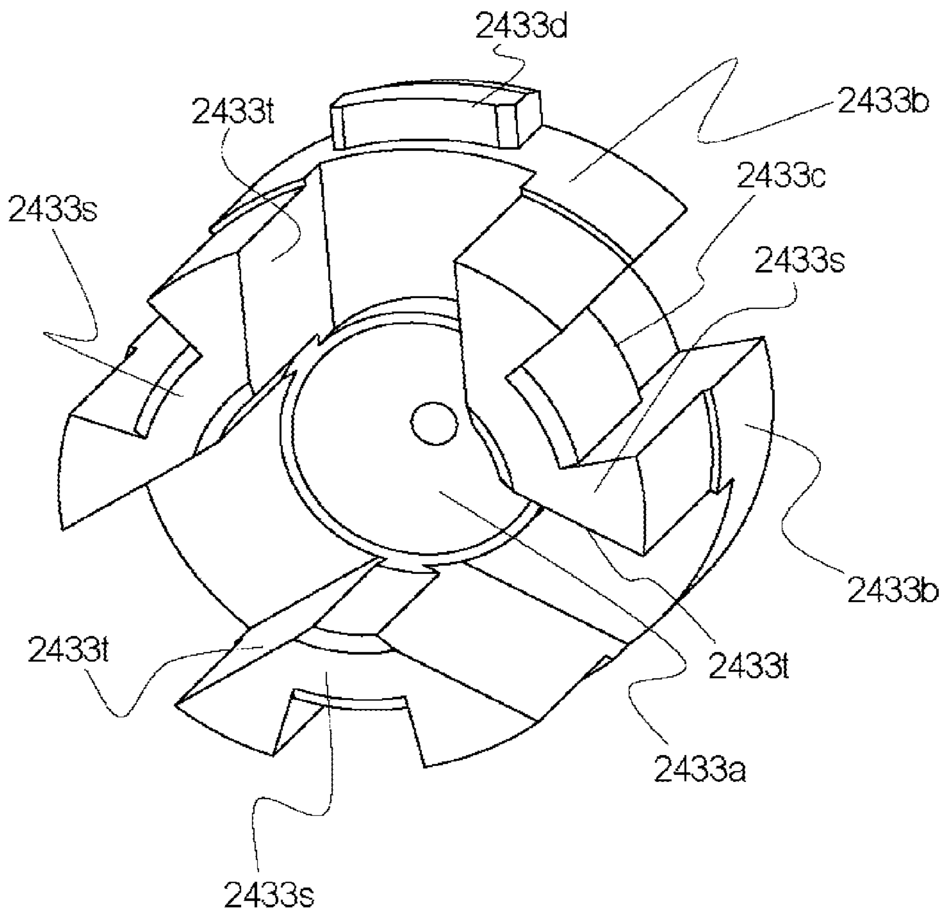

FIG. 126 is a perspective view of an alignment member 2433 according to Embodiment 22.

Figure 127:
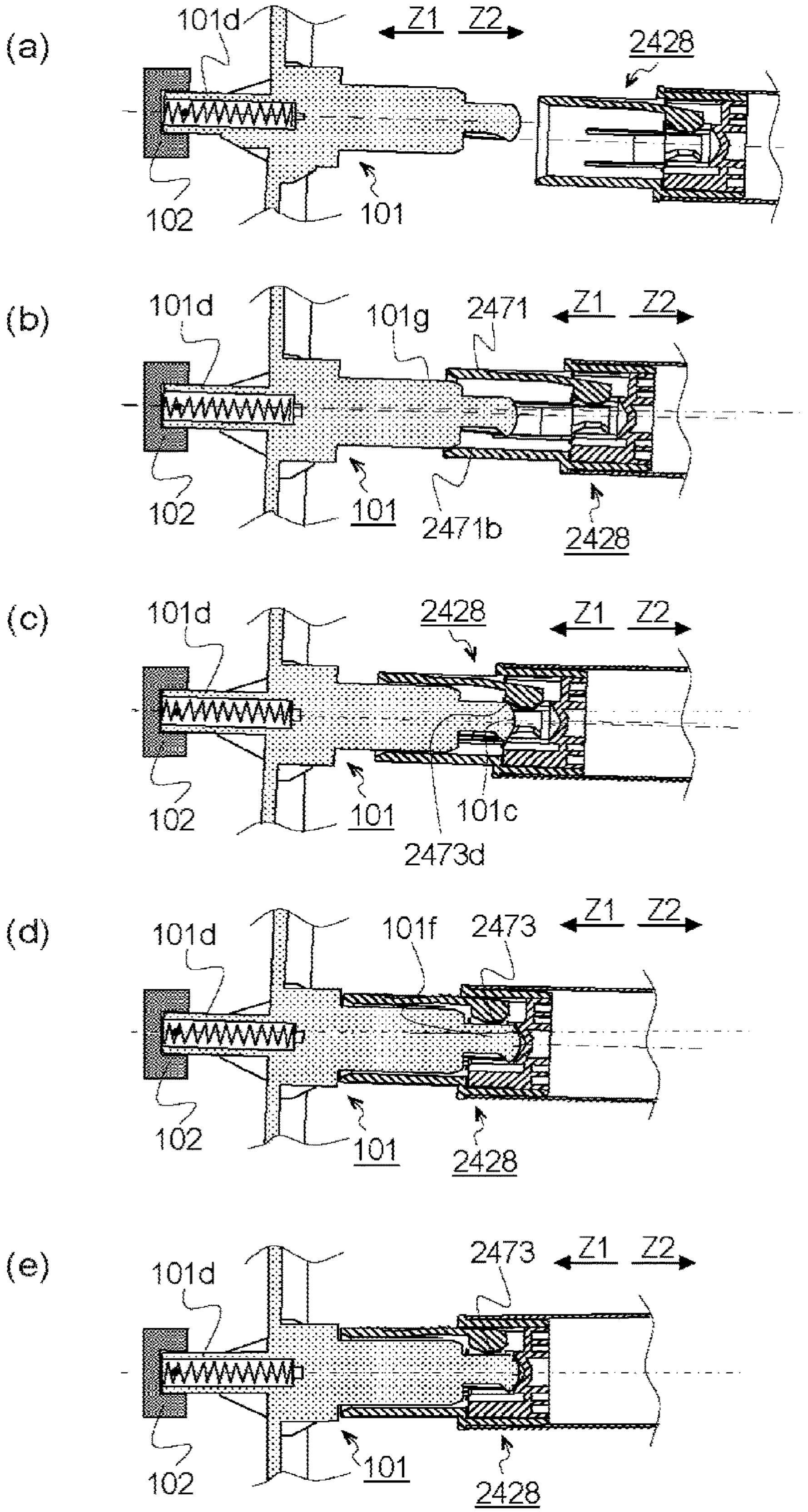

FIG. 127 is explanatory sectional views of the mounting operation of the coupling member 2428 to the main assembly driving shaft 101 according to Embodiment 22.

Figure 128:
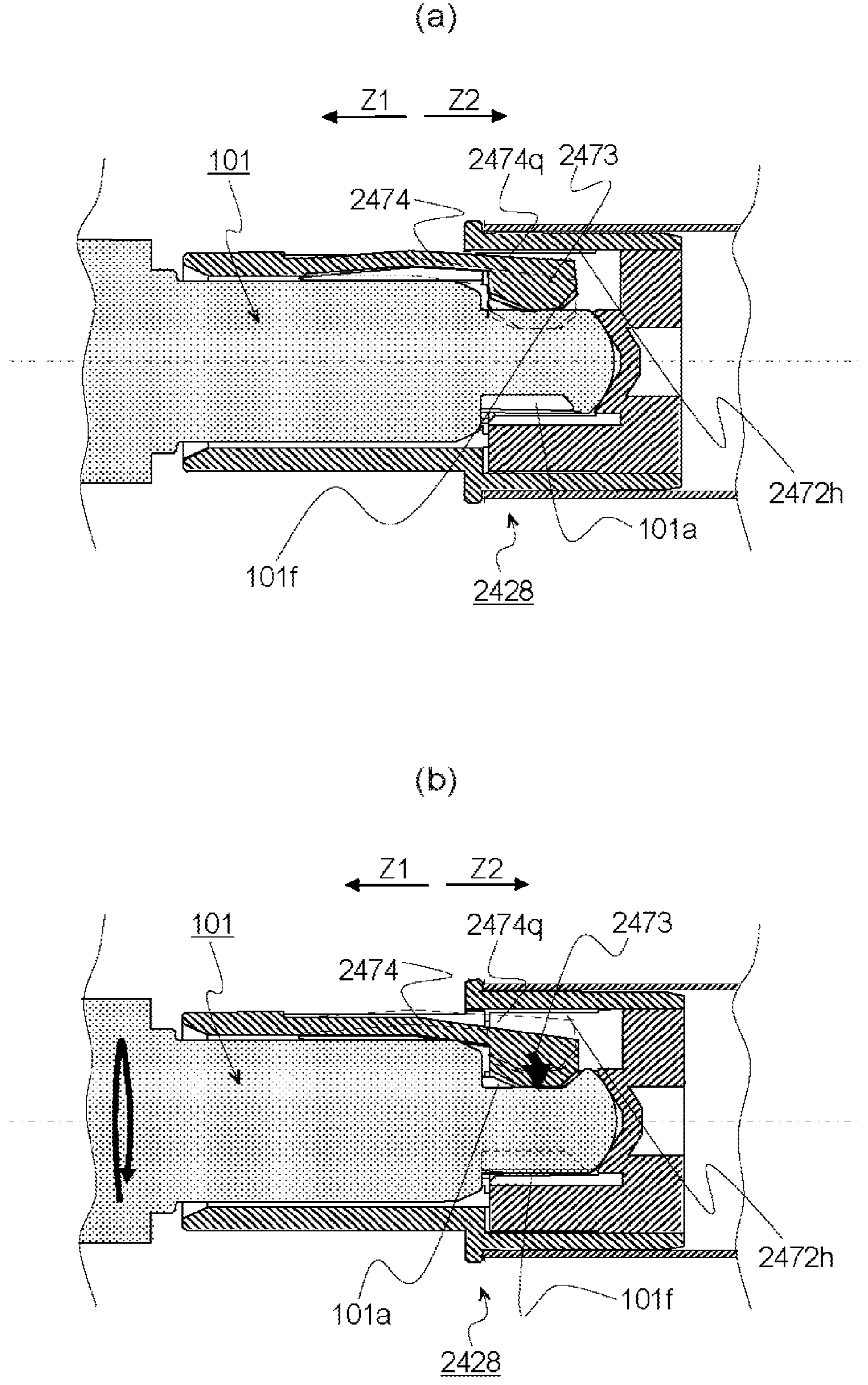

FIG. 128 is explanatory sectional views of the mounting operation of the coupling member 2428 to the main assembly driving shaft 101 according to Embodiment 22.

Figure 129:
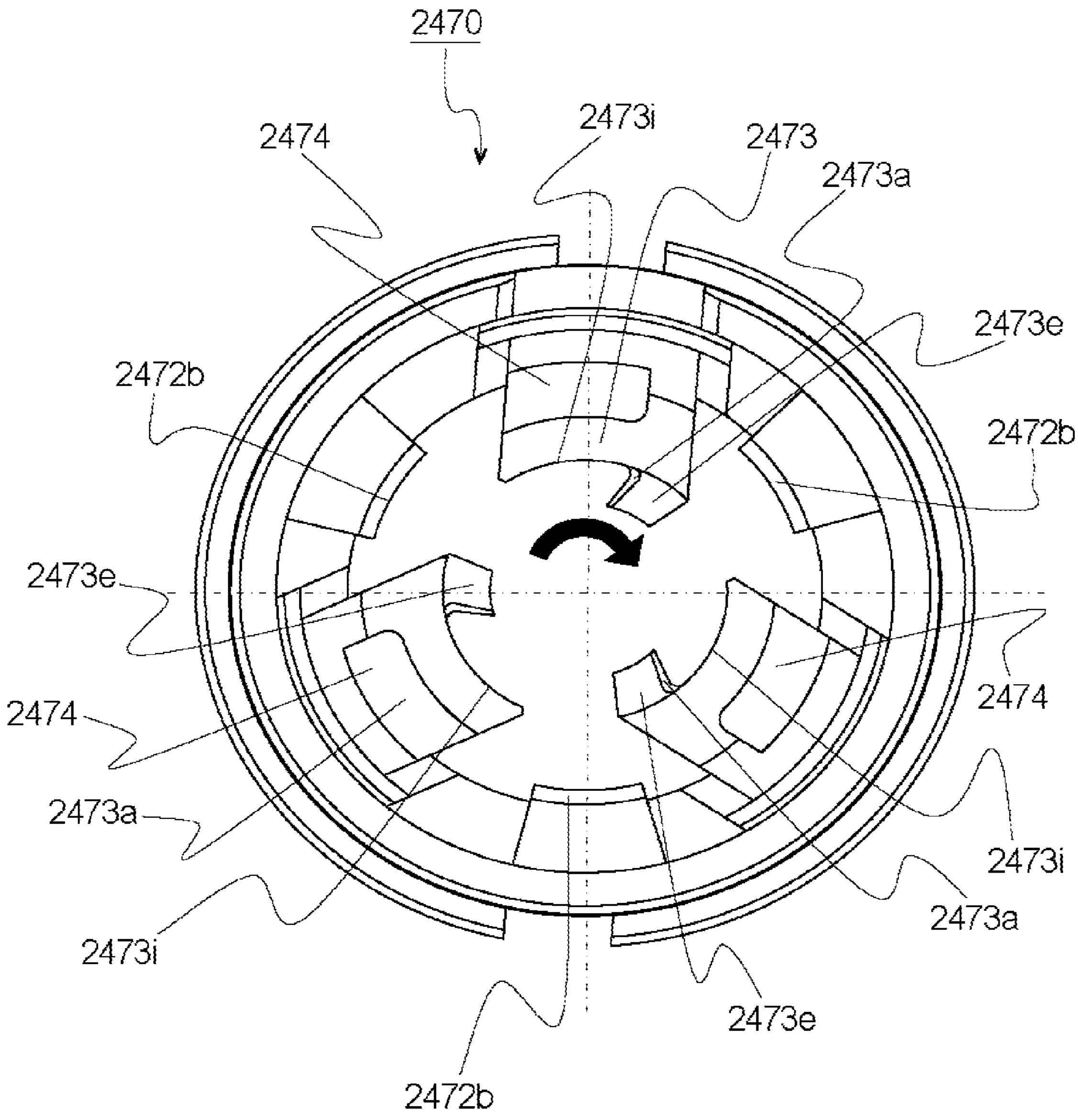

FIG. 129 is an illustration of a flange member 2470 according to Embodiment 22 as viewed in the Z direction from the inner side.

FIG. 130 is a cross-sectional view of the coupling member 2438 according to Embodiment 22.

FIG. 131 is a perspective view illustrating assembling of an aligning member 2433 to the flange member 2470 according to Embodiment 22.

In Embodiment 1, the cut-away portion **71*d* is provided in the cylindrical portion 71, the base portion 74 has a shape extending from the cylindrical portion 71, and the engaging portion 73 and the base portion 74 are arranged so as to been outside the photosensitive drum 1 in the axial direction of the photosensitive drum 1 (downstream side in Z1 direction). On the other hand, although the detailed structure will be described hereinafter, in this embodiment, the root portion 2474*a* of the base portion 2474 is disposed in the outer side (downstream side in the Z1 direction) of the photosensitive drum 1. Further, the engaging portion 2473 is disposed in the Z-direction within the inner periphery 2472*h* of the mounting portion 2472, which is inside the photosensitive drum 1 (as shown in FIG. 122). That is, the driving force receiving surface 2473*a* is disposed on a rear side (the Z2 direction side) of the end surface 2475*b* of the flange portion 2475 about 10 against the photosensitive drum 1 when the coupling member 2428 is assembled to the photosensitive drum 1**.

[Structure of Coupling Member]

The coupling member 2428 comprises two members provided by combining the flange member 2470 and the alignment member 2433 (shown in FIGS. 122 and 123).

(Description on Flange Member)

As in Embodiment 1, the engaging portions 2473 are arranged at three positions (120 degrees interval, substantially equally spaced) at regular intervals in the circumferential direction of the flange member 2470. Similarly, three base portions 2474 are also arranged at regular intervals in the circumferential direction of the flange member (part (a) of FIG. 124).

In addition, the engaging portion 2473 is provided with a driving force receiving surface **2473*a*, a contact surface 2473*h*, a backed-up surface 2473*i*, and a taper 2473*f* (shown in FIGS. 122, 124** (*a*)).

The contact surface **2473*h* is a surface that the coupling member 2428 contacts with the shaft portion 101*f* when engaged with the main assembly driving shaft 101, and the radius 8241 of the circular arc forming the inner diameter is substantially the same as the radius R2 of the shaft portion 101*f***.

The backed-up surface **2473*i* is a surface which abuts against the backup surface 2433*t* of the backup portion 2433*j* of the aligning member 2433 which will be described hereinafter and is disposed in the downstream side of the driving force receiving surface 2473*a* with respect to the rotational direction (shown in FIG. 124). As shown in FIG. 125, the angle J formed between the backed-up surface 2473*i* and the driving force receiving surface 2473*a*** is a acute angle.

As shown in FIGS. 122 and 123, the taper **2473*f* has a tapered shape provided on the outer diameter side of the engaging portion 2473**.

As shown in FIGS. 122 and 123, the base portion 2474 has a linear portion **2474*p* and a connecting portion 2474*q***.

The linear portion **2474*p* has a cut-away shape 2471*d* extending in the axial direction of the photosensitive drum 1 and provided in the cylindrical portion 2471 of the flange member 2470**.

The connecting portion **2474*q* is a portion connecting the engaging portion 2473 and the linear portion 2474*p* with each other while making an angle relative to the straight portion 2474*p***.

Similarly to the Embodiment 1, the base portion 2474 elastically deforms when the coupling member 2428 is mounted to the main assembly driving shaft 101, thereby moving the engagement portion 2473 radially outward of the shaft portion 101*f*. The direction in which the base portion 2474 elastically deforms is substantially perpendicular to the backed-up surface 2473*i*. More specifically, as shown in part (b) of FIG. 124, the root portion 2474*a* is disposed so as to be substantially symmetrical with respect to a straight line passing through the rotation center of the flange member 2470 in parallel with the backed-up surface 2473*i*.

(Description on Alignment Member)

As shown in FIGS. 122 and 126, the aligning member 2433 includes an inverted conical shape 2433*a*, a backup portion 2433*s*, a fitting portion 2433*b*, a retaining portion 2433*c*, and a protrusion 2433*d* for matching the phase of the flange member 2470.

Similarly to the inverted conical shape 533*a* described in Embodiment 5, the inverted conical shape 2433*a* is a substantially conical recess, and the function thereof is the same as the inverted conical shape 533*a* described in Embodiment 5.

As in Embodiment 5, the fitting portion 2433*b* of the aligning member 2433 is fitted in the flange member 2470 so as to satisfy the following conditions. That is, in the Z direction, the center 101*h* of the semispherical shape 101*c* of the main assembly driving shaft 101 is within the range of the driving force receiving surface 2473*a* in a state in which the semispherical shape 101*c* is in contact with the abutment portion 2433*e*.

Further, the retaining portion 2433*c* has a function of preventing disengagement from the flange member 2470.

As described above, the backup portion 2433*s* is provided with a backup surface 2433*t* that contacting with the backed-up surface 2473*i* of the flange member 2470.

As shown in FIGS. 123 and 130, in this embodiment, the backup surface 2433*t* is disposed so as to overlap with the driving force receiving surface 2473*a* in the Z direction, but it is preferable to arrange it so as to overlap at least partly.

As shown in FIG. 130, the fitting portion 2433*b* is disposed on the inner side (downstream side in the Z2 direction) of the photosensitive drum unit with respect to the abutment portion 2433*e*. Further, the flange member 2470 has a fitted portion 2472*a* at a position corresponding to the fitting portion 2433*b*.

Also, as shown in FIGS. 122 and 123, the flange member 2470 has a hooking portion 2472*b* corresponding to the retaining portion 2433*c*. As shown in FIG. 129, the hooking portion 2472*b* is disposed in a position so as not to overlap with the base portion 2474 as viewed along the Z direction.

the hooked portion 2472*b* is disposed substantially in the middle of the two root portions 2474*a* arranged so as to be adjacent to each other in the circumferential direction. In this embodiment, three hook portions 2472*b* engaged with the retaining portion 2433*c* are disposed in the middle of the root portion 2474*a*.

As shown in FIG. 131, the positioning of the flange member 2470 and the alignment member 2433 in the rotational direction of the coupling member 2428 is accomplished by fitting the protrusion 2433*d* of the alignment member 2433 into the cut-away portion 2472*c* of the flange member 2470. The protruding portion 2433*d* has a shape protruding radially outward from the fitting portion 2433*b*. Therefore, when the alignment member 2433 is mounted to the flange member 2470, the phases of the retaining portion 2433*c* and the hooking portion 2472*b* can easily be matched.

[Engaging Process of Coupling Member to Main Assembly Drive Shaft]

Next, the engagement process between the coupling member 2428 and the main assembly driving shaft 101 will be described in detail.

FIG. 127 is cross-sectional views illustrating the operation of mounting the coupling member to the main assembly driving shaft. Part (a) of FIG. 127 in an illustration showing a state in which the coupling member 2428 has started engaging with the main driving shaft 101. Part (e) of FIG. 127 shows a state in which the cartridge 7 has been mounted to the image forming apparatus main assembly 100A, the cartridge door 104 has been closed, the lower front side cartridge guide 109 has been raised, and the cartridge 7 has been positioned relative to the image forming apparatus main assembly 100A. Part (b) of FIGS. 127 to 127 (*d*) are illustrations of a process of connecting the coupling member 2428 to the main assembly driving shaft 101 between part (a) of FIG. 127 and part (e) of FIG. 127. As in Embodiment 1, the main assembly driving shaft 101 hangs downward in the direction of gravity by a small angle due to its own weight.

Part (a) of FIG. 128 is an illustration of a state in which the phases of the main assembly drive transmission groove 101*a* and the engagement portion 2473 (driving force receiving surface 2473*a*) are not aligned with each other. That is, in part (a) of FIG. 128, the engaging portion 2473 (the driving force receiving surface 2473*a*) does not enter the main assembly drive transmission groove 101*a*, in which they are not engaged with each other.

Similarly to Embodiment 1, as shown in part (a) of FIG. 127, when the cartridge 7 is positioned relative to the image forming apparatus main assembly 100A (shown in part (e) of FIG. 127), the coupling member 528 is inserted into the main assembly driving shaft 101 with an inclination. This inclination is about 0.5 to 2 degrees.

First, as shown in part (b) of FIG. 127, the free end of the inner peripheral surface 2471*b* of the cylindrical portion 2471 of the flange member 2470 abuts against the rough guide portion 101*g* of the main assembly driving shaft 101. As shown in the Figure, the main assembly driving shaft 101 is configured to be supported by the bearing portion 101*d* in the cantilever fashion. Therefore, the coupling 7 is inserted into the main assembly driving shaft 101 in a state in which the rough guide portion 101*g* of the main assembly driving shaft 101 fits the inner peripheral surface 2471*b* of the coupling member 2470. Similarly to Embodiment 1, in the Z direction, the driving force receiving surface 573 of the engaging portion 2473 has a length L2 which satisfy L1>L2, where L1 is a distance from the front end surface of the cylindrical portion 2471 to the front end surface of the engaging portion 2473 (as shown in FIG. 122). Therefore, before the semispherical shape 101*c* at the free end of the main assembly driving shaft 101 hits the engaging portion 2473, the rough guide portion 101*g* of the main assembly driving shaft 101 follows the inner peripheral surface 2471*b* of the coupling member 2470.

By this, the main assembly driving shaft 101 is guided by the coupling member 2428. Therefore, it is possible to prevent the semi-spherical shape portion 101*c* at the free end of the main assembly driving shaft 101 from abutting against a unexpected place of the engaging portion 2473 and giving a impact to the engaging portion 2473. That is, the engaging portion 2473 and the base portion 2474 can be protected.

As shown in part (c) of FIG. 127, when the coupling member 2428 is further inserted toward the back side of the main driving shaft 101, the insertion taper surface 2473*d* of the engagement portion 2473 and the main driving shaft 101 and the semispherical shape 101*c* abut to each other. Due to the inclined surface of the insertion tapered surface 2473*d* and the spherical shape of the semispherical shape 101*c*, the main assembly driving shaft 101 is guided substantially to the center of the three engaging portions 2473.

When the coupling member 2428 is further inserted into the main assembly driving shaft 101, the base portion 2474 elastically deforms radially outward so that the engagement portion 2473 follows the semispherical shape 101*c*. As a result, as shown in part (a) of FIG. 128, the engaging portion 2473 moves (retracts) to the outer diameter surface of the shaft portion 101*f* of the main assembly driving shaft 101.

By this movement, as shown in part (d) of FIG. 127, the coupling member 2428 is mounted to the main assembly driving shaft 101 until the dismounting tapered surface 573*e* of the engagement portion 2473 comes deeper in the Z direction than the main assembly side dismounting taper 101*i* of the main assembly driving shaft 101.

At this time, the connecting portion 2474*q* makes a angle with the straight portion 2474*p*, and therefore, the connecting portion 2474*q* does not interfere with the inner periphery 2472*h* of the mounting portion 2472, and moves (retracts) the engaging portion 2473 to the outer diameter of the shaft portion 101*f*.

Similarly, since the engaging portion 2473 has the taper 2473*f*, the engaging portion 2473 does not interfere with the inner periphery 2472*h* of the mounting portion 2472 and can move (retract) the engaging portion 2473 to the outer diameter of the shaft portion 101*f*.

In summary, the support portion constituted by the engagement portion 2473 and the base portion 2474 has a part away from the inner surface (inner circumference 2472*h*) of the coupling member from the fixed end toward the free end (so as to widen the distance). That is the taper 2473*f* and the connecting portion 2474*q*. The tapered portion 2473*f* and the connecting portion 2474*q* are inclined surfaces (inclined portions), but it may have a stepped shape.

Thereafter, similarly to Embodiment 1, the cartridge 7 is lifted so that the drum unit bearing member 39L of the cartridge 7 abuts against the front side cartridge positioning portion 110. By thus lifting the cartridge 7, the cartridge 7 is positioned relative to the image forming apparatus main assembly 100A (as shown in part (d) of FIG. 21). By this operation of the cartridge 7, as shown in part (e) of FIG. 127, the inclination of the coupling member 2428 is eliminated. That is, the coupling member 2428 and the drum unit are in an attitude capable of forming an image.

When the main assembly driving shaft 101 rotates, as shown in part (b) of FIG. 128, the main assembly drive transmission groove 101*a* and the engagement portion 2473 come to have the same phase. As a result, the elastic deformation of the base portion 2474 is eliminated, a part of the engagement portion 2473 enters the main assembly drive transmission groove 101*a*, and the coupling member 2428 and the main assembly driving shaft 101 are engaged with each other.

When the phases of the main assembly drive transmission groove 101*a* and the engagement portion 573 are in alignment with each other, at least part of the elastic deformation of the base portion 2474 is eliminated at the stage of part (d) of FIG. 127, and the state of part (b) of FIG. 128 is provided. That is, the base portion 2474 is deformed so as to move the engaging portion 2473 inward in the radial direction when shifting from the state shown in part (a) of FIG. 128 to the state shown in part (b) of FIG. 128. Strictly speaking, the state of the base portion 2474 which has been deformed outward in the radial direction is at least partially restored, by which the engaging portion 2473 moves at least inward in the radial direction.

In this manner, the base portion 2474 advances the engaging portion 2473 into the main assembly drive transmission groove 101*a*, and causes the engaging portion 2473 to engage with the main assembly driving transmission groove 101*a* of the main assembly driving shaft 101.

[Driving of Coupling Member by Main Assembly Drive Shaft]

Referring to FIGS. 51 to 57, transmission of rotational drive from the main driving shaft 101 to the coupling member 2428 will be described.

As described above, after closing the cartridge door 104 of the image forming apparatus main assembly 100A to which the cartridge 7 is mounted, the main assembly driving shaft 101 rotates. As a result, the phase of the engagement portion 2473 and the phase of the main assembly drive transmission groove 101*a* match each other, with the result of the state shown in part (b) of FIG. 128. The main assembly driving shaft 101 is configured to be rotatable in the rotational direction for image forming operation and also in the opposite direction.

Further, when the main assembly driving shaft 101 rotates, as shown in FIG. 125, the main assembly drive transmission surface 101*b* abuts against the driving force receiving surface 2473*a*. As a result, the rotational driving force of the main assembly driving shaft 101 is transmitted to the photosensitive drum 1 by way of the coupling member 2428.

As in Embodiment 1, the driving force receiving surface 2473*a* is twisted about the center of the rotation axis of the flange member 2470. The twisting direction is such that the outer side (the Z1 direction side) of the photosensitive drum unit 30 of the driving force receiving surface 2473*a* is upstream, with respect to the rotational direction of the photosensitive drum 1, of the inner side (downstream side in the Z2 direction) 52 (as shown in FIG. 129).

As described above, the angle J formed between the back-up surface 2473*i* and the driving force receiving surface 2473*a* is a acute angle. As a result, as shown in FIG. 125, when receiving the driving force F1 on the driving force receiving surface 2473*a*, the force Fh24 having the component in the direction toward the main assembly driving shaft 101 side is produced along the backed-up surface 2473*i*. When the engaging portion 2473 is attracted toward the main assembly driving shaft 101 side, the abutting surface 2473*h* is brought into contact with the shaft portion 101*f*.

By this, as for the engaging portion 2473 of the coupling member 2428, the backed-up surface 2473*i* abuts to the backup surface 2433*t*, the contact surface 2473*h* abuts to the shaft portion 101*f*, and the driving force receiving surface 2473*a* abuts to the main assembly drive transmitting groove 101*a*, respectively. By this abutment, the coupling member 2428 can rotate the photosensitive drum 1 integrally with the main assembly driving shaft 101.

The backed-up surface 2473*i* is a portion to be urged provided on the backup surface 2433*t*. When the driving force receiving surface (driving force receiving portion) 2473*a* attempts to move in the rotational direction of the coupling member, the backup surface 2433*t* is brought into contact to the backup surface 2433*t* to restrict movement thereof. Further, the backup surface 2433*t* stabilizes the engagement state between the main assembly driving shaft 101 and the engagement portion 2473 by urging the driving force receiving surface 2473$a$ toward the inner side (radially inward) of the drive transmission groove.

[Removal of Coupling Member from Main Assembly Driving Shaft]

As for the removal operation of the coupling member 2428 from the main driving shaft 101, similarly to Embodiment 1, the dismounting tapered surface 2473$e$ (shown in FIG. 129) provided on the engagement portion 2473 and the main assembly side removed taper 101$i$ are used.

Further, in this embodiment, the fixed end (the fixed end of the base portion 2477) of the supporting portion which supports the driving force receiving portion (the driving force receiving surface 2473$a$) is disposed outside the driving force receiving portion in the axial direction. In other words, the driving force receiving portion is disposed inside the fixed end in the axial direction.

When the driving force receiving surface 2473$a$ is provided on the inner side in the axial direction, the following effects are provided. By placing the driving force receiving surface 2473$a$ in the back of the drum unit, the driving force receiving surface 2473$a$ can be protected.

Also, when the cartridge is mounted in the image forming apparatus main assembly, that is, when the coupling member 2428 is coupled with the main assembly driving shaft 101, a force directed inward in the axial direction is applied to the driving force receiving surface 2473$a$. At this time, the force applied to the supporting portion (the engaging portion 2473 and the base portion 2477) for supporting the driving force receiving surface 2473$a$ is a pulling force. Generally, the supporting portion is more resistant to pulling forces than to withstand forces applied in the compressed orientation. Therefore, even if the user vigorously mount the cartridge to the image forming apparatus main assembly with the result that a strong tensile force is applied to the support portion, deformation or the like of the support portion can be suppressed.

Embodiment 23

Referring to FIGS. 132 to 134, Embodiment 23 will be described.

Elements corresponding to those of the above-described embodiment (particularly, Embodiment 22) are assigned by the same names, and descriptions of the similar points to those of the above-described elements may be omitted. The description will be made mainly about the differences from the abovementioned elements.

FIG. 132 is a cross-sectional perspective view of the coupling member 2528 according to Embodiment 23.

FIG. 133 is sectional views of the coupling member 2528 according to Embodiment 23, taken along a plane perpendicular to the rotation axis of the coupling member 2528 and including a position of a linear portion 2574$p$ of a base portion 2574.

FIG. 134 is a cross-sectional view of the coupling member 2538 according to Embodiment 23.

In the Embodiment 22, the angle J formed between the backed-up surface 2273$i$ and the driving force receiving surface 2273$a$ is a acute angle. On the other hand, in this embodiment, the driving force receiving surface 2573$a$ and the backed-up surface 2573$i$ are arranged substantially in parallel with each other. As the driving force receiving surface 2573$a$ is viewed in a cross section in a direction perpendicular to the axis of the flange member 2570, the backed-up surface 2573$i$ is provided so that the driving force receiving surface 2573$a$ and the backed up surface 2573$i$ have at least surfaces parallel to each other.

As in Embodiment 22, the engaging portion 2573 is provided with a driving force receiving surface 2573$a$, a backed-up surface 2573$i$, and a taper 2573$f$ (shown in FIG. 132).

Also, as in Embodiment 22, the base portion 2574 has a linear portion 2574$p$ and a connecting portion 2574$q$, as shown in FIG. 132.

As in the Embodiment 22, the direction in which the base portion 2574 elastically deforms is a direction substantially perpendicular to the backed-up surface 2573$i$. More specifically, as shown in part (b) of FIG. 133, the root portion 2574$a$ is disposed so as to be substantially symmetrical with respect to a straight line passing through the rotation center of the flange member 2570 in parallel with the backed-up surface 2573$i$.

In this embodiment, as shown in FIG. 134, the backup surface 2533$t$ is disposed so as to overlap with a part of the driving force receiving surface 2273$a$ in the Z direction.

Upon receiving the driving force F1, as contrasted to Embodiment 22, no component of force is produced in the engaging portion 2573 toward the main assembly driving shaft 101 side. However, the backed surface 2573$i$ is in contact with the backup surface 2533$t$, the contact surface 2573$h$ is in contact with the shaft portion 101$f$, and the driving force receiving surface 2573$a$ is in contact with the main assembly drive transmission surface 101$b$. By these contacts, the engaging portion 2573 is sandwiched between the backup surface 2533$t$ and the opposite driving transmission surface 101$b$. Therefore, the coupling member 2528 can stably rotate the photosensitive drum 1 integrally with the main assembly driving shaft 101 if the load is as small as applied to the photosensitive drum 1.

Embodiment 24

Referring to FIGS. 135 to 141, Embodiment 24 will be described.

Elements corresponding to those of the above-described embodiment (particularly, the Embodiment 22) are assigned by the same names, and descriptions of the similar points to those of the above-described elements may be omitted. The description will be made mainly about the differences from the abovementioned elements.

FIG. 135 is a perspective view of a cylindrical inner member 2640 according to Embodiment 24.

FIG. 136 is a sectional view of the cylindrical inner member 2640 according to Embodiment 24.

FIG. 137 is sectional views of the coupling member 2628 according to Embodiment 24, taken along a plane perpendicular to the rotation axis of the coupling member 2628 and including a position of a linear portion 2674$p$ of a base portion 2674.

FIG. 138 is a perspective view illustrating the assembly of the cylindrical inner member 2640 to the flange member 2670 according to Embodiment 24.

FIG. 139 is a cross-sectional view of the coupling member 2628 according to Embodiment 24.

FIG. 140 is a sectional perspective view of the coupling member 2628 according to Embodiment 24.

FIG. 141 is a sectional view illustrating movement of the cylindrical inner member 2640 with respect to the flange member 2670 according to Embodiment 24.

In Embodiment 22, the coupling member 2238 comprises the flange member 2270 and the aligning member 2233. In particular, the engaging portion 2273 and the base portion 2274 are integrally formed with the flange member 2270. In this embodiment, however, as shown in FIG. 138, the coupling member 2638 comprises a flange member 2670 and a cylindrical inner member 2640, as will be described in detail hereinafter.

The coupling member 2638 is assembled (shown in FIG. 138) by mounting the cylindrical inner member 2640 to the flange member 2670 in the axial direction of the flange member 2670 from the front side to the back side (to the Z2 side from the Z1 side). (Description on cylindrical inner member).

As shown in FIGS. 135 and 136, the cylindrical inner member 2640 comprises a fitting portion 2640*a*, a fixing portion 2640*b*, a engaging portion 2673, and a base portion 2674. The engaging portion 2673 is provided with a driving force receiving portion (driving force receiving surface 2673*a*) for receiving a driving force from the main assembly side driving transmission shaft 101.

The cylindrical inner member 2640 is a driving force receiving member having a driving force receiving portion. The cylindrical inner member 2640 is movable in the circumferential direction of the coupling member relative to the flange member 2670. More specifically, the cylindrical inner member 2640 is configured to be rotatable relative respect to the flange member 2670 within a certain angle range around the axis Ax of the coupling member.

Outer peripheral surface of the fitting portion 2640*a* is rotatably fitted to the inner peripheral surface 2671*b* of the cylindrical portion 2671 of the flange member 2670 which will be described hereinafter.

As shown in FIGS. 135 and 136, the fixing portion 2640*b* is provided at the free end side of the snap fit shape 2640*c* provided on a part of the fitting portion 2640*a*, and has a shape protruding to the outer periphery of the fitting portion 2640*a*. The fixing portion 2640*b* restricts the movement of the cylindrical inner member 2640 in the axial direction (Z direction) by entering the fixing hole 2671*e* provided in the cylindrical portion 2671 of the flange member 2670 which will be described hereinafter.

Like Embodiment 22, the engaging portion 2673 is provided with a driving force receiving surface 2673*a*, a contact surface 2673*h*, a backed-up surface 2673*i*, and a taper 2673*f*.

The taper 2673*f* is a inclined portion that is inclined so as to widen the distance from the inner surface of the coupling member (the inner surface of the flange member 2670) toward the three side of the engagement portion 2673 in the axial direction.

The angle J formed between the driving force receiving surface 2673*a* and the backed-up surface 2673*i* is also acute as in the Embodiment 22 (shown in FIGS. 135,136,137).

Similarly to Embodiment 22, the base portion 2674 is also provided with a straight portion 2674*p* and a connecting portion 2674*q* (shown in FIGS. 135 and 136). As in Embodiment 22, the direction in which the base portion 2674 elastically deforms is a direction substantially perpendicular to the backed-up surface 2673*i*. More specifically, as shown in part (b) of FIG. 137, a root portion 2674*a* is disposed so as to be substantially symmetrical with respect to a straight line passing through the rotation center of the flange member 2670 in parallel with the backed-up surface 2673*i*. In this embodiment, since the fitting portion 2640*a* is fitted to the cylindrical portion 2671 of the flange member 2670, the center of rotation of the flange member 2670 and the center of the cylinder of the fitting portion 2640*a* are substantially the same.

(Description on Flange Member)

As shown in FIGS. 138 and 139, the flange member 2670 has a cylindrical portion 2671, a mounting portion 2672, a flange portion 2675, an inverted conical shape 2633*a*, and a backup portion 2633*s*.

The cylindrical portion 2671 is provided with a fixing hole 2671*e* elongated in the circumferential direction into which the fixing portion 2640*b* provided in the cylindrical inner member 2640 enters (as shown in FIG. 138).

Similarly to the Embodiment 22, the engaging portion (driving force receiving portion) moves outward in the radial direction of the flange member 2670 by the elastic deformation of the base portion 2674, when the coupling member 2638 is coupled to the main assembly driving shaft 101. At that time, the base portion 2674 of the cylindrical inner member 2640 is provided with a relief hole 2671*f* so as not to interfere with the elastic deformation.

(Description on Coupling Member)

The coupling member 2638 is constituted by assembling the cylindrical inner member 2640 to the flange member 2670 as described above. The position of the cylindrical inner member 2640 relative to the flange member 2670 is determined by fitting the fitting portion 2640*a* to the inner peripheral surface 2671*b* of the cylindrical portion 2671.

As shown in FIG. 141, the cylindrical inner member 2640 is rotatably assembled to the flange member until the engagement portion 2673 abuts against the backup portion 2633*s* on the upstream side and the downstream side in the rotational direction of the engagement portion 2673. The fixing hole 2671*e* has a shape elongated in the circumferential direction, so that a gap is provided between itself and the fixing portion 2640*b* in the rotational direction (shown in FIG. 138) to permit rotation.

The escape hole 2671*f* is also effective to avoid interference with the base portion 2674 retracted radially outward, even when the coupling member 2638 is coupled with the main assembly driving shaft 101 in the state that the engaging portion 2673 abuts to the upstream side or the downstream side backup portion 2633*s*.

And, the surface of the backup portion 2633*s* on the downstream side in the rotational direction which is in contact with the backed-up surface 2673*i* of the engaging portion 2673 functions as the backup surface 2633*t*, and on the surface thereof follows the backed-up surface 2673*i* upon contact therebetween.

With the above-described structure, when the coupling member 2638 begins to receive the driving force from the main assembly driving shaft 101, the backup portion 2633*t* and the backed-up portion 2673*i* are not necessarily in phase alignment with each other.

Since the cylindrical inner member 2640 is rotatably supported with respect to the flange member 2670, the cylindrical inner member 2640 rotates Relative to the flange member 2670 when the driving force begins to be received. Thereafter, the cylindrical inner member 2640 rotates until the backup surface 2673*i* abuts against the backed-up surface 2633*t*.

The backup surface 2673*i* contacts the backed-up surface 2633*t*, whereby the driving force is transmitted. In other words, the backup surface 2673*i* is the transmitted portion of the driving force.

The flange member 2670 is provided with the backup portion (backup surface 2673*i*) and is a backup member formed separately from the driving force receiving member (cylindrical inner member 2640). If the cylindrical inner member 2640 and the flange member 2670 are separate members (unintegral members), it is easy to shorten the distance between the backed-up surface provided on the cylindrical inner member 2640 and the backup surface of the flange member 2670, thus enhancing the function of the backup surface.

Further, the flange member 2670 is a transmitted member to which the driving force is transmitted from the driving force receiving member. And, it is a transmitted member to which the driving force is transmitted from the cylindrical inner member 2640 by way of the backup surface 2673*i*. Since the flange member 2670 is fixed to the photosensitive drum 1, the photosensitive drum 1 is rotated by the force received by the flange member 2670.

As in Embodiment 22, the angle J formed between the driving force receiving surface 2673*a* and the backed-up surface 2673*i* is an acute angle. Therefore, after the backup surface 2673*i* is brought into contact with the backed-up surface 2633*t*, as in the case of Embodiment 22, the force of the component Fh22 toward the main assembly driving shaft 101 side along the backed-up surface 2673*i* is applied to the engaging portion 2673.

That is, the backup surface (backup portion, transmitted portion) 2673*i* is inclined so as to urge the driving force receiving portion 2673*a* at least radially inward (toward the inside of the drive transmission groove), when contacting to the backed-up surface (urged portion) 2633*t*.

Also in this embodiment, similarly to Embodiment 22, the coupling member 2628 can rotate the photosensitive drum 1 integrally with the main assembly driving shaft 101.

In this embodiment, the structures of the engaging portion 2673 and the base portion 2674 are the same as those of Embodiment 22, but the same structures as with Embodiment 23 may be employed.

Embodiment 25

Referring to FIGS. 142 to 156, Embodiment 25 will be described. Elements corresponding to those of the above-described embodiment (particularly, the Embodiment 6) are assigned by the same names, and descriptions of the similar points to those of the above-described elements may be omitted. The description will be made mainly about the differences from the abovementioned elements.

The coupling member disclosed in each of the foregoing embodiments is a member to which a driving force for rotating the photosensitive drum 1 is transmitted. In contrast, in this embodiment, a coupling member 4028 receives the driving force for rotating the developing roller and the toner supplying roller.

The photosensitive drum 1, the developing roller 4017, and the toner supply roller 4020 are all rotatable members configured to rotate in a state in which a developer (toner) is carried on the surface thereof.

[General Arrangement of Electrophotographic Image Forming Apparatus]

Referring first to FIG. 142, the overall structure of a embodiment of a electrophotographic image forming apparatus (image forming apparatus) according to this embodiment will be described.

FIG. 142 is a schematic sectional view of the image forming apparatus 4100A of this embodiment.

As shown in FIG. 142, the image forming apparatus 4100A includes, as a plurality of image forming sections, first, second, third and fourth image forming units SY, SM, SC and SK for forming images of respective colors, namely yellow (Y), magenta (M), cyan (C) and black (K). In this embodiment, the first to fourth image forming portions SY, SM, SC, and SK are arranged in a line in a substantially horizontal direction.

In this embodiment, the structures and operations of the drum cartridges 4013 (4013Y, 4013M, 4013C and 4013K) and the developing cartridges 4004 (4004Y, 4004M, 4004C, and 4004K) are substantially the same as those of the drum cartridges 4013, except that the colors of the images to be formed on different from each other. Therefore, hereinafter, Y, M, C, and K will be omitted and explanation will be commonly applied unless otherwise stated.

In this embodiment, the image forming apparatus 4100A has cylinders (hereinafter referred to as photosensitive drums) 1 each having a photosensitive layer, the cylinders being arranged side by side along a direction inclined slightly with respect to a vertical direction as a plurality of image bearing members. A scanner unit (exposure device) 4013 is disposed below the drum cartridge 4013 and the developing cartridge 4004 with respect to the direction of gravitational force. In addition, around the photoconductive drum 1, a charging roller 2 or the like functioning as process means (process device, process member) acting on the photosensitive layer are arranged.

The charging roller 2 is charging means (charging device, charging member) for uniformly charging the surface of the photosensitive drum 1. The scanner unit (exposure device) 3 is exposure means (exposure device, exposure member) for forming an electrostatic image (electrostatic latent image) on the photosensitive drum 1 by exposing to a laser on the basis of image information. Around the photosensitive drum 1, a cleaning blade 6 as cleaning means (cleaning device, cleaning member) and a developing cartridge 4004 are provided.

Further, an intermediary transfer belt 5 as an intermediary transfer member for transferring the toner image from the photosensitive drum 1 onto the recording material (sheet, recording medium) 12 is provided so as to face the four photosensitive drums 1.

In the developing cartridge 4004 of this embodiment, a contact developing method in which a non-magnetic one-component developer (hereinafter referred to as toner) is used as a developer and a developing roller 4017 as a developer carrying member contacts the photosensitive drum 1 is employed.

With the above-described structure, the toner image formed on the photosensitive drum 1 is transferred onto the sheet (paper) 12, and the toner image transferred onto the sheet is fixed. As process means actable on the photosensitive drum 1, the drum cartridge 4013 is provided with the charging roller 2 for charging the photosensitive drum 1, the cleaning blade 6 for removing the toner remaining without being transferred onto the photosensitive drum 1. The untransferred residual toner remaining on the photosensitive drum 1 not having been transferred onto the sheet 12 is collected by the cleaning blade 6. Further, the residual toner collected by the cleaning blade 6 is accommodated in a removed developer accommodating portion (hereinafter referred to as a waste toner accommodating portion) 4014*a* from the opening 4014*b*. The waste toner container 4014*a* and the cleaning blade 6 are integrated into a drum cartridge (photosensitive member unit, drum unit, image bearing member unit) 4013.

The image forming apparatus 4100A is provided on the main assembly frame with guides (positioning means) such as a mounting guide and a positioning member (not shown). The developing cartridge 4004 and the drum cartridge 4013 are guided by the above-described guides and are mountable to and dismountable from the image forming apparatus main assembly 4100A.

Toners of respective colors of yellow (Y), magenta (M), cyan (C), and black (K) are accommodated in the developing cartridges 4004 for the respective colors.

The intermediary transfer belt 5 contacts the photosensitive drum 1 of each drum cartridge 4013 and rotates (moves) in the direction of arrow B in FIG. 1. The intermediary transfer belt 5 is wound around a plurality of support members (a drive roller 51, a secondary transfer opposed roller 52, a driven roller 53). On the inner peripheral surface side of the intermediary transfer belt 5, four primary transfer rollers 8 as primary transfer means are juxtaposed so as to face each photosensitive drum 1. A secondary transfer roller 9 as a secondary transfer means is disposed at a position facing the secondary transfer opposing roller 52 on the outer peripheral surface side of the intermediary transfer belt 5.

At the time of image formation, the surface of the photosensitive drum 1 is first uniformly charged by the charging roller 2. Then, the surface of the thus charged photosensitive drum 1 is scanned by and exposed to laser beam corresponding to image information emitted from the scanner unit 3. By this, an electrostatic latent image corresponding to image information is formed on the photosensitive drum 1. The electrostatic latent image formed on the photosensitive drum 1 is developed into a toner image by the developing cartridge 4004. The toner image formed on the photosensitive drum 1 is transferred (primary transfer) onto the intermediary transfer belt 5 by the operation of the primary transfer roller 8.

For example, when a full-color image is formed, the above-described process is sequentially performed in the four drum cartridges 4013 (4013Y, 4013M, 4013C, 4013K) and the four developing cartridges 4004 (4004Y, 4004M, 4004C, 4004K). The toner images of the respective colors formed on the photosensitive drums 1 of the respective drum cartridges 4013 are sequentially primarily transferred so as to be superimposed on the intermediary transfer belt 5. Thereafter, in synchronism with the movement of the intermediary transfer belt 5, the recording material 12 is conveyed to the secondary transfer portion. The four color toner images on the intermediary transfer belt 5 are altogether transferred onto the recording material 12 conveyed to the secondary transfer portion constituted by the intermediary transfer belt 5 and the secondary transfer roller 9.

The recording material 12 to which the toner image has been transferred is conveyed to a fixing device 10 as fixing means. By applying heat and pressure to the recording material 12 in the fixing device 10, the toner image is fixed on the recording material 12. Further, the primary transfer residual toner remaining on the photosensitive drum 1 after the primary transferring process is removed by the cleaning blade 6 and collected as waste toner. Further, the secondary transfer residual toner remaining on the intermediary transfer belt 5 after the secondary transfer step is removed by the intermediary transfer belt cleaning device 11.

The image forming apparatus 4100A is also capable of forming monochrome or multicolor images using desired single or some (not all) image forming units.

[General Arrangement of Process Cartridge]

Referring to FIGS. 143, 144, 145 and 146, the description will be made as to the general arrangements of the drum cartridges 4013 (4013Y, 4013M, 4013C, 4013K) and the developing cartridges 4004 (4004Y, 4004M, 4004C, 4004K) mountable to the image forming apparatus main assembly 4100A of this embodiment.

The drum cartridge 4013Y, the drum cartridge 4013M, the drum cartridge 4013C, and the drum cartridge 4013K have the same structures. In addition, the developing cartridge 4004Y containing the yellow toner, the developing cartridge 4004M containing the magenta toner, the developing cartridge 4004C containing the cyan toner and the developing cartridge 4004K containing the black toner have the same structures. Therefore, in the following description, each of the drum cartridges 4013Y, 4013M, 4013C, and 4013K will be commonly referred to as a drum cartridge 4013, and each developing cartridge 4004Y, 4004M, 4004C, and 4004K will be commonly referred to as a developing cartridge 4004. The respective cartridge components will also be commonly described in the same manner.

FIG. 143 is an external perspective view of the drum cartridge 4013. Here, as shown in FIG. 143, the direction of the rotation axis of the photosensitive drum 1 is defined as a Z direction (arrow Z1, arrow Z2), the horizontal direction in FIG. 142 as X direction (arrow X1, arrow X2), the vertical direction is a Y direction (arrow Y1, arrow Y2) in FIG. 142.

The drum unit bearing members 4039R and 4039L are mounted to the sides of the cleaning frame 4014, respectively, and support the photosensitive drum unit 4030. By this, the photosensitive drum unit 4030 is supported so as to be rotatable relative to the cleaning frame 4014. Rotation.

In addition, a charging roller 2 and a cleaning blade 6 are mounted to the cleaning frame 4014, and they are arranged so as to be in contact with the surface of the photosensitive drum 1. A charging roller bearing 15 is mounted to the cleaning frame 4014. The charging roller bearing 15 is a bearing for supporting the shaft of the charging roller 2.

Here, the charging roller bearings 15 (15R, 15L) are mounted so as to be movable in the direction of the arrow C shown in FIG. 144. A rotating shaft 2*a* of the charging roller 2 is rotatably mounted to the charging roller bearing 15 (15R, 15L). The charging roller bearing 15 is urged toward the photosensitive drum 1 by a pressing spring 16 as an urging means. As a result, the charging roller 2 abuts against the photosensitive drum 1 and is rotated by the photosensitive drum 1.

The cleaning frame 4014 is provided with a cleaning blade 6 as a cleaning means for removing the toner remaining on the surface of the photosensitive drum 1. The cleaning blade 6 is formed by unitizing a blade-shaped rubber (elastic member) 6*a* that abuts against the photosensitive drum 1 to remove toner on the photosensitive drum 1 and a supporting metal plate 6*b* that supports the blade-like rubber (elastic member) 6*a* In this embodiment, the support metal plate 6*b* is fixed to the cleaning frame 4014 with screws.

As described in the foregoing, the cleaning frame 4014 has an opening 4014*b* for collecting the transfer residual toner collected by the cleaning blade 6. The opening 4014*b* is provided with a blowing prevention sheet 26 which is in contact with the photosensitive drum 1 and seals between the photosensitive drum 1 and the opening 4014*b* to prevent toner leakage in the upper portion of the opening 4014*b*.

FIG. 145 is an external perspective view of the developing cartridge 4004.

The developing cartridge 4004 includes a developing frame 4018 for supporting various elements. In the developing cartridge 4004, there is provided a developing roller 4017 as a developer carrying member which rotates in the direction of arrow D (counterclockwise direction) shown in FIG. 5 in contact with the photosensitive drum 1. The developing roller 4017 is rotatably supported by the developing frame 4018 through development bearings 4019 (4019R, 4019L) at both end portions with respect to the longitudinal direction (rotational axis direction) thereof. Here, the developing bearings 4019 (4019R, 4019L) are mounted to respective side portions of the developing frame 4018, respectively.

Further, as shown in FIG. 146, the developing cartridge 4004 includes a developer accommodating chamber (hereinafter referred to as a toner accommodating chamber) 4018*a* and a developing chamber 4018*b* in which the developing roller 4017 is provided.

In the developing chamber 4018*b*, there are provided a toner supply roller 4020 as a developer supply member which contacts the developing roller 4017 and rotates in the direction of arrow E, and a developing blade 21 as a developer regulating member for regulating the toner layer of the developing roller 4017. The developing blade 21 is fixed and integrated to the fixing member 22 by welding or the like.

A stirring member 23 for stirring the contained toner and for conveying the toner to the toner supplying roller 4020 is provided in the toner accommodating chamber 4018*a* of the developing frame 4018.

[Structure of Main Assembly Driving Shaft]

Referring to FIGS. 147 and 148, the structure of the main assembly driving shaft 4101 will be described.

FIG. 147 is an external view of the main assembly driving shaft 4101.

FIG. 148 is a cross-sectional view taken along the rotation axis (rotation axis) of the main assembly driving shaft 4101 mounted to the image forming apparatus main assembly.

As shown in FIG. 147, the main assembly driving shaft 4101 comprises a gear member 4101*e*, a intermediate member 4101*p*, a output member 4101*q*, and a drive transmission member 4101*r*.

A motor (not shown) as a drive source is provided in the image forming apparatus main assembly 4100A. From this motor, the gear member 4101*e* is supplied with a rotational driving force, and the driving force is transmitted in the order of the intermediate member 4101*p*, the output member 4101*q*, and the drive transmission member 4101*r*, so that the main assembly driving shaft 4101 rotates. The gear member 4101*e*, the intermediate 4101*p* and the output member 4101*q* constitute a mechanism of the Oldham coupling, in which movement is possible in the X direction and Y direction within a certain distance range. Therefore, the drive transmission member 4101*r* provided through the Oldham coupling on the cartridge side of the main assembly driving shaft 4101 can also move within a certain distance range in the X direction and Y direction. The drive transmission member 4101*r* is provided with a rotatable shaft portion 4101*f*, and the rotational driving force received from the motor is transmitted to the developing cartridge 4004 side by the way of a groove-shaped drive transmission groove 4101*a* (a recessed portion, a drive passing portion) provided in the shaft portion 4101*f*. Furthermore, the shaft portion 4101*f* has a conical shape 4101*c* at the free end thereof.

The main assembly drive transmission groove 4101*a* has such a shape that a part of an engagement portion 4073 which will be described hereinafter can enter. Specifically, it is provided with a main assembly drive transmission surface 4101*b* as a surface that contacts the driving force receiving surface (driving force receiving portion) 4073*a* of the coupling member 4028 to transmit the driving force.

Further, as shown in FIG. 147, the main assembly drive transmission surface 4101*b* is not a flat surface but a shape twisted about the rotational axis of the main assembly driving shaft 4101. The twisting direction is such that the downstream side in the Z1 direction of the main assembly driving shaft 4101 is upstream of the downstream side in the Z2 direction thereof, with respect to the rotational direction of the main assembly driving shaft 4101. In this embodiment, the amount of twisting along the rotational axis direction of the cylinder of the engaging portion 4073 is set to about 1 degree per 1 mm. The reason why the main assembly drive transmission surface 4101*b* is twisted will be described hereinafter.

Also, a main assembly side dismounting taper 4101*i* is provided on a downstream side surface with respect to the Z2 direction of the main assembly drive transmission groove 4101*a*. The main assembly side dismounting taper portion 4101*i* has a taper (inclined surface, inclined portion) for assisting the engagement portion 4073 to be disengaged from the drive transmission groove 4101*a* when dismounting the developing cartridge 4004 from the apparatus main assembly 4100A.

As shown in FIG. 148, a supported portion 4101*d* provided on the gear member 4101*e* is rotatably supported (axially supported) by a bearing member 4102 provided in the image forming apparatus main assembly 4100A. The output member 4101*q* is rotatably supported by a coupling holder 4101*s*. In addition, the drive transmission member 4101*r* is supported by the output member 4101*q* so as to be movable in the Z direction, and is urged toward the developing cartridge 4004 (the Z2 direction) by the spring member 4103. However, the movable amount (play) of the drive transmission member 4101*q* in the Z direction is about 1 mm, which is sufficiently smaller than the width of a driving force receiving surface 4073*a* which will be described hereinafter, in the Z direction.

Further, the coupling holder 4101*s* is urged in the substantially Y2 direction by the biasing spring 4101*t*. Therefore, as will be described hereinafter, when mounting the developing cartridge 4004, the drive transmission member 4101*r* is in a position shifted in the substantially Y2 direction relative to the axis line of the gear member 4101*e*.

As described above, the drive transmission member 4101*r* is provided with the main assembly drive transmission groove 4101*a*, and the coupling member 4028 is provided with the engagement portion 4073, so that the drive is transmitted from the apparatus main assembly 4100A to the development cartridge 4004.

As will be described in detail hereinafter, the engaging portion 4073 is provided at the free end of the elastically deformable base portion 4074. Therefore, the engaging portion 4073 is configured to be movable radially outward when the developing cartridge 4004 is mounted to the apparatus main assembly 4100A. By doing so, as the developer cartridge 4004 is inserted into the apparatus main assembly 4100A, the engagement portion 4073 enters the drive transmission groove 4101*a*, and the engagement portion 4073 and the main assembly drive transmission groove 4101*a* can engage with each other.

[Structure of Coupling Member]

Referring to FIGS. 149, 150, 151, and 152, the coupling member 4028 of this embodiment will be described in detail.

FIG. 149 is a cross-sectional view of the coupling member 4028 taken along a plane perpendicular to the axis of rotation of the coupling member 4028 and including the base portion 4074.

FIG. 150 is an illustration of the cylinder member 4070 as viewed in the Z direction from the outer side.

FIG. 151 is a perspective view of an alignment member 4033.

FIG. 152 in an illustration of the assembly of the coupling member 4028.

As shown in FIG. 149, the coupling member 4028 constituted by combination of two members, namely the cylinder member 4070 and the alignment member 4033. However, depending on selection of material and molding method, there is no need to have two bodies, it may be integrated, or may be constituted by combining three or more members. The alignment member 4033 is a positioning member for determining the position of the coupling member 4028 relative to the drive transmission shaft and also a driving force receiving member to which the driving force is transmitted from the cylinder member 4070.

As shown in FIG. 152, the aligning member 4033 is assembled to the cylinder member 4070 in the axial direction (indicated by an arrow) of the cylinder member (driving force receiving member) 4070. Further, by rotating the aligning member 4033 in the counterclockwise direction (shown by the arrow), the retaining portion 4033*c* is engaged with a hooking portion 4072 to be unitized.

(Description on Flange Member)

As shown in FIG. 150, the base member 4074 of the cylinder member 4070 includes a root portion 4074*a*, a winding portion 4074*b*, and a straight portion 4074*c* that linearly connects the root portion 4074*a* and the winding portion 4074*b*.

The engaging portion 4073 provided in the cylinder member 4070 protrudes at least radially inward of the coupling member 4028 in order to engage with the main assembly driving shaft 4101. The engaging portion 4073 is provided at the free end of the base portion 4074 and has a driving force receiving surface 4073*a*. The driving force receiving surface 4073*a* is a driving force receiving portion for receiving the driving force from the main assembly driving shaft 4101 by contacting the driving transmission groove 4101*a*. Further, the engaging portions 4073 are provided at three positions (120 degrees intervals, substantially equally spaced) at regular intervals in the circumferential direction of the coupling member 4028. Similarly, the base portion 4074 is also provided at three positions equally spaced in the circumferential direction of the cylindrical portion 4071. The base portion 4074 has a fixed end in the cylindrical portion 4071, and has a shape that is elastically deformable with the fixed end as a fulcrum.

That is, the base portion 4074 is an extending portion (extension, extension portion) extending at least in the circumferential direction of the coupling member 4028. Further, the engaging portion 4073 is a protrusion provided at the free end of the base portion 4073. The base portion 4074 and the engaging portion 4073 are support portions for supporting the driving force receiving surface 4073*a*.

The engaging portion 4073 is supported by an elastically deformable base portion 4074 and can move in the radial direction of the coupling member 4028 by deformation of the base portion 4074. In other words, the base portion 4074 deforms when receiving an external force and has a restoring force in a direction of restoring to the position in the natural state.

Specifically, when the engaging portion 4073 is brought into contact with the outer peripheral surface of the drive transmission member 4101*r*, the engaging portion 4073 elastically deforms so that the engaging portion 4073 moves outward in the radial direction along the outer peripheral surface of the drive transmission member 4101*r*. Thereafter, when the engaging portion 4073 is at the same position (same phase) as the main assembly side drive transmission groove 4101*a* provided on the outer peripheral surface of the drive transmission member 4101*r*, the elastic deformation of the engaging portion 4073 is released. Then, the engaging portion 4073 moves inwardly in the radial direction, so that a part of the engaging portion 4073 can enter the main assembly drive transmission groove 4101*a*.

from the standpoint of driving stability, it is preferable to provide a plurality of the engaging portions 4073 in the circumferential direction of the cylinder member 4070.

The driving force receiving surface 4073*a* of the coupling member 4028 has a shape twisted about the axis of the coupling member 4028, and in this embodiment, the amount of twisting is set to be the same as that of the main assembly drive transmission surface 4101*b*.

It is sufficient that the driving force receiving surfaces 4073*a* have different phases of two points in contact with the drive transmission member 4101*r* in the rotational direction. That is, the driving force receiving surface 4073*a* may not necessarily have a twisted shape if it has the same function as the twisted surface. Since the driving force receiving surface 4073*a* has the twisted shape, the coupling member 4028 receives a force to be attracted toward the outside of the developing cartridge 4004 (Z1 direction) when the driving force receiving surface 4073*a* receives the driving force.

Further, as shown in FIG. 149, the engaging portion 4073 is provided with the mounting tapered surface 4073*d* as a mounting force receiving portion on the outer side (the Z1 direction side) of the developing cartridge 4004 in the Z direction. In addition, the engaging portion 4073 is provided with the dismounting tapered surface 4073*e* as a dismounting force receiving portion on the inner side (the Z2 direction side) of the developing cartridge 4004 in the Z direction. By this, the mountability and dismountability of the coupling member 4028 relative to the main driving shaft 4101 can be improved.

At the time of mounting, the mounting tapered surface 4073*d* and the conical shape 4101*c* contact to each other, and the engaging portion 4073 is moved toward the outside in the radial direction of the driving shaft. Further, at the time of dismounting, the dismounting tapered surface 4073*e* and the main assembly side removing taper 4101*i* are brought into contact with each other, and the engagement portion 4073 is moved toward the outside in the radial direction of the main assembly driving shaft 4101.

(Description of on Manufacturing Method)

As in the case of Embodiment 5, in the case of manufacturing using injection molding, it is preferable to use a two-piece structure as in Embodiment 6.

Similarly to Embodiment 5, the end of the insertion taper 4073 and the end of the driving force receiving surface 4073*a* are arranged at the same position in the Z direction, and the parting plane at the engaging portion 1473 is made straight.

The inner diameter of the portion where the root portion 4074*a* of the cylinder member 4070 is provided is substantially the same as the inner diameter of the other portion as in Embodiment 5.

As in Embodiment 5, the engaging portion 4073 and the support 4074 do not overlap with other portions on a projection plane provided by projecting the cylinder member 4070 on a plane perpendicular to the rotation axis (Z direction).

[Insert Molding of Flange Member]

The material, shape, and manufacturing method of the coupling member 4028 may be appropriately selected if the mountability and drive transmission are stable. In particular, when considering mass productivity (POM, PPS, PS, nylon, etc.), it is preferable to use a resin material.

The cylinder member 4070 of this embodiment is formed by insert-molding a sheet metal made of stainless steel as shown in Embodiment 6.

(Description on Alignment Member).

As shown in FIG. 151, the alignment member 4033 has a positioning portion 4033*a*. The positioning portion 4033*a* is a portion for determining a position of the main assembly driving shaft 4101 of the drive transmission member 4101*r* in the axial direction and in the radial direction. The positioning portion 4033*a* is provided with a inverted conical curved surface, which is capable of making contact with the conical shape 4101*c* of the drive transmission member 4101*r*, so that the movement of the drive transmission member 4101*r* in the axial direction and in the radial direction of the main driving shaft 4101 is restricted.

[Driving of Coupling Member by Main Assembly Drive Shaft]

As described above, the driving force receiving surface 4073*a* has a shape twisted about the center of the rotation axis of the cylinder member 4070 similarly to the Embodiment 1. When the driving force receiving surface 4073*a* is driven by the main assembly driving shaft 4101, the inverted conical shape 4033*a* of the aligning member 4033 is reliably brought into contact with the conical shape 4101*c* at the free end of the main assembly driving shaft 4101.

The inverted conical shape 4033*a* of the alignment member 4033 abuts to the conical shape 4101*c* at the free end of the main assembly driving shaft 4101 to suppress the inclination of the axis of the drive transmission member 4101*r* relative to the axis of the cylinder member 4070. As for the deviation of the axis center between the cylinder member 4070 and the drive transmission member 4101*r*, the influence on the rotation can be reduced by the Oldham mechanism provided in the apparatus main assembly 4100A as described above.

Further, when a driving force is applied from the main assembly driving shaft 4101, the winding portion 4074*b* winds around the shaft portion 4101*f*. Thus, as in Embodiment 5, even if the load received by the cylinder member 4070 changes, the deformation amount of the base portion 4074 is small, so that the influence of deformation on the rotation of the cylinder member 4070 can be suppressed to a small extent.

As shown in FIG. 152, the driving force from the cylinder member 4070 to the alignment member 4033 is transmitted by engagement between the flange drive transmission surface (transmission portion) 4070*m* and the alignment drive transmission surface (transmission portion) 4033*m*. The flange drive transmission surface 4070*m* and the alignment drive transmission surface 4033*m* are arranged at three positions (120 degrees spacing, approximately equal intervals) at regular intervals in the circumferential direction of the cylinder member 4070 and the alignment member 4033. Further, the flange drive transmission surface 4070*m* and the alignment drive transmission surface 4033*m* are twisted about the axis of the cylinder member 4070 and the alignment member 4033, respectively, and the twist amount is about 2 degrees per 1 mm. The amount of twisting is determined so as to always satisfy Fz2>Fz1, when the cylinder member 4070 receives the force Fz1 toward the outside (Z1 direction) of the developing cartridge 4004 at the driving force receiving surface 4073*a* and receives the force Fz2 toward the inside of the developing cartridge 4004 (Z2 direction) at the flange driving transmission surface 4070*m*. Therefore, the cylinder member 4070 is always attracted in the Z2 direction. In addition, at least a part of the engagement portion D, in the Z direction, between the flange drive transmission surface 4070*m* and the alignment drive transmission surface 4033*m* overlaps with the root portion 4074*a* in the Z direction, and the amount of the deformation of the cylinder member 4070 can be suppressed.

Further, in this embodiment, as shown in FIG. 153, the drive is transmitted from the alignment member 4033 to the shaft of the toner supply roller 4020, so that the toner supply roller 4020 can rotate.

That is, in this embodiment, the coupling member 4028 is disposed coaxial with the axis of the toner supply roller 4020 and is fixed to the shaft of the toner supply roller 4020. That is, the aligning member has a mounting portion 4033*d* (FIG. 151) which provides a D-shaped opening. This mounting portion 4033*d* is fitted to the end portion of the shaft formed in the D shape, and the coupling member 4028 is fixed to the toner supply roller 4020.

When the toner supply roller 4020 rotates, the drive is transmitted to the toner supply roller gear 4098 provided on the downstream side of the axis of the toner supply roller 4020 with respect to the Z1 direction. Finally, the drive is transmitted from the toner supply roller gear 4098 to the developing roller gear 4099 provided in the downstream side of the axis of the developing roller 4017 with respect to the Z1 direction, whereby the developing roller 4020 can rotate.

In this embodiment, a drive transmission radius L2 from the drive transmission member 4101*r* to the flange member satisfies L2>L1, where L1 is a drive transmission radius L1 from the alignment member 4033 to the axis of the toner supply roller 4020.

That is, the shortest distance from the drive transmission portion (drive transmission surface 4073*a*) to the axis of the coupling member 4028 is longer than the distance from the mounting portion 4033*d* to the axis.

By doing so, it is possible to make the force applied to the driving force receiving surface 4073*a* of the cylinder member 4070 smaller than the load torque of the shaft of the toner supply roller 4020, thereby suppressing the deformation amount of the cylinder member 4070 is possible.

[Mounting of Cartridge to Image Forming Apparatus Main Assembly]

Referring to FIGS. 154 and 155, the mounting and dismounting of the developing cartridge 4004 relative to the main assembly of the image forming apparatus will be described.

FIG. 154 is a perspective view illustrating mounting of the developing cartridge 4004 to the image forming apparatus main assembly 4100A.

FIG. 155 is cross-sectional views illustrating the mounting operation of the developing cartridge 4004 to the image forming apparatus main assembly 4100A.

The image forming apparatus main assembly 4100A of this embodiment employs a structure in which the developing cartridge 4004 and the drum cartridge 4013 can be mounted in the horizontal direction. Specifically, the image forming apparatus main assembly 4100A includes therein a space in which the developing cartridge 4004 and the drum cartridge 4013 can be mounted. The cartridge door 4104 (front door) for a permitting insertion of the developing cartridge 4004 and the drum cartridge 4013 into the space is provided on the front side of the image forming apparatus main assembly 4100A (the side to which the user stands for use).

As shown in FIG. 154, the cartridge door 4104 of the image forming apparatus main assembly 4100A is provided so as to be opened and closed. When the cartridge door 4104 is opened, the lower cartridge guide rail 4105 for guiding the developing cartridge 4004 is provided on the bottom of the space, and the upper cartridge guide rail 4106 is disposed on the upper surface. The developing cartridge 4004 is guided to the mounting position by the upper and lower guide rails (4105, 4106) provided above and below the space. The developing cartridge 4004 is inserted into the mounting position substantially along the axis of the developing roller 4020.

Referring to FIG. 155, the mounting and dismounting operations of the developing cartridge 4004 to the image forming apparatus main assembly 4100A will be described below.

As shown in part (a) of FIG. 155, the developing cartridge 4004 is inserted in the state that the lower part of the end portion on the rear side in the inserting direction is supported and guided by the lower cartridge guide rail 4105, and the upper side of the end portion thereof on the rear side in the inserting direction is guided by the upper cartridge guide rail 4016. There is a dimensional relationship such that the intermediary transfer belt 5 does not contact with the developing frame 4018 or the developing bearing 4019.

As shown in part (b) of FIG. 155, the developing cartridge 4004 is horizontally inserted while being supported by the lower cartridge guide mil 4105, and is inserted until it the abuts to the rear cartridge positioning portion 4108 provided in the image forming apparatus main assembly 4100A.

When the developing cartridge 4004 is mounted in this manner, the drive transmission member 4101*r* of the image forming apparatus main assembly 4100A is engaged with the coupling member 4028 while being urged substantially in the Y2 direction.

Part (c) of FIG. 155 is an illustration of the state of the image forming apparatus main assembly 4100A and the developing cartridge 4004 in a state in which the cartridge door 4104 is closed. The lower cartridge guide rail 4105 of the image forming apparatus main assembly 4100A is configured to move up and down in interrelation with the opening and closing of the cartridge door (front door) 4104.

When the user closes the cartridge door 4104, the lower cartridge guide rail 4105 is raised. Then, both end portions of the developing cartridge 4004 contacts to the cartridge positioning portions (4108,4110) of the image forming apparatus main assembly 4100A, and the developing cartridge 4004 is positioned relative to the image forming apparatus main assembly 4100A. Further, the drive transmission member 4101*r* of the image forming apparatus main assembly 4100A also follows the developing cartridge 4004 so as to move upward.

By the above-described operation, the mounting of the developing cartridge 4004 to the image forming apparatus main assembly 4100A is completed.

Further, the dismounting operation of the developing cartridge 4004 from the image forming apparatus main assembly 4100A is performed in the reverse order of the above-described inserting operation.

[Engaging Process of Coupling Member to Main Assembly Drive Shaft]

Referring to FIG. 156, the engagement process of the coupling member 4028 and the main assembly driving shaft 4101 will be described in detail.

FIG. 156 is sectional views illustrating the operation of mounting the coupling member 4028 on the main assembly driving shaft 4101.

Part (a) of FIG. 156 in an illustration of a state in which the coupling member 4028 starts engaging with the drive transmission member 4101*r*. In addition, part (d) of FIG. 156 shows a state in which the developing cartridge 4004 is mounted to the image forming apparatus main assembly 4100A. Particularly, part (d) of FIG. 156 shows a state in which the lower cartridge guide rail 4105 is raised as the cartridge door 4104 closes, and the developing cartridge 4004 is positioned with respect to the image forming apparatus main assembly 4100A.

Here, part (b) of FIGS. 156 and (c) are illustrations of the mounting process of the coupling member 4028 and the drive transmission member 4101*r* between the positions of shown in part (a) of FIG. 156 and part (d) of FIG. 156. The drive transmission member 4101*r* is urged substantially in the direction Y2 by the urging spring 4101*t* and the axis of the drive transmission member 4101*r* is urged to a position shifted substantially in the Y2 direction from the axis of the coupling member 4028.

As has been described referring to FIG. 155, the developing cartridge 4004 is horizontally inserted while being supported by the lower cartridge guide rail 4105 of the image forming apparatus main assembly 4100A.

Part (a) of FIG. 156 is an illustration of a state in which the drive transmission member 4101*r* is not in contact with the coupling member 4028. As described above, in this state, the axis of the drive transmission member 4101*r* and the axis of the coupling member 4028 are deviated from each other. Therefore, the conical shape 4101*c* of the drive transmission member 4101*r* is brought into contact with the insertion tapered surface 4073*d* of the coupling member 4028.

As shown in part (b) of FIG. 156, when the coupling member 4028 is further inserted from the position shown in part (a) of FIG. 156 toward the back side of the drive transmission member 4101*r*, the mounting tapered surface 4073*d* of the coupling member 4028 is guided by the conical shape portion 4101*c* of the drive transmission member 4101*r*, so that the axis of the coupling member 4028 and the axis of the drive transmission member 4101*r* become substantially aligned.

As shown in part (c) of FIG. 156, when the coupling member 4028 is further inserted toward the back side of the drive transmission member 4101*r* from part (b) of FIG. 156 position, the coupling member 4028 is inserted to the drive transmission member 4101*r* until the dismounting tapered surface 4073*e* of the engaging portion 4073 of the coupling member 4028 comes to the back side in the Z direction beyond the main assembly side dismounting taper 4101*i* of the drive transmission member 4101*r*. Then, the coupling member 4028 is inserted to the drive transmission member 4101*r* until the positioning portion 4033*a* of the coupling member 4028 abuts against the conical shape 4101*c* of the drive transmission member 4101*r*.

Thereafter, as described above, the developing cartridge 4004 is lifted up by the lower cartridge guide rail 4105, so that the developing cartridge 4004 is positioned in place relative to the image forming apparatus main assembly 4100A (shown in part (c) of FIG. 155). Further, as shown in part (d) of FIG. 155, the drive transmission member 4101*r* also rises as the developing cartridge 4004 moves up.

As described above, as the developer cartridge 4004 is mounted to the apparatus main assembly 4100A, the main assembly drive transmission groove 4101*a* and the engagement portion 4073 can be engaged with each other. Therefore, there is no need to move the main assembly driving shaft 4101 to engage with the coupling member 4028. That is, there is no need to provide a mechanism for moving the main assembly driving shaft 4101 so as to engage with the coupling member 4028, in the apparatus main assembly 4100A of the image forming apparatus.

That is, it is not necessary to provide a mechanism for moving the main assembly driving shaft 4101 so as to engage with the coupling member 4028 after mounting the developing cartridge 4004 to the image forming apparatus main assembly 4100A.

When the developing cartridge 4004 is mounted to the apparatus main assembly 4100A, the engaging portion 4073 of the coupling member 4028 contacts to the main assembly driving shaft 4101 to retreat radially outward. The engaging portion 4073 is configured to engage with the groove (main assembly drive transmission groove 4101*a*) of the main assembly driving shaft 4101 by moving radially inward.

Here, it is also possible to provide a groove for receiving the drive on the coupling member, and a movable portion engageable with the groove by moving in the radial direction is provided on the main assembly driving shaft 4101 side. However, as compared with the developing cartridge 4004, the image forming apparatus main assembly 4100A is required to have higher durability. It is preferable to provide the movable portion (the engaging portion 4073) which moves in the radial direction as in this embodiment on the coupling member 4028 side of the developing cartridge 4004 from the standpoint of enhancing the durability of the image forming apparatus main assembly 4100A.

The base portion 4074, the engaging portion 4073, and the driving force receiving surface 4073*a* of the coupling member 4028 of this embodiment have substantially the shapes equivalent to those of the coupling member 628 of Embodiment 6. That is, the coupling member 4028 of this embodiment is a modification in which the structure is partially changed so that the coupling member 628 of Embodiment 6 is applied to the developing cartridge (developing apparatus) 4004.

However, the coupling member that can be utilized for the developing cartridge 4004 is not limited to the coupling member 628 disclosed in Embodiment 6. The coupling members disclosed in the embodiments other than Embodiment 6 may be used for the developing cartridge 4004.

Finally, representative structures disclosed in this application are summarized as follows. In the following, reference numerals are added to some elements in the structure example to indicate the correspondence with the elements described in the above-mentioned embodiments. However, such correspondence is merely examples for reference, and any element described below is not limited to the structure of the element of the above-mentioned embodiment.

Structure Example A1

A drum unit detachably mountable to a main assembly of the electrophotographic image forming apparatus comprising:

(I) a photosensitive drum (1); and (II) a coupling member provided on said photosensitive drum, said coupling member including (II-I) a driving force receiving portion (273*a*, 373*a*, 473*a*, 573*a*, 673*a*, 773*a*, 873*a*, 973*a*, 1073*a*, 1173*a*, 1273*a*, 1373*a*, 1673*a*, 2173*a*, 2273*a*, 2473*a*, 2673*a*) configured to receive a driving force for rotating said photosensitive drum, and (II-II) a supporting portion (273, 274, 372, 374, 473, 474, 573, 574, 673, 674, 773, 774, 873, 874, 973, 974, 1073, 1074, 1273, 1274, 1373, 1374, 1673, 1674, 2173, 2273, 2473, 2474, 2673, 2674) movably supporting said driving force receiving portion, wherein said supporting portion includes (II-II-I) a projected portion (273, 372, 473, 573, 673, 773, 873, 973, 1073, 1273, 1274, 1373, 1374, 1673, 1674, 2173, 2273, 2473, 2474, 2673) provided with said driving force receiving portion, and (II-II-II) extending portion (274, 374, 474, 574, 674, 774, 874, 974, 1074, 1274, 1374, 1674, 2173, 2273, 2474, 2674) extending in a direction crossing with a projecting direction of said projected portion, wherein at least a part of said supporting portion and/or at least a part of said driving force receiving portion is disposed inside said photosensitive drum (1).

Structure Example A2

A drum unit detachably mountable to a main assembly of the electrophotographic image forming apparatus comprising:

(I) a photosensitive drum (1); and (II) a coupling member provided on said photosensitive drum, said coupling member including (II-I) a driving force receiving portion (573*a*, 673*a*, 773*a*, 873*a*, 973*a*, 1073*a*, 1173*a*, 1273*a*, 1373*a*, 1673*a*, 2173*a*, 2273*a*) configured to receive a driving force for rotating said photosensitive drum, and (II-II) a supporting portion (573, 574, 673, 674, 773, 774, 873, 874, 973, 974, 1073, 1074, 1273, 1274, 1373, 1374, 1673, 1674, 2173, 2273) movably supporting said driving force receiving portion, wherein said supporting portion includes (II-II-I) a projected portion (573, 673, 773, 873, 973, 1073, 1273, 1274, 1373, 1374, 1673, 1674, 2173, 2273) provided with said driving force receiving portion, and (II-II-II) an extending portion (574, 674, 774, 874, 974, 1074, 1274, 1374, 1674, 2173, 2273) extend in a direction crossing with a projecting direction of said projected portion and at least in a direction of a circumferential direction of said coupling member.

Structure Example A3

A drum unit detachably mountable to a main assembly of the electrophotographic image forming apparatus comprising:

(I) a photosensitive drum;

(II) a coupling member provided on said photosensitive drum, said coupling member including, (II-I) a driving force receiving portion configured to receive a driving force for rotating said photosensitive drum, and (II-II) a supporting portion movably supporting said driving force receiving portion, and (II-II-I) wherein said supporting portion includes a projected portion provided with said driving force receiving portion, and (II-II-II) extending portion extending in a direction crossing with a projecting direction of said projected portion, wherein said driving force receiving portion is provided with an inclined portion which is inclined relative to a moving direction of said driving force receiving portion.

Structure Example A4

A drum unit detachably mountable to a main assembly of the electrophotographic image forming apparatus comprising:

(I) photosensitive drum;

(II) a coupling member provided on said photosensitive drum, said coupling member including (II-I) a driving force receiving portion configured to receive a driving force for rotating said photosensitive drum, and (II-II) a supporting portion movably supporting said driving force receiving portion; and (III) a borne portion configured to be rotatably supported, wherein said supporting portion includes (II-II-I) a projected portion provided with said driving force receiving portion, and (II-II-II) extending portion extending in a direction crossing with a projecting direction of said projected portion, and wherein at least a part of said supporting portion and/or at least a part of said driving force receiving portion is disposed inside said bearing-supported portion.

Structure Example A5

A drum unit detachably mountable to a main assembly of the electrophotographic image forming apparatus comprising:

(I) a photosensitive drum;

(II) a coupling member provided on said photosensitive drum, said coupling member including (II-I) a driving force receiving portion configured to receive a driving force for rotating said photosensitive drum, and (II-II) a supporting portion movably supporting said driving force receiving portion; and (III) a borne portion configured to be rotatably supported;

wherein said supporting portion includes (II-II-I) a projected portion provided with said driving force receiving portion, and (II-II-II) extending portion extending in a direction crossing with a projecting direction of said projected portion, and wherein as said supporting portion, said driving force receiving portion and said photosensitive drum are projected onto the axis of said coupling member, projected ranges of said supporting portion and said driving force receiving portion at least partly overlap a projected range of said photosensitive drum.

Structure Example A6

A drum unit detachably mountable to a main assembly of the electrophotographic image forming apparatus comprising:

(I) a photosensitive drum; and (II) a coupling member provided on said photosensitive drum, said coupling member including (II-I) a driving force receiving portion configured to receive a driving force for rotating said photosensitive drum, and a supporting portion having a free end and a fixed end and extending at least in an axial direction of said coupling member, said supporting portion movably supporting said driving force receiving portion, and at least a part of said supporting portion being disposed inside said coupling member, wherein said supporting portion including a projected portion provided with said driving force receiving portion and an extending portion extending in a direction crossing with a projecting direction of said projected portion, and wherein said coupling member includes a portion where a distance from an inner surface of said coupling member increases toward a free end side from a fixed end side of said supporting portion.

Structure Example A7

A drum unit detachably mountable to a main assembly of the image forming apparatus, said drum unit comprising:

(I) a photosensitive drum; and (II) a coupling member provided on said photosensitive drum, said coupling member including (II-I) a driving force receiving portion configured to receive a driving force for rotating said photosensitive drum, and (II-II) a supporting portion movably supporting said driving force receiving portion, wherein said supporting portion includes (II-II-I) a projected portion provided with said driving force receiving portion, and (II-II-II) extending portion extending in a direction crossing with a projecting direction of said projected portion, and wherein as said supporting portion, said driving force receiving portion and said photosensitive drum are projected onto the axis of said coupling member, at least a part of projected ranges of said supporting portion and said driving force receiving portion overlaps at least a part of a projected range of said photosensitive drum.

Structure Example A8

A drum unit detachably mountable to a main assembly of the electrophotographic image forming apparatus comprising:

(I) a photosensitive drum; and (II) a coupling member provided on said photosensitive drum, said coupling member including (II-I) a driving force receiving portion configured to receive a driving force for rotating said photosensitive drum, and (II-II) a supporting portion movably supporting said driving force receiving portion, wherein said driving force receiving portion is disposed inside a fixed end of said supporting portion with respect to an axial direction of said coupling member.

Structure Example A9

A drum unit detachably mountable to a main assembly of the electrophotographic image forming apparatus comprising:

(I) a photosensitive drum; and (II) a coupling member provided on said photosensitive drum, said coupling member including (II-I) a driving force receiving portion configured to receive a driving force for rotating said photosensitive drum, (II-II) a supporting portion movably supporting said driving force receiving portion, and (II-III) a recess provided at a position inside said driving force receiving portion with respect to an axial direction of said coupling member, wherein the recess of said coupling member opens in an outward direction with respect to the axial direction and converges toward an inside.

Structure Example A10

A drum unit detachably mountable to a main assembly of the electrophotographic image forming apparatus comprising:

(I) a photosensitive drum; and (II) a coupling member provided on said photosensitive drum, said coupling member including (II-I) a driving force receiving portion configured to receive a driving force for rotating said photosensitive drum, and (II-II) a supporting portion movably supporting said driving force receiving portion, wherein as said coupling member is viewed along an axis thereof, said supporting portion crosses with a normal line of said driving force receiving portion at a free end thereof.

21 Structure Example A1

A drum unit according to any one of Structure Examples A8-A10, wherein said supporting portion includes a projected portion provided with said driving force receiving portion and an extending portion extending in a direction crossing with a projecting direction of said projected portion.

Structure Example A12

A drum unit detachably mountable to a main assembly of the electrophotographic image forming apparatus comprising:

(I) a photosensitive drum; and (II) a coupling member provided on said photosensitive drum, wherein said coupling member includes (II-I) driving force receiving member including (II-I-I) a projected portion provided with a driving force receiving portion for receiving a driving force for rotating said photosensitive drum, and (II-I-II) an extending portion extending in a direction crossing with a project in the direction of said projected portion, and (II-II) a force-transmitted member for receiving a driving force from said driving force receiving member, wherein said driving force receiving member is movable relative to said force-transmitted member in a circumferential direction of said coupling member.

Structure Example A13

A drum unit detachably mountable to a main assembly of the electrophotographic image forming apparatus comprising:

(I) a photosensitive drum; and (II) a coupling member provided on said photosensitive drum, said coupling member including, (II-I) a driving force receiving member, and (II-II) a back-up member unintegral with said driving force receiving member;

wherein said driving force receiving member includes (II-I-I) a projection provided with a driving force receiving portion for receiving a driving force for rotating said photosensitive drum, and (II-I-II) an extending portion movably supporting said projection, said extending portion extending in a direction crossing with said projection, and wherein said back-up member including (II-II-I) for restricting movement of said driving force receiving portion in a circumferential direction of said coupling member.

Structure Example A14

A drum unit according to Structure Example A12 or A13, wherein said driving force receiving member includes a supporting portion having said projection and an extending portion and movably supporting said driving force receiving portion.

Structure Example A15

A drum unit detachably mountable to a main assembly of the electrophotographic image forming apparatus comprising:

(I) a photosensitive drum; and (II) a coupling member provided on said photosensitive drum, said coupling member including, (II-I) a movable driving force receiving portion configured receive a driving force for rotating said photosensitive drum, (II-II) a portion-to-be-urged movable together with said driving force receiving portion, in (II-III) a back-up portion for restricting movement of said driving force receiving portion in a circumferential direction of said coupling member, said back-up portion urging said driving force receiving portion at least radially inward of said coupling member when contacting said portion-to-be-urged.

Structure Example A16

A drum unit according to Structure Example A15, wherein said coupling member includes a supporting portion movably supporting said driving force receiving portion.

Structure Example A17

A drum unit according to Structure Example A16, wherein said supporting portion includes a projected portion provided with said driving force receiving portion, and an extending portion extending in a direction crossing with a projecting direction of said projected portion.

Structure Example A18

A drum unit according to any one of Structure Examples A1-A17, wherein said driving force receiving portion is movable at least in a radial direction of said coupling member.

Structure Example A19

A drum unit according to any one of Structure Examples A1-A18, wherein said supporting portion includes a deformed portion capable of elastic deformation to move said driving force receiving portion.

Structure Example A20

A drum unit according to any one of Structure Example A1-A19, wherein at least a part of said extending portion disposed inside said photosensitive drum.

Structure Example A21

A drum unit according to any one of Structure Examples A1-A20, wherein an entirety of said extending portion is disposed inside said photosensitive drum.

Structure Example A22

A drum unit according to Structure Examples A1-A21, wherein at least a part of said projected portion is inside said photosensitive drum.

Structure Example A23

A drum unit according to any one of Structure Examples A1-A22, wherein an entirety of said projected portion is disposed inside said photosensitive drum.

Structure Example A24

A drum unit according to any one of Structure Examples A1-A23, wherein a length of projection of said projected portion from said extending portion is shorter than a length of said extending portion.

Structure Example A25

A drum unit according to any one of Structure Examples A1-A24, wherein said projected portion is projected at least radially inward of said coupling member.

Structure Example A26

A drum unit according to any one of Structure Examples A1-A25, wherein at least a part of said driving force receiving portion is inside said photosensitive drum.

Structure Example A27

A drum unit according to any one of Structure Examples A1-A26, wherein an entirety of said driving force receiving portion is inside said photosensitive drum.

Structure Example A28

A drum unit according to any one of Structure Examples A1-A27, wherein an entirety of said supporting portion is inside said photosensitive drum.

Structure Example A29

A drum unit according to any one of Structure Examples A1-A28, wherein said driving force receiving portion is provided with an inclined portion inclined relative to a moving direction of said driving force receiving portion.

Structure Example A30

A drum unit according to Structure Example A29, wherein said inclined portion of said driving force receiving portion is inclined such that when receiving a driving force from the driving shaft, a force urging said driving force receiving portion at least radially inward of said coupling member is produced.

Structure Example A31

A drum unit according to Structure Example A29 or A30, wherein as viewed along an axis of said coupling member, said driving force receiving portion faces a line extended from a free end of said driving force receiving portion in a direction of radially outward movement of said driving force receiving portion.

Structure Example A32

A drum unit according to any one of Structure Examples A1-A31, wherein at least a part of said supporting portion is made of metal.

Structure Example A33

A drum unit according to any one of Structure Examples A1-A32, wherein said supporting portion includes a metal portion and a resin material portion.

Structure Example A34

A drum unit according to Structure Example A33, wherein a part of said metal portion is covered by said resin material portion, and the other part is uncovered by said resin material portion.

Structure Example A34-2

A drum unit according to Structure Example A33 or A34, wherein said metal portion is provided with a through-hole, at least in which said resin material portion is provided.

Structure Example A35

A drum unit according to any one of Structure Examples A1-A34-2, wherein at least a part of said supporting portion is made of resin material.

Structure Example A36

A drum unit according to any one of Structure Examples A1-A35, wherein a cross-sectional configuration of said supporting portion taken along a plane perpendicular to the axial direction of said coupling member at a position where said driving force receiving portion is provided is non-circular.

Structure Example A37

A drum unit according to any one of Structure Examples A1-A36, wherein said coupling member comprises a plurality of such driving force receiving portions and the plurality of such supporting portions.

Structure Example A38

A drum unit according to Structure Example A37, wherein as viewed along the axial direction of said coupling member, said driving force receiving portions are provided substantially at regular intervals.

Structure Example A39

A drum unit according to Structure Example A37 or A38, wherein the number of said driving force receiving portions of said coupling member and the number of said supporting portions of said coupling member are three.

Structure Example A40

A drum unit according to Structure Example A37 or A38, wherein the number of said driving force receiving portions of said coupling member and the number of said supporting portions of said coupling member are two.

Structure Example A41

A drum unit according to any one of Structure Examples A1-A40, wherein said supporting portion includes a deformed portion capable of elastic deformation to move said driving force receiving portion.

Structure Example A42

A drum unit according to any one of Structure Examples A1-A41, wherein said coupling member includes an inner surface contact portion contacting an inner circumferential surface of said photosensitive drum, and a cylindrical portion provided outside of said photosensitive drum with respect to the axial direction of said coupling member.

Structure Example A43

A unit according to Structure Example A42, wherein said supporting portion is supported by an inner surface of said inner circumferential surface contact portion.

Structure Example A44

A drum unit according to Structure Example A42, wherein said supporting portion is supported by an inner surface of a second cylindrical portion.

Structure Example A45

A drum unit according to Structure Example A42, wherein said coupling member includes a first inner diameter portion and a second inner diameter portion provided inside of said first inner diameter portion with respect to the axial direction and having an inner diameter which is smaller than an inner diameter of said first inner diameter portion.

Structure Example A46

A drum unit according to any one of Structure Examples A1-A45, wherein said coupling member is provided with a guide portion having a circular inner circumferential surface.

Structure Example A47

A drum unit according to any one of Structure Examples A1-A46, wherein said coupling member is provided with a curved surface portion extending along a circumferential direction of said coupling member and facing an axis of said coupling member, wherein said curved surface portion is disposed outside of a free end of said driving force receiving portion and inside of a fixed end of said supporting portion with respect to a radial direction of said coupling member.

Structure Example A48

A drum unit according to Structure Example A47, wherein said curved surface portion is supported by said supporting portion.

Structure Example A49

A drum unit according to Structure Example A47 or A48, wherein said curved surface portion is disposed in a side facing said driving force receiving portion with respect to a circumferential direction of said coupling member.

Structure Example A50

A drum unit according to any one of Structure Examples A47-A49, wherein said curved surface portion and the fixed end of said supporting portion are projected onto the axis of said coupling member, a projected range of said contact portion and a projected range of said fixed end are at least partly overlapped with each other.

Structure Example A51

A drum unit according to any one of Structure Examples A1-A50, wherein said driving force receiving portion is movable in the radial direction by at least 0.6 mm.

Structure Example A52

A drum unit according to Structure Examples A1-A51, wherein said driving force receiving portion is movable in the radial direction by at least 1.2 mm.

Structure Example A53

A drum unit according to any one of Structure Examples A1-A52, wherein said supporting portion is configured to move said driving force receiving portion to a position radially outward of said coupling member, as compared with a free state, when receiving a force from a outside of said drum unit.

Structure Example A54

A drum unit according to any one of Structure Examples A1-A53, wherein said projected portion is provided with an inclined portion facing outward with respect to the axial direction of said coupling member.

Structure Example A55

A drum unit according to any one of Structure Examples A1-A54, wherein said projected portion is provided with an inclined portion facing inward with respective the axial direction of said coupling member.

Structure Example A56

A drum unit according to any one of Structure Examples A1-A55, wherein at least a part of a fixed end of said supporting portion is disposed inside said photosensitive drum.

Structure Example A57

A drum unit according to any one of Structure Examples A1-A56, wherein an entirety of the fixed end of said supporting portion is disposed inside said photosensitive drum.

Structure Example A58

A drum unit according to any one of Structure Examples A1-A57, wherein said supporting portion moves said driving force receiving portion by deforming with the fixed end thereof as a fulcrum.

Structure Example A59

A unit according to any one of Structure Examples A1-A58, wherein said driving force receiving portion is disposed inside the fixed end of said supporting portion with respect to the radial direction of said coupling member.

Structure Example A60

A drum unit according to any one of Structure Examples A1-A59, wherein a free end of said supporting portion is inside the fixed end of said supporting portion with respect to the radial direction of said coupling member.

Structure Example A61

A drum unit according to any one of Structure Examples A1-A60, wherein said supporting portion extends at least in the axial direction of said coupling member.

Structure Example A62

A drum unit according to any one of Structure Examples A1-A61, wherein the fixed end of said supporting portion is disposed inside said driving force receiving portion with respect to the axial direction of said coupling member.

Structure Example A63

A drum unit according to any one of Structure Examples A1-A62, wherein the fixed end of said supporting portion is inside the free end of said supporting portion with respect to the axial direction of said coupling member.

Structure Example A64

A drum unit according to any one of Structure Examples A1-A63, wherein the fixed end of said supporting portion is disposed outside said driving force receiving portion with respect to the axial direction of said coupling member.

Structure Example A65

A drum unit according to any one of Structure Examples A1-A64, wherein the fixed end of said supporting portion is disposed outside the free end of said supporting portion with respect to the axial direction of said coupling member.

Structure Example A66

A drum unit according to any one of Structure Examples A1-A65, wherein said coupling member includes a portion where a distance from an inner surface of said coupling member increases toward a free end side from a fixed end side of said supporting portion.

Structure Example A67

A drum unit according to Structure Example A66, wherein said supporting portion is inclined so as to be away from the inner surface of said coupling member.

Structure Example A68

A drum unit according to any one of Structure Examples A1-A67, wherein said supporting portion is a snap-fit portion.

Structure Example A69

A drum unit according to any one of Structure Examples A1-68, wherein said supporting portion is connected with an inner surface of said coupling member.

Structure Example A70

A drum unit according to any one of Structure Examples A1-69, wherein said supporting portion extends at least in a circumferential direction of said coupling member.

Structure Example A71

A drum unit according to any one of Structure Examples A1-A70, wherein as viewed along the axis of said coupling member, said supporting portion crosses with a normal line to said drive receiving portion from a free end of said drive receiving portion.

Structure Example A72

A drum unit according to any one of Structure Examples A1-A71, wherein said supporting portion extends in a direction inclined relative to the axis of said coupling member by an angle not less than 30° and not more than 90°.

Structure Example A73

A drum unit according to any one of Structure Examples A1-A71, wherein said supporting portion extends in a direction inclined relative to the axis of said coupling member by a angle not less than 50° and not more than 90°.

Structure Example A74

A unit according to any one of Structure Examples A1-A73, wherein said supporting portion extends in a direction substantially perpendicular to the axis of said coupling member.

Structure Example A75

A drum unit according to any one of Structure Examples A1-A74, wherein as the fixed end of said supporting portion and said driving force receiving portion are projected onto the axis of said coupling member, the projected ranges thereof at least partly overlaps with each other.

Structure Example A76

A drum unit according to any one of Structure Examples A1-A75, wherein said supporting portion extends with an inclination relative to a direction perpendicular to the axis of said coupling member.

Structure Example A77

A drum unit according to any one of Structure Examples A1-A76, wherein said supporting portion extend the substantially in parallel with the axial direction.

Structure Example A78

A drum unit according to any one of Structure Examples A1-A77, further comprising a driving force receiving member provided with said driving force receiving portion and said supporting portion, and a force-transmitted member to which the driving force is transmitted from said driving force receiving member.

Structure Example A79

A drum unit according to Structure Example A78, wherein said force-transmitted member is fixed to said photosensitive drum.

Structure Example A80

A drum unit according to Structure Examples A78 or A79, wherein said driving force receiving member is movable in a circumferential direction of said coupling member relative to said force-transmitted member.

Structure Example A81

A drum unit according to any one of Structure Examples A78-A80, wherein said driving force receiving member is movably supported by said force-transmitted member.

Structure Example A82

A drum unit according to any one of Structure Examples A78-A81, wherein said driving force receiving member includes a plate-like portion.

Structure Example A83

A drum unit according to Structure Example A82, wherein said force-transmitted member includes a force-transmitted portion configured to receive the driving force from said driving force receiving member by contacting said plate-like portion, and said force-transmitted portion is contactable to a surface of said plate-like portion opposed to a surface provided with said driving force receiving portion.

Structure Example A84

A drum unit according to Structure Example A83, wherein said force-transmitted portion is disposed outside of a free end of said plate-like portion with respect to a radial direction of said coupling member.

Structure Example A85

A drum unit according to any one of Structure Examples A82-A84, wherein said plate-like portion includes a first portion provided with said driving force receiving portion, a second portion provided with said supporting portion and extending in a direction crossing with said first force, a bent portion provided between said first portion and said second portion.

Structure Example A86

A drum unit according to Structure Example A85, wherein said first portion projects at least radially inward of said coupling member, and said second portion extends at least in a circumferential direction of said coupling member.

Structure Example A87

A drum unit according to any one of Structure Examples A82-A86, wherein said plate-like portion is movable relative to said force-transmitted member.

Structure Example A88

A drum unit according to any one of Structure Examples A82-A87, wherein said plate-like portion has a portion having a thickness of not less than 0.1 mm.

Structure Example A89

A drum unit according to any one of Structure Examples A82-A88, wherein said plate-like portion has a portion having a thickness of not less than 0.2 mm.

Structure Example A90

A drum unit according to Structure Example A82, wherein said plate-like portion has a portion having a thickness of not more than 0.7 mm.

Structure Example A91

A drum unit according to any one of Structure Examples A82-A90, wherein said plate-like portion has a portion having a thickness of not more than 0.5 mm.

Structure Example A92

A drum unit according to any one of Structure Examples A82-A91, wherein said plate-like portion is made of metal.

Structure Example A93

A drum unit according to any one of Structure Examples A78-A92, wherein said driving force receiving member includes a leaf spring.

Structure Example A94

A drum unit according to any one of Structure Examples A78-A93, wherein said force-transmitted member includes a force-transmitted portion configured to receive the driving force from said driving force receiving member by contacting said plate-like portion, said force-transmitting portion being outside of the free end of said driving force receiving portion with respect to the radial direction of said coupling member.

Structure Example A95

A drum unit according to any one of Structure Examples A78-A94, wherein said driving force receiving member is movable in a circumferential direction of said coupling member relative to said force-transmitted member.

Structure Example A96

A drum unit according to any one of Structure Examples A78-A95, wherein said driving force receiving member rotatable about the axis of said coupling member relative to said force-transmitted member.

Structure Example A97

A drum unit according to any one of Structure Examples A78-A96, wherein said force-transmitted member includes a force-transmitted portion for receiving the driving force by contacting the driving force receiving member, and said force-transmitted portion is disposed outside of a free end of said plate-like portion with respect to the radial direction of said coupling member.

Structure Example A98

A drum unit according to any one of Structure Examples A78-A97, wherein said force-transmitted member is unintegral with said driving force receiving member.

Structure Example A99

A drum unit according to any one of Structure Examples A1-A98, wherein said coupling member provided with a back-up portion for restricting movement of said driving force receiving portion in the circumferential direction of said coupling member.

Structure Example A100

A drum unit according to Structure Example A99, wherein said back-up portion is opposed to said supporting portion in a side opposite from a side provided with said driving force receiving portion.

Structure Example A101

A drum unit according to Structure Example A99 or A100, wherein said back-up portion is provided with an inclined portion.

Structure Example A102

A drum unit according to Structure Example A101, wherein said inclined portion of said back-up portion is inclined such that a force urging said driving force receiving portion at least in a direction radially inward of said coupling member is produced.

Structure Example A103

A drum unit according to Structure Example A101 or A102, wherein said inclined portion is inclined relative to said driving force receiving portion Structure Example A104

A drum unit according to any one of Structure Examples A99-A103, wherein said coupling member includes a portion-to-be-urged movable together with said driving force receiving portion, and said back-up portion urges said driving force receiving portion at least radially inward of said coupling member, by contacting said portion-to-be-urged.

Structure Example A105

A drum unit according to Structure Example A104, wherein said supporting portion is provided with said portion-to-be-urged.

Structure Example A106

A drum unit according to any one of Structure Examples A99-A105, wherein said coupling member includes (1) a driving force receiving member provided with said driving force receiving portion and said supporting portion, and (2) a back-up member unintegral with said driving force receiving member and provided with said back-up portion.

Structure Example A107

A drum unit according to any one of Structure Examples A99-A106, wherein said coupling member includes (1) a driving force receiving member provided with said driving force receiving portion and said supporting portion, and (2) a back-up member having said back-up portion, and wherein said driving force receiving member is rotatable relative to said back-up member.

Structure Example A108

A drum unit detachably mountable to a main assembly of an electrophotographic image forming apparatus, said drum unit comprising:

(I) photosensitive drum; and (II) a coupling member provided on said photosensitive drum, said coupling member including (II-I) a plate-like portion provided with a driving force receiving portion for receiving a driving force for rotating said photosensitive drum, and (II-II) a force-transmitted member to which the driving force is transmitted from said plate-like portion.

Structure Example A109

A drum unit according to Structure Example A108, wherein said plate-like portion is movable at least in a radial direction of said coupling member relative to said force-transmitted member.

Structure Example A110

A drum unit according to Structure Example A108 or A109, wherein said plate-like portion is supported so as to be movable at least in a circumferential direction of said coupling member relative to said force-transmitted member.

Structure Example A111

A drum unit according to any one of Structure Examples A108-A110, wherein said force-transmitted member includes a force-transmitted portion for receiving the driving force from said driving force receiving member by contacting said plate-like portion, and said force-transmitted portion contacts a side opposite to the side of said plate-like portion provided with said driving force receiving portion.

Structure Example A112

A drum unit according to Structure Example A111, wherein said force-transmitted portion is disposed outside of a free end of said plate-like portion with respect to a radial direction of said coupling member.

Structure Example A113

A drum unit according to any one of Structure Examples A108-A112, wherein said plate-like portion includes a first portion provided with said driving force receiving portion, a second portion provided with said supporting portion and extending in a direction crossing with said first force, a bent portion provided between said first portion and said second portion.

Structure Example A114

A drum unit according to Structure Example A113, wherein said first portion projects at least radially inward of said coupling member, and said second portion extends at least in the circumferential direction of said coupling member.

Structure Example A115

A drum unit according to Structure Example A113 or A114, wherein said first portion is inclined relative to a radial direction of said coupling member.

Structure Example A116

A drum unit according to any one of Structure Examples A113-A115, wherein said first portion is inclined so as to produce the force urging said driving force receiving portion at least radially inward of said coupling member, when receiving said driving force.

Structure Example A117

A drum unit according to any one of Structure Examples A108-A116, wherein said plate-like portion is made of metal.

Structure Example A118

A drum unit according to any one of Structure Examples A108-A116, wherein said plate-like portion is a leaf spring.

Structure Example A119

A drum unit according to any one of Structure Examples A108-A118, wherein said plate-like portion is movable relative to said force-transmitted member.

Structure Example A120

A drum unit according to any one of Structure Examples A108-A119, wherein said plate-like portion has a portion having a thickness of not less than 0.1 mm.

Structure Example A121

A drum unit according to any one of Structure Examples A108-A120, wherein said plate-like portion has a portion having a thickness of not less than 0.2 mm.

Structure Example A122

A drum unit according to any one of Structure Examples A108-A121, wherein said plate-like portion has a portion having a thickness of not more than 0.7 mm.

Structure Example A123

A drum unit according to any one of Structure Examples A108-A122, wherein said plate-like portion has a portion having a thickness of not more than 0.5 mm.

Structure Example A124

A drum unit according to any one of Structure Examples A1-A123, wherein said coupling member is provided with a recess disposed inside said driving force receiving portion with respect to the axial direction of said coupling member and opening outward with respect to the axial direction.

Structure Example A125

A drum unit according to Structure Example A124, wherein the recess has a shape converging toward an inside of said coupling member with respect to the axial direction.

Structure Example A126

A drum unit according to Structure Example A124 or A125, wherein the recess has a portion substantially conically recessed.

Structure Example A127

A drum unit according to any one of Structure Examples A124-A126, wherein said coupling member includes a driving force receiving member provided with said driving force receiving portion, and a positioning member provided with the recess.

Structure Example A128

A drum unit according to any one of Structure Examples A124-A127, wherein said positioning member or said driving force receiving member is provided with a snap-fit portion for mounting said positioning member to said driving force receiving portion.

Structure Example A129

A drum unit according to Structure Example A127 or A128, wherein said positioning member is dismountable from said driving force receiving member by rotating relative to said driving force receiving member.

Structure Example A130

A drum unit detachably mountable to a main assembly of the electrophotographic image forming apparatus comprising:

- a photosensitive drum; and
- a coupling member provided on said photosensitive drum and configured to receive a driving force for rotating said photosensitive drum,
- wherein at least a part of said snap-fit portion is inside said photosensitive drum.

Structure Example A131

A drum unit detachably mountable to a main assembly of the electrophotographic image forming apparatus comprising:

- a photosensitive drum; and
- a coupling member provided on said photosensitive drum and configured to receive a driving force for rotating said photosensitive drum,
- wherein said snap-fit portion extends at least in a circumferential direction of said coupling member.

Structure Example A132

A drum unit detachably mountable to a main assembly of the electrophotographic image forming apparatus comprising:

a photosensitive drum; and a coupling member including a snap-fit portion to receive a driving force for rotating said photosensitive drum;

a borne portion rotatably supported;

wherein at least a part of said snap-fit portion is inside said borne portion with respect to an axial direction of said coupling member.

Structure Example A133

A drum unit detachably mountable to a main assembly of the image forming apparatus, said drum unit comprising:

(I) a photosensitive drum; and (II) a coupling member provided on said photosensitive drum and including a snap-fit portion, is configured to receive a driving force for rotating said photosensitive drum, wherein as said snap-fit portion and said photosensitive drum are projected onto an axis of said coupling member, at least a part of a projected range of said snap-fit and at least a part of a projected range of said photosensitive drum overlap with each other.

Structure Example A134

A cartridge detachably mountable to a main assembly of an electrophotographic image forming apparatus, said cartridge comprising:

(I) a drum unit; and (II) a bearing portion rotatably supporting said drum unit;

wherein said drum unit including, (II-I) a photosensitive drum;

(II-II) a coupling member provided on said photosensitive drum, said coupling member including (II-II-I) a driving force receiving portion configured to receive a driving force for rotating said photosensitive drum, and (II-II-II) a supporting portion movably supporting said driving force receiving portion, wherein said supporting portion includes a projected portion provided with said driving force receiving portion, and an extending portion Extending in a direction crossing with a projecting direction of said projected portion and movably supporting said projected portion, and wherein at least a part of said driving force receiving portion and/or at least a part of said supporting portion is inside said borne portion with respect to an axial direction of said coupling member.

Structure Example A135

A cartridge detachably mountable to a main assembly of an electrophotographic image forming apparatus, said cartridge comprising:

(I) a drum unit; and (II) a bearing portion rotatably supporting said drum unit;

wherein said drum unit including, (II-I) a photosensitive drum;

(II-II) a coupling member provided on said photosensitive drum, said coupling member including (II-II-I) a driving force receiving portion configured to receive a driving force for rotating said photosensitive drum, and (II-II-II) a supporting portion movably supporting said driving force receiving portion, wherein at least a part of said snap-fit portion is inside said borne portion with respect to the axial direction of said coupling member.

Structure Example B1

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member, said coupling member including (II-I) a driving force receiving portion configured to receive a driving force for rotating said rotatable member, and (II-II) a supporting portion movably supporting said driving force receiving portion, wherein said supporting portion includes (II-II-I) a projected portion provided with said driving force receiving portion, and (II-II-II) extending portion extending in a direction crossing with a projecting direction of said projected portion, and wherein at least a part of said supporting portion and/or at least a part of said driving force receiving portion is inside said rotatable member.

Structure Example B2

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member, said coupling member including (II-I) a driving force receiving portion configured to receive a driving force for rotating said rotatable member, and (II-II) a supporting portion movably supporting said driving force receiving portion, wherein said supporting portion includes (II-II-I) a projected portion provided with said driving force receiving portion, and (II-II-II) an extending portion extending in a direction crossing with a projecting direction of said projected portion and at least in a circumferential direction of said coupling member.

Structure Example B3

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member, said coupling member including (II-I) a driving force receiving portion configured to receive a driving force for rotating said rotatable member, and (II-II) a supporting portion movably supporting said driving force receiving portion, wherein said supporting portion includes (II-II-I) a projected portion provided with said driving force receiving portion, and (II-II-II) extending portion extending in a direction crossing with a projecting direction of said projected portion, and wherein said driving force receiving portion is provided with an inclined portion inclined relative to a moving direction of said driving force receiving portion.

Structure Example B4

A cartridge detachably mountable to a main assembly of an electrophotographic image forming apparatus, said cartridge comprising:

(I) a rotatable member rotatable while carrying a developer on a surface thereof;

(II) a coupling member provided on said rotatable member, said coupling member including (II-I) a driving force receiving portion configured to receive a driving force for rotating said rotatable member, and (II-II) a supporting portion movably supporting said driving force receiving portion; and (III) a borne portion configured to be rotatably supported, wherein said supporting portion includes (II-II-I) a projected portion provided with said driving force receiving portion, and (II-II-II) extending portion extending in a direction crossing with a projecting direction of said projected portion, and wherein at least a part of said supporting portion and/or at least a part of said driving force receiving portion is inside said borne portion with respect to an axial direction of said coupling member.

Structure Example B5

A cartridge detachably mountable to a main assembly of an electrophotographic image forming apparatus, said cartridge comprising:

(I) a rotatable member rotatable while carrying a developer on a surface thereof;

(II) a coupling member provided on said rotatable member, said coupling member including (II-I) a driving force receiving portion configured to receive a driving force for rotating said rotatable member, and (II-II) a supporting portion movably supporting said driving force receiving portion; and (III) a borne portion configured to be rotatably supported, wherein said supporting portion includes (II-II-I) a projected portion provided with said driving force receiving portion, and (II-II-II) extending portion extending in a direction crossing with a projecting direction of said projected portion, wherein as said supporting portion, said driving force receiving portion and a rotatable member are projected onto an axis of said coupling member, at least parts of projected ranges of said supporting portion and said driving force receiving portion overlaps with at least a part of the projected range of said rotatable member.

Structure Example B6

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member, said coupling member including (II-I) a driving force receiving portion configured to receive a driving force for rotating said rotatable member, and a supporting portion having a free end and a fixed end and extending at least in an axial direction of said coupling member, said supporting portion rotatably supporting said driving force receiving portion, and at least a part of said supporting portion being disposed inside said coupling member, wherein said supporting portion including a projected portion provided with said driving force receiving portion and an extending portion extending in a direction crossing with a projecting direction of said projected portion, and wherein said coupling member includes a portion where a distance from an inner surface of said coupling member increases toward a free end side from a fixed end side of said supporting portion.

Structure Example B7

A cartridge detachably mountable to a main assembly of an electrophotographic image forming apparatus, said cartridge comprising:

(I) a rotatable member rotatable while carrying a developer on a surface thereof; and (II) a coupling member including (II-I) a driving force receiving portion configured to receive a driving force for rotating said rotatable member, and (II-II) a supporting portion rotatably supporting said driving force receiving portion, wherein said supporting portion includes a projected portion provided with said driving force receiving portion, and extending portion extending in a direction crossing with a projecting direction of said projected portion, wherein as said supporting portion, said driving force receiving portion and said rotatable member are projected onto an axis of said coupling member, at least a part of a projected range of said supporting portion and said driving force receiving portion and at least a part of a projected range of said rotatable member overlap with each other.

Structure Example B8

A cartridge detachably mountable to a main assembly of an electrophotographic image forming apparatus, said cartridge comprising:

(I) a rotatable member rotatable while carrying a developer on a surface thereof and (II) a coupling member provided on said rotatable member, said coupling member including (II-I) a driving force receiving portion configured to receive a driving force for rotating said rotatable member, and (II-II) a supporting portion movably supporting said driving force receiving portion, wherein said driving force receiving portion is inside of said supporting portion with respect to an axial direction of said coupling member.

Structure Example B9

A cartridge detachably mountable to a main assembly of an electrophotographic image forming apparatus, said cartridge comprising:

(I) a rotatable member rotatable while carrying a developer on a surface thereof and (II) a coupling member provided on said rotatable member, said coupling member including (II-I) a driving force receiving portion configured to receive a driving force for rotating said rotatable member, (II-II) a supporting portion movably supporting said driving force receiving portion, and (II-III) a recess provided between inside of said driving force receiving portion with respect to an axial direction of said coupling member, wherein the recess opens toward an outside with respect to the axial direction and converged toward an inside.

Structure Example B10

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member, said coupling member including (II-I) a driving force receiving portion configured to receive a driving force for rotating said rotatable member, and (II-II) a supporting portion movably supporting said driving force receiving portion, wherein as seen along the axis of said coupling member, said supporting portion crosses with a normal line to said drive receiving portion from a free end of said drive receiving portion.

Structure Example B11

A cartridge according to any one of Structure Examples B8-B10, wherein said supporting portion includes a projected portion provided with said driving force receiving portion and an extending portion extending in a direction crossing with a projecting direction of said projected portion.

Structure Example B12

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member, wherein said coupling member includes, (II-I) a driving force receiving member including (II-I-I) a projected portion provided with a driving force receiving portion for receiving a driving force for rotating said rotatable member, and (II-I-II) an extending portion extending in a direction crossing with a projecting direction of said projected portion, and (II-II) a force-transmitted member for receiving a driving force from said driving force receiving member, wherein said driving force receiving member is movable relative to said force-transmitted member in a circumferential direction of said coupling member.

Structure Example B13

A cartridge detachably mountable to a main assembly of an electrophotographic image forming apparatus, said cartridge comprising:

(I) a rotatable member rotatable while carrying a developer on a surface thereof; and (II) a coupling member provided on said rotatable member and the including (II-I) a driving force receiving member, and (II-II) a back-up member unintegral with said driving force receiving member, wherein said driving force receiving member includes (II-I-I) a projection provided with a driving force receiving portion for receiving a driving force for rotating said rotatable member, and (II-I-II) an extending portion rotatably supporting said projection and extending in a direction crossing with said projection, and wherein said back-up member includes (II-II-I) a back-up portion for restricting movement of said driving force receiving portion in a circumferential direction of said coupling member.

Structure Example B14

A cartridge according to Structure Example B12 or B13, wherein said driving force receiving member includes a supporting portion provided with said projection and said extending portion and rotatably supporting said driving force receiving portion.

Structure Example B15

A cartridge detachably mountable to a main assembly of an electrophotographic image forming apparatus, said cartridge comprising:

(I) a rotatable member rotatable while carrying a developer on a surface thereof; and (II) a coupling member provided on said photosensitive drum, said coupling member including, (II-I) a movable driving force receiving portion configured receive a driving force for rotating said rotatable member, (II-II) a portion-to-be-urged movable together with said driving force receiving portion, (II-III) a back-up portion for restricting movement of said driving force receiving portion in a circumferential direction of said coupling member, said back-up portion urging said driving force receiving portion at least radially inward of said coupling member when contacting said portion-to-be-urged.

Structure Example B16

A cartridge according to Structure Example B15, wherein said coupling member includes a supporting portion movably supporting said driving force receiving portion.

Structure Example B17

A cartridge according to Structure Example B16, wherein said supporting portion includes a projected portion provided with said driving force receiving portion and an extending portion extending in a direction crossing with a projecting direction of said projected portion.

Structure Example B18

A cartridge according to any one of Structure Examples B1-B17, wherein said driving force receiving portion is movable at least in a radial direction of said coupling member.

Structure Example B19

A cartridge according to any one of Structure Examples B1-B18, wherein said supporting portion is provided with a deformed portion capable of the elastic deformation to move said driving force receiving portion.

Structure Example B20

A cartridge according to any one of Structure Examples B1-B19, wherein at least a part of said extending portion is disposed inside said rotatable member.

Structure Example B21

A cartridge according to any one of Structure Examples B1-B20, wherein an entirety of said extending portion is in said rotatable member.

Structure Example B22

A cartridge according to any one of Structure Examples B1-B21, wherein at least a part of said projected portion is provided in said rotatable member.

Structure Example B23

A cartridge according to any one of Structure Examples B1-B22, wherein an entirety of said projected portion is in said rotatable member.

Structure Example B24

A cartridge according to any one of Structure Examples B1-B23, wherein a length of projection of said projected portion from said extending portion is shorter than a length of said extending portion.

Structure Example B25

A cartridge according to any one of Structure Examples B1-B24, wherein said projected portion is projected at least radially inward of said coupling member.

Structure Example B26

A cartridge according to any one of Structure Examples B1-B25, wherein at least a part of said driving force receiving portion is inside said rotatable member.

Structure Example B27

A cartridge according to any one of Structure Examples B1-B26, wherein an entirety of said driving force receiving portion is in said rotatable member.

Structure Example B28

A cartridge according to any one of Structure Examples B1-B27, wherein an entirety of said supporting portion is in said rotatable member.

Structure Example B29

A cartridge according to any one of Structure Examples B1-B28, wherein said driving force receiving portion is provided with an inclined portion inclined relative to a moving direction of said driving force receiving portion.

Structure Example B30

A cartridge according to Structure Example B29, wherein said inclined portion is inclined so as to produce the force urging said driving force receiving portion at least radially inward of said coupling member, when receiving said driving force.

Structure Example B31

A cartridge according to Structure Example B29 or B30, wherein as viewed along an axis of said coupling member, said driving force receiving portion faces a line extended from a free end of said driving force receiving portion in a direction of radially outward movement of said driving force receiving portion.

Structure Example B32

A cartridge according to any one of Structure Examples B1-B31, wherein at least a part of said supporting portion is made of metal.

Structure Example B33

A cartridge according to any one of Structure Examples B1-B32, wherein said supporting portion includes a metal portion and a resin material portion.

Structure Example B34

A cartridge according to Structure Example B33, wherein a part of said metal portion is covered by said resin material portion, and the other part is uncovered by said resin material portion.

Structure Example B34-2

A cartridge according to Structure Example B33 or B34, wherein said metal portion is provided with a through-hole, at least in which said resin material portion is provided.

Structure Example B35

A cartridge according to any one of Structure Examples B1-B34-2, wherein at least a part of said supporting portion is made of resin material.

Structure Example B36

A cartridge according to any one of Structure Examples B1-B35, wherein a cross-sectional configuration of said supporting portion taken along a plane perpendicular to the axial direction of said coupling member at a position where said driving force receiving portion is provided is non-circular.

Structure Example B37

A cartridge according to any one of Structure Examples B1-B36, wherein said coupling member comprises a plurality of such driving force receiving portions and the plurality of such supporting portions.

Structure Example B38

A cartridge according to Structure Example B37, wherein as viewed along the axial direction of said coupling member, said driving force receiving portions are provided substantially at regular intervals.

Structure Example B39

A cartridge according to Structure Example B37 or B38, wherein the number of said driving force receiving portions of said coupling member and the number of said supporting portions of said coupling member are three.

Structure Example B40

A cartridge according to Structure Example B37 or B38, wherein the number of said driving force receiving portions of said coupling member and the number of said supporting portions of said coupling member are two.

Structure Example B41

A cartridge according to any one of Structure Example B1-B40, wherein said coupling member includes a deformed portion capable of elastic deformation to move said driving force receiving portion.

Structure Example B42

A cartridge according to Structure Examples B1-B41, wherein said coupling member includes an inner surface contact portion contacting an inner circumferential surface of said rotatable member, and a cylindrical portion provided outside of said inner surface contact portion with respect to the axial direction of said coupling member.

Structure Example B43

A cartridge according to Structure Example B42, wherein said supporting portion is supported by an inner surface of said inner circumferential surface contact portion.

Structure Example B45

A cartridge according to Structure Example B42, wherein said supporting portion is supported by an inner surface of a second cylindrical portion.

Structure Example B43

A cartridge according to any one of Structure Examples B1-B42, wherein said coupling member includes a first inner diameter portion and a second inner diameter portion provided inside of said first inner diameter portion with respect to the axial direction and having an inner diameter which is smaller than an inner diameter of said first inner diameter portion.

Structure Example B46

A cartridge according to any one of Structure Examples B1-B45, wherein said coupling member is provided with a guide portion having a circular inner circumferential surface.

Structure Example B47

A cartridge according to any one of Structure Examples B1-B46, wherein said coupling member is provided with a curved surface portion extending along a circumferential direction of said coupling member and facing an axis of said coupling member, wherein said curved surface portion is disposed outside of a free end of said driving force receiving portion and inside of a fixed end of said supporting portion with respect to a radial direction of said coupling member.

Structure Example B48

A cartridge according to any one of Structure Examples B1-B47, wherein said curved surface portion is supported by said supporting portion.

Structure Example B49

A cartridge according to Structure Example B47 or 48, wherein said curved surface portion is disposed in a side facing said driving force receiving portion with respect to a circumferential direction of said coupling member.

Structure Example B50

A cartridge according to any one of Structure Examples B47-B49, wherein said curved surface portion and the fixed end of said supporting portion are projected onto the axis of said coupling member, a projected range of said contact portion and a projected range of said fixed end are at least partly overlap with each other.

Structure Example B51

A cartridge according to any one of Structure Examples B1-B50, wherein said driving force receiving portion is movable in the radial direction by at least 0.6 mm.

Structure Example B52

A cartridge according to any one of Structure Examples B1-B51, wherein said driving force receiving portion is movable in the radial direction by at least 1.0 mm.

Structure Example B53

A cartridge according to any one of Structure Examples B1-B52, wherein said supporting portion is configured to move said driving force receiving portion to a position radially outward of said coupling member, as compared with a free state, when receiving a force from a outside of said cartridge.

Structure Example B54

A cartridge according to any one of Structure Examples B1-B53, wherein said projected portion is provided with an inclined portion facing outward with respect to the axial direction of said coupling member.

Structure Example B55

A cartridge according to any one of Structure Examples B1-B54, wherein said projected portion is provided with an inclined portion facing inward with respective the axial direction of said coupling member.

Structure Example B56

A cartridge according to any one of Structure Examples B1-B55, wherein at least a part of a fixed end of said supporting portion is disposed inside said rotatable member.

Structure Example B57

A cartridge according to any one of Structure Examples B1-B56, wherein a entirety of the fixed end of said supporting portion is disposed inside said rotatable member.

Structure Example B58

A cartridge according to any one of Structure Examples B1-B57, wherein said supporting portion moves said driving force receiving portion by deforming with the fixed end thereof as a fulcrum.

Structure Example B59

A cartridge according to any one of Structure Examples B1-B58, wherein said driving force receiving portion is disposed inside the fixed end of said supporting portion with respect to the radial direction of said coupling member.

Structure Example B60

A cartridge according to any one of Structure Examples B1-B59, wherein a free end of said supporting portion is inside the fixed end of said supporting portion with respect to the radial direction of said coupling member.

Structure Example B61

A cartridge according to any one of Structure Examples B1-B60, wherein said supporting portion extends at least in the axial direction of said coupling member.

Structure Example B62

A cartridge according to any one of Structure Examples B1-B61, wherein the fixed end of said supporting portion is disposed inside said driving force receiving portion with respect to the axial direction of said coupling member.

Structure Example B63

A cartridge according to any one of Structure Examples B1-B62, wherein the fixed end of said supporting portion is inside the free end of said supporting portion with respect to the axial direction of said coupling member.

Structure Example B64

A cartridge according to any one of Structure Examples B1-B63, wherein the fixed end of said supporting portion is disposed outside said driving force receiving portion with respect to the axial direction of said coupling member.

Structure Example B65

A cartridge according to any one of Structure Examples B1-B64, wherein the fixed end of said supporting portion is disposed outside the free end of said supporting portion with respect to the axial direction of said coupling member.

Structure Example B66

A cartridge according to any one of Structure Examples B1-B65, wherein said coupling member includes a portion where a distance from an inner surface of said coupling member increases toward a free end side from a fixed end side of said supporting portion.

Structure Example B67

A cartridge according to Structure Example B66, wherein said supporting portion is inclined so as to be away from the inner surface of said coupling member.

Structure Example B68

A cartridge according to any one of Structure Examples B1-B67, wherein said supporting portion is a snap-fit portion.

Structure Example B69

A cartridge according to any one of Structure Examples B1-68, wherein said supporting portion is connected with an inner surface of said coupling member.

Structure Example B70

A cartridge according to any one of Structure Examples B1-69, wherein said supporting portion extends at least in a circumferential direction of said coupling member.

Structure Example B71

A cartridge according to any one of Structure Examples B1-B70, wherein as viewed along the axis of said coupling member, said supporting portion crosses with a normal line to said drive receiving portion from a free end of said drive receiving portion.

Structure Example B72

A cartridge according to any one of Structure Examples B1-B71, wherein said supporting portion extends in a direction inclined relative to the axis of said coupling member by an angle of 30°-90°.

Structure Example B73

A cartridge according to any one of Structure Examples B1-B71, wherein said supporting portion extends in a direction inclined relative to the axis of said coupling member by a angle of 50°-90°.

Structure Example B74

A cartridge according to any one of Structure Examples B1-B73, wherein said supporting portion extends in a direction substantially perpendicular to the axis of said coupling member.

Structure Example B75

A cartridge according to any one of Structure Examples B1-B74, wherein as the fixed end of said supporting portion and said driving force receiving portion are projected onto the axis of said coupling member, the projected ranges thereof at least partly overlaps with each other.

Structure Example B76

A cartridge according to any one of Structure Examples B1-B75, wherein said supporting portion extends with an inclination relative to a direction perpendicular to the axis of said coupling member.

Structure Example B77

A cartridge according to any one of Structure Examples B1-B76, wherein said supporting portion extend the substantially in parallel with the axial direction.

Structure Example B78

A cartridge according to any one of Structure Examples B1-B77, further comprising a driving force receiving member provided with said driving force receiving portion and said supporting portion, and a force-transmitted member to which the driving force is transmitted from said driving force receiving member.

Structure Example B79

A cartridge according to Structure Example B78, wherein said force-transmitted member is fixed to said rotatable member.

Structure Example B80

A cartridge according to Structure Example B78 or B79, wherein said driving force receiving member is movable in a circumferential direction of said coupling member relative to said force-transmitted member.

Structure Example B81

A cartridge according to any one of Structure Examples B78-B80, wherein said driving force receiving member is movably supported by said force-transmitted member.

Structure Example B82

A cartridge according to any one of Structure Examples B78-B81, wherein said driving force receiving member includes a plate-like portion.

Structure Example B83

A cartridge according to Structure Example B82, wherein said force-transmitted member includes a force-transmitted portion configured to receive the driving force from said driving force receiving member by contacting said plate-like portion, and said force-transmitted portion is contactable to a surface of said plate-like portion opposed to a surface provided with said driving force receiving portion.

Structure Example B84

A cartridge according to Structure Example B83, wherein said force-transmitted portion is disposed outside of a free end of said plate-like portion with respect to a radial direction of said coupling member.

Structure Example B85

A cartridge according to any one of Structure Examples B82-B84, wherein said plate-like portion includes a first portion provided with said driving force receiving portion, a second portion provided with said supporting portion and extending in a direction crossing with said first force, a bent portion provided between said first portion and said second portion.

Structure Example B86

A cartridge according to any one of Structure Examples B1-B85, wherein said first portion projects at least radially inward of said coupling member, and said second portion extends at least in a circumferential direction of said coupling member.

Structure Example B87

A cartridge according to any one of Structure Examples B82-B86, wherein said plate-like portion is movable relative to said force-transmitted member.

Structure Example B88

The cartridge according to any one of Structure Examples B82-B87, wherein said plate-like portion has a portion having a thickness of not less than 0.1 mm.

Structure Example B89

A cartridge according to any one of Structure Examples B82-B88, wherein said plate-like portion has a portion having a thickness of not less than 0.2 mm.

Structure Example B90

A cartridge according to any one of Structure Examples B82-B89, wherein said plate-like portion has a portion having a thickness of not more than 0.7 mm.

Structure Example B91

A cartridge according to any one of Structure Examples B82-B90, wherein said plate-like portion has a portion having a thickness of not more than 0.5 mm.

Structure Example B92

A cartridge according to any one of Structure Examples B82-B91, wherein said plate-like portion is made of metal.

Structure Example B93

A cartridge according to any one of Structure Examples B82-B92, wherein said driving force receiving member includes a leaf spring.

Structure Example B94

A cartridge according to any one of Structure Examples B78-B93, wherein said force-transmitted member includes a force-transmitted portion configured to receive the driving force from said driving force receiving member by contacting said plate-like portion, said force-transmitting portion being disposed outside of the free end of said driving force receiving portion with respect to the radial direction of said coupling member.

Structure Example B95

A cartridge according to any one of Structure Examples B78-B94, wherein said driving force receiving member is movable in a circumferential direction of said coupling member relative to said force-transmitted member.

Structure Example B96

A cartridge according to any one of Structure Examples B78-B95, wherein said driving force receiving member rotatable about the axis of said coupling member relative to said force-transmitted member.

Structure Example B97

A cartridge according to any one of Structure Examples B78-B96, wherein said force-transmitted member includes a force-transmitted portion for receiving the driving force by contacting the driving force receiving member, and said force-transmitted portion is disposed outside of a free end of said plate-like portion with respect to the radial direction of said coupling member.

Structure Example B98

A cartridge according to any one of Structure Examples B78-B97, wherein said force-transmitted member is unintegral with said driving force receiving member.

Structure Example B99

A cartridge according to any one of Structure Examples B1-B98, wherein said coupling member provided with a back-up portion for restricting movement of said driving force receiving portion in the circumferential direction of said coupling member.

Structure Example B100

A cartridge according to Structure Example B99, wherein said back-up portion is opposed to said supporting portion in a side opposite from a side provided with said driving force receiving portion.

Structure Example B101

A cartridge according to Structure Example B99 or B100, wherein said back-up portion is provided with an inclined portion.

Structure Example B102

A cartridge according to any one of Structure Examples B99-B101, wherein said inclined portion of said back-up portion is inclined such that a force urging said driving force receiving portion at least in a direction radially inward of said coupling member is produced.

Structure Example B103

A cartridge according to any one of Structure Examples B101-B102, wherein said inclined portion is inclined relative to said driving force receiving portion Structure Example B104

A cartridge according to any one of Structure Examples B99-B103, wherein said coupling member includes a portion-to-be-urged movable together with said driving force receiving portion, and said back-up portion urges said driving force receiving portion at least radially inward of said coupling member, by contacting said portion-to-be-urged, said back-up member is configured to urge said driving force receiving member at least radially inward of said coupling member.

Structure Example B105

A cartridge according to Structure Example B104, wherein said supporting portion is provided with said portion-to-be-urged.

Structure Example B106

A cartridge according to any one of Structure Examples B1-B105, wherein said coupling member includes (1) a driving force receiving member provided with said driving force receiving portion and said supporting portion, and (2) a back-up member unintegral with said driving force receiving member and provided with said back-up portion.

Structure Example B107

A cartridge according to any one of Structure Examples B1-B106, wherein said coupling member includes (1) a driving force receiving member provided with said driving force receiving portion and said supporting portion, and (2) a back-up member having said back-up portion, and wherein said driving force receiving member is rotatable relative to said back-up member.

Structure Example B108

A cartridge detachably mountable to a main assembly of an electrophotographic image forming apparatus, said cartridge comprising:

(I) a rotatable member rotatable while carrying the developer on a surface thereof and (II) a coupling member provided on said rotatable member, said coupling member including, (II-I) a plate-like portion provided with a driving force receiving portion for receiving a driving force for rotating said rotatable member, and (II-II) a force-transmitted member to which the driving force is transmitted from said plate-like portion.

Structure Example B109

A cartridge according to Structure Example B108, wherein said plate-like portion is movable at least in a radial direction of said coupling member relative to said force-transmitted member.

Structure Example B110

A cartridge according to Structure Example B109, wherein said plate-like portion is supported so as to be movable at least in a circumferential direction of said coupling member relative to said force-transmitted member.

Structure Example B111

A cartridge according to any one of Structure Examples B108-B110, wherein said force-transmitted member includes a force-transmitted portion for receiving the driving force from said driving force receiving member by contacting said plate-like portion, and said force-transmitted portion contacts a side opposite to the side of said plate-like portion provided with said driving force receiving portion.

Structure Example B112

A cartridge according to any one of Structure Examples B108-B111, wherein said force-transmitted portion is disposed outside of a free end of said plate-like portion with respect to a radial direction of said coupling member.

Structure Example B113

A cartridge according to any one of Structure Examples B108-B112, wherein said plate-like portion includes a first portion provided with said driving force receiving portion, a second portion provided with said supporting portion and extending in a direction crossing with said first force, a bent portion provided between said first portion and said second portion.

Structure Example B114

A cartridge according to any one of Structure Examples B108-B113, wherein said plate-like portion is made of metal.

Structure Example B115

A cartridge according to any one of Structure Examples B108-B114, wherein said plate-like portion is a leaf spring.

Structure Example B116

A cartridge according to Structure Example B115, wherein said first portion projects at least radially inward of said coupling member, and said second portion extends at least in the circumferential direction of said coupling member.

Structure Example B117

A cartridge according to Structure Example B115 or B116, wherein said first portion is inclined relative to a radial direction of said coupling member.

Structure Example B118

A cartridge according to any one of Structure Examples B115-B117, wherein said first portion is inclined so as to produce the force urging said driving force receiving portion at least radially inward of said coupling member, when receiving said driving force.

Structure Example B119

A cartridge according to any one of Structure Examples B108-B118, wherein said plate-like portion is movable relative to said force-transmitted member.

Structure Example B120

The cartridge according to any one of Structure Examples B108-B119, wherein said plate-like portion has a portion having a thickness of not less than 0.1 mm.

Structure Example B121

The cartridge according to any one of Structure Examples B108-B120, wherein said plate-like portion has a portion having a thickness of not less than 0.2 mm.

Structure Example B122

A cartridge according to any one of Structure Examples B108-B121, wherein said plate-like portion has a portion having a thickness of not more than 0.7 mm.

Structure Example B123

A cartridge according to any one of Structure Examples B108-B122, wherein said plate-like portion has a portion having a thickness of not more than 0.5 mm.

Structure Example B124

A cartridge according to any one of Structure Examples B1-B123, wherein said coupling member is provided with a recess disposed inside said driving force receiving portion with respect to the axial direction of said coupling member opening outward with respect to the axial direction.

Structure Example B125

A cartridge according to Structure Example B124, wherein the recess has a shape converging toward an inside of said coupling member with respect to the axial direction.

Structure Example B126

A cartridge according to Structure Example B124 or B125, wherein the recess has a portion substantially conically recessed.

Structure Example B127

A cartridge according to any one of Structure Examples B124-B126, wherein said coupling member includes a driving force receiving member provided with said driving force receiving portion, and a positioning member provided with the recess.

Structure Example B128

A cartridge according to Structure Example B127, wherein said positioning member or said driving force receiving member is provided with a snap-fit portion for mounting said positioning member to said driving force receiving portion.

Structure Example B129

A cartridge according to Structure Example B127, wherein said positioning member is dismountable from said driving force receiving member by rotating relative to said driving force receiving member.

Structure Example B130

A cartridge detachably mountable to a main assembly of an electrophotographic image forming apparatus, said cartridge comprising:

a rotatable member rotatable while carrying a developer on a surface thereof; and a coupling member provided on said rotatable member, said coupling member including a snap-fit portion configured to receive a driving force for rotating said rotatable member, wherein at least a part of said snap-fit portion is inside said photosensitive drum.

Structure Example B131

A cartridge detachably mountable to a main assembly of an electrophotographic image forming apparatus, said cartridge comprising:

a rotatable member rotatable while carrying a developer on a surface thereof; and a coupling member provided on said rotatable member, said coupling member including a snap-fit portion configured to receive a driving force for rotating said rotatable member, wherein said snap-fit portion extends at least in a circumferential direction of said coupling member.

Structure Example B132

A cartridge detachably mountable to a main assembly of an image forming apparatus, said cartridge comprising:

(I) a rotatable member rotatable while carrying a developer on a surface thereof; and (II) a coupling member provided on said rotatable member, said coupling member including a snap-fit portion configured to receive a driving force for rotating said rotatable member, wherein as said snap-fit portion and said photosensitive drum are projected onto an axis of said coupling member, at least a part of a projected range of said snap-fit and at least a part of a projected range of said photosensitive drum overlap with each other.

Structure Example B133

A cartridge according to any one of Structure Examples B1-B132, wherein said coupling member is coaxial with the axis of said rotatable member.

Structure Example B134

A cartridge according to any one of Structure Examples B1-B133, wherein said rotatable member is provided with a shaft, and said coupling member is provided with a mounting portion for connecting with said shaft.

Structure Example B135

A cartridge according to any one of Structure Examples B1-B134, wherein a shortest distance between the axis of said coupling member and said driving force receiving portion is longer than a shortest distance between the axis and said mounting portion.

Structure Example B136

A cartridge according to any one of Structure Examples B1-B135, wherein said rotatable member is a developing roller.

Structure Example B137

A cartridge according to any one of Structure Examples B1-B136, wherein said rotatable member is a supplying roller for supplying the developer to a developing roller.

Structure Example B138

A cartridge according to any one of Structure Examples B1-B137, wherein said rotatable member includes a developing roller and a supplying roller for supplying the developer to said developing roller, and as such rotatable members.

Structure Example B139

A cartridge according to Structure Example B138, wherein the driving force is transmitted to said developing roller through said supplying roller.

Structure Example B140

A cartridge according to any one of Structure Examples B1-B139, wherein said rotatable member is a photosensitive drum.

Structure Example C1

A coupling member for an electrophotographic image forming apparatus, said coupling member comprising:

a driving force receiving portion configured to receive a driving force; and a supporting portion movably supporting said driving force receiving portion;

said supporting portion including, a projected portion provided with said driving force receiving portion, and an extending portion extending in a direction crossing with the projecting direction of said projected portion and at least in a circumferential direction of said coupling member.

Structure Example C2

A coupling member for an electrophotographic image forming apparatus, said coupling member comprising:

a driving force receiving portion configured to receive a driving force; and a supporting portion movably supporting said driving force receiving portion;

said supporting portion including, a projected portion provided with said driving force receiving portion, and an extending portion extending in a direction crossing with a projecting direction of said projected portion, wherein said driving force receiving portion includes an inclined portion inclined relative to a moving direction of said driving force receiving portion.

Structure Example C3

A coupling member for an electrophotographic image forming apparatus, said coupling member comprising:

a driving force receiving portion configured to receive the driving force; and a supporting portion having a free end and a fixed end and extending at least in an axial direction of said coupling member, said supporting portion movably supporting said driving force receiving portion, and at least a part of said supporting portion being disposed in said coupling member, wherein said supporting portion including a projected portion provided with said driving force receiving portion and an extending portion extending in a direction crossing with a projecting direction of said projected portion, and wherein a distance between said supporting portion and an inner surface of said coupling member increases toward the free end side of said supporting portion from the fixed end side thereof.

Structure Example C4

A coupling member for an electrophotographic image forming apparatus, said coupling member comprising:

a driving force receiving portion configured to receive a driving force;

a supporting portion movably supporting said driving force receiving portion; and a recess opening in an axial direction of said coupling member and converging toward a bottom portion of the recess.

Structure Example C5

A coupling member for an electrophotographic image forming apparatus, said coupling member comprising:

a driving force receiving portion configured to receive a driving force;

a supporting portion movably supporting said driving force receiving portion, wherein as viewed along the axis of said coupling member, said supporting portion crosses with a normal line to said drive receiving portion from a free end of said drive receiving portion.

Structure Example C6

A coupling member according to Structure Example C4 or C5, further comprising a projected portion provided with said driving force receiving portion and an extending portion extending in a direction crossing with a projecting direction of said projected portion.

Structure Example C7

A coupling member for an electrophotographic image forming apparatus, said coupling member comprising:

(I) a driving force receiving member including (I-I) a projected portion provided with a driving force receiving portion for receiving a driving force, and (I-II) an extending portion extending in a direction crossing with a projecting direction of said projected portion; and (II) a force-transmitted member for receiving a driving force from said driving force receiving member, wherein said driving force receiving member is movable relative to said force-transmitted member in a circumferential direction of said coupling member.

Structure Example C8

A coupling member for an electrophotographic image forming apparatus, said coupling member comprising:

(I) a driving force receiving member including (I-I) a projection provided with a driving force receiving portion for receiving a driving force, and (I-II) an extending portion extending in a direction crossing with said projection and movably supporting said projection; and (II) a back-up member unintegral with said driving force receiving member to restrict movement of said driving force receiving portion in a circumferential direction of said coupling member.

Structure Example C9

A coupling member according to Structure Example C7 or C8, wherein said driving force receiving member includes a supporting portion, provided with said projection and said extending portion, for movably supporting said driving force receiving portion.

Structure Example C10

A coupling member for an electrophotographic image forming apparatus, said coupling member comprising:

(I) a movable driving force receiving portion configured to receive a driving force;

(II) a portion-to-be-urged movable together with said driving force receiving portion; and (III) a back-up portion for restricting movement of said driving force receiving portion in a circumferential direction of said coupling member, said back-up portion urging said driving force receiving portion at least radially inward of said coupling member when contacting said portion-to-be-urged.

Structure Example C11

A coupling member according to Structure Example C10, further comprising a supporting portion movably supporting said driving force receiving portion.

Structure Example C12

A coupling member according to Structure Example C11, wherein said supporting portion includes a projected portion provided with said driving force receiving portion and an extending portion extending in a direction crossing with a projecting direction of said projected portion.

Structure Example C13

A coupling member according to any one of Structure Example C1-C12, wherein said driving force receiving portion is movable at least in a radial direction of said coupling member.

Structure Example C14

A coupling member according to any one of Structure Example C1-C13, wherein said supporting portion includes an elastically deformable deformed portion to move said driving force receiving portion.

Structure Example C15

A coupling member according to any one of Structure Example C1-C14, wherein a length of projection of said projected portion from said extending portion is shorter than a length of said extending portion.

Structure Example C16

A coupling member according to any one of Structure Example C1-C15, wherein said projected portion projects at least the radial inward of said coupling member.

Structure Example C17

A coupling member according to any one of Structure Example C1-C16, wherein said driving force receiving portion is provided with an inclined portion inclined relative to a moving direction of said driving force receiving portion.

Structure Example C18

A coupling member according to Structure Example C17, wherein said inclined portion of said driving force receiving portion is inclined such that a force urging said driving force receiving portion at least radially inward of said coupling member is produced when receiving the driving force.

Structure Example C19

A coupling member according to Structure Example C17 or C18, wherein as viewed along an axis of said coupling member, said driving force receiving portion faces a line extended from a free end of said driving force receiving portion in a direction of radially outward movement of said driving force receiving portion.

Structure Example C20

A coupling according to any one of Structure Example C1-C19, wherein at least a part of said supporting portion is made of metal.

Structure Example C21

A coupling member according to any one of Structure Example C1-C20, wherein said supporting portion comprises a metal portion and the resin material portion.

Structure Example C22

A coupling member according to Structure Example C21, wherein a part of said metal portion is covered by said resin material portion, and the other part is uncovered by said resin material portion.

Structure Example C22-2

A coupling member according to Structure Example C21 or 22, wherein said metal portion is provided with a through-hole, at least in which said resin material portion is provided.

Structure Example C23

A coupling member according to any one of Structure Example C1-C22-2, wherein at least a part of said supporting portion is made of resin material.

Structure Example C24

A coupling member according to any one of Structure Example C1-C23, wherein a cross-sectional configuration of said supporting portion taken along a plane perpendicular to the axial direction of said coupling member at a position where said driving force receiving portion is provided is non-circular.

Structure Example C25

A coupling member according to any one of Structure Example C1-C24, wherein said coupling member comprises a plurality of such driving force receiving portions and the plurality of such supporting portions.

Structure Example C26

A coupling member according to Structure Example C25, wherein as viewed along the axial direction of said coupling member, said driving force receiving portions are provided substantially at regular intervals.

Structure Example C27

A coupling member according to Structure Example C25 or C26, wherein the number of said driving force receiving portions of said coupling member and the number of said supporting portions of said coupling member are three.

Structure Example C28

A coupling member according to Structure Example C25 or C26, wherein the number of said driving force receiving portions of said coupling member and the number of said supporting portions of said coupling member are two.

Structure Example C29

A coupling member according to any one of Structure Example C1-C29, wherein said coupling member includes a deformed portion capable of elastic deformation to move said driving force receiving portion.

Structure Example C30

A coupling member according to any one of Structure Example C1-C29, further comprising a first cylindrical portion and a second cylindrical portion having a diameter larger than that of said first cylindrical portion.

Structure Example C31

A coupling member according to any one of Structure Example C1-C30, wherein said supporting portion is supported by said first cylindrical portion.

Structure Example C32

A coupling member according to any one of Structure Example C1-C31, wherein said supporting portion is supported by said second cylindrical portion.

Structure Example C33

A coupling member according to any one of Structure Example C1-C32, wherein said coupling member has a circular inner peripheral surface.

Structure Example C34

A coupling member according to any one of Structure Example C1-C33, wherein said coupling member is provided with a curved surface portion extending along a circumferential direction of said coupling member and facing an axis of said coupling member, wherein said curved surface portion is disposed outside of a free end of said driving force receiving portion and inside of a fixed end of said supporting portion with respect to a radial direction of said coupling member.

Structure Example C35

A coupling member according to any one of Structure Example C1-C34, wherein said curved surface portion is supported by said supporting portion.

Structure Example C36

A coupling member according to Structure Example C34 or C35, wherein said curved surface portion is disposed in a side facing said driving force receiving portion with respect to a circumferential direction of said coupling member.

Structure Example C37

A coupling member according to any one of Structure Examples C34-C36, wherein said curved surface portion and the fixed end of said supporting portion are projected onto the axis of said coupling member, a projected range of said contact portion and a projected range of said fixed end are at least partly overlap with each other.

Structure Example C38

A coupling member according to any one of Structure Examples C1-C37, wherein said driving force receiving portion is movable in the radial direction by at least 0.6 mm.

Structure Example C39

A coupling member according to any one of Structure Examples C1-C38, wherein said driving force receiving portion is movable in the radial direction by at least 1.0 mm.

Structure Example C40

A coupling member according to any one of Structure Examples C1-C39, wherein said supporting portion is configured to move said driving force receiving portion to a position radially outward of said coupling member, as compared with a free state, when receiving a force from outside of said drum unit.

Structure Example C41

A coupling member according to any one of Structure Examples C1-C40, wherein said projected portion is provided with an inclined portion facing one side with respect to the axial direction of said coupling member.

Structure Example C42

A coupling member according to Structure Examples C41, wherein said projected portion is provided with an inclined portion facing the other side with respective the axial direction of said coupling member.

Structure Example C43

A coupling member according to any one of Structure Examples C1-C42, wherein said supporting portion moves said driving force receiving portion by deforming with the fixed end thereof as a fulcrum.

Structure Example C44

A coupling member according to any one of Structure Examples C1-C43, wherein said driving force receiving portion is disposed inside the fixed end of said supporting portion with respect to the radial direction of said coupling member.

Structure Example C45

A coupling member according to any one of Structure Examples C1-C44, wherein a free end of said supporting portion is inside the fixed end of said supporting portion with respect to the radial direction of said coupling member.

Structure Example C46

A coupling member according to any one of Structure Examples C1-C45, wherein said supporting portion extends at least in the axial direction of said coupling member.

Structure Example C47

A coupling member according to any one of Structure Examples C1-C46, wherein said coupling member includes a portion where a distance from an inner surface of said coupling member increases toward a free end side from a fixed end side of said supporting portion.

Structure Example C48

A coupling member according to Structure Example C47, wherein said supporting portion is inclined so as to be away from the inner surface of said coupling member.

Structure Example C49

A coupling member according to any one of Structure Examples C1-C48, wherein said supporting portion is a snap-fit portion.

Structure Example C50

A coupling member according to any one of Structure Examples C1-C49, wherein said supporting portion is connected with an inner surface of said coupling member.

Structure Example C51

A coupling member according to any one of Structure Examples C1-50, wherein said supporting portion extends at least in a circumferential direction of said coupling member.

Structure Example C52

A coupling member according to any one of Structure Examples C1-C51, wherein as viewed along the axis of said coupling member, said supporting portion crosses with a normal line to said drive receiving portion from a free end of said drive receiving portion.

Structure Example C53

A coupling member according to any one of Structure Examples C1-C52, wherein said supporting portion extends in a direction inclined relative to the axis of said coupling member by an angle of 30°-90°.

Structure Example C54

A coupling member according to any one of Structure Examples C1-C53, wherein said supporting portion extends in a direction inclined relative to the axis of said coupling member by an angle of 50°-90°.

Structure Example C55

A coupling member according to any one of Structure Examples C1-C54, wherein said supporting portion extends in a direction substantially perpendicular to the axis of said coupling member.

Structure Example C56

A coupling member according to any one of Structure Examples C1-C55, wherein as the fixed end of said supporting portion and said driving force receiving portion are projected onto the axis of said coupling member, the projected ranges thereof at least partly overlaps with each other.

Structure Example C57

A coupling member according to any one of Structure Examples C1-C56, wherein said supporting portion extends with an inclination relative to a direction perpendicular to the axis of said coupling member.

Structure Example C58

A coupling member according to any one of Structure Examples C1-C57, wherein said supporting portion extend the substantially in parallel with the axial direction.

Structure Example C59

A coupling member according to Structure Example C58, further comprising a driving force receiving member provided with said driving force receiving portion and said supporting portion, and a force-transmitted member to which the driving force is transmitted from said driving force receiving member.

Structure Example C60

A coupling member according to Structure Example C59, wherein said driving force receiving member is movable in a circumferential direction of said coupling member relative to said force-transmitted member.

Structure Example C61

A coupling member according to Structure Example C59 or 60, wherein said driving force receiving member is movably supported by said force-transmitted member.

Structure Example C62

A coupling member according to any one of Structure Examples C59-C61, wherein said force-transmitted member includes a force-transmitted portion configured to receive the driving force from said driving force receiving member by contacting said plate-like portion, and said force-transmitted portion is disposed outside the free end of said driving force receiving portion with respect to the radial direction of said coupling member.

Structure Example C63

A coupling member according to any one of Structure Examples C59-C62, wherein said driving force receiving member is movable in a circumferential direction of said coupling member relative to said force-transmitted member.

Structure Example C64

A coupling member according to any one of Structure Examples C59-C63, wherein said driving force receiving member rotatable about the axis of said coupling member relative to said force-transmitted member.

Structure Example C65

A coupling member according to any one of Structure Examples C59-C64, wherein said force-transmitted member is unintegral with said driving force receiving member.

Structure Example C66

A coupling member according to any one of Structure Examples C1-C65, wherein said coupling member provided with a back-up portion for restricting movement of said driving force receiving portion in the circumferential direction of said coupling member.

Structure Example C67

A coupling member according to Structure Example C67, wherein said back-up portion is opposed to said supporting portion in a side opposite from a side provided with said driving force receiving portion.

Structure Example C68

A coupling member according to Structure Example C66 or C67, wherein said back-up portion is provided with an inclined portion.

Structure Example C69

A coupling member according to Structure Example C68, wherein said inclined portion of said back-up portion is inclined such that a force urging said driving force receiving portion at least in a direction radially inward of said coupling member is produced.

Structure Example C70

A coupling member according to Structure Example C68 or C69, wherein said inclined portion is inclined relative to said driving force receiving portion.

Structure Example C71

A coupling member according to anyone of Structure Examples C66-C70, wherein said coupling member includes a portion-to-be-urged movable together with said driving force receiving portion, and said back-up portion urges said driving force receiving portion at least radially inward of said coupling member, by contacting said portion-to-be-urged.

Structure Example C72

A coupling member according to Structure Example C71, wherein said supporting portion is provided with said portion-to-be-urged.

Structure Example C73

A coupling member according to any one of Structure Examples C1-C72, wherein said coupling member includes (1) a driving force receiving member provided with said driving force receiving portion and said supporting portion, and (2) a back-up member unintegral with said driving force receiving member and provided with said back-up portion.

Structure Example C74

A coupling member according to any one of Structure Example C1-C73, wherein said coupling member includes (1) a driving force receiving member provided with said driving force receiving portion and said supporting portion, and (2) a back-up member having said back-up portion, and wherein said driving force receiving member is rotatable relative to said back-up member.

Structure Example C75

A coupling member for an electrophotographic image forming apparatus, said coupling member comprising:

- a plate-like portion provided with a driving force receiving portion for receiving a driving force; and
- a force-transmitted member configured to receive the driving force from said plate-like portion.

Structure Example C76

A coupling member according to Structure Example C75, wherein said plate-like portion is movable at least in a radial direction of said coupling member relative to said force-transmitted member.

Structure Example C77

A coupling member according to Structure Example C75 or C76, wherein said plate-like portion is supported so as to be movable at least in a circumferential direction of said coupling member relative to said force-transmitted member.

Structure Example C78

A coupling member according to any one of Structure Examples C75-C77, wherein said force-transmitted member includes a force-transmitted portion for receiving the driving force from said driving force receiving member by contacting said plate-like portion, and said force-transmitted portion contacts a side opposite to the side of said plate-like portion provided with said driving force receiving portion.

Structure Example C79

A coupling member according to any one of Structure Examples C75-C78, wherein said force-transmitted portion is disposed outside of a free end of said plate-like portion with respect to a radial direction of said coupling member.

Structure Example C80

A coupling member according to any one of Structure Examples C75-C79, wherein said plate-like portion includes a first portion provided with said driving force receiving portion, a second portion provided with said supporting portion and extending in a direction crossing with said first force, a bent portion provided between said first portion and said second portion.

Structure Example C81

A coupling member according to Structure Example C80, wherein said first portion projects at least radially inward of said coupling member, and said second portion extends at least in the circumferential direction of said coupling member.

Structure Example C82

A coupling member according to Structure Example C80 or C81, wherein said first portion is inclined relative to a radial direction of said coupling member.

Structure Example C83

A coupling member according to any one of Structure Examples C80-82, wherein said first portion is inclined so as to produce the force urging said driving force receiving portion at least radially inward of said coupling member, when receiving said driving force.

Structure Example C84

A coupling member according to any one of Structure Examples C75-C83, wherein said plate-like portion is movable relative to said force-transmitted member.

Structure Example C85

A coupling member according to any one of Structure Examples C75-C84, wherein said plate-like portion has a portion having a thickness of not less than 0.1 mm.

Structure Example C86

A coupling member according to any one of Structure Examples C75-C85, wherein said plate-like portion has a portion having a thickness of not less than 0.2 mm.

Structure Example C87

A coupling member according to any one of Structure Examples C75-C86, wherein said plate-like portion has a portion having a thickness of not more than 0.7 mm.

Structure Example C88

A coupling member according to any one of Structure Examples C75-C86, wherein said plate-like portion has a portion having a thickness of not more than 0.5 mm.

Structure Example C89

A coupling member according to any one of Structure Examples C75-C88, wherein said plate-like portion is made of metal.

Structure Example C90

A coupling member according to any one of Structure Examples C75-C89, wherein said plate-like portion is a leaf spring.

Structure Example C91

A coupling member according to any one of Structure Examples C1-C90, wherein said coupling member is provided with a recess opening outward with respect to the axial direction.

Structure Example C92

A coupling member according to Structure Example C91, wherein the recess has a shape converging toward an inside of said coupling member with respect to the axial direction.

Structure Example C93

A coupling member according to Structure Example C91 or C92, wherein the recess has a portion substantially conically recessed.

Structure Example C94

A coupling member according to any one of Structure Examples C91-93, wherein said coupling member includes a driving force receiving member provided with said driving force receiving portion, and a positioning member provided with the recess.

Structure Example C95

A coupling member according to Structure Example C94, wherein said positioning member or said driving force receiving member is provided with a snap-fit portion for mounting said positioning member to said driving force receiving portion.

Structure Example C96

A coupling member according to Structure Example C94 or C95, wherein said positioning member is dismountable from said driving force receiving member by rotating relative to said driving force receiving member.

Structure Example C97

A coupling member for an electrophotographic image forming apparatus, said coupling member comprising:

a coupling member including a snap-fit portion configured to receive a driving force, said snap-fit extends in at least in a circumferential direction of said coupling member.

Structure Example D1

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving portion configured to enter the recess and receive a driving force for rotating said photosensitive drum, (II-II) a supporting portion movably supporting said driving force receiving portion, wherein at least a part of said supporting portion and/or at least a part of said driving force receiving portion is disposed inside said photosensitive drum.

Structure Example D2

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving member having a driving force receiving portion configured to enter the recess and receive a driving force for rotating said photosensitive drum, and (II-II) a supporting portion movably supporting said driving force receiving portion, wherein said supporting portion extends at least in a circumferential direction of said coupling member.

Structure Example D3

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving portion configured to enter the recess and receive a driving force for rotating said photosensitive drum, and (II-II) a supporting portion movably supporting said driving force receiving portion, wherein said driving force receiving portion is provided with an inclined portion which is inclined relative to a moving direction of said driving force receiving portion.

Structure Example D4

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving portion configured to enter the recess and receive a driving force for rotating said photosensitive drum, (II-II) a supporting portion movably supporting said driving force receiving portion, wherein said driving force receiving portion is disposed inside a fixed end of said supporting portion with respect to an axial direction of said coupling member.

Structure Example D5

A drum unit detachably mountable to a main assembly of the electrophotographic image forming apparatus, the main assembly including a driving shaft having a recess, said drum unit comprising:

(I) a photosensitive drum;

(II) a coupling member provided on said photosensitive drum, said coupling member including, (II-I) a driving force receiving portion configured to enter the recess and receive a driving force for rotating said photosensitive drum, and (II-II) a supporting portion movably supporting said driving force receiving portion; and (III) a borne portion configured to be rotatably supported, wherein at least a part of said supporting portion and/or at least a part of said driving force receiving portion is disposed more inside of said drum unit than said borne portion in an axial direction of said coupling member.

Structure Example D6

A drum unit detachably mountable to a main assembly of the electrophotographic image forming apparatus, the main assembly including a driving shaft having a recess, said drum unit comprising:

(I) a photosensitive drum; and (II) a coupling member mounted on photosensitive drum, said coupling member including, (II-I) a driving force receiving portion configured to enter the recess and receive a driving force for rotating said photosensitive drum, and (II-II) a force-transmitted member to which said driving force is transmitted from said driving force receiving member, wherein said driving force receiving member is movable relative to said force-transmitted member in a circumferential direction of said coupling member.

Structure Example D7

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum and including, (II-I) a driving force receiving portion configured to enter the recess and capable of receiving a driving force for rotating said rotatable member, and (II-II) a supporting portion having a free end and a fixed end and extending at least in an axial direction of said coupling member, said supporting portion movably supporting said driving force receiving portion and at least partly disposed inside said coupling member, wherein said coupling member includes a portion where a distance from an inner surface of said coupling member increases toward a free end side from a fixed end side of said supporting portion.

Structure Example D8

A drum unit detachably mountable to a main assembly of the electrophotographic image forming apparatus, the main assembly including a driving shaft having a recess, said drum unit comprising:

a photosensitive drum; and a coupling member provided on said photosensitive drum, said coupling member including (I) a driving force receiving portion configured to enter the recess and receive a driving force for rotating said photosensitive drum, (II) a positioning portion provided inside of said driving force receiving portion with respect to an axial direction of said coupling member and configured to position said coupling member relative to the driving shaft.

Structure Example D9

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving member, and (II-II) a back-up member unintegral with said driving force receiving member, said drive receiving member including (II-I-I) a driving force receiving portion configured to enter the recess and receive a driving force for rotating said photosensitive drum, and (II-I-II) a supporting portion movably supporting said driving force receiving portion, and said back-up member including (II-II-I) a back-up portion for restricting movement of said driving force receiving portion in a circumferential direction of said coupling member.

Structure Example D10

A drum unit detachably mountable to a main assembly of an electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving portion configured to enter the recess and receive a driving force for rotating said photosensitive drum, (II-II) a supporting portion movably supporting said driving force receiving portion, and wherein as said supporting portion, said driving force receiving portion and said of said photosensitive drum are projected onto an axis of said coupling member, at least a part of a projected range of said supporting portion or said driving force receiving portion and at least a part of a projected range of said photosensitive drum overlap with each other.

Structure Example D11

A drum unit detachably mountable to a main assembly of the electrophotographic image forming apparatus, the main assembly including a driving shaft having a recess, said drum unit comprising:

(I) photosensitive drum;

(II) a coupling member provided on said photosensitive drum, said coupling member including, (II-I) a driving force receiving portion configured to enter the recess and receive a driving force for rotating said photosensitive drum, (II-II) a supporting portion movably supporting said driving force receiving portion; and (III) a borne portion configured to be rotatably supported, wherein as said supporting portion, said driving force receiving portion and said borne portion is projected in an axial direction of said coupling member, at least a part of a projected range of said supporting portion or said driving force receiving portion overlaps with at least a part of a projected range of said borne portion.

Structure Example D12

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a driving force receiving portion configured to enter the recess and receive a driving force for rotating said photosensitive member, and (II-II) a supporting portion movably supporting said driving force receiving portion and configured to wind around the driving shaft when said driving force receiving portion receives the driving force.

Structure Example D13

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a movable driving force receiving portion configured to enter the recess and receive a driving force for rotating said photosensitive drum, (II-II) a portion-to-be-urged movable together with said driving force receiving portion, and (II-III) a back-up portion for restricting movement of said driving force receiving portion in a circumferential direction of said coupling member, said back-up portion urging said driving force receiving portion toward a inside of the recess when contacting said portion-to-be-urged.

Structure Example D14

A drum unit according to Structure Example D13, wherein said coupling member includes a supporting portion movably supporting said driving force receiving portion.

Structure Example D15

A drum unit according to Structure Example D14, wherein said portion-to-be-urged is provided on said supporting portion.

Plate-Like Portion

Structure Example D16

A drum unit detachably mountable to a main assembly of the electrophotographic image forming apparatus, the main assembly including a driving shaft having a recess, said drum unit comprising:

(I) a photosensitive drum; and (II) a coupling member provided on said photosensitive drum, said coupling member including, (II-I) a plate-like portion provided with a driving force receiving portion and configured to enter the recess and receive a driving force for rotating said photosensitive drum, and (II-II) a force-transmitted member configured to receive the driving force from said plate-like portion.

Structure Example D17

A drum unit according to Structure Example D16, wherein said plate-like portion includes a supporting portion rotatably supporting said driving force receiving portion.

Structure Example D18

A drum unit according to Structure Example D16 or D17, wherein said force-transmitted member includes a force-transmitted portion configured to receive the driving force from said driving force receiving member by contacting said plate-like portion, and said force-transmitted portion is contactable to a surface of said plate-like portion opposed to a surface provided with said driving force receiving portion.

Structure Example D19

A drum unit according to any one of Structure Examples D16-D18, wherein said force-transmitted portion is disposed outside of a free end of said plate-like portion with respect to a radial direction of said coupling member.

Structure Example D20

A drum unit according to any one of Structure Examples D16-D19, wherein said plate-like portion includes a first portion provided with said driving force receiving portion and uncovered by said force-transmitted member, a second portion provided with said supporting portion and extending in a direction crossing with said first force, a bent portion provided between said first portion and said second portion.

Structure Example D21

A drum unit according to any one of Structure Examples D16-D20, wherein said plate-like portion has a portion having a thickness of not less than 0.1 mm.

Structure Example D22

A drum unit according to any one of Structure Examples D16-D21, wherein said plate-like portion has a portion having a thickness of not less than 0.2 mm.

Structure Example D23

A drum unit according to any one of Structure Examples D16-D22, wherein said plate-like portion has a portion having a thickness of not more than 0.7 mm.

Structure Example D24

A drum unit according to any one of Structure Examples D16-D23, wherein said plate-like portion has a portion having a thickness of not more than 0.5 mm.

Structure Example D25

A drum unit according to any one of Structure Examples D16-D24, wherein said plate-like portion is made of metal.

Structure Example D26

A drum unit according to any one of Structure Examples D16-D25, wherein said driving force receiving member includes a leaf spring.

Structure Example D27

A drum unit according to any one of Structure Examples D16-D26, wherein said force-transmitted member includes a force-transmitted portion configured to receive the driving force from said driving force receiving member by contacting said plate-like portion, said force-transmitting portion being disposed outside of the free end of said driving force receiving portion with respect to the radial direction of said coupling member.

Structure Example D28

A drum unit according to any one of Structure Examples D1-D27, wherein said supporting portion includes a deformed portion capable of elastic deformation to move said driving force receiving portion.

Structure Example D29

A drum unit according to any one of Structure Examples D1-D28, wherein said supporting portion is provided with a projected portion provided with said driving force receiving portion.

Structure Example D30

A drum unit according to any one of Structure Examples D1-D29, wherein said supporting portion is provided with an extending portion extending in a direction crossing with a projecting direction of said projected portion.

Structure Example D31

A drum unit according to Structure Example D30, wherein at least a part of said extending portion is provided in said photosensitive drum.

Structure Example D32

A drum unit according to Structure Example D30 or D31, wherein an entirety of said extending portion is in said photosensitive drum.

Structure Example D33

A drum unit according to any one of Structure Examples D29-D32, wherein at least a part of said projected portion is inside said photosensitive drum.

Structure Example D34

A drum unit according to any one of Structure Examples D29-D33, wherein an entirety of said projected portion is in said photosensitive drum.

Structure Example D35

A drum unit according to any one of Structure Examples D30-D34, wherein a length of projection of said projected portion from said extending portion is shorter than a length of said extending portion.

Structure Example D36

A drum unit according to any one of Structure Examples D29-D35, wherein said projected portion is projected at least radially inward of said coupling member.

Structure Example D37

A drum unit according to any one of Structure Examples D1-D36, wherein at least a part of said driving force receiving portion is inside said photosensitive drum.

Structure Example D38

A drum unit according to any one of Structure Examples D1-D37, wherein an entirety of said supporting portion is in said photosensitive drum.

Structure Example D39

A drum unit according to any one of Structure Examples D1-D38, wherein at least a part of said supporting portion is made of metal.

Structure Example D40

A drum unit according to any one of Structure Examples D1-D39, wherein said supporting portion includes a metal portion and a resin material portion.

Structure Example D41

A drum unit according to Structure Example D40, wherein a part of said metal portion is covered by said resin material portion, and the other part is uncovered by said resin material portion.

Structure Example D41-2

A drum unit according to Structure Example D39 or D40, wherein said metal portion is provided with a through-hole, at least in which said resin material portion is provided.

Structure Example D42

A drum unit according to any one of Structure Examples D1-D41-2, wherein at least a part of said supporting portion is made of resin material.

Structure Example D43

A drum unit according to any one of Structure Examples D1-D42, wherein a cross-sectional configuration of said supporting portion taken along a plane perpendicular to the axial direction of said coupling member at a position where said driving force receiving portion is provided is non-circular.

Structure Example D44

A drum unit according to any one of Structure Examples D1-D43, wherein said coupling member includes an inner surface contact portion contacting an inner circumferential surface of said photosensitive drum, and a cylindrical portion provided outside of said photosensitive drum with respect to the axial direction of said coupling member.

Structure Example D45

A drum unit according to Structure Example D44, wherein said supporting portion is supported by an inner surface of said inner circumferential surface contact portion.

Structure Example D46

A drum unit according to any one of Structure Example D44, wherein said supporting portion is supported by an inner surface of said cylindrical portion.

Structure Example D47

A drum unit according to any one of Structure Examples D1-D46, wherein said coupling member includes a contact portion configured to contact an outer periphery of the driving shaft, and said contact portion is provided outside of the free end of said driving force receiving portion with respect to a radial direction of said coupling member and inside of a fixed end of said supporting portion.

Structure Example D48

A drum unit according to Structure Example D47, wherein said contact portion faces the axis of said coupling member and is curved along a circumferential direction of said coupling member.

Structure Example D49

A drum unit according to Structure Example D47 or D48, wherein said contact portion is movably supported by said supporting portion.

Structure Example D50

A drum unit according to any one of Structure Examples D47-D49, wherein said contact portion and the fixed end of said supporting portion are projected onto the axis of said coupling member, a projected range of said contact portion and a projected range of said fixed end are at least partly overlap with each other.

Structure Example D51

A drum unit according to any one of Structure Examples D1-D50, wherein at least a part of a fixed end of said supporting portion is disposed inside said photosensitive drum.

Structure Example D52

A drum unit according to any one of Structure Example D1-D51, wherein an entirety of the fixed end of said supporting portion is disposed inside said photosensitive drum.

Structure Example D53

A drum unit according to any one of Structure Example D1-D52, wherein said supporting portion moves said driving force receiving portion by deforming with the fixed end thereof as a fulcrum.

Structure Example D54

A drum unit according to any one of Structure Examples D1-D53, wherein said driving force receiving portion is disposed inside the fixed end of said supporting portion with respect to the radial direction of said coupling member.

Structure Example D55

A drum unit according to any one of Structure Examples D1-D54, wherein a free end of said supporting portion is inside the fixed end of said supporting portion with respect to the radial direction of said coupling member.

Structure Example D56

A drum unit according to any one of Structure Examples D1-D55, wherein said supporting portion extends at least in the axial direction of said coupling member.

Structure Example D57

A drum unit according to any one of Structure Examples D1-D56, wherein the fixed end of said supporting portion is disposed more inside of said drum unit than said driving force receiving portion with respect to the axial direction of said coupling member.

Structure Example D58

A drum unit according to any one of Structure Examples D1-D57, wherein the fixed end of said supporting portion is one inside of said drum unit than the free end of said supporting portion with respect to the axial direction of said coupling member.

Structure Example D59

A drum unit according to any one of Structure Examples D1-D58, wherein the fixed end of said supporting portion is disposed more outside of said drum unit than said driving force receiving portion with respect to the axial direction of said coupling member.

Structure Example D60

A drum unit according to any one of Structure Examples D1-D59, wherein the fixed end of said supporting portion is disposed more outside of said drum unit than the free end of said supporting portion with respect to the axial direction of said coupling member.

Structure Example D61

A drum unit according to any ones of Structure Examples D1-D60, wherein said coupling member includes a portion where a distance from an inner surface of said coupling member increases toward a free end side from a fixed end side of said supporting portion.

Structure Example D62

A drum unit according to any one of Structure Examples D1-D61, wherein said supporting portion is inclined so as to be away from the inner surface of said coupling member.

Structure Example D63

A drum unit according to any one of Structure Examples D1-D62, wherein said supporting portion is a snap-fit portion.

Structure Example D64

A drum unit according to any one of Structure Examples D1-D63, wherein said supporting portion is connected with an inner surface of said coupling member.

Structure Example D65

A drum unit according to any one of Structure Examples D1-D64, wherein said supporting portion extends at least in a circumferential direction of said coupling member.

Structure Example D66

A drum unit according to any one of Structure Examples D1-D65, wherein as viewed along the axis of said coupling member, said supporting portion crosses with a normal line to said drive receiving portion from a free end of said drive receiving portion.

Structure Example D67

A drum unit according to any one of Structure Examples D1-D66, wherein said supporting portion extends in a direction inclined relative to the axis of said coupling member by an angle of 30°-90°.

Structure Example D68

A drum unit according to any one of Structure Examples D1-D67, wherein said supporting portion extends in a direction inclined relative to the axis of said coupling member by an angle of 50°-90°.

Structure Example D69

A drum unit according to any one of Structure Examples D1-D68, wherein said supporting portion extends in a direction substantially perpendicular to the axis of said coupling member.

Structure Example D70

A drum unit according to any one of Structure Examples D1-D69, wherein as the fixed end of said supporting portion and said driving force receiving portion are projected onto the axis of said coupling member, the projected ranges thereof at least partly overlaps with each other.

Structure Example D71

A drum unit according to any one of Structure Examples D1-D70, wherein said supporting portion extends with an inclination relative to a direction perpendicular to the axis of said coupling member.

Structure Example D72

A drum unit according to any one of Structure Examples D1-D71, wherein said supporting portion is configured to wind around the driving shaft when said driving force receiving portion receives the driving force.

Structure Example D73

A drum unit according to any one of Structure Examples D1-D72, wherein said supporting portion includes a winding portion facing an axis of said coupling member and extending along a circumferential direction of said coupling member, said winding portion being configured to contact the driving shaft by receiving the driving force at said driving force receiving portion receiving.

Structure Example D74

A drum unit according to any one of Structure Examples D1-D73, wherein as the fixed end of said supporting portion and said winding portion are projected onto the axis of said coupling member, the projected ranges thereof at least partly overlaps with each other.

Structure Example D75

A drum unit according to any one of Structure Examples D1-D74, wherein said supporting portion extend the substantially in parallel with the axial direction.

Snap-Fit

Structure Example D76

A drum unit detachably mountable to a main assembly of an electrophotographic image forming apparatus, the main assembly including a driving shaft provided with a recess, said drum unit comprising:

a photosensitive drum; and a coupling member provided on said photosensitive drum, said coupling member including a driving force receiving portion including a snap-fit portion configured to engage with the recess to receive a driving force for rotating said photosensitive drum, wherein at least a part of said snap-fit portion is inside said photosensitive drum.

Structure Example D77

A drum unit detachably mountable to a main assembly of an electrophotographic image forming apparatus, the main assembly including a driving shaft provided with a recess, said drum unit comprising:

a photosensitive drum;

a coupling member provided on said photosensitive drum and including a snap-fit portion configured to engage with the recess to receive a driving force for rotating said photosensitive drum, wherein said snap-fit portion extends at least in a circumferential direction of said coupling member.

Structure Example D78

A drum unit detachably mountable to a main assembly of the electrophotographic image forming apparatus, the main assembly including a driving shaft having a recess, said drum unit comprising:

a photosensitive drum; and a coupling member including a snap-fit portion configured to engage with the recess to receive a driving force for rotating said photosensitive drum;

a borne portion rotatably supported, wherein at least a part of said snap-fit portion is inside said borne portion with respect to an axial direction of said coupling member.

Structure Example D79

A drum unit detachably mountable to a main assembly of an electrophotographic image forming apparatus, the main assembly including a driving shaft having a recess, said drum unit comprising:

a photosensitive drum; and a coupling member provided on said photosensitive drum and configured to engage with the recess to receive a driving force for rotating said photosensitive drum, wherein as said snap-fit portion and said photosensitive drum are projected onto an axis of said coupling member, at least a part of a projected range of said snap-fit and at least a part of a projected range of said photosensitive drum overlap with each other.

Structure Example D80

A drum unit according to any one of Structure Examples D76-D79, wherein said snap-fit portion includes a driving force receiving portion for entering the recess to receive the driving force.

Structure Example D81

A drum unit according to any one of Structure Examples D1-D80, wherein said driving force receiving portion is movable at least in a radial direction of said coupling member.

Structure Example D82

A drum unit according to any one of Structure Examples D1-D81, wherein an entirety of said driving force receiving portion is inside said photosensitive drum.

Structure Example D83

A drum unit according to any one of Structure Examples D1-D82, wherein said driving force receiving portion is provided with an inclined portion inclined relative to a moving direction of said driving force receiving portion.

Structure Example D84

A drum unit according to any one of Structure Examples D1-D83, wherein said inclined portion of said driving force receiving portion is inclined such that when receiving a driving force from the driving shaft, a force urging said driving force receiving portion at least radially inward of said coupling member is produced.

Structure Example D85

A drum unit according to any one of Structure Examples D1-D84, wherein as viewed along an axis of said coupling member, said driving force receiving portion faces a line extended from a free end of said driving force receiving portion in a direction of radially outward movement of said driving force receiving portion.

Structure Example D87

A drum unit according to any one of Structure Examples D1-D86, wherein said coupling member comprises a plurality of such driving force receiving portions.

Structure Example D88

A drum unit according to any one of Structure Examples D1-D87, wherein as viewed along the axial direction of said coupling member, said driving force receiving portions are provided substantially at regular intervals.

Structure Example D89

A drum unit according to any one of Structure Examples D1-D88, wherein the number of said driving force receiving portions of said coupling member is three.

Structure Example D90

A drum unit according to any one of Structure Examples D1-D89, wherein the number of said driving force receiving portions of said coupling member is two.

Structure Example D91

A drum unit according to any one of Structure Examples D1-D90, wherein said coupling member is provided with a deformable portion which is elastically deformable to move said driving force receiving portion.

Structure Example D92

A drum unit according to any one of Structure Examples D1-D91, wherein said coupling member includes an inner surface contact portion contacting an inner circumferential surface of said photosensitive drum, and a cylindrical portion provided outside of said photosensitive drum with respect to the axial direction of said coupling member.

Structure Example D93

A drum unit according to any one of Structure Examples D1-D92, wherein said coupling member includes a first inner diameter portion and a second inner diameter portion having an inner diameter which is smaller than the inner diameter of said first inner diameter portion.

Structure Example D94

A drum unit according to any one of Structure Examples D1-D93, wherein said coupling member is provided with a guide portion for guiding insertion of the driving shaft.

Structure Example D95

A drum unit according to any one of Structure Examples D1-D94, wherein said driving force receiving portion is movable in the radial direction by at least 0.6 mm.

Structure Example D96

A drum unit according to any one of Structure Examples D1-D95, wherein said driving force receiving portion is movable in the radial direction by at least 1.0 mm.

Structure Example D97

A drum unit according to any one of Structure Examples D1-D95, wherein said driving force receiving portion is movable in the radial direction by at least 1.2 mm.

Structure Example D98

A drum unit according to any one of Structure Examples D1-D97, wherein said supporting portion is configured to move said driving force receiving portion to a position radially outward of said coupling member, as compared with a free state, when said coupling member receives a force from the driving shaft.

Structure Example D99

A drum unit according to any one of Structure Examples D1-D98, wherein said coupling member includes at-mounting force receiving portion for receiving a force for moving said driving force receiving portion in the radial direction, from the driving shaft, at the time of mounting said drum unit.

Structure Example D100

A drum unit according to any one of Structure Examples D1-D99, wherein said at-mounting force receiving portion is provided with an inclined portion inclined relative to the axis of said coupling member.

Structure Example D101

A drum unit according to any one of Structure Examples D1-D100, wherein said coupling member includes at-dismounting force receiving portion for receiving a force for moving said driving force receiving portion in the radial direction, from the driving shaft, at the time of dismounting said drum unit.

Structure Example D102

A drum unit according to Structure Example D101, wherein said at-dismounting force receiving portion is provided with an inclined portion inclined relative to the axis of said coupling member.

Structure Example D103

A drum unit according to any one of Structure Examples D1-D102, wherein a outside of said driving force receiving portion with respect to the axial direction of said coupling member is disposed an upstream side of an inside of said driving force receiving portion with respect to a rotational moving direction of said coupling member.

Cartridge

Structure Example D104

A cartridge detachably mountable to a main assembly of an electrophotographic image forming apparatus, the main assembly including a driving shaft provided with a recess, said cartridge comprising:

(I) a drum unit; and (II) a bearing portion rotatably supporting said drum unit;

said drum unit including, (II-I) a photosensitive drum;

(II-II) a coupling member provided on said photosensitive drum, said coupling member including, (II-II-I) a driving force receiving portion configured to enter the recess and receive a driving force for rotating said photosensitive drum, (II-II-II) a supporting portion movably supporting said driving force receiving portion, and wherein at least parts of said driving force receiving portion and said supporting portion is inside said borne portion with respect to an axial direction of said coupling member.

Structure Example D105

A cartridge detachably mountable to a main assembly of an electrophotographic image forming apparatus, the main assembly including a driving shaft provided with a recess, said cartridge comprising:

(I) a drum unit; and (II) a bearing portion rotatably supporting said drum unit;

said drum unit including, (II-I) a photosensitive drum; in (II-II) a coupling member provided on said photosensitive drum, said coupling member including, (II-II-I) a driving force receiving portion configured to enter the recess and receive a driving force for rotating said photosensitive drum, and (II-II-II) a supporting portion movably supporting said driving force receiving portion, wherein as said driving force receiving portion, said supporting portion and said bearing portion are projected onto an axis of said coupling member, at least a part of a projected range of said driving force receiving portion and said supporting portion overlaps at least a part of a projected range of said bearing portion.

Structure Example E1

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including (II-I) a driving force receiving portion configured to receive a driving force for rotating said rotatable member, and (II-II) supporting portion movably supporting said driving force receiving portion, wherein at least a part of said supporting portion and/or at least a part of said driving force receiving portion is inside said rotatable member.

Structure Example E2

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including (II-I) a driving force receiving portion configured to receive a driving force for rotating said rotatable member, and (II-II) supporting portion movably supporting said driving force receiving portion, wherein said supporting portion extends at least in a circumferential direction of said coupling member.

Structure Example E3

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including (II-I) a driving force receiving portion configured to receive a driving force for rotating said rotatable member, and (II-II) supporting portion movably supporting said driving force receiving portion, said driving force receiving portion is provided with an inclined portion inclined relative to a moving direction of said driving force receiving portion.

Structure Example E4

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including, (II-I) a driving force receiving portion configured to enter the recess and receive a driving force for rotating said photosensitive drum, and (II-II) a supporting portion movably supporting said rotatable member, and wherein said driving force receiving portion is inside of said supporting portion with respect to an axial direction of said coupling member.

Structure Example E5

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof;

(II) a coupling member including, (II-I) a driving force receiving portion configured to enter the recess and receive a driving force for rotating said rotatable member, and (II-II) a supporting portion movably supporting said driving force receiving portion; and (III) a borne portion configured to be rotatably supported, wherein at least a part of said supporting portion and/or at least a part of said driving force receiving portion is more inside of said cartridge than said borne portion with respect to an axial direction of said coupling member.

Structure Example E6

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including (II-I) a driving force receiving member having a driving force receiving portion for entering the recess to receive a driving force for rotating said rotatable member, and (II-II) a force-transmitted member to which the driving force is transmitted from said driving force receiving member, wherein said driving force receiving member is movable relative to said force-transmitted member in a circumferential direction of said coupling member.

Structure Example E7

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including, (II-I) a driving force receiving portion configured to enter the recess and capable of receiving a driving force for rotating said rotatable member, and (II-II) a supporting portion having a free end and a fixed end and extending at least in an axial direction of said coupling member, said supporting portion movably supporting said driving force receiving portion and at least partly disposed inside said coupling member, wherein said coupling member includes a portion where a distance from an inner surface of said coupling member increases toward a free end side from a fixed end side of said supporting portion.

Structure Example E8

A cartridge detachably mountable to a main assembly of an electrophotographic image forming apparatus, the main assembly including a driving shaft provided with a recess, said cartridge comprising:

a rotatable member rotatable while carrying a developer on a surface thereof; and a coupling member including (I) a driving force receiving portion configured to enter the recess and receive a driving force for rotating said rotatable member, (II) a positioning portion provided inside of said driving force receiving portion with respect to an axial direction of said coupling member and configured to position said coupling member relative to the driving shaft.

Structure Example E9

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including, (II-I) a driving force receiving member, and (II-II) a back-up member unintegral with said driving force receiving member;

said drive receiving member including (II-I-I) a driving force receiving portion configured to enter the recess and receive a driving force for rotating said rotatable member, and (II-I-II) a supporting portion movably supporting said driving force receiving portion, and said back-up member including (II-II-I) a back-up portion for restricting movement of said driving force receiving portion in a circumferential direction of said coupling member.

Structure Example E10

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including (II-I) a driving force receiving portion configured to receive a driving force for rotating said rotatable member, and (II-II) supporting portion movably supporting said driving force receiving portion, wherein as said supporting portion, said driving force receiving portion and a rotatable member are projected onto an axis of said coupling member, at least a part of projected ranges of said supporting portion or said driving force receiving portion is overlapped with at least a part of a projected range of said rotatable member.

Structure Example E11

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof;

(II) a coupling member including, (II-I) a driving force receiving portion configured to enter the recess and receive a driving force for rotating said rotatable member, and (II-II) a supporting portion movably supporting said driving force receiving portion; and (III) a borne portion configured to be rotatably supported, wherein as said supporting portion, said driving force receiving portion and said borne portion are projected onto an axis of said coupling member, a projected range of said supporting portion or said driving force receiving portion and a projected range of said borne portion are at least partly overlapped with each other.

Structure Example E12

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member provided, said coupling member including, (II-I) a driving force receiving portion configured to enter the recess and receive a driving force for rotating said rotatable member, and (II-II) a supporting portion movably supporting said driving force receiving portion and configured to wind around the driving shaft when said driving force receiving portion receives the driving force.

Structure Example E13

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof; and (II) a coupling member including, (II-I) a movable driving force receiving portion configured to enter the recess and receive a driving force for rotating said rotatable member, (II-II) a portion-to-be-urged movable together with said driving force receiving portion, and (II-III) a back-up portion for restricting movement of said driving force receiving portion in a circumferential direction of said coupling member, said back-up portion urging said driving force receiving portion toward an inside of the recess when contacting said portion-to-be-urged.

Structure Example E14

A cartridge according to Structure Example E13, wherein said coupling member includes a supporting portion movably supporting said driving force receiving portion.

Structure Example E15

A cartridge according to Structure Example E14, wherein said supporting portion is provided with said portion-to-be-urged.

Structure Example E16

A cartridge detachably mountable to a main assembly of an electrophotographic image forming apparatus, the main assembly including a driving shaft provided with a recess, said cartridge comprising:

(I) a rotatable member rotatable while carrying a developer on a surface thereof and (II) a coupling member including, (II-I) a plate-like portion provided with a driving force receiving portion configured to enter the recess and receive a driving force for rotating said rotatable member, and (II-II) a force-transmitted member configured to receive the driving force from said plate-like portion.

Structure Example E17

A cartridge according to Structure Example E16, wherein said plate-like portion includes a supporting portion movably supporting said driving force receiving portion.

Structure Example E18

A cartridge according to Structure Example E16 or E17, wherein said force-transmitted member includes a force-transmitted portion configured to receive the driving force from said driving force receiving member by contacting said plate-like portion, and wherein said force-transmitted portion is contactable to a surface of said plate-like portion opposite a surface provided with said driving force receiving portion.

Structure Example E19

A cartridge according to any one of Structure Examples E16-E18, wherein said force-transmitted portion is disposed outside of a free end of said plate-like portion with respect to a radial direction of said coupling member.

Structure Example E20

A cartridge according to any one of Structure Examples E16-E19, wherein said plate-like portion includes a first portion provided with said driving force receiving portion and uncovered by said force-transmitted member, a second portion provided with said supporting portion and extending in a direction crossing with said first portion, and a bent portion provided between said first portion and said second portion provided by bending said plate-like portion.

Structure Example E21

A cartridge according to any one of Structure Examples E16-E20, wherein said plate-like portion has a portion having a thickness of not less than 0.1 mm.

Structure Example E22

A cartridge according to any one of Structure Examples E16-E21, wherein said plate-like portion has a portion having a thickness of not less than 0.2 mm.

Structure Example E23

A cartridge according to any one of Structure Examples E16-E22, wherein said plate-like portion is provided with a portion having a thickness of not more than 0.7 mm.

Structure Example E24

A cartridge according to any one of Structure Examples E16-E23, wherein said plate-like portion is provided with a portion having a thickness of not more than 0.5 mm.

Structure Example E25

A cartridge according to any one of Structure Examples E16-E24, wherein said plate-like portion is made of metal.

Structure Example E26

A cartridge according to any ones of Structure Examples E16-E25, wherein said driving force receiving member includes a leaf spring.

Structure Example E27

A cartridge according to any one of Structure Examples E16-E26, wherein said force-transmitted member includes a force-transmitted portion configured to receive the driving force from said driving force receiving member by contacting said plate-like portion, said force-transmitting portion being disposed outside of the free end of said driving force receiving portion with respect to the radial direction of said coupling member.

Structure Example E28

A cartridge according to any one of Structure Examples E1-E27, wherein said supporting portion is provided with a deformed portion capable of the elastic deformation to move said driving force receiving portion.

Structure Example E29

A cartridge according to any one of Structure Examples E1-E28, wherein said supporting portion includes a projected portion provided with said driving force receiving portion.

Structure Example E30

A cartridge according to any one of Structure Examples E1-E29, wherein said supporting portion is provided with an extending portion extending in a direction crossing with the projecting direction of said projected portion.

Structure Example E31

A cartridge according to Structure Example E30, wherein at least a part of said extending portion is inside said rotatable member.

Structure Example E32

A cartridge according to Structure Example E30 or E31, wherein an entirety of said extending portion is inside said rotatable member.

Structure Example E33

A cartridge according to any one of Structure Examples E29-E32, wherein at least a part of said projected portion is provided in said rotatable member.

Structure Example E34

A cartridge according to any one of Structure Examples E29-E33, wherein an entirety of said projected portion is inside said rotatable member.

Structure Example E35

A cartridge according to any one of Structure Examples E30-E34, wherein a length of projection of said projected portion from said extending portion is shorter than a length of said extending portion.

Structure Example E36

A cartridge according to any one of Structure Examples E29-E35, wherein said projected portion is projected at least radially inward of said coupling member.

Structure Example E37

A cartridge according to any one of Structure Examples E1-E36, wherein at least a part of said driving force receiving portion is inside said rotatable member.

Structure Example E38

A cartridge according to any one of Structure Examples E1-E37, wherein an entirety of said supporting portion is inside said rotatable member.

Structure Example E39

A cartridge according to any one of Structure Examples E1-E38, wherein at least a part of said supporting portion is made of metal.

Structure Example E40

A cartridge according to any one of Structure Examples E1-E39, wherein said supporting portion includes a metal portion and a resin material portion.

Structure Example E41

A cartridge according to Structure Example E40, wherein a part of said metal portion is covered by said resin material portion, and the other part is uncovered by said resin material portion.

Structure Example E41-2

A cartridge according to Structure Example E40 or E41, wherein said metal portion is provided with a through-hole, at least in which said resin material portion is provided.

Structure Example E42

A cartridge according to any one of Structure Examples E1-E41-2, wherein at least a part of said supporting portion is made of resin material.

Structure Example E43

A cartridge according to any one of Structure Examples E1-E42, wherein a cross-sectional configuration of said supporting portion taken along a plane perpendicular to the axial direction of said coupling member at a position where said driving force receiving portion is provided is non-circular.

Structure Example E44

A cartridge according to any one of Structure Examples E1-E43, wherein said coupling member includes an inner surface contact portion contacting an inner circumferential surface of said rotatable member, and a cylindrical portion provided outside of said rotatable member with respect to the axial direction of said coupling member.

Structure Example E45

A cartridge according to Structure Example E44, wherein said supporting portion is supported by an inner surface of said inner surface contact portion.

Structure Example E46

A cartridge according to Structure Example E4, wherein said supporting portion is supported by an inner surface of said cylindrical portion.

Structure Example E47

A cartridge according to any one of Structure Examples E1-E46, wherein said coupling member includes a contact portion configured to contact an outer periphery of the driving shaft, and said contact portion is provided outside of the free end of said driving force receiving portion with respect to a radial direction of said coupling member and inside of a fixed end of said supporting portion.

Structure Example E48

A cartridge according to Structure Example E47, wherein said contact portion faces the axis of said coupling member and is curved along a circumferential direction of said coupling member.

Structure Example E49

A cartridge according to Structure Example E47 or E48, wherein said contact portion is movably supported by said supporting portion.

Structure Example E50

A cartridge according to any one of Structure Examples E47-E49, wherein said contact portion and the fixed end of said supporting portion are projected onto the axis of said coupling member, a projected range of said contact portion and a projected range of said fixed end are at least partly overlap with each other.

Structure Example E51

A cartridge according to any one of Structure Examples E1-E50, wherein at least a part of a fixed end of said supporting portion is disposed inside said rotatable member.

Structure Example E52

A cartridge according to any one of Structure Examples E1-E51, wherein a entirety of the fixed end of said supporting portion is disposed inside said rotatable member.

Structure Example E53

A cartridge according to any one of Structure Examples E1-E52, wherein said supporting portion moves said driving force receiving portion by deforming with the fixed end thereof as a fulcrum.

Structure Example E54

A cartridge according to any one of Structure Examples E1-E53, wherein said driving force receiving portion is disposed inside the fixed end of said supporting portion with respect to the radial direction of said coupling member.

Structure Example E55

A cartridge according to any one of Structure Examples E1-E54, wherein a free end of said supporting portion is inside the fixed end of said supporting portion with respect to the radial direction of said coupling member.

Structure Example E56

A cartridge according to any one of Structure Examples E1-E55, wherein said supporting portion extends at least in the axial direction of said coupling member.

Structure Example E57

A cartridge according to any one of Structure Examples E1-E56, wherein a fixed end of said supporting portion is more inside of said cartridge than said driving force receiving portion with respect to the axial direction of said coupling member.

Structure Example E58

A cartridge according to any one of Structure Examples E1-E57, wherein the fixed end of said supporting portion is one inside of said cartridge than the free end of said supporting portion with respect to the axial direction of said coupling member.

Structure Example E59

A cartridge according to any one of Structure Examples E1-E58 wherein the fixed end of said supporting portion is disposed more outside of said cartridge than said driving force receiving portion with respect to the axial direction of said coupling member.

Structure Example E60

A cartridge according to any one of Structure Examples E1-E59, wherein the fixed end of said supporting portion is disposed more outside of said cartridge than the free end of said supporting portion with respect to the axial direction of said coupling member.

Structure Example E61

A cartridge according to any one of Structure Examples E1-E60, wherein said coupling member includes a portion where a distance from an inner surface of said coupling member increases toward a free end side from a fixed end side of said supporting portion.

Structure Example E62

A cartridge according to any one of Structure Examples E1-E61, wherein said supporting portion is provided with an inclined portion inclined away from an inner surface of said coupling member.

Structure Example E63

A cartridge according to any one of Structure Examples E1-E62, wherein said supporting portion is a snap-fit portion.

Structure Example E64

A cartridge according to any one of Structure Examples E1-E63, wherein said supporting portion is connected with an inner surface of said coupling member.

Structure Example E65

A cartridge according to any one of Structure Examples E1-E64, wherein said supporting portion extends at least in a circumferential direction of said coupling member.

Structure Example E66

A cartridge according to any one of Structure Examples E1-E65, wherein as viewed along the axis of said coupling member, said supporting portion crosses with a normal line to said drive receiving portion from a free end of said drive receiving portion.

Structure Example E67

A cartridge according to any one of Structure Examples E1-E66, wherein said supporting portion extends in a direction inclined relative to the axis of said coupling member by a angle of 30°-90°.

Structure Example E68

A cartridge according to any one of Structure Examples E1-E67, wherein said supporting portion extends in a direction inclined relative to the axis of said coupling member by an angle of 50°-90°.

Structure Example E69

A cartridge according to any one of Structure Examples E1-E68, wherein said supporting portion extends in a direction substantially perpendicular to the axis of said coupling member.

Structure Example E70

A cartridge according to any one of Structure Examples E1-E69, wherein as the fixed end of said supporting portion and said driving force receiving portion are projected onto the axis of said coupling member, the projected ranges thereof at least partly overlaps with each other.

Structure Example E71

A cartridge according to any one of Structure Examples E1-E70, wherein said supporting portion extends with an inclination relative to a direction perpendicular to the axis of said coupling member.

Structure Example E72

A cartridge according to any one of Structure Examples E1-E71, wherein said supporting portion is configured to wind around the driving shaft when said driving force receiving portion receives the driving force.

Structure Example E73

A cartridge according to any one of Structure Examples E1-E72, wherein said supporting portion includes a winding portion facing an axis of said coupling member and extending along a circumferential direction of said coupling member, said winding portion being configured to contact the driving shaft by receiving the driving force at said driving force receiving portion receiving.

Structure Example E74

A cartridge according to any one of Structure Examples E1-E73, wherein as the fixed end of said supporting portion and said winding portion are projected onto the axis of said coupling member, the projected ranges thereof at least partly overlaps with each other.

Structure Example E75

A cartridge according to any one of Structure Examples E1-E74, wherein said supporting portion extend the substantially in parallel with the axial direction.

Structure Example E76

A cartridge detachably mountable to a main assembly of an electrophotographic image forming apparatus, the main assembly including a driving shaft provided with a recess, said cartridge comprising:

a rotatable member rotatable while carrying a developer on a surface thereof; and a coupling member including a snap-fit portion configured to engage with the recess to receive a driving force for rotating said rotatable member, wherein at least a part of said snap-fit portion is inside said photosensitive drum.

Structure Example E77

A cartridge detachably mountable to a main assembly of an electrophotographic image forming apparatus, the main assembly including a driving shaft provided with a recess, said cartridge comprising:

a rotatable member rotatable while carrying a developer on a surface thereof; and a coupling member including a snap-fit portion configured to engage with the recess to receive a driving force for rotating said rotatable member, wherein said snap-fit portion extends at least in a circumferential direction of said coupling member.

Structure Example E78

A cartridge detachably mountable to a main assembly of an electrophotographic image forming apparatus, the main assembly including a driving shaft provided with a recess, said cartridge comprising:

a rotatable member rotatable while carrying a developer on a surface thereof; and a coupling member including a snap-fit portion configured to engage with the recess to receive a driving force for rotating said rotatable member;

a borne portion rotatably supported, wherein at least a part of said snap-fit portion is inside said borne portion with respect to the axial direction of said coupling member.

Structure Example E79

A cartridge detachably mountable to a main assembly of an electrophotographic image forming apparatus, the main assembly including a driving shaft provided with a recess, said cartridge comprising:

a rotatable member rotatable while carrying a developer on a surface thereof; and a coupling member provided on said rotatable member and configured to receive a driving force for rotating said rotatable member, said coupling member being engageable with the recess to receive the driving force, wherein as said snap-fit portion and said rotatable member are projected onto an axis of said coupling member, at least a part of a projected range of said snap-fit and at least a part of a projected range of said rotatable member.

Structure Example E80

A cartridge according to any one of Structure Examples E76-E79, wherein said snap-fit portion including a driving force receiving portion for entering the recess to receive the driving force.

Structure Example E81

A cartridge according to any one of Structure Examples E1-E80, wherein said driving force receiving portion is movable at least in a radial direction of said coupling member.

Structure Example E82

A cartridge according to any one of Structure Examples E1-E81, wherein a entirety of said driving force receiving portion is in said rotatable member.

Structure Example E83

A cartridge according to any one of Structure Examples E1-E82, wherein said driving force receiving portion is provided with an inclined portion inclined relative to a moving direction of said driving force receiving portion.

Structure Example E84

A cartridge according to any one of Structure Examples E1-E83, wherein said inclined portion of said driving force receiving portion is inclined such that a force urging said driving force receiving portion at least inward of said driving shaft is produced when receiving the driving force from the driving shaft.

Structure Example E85

A cartridge according to any one of Structure Examples E1-E84, wherein as viewed along an axis of said coupling member, said driving force receiving portion faces a line extended from a free end of said driving force receiving portion in a direction of radially outward movement of said driving force receiving portion.

Structure Example E87

A cartridge according to any one of Structure Examples E1-E86, wherein said coupling member comprises a plurality of such said driving force receiving portions.

Structure Example E88

A cartridge according to any one of Structure Examples E1-E87, wherein as viewed along the axial direction of said coupling member, said driving force receiving portions are provided substantially at regular intervals.

Structure Example E89

A cartridge according to any one of Structure Examples E1-E88, wherein the number of said driving force receiving portions of said coupling member is three.

Structure Example E90

A cartridge according to any one of Structure Examples E1-E89, wherein the number of said driving force receiving portions of said coupling member is two.

Structure Example E91

A cartridge according to any one of Structure Examples E1-E90, wherein said coupling member includes a deformed portion capable of elastic deformation to move said driving force receiving portion.

Structure Example E92

A cartridge according to any one of Structure Examples E1-E91, wherein said coupling member includes an inner surface contact portion contacting an inner circumferential surface of said rotatable member, and a cylindrical portion provided outside of said rotatable member with respect to the axial direction of said coupling member.

Structure Example E93

A cartridge according to any one of Structure Examples E1-E92, wherein said coupling member includes a first inner diameter portion and a second inner diameter portion provided inside of said first inner diameter portion with respect to the axial direction and having an inner diameter which is smaller than an inner diameter of said first inner diameter portion.

Structure Example E94

A cartridge according to any one of Structure Examples E1-E93, wherein said coupling member includes a guide portion for guiding insertion of the driving shaft.

Structure Example E95

A cartridge according to any one of Structure Examples E1-E94, wherein said driving force receiving portion is movable in the radial direction by at least 0.6 mm.

Structure Example E96

A cartridge according to any one of Structure Examples E1-E95, wherein said driving force receiving portion is movable in the radial direction by at least 1.0 mm.

Structure Example E97

A cartridge according to any one of Structure Examples E1-E95, wherein said driving force receiving portion is movable in the radial direction by at least 1.2 mm.

Structure Example E98

A cartridge according to any one of Structure Examples E1-E97, wherein said supporting portion is configured to move said driving force receiving portion to a position radially outward of said coupling member, as compared with a free state, when receiving a force from outside of said coupling member.

Structure Example E99

A cartridge according to any one of Structure Examples E1-E98, wherein said coupling member includes at-mounting force receiving portion for receiving a force for moving said driving force receiving portion in the radial direction, from the driving shaft, at the time of mounting said cartridge.

Structure Example E100

A cartridge according to any one of Structure Examples E1-E99, wherein said at-mounting force receiving portion is provided with an inclined portion inclined relative to the axis of said coupling member.

Structure Example E101

A cartridge according to any one of Structure Examples E1-E100, wherein said coupling member includes at-dismounting force receiving portion for receiving a force for moving said driving force receiving portion in the radial direction, from the driving shaft, at the time of dismounting said cartridge.

Structure Example E102

A cartridge according to Structure Example E101, wherein said at-dismounting force receiving portion is provided with an inclined portion inclined relative to the axis of said coupling member.

Structure Example E103

A cartridge according to any one of Structure Examples E1-E102, wherein a outside of said driving force receiving portion with respect to the axial direction of said coupling member is disposed in an upstream side of an inside of said driving force receiving portion with respect to a rotational moving direction of said coupling member.

Structure Example E104

A cartridge according to any one of Structure Examples E1-E103, wherein said coupling member is provided so as to be coaxial with said rotatable member.

Structure Example E105

A cartridge according to any one of Structure Examples E1-E104, wherein said rotatable member is provided with a shaft, and said coupling member is provided with a mounting portion for connecting with said shaft.

Structure Example E106

A cartridge according to any one of Structure Examples E1-105, wherein a shortest distance between the axis of said coupling member and said driving force receiving portion is longer than a shortest distance between the axis and said mounting portion.

Structure Example E107

A cartridge according to any one of Structure Examples E1-106, wherein said rotatable member is a developing roller.

Structure Example E108

A cartridge according to any one of Structure Examples 1-107, wherein said rotatable member is a supplying roller for supplying the developer to a developing roller.

Structure Example E109

A cartridge according to any one of Structure Examples 1-E108, wherein said rotatable member includes a developing roller and a supplying roller for supplying the developer to said developing roller.

Structure Example E110

A cartridge according to Structure Example E109, wherein the driving force is transmitted to said developing roller through said supplying roller.

Structure Example E111

A cartridge according to any one of Structure Examples 1-E110, comprising a photosensitive drum as said rotatable member.

Structure Example F1

A coupling member capable of coupling with and decoupling from a driving shaft which is provided in a main assembly of an electrophotographic image forming apparatus and which is provided with a recess, said coupling member comprising:

a driving force receiving portion for entering the recess to receive a driving force for rotating a rotatable member carrying a developer on a surface thereof; and a supporting portion movably supporting said driving force receiving portion, wherein said supporting portion extends at least in a circumferential direction of said coupling member.

Structure Example F2

A coupling member capable of coupling with and decoupling from a driving shaft which is provided in a main assembly of an electrophotographic image forming apparatus and which is provided with a recess, said coupling member comprising:

a driving force receiving portion for entering the recess to receive a driving force for rotating a rotatable member carrying a developer on a surface thereof; and a supporting portion movably supporting said driving force receiving portion;

wherein said driving force receiving portion includes an inclined portion inclined relative to a moving direction of said driving force receiving portion.

Structure Example F3

A coupling member capable of coupling with and decoupling from a driving shaft which is provided in a main assembly of an electrophotographic image forming apparatus and which is provided with a recess, said coupling member comprising:

a driving force receiving member including a driving force receiving portion for entering the recess to receive a driving force for rotating a rotatable member carrying a developer on a surface thereof and a force-transmitted member to which the driving force is transmitted from said driving force receiving member, wherein said driving force receiving member is movable relative to said force-transmitted member in a circumferential direction of said coupling member.

Structure Example F4

A coupling member capable of coupling with and decoupling from a driving shaft which is provided in a main assembly of an electrophotographic image forming apparatus and which is provided with a recess, said coupling member comprising:

a driving force receiving portion configured to enter the recess and capable of receiving a driving force for rotating said rotatable member, and a supporting portion having a free end and a fixed end and extending at least in an axial direction of said coupling member, said supporting portion movably supporting said driving force receiving portion and at least partly disposed inside said coupling member;

wherein a distance between said supporting portion and an inner surface of said coupling member increases toward the free end side of said supporting portion from the fixed end side thereof.

Structure Example F5

A coupling member capable of coupling with and decoupling from a driving shaft which is provided in a main assembly of an electrophotographic image forming apparatus and which is provided with a recess, said coupling member comprising:

a driving force receiving portion configured to enter the recess to receive a driving force for rotating a rotatable member carrying a developer on a surface thereof; and a positioning portion facing in an axial direction of said coupling member and configured to position said coupling member relative to the driving shaft.

Structure Example F6

A coupling member capable of coupling with and decoupling from a driving shaft which is provided in a main assembly of an electrophotographic image forming apparatus and which is provided with a recess, said coupling member comprising:

a driving force receiving member; and a back-up member unintegral with said driving force receiving member;

said drive receiving member including, a driving force receiving portion configured to enter the recess to receive a driving force for rotating a rotatable member carrying a developer on a surface thereof;

a supporting portion movably supporting said driving force receiving portion, wherein said back-up member includes a back-up portion for restricting movement of said driving force receiving portion in a circumferential direction of said coupling member.

Structure Example F7

A coupling member detachably mountable to a main assembly of an image forming apparatus, the main assembly including a driving shaft provided with a recess, said coupling member comprising:
- a driving force receiving portion configured to enter the recess to receive a driving force for rotating a rotatable member carrying a developer on a surface thereof; and
- a supporting portion movably supporting said driving force receiving portion;
- wherein as said supporting portion, said driving force receiving portion and a rotatable member are projected onto an axis of said coupling member, at least a part of projected ranges of said supporting portion or said driving force receiving portion is overlapped with at least a part of a projected range of said rotatable member.

Structure Example F8

A coupling member capable of coupling with and decoupling from a driving shaft which is provided in a main assembly of an electrophotographic image forming apparatus and which is provided with a recess, said coupling member comprising:
- a driving force receiving portion configured to enter the recess to receive a driving force for rotating a rotatable member carrying a developer on a surface thereof;
- a borne portion configured to be rotatably supported,
- wherein as said supporting portion, said driving force receiving portion and said borne portion are projected onto an axis of said coupling member, a projected range of said supporting portion or said driving force receiving portion and a projected range of said borne portion are at least partly overlapped with each other.

Structure Example F9

A coupling member capable of coupling with and decoupling from a driving shaft which is provided in a main assembly of an electrophotographic image forming apparatus and which is provided with a recess, said coupling member comprising:
- a driving force receiving portion configured to enter the recess to receive a driving force for rotating a rotatable member carrying a developer on a surface thereof and
- a supporting portion movably supporting said driving force receiving portion and configured to wind around the driving shaft when said driving force receiving portion receives the driving force.

Structure Example F10

A coupling member capable of coupling with and decoupling from a driving shaft which is provided in a main assembly of an electrophotographic image forming apparatus and which is provided with a recess, said coupling member comprising:
- an movable driving force receiving portion configured to enter the recess to receive a driving force for rotating a rotatable member carrying a developer on a surface thereof;
- a portion-to-be-urged movable together with said driving force receiving portion; and
- a back-up portion for restricting movement of said driving force receiving portion in a circumferential direction of said coupling member, said back-up portion urging said driving force receiving portion toward a inside of the recess when contacting said portion-to-be-urged.

Structure Example F11

A coupling member according to Structure Example F10, further comprising a supporting portion movably supporting said driving force receiving portion.

Structure Example F12

A coupling member according to Structure Example F11, wherein said portion-to-be-urged is provided on said supporting portion.

Structure Example F13

A coupling member capable of coupling with and decoupling from a driving shaft which is provided in a main assembly of an electrophotographic image forming apparatus and which is provided with a recess, said coupling member comprising:
- a plate-like portion provided with a driving force receiving portion configured to enter the recess to receive a driving force for rotating a rotatable member carrying a developer on a surface thereof and
- a force-transmitted member configured to receive the driving force from said plate-like portion.

Structure Example F14

A coupling member according to Structure Example F16, wherein said plate-like portion includes a supporting portion movably supporting said driving force receiving portion.

Structure Example F15

A cartridge according to Structure Example F13 or F14, wherein said force-transmitted member includes a force-transmitted portion configured to receive the driving force from said driving force receiving member by contacting said plate-like portion, and wherein said force-transmitted portion is contactable to a surface of said plate-like portion opposite a surface provided with said driving force receiving portion.

Structure Example F16

A coupling member according to any one of Structure Examples F13-F15, wherein said force-transmitted portion is disposed outside of a free end of said plate-like portion with respect to a radial direction of said coupling member.

Structure Example F17

A coupling member according to any one of Structure Examples F13-F16, wherein said plate-like portion includes a first portion provided with said driving force receiving portion and uncovered by said force-transmitted member, a second portion provided with said supporting portion and extending in a direction crossing with said first portion, and a bent portion provided between said first portion and said second portion provided by bending said plate-like portion.

Structure Example F18

A coupling member according to any one of Structure Examples F13-F17, wherein said plate-like portion has a portion having a thickness of not less than 0.1 mm.

Structure Example F19

A coupling member according to any one of Structure Examples F13-F18, wherein said plate-like portion has a portion having a thickness of not less than 0.2 mm.

Structure Example F20

A coupling member according to any one of Structure Examples F13-F19, wherein said plate-like portion has a portion having a thickness of not more than 0.7 mm.

Structure Example F21

A coupling member according to any one of Structure Examples F13-F19, wherein said plate-like portion has a portion having a thickness of not more than 0.5 mm.

Structure Example F22

A coupling member according to any one of Structure Examples F13-F21, wherein said plate-like portion is made of metal.

Structure Example F23

A coupling member according to any one of Structure Examples F13-F22, wherein said plate-like portion is a leaf spring.

Structure Example F24

A coupling member according to any one of Structure Examples F13-F23, wherein said force-transmitted member includes a force-transmitted portion configured to receive the driving force from said driving force receiving member by contacting said plate-like portion, and said force-transmitting portion is disposed outside of the free end of said driving force receiving portion with respect to the radial direction of said coupling member.

Structure Example F25

A coupling member according to any one of Structure Examples F1-F24, wherein said supporting portion includes an elastically deformable deformed portion to move said driving force receiving portion.

Structure Example F26

A coupling member according to any one of Structure Examples F1-F25, wherein said supporting portion includes a projected portion provided with said driving force receiving portion.

Structure Example F27

A coupling member according to any one of Structure Examples F1-F26, wherein said supporting portion is provided with an extending portion extending in a direction crossing with the projecting direction of said projected portion.

Structure Example F28

A coupling member according to any one of Structure Examples F30-F27, wherein a length of projection of said projected portion from said extending portion is shorter than a length of said extending portion.

Structure Example F29

A coupling member according to any one of Structure Examples F26-F28, wherein said projected portion projects at least the radial inward of said coupling member.

Structure Example F30

A coupling member according to any one of Structure Examples F1-F29, wherein at least a part of said supporting portion is made of metal.

Structure Example F31

A coupling member according to any one of Structure Examples F1-F30, wherein said supporting portion comprises a metal portion and the resin material portion.

Structure Example F32

A coupling member according to Structure Example F31, wherein a part of said metal portion is covered by said resin material portion, and the other part is uncovered by said resin material portion.

Structure Example F32-2

A coupling member according to Structure Example F30 or F31, wherein said metal portion is provided with a through-hole, at least in which said resin material portion is provided.

Structure Example F33

A coupling member according to any one of Structure Examples F1-F32-2, wherein at least a part of said supporting portion is made of resin material.

Structure Example F34

A coupling member according to any one of Structure Examples F1-F33, wherein a cross-sectional configuration of said supporting portion taken along a plane perpendicular to the axial direction of said coupling member at a position where said driving force receiving portion is provided is non-circular.

Structure Example F35

A coupling member according to any one of Structure Examples F1-F34, wherein said coupling member includes a contact portion configured to contact an outer periphery of the driving shaft, and said contact portion is provided outside of the free end of said driving force receiving portion with respect to a radial direction of said coupling member and inside of a fixed end of said supporting portion.

Structure Example F36

A coupling member according to Structure Example F35, wherein said contact portion faces the axis of said coupling member and is curved along a circumferential direction of said coupling member.

Structure Example F37

A coupling member according to Structure Example F35 or F36, wherein said contact portion is movably supported by said supporting portion.

Structure Example F38

A coupling member according to any one of Structure Examples F35-F37, wherein said contact portion and the fixed end of said supporting portion are projected onto the axis of said coupling member, a projected range of said contact portion and a projected range of said fixed end are at least partly overlap with each other.

Structure Example F39

A coupling member according to any one of Structure Examples F1-F38, wherein said supporting portion moves said driving force receiving portion by deforming with the fixed end thereof as a fulcrum.

Structure Example F40

A coupling member according to any one of Structure Examples F1-39, wherein said driving force receiving portion is disposed inside the fixed end of said supporting portion with respect to the radial direction of said coupling member.

Structure Example F41

A coupling member according to any one of Structure Examples F1-F40, wherein a free end of said supporting portion is inside the fixed end of said supporting portion with respect to the radial direction of said coupling member.

Structure Example F42

A coupling member according to any one of Structure Examples F1-F41, wherein said supporting portion extends at least in the axial direction of said coupling member.

Structure Example F43

A coupling member according to any one of Structure Examples F1-F42, wherein said coupling member includes a portion where a distance from an inner surface of said coupling member increases toward a free end side from a fixed end side of said supporting portion.

Structure Example F44

A coupling member according to any one of Structure Examples F1-F42, wherein said supporting portion is provided with an inclined portion inclined away from an inner surface of said coupling member.

Structure Example F45

A coupling member according to any one of Structure Examples F1-F44, wherein said supporting portion is a snap-fit portion.

Structure Example F46

A coupling member according to any one of Structure Examples F1-F45, wherein said supporting portion is connected with an inner surface of said coupling member.

Structure Example F47

A coupling member according to any one of Structure Examples F1-F46, wherein said supporting portion extends at least in a circumferential direction of said coupling member.

Structure Example F48

A coupling member according to any one of Structure Examples F1-F47, wherein as viewed along the axis of said coupling member, said supporting portion crosses with a normal line to said drive receiving portion from a free end of said drive receiving portion.

Structure Example F49

A coupling member according to any one of Structure Examples F1-F48, wherein said supporting portion extends in a direction inclined relative to the axis of said coupling member by an angle of 30°-90°.

Structure Example F50

A coupling member according to any one of Structure Examples F1-F49, wherein said supporting portion extends in a direction inclined relative to the axis of said coupling member by an angle of 50°-90°.

Structure Example F51

A coupling member according to any one of Structure Examples F1-F50, wherein said supporting portion extends in a direction substantially perpendicular to the axis of said coupling member.

Structure Example F52

A coupling member according to any one of Structure Examples F1-F51, wherein as the fixed end of said supporting portion and said driving force receiving portion are projected onto the axis of said coupling member, the projected ranges thereof at least partly overlaps with each other.

Structure Example F53

A coupling member according to any one of Structure Examples F1-F52, wherein said supporting portion extends with an inclination relative to a direction perpendicular to the axis of said coupling member.

Structure Example F54

A coupling member according to any one of Structure Examples F1-F53, wherein said supporting portion is configured to wind around the driving shaft when said driving force receiving portion receives the driving force.

Structure Example F55

A coupling member according to any one of Structure Examples F1-F54, wherein said supporting portion includes a winding portion facing an axis of said coupling member and extending along a circumferential direction of said coupling member, said winding portion being configured to contact the driving shaft by receiving the driving force at said driving force receiving portion receiving.

Structure Example F56

A coupling member according to Structure Example F55, wherein as the fixed end of said supporting portion and said winding portion are projected onto the axis of said coupling member, the projected ranges thereof at least partly overlaps with each other.

Structure Example F57

A coupling member according to any one of Structure Examples F1-F56, wherein said supporting portion extends substantially in parallel with the axial direction.

Structure Example F58

A coupling member capable of coupling with and decoupling from a driving shaft which is provided in a main assembly of an electrophotographic image forming apparatus and which is provided with a recess, said coupling member comprising: a snap-fit portion configured to engage with the recess to receive a driving force for rotating a rotatable member carrying a developer on a surface thereof, said snap-fit portion extend in at least in a circumferential direction of said coupling member.

Structure Example F59

A coupling member according to any one of Structure Examples F1-F57, wherein said snap-fit portion including a driving force receiving portion for entering the recess to receive the driving force.

Structure Example F60

A coupling member according to any one of Structure Examples F1-F58, wherein said driving force receiving portion is movable at least in a radial direction of said coupling member.

Structure Example F61

A coupling member according to any one of Structure Examples F1-F60, wherein said driving force receiving portion is provided with an inclined portion inclined relative to a moving direction of said driving force receiving portion.

Structure Example F62

A coupling member according to any one of Structure Examples F1-F61, wherein said inclined portion of said driving force receiving portion is inclined such that a force urging said driving force receiving portion at least radially inward of said coupling member is produced when receiving the driving force from the driving shaft.

Structure Example F63

A coupling member according to any one of Structure Examples F1-F62, wherein as viewed along an axis of said coupling member, said driving force receiving portion faces a line extended from a free end of said driving force receiving portion in a direction of radially outward movement of said driving force receiving portion.

Structure Example F64

A coupling member according to any one of Structure Examples F1-F63, wherein said coupling member comprises a plurality of such said driving force receiving portions.

Structure Example F65

A coupling member according to Structure Example F64, wherein as viewed along the axial direction of said coupling member, said driving force receiving portions are provided substantially at regular intervals.

Structure Example F66

A coupling member according to any one of Structure Examples F1-F65, wherein the number of said driving force receiving portions of said coupling member is three.

Structure Example F67

A coupling member according to Structure Example F64 or F65, wherein the number of said driving force receiving portions of said coupling member is two.

Structure Example F68

A coupling member according to any one of Structure Examples F1-F67, wherein said coupling member includes a deformed portion capable of elastic deformation to move said driving force receiving portion.

Structure Example F69

A coupling member according to any one of Structure Examples F1-F68, wherein said coupling member includes a guide portion for guiding insertion of the driving shaft.

Structure Example F70

A coupling member according to any one of Structure Examples F1-F69, wherein said driving force receiving portion is movable in the radial direction by at least 0.6 mm.

Structure Example F71

A coupling member according to any one of Structure Examples F1-F70, wherein said driving force receiving portion is movable in the radial direction by at least 1.0 mm.

Structure Example F72

A coupling member according to any one of Structure Examples F1-F71, wherein said driving force receiving portion is movable in the radial direction by at least 1.2 mm.

Structure Example F73

A coupling member according to any one of Structure Examples F1-F72, wherein said supporting portion is configured to move said driving force receiving portion to a position radially outward of said coupling member, as compared with a free state, when receiving a force from the driving shaft.

Structure Example F74

A coupling member according to any one of Structure Examples F1-F73, wherein said coupling member includes at-mounting force receiving portion for receiving a force for moving said driving force receiving portion in the radial direction, from the driving shaft, at the time of mounting said cartridge.

Structure Example F75

A coupling member according to any one of Structure Examples F1-F74, wherein said at-mounting force receiving portion is provided with an inclined portion inclined relative to the axis of said coupling member.

Structure Example F76

A coupling member according to any one of Structure Examples F1-F75, wherein said coupling member includes at-dismounting force receiving portion for receiving a force for moving said driving force receiving portion in the radial direction, from the driving shaft, at the time of dismounting said cartridge.

Structure Example F77

A coupling member according to Structure Example F76, wherein said at-dismounting force receiving portion is provided with an inclined portion inclined relative to the axis of said coupling member.

Structure Example F78

A coupling member according to any one of Structure Examples F1-F77, wherein said coupling member is provided with a mounting portion for connecting with a shaft of said rotatable member.

Structure Example F78-2

A coupling member according to any one of Structure Examples F1-F78, wherein a shortest distance between the axis of said coupling member and said driving force receiving portion is longer than a shortest distance between the axis and said mounting portion.

Structure Example F79

A coupling member according to Structure Examples F1-F78-2, wherein said coupling member is for transmitting the driving force to a developing roller as said rotatable member.

Structure Example F80

A coupling member according to any one of Structure Examples 1-F79, wherein said coupling member is for transmitting the driving force to a developing roller as the rotatable member and to a supplying roller for supplying the developer to the developing roller.

Structure Example F81

A coupling member according to any one of Structure Examples F1-F80, wherein said coupling member is for transmitting the driving force to a photosensitive drum as the rotatable member.

Structure Example G

A cartridge comprising a drum unit according to any one of the foregoing Structure Examples, and a bearing portion rotatably supporting said drum unit.

Structure Example H

An electrophotographic image forming apparatus comprising the main assembly of the electrophotographic image forming apparatus, and a drum unit according to any one of the foregoing Structure Examples.

Structure Example I

An electrophotographic image forming apparatus comprising the main assembly of the electrophotographic image forming apparatus, and a cartridge according to any one of the foregoing Structure Examples.

INDUSTRIAL APPLICABILITY

According to the present invention, a process cartridge, drum unit, cartridge and coupling member usable with an image forming apparatus using an electrophotographic process are provided.

REFERENCE Numerals

SY, SM, SC, SK: image forming stations,
1: photosensitive drum,
7: process cartridge,
33: aligning member,
33*a*: inverse conical shape,
33*b*: press-fitting portion,
33*c*: retaining portion,
33*d*: projection,
33*e*: contact portion,
33*f*: outer cylindrical rib,
33*g*: inside cylindrical rib,
33*h*: free end portion of inverse conical shape,
39: drum unit bearing member,
52: secondary transfer opposing roller,
60: cylinder side metal mold,
61: mounting portion side metal mold,
62: mold parting plane,
70: flange member,
72: mounting portion,
74: base portion,
75: flange portion,
100: electrophotographic image forming apparatus (image forming apparatus),
100A: main assembly of the image forming apparatus,
101: main assembly driving shaft,
101*a*: main assembly drive transmission groove,
101*b*: main assembly drive transmission surface,

101*c*: semi-spherical,
101*d*: bearing portion,
101*e*: gear portion,
101*f*: shaft portion,
101*g*, rough guide portion,
101*h*: center of semi-spherical,
101*i*: main assembly side dismounting taper,
102: bearing member, and
103: spring member.

The invention claimed is:

1. A developing cartridge comprising:

a casing having a first end and a second end opposite to the first end;

a developing roller rotatably supported by the casing; and a coupling member provided adjacent to the first end of the casing, the coupling member being operatively connected to the developing roller, the coupling member being rotatable about a rotational axis thereof, and the coupling member including (i) a cylindrical portion, (ii) a first projection at least partially positioned inside of the cylindrical portion, (iii) a second projection at least partially positioned inside of the cylindrical portion, (iv) an elastically movable projection at least partially positioned inside of the cylindrical portion, and (v) a wall extending in a direction perpendicular to the rotational axis and positioned between the second end of the casing and the first and second projections, wherein, along a line perpendicular to the rotational axis of the coupling member, the first projection is open to the rotational axis of the coupling member, and wherein, along a line perpendicular to the rotational axis of the coupling member, the second projection is open to the rotational axis of the coupling member.

2. A developing cartridge according to claim 1, wherein, along a line perpendicular to the rotational axis of the coupling member, the movable projection is open to the rotational axis of the coupling member.

3. A developing cartridge according to claim 1, wherein the movable projection is movable such that a distance between the movable projection and the first and second projections is changeable.

4. A developing cartridge according to claim 1, wherein the movable projection is movable between a first position and a second position, with a distance between the rotational axis of the coupling member and an end of the movable projection being shorter when the movable projection is in the first position than when the movable projection is in the second position.

5. A developing cartridge according to claim 4, wherein the movable projection is biased toward the first position.

6. A developing cartridge according to claim 1, further comprising a toner supplying roller configured to supply toner to the developing roller.

7. A developing cartridge according to claim 6, wherein the coupling member is configured to transmit a driving force to the developing roller through the toner supplying roller.

8. A developing cartridge according to claim 1, further comprising:

a first gear positioned coaxially with the coupling member, the first gear being operatively connected to the coupling member so as to receive a driving force from the coupling member; and a second gear operatively connected to the developing roller, the second gear being operatively connected to the first gear and the developing roller so as to transmit the driving force from the first gear to the developing roller.

9. A developing cartridge according to claim 8, wherein the first gear and the second gear are positioned adjacent to the second end of the casing.

10. A developing cartridge according to claim 1, further comprising toner contained in the casing.

11. A developing cartridge according to claim 1, wherein, as seen in a direction of the rotational axis of the coupling member, the first and second projections are positioned in one half section of the inside of the cylindrical portion and the movable projection is positioned in a second half section of the inside of the cylindrical portion.

* * * * *